US011558192B2

(12) United States Patent
Auh et al.

(10) Patent No.: US 11,558,192 B2
(45) Date of Patent: Jan. 17, 2023

(54) NUTS: FLEXIBLE HIERARCHY OBJECT GRAPHS

(71) Applicant: NUTS HOLDING, LLC, Glencoe, IL (US)

(72) Inventors: Yoon Auh, Glencoe, IL (US); Nicholas Bennig, Glencoe, IL (US); Sotirios Triantafillou, Glencoe, IL (US)

(73) Assignee: NUTS HOLDINGS, LLC, Glencoe, IL (US)

( * ) Notice: Subject to any disclaimer, the term of this patent is extended or adjusted under 35 U.S.C. 154(b) by 111 days.

(21) Appl. No.: 17/213,932

(22) Filed: Mar. 26, 2021

(65) Prior Publication Data

US 2021/0320794 A1 Oct. 14, 2021

Related U.S. Application Data

(60) Provisional application No. 63/007,636, filed on Apr. 9, 2020.

(51) Int. Cl.

| | |
|---|---|
| ***H04L 9/14*** | (2006.01) |
| ***G06F 16/901*** | (2019.01) |
| ***H04L 9/08*** | (2006.01) |

(52) U.S. Cl.

CPC ............ *H04L 9/14* (2013.01); *G06F 16/9024* (2019.01); *H04L 9/0836* (2013.01); *H04L 9/0861* (2013.01)

(58) Field of Classification Search

CPC ....... H04L 9/14; H04L 9/0836; H04L 9/0861; H04L 9/0891; H04L 9/085; G06F 16/9024

See application file for complete search history.

(56) References Cited

U.S. PATENT DOCUMENTS

| | | | |
|---|---|---|---|
| 5,715,403 | A | 2/1998 | Stefik |
| 6,185,684 | B1 | 2/2001 | Pravetz et al. |
| 6,205,549 | B1 | 3/2001 | Pravetz |
| 6,249,866 | B1 | 6/2001 | Brundrett et al. |
| 6,324,650 | B1 | 11/2001 | Ogilvie |
| 6,823,068 | B1 | 11/2004 | Samid |
| 6,845,449 | B1 | 1/2005 | Carman et al. |
| 6,868,159 | B2 | 3/2005 | Leppek |
| 6,895,392 | B2 | 5/2005 | Stefik et al. |
| 6,976,168 | B1 | 12/2005 | Branstad et al. |
| 7,010,570 | B1 | 3/2006 | Boies et al. |

(Continued)

FOREIGN PATENT DOCUMENTS

| | | | |
|---|---|---|---|
| WO | WO 2016/077219 A1 | 5/2016 | |
| WO | WO-2016077219 A1 * | 5/2016 | .......... G06F 19/322 |

OTHER PUBLICATIONS

U.S. Appl. No. 15/692,584, filed Aug. 31, 2017, Patented.

(Continued)

*Primary Examiner* — Matthew Smithers

(74) *Attorney, Agent, or Firm* — DLA Piper LLP US

(57) ABSTRACT

A lock node for storing data and a protected storage unit. The lock node includes an input section which provides a plurality of key maps, each corresponding to one of a plurality of primary keys, respectively, applied to the input section, each key map including at least one main key, a variable lock section producing a derived key from a logical operation on the main keys corresponding to the primary keys applied to the input section, and an output section producing the data in response to the derived key.

20 Claims, 306 Drawing Sheets

(56) References Cited

U.S. PATENT DOCUMENTS 7,095,850 B1 8/2006 McGrew
7,136,859 B2 11/2006 Lucovsky et al.
7,197,512 B2 3/2007 Pharies et al.
7,243,157 B2 7/2007 Levin et al.
7,359,517 B1 4/2008 Rowe
7,389,529 B1 6/2008 Enderwick et al.
7,394,470 B2 7/2008 Nishimura et al.
7,434,052 B1 10/2008 Rump
7,441,185 B2 10/2008 Coulson et al.
7,509,492 B2 3/2009 Boyen et al.
7,539,867 B2 5/2009 Bolosky et al.
7,587,589 B2 9/2009 England et al.
7,593,548 B2 9/2009 Dharmarajan et al.
7,624,400 B2 11/2009 Pharies et al.
7,653,876 B2 1/2010 Ethier et al.
7,715,565 B2 5/2010 Kimmel et al.
7,762,456 B2 7/2010 England et al.
7,765,193 B2 7/2010 Hirose
7,779,139 B2 8/2010 Vishwanath et al.
7,793,099 B2 9/2010 Peterson
7,886,364 B2 2/2011 Douceur et al.
7,890,771 B2 2/2011 England et al.
7,945,784 B1 5/2011 Masinter et al.
7,949,720 B2 5/2011 Vernal et al.
7,979,697 B2 7/2011 Phillips et al.
8,059,815 B2 11/2011 Lofgren et al.
8,145,900 B2 3/2012 Launchbury et al.
8,219,821 B2 7/2012 Zimmels et al.
8,306,920 B1 11/2012 Lynch
8,331,560 B2 12/2012 Boyen et al.
8,347,087 B1 1/2013 Agrawal et al.
8,370,956 B2 2/2013 Stefik et al.
8,397,068 B2 3/2013 Shur et al.
8,463,776 B2 6/2013 Dunbar et al.
8,468,345 B2 6/2013 Auradkar et al.
8,561,127 B1 10/2013 Agrawal et al.
8,625,805 B1 1/2014 Statica et al.
8,656,159 B1 2/2014 Donahue
8,683,230 B2 3/2014 England et al.
8,694,788 B1 4/2014 Thomas et al.
8,812,643 B2 8/2014 Maine et al.
8,826,005 B1 9/2014 Brichford
8,831,228 B1 9/2014 Agrawal et al.
8,832,047 B2 9/2014 Herbach et al.
8,887,254 B2 11/2014 Spalka et al.
8,954,726 B1 2/2015 Statica et al.
8,972,750 B2 3/2015 Goel et al.
8,978,091 B2 3/2015 Banti et al.
9,009,477 B2 4/2015 Das
9,077,525 B2 7/2015 Chandran et al.
9,129,095 B1 9/2015 Lam et al.
9,183,406 B2 11/2015 England et al.
9,191,376 B2 11/2015 Phillips, II et al.
9,378,380 B1 6/2016 Reid et al.
9,390,228 B2 7/2016 Reid
9,563,783 B2 2/2017 Szebeni et al.
9,767,317 B1 9/2017 Chakrovorthy et al.
9,871,772 B1 1/2018 Weinstein
2002/0041685 A1 4/2002 McLoone et al.
2002/0094084 A1 7/2002 Wasilewski et al.
2002/0161973 A1* 10/2002 Ulrich .................... G06F 16/10 711/170
2002/0170053 A1 11/2002 Peterka et al.
2002/0184485 A1 12/2002 Dray, Jr. et al.
2003/0003896 A1 1/2003 Klingler et al.
2003/0055666 A1 3/2003 Roddy et al.
2003/0074482 A1 4/2003 Chirstensen et al.
2005/0086661 A1* 4/2005 Monnie .................. G06F 9/526 719/310
2005/0213511 A1 9/2005 Reece, Jr. et al.
2005/0278525 A1 12/2005 Doucer et al.
2006/0004756 A1 1/2006 Peleg et al.
2007/0088947 A1 4/2007 Cross et al.
2007/0113095 A1 5/2007 Marui et al.
2007/0223697 A1 9/2007 Mizuno
2007/0291934 A1 12/2007 Volkovs et al.
2008/0091606 A1 4/2008 Grecia
2008/0091699 A1 4/2008 Nakashima
2008/0097786 A1 4/2008 Sachdeva
2008/0155690 A1 6/2008 Broshy
2008/0248782 A1 10/2008 Stiers
2009/0093312 A1 4/2009 Carlson
2010/0173610 A1 7/2010 Kitazoe et al.
2010/0174664 A1 7/2010 Schwaab et al.
2011/0055932 A1 3/2011 Fox et al.
2012/0033815 A1 2/2012 Kuo
2013/0060705 A1 3/2013 Lynch
2013/0262685 A1 10/2013 Shelton et al.
2013/0332424 A1 12/2013 Nos
2014/0025719 A1 1/2014 Kalinkin
2014/0195804 A1 7/2014 Hursti
2014/0245025 A1* 8/2014 Fairless ................ G06F 21/602 713/189
2014/0289789 A1 9/2014 Poornachandran
2015/0161210 A1 6/2015 Cook et al.
2015/0347480 A1 12/2015 Smart
2015/0378842 A1 12/2015 Tomlinson et al.
2016/0028735 A1 1/2016 Francis et al.
2016/0191993 A1 6/2016 Roth et al.
2016/0261413 A1 9/2016 Kirsch
2016/0275461 A1 9/2016 Sprague et al.
2016/0335299 A1* 11/2016 Vemulapati ......... G06F 16/2246
2017/0004314 A1 1/2017 Blumenau et al.
2017/0230175 A1 8/2017 Feliciano
2017/0278186 A1 9/2017 Creighton et al.
2017/0366354 A1 12/2017 Alomair
2020/0019735 A1 1/2020 Auh
2020/0193047 A1 6/2020 Moore
2020/0320211 A1 10/2020 Moore

OTHER PUBLICATIONS

U.S. Appl. No. 15/692,648, filed Aug. 31, 2017, Patented.
U.S. Appl. No. 16/582,649, filed Sep. 24, 2019, Patented.
U.S. Appl. No. 16/828,535, filed Mar. 24, 2020, Patented.
U.S. Appl. No. 17/213,932, filed Mar. 26, 2021, Pending.
U.S. Appl. No. 17/232,929, filed Apr. 16, 2021, Pending.
U.S. Appl. No. 17/232,903, filed Apr. 16, 2021, Pending.
International Search Report in PCT/US2021/024356, dated Aug. 16, 2021.
Written Opinion in PCT/US2021/024356, dated Aug. 16, 2021.
Bernhard Amann et al., "IgorFs: A Distributed P2P File System", Proc. of the 8th IEEE Intl. Conference on Peer-to-Peer Computing, Sep. 8-11, 2008, Aachen, Germany.
Bernhard Amann et al., "Cryptographically Enforced Permissions for Fully Decentralized File Systems",, Proc. of the 10th IEEE Intl. Conference on Peer-to-Peer Computing, 2010.
Christian D. Jensen, "CryptoCache: A Secure Sharable File Cache for Roaming Users", EW 9 Proceedings of the 9th workshop on ACM SIGOPS European workshop: beyond the PC: new challenges for the operating system, pp. 73-78, Sep. 17-20, 2000, Kolding, Denmark.
Anthony Harrington et al., "Cryptograhic Access Control in a Distrubted File System", SACMAT'03, Jun. 1-4, 2003, Como, Italy.
Kendy Kutzner, "The Decentralized File System Igor-FS as an Application for Overlay-Networks", Doctoral Dissertation Universitat Fridericiana zu Karlsruhe, Feb. 14, 2008, Karlsruhe, Baden-Württemberg, Germany.
Kendy Kutzner et al., "The IGOR File System and Beyond", Slide show presentation, Peer-to-Peer Technology in Grid Computing, Apr. 2008, Germany.
Tom Lyons, "The Book of Fermat", May 2017, www.fermat.org.
Luis Fernando Molina, "Introducing the Graphchain" Mar. 10, 2017, Medium, https://hackernoon.com/introducing-the-graphchain-2d20513bf713.
Luis Fernando Molina et al., "Internet of People: A Public and Open Peer-to-Peer Network of People", Mar. 2017, www.fermat.org.
Luis Fernando Molina et al., "Fermat: A Modular App Platform to Develop 'Internet of People' Apps", Aug. 2016, www.fermat.org.

(56) References Cited

OTHER PUBLICATIONS

Luis Fernando Molina, "Fermat, the Internet of People and the Person to Person Economy", Medium, Nov. 18, 2016, https://hackernoon.com/fermat-the-internet-of-people-and-the-person-to-person-economy-ce933865a0b0.
ODNI, "XML Data Encoding Specification for Trusted Data Format", Sep. 6, 2013, Intelligence Community Technical Specification, Version 3, USA.
Virtru, "Client-Side Data Protection with Virtru Encryption as a Service (EaaS)", © 2016 Virtru Corporation, www.virtru.com.
Docker "What is Docker?", as early as 2013, 8 pages, www.docker.com.
A. Armando et al., "Content-based Information Protection and Release in NATO Operations", SACMAT 2013, Amsterdam, Netherlands.
Simson Garfinkel et al., "Practical Unix & Internet Security, 3rd Edition", Mar. 3, 2003, chap 4,6,7,10 pp. 128,438,606, O'Reilly Media, Sebastopol, CA, USA.
Ladar Levison, "Dark Internet Mail Environment (DIME): Architecture and Specifications", Mar. 2015, www.darkmail.info.
Tuomas Lukka et al., "GZigZag—A Platform for Cybertext Experiments", as early as Aug. 25, 2000, http://www.nongnu.org/gzz/ct/ct.html.
Jacob Strauss et al., "Eyo: Device-Transparent Personal Storage", 2011 USENIX Annual Technical Conference, Jun. 15-17, 2011, Portland, OR, USA.
Jacob Strauss et al., "Device Transparency: a New Model for Mobile Storage", Oct. 11, 2009, Presentation slides, SOSP Workshop on Hot Topics in Storage and File Systems (HotStorage '09), Big Sky, MT, USA.
Jacob Strauss et al., "Device-Transparent Personal Storage", Jun. 17, 2011, Quanta Research Cambridge presentation slides, MIT, Yale, USA.
Andreas M. Antonopoulos, "Mastering Bitcoin: Unlocking Digital Crytocurrencies", Dec. 20, 2014, chap 2,4,7,10, O'Reilly Media, Sebastopol, CA, USA.
Charles H. Bennett, "Notes on Landauer's principle, reversible computation, and Maxwell's Demon", Studies in History and Philosophy of Modern Physics 34 (2003) 501-510, 2003, Elsevier Science Ltd., www.elsevier.com.
Charles H. Bennett, "Logical Reversibility of Computation", Nov. 1973, pp. 525-532, IBM J. Res. Develop., Yorktown Heights, NY, USA.
Daniel J. Bernstein et al., "The security impact of a new crytographic library", Jul. 25, 2012, Progress in Cryptology—LATINCRYPT 2012. LATINCRYPT 2012. Lecture Notes in Computer Science, vol. 7533. Springer, Berlin, Heidelberg, Germany.
David Chaum et al., "cMix: Anonymizatior by High-Performance Scalable Mixing", Feb. 23, 2016, 25th USENIX Security Symposium.
Ralf Dragon et al., "Data Storage in Getelligent Components: A New Way for Self-Authentication", Sep. 2010, 2nd workshop Self-X in Engineering, Karlsruhe, Germany.
Niels Ferguson et al., "Cryptography Engineering: Design Principles and Practical Applications", Mar. 15, 2010, chap 15,18-21, Wiley Publishing, Indianapolis, Indiana, USA.
Anthony Harrington, "Cryptographic Access Control for a Network File System", Sep. 17, 2001, MS Dissertation, University of Dublin, Ireland.
Satoshi Nakamoto, "Bitcoin: A Peer-to-Peer Electronic Cash System", Oct. 31, 2008, www.bitcoin.org.
Declan Patrick O'Shanahan, "CryptoFS: Fast Crytographic Secure NFS", Sep. 15, 2000, MS Dissertation, University of Dublin, Ireland.
Samsung Research America, "White Paper: Samsung KNOX Security Solution", Feb. 2016, Samsung Electronics Co. Ltd., Korea.
Samsung Enterprise Mobility Solutions, "White Paper: An Overview of the Samsung KNOX Platform", Sep. 2015, Samsung Electronics Co. Ltd., Korea.
Samsung Business, "Beyond basic Android: Security with Samsung KNOX", 2015, Samsung Electronics Co. Ltd., Korea.
Thomas Schwarz et al., "An Encrypted, Content Searchable Scalable Distributed Data Structure", Apr. 3-7, 2006, pp. 1,2,5, 22nd International Conference on Data Engineering Workshops (ICDEW'06), Atlanta, GA, USA.
Symantec, "Symantec™ Encryption Desk for Windows User's Guide 10.3", Jan. 2014, pp. 79,128,180,182,188,189,202,207,217,224,235,240,245, Symantec Corporation, Mountain View, CA, USA.
Simon Thyregod, "Key Management in Crytographic Access Control", Mar. 2, 2006, MS Thesis, Technical University of Denmark, Kongens Lyngby, Denmark.
Vormetric, "Vormetric Encryption Architecture Overview: Protecting Enterprise Data at Rest with Encryption, Access Controls and Auditing", 2012, Vormetric Inc., www.vormetric.com.
Frank Wang et al., "Sieve: Cryptographic Enforced Access Control for User Data in Untrusted Clouds", 2016, pp. 1-5,10,13th USENIX Symposium on Networked Systems Design and Implementation (NSDI 16), Santa Clara, CA, USA.
Ted Nelson "Project Xanadu", as early as 1960, www.wikipedia.org.
J. Chris Anderson et al., "CouchDB: The Definitive Guide, 1st Edition", Jan. 2010, chap 2,12,16,17,22, O'Reilly Media, Sebastopol, CA, USA.
Jacob Appelbaum et al., "Unlocking FileVault: An analysis of Apple's disk encryption system", Dec. 29, 2006, 23rd Chaos Communication Congress, Germany.
John Bethencourt et al., "Ciphertext-Policy Attribute-Based Encryption", May 20-23, 2007, 2007 IEEE Symposium on Security and Privacy (SP '07), Berkeley, CA, USA.
Dan Boneh et al., "Functional Encryption: Definition and Challenges", 2011, Theory of Cryptography, TCC 2011, Lecture Notes in Computer Science, vol. 6597. Springer, Berlin, Heidelberg, Germany.
Melissa Chase et al., "Structured Encryption and Controlled Disclosure", 2010, Advances in Cryptology—ASIACRYPT 2010, ASIACRYPT 2010, Lecture Notes in Computer Science, vol. 6477, Springer, Berlin, Heidelberg, Germany.
Jason Crampton, "Cryptographic Enforcement of Role-Based Access Control", 2011, Formal Aspects of Security and Trust, FAST 2010, Lecture Notes in Computer Science, vol. 6561, Springer, Berlin, Heidelberg, Germany.
Arkajit Dey et al., "Keyczar: A Cryptogrphic Toolkit", as early as 2008, MIT, Google Research, www.google.com.
Siyaram Gupta et al., "A Python Based Enhanced Secret Sharing Scheme to Secure Information using Cryptography Techniques", 2014, International Journal of Advanced Science and Technology vol. 71 (2014), pp. 15-30, http://dx.doi.org/10.14257/ijast.2014.71.02.
Michael Austin Halcrow, "eCryptfs: An Enterprise-class Cryptographic Filesystem for Linux", 2005, 2005 Linux Symposium, Canada.
Sandro Hawke, "Introduction to Linked Data", Jun. 8, 2010, Presentation slideshow at Cambridge Semantic Web Gathering, Cambridge, MA, USA.
Marc Jaimez et al., "A mechanism to avoid collusion attacks based on code passing in mobile agent systems", 2009, Information Security Theory and Practice. Smart Devices, Pervasive Systems, and Ubiquitous Networks, WISTP Science, vol. 5746, Springer, Berlin, Heidelberg, Germany.
M. Jones, "JSON Web Key (JWK)", May 2015, Internet Engineering Task Force (IETF) Request for Comments: 7517.
M. Jones, "JSON Web Algorithms (JWA)", May 2015, Internet Engineering Task Force (IETF) Request for Comments: 7518.
M. Jones et al., "JSON Web Encryption (JWE)", May 2015, Internet Engineering Task Force (IETF) Request for Comments: 7516.
M. Jones et al., "JSON Web Signature (JWS)", May 2015, Internet Engineering Task Force (IETF) Request for Comments: 7515.
Anne Voluntas Dei Massah Kayem, "Adaptive Cryptographic Access Control for Dynamic Data Sharing Environments", Oct. 2008, chap 1,2,5, Doctoral Dissertation, Queen's University, Kingston, Ontario, Canada.

(56) References Cited

OTHER PUBLICATIONS

Anne Voluntas Dei Massah Kayem et al., "Adaptive Cryptographic Access Control", Aug. 16, 2010, chap 2,6, Advances in Information Security (Book 48), Springer Verlag, New York, NY, USA.
Hugo Krawczyk, "Secret Sharing Made Short", 1994, Advances in Cryptology—CRYPTO '93 LNCS 773, pp. 136-146, Springer-Verlag, Berlin, Heidelberg, Germany.
Allison Lewko et al. "Fully Secure Functional Encryption: Attribute-Based Encryption and (Hierarchical) Inner Product Encryption", 2010, Advances in Cryptology—EUROCRYPT 2010. EUROCRYPT 2010, Lecture Notes in Computer Science, vol. 6110, Springer, Berlin, Heidelberg, Germany.
John Lyle, "Personal PKI for the smart device era", 2012, Public Key Infrastructures, Services and Applications, EuroPKI 2012, Lectures Notes in Computer Science, vol. 7868, Springer, Berlin, Heidelberg, Germany.
Network Associates, "PGP Freeware for Windows User's Guide version 7.0", 2001, Network Associates Inc, Santa Clara, CA, USA.
Jon Callas, "Introduction to Cryptography", 2009, PGP Corporation, USA, www.pgp.com.
Brent Waters, "Ciphertext-Policy Attribute-Based Encryption: An Expressive, Effcient, and Provably Secure Realization", 2011, Public Key Cryptography—PKC 2011, PKC 2011, Lecture Notes in Computer Science, vol. 6571, Springer, Berlin, Heidelberg, Germany.
Wire Swiss GMBH, "Wire Privacy Whitepaper", Mar. 3, 2016, Wire Swiss GmbH, Germany, www.wire.com.
Wire Swiss GMBH, "Wire Security Whitepaper", Mar. 3, 2016, Wire Swiss GmbH, Germany, www.wire.com.
M. Miller, "Examples of Protecting Content Using JSON Object Signing and Encryption (JOSE)", May 2015, Internet Engineering Task Force (IETF) Request for Comments: 7520.
WT SDK, Product Brief SDK functions; www.windtalkersercurity.com; 2016 Windtalker, LLC.
WT Overview; www.windtalkersecurity.com; 2016 CoreGuard, LLC
WT Security Solution Brief; www.windtalkersecurity.com; CIO Magazine, Sep. 15, 2011.
Business Wire; Windtalker Launches Cloud-Based Content Security Technology Today; Social Media Profiles; Oct. 30, 2018.
FAQ Windtalker; Mar. 11, 2019.
Windtalker Data Centric Security Infographic; www.windtalkersecurity.com.
Windtalker Vector Product Brief; www.windtalkersecurity.com; 2016 Windtalker, LLC.
International Search Report issued in PCT/US2017/049661 dated Feb. 2, 2018.
Written Opinion issued in PCT/US2017/049661 dated Feb. 2, 2018.
European Search Report from EP Application No. 17851312.3 dated Apr. 6, 2020.
Eurasian Office Action issued in Eurasian patent application No. 201990315 dated Apr. 22, 2020.
Eurasian Office Action issued in Eurasian patent application No. 19179180.5 dated Nov. 30, 2020.
Werner Vogels, "Eventually Consistent", Communications of the ACM, Jan. 2009, pp. 40-44, vol. 52 No. 1, Association for Computing Machinery, USA.
Vinton G. Cerf, "Half-Baked High-Resolution Referencing", Feb. 2021, p. 7, vol. 64 No. 2, Association for Computing Machinery, USA.
Paul V. Blessy et al., "Cryptograph File System for Secured Group Communication", May 30, 2015, pp. 207-211, vol. 3, Issue-5, International Journal of Computer Sciences and Engineering, Indore, India.
Fangbo Cai et al., "Survey of access control models and technologies for cloud computing", Feb. 1, 2018, pp. 6111-6116, Cluster Comput 22, Springer Science+Business Media, LLC, part of Springer Nature 2018, Switzerland.
Giuseppe Decandia et al., "Dynamo: Amazon's Highly Available Key-value Store", SOSP'07, Oct. 14-17, 2007, pp. 205-220, Association for Computing Machinery, Stevenson, Washington, USA.
Keiko Hashizume et al., "An analysis of security issues for cloud computing", Journal of Internet Services and Applications, Feb. 27, 2013, 13 pages, SpringerOpen Journal, Switzerland.
Mustaque Ahamad et al., "Replicated Data Management in Distributed Systems", 1992, 32 pages, College of Computing, Georgia Institute of Technlogy, Atlanta, Georgia, USA.
David Elliot Bell, "Looking Back at the Bell-La Padula Model", Dec. 7, 2005, 15 pages, 21st Annual Computer Security Applications Conference (ACSAC'05), IEEE, USA.
David Elliot Bell et al., "Secure Computer System: Unified Exposition and Multics Interpretation", Mar. 1976, 134 pages, Prepared for the US Air Force, The MITRE Corporation, Bedford, MA, USA.
Len Lapadula et al., "Secure Computer System: Mathematical Foundations", Mar. 1973, 33 pages, MITRE Technical Report 2547, The MITRE Corporation, Bedford, MA, USA.
Marc Shapiro et al., "A comprehensive study of Convergent and Commutative Replicated Data Types", Research Report RR-7506, Jan. 13, 2011, 47 pages, INRIA, Paris, France.
Anton Zagorskii, "CRDT: Conflict-free Replicated Data Types", Web article, Aug. 6, 2018, www.medium.com, USA.
Martin Kleppmann et al., "A Conflict-Free Replicated JSON Datatype", CoRR, Aug. 2016, 17 pages, IEEE Transaction on Parallel and Distributed Systems PP(99), IEEE, USA.
Marc Shapiro et al., "Conflict-free Replicated Data Types", France SSS 2011—13th International Symposium Stabilization, Safety, and Security of Distributed Systems, Oct. 2011, pp. 386-400, Grenoble, France.
Nuno Preguiça, "Conflict-free Replicated Data Types: An Overview", Computing Research Repository (CoRR), Jun. 27, 2018, 41 pages, Cornell University and ACM, USA.
Peter J. Denning et al., "The Profession of IT, The Long Quest for Universal Information Access", Dec. 2010, pp. 34-36, vol. 53 No. 12, Association for Computing Machinery, USA.
Jim Gray et al., "The Dangers of Replication and a Solution", 1996 ACM SIGMOD Conference at Montreal, May 1996, pp. 173-182, Microsoft Research Technical Report MSR-TR-96-17, Association for Computing Machinery, USA.
Martin Kleppmann, "A Critique of the CAP Theorem", CoRR, Sep. 18, 2015, 14 pages, Cornell University, USA.
Doug Cahill, "Before and After Next-gen: Cybersecurity Considerations that Transcend Paradigm Shifts", ESG White Paper, Jan. 2017, 12 pages, The Enterprise Strategy Group, USA.
Jianbing Ni et al., "Securing Fog Computing for Internet of Things Applications: Challenges and Solutions", IEEE Communications Surveys & Tutorials, Oct. 12, 2017, pp. 601-628, vol. 20, No. 1, IEEE, USA.
Mattia Antonini et al., "Fog Computing Architectures: a Reference for Practitioner", IEEE Internet of Things Magazine, Sep. 2019, pp. 19-25, vol. 2, No. 3, IEEE, USA.
Alberto Montresor, "Gossip and Epidemic Protocols", Wiley Online Library, Aug. 15, 2017, 19 pages, Wiley, USA.
Mark Jelasity, "Chapter 1: Gossip", Self-Organising Software: From Natural to Artificial Adaptation, Natural Computing Series, 2011, pp. 139-162, Springer, Switzerland.
Chip Sharp, "Overview of the Digital Object Architecture (DOA)", An Internet Society Information Paper, Oct. 25, 2016, 8 pages, Internet Society, USA.
Leslie Lamport, "The Part-Time Parliament", ACM Transactions on Computer Systems, May 1998, pp. 133-169, vol. 16 No. 2, Association for Computing Machinery, USA.
Rini Mahajan et al., "A Novel access control model in cloud computing environment (PAR-AC)", International Journal of Engineering & Technology, 2018, pp. 1795-1800, vol. 7 No. 3, Science Publishing Corporation, UAE.
Sunita Mahajan et al., "Security in Distributed Systems", Distributed Computing $2^{nd}$ edition, Dec. 1, 2013, Chapter 11 pp. 384-449, Oxford University Press, India.
Nami Nasserazad et al., "Practical Demystification of CRDTs", Amsterdam.SCALA Meetup, Aug. 27, 2015, 59 slides, TOMTOM, Amsterdam, Netherlands.
Leslie Lamport, "Paxos Made Simple", ACM SIGACT News (Distributed Computing Column), Dec. 2001, pp. 51-58, vol. 32 No. 4, Association for Computing Machinery, USA.

(56) References Cited

OTHER PUBLICATIONS

You-Jin Song et al., "Access Control Policy of Data Considering Varying Context in Sensor Fusion Environment of Internet of Things", KIPS Tr. Software and Data Eng., Sep. 2015, pp. 409-441, vol. 4 No. 9, KTSDE, South Korea.
Charles Byers et al., "OpenFog Reference Architecture for Fog Computing", OpenFog Architecture Workgroup, Feb. 2017, 162 pages, OpenFog Consortium, USA.
Michaela Iorga et al., "Fog Computing Conceptual Model: Recommendations of the National Institute of Standards and Technology", NIST Special Publication 500-325, Mar. 2018, 14 pages, NIST, USA.
Wikipedia, "Version Control", Jun 6. 2019, 9 pages, wikipedia.org, USA.
Eric Sink, "Version Control by Example", Jul. 2011, 226 pages, Pyrenean Gold Press, Champaign, Illinois, USA.
Admin Protonmail, "The ProtonDrive security model", Aug. 31, 2020, 15 pages, web article, Proton Technologies AG, Switzerland.
Jon Loeliger et al., "Version Control with Git 2nd Edition", Aug. 2012, 464 pages, O'Reilly Media Inc., Sebastopol, CA, USA.
Michael Freedman, "Strong Consistency & CAP Theorem", Oct. 7, 2016, 8 pages, lecture slides for COS-418 Fall 2016 Distributed Systems at Princeton University, Princeton, New Jersey, USA.
Kyle Jamieson, "Eventual Consistency: Bayou", Oct. 19, 2016, 12 pages, lecture slides for COS-418 Fall 2016 Distributed Systems at Princeton University, Princeton, New Jersey, USA.
U.S. Appl. No. 15/692,584, filed Aug. 31, 2017.
U.S. Appl. No. 15/692,648, filed Aug. 31, 2017.
U.S. Appl. No. 16/582,649, filed Sep. 24, 2019.
U.S. Appl. No. 16/828,535, filed Mar. 24, 2020.
U.S. Appl. No. 17/232,903, filed Apr. 16, 2021.
U.S. Appl. No. 17/232,929, filed Apr. 16, 2021.

* cited by examiner

| Key Type | Symbol |
|---|---|
| Passphrase | (P) 102 |
| Symmetric | (S) 104 |
| Asymmetric | (A) 106 |
| Asymmetric Public | (U) 108 |
| Asymmetric Private | (R) 110 |

Fig. 1

| | Transmutation | | |
|---|---|---|---|
| **Data Operation** | **Classification** | **Operation** | **Executable Command** |
| JSON serialization | serialize | json | serialize json |
| data compression | compress | zlib | compress zlib |
| base64 encoding | encode | base 64 | encode base 64 |
| encode binary in utf8 | encode | strbin utf_8 | encode strbin utf_8 |
| asymmetric cipher | acipher | pkcs1_oaep | acipher pkcs1_oaep |
| symmetric cipher | scipher | aes | scipher aes |
| key derivation function | derive | pbkdf2 | derive pbkdf2 |
| key stretching function | derive | hkdf | derive hkdf |
| hash | digest | hash | digest hash |
| MAC | digest | hash | digest hash |
| HMAC | digest | hmac | digest hmac |
| CMAC | digest | cmac | digest cmac |
| PSS digital signature | dign | pkcs1_pss | dign pcks1_pss |

Fig. 6

| Transmutation | Operations |
| --- | --- |
| serialize | JSON, XML, COM, CORBA, SOAP |
| compress | zlib, gzip, bz2, lzma |
| encode | base64, base85, utf_8, quopri, binary, over 90 variations of codecs |
| acipher | pkcs1_oaep, pkcs1_v1_5 |
| scipher | aes, chacha20, salsa20 |
| derive | pbkdf2, hkdf, scrypt |
| digest | hash: crc, md5, sha1, sha2, shae3, shake128, shake256, keccak<br>hmac: md5, sha1, sha2<br>cmac: aes |
| dign | pkcs1_v1_5, pkcs1_pss, dss, |

Fig. 10

Python v3.6 Codec Types

| | | | | |
|---|---|---|---|---|
| ascii | cp863 | cp1256 | iso8859_2 | mac_greek |
| big5 | cp864 | cp1257 | iso8859_3 | mac_iceland |
| big5hkscs | cp865 | cp1258 | iso8859_4 | mac_latin2 |
| cp037 | cp866 | cp65001 | iso8859_5 | mac_roman |
| cp273 | cp869 | euc_jp | iso8859_6 | mac_turkish |
| cp424 | cp874 | euc_jis_2004 | iso8859_7 | ptcp154 |
| cp437 | cp875 | euc_jisx0213 | iso8859_8 | shift_jis |
| cp500 | cp932 | euc_kr | iso8859_9 | shift_jis_2004 |
| cp720 | cp949 | gb2312 | iso8859_10 | shift_jisx0213 |
| cp737 | cp950 | gbk | iso8859_11 | utf_32 |
| cp775 | cp1006 | gb18030 | iso8859_13 | utf_32_be |
| cp850 | cp1026 | hz | iso8859_14 | utf_32_le |
| cp852 | cp1125 | iso2022_jp | iso8859_15 | utf_16 |
| cp855 | cp1140 | iso2022_jp_1 | iso8859_16 | utf_16_be |
| cp856 | cp1250 | iso2022_jp_2 | johab | utf_16_le |
| cp857 | cp1251 | iso2022_jp_2004 | koi8_r | utf_7 |
| cp858 | cp1252 | iso2022_jp_3 | koi8_t | utf_8 |
| cp860 | cp1253 | iso2022_jp_ext | koi8_u | utf_8_sig |
| cp861 | cp1254 | iso2022_kr | kz1048 | |
| cp862 | cp1255 | latin_1 | mac_cyrillic | |

Fig. 11

| Transmutation | Description |
|---|---|
| serialize | Serialize data structure |
| compress | Compress the data |
| encode | Encode a string/bytes according to specification |
| acipher | Cipher the data using asymmetric method |
| scipher | Cipher the data using symmetric method |
| derive | Key Derivation Function |
| digest | Create digest on data |
| dign | Digital signature |
| **key** | Key manipulations and management |
| **clean** | Housekeeping of internal structures |
| **TAR group** | Groupings in a TAR for dependent transmutations |
| **press** | Language specific data preparation |
| **lock** | Lock the data using a Variable Lock |
| **mobius** | Convert from one structure to another internally |

Fig. 12

| | Reversibility | | |
|---|---|---|---|
| Transmutation | Reversible | Irreversible | Conditional |
| serialize | ✓ | | |
| compress | ✓ | ✓ | |
| encode | ✓ | | |
| acipher | | | ✓ |
| scipher | | | ✓ |
| derive | | ✓ | |
| digest | | ✓ | |
| dign | | ✓ | |
| **key** | | ✓ | |
| **clean** | | ✓ | |
| **TAR group** | | ✓ | |
| **press** | ✓ | | |
| **lock** | | | ✓ |
| **mobius** | ✓ | | |

Fig. 13

| | Mode | |
|---|---|---|
| **Transmutation** | **Forward** | **Reverse** |
| serialize | serialize | deserialize |
| compress | compress | decompress |
| encode | encode | decode |
| acipher | encrypt | decrypt |
| scipher | encrypt | decrypt |
| derive | derive | derive |
| digest | digest | verification |
| dign | sign | authentication |
| key | key | |
| clean | clean | |
| TAR group | TAR group | TAR group |
| press | press | depress |
| lock | lock | unlock |
| mobius | mobius | mobius |

| Transmutation | operation= | sortkeys= | Input | Output |
| --- | --- | --- | --- | --- |
| serialize | **json** | [t\|f] | structure | string |
| serialize | xml | [t\| f] | structure | string |
| compress | **zlib** (gzip) | - | binary | binary |
| compress | bz2 | - | binary | binary |
| compress | lzma | - | binary | binary |

2104
Transmutation Commands serialize json
serialize json t
serialize json sortkeys=t
serialize operation=json sortkeys=t
compress bz2
compress operation=lzma

| Transmutation | **operation=** | **encoding=** | Input | Output |
|---|---|---|---|---|
| encode | strbin | Codecs (98), Default **utf_8** | string | binary |
| encode | utf | Codecs (98), Default **utf_8** | string | string |
| encode | binascii | [ **hex**\|64\|qp\|uu] | binary | string |
| encode | base | [16\|32\| **64**\|64url\|64std\|85\|a85] | binary | string |
| encode | quopri | Codecs (98), Default **utf_8** | binary | string |
| encode | codecs | Any encoding like rot_13<br>from python module<br>It has 98+10 extra encodings | string<br>string<br>binary | string<br>binary<br>binary |

2204
Transmutation Commands encode strbin utf_8
encode utf utf_16
encode binascii hex
encode base 64
encode quopri utf_8
encode utf_8

| Transmutation | **operation=** | **typ=** | **digestlen=** | **keylen=** | **Input** | **Output** |
|---|---|---|---|---|---|---|
| digest | hash | crc | [16\| **32**] | | Data string | Digest string |
| digest | hash | md5 | 128 | | Data string | Digest string |
| digest | hash | md4 | 128 | | Data string | Digest string |
| digest | hash | md2 | 128 | | Data string | Digest string |
| digest | hash | sha1 | 160 | | Data string | Digest string |
| digest | **hash** | **sha2** | [224\|256\|384\| **512**] | | Data string | Digest string |
| digest | hash | sha3 | [224\|256\|384\| **512**] | | Data string | Digest string |
| digest | hash | shake128 | [n\| **512**] | | Data string | Digest string |
| digest | hash | shake256 | [n\| **512**] | | Data string | Digest string |
| digest | hash | keccak | [224\|256\|384\| **512**] | | Data string | Digest string |
| digest | hmac | md5 | 128 | | Data string | Digest string |
| digest | hmac | sha1 | 160 | | Data string | Digest string |
| digest | hmac | sha2 | [224\|256\|384\| **512**] | | Data string | Digest string |
| digest | cmac | aes | 128 | [128\|192\| **256**] | Data string | Digest string |

2304
Transmutation Commands digest hash md5 128
digest hash sha2 512
digest hash shake256 digestlen=332
digest hmac sha2 256
digest cmac aes 256

| Transmutation | **operation=** | **keylen=** | **hashtyp=** | **digestlen=** | **e=** | key type |
|---|---|---|---|---|---|---|
| acipher | **pkcs1_oaep** | [1024\|**2048**\| 3072] | sha1/**2**/3 (9) | [160\|224\|256\|384\|**512**] | **65537** | RSA |
| | pkcs1_v1_5 | | - | - | - | |

2404

| Transmutation | **operation=** | **keylen=** | **hashtyp=** | **digestlen=** | **saltlen=** | key type |
|---|---|---|---|---|---|---|
| dign | pkcs1_v1_5 | [1024\|**2048**\|3072] | any | [16-**512**] | - | RSA |
| | **pkcs1_pss** | | | | **digestLen** | |

2406

| Transmutation | **operation=** | **keylen=** | **hashtyp=** | **digestlen=** | **mode=** | key type |
|---|---|---|---|---|---|---|
| dign | dss | [1024\|**2048**\|3072] | sha1/**2** (5) | [160-**512**] | [**fips-186-3**\| deterministic-rfc6979] | DSA |
| | | 256 (curve-256) | | | | ECC |

2410
Transmutation Commands acipher pkcs1_oaep 2048
acipher pkcs1_oaep 1024 hashtyp=sha2
acipher pkcs1_v1_5 3072
dign pkcs1_v1_5 2048
dign pkcs1_pss 3072
dign dss 1024 hashtyp=sha2
dign dss 256

| Transmutation | **operation=** | **hashtyp=** | **digestlen=** | **salttyp=** | **saltlen=** | **keylen=** | **iterations=** | Input |
|---|---|---|---|---|---|---|---|---|
| derive | **pbkdf2** | **any** | any:**512** | iv str | **digestLen** | any:**256** | **10000** | str |

2504

| Transmutation | **operation=** | **hashtyp=** | **digestlen=** | **salttyp=** | **saltlen=** | **keylen=** | **numkeys=** | Master |
|---|---|---|---|---|---|---|---|---|
| derive | hkdf | md5/ **sha**1/**2**/3 (11) | [128:512] | iv | **digestLen** | any:**256** | 1+ | bytes |

2506

| Transmutation | **operation=** | **salttyp=** | **saltlen=** | **keylen=** | **n=** | **r=** | **p=** | **numkeys=** | **mode=** | Input |
|---|---|---|---|---|---|---|---|---|---|---|
| derive | scrypt | iv str | any: **512** | any:**256** | 16384 | 8 | 1 | 1+ | login | str |
| derive | scrypt | iv str | any:512 | any:256 | 1048576 | 8 | 1 | 1+ | file | str |
| derive | scrypt | iv str | any:512 | any:256 | x | y | z | 1+ | custom | str |

2510
Transmutation Commands derive pbkdf2 keylen=256 iterations=100000
derive hkdf keylen=256 numkeys=4
derive scrypt keylen=128 mode=login
derive scrypt keylen=256 mode=file

| Transmutation | operation= | keylen= | mode= | salttyp= | saltlen= | pad= | Block | type |
|---|---|---|---|---|---|---|---|---|
| scipher | aes | [128\|192\|**256**] | ecb | - | - | yes | 128 | Block |
| scipher | aes | [128\|192\|**256**] | cbc | iv | 128 | yes | 128 | Block |
| scipher | aes | [128\|192\|**256**] | ctr | nonce | 64 | no | 128 | Block |
| scipher | aes | [128\|192\|**256**] | cfb | iv | 128 | no | 128 | Stream |
| scipher | **aes** | [128\|192\|**256**] | **ofb** | iv | 128 | no | 128 | Stream |
| scipher | aes | [128\|192\|**256**] | ocb | nonce | 120 | no | 128 | AEAD |
| scipher | aes | [128\|192\|**256**] | ccm | nonce | 88 | no | 128 | AEAD |
| scipher | aes | [128\|192\|**256**] | eax | nonce | 128 | no | 128 | AEAD |
| scipher | aes | [128\|192\|**256**] | gcm | nonce | 128 | no | 128 | AEAD |
| scipher | aes | [**256**\|384\|512] | siv | nonce | 128 | no | 128 | AEAD |
| scipher | chacha20 | **256** | - | nonce | 64 | no | n/a | Stream |
| scipher | salsa20 | [128\| **256**] | - | nonce | 64 | no | n/a | Stream |

2604
Transmutation Commands scipher aes 256 mode=ofb
scipher aes 128 mode=gcm
scipher chacha20 256
scipher salsa20 128

Fig. 26

| | | | | | |
|---|---|---|---|---|---|
| | **Description** | | | **Plaintext** | |
| **Step 1** | *Part* | | | **Message** | **Padding (optional)** |
| | *Length* | | | variable | pad length |
| | | | | | |
| | **Description** | **Packed Message** | | | |
| **Step 2** | *Part* | **Header Size** | **Header** | **Encrypted message** | |
| | *Length* | 2 bytes | Header Size | variable | |
| | *Data Type* | binary | Utf8 encoded | binary | |

Fig. 27

| Keyword | Format | Type | Units | Typical Values |
|---|---|---|---|---|
| Header Size | 16 bits | integer | binary | No keyword on initial header, size of header main string |
| key_len | num string | integer | bytes | 16 |
| ciphername | string | string | | aes/salsa20/chacha20 |
| ciphertype | string | string | | block/stream/aead |
| ciphermode | string | string | | siv/ofb |
| block_len | num string | integer | bytes | 16 |
| padstyle | string | string | | char/ansix923/iso10126/pkcs7/iso7816-4/zero/space |
| padchar | num string | integer | | 0/32/90 -> char(0/32/90) |
| pad_len | num string | integer | bytes | 7 |
| pad_val | bin string | base64 | | G8934fdfs0ke |
| saltsource | string | string | | cipher/stack/internal |
| saltfunc | string | string | | somesaltfuncname |
| salttype | string | string | | iv/nonce |
| salt_len | num string | integer | bytes | 8 |
| salt_val | bin string | base64 | | 7efiglsi32 |
| macsource | string | string | | cipher/internal |
| macfunc | string | string | | somemacname |
| mac_len | num string | integer | bytes | 16 |
| mac_val | bin string | base64 | | D34fdfs0ke |

| Transmutation | **operation=** | **lockkeylen=** | **numkeys=** | **threshold =** | **scipher =** | **scipherkeylen =** | **sciphermode=** | Payload Len |
|---|---|---|---|---|---|---|---|---|
| lock | sslock_b | 256 (index+key) | n >= 2 | k <= n | Any: **AES** | 128 | **EAX** (10) | 128 |
| lock | sslock | 256 | n >= 2 | k <= n | Any: **AES** | 256 | **EAX** (10) | 256 |
| lock | **orlock** | [128\|192\|**256**] | **1** | **1** | Any:**AES** | [128-512:**256**] | **EAX** (10) | any |
| lock | matlock | [128\|192\|256] | n >= 2 | n | Any: **AES** | [128-512:**256**] | **EAX** (10) | any |
| lock | xorlock | [128\|192\|256] | n >= 2 | n | Any: **AES** | [128-512:**256**] | **EAX** (10) | any |
| lock | hashlock* | [128\|192\|256] | n >= 2 | n | Any: **AES** | [128-512:**256**] | **EAX** (10) | any |

3010
Transmutation Commands lock sslock_b 256 numkeys=6 threshold=3
lock sslock 256 numkeys=4 threshold=2
lock orlock 128 numkeys=10 scipherkeylen=128
lock matlock 256 numkeys=5
lock xorlock 128 numkeys=6
lock hashlock 192 numkeys=7

| Structure | Field | Type | Values | Definition |
|---|---|---|---|---|
| NSbin | typ | string | "NSbin" | structure type specifier |
| | b64 | string | data | Data in base64 encoding |

3104

| Structure | Field | Type | Values | Definition |
|---|---|---|---|---|
| NSjson | typ | string | "NSjson" | structure type specifier |
| | obj | string | data | JSON formatted string |

3106

| Structure | Field | Type | Values | Definition |
|---|---|---|---|---|
| NStar | typ | string | "NStar" | structure type specifier |
| | name | string | | TAR label |
| | cmds | list of strings | | List of TAR commands – normal form |
| | expd | list of strings | | List of TAR commands – expanded form |

3108

| Structure | Field | Type | Values | Definition |
|---|---|---|---|---|
| NSstr | typ | string | "NSstr" | structure type specifier |
| | state | string | "preTAR"<br>"postTAR" | State of structure |
| | obj | value or pointer | data | Input/Output data |
| | digest | binary string | digest | Digest string of obj |
| | keystack | List of KISS structures | | Cryptographic keys in KISS structures to be used by TAR |
| | tar | NStar structure | | TAR structure holding TAR commands |

| Transmutation | **operation=** | Input | Output | Comments |
|---|---|---|---|---|
| mobius | nsjson | NSstr | NSjson | Must be last TAR command |

3204

| **Input structure type** | **mobius nsx** | **reverse mobius nsx** | **mobius func call** |
|---|---|---|---|
| NSstr | NSx | ignore | n/a |
| NSx | not possible, no TAR | not possible, no TAR | NSstr |

3302

| Transmutation | Input | Output |
|---|---|---|
| press | Language specific native data structure | JSON compatible data structure in language |
| clean | NSstr | NSstr (cleaned) |

3304

| Transmutation | **operation=** | TAR forward | TAR reverse | Comments |
|---|---|---|---|---|
| key | **generate** | Conditional | Never | Automatically called if needed after a 'key check' |
| key | check | Auto | Auto | Try to do everything possible to have successful TAR run. |

3310
Transmutation Commands press
clean
key generate
key check

Fig. 33

| Section | Field | In | Gen | Values | Definition |
|---|---|---|---|---|---|
| typ | | ✓ | ✓ | 'kiss' | structure type specifier |
| ID | | | ✓ | b64 | key identifier (PUID) a NutID, anything if you have nothing. |
| ima | | ✓ | ✓ | keyhole, key | Specifies what this KES is doing here. "I'm a keyhole!" |
| key | value | ✓ | ✓ | key value(s) | String or list depending on key→count |
| | type | ✓ | ✓ | symmetric, rsa, dsa, ecc, passphrase, ikm, symmetriclist, tines256, tinesidx128 | Key types as used in the key templates |
| | format | ✓ | ✓ | b64, hex, str, pem, bin | Method of format for the key value |
| | length | | ✓ | integer (bit/char count) | Length of key in bits. |
| | part | | ✓ | private, public | Applies to asymmetric keys only. |
| | count | | ✓ | default=1 | If > 1, then key value is a list of key values. |
| | state | | ✓ | put, gen,ask,putobj | Where does it come from? Put(in), gen(erated) or ask(for it), putobj is from single call via obj method |
| salt | value | | ✓ | salt value | Salt associated with this key. It may be provided or generated by its use by a crypto algo. It may be informational or must be stored by user depending on usage. Generally should be stored per data item applied to and in near proximity. |
| | type | | ✓ | iv, nonce, custom | |
| | format | | ✓ | b64, hex, str, bin | |
| | length | | ✓ | integer (bit count) | |
| | function | | ✓ | string | Name of function that generated the salt |
| | state | | ✓ | put, gen | Where does it come from? |
| tag | label | | ✓ | | Descriptive info for key |
| | description | | ✓ | | Descriptive info for key |
| | question | | | | Additional information for pp key type |
| | hint | | | | Additional information for pp key type |
| | dign | | | | Digital signature of key by key maker |
| dt | create | | ✓ | UTC format string | Creation date of key |
| | madeby | | ✓ | | Creator's identifier |
| | active | | | | Activation date of key |
| | expire | | | UTC format string | Expiration date of key |
| Other sections can be added such as 'certificate', 'x.509' as needed. Maintenance is left up to each applicable program. | | | | | |

| Mode | Source | Persistent Store | Applies to |
|---|---|---|---|
| transmutation | generated (gen) | embedded, informational | ciphertext |
| | input (put) | | |
| keyhole | generated (gen) | mandatory | |
| | input (put) | | derived key |

3504

| Template Parameter Keywords | | | | | | Salt Source | | Salt Storage | |
|---|---|---|---|---|---|---|---|---|---|
| keytyp: | keylen: | numkeys: | threshold: | salttyp: | saltlen: | put | gen | KISS | embed |
| passphrase, ikm | ✓ | × | × | ✓ | | ✓ | ✓ | ✓ | × |
| symmetric | ✓ | × | × | ✓ | | × | ✓ | × | ✓ |
| symmetriclist | ✓ | ✓ | × | ✓ | | × | ✓ | × | ✓ |
| rsa | ✓ | × | × | × | ✓ * | × | × | × | ✓ * |
| dsa, ecc | ✓ | × | × | × | | × | × | × | × |
| tines256, tinesidx128 | ✓ | ✓ | ✓ | × | | × | × | × | × |

3506

| keytyp: | definition |
|---|---|
| passphrase | Any printable string of characters |
| ikm | Initial key material |
| symmetric | Key for symmetric cipher, usually a random number |
| symmetriclist | A list of symmetric keys |
| rsa | Asymmetric cipher key set according to RSA methods for RSA ciphers and signature schemes |
| dsa | Digital Signature Algorithm asymmetric key set for DSS signature schemes |
| ecc | Asymmetric key set using Elliptic Curve Cryptography methods |
| tines256 | List of 256 bit long secret sharing keys with embedded indices |
| tinesidx128 | List of 128 bit long secret sharing keys with prepended 128 bit indices |

Fig. 35

3602 tar label01
transmutation command 1
transmutation command 2
labeln
...
transmutation command n

3604 tar test_a01
press tar test_a02
press
test_a01 tar test_a03
press
test_a01
test_a02 tar test_a07
press
serialize json
encode strbin utf_32 tar test_a17
press
serialize json f
encode codecs rot_13
mobius nsjson

3606 tar test_a20
press
serialize json f
encode strbin utf_8
scipher chacha20 256
encode base 64 tar test_a24
press
serialize json f
encode strbin utf_8
scipher chacha20 256
dign pkcs1_pss 2048
encode base 64 tar test_a42
press
serialize json f
encode strbin utf_8
<b> derive pbkdf2 keylen=256
<b> scipher chacha20 256

3608 tar test_a50
press
serialize json f
encode strbin utf_8
lock orlock 256 tar test_a64
press
serialize json
encode strbin utf_8
scipher chacha20 256
scipher salsa20 128
scipher aes 256 mode=eax
compress zlib
scipher salsa20 256
scipher aes 128 mode=ocb
dign dss 1024
encode base 64

3610 symmetric 256
symmetric 128
symmetric 256
symmetric 256
symmetric 128
dsa 1024

| Transmutation [Operation type] | keytyp template |
|---|---|
| derive [pbkdf2, scrypt] | passphrase |
| derive hkdf | ikm |
| scipher | symmetric |
| acipher | rsa |
| dign [pkcs1_pss, pkcs1_v1_5] | rsa |
| dign dss [1024, 2048, 3072] | dsa |
| dign dss 256 | ecc |
| lock orlock | symmetric |
| lock orlock | symmetriclist |
| lock [matlock, xorlock, hashlock] | symmetriclist |
| lock sslock | tines256 |
| lock sslock_b | tinesidx128 |

| TAR Example A | Key Template Generated |
|---|---|
| tar test_a64 | |
| press | |
| serialize json | |
| encode strbin utf_8 | |
| scipher salsa20 256 | keytyp=symmetric, keylen=256 |
| dign dss 1024 digestlen=512 | keytyp=dsa, keylen=1024 |
| encode base 64 | |
| mobius | |

4404

| TAR Example B | Key Template Generated |
|---|---|
| tar test_a64 | |
| press | |
| serialize json | |
| encode strbin utf_8 | |
| scipher salsa20 256 | keytyp=symmetric, keylen=256 |
| scipher aes 256 mode=eax | keytyp=symmetric, keylen=256 |
| scipher chacha20 256 | keytyp=symmetric, keylen=256 |
| compress zlib | |
| dign dss 1024 digestlen=512 | keytyp=dsa, keylen=1024 |
| encode base 64 | |
| mobius | |

| TAR Example A | Key Template Generated | KISS List [put/gen] |
|---|---|---|
| tar test_a64 | | |
| press | | |
| serialize json | | |
| encode strbin utf_8 | | |
| scipher salsa20 256 | keytyp=symmetric, keylen=256 | KISS A1 |
| dign dss 1024 digestlen=512 | keytyp=dsa, keylen=1024 | KISS A2 |
| encode base 64 | | |
| mobius | | |

keystack 4510

4508

4504

| TAR Example B | Key Template Generated | KISS List [put/gen] |
|---|---|---|
| tar test_a64 | | |
| press | | |
| serialize json | | |
| encode strbin utf_8 | | |
| scipher salsa20 256 | keytyp=symmetric, keylen=256 | KISS B1 |
| scipher aes 256 mode=eax | keytyp=symmetric, keylen=256 | KISS B2 |
| scipher chacha20 256 | keytyp=symmetric, keylen=256 | KISS B3 |
| compress zlib | | |
| dign dss 1024 digestlen=512 | keytyp=dsa, keylen=1024 | KISS B4 |
| encode base 64 | | |
| mobius | | |

```
Line 01   data = dict(string = 'oops', bytes = b'234', deeper = ('str2', b'2'))
```

5220

```
Line 02   Make data JSON compatible by converting all bytes to strings
Line 03   Perform JSON serialization on data
Line 04   Convert JSON string into bytes string
Line 05   Calculate CRC 16 hash on data
Line 06   Wrap data and digest into a structure
Line 07   Write data to file
```

5250

```
          # Perform manual data folding (ravel)
Line 08   import base64, json, binascii
Line 09   data['bytes'] = base64.b64encode(data['bytes']).decode()
Line 10   data['deeper'][1] = base64.b64encode(data['deeper'][1]).decode()
Line 11   data = json.dumps(data, sort_keys=False)
Line 12   data = data.encode('utf_8')
Line 13   digest = binascii.crc_hqx(data,0).to_bytes(2, byteorder = 'big')
Line 14   wrap = dict(data=data.decode(), digest=base64.b64encode(digest).decode())
Line 15   with open("mydata.json", "w") as f:
Line 16       json.dump(wrap, f)
```

5260

```
          # Perform manual data unfolding
Line 17   import base64, json
Line 18   with open("mydata.json", "r") as f:
Line 19       wrap = json.load(f)
Line 20   digest = binascii.crc_hqx(wrap['data'].encode(),0).to_bytes(2, byteorder = 'big')
Line 21   if digest != base64.b64decode(wrap['digest']):
Line 22          print('error: crc codes do not match')
Line 23   data = json.loads(wrap['data'])
Line 24   data['deeper'][1] = base64.b64decode(data['deeper'][1])
Line 25   data['bytes'] = base64.b64decode(data['bytes'])
```

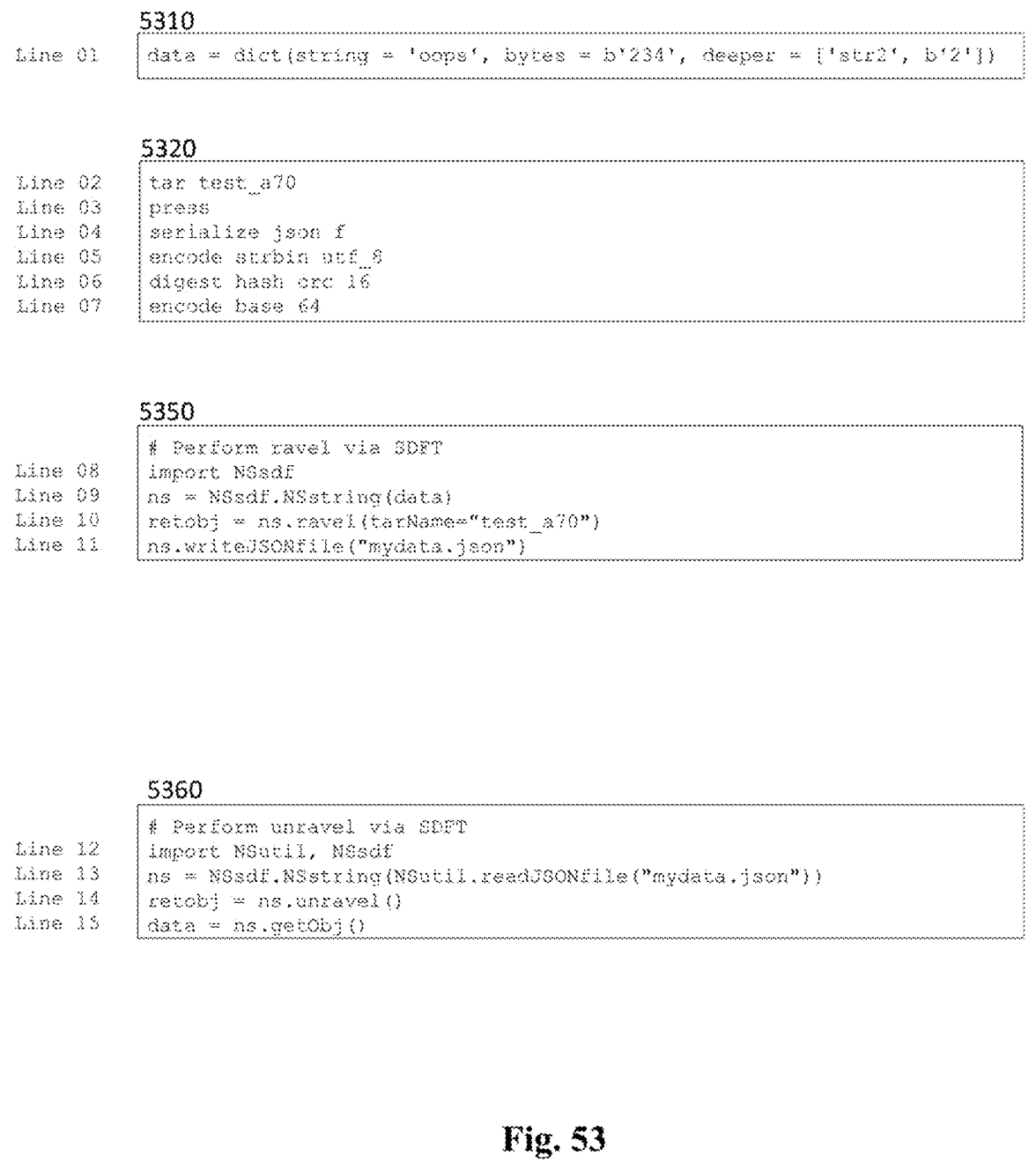

```
data = dict(string = 'oops', bytes = b'234', deeper = ['str2', b'2'])
```

5320

```
tar test_a70
press
serialize json f
encode strbin utf_8
digest hash crc 16
encode base 64
```

5350

```
# Perform ravel via SDFT
import NSsdf
ns = NSsdf.NSstring(data)
retobj = ns.ravel(tarName="test_a70")
ns.writeJSONfile("mydata.json")
```

5360

```
# Perform unravel via SDFT
import NSutil, NSsdf
ns = NSsdf.NSstring(NSutil.readJSONfile("mydata.json"))
retobj = ns.unravel()
data = ns.getObj()
```

Fig. 53

| Variable Lock Type | Keys Accepted | Keys Needed | Key Type | Description |
|---|---|---|---|---|
| ORLOCK | k: {1,n} | 1 | symmetric | Any single valid key will open this lock. There are n keys registered. |
| MATLOCK | k: {n} | n | symmetric | Each key is used in a sorted order. There are n keys registered. |
| XORLOCK | k: {n} | n>1 | symmetric | All keys are XOR'd to create a calculated key. There are n keys registered. |
| HASHLOCK | k: {n} | n | symmetric | All keys are concatenated in a sorted order and hashed to create a calculated key. There are n keys registered. |
| SSLOCK | k: {m,n} | 1 > m ≤ k ≤ n | tine | Secret sharing lock where there are n shares and a threshold of m shares. |

Fig. 67

| Role | Keys Held | Data | | Dign (Digital Signature) | |
|---|---|---|---|---|---|
| | | Encrypt | Decrypt | Create | Verify |
| Reader A | Ⓢ Ⓤ | *True* | *True* | *False* | *True* |
| Reader B | Ⓢ Ⓤ | *True* | *True* | *False* | *True* |
| Writer X | Ⓢ Ⓡ Ⓤ | *True* | *True* | *True* | *True* |
| Writer Y | Ⓢ Ⓡ Ⓤ | *True* | *True* | *True* | *True* |
| Verifier V | Ⓤ | *False* | *False* | *False* | *True* |

Fig. 80

| Part | Type of Data | Bag Opacity | Description |
|---|---|---|---|
| hair | metadata | clear | File characteristics of the Nut: filename, pathname, size, clear log, directory, file/directory naming rules |
| tick | metadata | clear | Nut characteristics: Nut ID, version, expiry, timestamps, etc. |
| seal | metadata | clear | Nut functions: cryptographic library versions, cipher versions, hash versions |
| vita | log | encrypted | Nut logging |
| face | facade | clear | Rule based filtered summary of payload |
| tale | history | encrypted | History of payload changes |
| bale | payload | encrypted | Main stored data |

Fig. 81

| Nut Part | Access Role | Description |
|---|---|---|
| All | RAT | Nut owner |
| | RAT Reader | Verify/Read Nut digns |
| | RAT Verifier | Verify |
| Bale | COW | Payload writer (Class of Writers) |
| | COR | Verify/Read payload (Class of Readers) |
| | COR Verifier | Verify |
| Vita | Logger | Log writer |
| | Log Reader | Verify/Read Log |
| | Log Verifier | Verify |
| Tale | Historian | History writer |
| | History Reader | Verify/Read History |
| | History Verifier | Verify |

Fig. 82

| Role | Dign | | Write | | Data (Default) | Data (Instance) |
|---|---|---|---|---|---|---|
| | Create | Verify | Encrypt | Decrypt | | |
| Reader | | $U_D$ | | $R_W$ | $S_0$ | $S_n$ |
| Writer | $R_D$ | $U_D$ | $U_W$ | $R_W$ | $S_0$ | $S_n$ |
| Verifier | | $U_D$ | | | | |
| WriteOnly | $R_D$ | $U_D$ | $U_W$ | | | $S_n$ |

Fig. 87

| Symptom | Possible Cause | Action | Effect |
|---|---|---|---|
| Alice receives incorrectly encrypted Nut from Bob | Someone is attempting to impersonate Bob | Contact Bob and reset RBK | New RBK channel established |
| Alice receives spam from Bob | Bob's RBK for Alice has been compromised | Contact Bob and reset RBK | New RBK channel established |
| Alice receives spam from Bob | Bob now works as a spammer | Yell at Bob | See if Bob listens |
| Alice receives spam from Bob | Bob now works as a spammer | Erase Bob's RBK | So long, Bob. |
| Alice receives spam from Bob | Bob sold Alice's RBK data to a spammer | Erase Bob's RBK | Alice hates Bob |

Fig. 116

| Symptom | Possible Cause | Action | Effect |
| --- | --- | --- | --- |
| Alice receives incorrectly encrypted Nut from Vendor | Someone is attempting to impersonate Vendor | Contact Vendor and reset RBK | New RBK channel established |
| Alice receives spam from Vendor | Vendor's RBK for Alice has been compromised | Contact Vendor and reset RBK | New RBK channel established |
| Alice receives spam from Vendor | Vendor has annoying marketing department | Erase Vendor's RBK | So long, Vendor. * |
| Alice receives spam from spammer using RBK with Vendor | Vendor sold Alice's data to spammer | Erase Vendor's RBK | Alice hates Vendor. |
| Alice's credit card is used fraudulantly with RBK with Vendor | Vendor has been hacked | Contact Vendor, credit card company and reset RBK | New RBK channel established |
| Alice's credit card is used fraudulantly with RBK with Vendor | Vendor is a fraud | Contact authorities, credit card company and erase RBK | Shame on you, Vendor. |

Fig. 117

| Symptom | Possible Cause | Action | Effect |
|---|---|---|---|
| Vendor receives incorrectly encrypted Nut from Alice | Someone is attempting to impersonate Alice | Contact Alice and reset RBK | New RBK channel established |
| Vendor receives spam from Alice | Alice's RBK for Vendor has been compromised | Contact Alice and reset RBK | New RBK channel established |
| Vendor receives spam from Alice | Alice is a spammer | Erase Alice's RBK | So long, Alice. * |
| Vendor receives spam from spammer using RBK with Alice | Alice sold Vendor's data to spammer | Erase Alice's RBK and put Alice on internal watch list | So long, Alice. * |
| Alice submits fraudulant transaction | Alice is using a stolen credit card | Erase Alice's RBK and contact credit card company | Run Alice, run. |

Fig. 118

Full Personal Data Nut 12000

| Field | Value |
|---|---|
| Full Name | Bob Crypto |
| Address | 123 Main St, Joy, CA 11122 |
| DOB | 1990-02-20 |
| SSN | 000-12-1234 |
| Driver's License | CA-A3332244 |
| Mother's Name | Joan Aes Crypto |
| Father's Name | John Des Crypto |
| Mother's Maiden Name | Hash |
| Birthplace | Sorrow, CA, USA |
| Credit Card 1 | Visa 1234 1234 1234 1234 |
| Credit Card 2 | Macys 2345 2345 2345 2345 |
| Cell Phone | 111-222-3333 |
| Text Phone | 111-222-3333 |
| Email 1 | Bob@hotmail.com |
| Email 2 | SneakyRob@yahoo.com |

Derived Automatically from Full Data Nut

Simple Personal Data Nut 12010

| Field | Value |
|---|---|
| Full Name | Bob Crypto |
| Email 1 | Bob@hotmail.com |

Anonymous Personal Data Nut 12020

| Field | Value |
|---|---|
| Email 2 | SneakyRob@yahoo.com |

Shopping Personal Data Nut for Card 1 12030

| Field | Value |
|---|---|
| Full Name | Bob Crypto |
| Address | 123 Main St, Joy, CA 11122 |
| Credit Card 1 | Visa 1234 1234 1234 1234 |
| Cell Phone | 111-222-3333 |
| Email 1 | Bob@hotmail.com |

Fig. 120

| Service | Description |
|---|---|
| NUTserver | Organizes local Nuts. Synchronizes with peers. Main local App interface for Nut based PKI. |
| MIOR Server | Manages local MIOR cache for fast retrieval of commonly used modules. Communicates with external MIOR servers. |
| NUTbook | Nut based catalog app. Serves as main Nut based PKI. |
| NUTbrowser | Generic Nut browser implementing all the MIOR features. Acts as file browser as well. |

Fig. 123

| Service | Description |
| --- | --- |
| NUTmail | Private anonymous email |
| NUTchat | Private anonymous chat |
| NUTcloud | Private anonymous cloud storage |
| NUTnet | Private anonymous social network |
| NUThub | Private anonymous port forwarding. Supports IoN (Internet of Nuts) |
| NUT Certification | Commercial NUTserver integrity validation service |

Fig. 144

| Device Category | Nut ID Authentication | Router Admin Access |
|---|---|---|
| Registered | Required | Yes |
| IoT | Required | No |
| Guest | None | No |

Fig. 169

| Connection Attributes | Registered Device | IoT Device | Guest Device |
|---|---|---|---|
| Expiry | None | None | 1 day |
| Bandwidth | Full | Full | 5% |
| Aggregate Bandwidth | Unlimited | 1 MB/day | 200 MB/day |
| Max Connections | 100 | 20 | 10 |
| Destinations | Unrestricted | Pre-approved List | Use public filter |
| Message mode | Immediate | Store & Review | Immediate |

Fig. 170

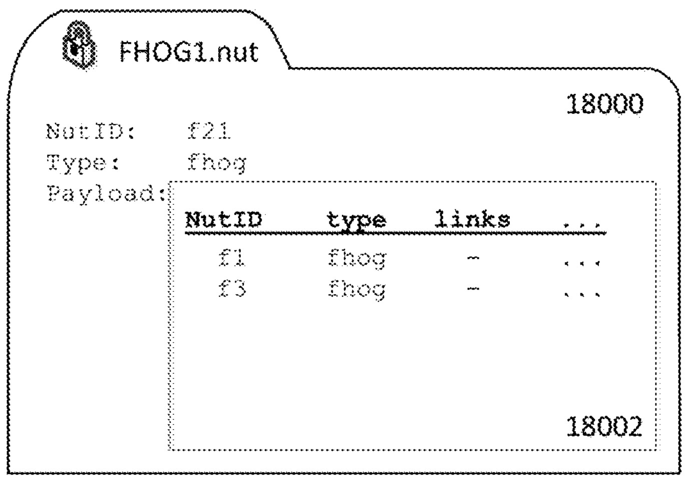
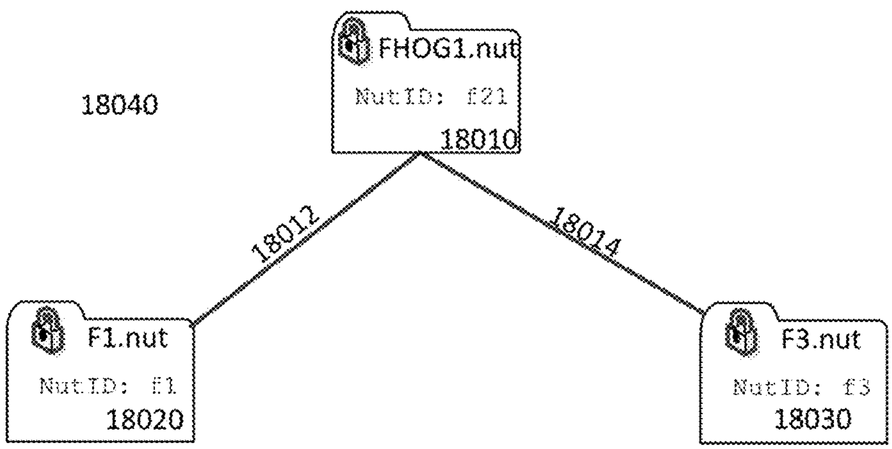
Fig. 180

NCL Definition for "nut001"
19352

19800

| | State Table | | | | | |
|---|---|---|---|---|---|---|
| 19802 | State S[T] | Condition C | C=False | C = True Action A | A = True Success | A=False Failure |
| 19804 | S0 | C0 | S0 | A0 | S1 | S0 |
| 19806 | S1 | C1 | S1 | A1 | S2 | S1 |
| 19808 | S2 | C2 | S1 | A2 | S3 | S0 |
| | S3 | C3 | S3 | A3 | S4 | S2 |
| | S4 | C4 | S4 | A4 | S4 | S3 |

Fig. 198

Relationship nut Data Fields

20300

| *Type* | *Field* | *Description* | *Example* |
|---|---|---|---|
| NutID | ID | Relationship nut ID | 123ABC |
| keyhole | Primary 1 | Passphrase for Target | 'secret' |
| | Primary 2 | Public key of Target→Sender RBK pair | kuTS |
| sender | ID | sender NutID | S111 |
| | email | email address | sender@mailsend.com |
| | status | relationship status | {'manual send' \| 'cleanup/ack' \|' active'} |
| | info | façade(senderNut, template) | {filtered sender contact info} |
| | RBK Sender→Target | Public key of Sender→Target RBK pair | kuST |
| target | ID | target NutID | T222 |
| | email | email address | target@mailtarget.com |
| | status | relationship status | {'received/cleanup' \| 'active'} |
| | info | façade(targetNut, template) | {filtered target contact info} |
| | RBK Target→Sender | Public key of Target→Sender RBK pair | kuTS |

20310

| *Type* | *Field* | *Description* | *Example* |
|---|---|---|---|
| NutID | ID | Relationship nut ID | 123ABC |
| keyhole | Primary 1 | Public key of Sender→Target RBK pair | kuST |
| | Primary 2 | Public key of Target→Sender RBK pair | kuTS |
| sender | ID | sender NutID | S111 |
| | email | email address | sender@mailsend.com |
| | status | relationship status | 'active' |
| | info | façade(senderNut, template) | {filtered sender contact info} |
| | RBK Sender→Target | Public key of Sender→Target RBK pair | kuST |
| target | ID | target NutID | T222 |
| | email | email address | target@mailtarget.com |
| | status | relationship status | 'active' |
| | info | façade(targetNut, template) | {filtered target contact info} |
| | RBK Target→Sender | Public key of Target→Sender RBK pair | kuTS |

| Part | Type of Data | Bag Opacity | Description |
|---|---|---|---|
| hair | metadata | clear | File characteristics of the Nut: filename, pathname, size, clear log, directory, file/directory naming rules |
| tick | metadata | clear | Nut characteristics: Nut ID, version, expiry, timestamps, etc. |
| seal | metadata | clear | Nut functions: cryptographic library versions, cipher versions, hash versions |
| vita | log | encrypted | Nut logging |
| face | facade | clear | Rule based filtered summary of payload |
| tale | history | encrypted | History of payload changes 21202 |
| fate | events | encrypted | Possible future events (PFE) 21204 |
| carnac | carnac revisions | encrypted | History and PFE 21206 |
| bale | payload | encrypted | Main stored data |

Fig. 212

```
21400 {
        Event
          E1==C11                  21402
        Execute
          S1                       21404
        Return true, false         21406
      }

21410 {
        Event
          E1==C11 & E2==C22        21412
        Execute
          S2                       21414
        Return E3, false           21416
      }

21420 {
        Event
          E3==C33                  21422
        Execute
          S3                       21424
        Return 0, -1               21426
      }

21430 {
        Event
          E4==C44                  21432
        Execute
          S4
          S5                       21434
          S6
      }
```

Fig. 214

```
{             21500
  Event
    clock=='12:00 Local'
  Execute
    S1
  Return complete, error
}

{             21510
  Event
    last_statement==complete
  Execute
    S2
}

{             21520
  Event
    last_statement==complete
  Execute
    S3
  Return complete, error
}
```

```
{          21540
  Event
    start
  Execute
    S1
}

{          21530
  Event
    wait 1 seconds
  Execute
    S2
}

{          21550
  Event
    wait 2 seconds
  Execute
    S3
}
```

Fig. 215

```
21600 targetCPU = 'Intel_8086_10MHZ'
21602 delay_ns = calculate_CPU_delay(targetCPU,'ns')

21604 # delay_cycles = calculate_CPU_delay(targetCPU,'cycles')

      {
21610   Event
          start                                21612
        Execute
          S1                                   21614
        Return complete, error                 21616
      }

      {
21620   Event
          wait delay_ns nanoseconds            21622
          # wait delay_cycles cycles           21624
        Execute
          S2                                   21626
        Return complete, error                 21628
      }

      {
21630   Event
          wait delay_ns nanoseconds            21632
          # wait delay_cycles cycles           21634
        Execute
          S3                                   21636
        Return complete, error                 21638
      }
```

Fig. 216

```
21700 condition(ERZ)
21702 # condition(machineID=45)
21704 # criteria(no_history, no_log)

21710 {
        Event
          date_time=='Jan 6,2020 CST'
        Execute
          send_text(self,'Wife birthday')
        Return complete, error
      }

21720 {
        Event
          interval('every month, first wed')
        Execute
          calendar_entry('12:00', 'Staff meeting')
        Return complete, error
      }

21730 {
        Event
          wait 36.5 hours
        Execute
          send_email(some_distribution_list, nut(someNutID)
        Return complete, error
      }

21740 {
        Event
          catch('reboot')
          wait 15 minutes
        Execute
          execute_payload
        Return complete, error
      }
```

```
{Payload data}

Thermostat first floor current temperature: 71F
Thermostat first floor humidity: 39%
Thermostat first floor status: OFF
Thermostat first floor mode: ON
Thermostat first floor fan mode: AUTO
Thermostat first floor temperature set: 70F

Thermostat upstairs current temperature: 72F
Thermostat upstairs temperature set: 73F
Thermostat upstairs humidity: 41%
Thermostat upstairs status: ON
Thermostat upstairs mode: ON

Thermometer Outdoor current temperature: 45F
Thermometer Outdoor battery status: 45%
Thermometer Outdoor battery life estimate: 42 days

Anemometer Outdoor current wind: 7 mph SSE
Anemometer Outdoor wind gusts: 15 mph SSW
```

Reference labels: 21810 (first floor thermostat), 21820 (upstairs thermostat), 21830 (outdoor thermometer), 21840 (outdoor anemometer)

```
condition(machineNameOrder=['IoTmaster',ERZ,RZ])

21910 {
  Event
    (msg, value) = catch('IoT_thermostat01_from')
  Execute
    edit_payload_line(match=msg, concatenate(msg,' ', value))
}

21920 {
  Event
    (msg, value) = catch('IoT_thermostat02_from')
  Execute
    edit_payload_line(match=msg, concatenate(msg,' ', value))
}

21930 {
  Event
    (msg, value) = catch('IoT_outdoor_temp')
  Execute
    edit_payload_line(match=msg, concatenate(msg,' ', value))
  Return complete, error
}

21940 {
  Event
    text = catch_payload_changed('return changed text lines')
  Execute
    search_string = 'Thermostat first floor temperature set:'
    if find(text, search_string) then
        set_temp = get_line(text, search_string)
        event('IoT_thermostat01_to', set_temp)

    search_string = 'Thermostat upstairs mode:'
    if find(text, search_string) then
        set_mode = get_line(text, search_string)
        event('IoT_thermostat02_to', set_mode)
  Return complete, error
}
```

Fig. 219

```
22000 Mode('calendar','US')
22002 Timezone('CST')
22004 TidyMode('cleanup_past_events')

22010 {
          On 01/12/2020 at 13:30 until 15:00
          title 'Staff meeting' in 'Room 32'
      }

22020 {
          Starting 01/13/2020 ending 4/15/20
          every thursday at 16:45 for 30 minutes
          title 'Swimming lessons' at 'Downtown YMCA'
      }

22030 {
          Every Monday at 10:15 for 30 minutes
          title 'Video call with overseas sales'
          at 'Conference room B23'
          attendees ['John Smith','Micky Rourke',
               'Alice Stonewall']
          notes 'https://video_link'
          set_notifications(EMERGENCY_ONLY)
      }

22040 {
          On 01/30/2020 at 8:15 for 1 hour
          title 'Annual Physical' at 'Central clinic'
          location '456 Baptist St, Chicago, IL 12345'
          phone '312-123-4567'
      }

22050 {
          On 1/15/20 at 24:00
          insert_appointment
              in 5 days at 10:00 for 4 hours
              title 'Drive to the mountain cabin'
              location 'some mountainous address'
      }
```

Fig. 220

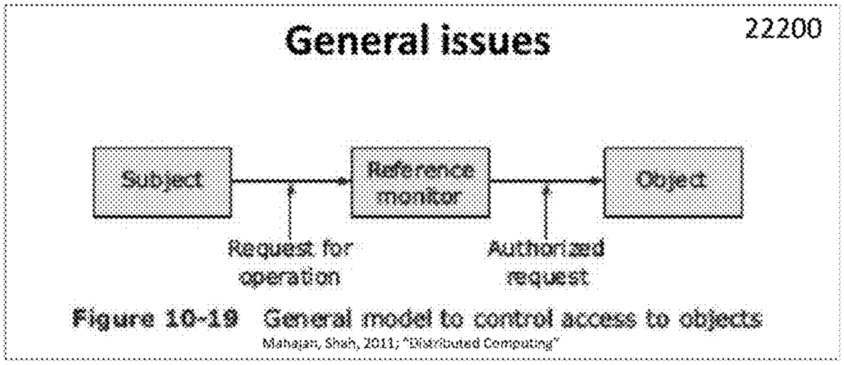
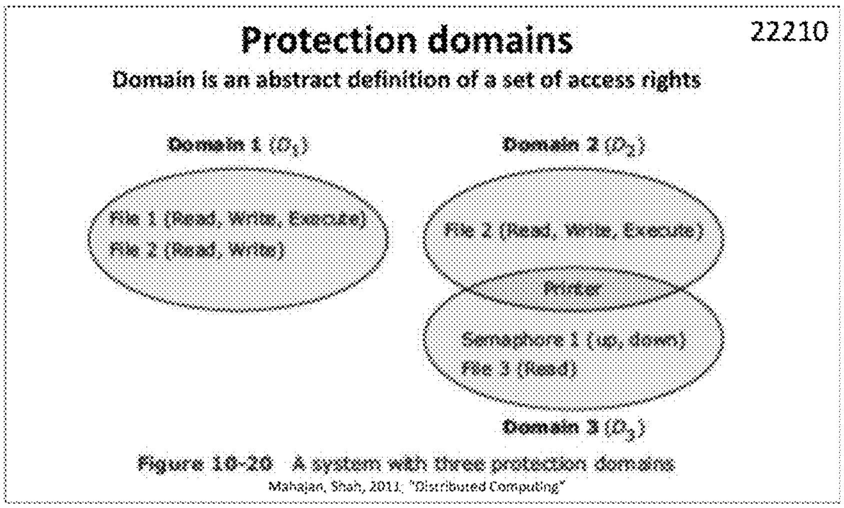
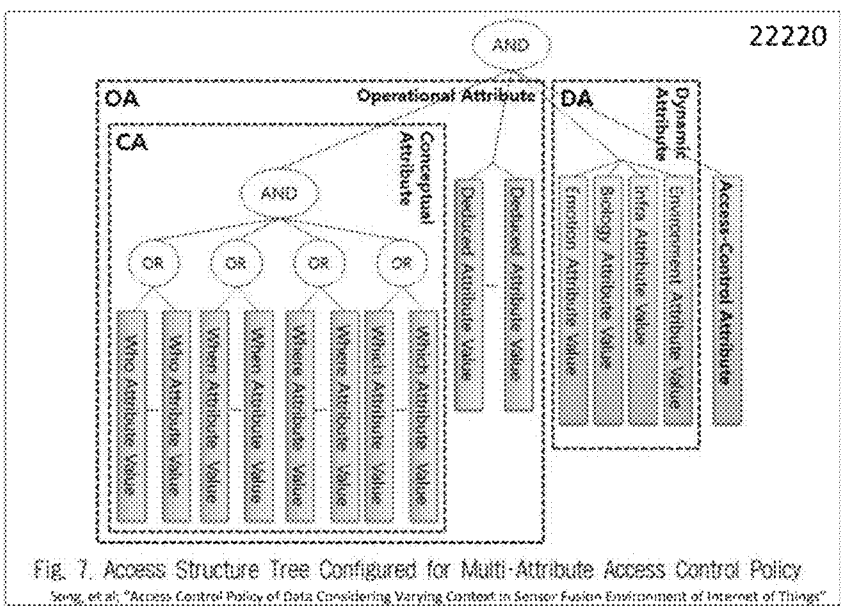
Fig. 222

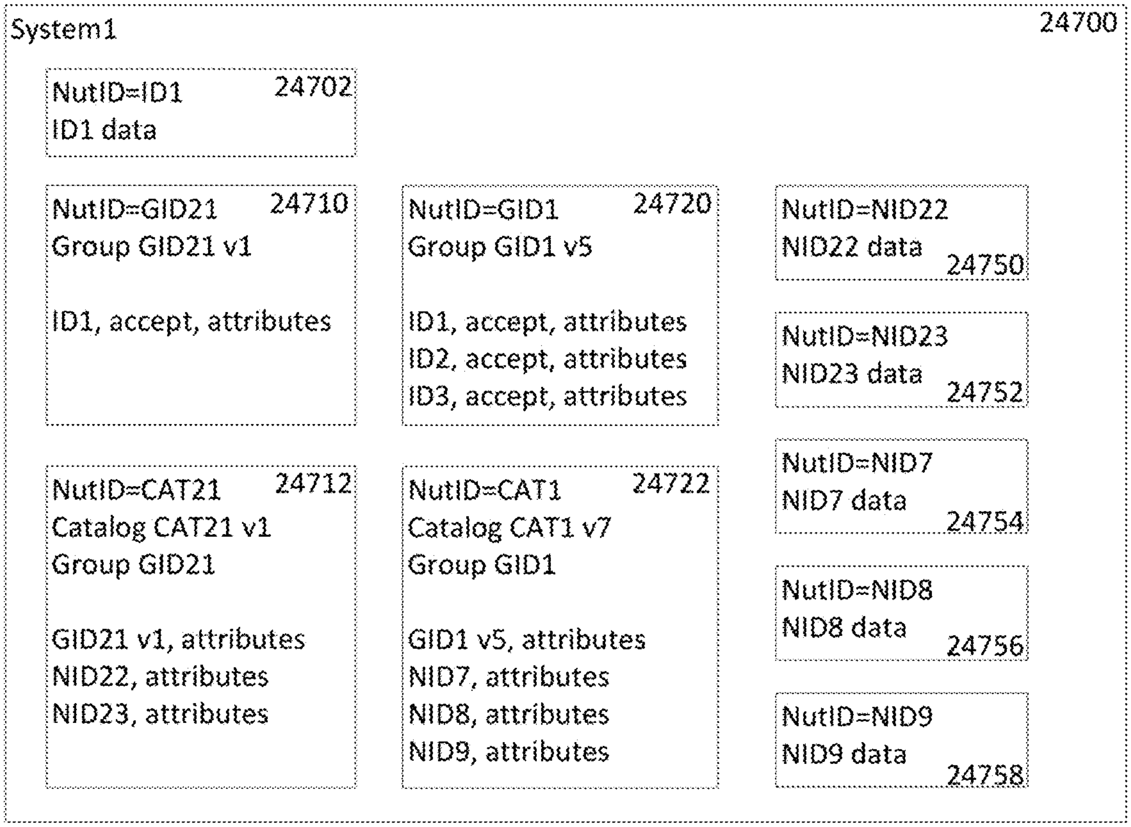
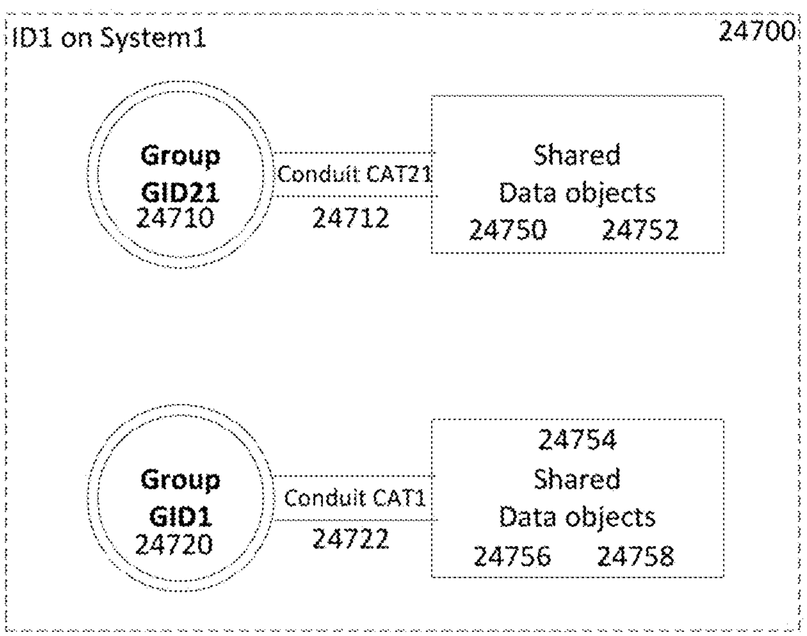
Fig. 247

Group nut G1 v5
25200

25202

| ID | type | Version | ... |
|---|---|---|---|
| G1 | GROUP | v5 | ... |

| Keyhole | User | Access | ... |
|---|---|---|---|
| KA | A | RAT | ... |
| KB | B | RW | ... |
| KC | C | RW | ... |
| KGA | GA | RAT | ... |
| KGB | GB | RW | ... |
| KGC | GC | RW | ... |

| Member | RBK | Access | Admin | ... |
|---|---|---|---|---|
| A\|GA | KGA | RAT | True | ... |
| B\|GB | KGB | RW | False | ... |
| C\|GC | KGC | RW | False | ... |

G1 v5
25204

Catalog nut A:C1 v5
25210

25212

| ID | type | CatID | group | member | Ver... |
|---|---|---|---|---|---|
| A:C1 | CATALOG | C1 | G1 | GA | v5 ... |

| Keyhole | User | Access | ... |
|---|---|---|---|
| KGA | GA | RAT | ... |
| KGB | GB | R | ... |
| KGC | GC | R | ... |

| ID | Version | Status | Type | ... |
|---|---|---|---|---|
| G1 | v5 | local | group | ... |

A:C1 v5
G1 v5
25214

Catalog nut B:C1 v5
25220

25222

| ID | type | CatID | group | member | Ver... |
|---|---|---|---|---|---|
| B:C1 | CATALOG | C1 | G1 | GB | v5 ... |

| Keyhole | User | Access | ... |
|---|---|---|---|
| KGA | GA | R | ... |
| KGB | GB | RAT | ... |
| KGC | GC | R | ... |

| ID | Version | Status | Type | ... |
|---|---|---|---|---|
| G1 | v5 | local | group | ... |

B:C1 v5
G1 v5
25224

Catalog nut C:C1 v5
25230

25232

| ID | type | CatID | group | member | Ver... |
|---|---|---|---|---|---|
| C:C1 | CATALOG | C1 | G1 | GC | v5 ... |

| Keyhole | User | Access | ... |
|---|---|---|---|
| KGA | GA | R | ... |
| KGB | GB | R | ... |
| KGC | GC | RAT | ... |

| ID | Version | Status | Type | ... |
|---|---|---|---|---|
| G1 | v5 | local | group | ... |

Relationship Based Keys for Alice, Bob & Carol

25922

| NUTbook: Bob | $A_B$ = Alice contact/RBK | | |
|---|---|---|---|
| KID | Public | Private | Shared |
| $A_BA\rightarrow B$ | $A_BA\rightarrow B.U$ | $A_BA\rightarrow B.R$ | |
| $B_AB\rightarrow A$ | $B_AB\rightarrow A.U$ | | |
| $A\leftrightarrow B$ | | | $A \leftrightarrow B.S$ |

25912

| NUTbook: Alice | $B_A$ = Bob contact/RBK | | | |
|---|---|---|---|---|
| KID | Public | Private | Shared | Description |
| $B_AB\rightarrow A$ | $B_AB\rightarrow A.U$ | $B_AB\rightarrow A.R$ | | Asymmetric key pair for Bob to Alice |
| $A_BA\rightarrow B$ | $A_BA\rightarrow B.U$ | | | Asymmetric key pair for Alice to Bob |
| $A\leftrightarrow B$ | | | $A \leftrightarrow B.S$ | Symmetric key between Alice and Bob |

25932

| NUTbook: Carol | $A_C$ = Alice contact/RBK | | |
|---|---|---|---|
| KID | Public | Private | Shared |
| $A_CA\rightarrow C$ | $A_CA\rightarrow C.U$ | $A_CA\rightarrow C.R$ | |
| $C_AC\rightarrow A$ | $C_AC\rightarrow A.U$ | | |
| $A\leftrightarrow C$ | | | $A \leftrightarrow C.S$ |

25914

| NUTbook: Alice | $C_A$ = Carol contact/RBK | | |
|---|---|---|---|
| KID | Public | Private | Shared |
| $C_AC\rightarrow A$ | $C_AC\rightarrow A.U$ | $C_AC\rightarrow A.R$ | |
| $A_CA\rightarrow C$ | $A_CA\rightarrow C.U$ | | |
| $A\leftrightarrow C$ | | | $A \leftrightarrow C.S$ |

25934

| NUTbook: Carol | $B_C$ = Bob contact/RBK | | |
|---|---|---|---|
| KID | Public | Private | Shared |
| $B_CB\rightarrow C$ | $B_CB\rightarrow C.U$ | $B_CB\rightarrow C.R$ | |
| $C_BC\rightarrow B$ | $C_BC\rightarrow B.U$ | | |
| $B\leftrightarrow C$ | | | $B \leftrightarrow C.S$ |

25924

| NUTbook: Bob | $C_B$ = Carol contact/RBK | | |
|---|---|---|---|
| KID | Public | Private | Shared |
| $C_BC\rightarrow B$ | $C_BC\rightarrow B.U$ | $C_BC\rightarrow B.R$ | |
| $B_CB\rightarrow C$ | $B_CB\rightarrow C.U$ | | |
| $B\leftrightarrow C$ | | | $B \leftrightarrow C.S$ |

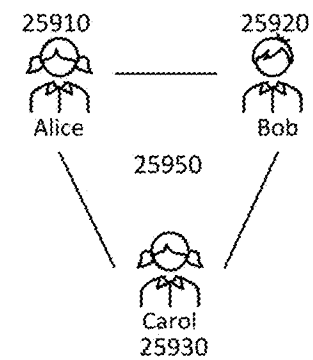

25940
How to decipher the terminology for key identifiers (KID):

| | |
|---|---|
| $B_CB\rightarrow C$ | Contact entry for Bob in Carol's NUTbook; asymmetric key pair when Bob sends something to Carol |
| $C_BC\rightarrow B$ | Contact entry for Carol in Bob's NUTbook; asymmetric key pair when Carol sends something to Bob |
| $B\leftrightarrow C$ | Contact entry for Carol or Bob NUTbook; symmetric key shared by Carol and Bob |
| {KID}.U | Public key part of asymmetric key pair KID |
| {KID}.R | Private key part of asymmetric key pair KID |

Within a group context, GA=A and GC=C, etc.

$A_{C:A}C \rightarrow A.U$ is read as

In contact A of book C, the public key originating from A to send a message from C to A.

$A_{A:A}C \rightarrow A.R$ is read as

In contact A of book A, the private key originating from A to read a message from C to A.

26210

| Group G | N→N | | Keys |
|---|---|---|---|
| From\To | A | B | C |
| A→ 26220 | 26222 $A_{A:A}$A↔A.S | 26224 $B_{A:B}$A→B.U $B_{A:A}$B→A.U $B_{A:A}$B→A.R $B_{A:X}$A↔B.S | 26226 $C_{A:C}$A→C.U $C_{A:A}$C→A.U $C_{A:A}$C→A.R $C_{A:X}$A↔C.S |
| B→ 26230 | 26232 $A_{B:A}$B→A.U $A_{B:B}$A→B.U $A_{B:B}$A→B.R $A_{B:X}$A↔B.S | 26234 $B_{B:B}$B↔B.S | 26236 $C_{B:C}$B→C.U $C_{B:B}$C→B.U $C_{B:B}$C→B.R $C_{B:X}$B↔C.S |
| C→ 26240 | 26242 $A_{C:A}$C→A.U $A_{C:C}$A→C.U $A_{C:C}$A→C.R $A_{C:X}$A↔C.S | 26244 $B_{C:B}$C→B.U $B_{C:C}$B→C.U $B_{C:C}$B→C.R $B_{C:X}$B↔C.S | 26246 $C_{C:C}$C↔C.S |

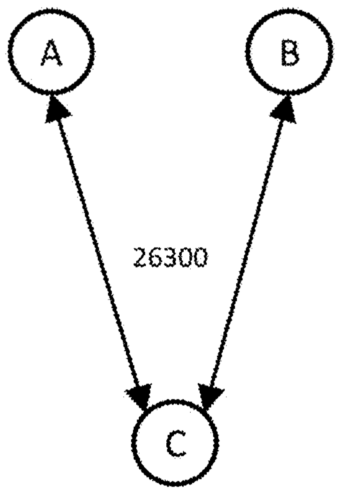

26310

| Group G | N→N | | Keys |
|---|---|---|---|
| From\To | A | B | C |
| A→ 26320 | 26322<br>$A_{A:A}$A↔A.S | 26324<br>$B_{A:B}$A→B.U<br>$B_{A:A}$B→A.U<br>$B_{A:A}$B→A.R<br>$B_{A:X}$A↔B.S | 26326<br>$C_{A:C}$A→C.U<br>$C_{A:A}$C→A.U<br>$C_{A:A}$C→A.R<br>$C_{A:X}$A↔C.S |
| B→ 26330 | 26332<br>$A_{B:A}$B→A.U<br>$A_{B:B}$A→B.U<br>$A_{B:B}$A→B.R<br>$A_{B:X}$A↔B.S | 26334<br>$B_{B:B}$B↔B.S | 26336<br>$C_{B:C}$B→C.U<br>$C_{B:B}$C→B.U<br>$C_{B:B}$C→B.R<br>$C_{B:X}$B↔C.S |
| C→ 26340 | 26342<br>$A_{C:A}$C→A.U<br>$A_{C:C}$A→C.U<br>$A_{C:C}$A→C.R<br>$A_{C:X}$A↔C.S | 26344<br>$B_{C:B}$C→B.U<br>$B_{C:C}$B→C.U<br>$B_{C:C}$B→C.R<br>$B_{C:X}$B↔C.S | 26346<br>$C_{C:C}$C↔C.S |

Fig. 263

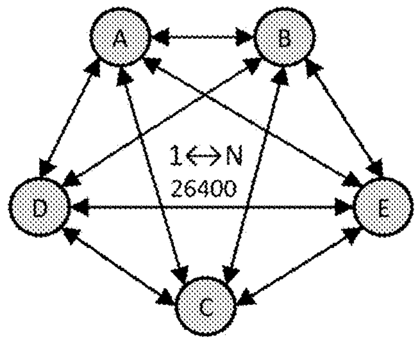

26410

| Group G | 1↔N | | Keys | | |
|---|---|---|---|---|---|
| From\To | A | B | C | D | E |
| A→ | $A_{A:A}$A↔A.S | $B_{A:B}$A→B.U<br>$B_{A:A}$B→A.U<br>$B_{A:A}$B→A.R<br>$B_{A:X}$A↔B.S | $C_{A:C}$A→C.U<br>$C_{A:A}$C→A.U<br>$C_{A:A}$C→A.R<br>$C_{A:X}$A↔C.S | $D_{A:D}$A→D.U<br>$D_{A:A}$D→A.U<br>$D_{A:A}$D→A.R<br>$D_{A:X}$A↔D.S | $E_{A:E}$A→E.U<br>$E_{A:A}$E→A.U<br>$E_{A:A}$E→A.R<br>$E_{A:X}$A↔E.S |
| B→ | $A_{B:A}$B→A.U<br>$A_{B:B}$A→B.U<br>$A_{B:B}$A→B.R<br>$A_{B:X}$A↔B.S | $B_{B:B}$B↔B.S | $C_{B:C}$B→C.U<br>$C_{B:B}$C→B.U<br>$C_{B:B}$C→B.R<br>$C_{B:X}$B↔C.S | $D_{B:D}$B→D.U<br>$D_{B:B}$D→B.U<br>$D_{B:B}$D→B.R<br>$D_{B:X}$B↔D.S | $E_{B:E}$B→E.U<br>$E_{B:B}$E→B.U<br>$E_{B:B}$E→B.R<br>$E_{B:X}$B↔E.S |
| C→ | $A_{C:A}$C→A.U<br>$A_{C:C}$A→C.U<br>$A_{C:C}$A→C.R<br>$A_{C:X}$A↔C.S | $B_{C:B}$C→B.U<br>$B_{C:C}$B→C.U<br>$B_{C:C}$B→C.R<br>$B_{C:X}$B↔C.S | $C_{C:C}$C↔C.S | $D_{C:D}$C→D.U<br>$D_{C:C}$D→C.U<br>$D_{C:C}$D→C.R<br>$D_{C:X}$C↔D.S | $E_{C:E}$C→E.U<br>$E_{C:C}$E→C.U<br>$E_{C:C}$E→C.R<br>$E_{C:X}$C↔E.S |
| D→ | $A_{D:A}$D→A.U<br>$A_{D:D}$A→D.U<br>$A_{D:D}$A→D.R<br>$A_{D:X}$A↔D.S | $B_{D:B}$D→B.U<br>$B_{D:D}$B→D.U<br>$B_{D:D}$B→D.R<br>$B_{D:X}$B↔D.S | $C_{D:C}$D→C.U<br>$C_{D:D}$C→D.U<br>$C_{D:D}$C→D.R<br>$C_{D:X}$D↔C.S | $D_{D:D}$D↔D.S | $E_{D:E}$D→E.U<br>$E_{D:D}$E→D.U<br>$E_{D:D}$E→D.R<br>$E_{D:X}$D↔E.S |
| E→ | $A_{E:A}$E→A.U<br>$A_{E:E}$A→E.U<br>$A_{E:E}$A→E.R<br>$A_{E:X}$A↔E.S | $B_{E:B}$E→B.U<br>$B_{E:E}$B→E.U<br>$B_{E:E}$B→E.R<br>$B_{E:X}$B↔E.S | $C_{E:C}$E→C.U<br>$C_{E:E}$C→E.U<br>$C_{E:E}$C→E.R<br>$C_{E:X}$E↔C.S | $D_{E:D}$E→D.U<br>$D_{E:E}$D→E.U<br>$D_{E:E}$D→E.R<br>$D_{E:X}$E↔D.S | $E_{E:E}$E↔E.S |

Fig. 264

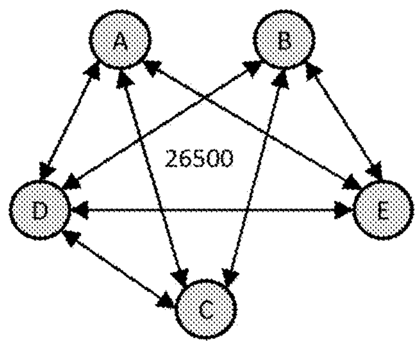

26510

| Group G | Keys | | | | |
|---|---|---|---|---|---|
| From\To | A | B | C | D | E |
| A→ | $A_{A:A}$A↔A.S | [illegible]A→B[illegible]<br>$B_{A:A}$[illegible]A.U<br>B[illegible]A.R<br>[illegible]$_{A:X}$A↔B[illegible] | $C_{A:C}$A→C.U<br>$C_{A:A}$C→A.U<br>$C_{A:A}$C→A.R<br>$C_{A:X}$A↔C.S | $D_{A:D}$A→D.U<br>$D_{A:A}$D→A.U<br>$D_{A:A}$D→A.R<br>$D_{A:X}$A↔D.S | $E_{A:E}$A→E.U<br>$E_{A:A}$E→A.U<br>$E_{A:A}$E→A.R<br>$E_{A:X}$A↔E.S |
| B→ | [illegible]B→A[illegible]<br>$A_{B:B}$[illegible]B.U<br>A[illegible]B.R<br>[illegible]$_{B:X}$A↔B[illegible] | $B_{B:B}$B↔B.S | $C_{B:C}$B→C.U<br>$C_{B:B}$C→B.U<br>$C_{B:B}$C→B.R<br>$C_{B:X}$B↔C.S | $D_{B:D}$B→D.U<br>$D_{B:B}$D→B.U<br>$D_{B:B}$D→B.R<br>$D_{B:X}$B↔D.S | $E_{B:E}$B→E.U<br>$E_{B:B}$E→B.U<br>$E_{B:B}$E→B.R<br>$E_{B:X}$B↔E.S |
| C→ | $A_{C:A}$C→A.U<br>$A_{C:C}$A→C.U<br>$A_{C:C}$A→C.R<br>$A_{C:X}$A↔C.S | $B_{C:B}$C→B.U<br>$B_{C:C}$B→C.U<br>$B_{C:C}$B→C.R<br>$B_{C:X}$B↔C.S | $C_{C:C}$C↔C.S | $D_{C:D}$C→D.U<br>$D_{C:C}$D→C.U<br>$D_{C:C}$D→C.R<br>$D_{C:X}$C↔D.S | [illegible]C→E[illegible]<br>$E_{C:C}$[illegible]C.U<br>E[illegible]C.R<br>[illegible]$_{C:X}$C↔E[illegible] |
| D→ | $A_{D:A}$D→A.U<br>$A_{D:D}$A→D.U<br>$A_{D:D}$A→D.R<br>$A_{D:X}$A↔D.S | $B_{D:B}$D→B.U<br>$B_{D:D}$B→D.U<br>$B_{D:D}$B→D.R<br>$B_{D:X}$B↔D.S | $C_{D:C}$D→C.U<br>$C_{D:D}$C→D.U<br>$C_{D:D}$C→D.R<br>$C_{D:X}$D↔C.S | $D_{D:D}$D↔D.S | $E_{D:E}$D→E.U<br>$E_{D:D}$E→D.U<br>$E_{D:D}$E→D.R<br>$E_{D:X}$D↔E.S |
| E→ | $A_{E:A}$E→A.U<br>$A_{E:E}$A→E.U<br>$A_{E:E}$A→E.R<br>$A_{E:X}$A↔E.S | $B_{E:B}$E→B.U<br>$B_{E:E}$B→E.U<br>$B_{E:E}$B→E.R<br>$B_{E:X}$B↔E.S | [illegible]$_{E:C}$E→C[illegible]<br>C[illegible]E.U<br>C[illegible]E.R<br>[illegible]$_{E:X}$E↔[illegible] | $D_{E:D}$E→D.U<br>$D_{E:E}$D→E.U<br>$D_{E:E}$D→E.R<br>$D_{E:X}$E↔D.S | $E_{E:E}$E↔E.S |

Fig. 265

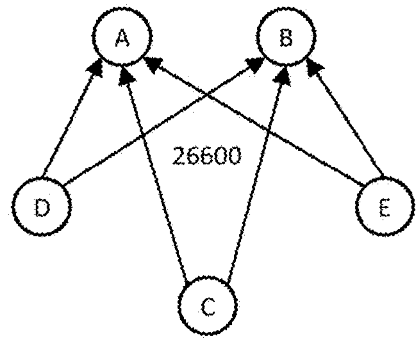

26610

| Group G | Keys | | | | |
|---|---|---|---|---|---|
| From\To | A | B | C | D | E |
| A→ | $A_{A:A}A \leftrightarrow A.S$ | [illegible]A→B[illegible]<br>$B_{A:A}$[illegible]A.U<br>B[illegible]B→A.R<br>[illegible]A↔B[illegible] | ~~$C_{A:C}A \rightarrow C.U$~~<br>$C_{A:A}C \rightarrow A.U$<br>$C_{A:A}C \rightarrow A.R$<br>~~$C_{A:X}A \leftrightarrow C.S$~~ | ~~$D_{A:D}A \rightarrow D.U$~~<br>$D_{A:A}D \rightarrow A.U$<br>$D_{A:A}D \rightarrow A.R$<br>~~$D_{A:X}A \leftrightarrow D.S$~~ | ~~$E_{A:E}A \rightarrow E.U$~~<br>$E_{A:A}E \rightarrow A.U$<br>$E_{A:A}E \rightarrow A.R$<br>~~$E_{A:X}A \leftrightarrow E.S$~~ |
| B→ | [illegible]B→A[illegible]<br>$A_{B:B}$[illegible]B.U<br>A[illegible]A→B.R<br>[illegible]A↔B[illegible] | $B_{B:B}B \leftrightarrow B.S$ | ~~$C_{B:C}B \rightarrow C.U$~~<br>$C_{B:B}C \rightarrow B.U$<br>$C_{B:B}C \rightarrow B.R$<br>~~$C_{B:X}B \leftrightarrow C.S$~~ | ~~$D_{B:D}B \rightarrow D.U$~~<br>$D_{B:B}D \rightarrow B.U$<br>$D_{B:B}D \rightarrow B.R$<br>~~$D_{B:X}B \leftrightarrow D.S$~~ | ~~$E_{B:E}B \rightarrow E.U$~~<br>$E_{B:B}E \rightarrow B.U$<br>$E_{B:B}E \rightarrow B.R$<br>~~$E_{B:X}B \leftrightarrow E.S$~~ |
| C→ | $A_{C:A}C \rightarrow A.U$<br>[illegible]A→C[illegible]<br>$A_{C:C}$[illegible]C.R<br>[illegible]A↔C[illegible] | $B_{C:B}C \rightarrow B.U$<br>[illegible]B→C[illegible]<br>$B_{C:C}$[illegible]C.R<br>[illegible]B↔C[illegible] | $C_{C:C}C \leftrightarrow C.S$ | [illegible]C→D[illegible]<br>$D_{C:C}$[illegible]C.U<br>D[illegible]D→C.R<br>[illegible]C↔D[illegible] | [illegible]C→E[illegible]<br>$E_{C:C}$[illegible]C.U<br>E[illegible]C.R<br>[illegible]C↔E[illegible] |
| D→ | $A_{D:A}D \rightarrow A.U$<br>[illegible]A→D[illegible]<br>A[illegible]D.R<br>[illegible]A↔D[illegible] | $B_{D:B}D \rightarrow B.U$<br>[illegible]B→D[illegible]<br>$B_{D:D}$[illegible]D.R<br>[illegible]B↔D[illegible] | [illegible]D→C[illegible]<br>$C_{D:D}$[illegible]D.U<br>C[illegible]C→D.R<br>[illegible]D↔C[illegible] | $D_{D:D}D \leftrightarrow D.S$ | [illegible]D→E[illegible]<br>$E_{D:D}$[illegible]D.U<br>E[illegible]D.R<br>[illegible]D↔E[illegible] |
| E→ | $A_{E:A}E \rightarrow A.U$<br>[illegible]A→E[illegible]<br>A[illegible]E.R<br>[illegible]A↔E[illegible] | $B_{E:B}E \rightarrow B.U$<br>[illegible]B→E[illegible]<br>B[illegible]E.R<br>[illegible]B↔E[illegible] | [illegible]E→C[illegible]<br>$C_{E:E}$[illegible]E.U<br>C[illegible]C→E.R<br>[illegible]E↔C[illegible] | [illegible]E→D[illegible]<br>$D_{E:E}$[illegible]E.U<br>D[illegible]D→E.R<br>[illegible]E↔D[illegible] | $E_{E:E}E \leftrightarrow E.S$ |

| Group G | N->N | | Keys |
|---|---|---|---|
| From\To | A | B | C |
| A→<br>26702 | $A_{A:A}A \leftrightarrow A.S$ | $B_{A:B}A \rightarrow B.U$<br>$B_{A:A}B \rightarrow A.U$<br>$B_{A:A}B \rightarrow A.R$<br>$B_{A:X}A \leftrightarrow B.S$ | $C_{A:C}A \rightarrow C.U$<br>$C_{A:A}C \rightarrow A.U$<br>$C_{A:A}C \rightarrow A.R$<br>$C_{A:X}A \leftrightarrow C.S$ |
| B→<br>26704 | $A_{B:A}B \rightarrow A.U$<br>$A_{B:B}A \rightarrow B.U$<br>$A_{B:B}A \rightarrow B.R$<br>$A_{B:X}A \leftrightarrow B.S$ | $B_{B:B}B \leftrightarrow B.S$ | $C_{B:C}B \rightarrow C.U$<br>$C_{B:B}C \rightarrow B.U$<br>$C_{B:B}C \rightarrow B.R$<br>$C_{B:X}B \leftrightarrow C.S$ |
| C→<br>26706 | $A_{C:A}C \rightarrow A.U$<br>$A_{C:C}A \rightarrow C.U$<br>$A_{C:C}A \rightarrow C.R$<br>$A_{C:X}A \leftrightarrow C.S$ | $B_{C:B}C \rightarrow B.U$<br>$B_{C:C}B \rightarrow C.U$<br>$B_{C:C}B \rightarrow C.R$<br>$B_{C:X}B \leftrightarrow C.S$ | $C_{C:C}C \leftrightarrow C.S$ |

26710

| Group G | Creator A | | | | |
|---|---|---|---|---|---|
| Mini-NUTbook | Contact Entry | Member Group Key | Symmetric | To Public Key | From Key Pair |
| A<br>26712 | A<br>B<br>C | KGA<br>KGA<br>KGA | $A_{A:A}A \leftrightarrow A.S$<br>$B_{A:X}A \leftrightarrow B.S$<br>$C_{A:X}A \leftrightarrow C.S$ | -<br>$B_{A:B}A \rightarrow B.U$<br>$C_{A:C}A \rightarrow C.U$ | -<br>$B_{A:A}B \rightarrow A.[U,R]$<br>$C_{A:A}C \rightarrow A.[U.R]$ |
| B<br>26714 | A<br>B<br>C | KGB<br>KGB<br>KGB | $A_{B:X}A \leftrightarrow B.S$<br>$B_{B:B}B \leftrightarrow B.S$<br>$C_{B:X}B \leftrightarrow C.S$ | $A_{B:A}B \rightarrow A.U$<br>-<br>$C_{B:C}B \rightarrow C.U$ | $A_{B:B}A \rightarrow B.[U,R]$<br>-<br>$C_{B:B}C \rightarrow B. [U,R]$ |
| C<br>26716 | A<br>B<br>C | KGC<br>KGC<br>KGC | $A_{C:X}A \leftrightarrow C.S$<br>$B_{C:X}B \leftrightarrow C.S$<br>$C_{C:C}C \leftrightarrow C.S$ | $A_{C:A}C \rightarrow A.U$<br>$B_{C:B}C \rightarrow B.U$<br>- | $A_{C:C}A \rightarrow C.[U,R]$<br>$B_{C:C}B \rightarrow C.[U,R]$<br>- |

| Group G | Creator A | | | | |
|---|---|---|---|---|---|
| **Mini-NUTbook** | **Contact Entry** | **Member Group Key** | **Symmetric** | **To Public Key** | **From Key Pair** |
| A | A | KGA | $A_{A:A}A\leftrightarrow A.S$ | - | - |
| | B | KGA | $B_{A:X}A\leftrightarrow B.S$ | $B_{A:B}A\rightarrow B.U$ | $B_{A:A}B\rightarrow A.[U,R]$ |
| | C | KGA | $C_{A:X}A\leftrightarrow C.S$ | $C_{A:C}A\rightarrow C.U$ | $C_{A:A}C\rightarrow A.[U.R]$ |
| B | A | KGB | $A_{B:X}A\leftrightarrow B.S$ | $A_{B:A}B\rightarrow A.U$ | $A_{B:B}A\rightarrow B.[U,R]$ |
| | B | KGB | $B_{B:B}B\leftrightarrow B.S$ | - | - |
| | C | KGB | $C_{B:X}B\leftrightarrow C.S$ | $C_{B:C}B\rightarrow C.U$ | $C_{B:B}C\rightarrow B.\ [U,R]$ |
| C | A | KGC | $A_{C:X}A\leftrightarrow C.S$ | $A_{C:A}C\rightarrow A.U$ | $A_{C:C}A\rightarrow C.[U,R]$ |
| | B | KGC | $B_{C:X}B\leftrightarrow C.S$ | $B_{C:B}C\rightarrow B.U$ | $B_{C:C}B\rightarrow C.[U,R]$ |
| | C | KGC | $C_{C:C}C\leftrightarrow C.S$ | - | - |

26810

| Group G | | Creator A | Admin A,B | | | |
|---|---|---|---|---|---|---|
| **Mini-NUTbook** | | **Contact Entry** | **Member Group Key** | **Symmetric** | **To Public Key** | **From Key Pair** |
| A | | A | KGA | $A_{A:A}A\leftrightarrow A.S$ | - | - |
| | | B | KGA | $B_{A:X}A\leftrightarrow B.S$ | $B_{A:B}A\rightarrow B.U$ | $B_{A:A}B\rightarrow A.[U,R]$ |
| | | C | KGA | $C_{A:X}A\leftrightarrow C.S$ | $C_{A:C}A\rightarrow C.U$ | $C_{A:A}C\rightarrow A.[U.R]$ |
| | 26812 | D | $B\rightarrow A_{RBK}$ | $D_{A:D}A\leftrightarrow D.S$ | $C_{A:D}A\rightarrow D.U$ | $C_{A:D}D\rightarrow A.[U.R]$ |
| B | | A | KGB | $A_{B:X}A\leftrightarrow B.S$ | $A_{B:A}B\rightarrow A.U$ | $A_{B:B}A\rightarrow B.[U,R]$ |
| | | B | KGB | $B_{B:B}B\leftrightarrow B.S$ | - | - |
| | | C | KGB | $C_{B:X}B\leftrightarrow C.S$ | $C_{B:C}B\rightarrow C.U$ | $C_{B:B}C\rightarrow B.\ [U,R]$ |
| | 26814 | D | KGB | $D_{B:D}B\leftrightarrow D.S$ | $D_{B:D}B\rightarrow D.U$ | $D_{B:D}D\rightarrow B.[U.R]$ |
| C | | A | KGC | $A_{C:X}A\leftrightarrow C.S$ | $A_{C:A}C\rightarrow A.U$ | $A_{C:C}A\rightarrow C.[U,R]$ |
| | | B | KGC | $B_{C:X}B\leftrightarrow C.S$ | $B_{C:B}C\rightarrow B.U$ | $B_{C:C}B\rightarrow C.[U,R]$ |
| | | C | KGC | $C_{C:C}C\leftrightarrow C.S$ | - | - |
| | 26816 | D | $B\rightarrow C_{RBK}$ | $D_{C:D}C\leftrightarrow D.S$ | $D_{C:D}C\rightarrow D.U$ | $D_{C:D}D\rightarrow C.[U.R]$ |
| D | | A | $B\rightarrow D_{RBK}$ | $A_{D:D}A\leftrightarrow C.S$ | $A_{D:D}D\rightarrow A.U$ | $A_{D:D}A\rightarrow D.[U,R]$ |
| | | B | $B\rightarrow D_{RBK}$ | $B_{D:D}B\leftrightarrow C.S$ | $B_{D:D}D\rightarrow B.U$ | $B_{D:D}B\rightarrow D.[U,R]$ |
| | | C | $B\rightarrow D_{RBK}$ | $C_{D:D}C\leftrightarrow C.S$ | $D_{D:D}D\rightarrow C.U$ | $D_{D:D}C\rightarrow D.[U.R]$ |
| | 26818 | D | $B\rightarrow D_{RBK}$ | $D_{D:D}D\leftrightarrow D.S$ | - | - |

Fig. 268

| 1 User, 1 Change 26910 | | | | |
|---|---|---|---|---|
| Time | Alice | Bob | Carol | |
| T1 | DS1 | DS1 | DS1 | |
| T2 | DS1→DS2→C | DS1 | DS1 | Alice modifies DS1 and sends catalog update |
| T3 | DS2 | ↔DS2 | ↔DS2 | Bob & Carol requests DS2 and replaces. |
| T4 | DS2 | DS2 | DS2 | Sync achieved. |

| 1 User, 2 Changes, Delayed Receiver 26920 | | | |
|---|---|---|---|
| Time | Alice | Bob | Carol |
| T1 | DS1 | DS1 | DS1 |
| T2 | DS1→DS2→C | DS1 | DS1 |
| T3 | DS2 | ↔DS2 | DS1 |
| T4 | DS2→DS3→C | DS2 | DS1 |
| T5 | DS3 | ↔DS3 | DS1 |
| T6 | DS3 | DS3 | ↔DS3 |

| Terminology 26900 | |
|---|---|
| dign version | DSx |
| modification | DS1 |
| state change | → |
| new state | DS2 |
| catalog poll | →C |
| merge DSy | m(DSy) |
| request DSy | ↔DSy |

Fig. 269

2 User, 1 Change each 27000

| Time | Alice | Bob | Carol |
|---|---|---|---|
| T1 | DS1 | DS1 | DS1 |
| T2 | DS1→DS2→C | DS1→DS3→C | DS1 |
| T3 | m(↔DS3)→DS4→C | DS3 | ↔DS3 |
| T4 | DS4 | ↔DS4 | ↔DS4 |
| T5 | DS4 | DS4 | DS4 |

2 User, 1 Change each 27010

| Time | Alice | Bob | Carol |
|---|---|---|---|
| T1 | DS1 | DS1 | DS1 |
| T2 | DS1→DS2→C | DS1→DS3→C | DS1 |
| T3 | m(↔DS3)→DS4→C | DS3→DS5→C | ↔DS3 |
| T4 | ↔DS5 | ↔DS4, ↔DS3 | ↔DS4 |
| T5 | m(DS5)→DS6 | m(DS4)→DS6 | DS4 |
| T6 | DS6 | DS6 | ↔DS6 |
| T7 | DS6 | DS6 | DS6 |

Fig. 270

Deriving an Anonymized ID (AID)

27100

27110 anonID1 = hash(identifier + IV)
anonID2 = hash(anonID1 + IV)
anonID3 = hash(anonID2 + IV)
anonID4 = hash(anonID3 + IV)
...

Table of ID Types 27200

| *ID Type* | *ID Mnemonic* | *AID Mnemonic* |
|---|---|---|
| NUTserver | NSID | ANSID |
| Relationship | RID | ARID |

Table of NUTserver IDs 27210

| *NUTserver* | *NSID* | *ANSID* |
|---|---|---|
| Alice NS | NSID_A | ANSID_A |
| Bob NS | NSID_B | ANSID_B |
| Bob NS 2 | NSID_B2 | ANSID_B2 |
| Carol NS | NSID_C | ANSID_C |
| Carol NS 2 | NSID_C2 | ANSID_C2 |

Table of IP Addresses 27220

| *NUTserver* | *NSID* | *ANSID* | *IPv4 Address* | *IPv6 Address* | *Port* |
|---|---|---|---|---|---|
| Alice NS | NSID_A | ANSID_A | 111.1.0.1 | 1111:34af:1000:0001: : | 41000 |
| Bob NS | NSID_B | ANSID_B | 222.1.0.1 | 2222:44aa:2000:0001: : | 41000 |
| Bob NS 2 | NSID_B2 | ANSID_B2 | 222.1.0.2 | 2222:44aa:2000:0002: : | 41000 |
| Carol NS | NSID_C | ANSID_C | 333.1.0.1 | | 41000 |
| Carol NS 2 | NSID_C2 | ANSID_C2 | 333.1.0.2 | | 41000 |

Fig. 272

29600 GBE — 29602

| ID | type |
|---|---|
| GBE | GROUP |

Keyholes
KBOB,KSYS1,KSYS2,KSSG

| Member | RBK | Access |
|---|---|---|
| BOBID | KGB | RAT |
| SYS1 | KGS1 | RW |
| SYS2 | KGS2 | RW |
| ANID | KGSG | RW |

29610 C1A — 29612

| ID | Group | CatID | Type | Ver |
|---|---|---|---|---|
| C1A | GBE | C1 | CATALOG | v1 |

Keyholes
KGB,KGS1,KGS2,KGSG

| ID | Ver | Type |
|---|---|---|
| GBE | v3 | group |
| F1 | v1 | fhog |

29620 C2A — 29622

| ID | Group | CatID | Type | Ver |
|---|---|---|---|---|
| C2A | GBE | C2 | CATALOG | v1 |

Keyholes
KGB,KGS1,KGS2,KGSG

| ID | Ver | Type |
|---|---|---|
| GBE | v3 | group |
| F1 | v1 | fhog |

29630 CLA — 29632

| ID | Group | CatID | Type | Ver |
|---|---|---|---|---|
| CLA | GBE | CL | CATALOG | v1 |

Keyholes
KGB,KGS1,KGS2,KGSG

| ID | Ver | Type |
|---|---|---|
| GBE | v3 | group |
| F1 | v1 | fhog |

29640 F1 — 29642

| ID | type | Mode | Ver |
|---|---|---|---|
| F1 | FHOG | Catalog | v1 |

Keyholes
KGB,KGS1,KGS2,KGSG

| ID | Version | Type |
|---|---|---|
| BOBID | v8 | contact |
| ANID | ... | access |
| SYS1 | ... | server |
| SYS2 | ... | server |
| SD1 | ... | storage |
| SD2 | ... | storage |
| CL1 | ... | clouddrive |
| GBE | ... | group |

29650 N10 — 29652

| ID | type | Version |
|---|---|---|
| N10 | text | v3 |

Keyholes
KGB,KGS1,KGS2,KGSG

Payload
Some text ABC

29660 N23 — 29662

| ID | type | Version |
|---|---|---|
| N23 | chat | v7 |

Keyholes
KGB,KGS1,KGS2,KGSG

Payload
Chat texts

Fig. 296

VM Ecogroup Hosting

Alice-Bob Relationship Group
In a Multi-Ecogroup Host

NUTS: FLEXIBLE HIERARCHY OBJECT GRAPHS

CROSS-REFERENCE TO RELATED APPLICATIONS

This application claims priority from U.S. Provisional Patent Application No. 63/007,636, entitled "NUTS: Flexible Hierarchy Object Graphs," filed Apr. 9, 2020, the entirety of which is incorporated by reference herein. This application also incorporates U.S. Pat. Nos. 10,503,933 and 10,671,764 by reference in their entireties.

BRIEF SUMMARY

A data centric model of computer software design is where user data may be prioritized over applications. A data centric software design may allow for data to be secured at the point of storage. The containerization of data may be an embodiment of a data centric design. In order to show how various concepts may be implemented within this disclosure, a series of drawings from different perspectives highlight the specific concepts being explored and integral drawings show how several of these processes and structures may work together.

The containerization of data may be presented in a layered approach and, if preferred, each layer may build upon, or work in conjunction with, the previous layers in part or whole. The concepts, methods, apparatus, embodiments and/or specifications described herein for a first layer may be collectively called Structured Data Folding with Transmutations or SDFT. The concepts, methods, apparatus, embodiments and/or specifications described herein for a second layer, which may be inclusive of the first layer, may be collectively called eNcrypted Userdata Transit & Storage or NUTS. Any combination of each layer may be deployed in part or whole to construct a container for data called a Nut, and each layer may be deployed in part or whole in isolation. The interplay and/or interweaving of these two layers may be significant and/or complex and may pose challenges for the clear demarcation of such layers. Therefore, these layers are presented together in this specification. The Nut container may then be infused with various data centric characteristics which may allow for logical operations on the data contained therein. Upon the unit of storage called a Nut, various embodiments may be described to show how certain common data oriented logical operations may be re-defined and restructured to offer users privacy, security, convenience and/or capabilities.

BRIEF DESCRIPTION OF THE DRAWINGS

Various embodiments may be disclosed in the following detailed description and the accompanying drawings:

FIG. 1 shows a table of symbols used to represent different cipher key types.

FIG. 6 shows a table of common data operations and their transmutation classifications

FIG. 10 shows a table of common data operations and functions grouped by transmutation type FIG. 11 shows a table of codecs defined in Python v3.

FIG. 12 shows a table listing additional transmutation definitions

FIG. 13 shows a transmutation reversibility matrix

FIG. 14 shows a transmutation modal action matrix

FIG. 21 shows a table of command specifications for serialize and compress transmutations and a set of sample transmutation commands showing its usage.

FIG. 22 shows a table of command specifications for an encode transmutation and a set of sample transmutation commands showing its usage.

FIG. 23 shows a table of command specifications for a digest transmutation and a set of sample transmutation commands showing its usage.

FIG. 24 shows a table of command specifications for an acipher and dign transmutations and a set of sample transmutation commands showing its usage.

FIG. 25 shows a table of command specifications for a derive transmutation and a set of sample transmutation commands showing its usage.

FIG. 26 shows a table of command specifications for a scipher transmutation 2602 and a set of sample transmutation commands showing its usage 2604.

FIG. 27 shows the output structure format for a scipher output string in a sequence of two steps where Step 1 illustrates the input format and Step 2 illustrates the output format. "Header" is the variable length key-value utf8 encoded parameter string of the scipher transmutation on the output message.

FIG. 28 shows a table of parameter keywords and specifications for the header string in the output structure format of a scipher transmutation.

FIG. 30 shows a table of command specifications for a lock transmutation 3002 and a set of sample transmutation commands showing its usage 3010.

FIG. 31 shows the specifications of various transmutation structures in tabular format.

FIG. 32 shows a table of command specifications for a mobius transmutation. Its usage is shown and a graphic shows the structural changes it can enact on various structures. A matrix shows the structure type/mode valid operations that the mobius transmutation can operate on.

FIG. 33 shows a table of command specifications for press, clean and key transmutations 3302, 3304 and a set of sample transmutation commands showing its usage 3310.

FIG. 34 shows a table for the Key Interchange Specification Structure or KISS.

FIG. 35 shows a table for KISS modes of operation 3502, a matrix showing key types/field generation mappings 3504 and key type definitions 3506.

FIG. 36 shows the structure of a TAR and examples of TAR definitions.

FIG. 43 shows a table of transmutations mapped to a key type template it may generate or require during TAR processing.

FIG. 44 shows TAR examples and the key templates generated from each.

FIG. 45 shows TAR examples and the key templates generated from each and the expected list of KISS structures to be input (put) or generated (gen). The list of KISSes is also referred to as the keystack.

FIG. 51 shows an illustration of the SDFT API/Library and the various types of TAR definition files it may have access to.

FIG. 52 shows an example Python script to perform manual data folding.

FIG. 53 shows an SDFT example of a TAR definition and its usage in a Python script.

FIG. 67 shows a table of Variable Lock Types available in any Lock Node and their characteristics.

FIG. 80 shows a table of Key Based Permissions for two roles and four role players.

FIG. 81 shows a table listing the variety of Nut Parts in an example Nut where each part may be represented by a Lock Node.

FIG. 82 shows a table listing Key Based Permissions access roles defined for a typical Nut.

FIG. 87 shows a table of Key Based Permissions for an alternate embodiment.

FIG. 116 shows a Deterministic Context Based Status Matrix of an Alice-Bob RBK communication channel.

FIG. 117 shows a Deterministic Context Based Status Matrix of an Alice-vendor RBK communication channel.

FIG. 118 shows a Deterministic Context Based Status Matrix of a vendor-Alice RBK communication channel.

FIG. 120 shows a block diagram of Pre-Packaged Data Nuts.

FIG. 123 shows a table listing the NUTS Core Applications and their descriptions.

FIG. 125 shows a block diagram of the NUTserver running in a user device.

FIG. 126 shows block diagram of the internal components comprising a NUTserver and their functional connections to the environment of the user device.

FIG. 127 shows an alternative embodiment of the NUTserver shown in FIG. 126 using a NoSQL database as a caching mechanism.

FIG. 128 shows a block diagram of a MIOR Server network layout.

FIG. 129 shows a block diagram of a MIOR Server application layout.

FIG. 130 shows a flowchart for fetching MIO modules from a MIOR Server.

FIG. 131 shows a block diagram illustrating the organization of a MIOR Cache.

FIG. 132 shows a block diagram of a NUTbrowser application in a user device environment.

FIG. 133 shows a block diagram of a NUTbook application in a user device environment.

FIG. 134 shows a block diagram of a Nut processing application framework in a user device environment.

FIG. 135 shows a block diagram illustrating the internal components comprising a NUTbook.

FIG. 136 shows a block diagram illustrating the internal organization of a NUTbook Catalog Cache from FIG. 135.

Figure 137:
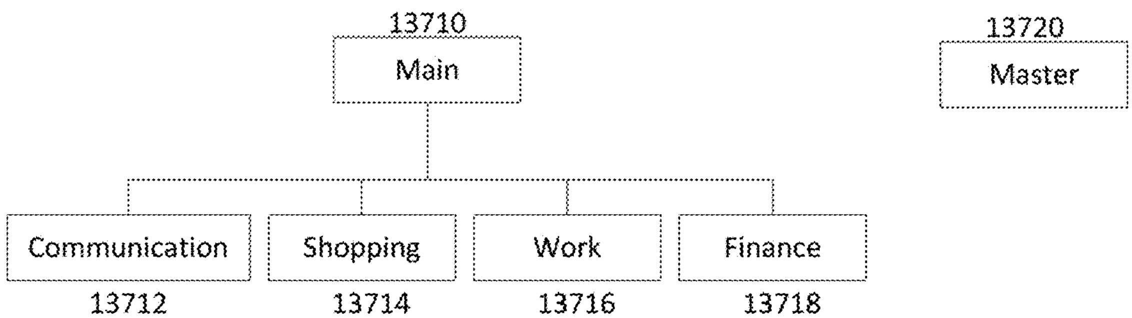

FIG. 137 shows a diagram showing the organization of Hierarchical Passwords.

Figure 138:
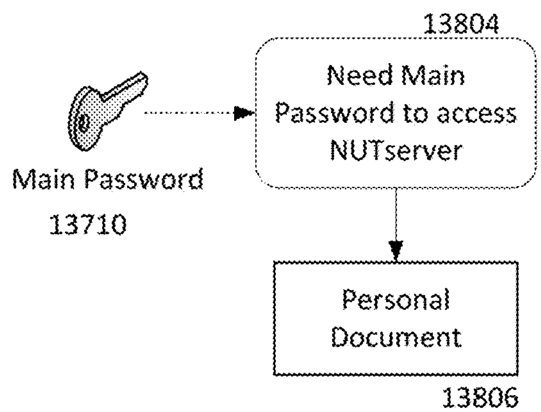

FIG. 138 shows how the Main Password opens a Personal Document as per the Hierarchical Passwords of FIG. 137.

Figure 139:
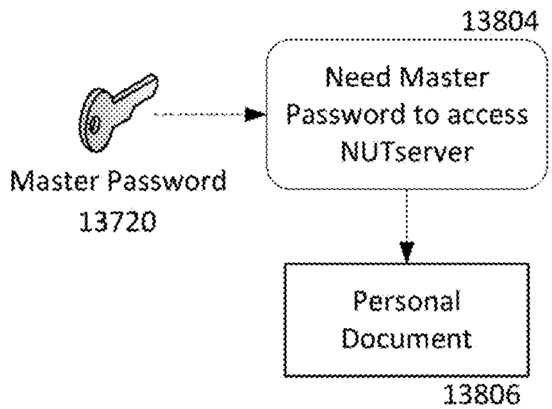

FIG. 139 shows how the Master Password opens a Personal Document as per the Hierarchical Passwords of FIG. 137 and the document in FIG. 138.

Figure 140:
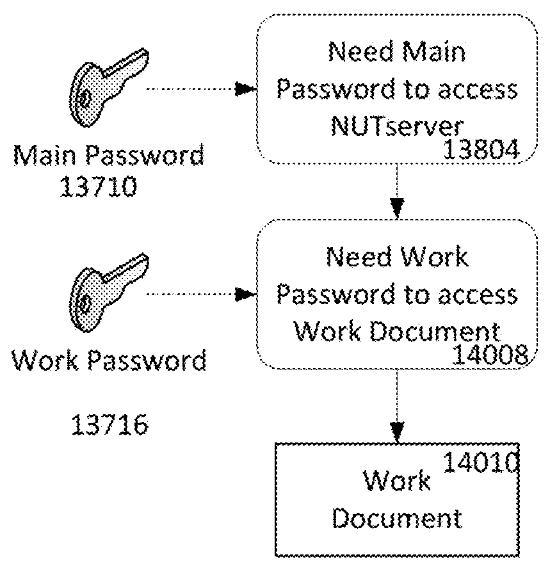

FIG. 140 shows how the Main and Work Passwords opens a Work Document as per the Hierarchical Passwords of FIG. 137.

Figure 141:
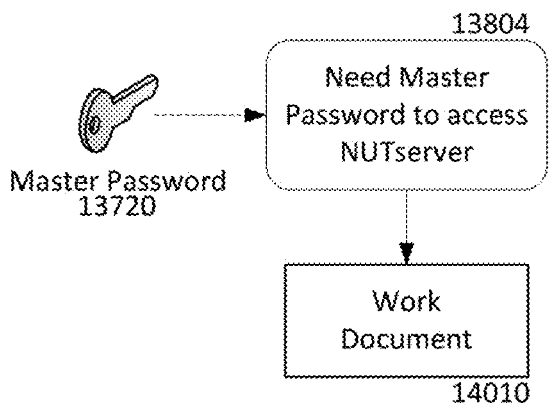

FIG. 141 shows how the Master Password opens a Work Document as per the Hierarchical Passwords of FIG. 137 and the document in FIG. 140.

Figure 135:
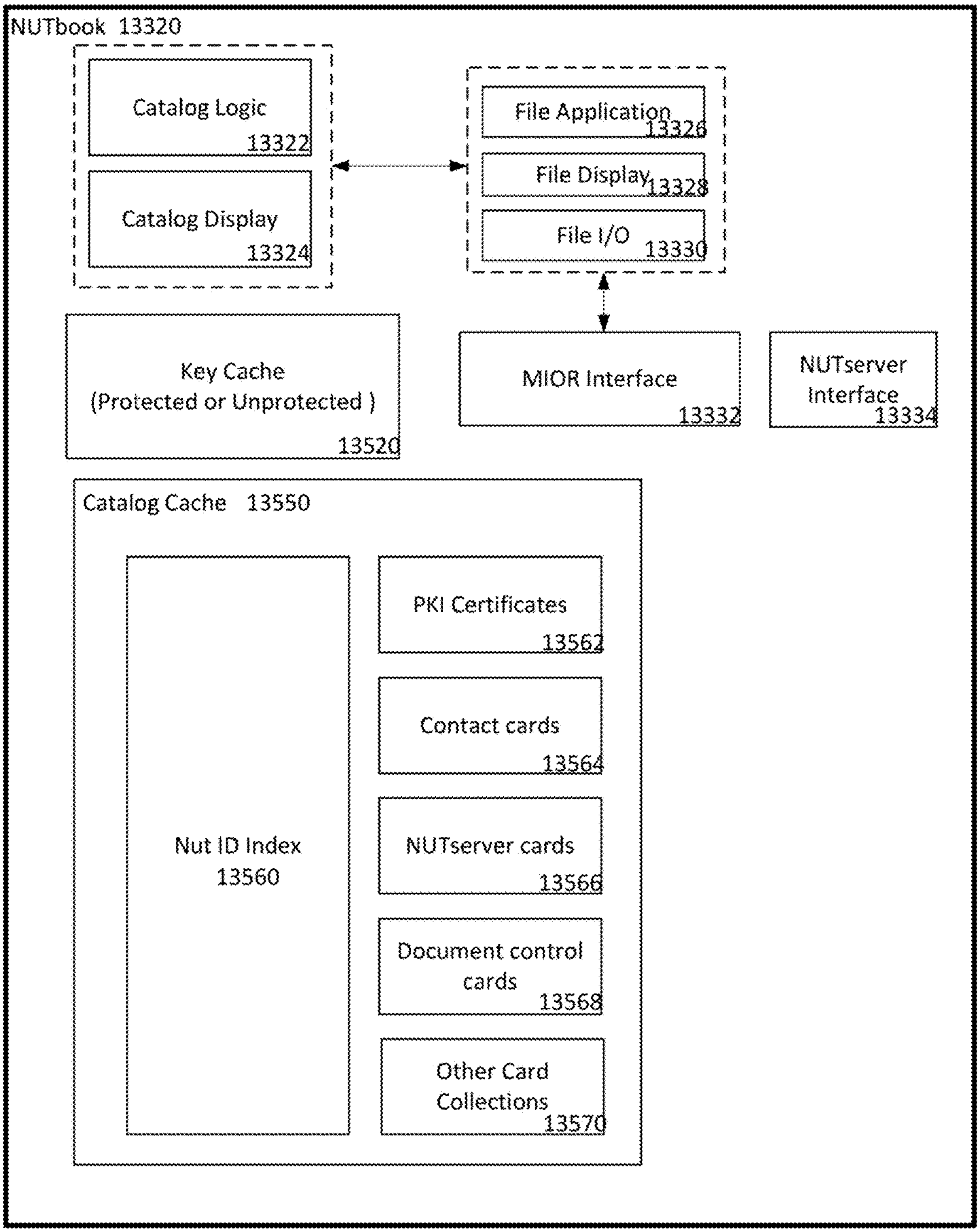
Figure 142:
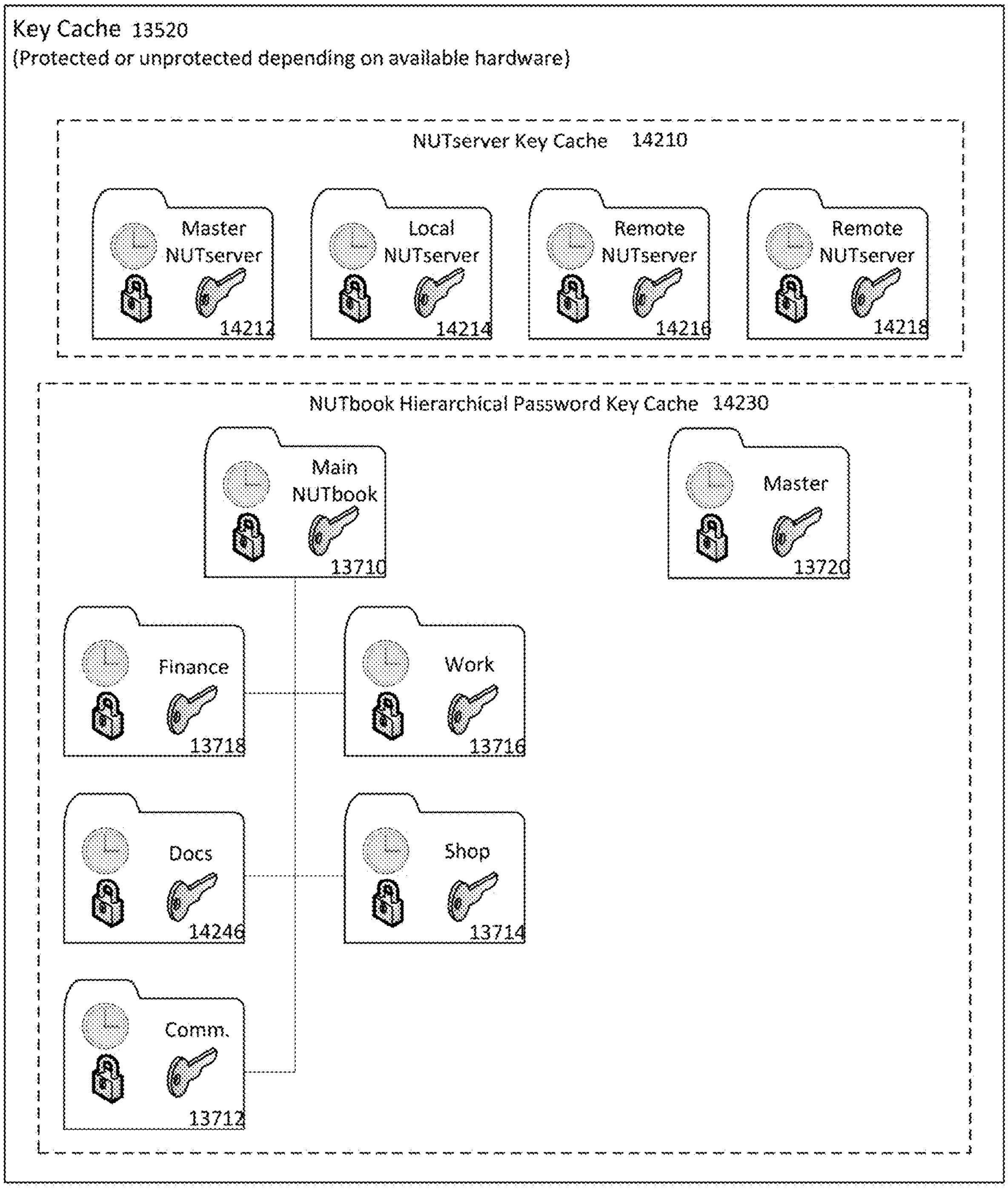

FIG. 142 shows a block diagram illustrating the internal organization of a NUTbook Key Cache from FIG. 135.

Figure 143:
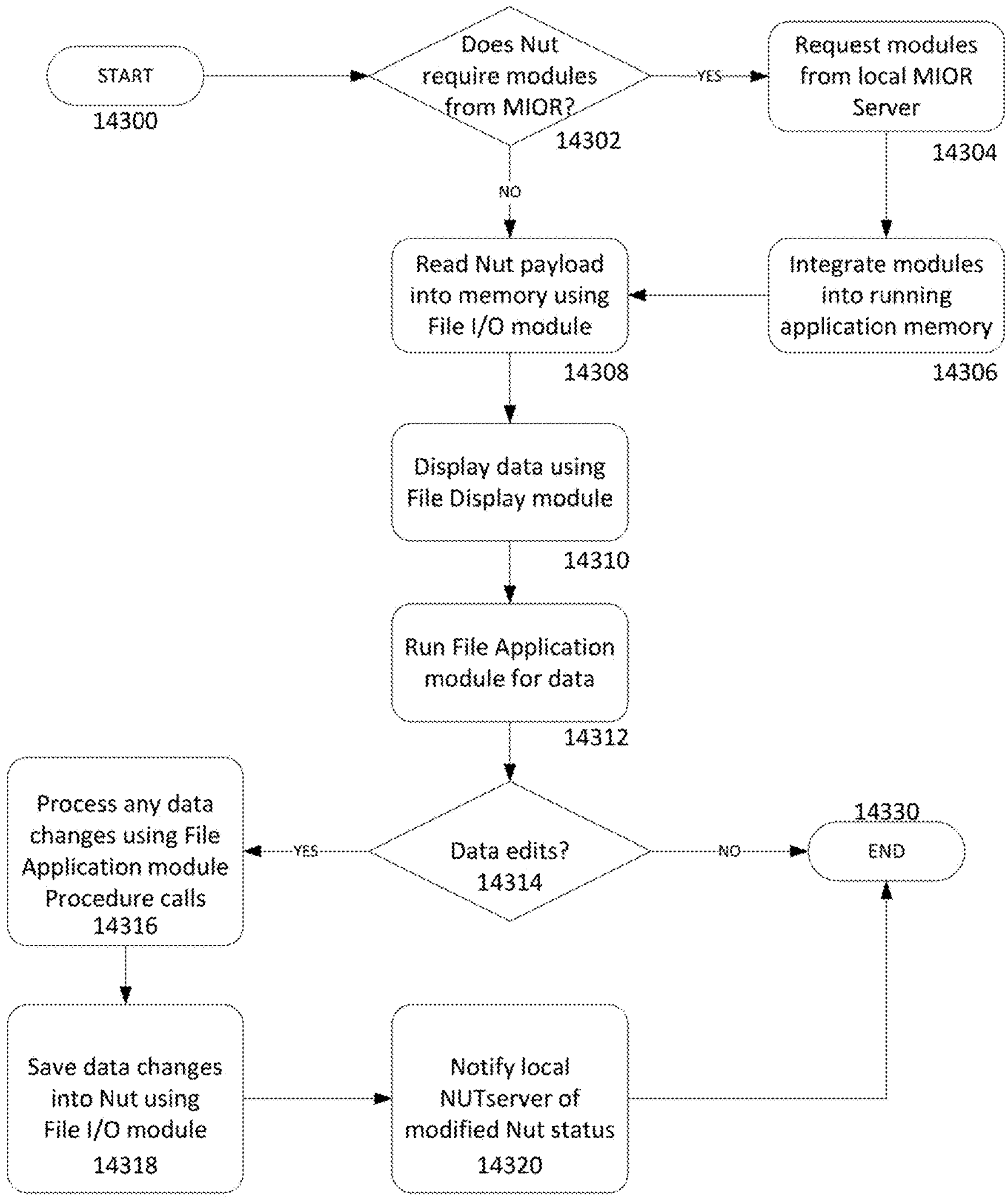

FIG. 143 shows a flowchart for how a NUTbook may view a Card Catalog.

FIG. 144 shows a table of NUTS Based Services.

Figure 145:
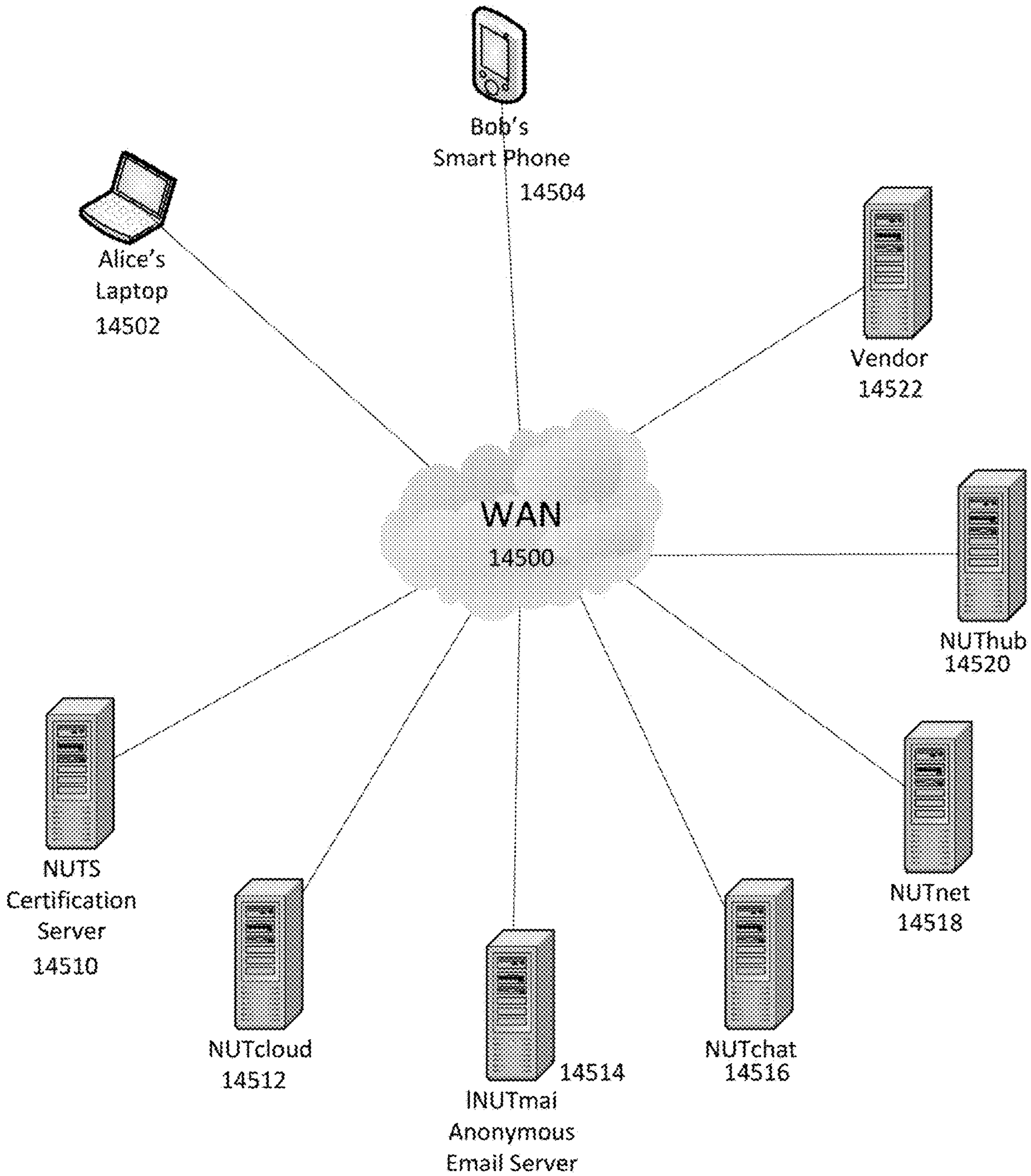

FIG. 145 shows an illustration of the network layout of NUTS Based Services.

Figure 146:
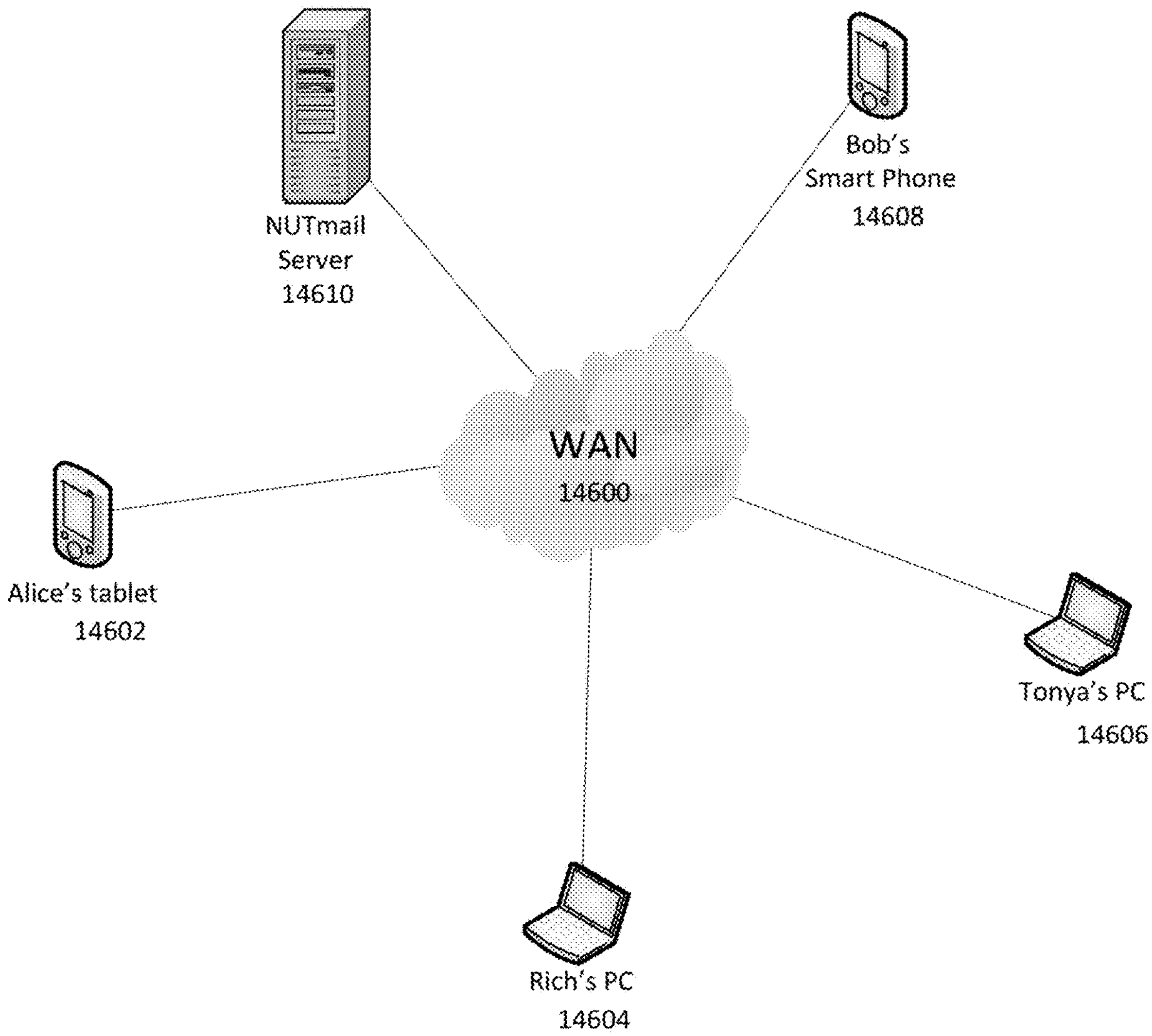

FIG. 146 shows an illustration of the network layout of a NUTmail Server.

Figure 147:
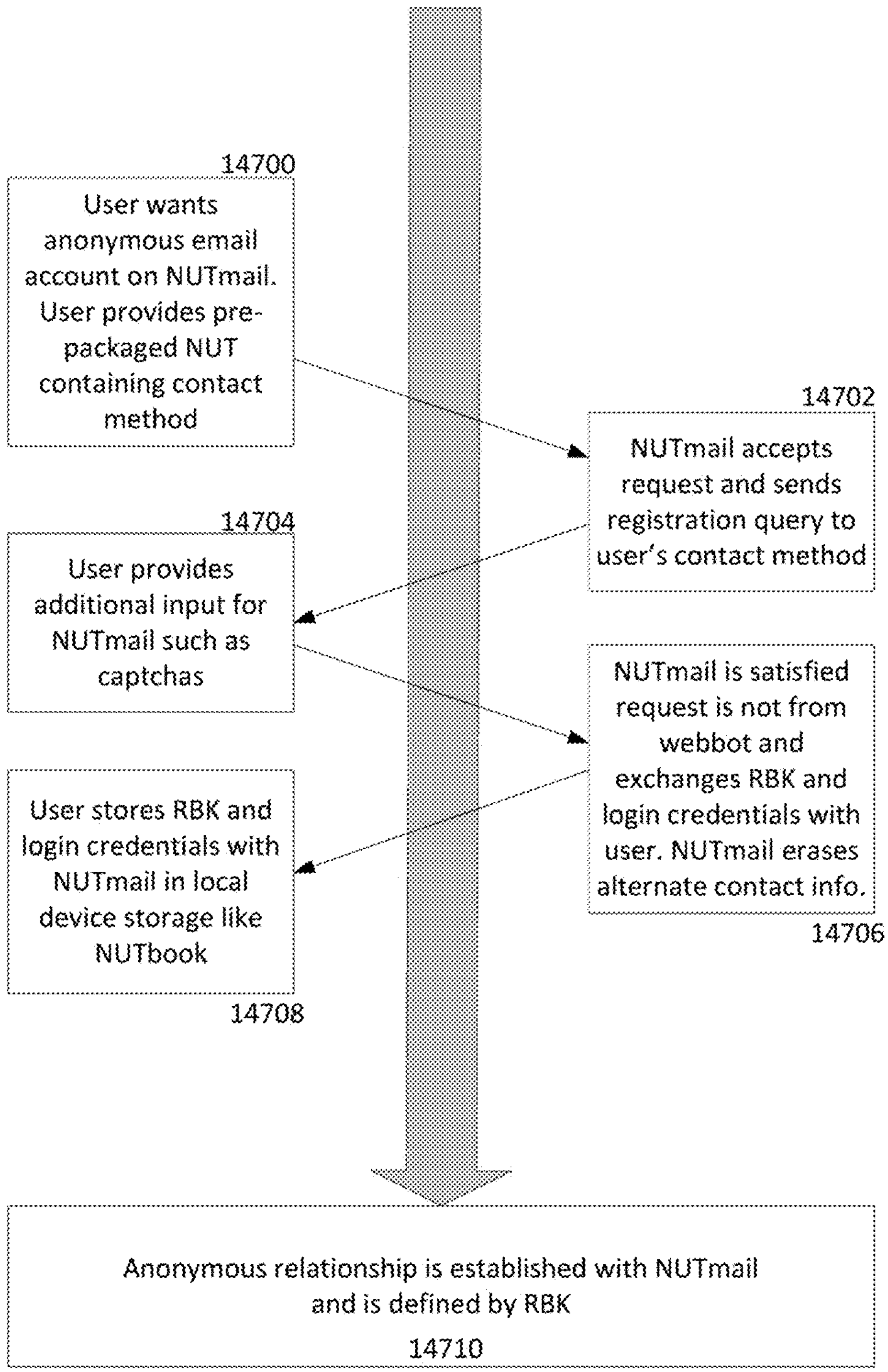

FIG. 147 charts the sequence of events in automated registration process to an anonymous email service such as NUTmail using RBKs.

Figure 148:
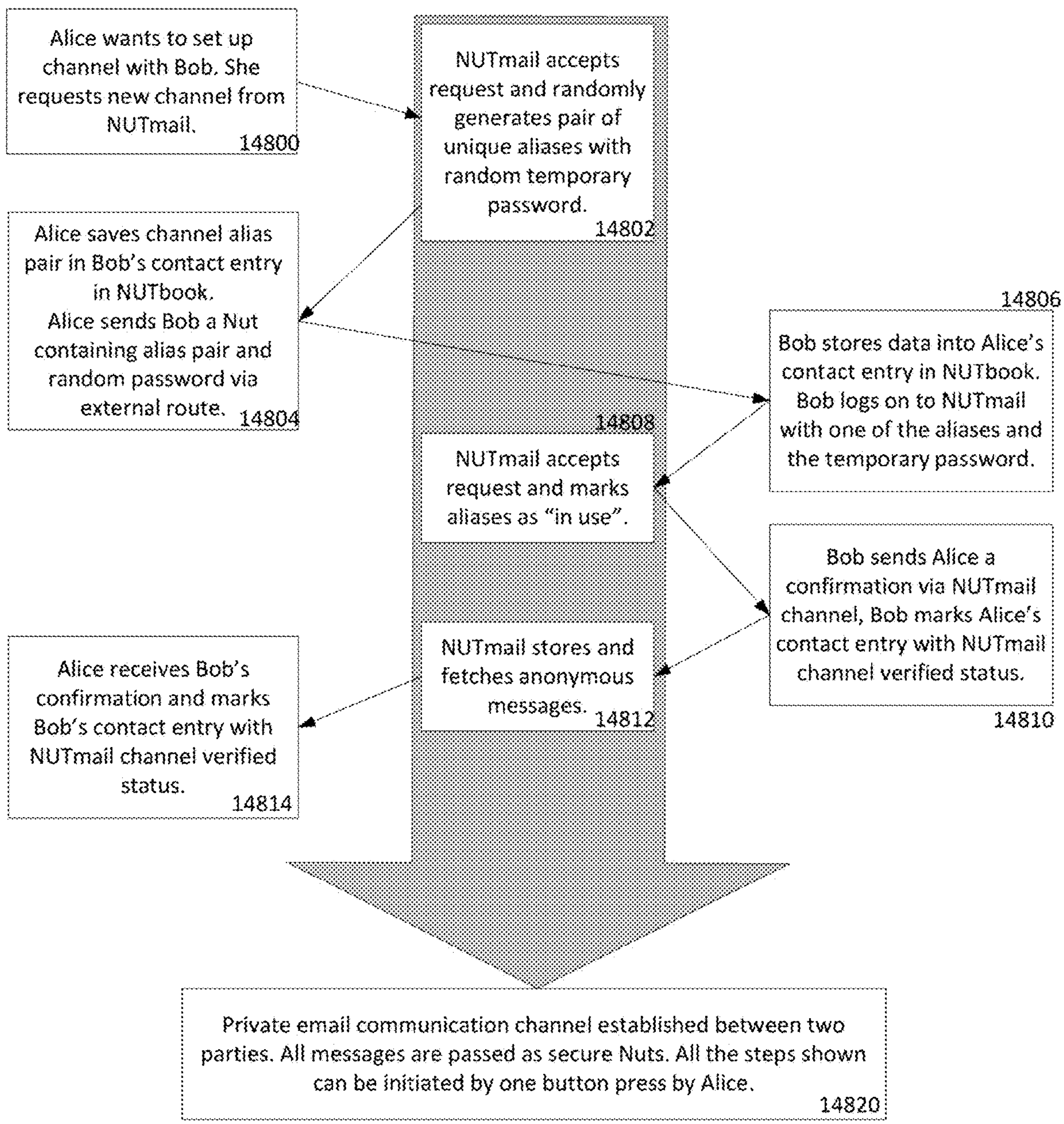

FIG. 148 charts the sequence of events when adding a communication channel in a NUTmail Server.

Figure 149:
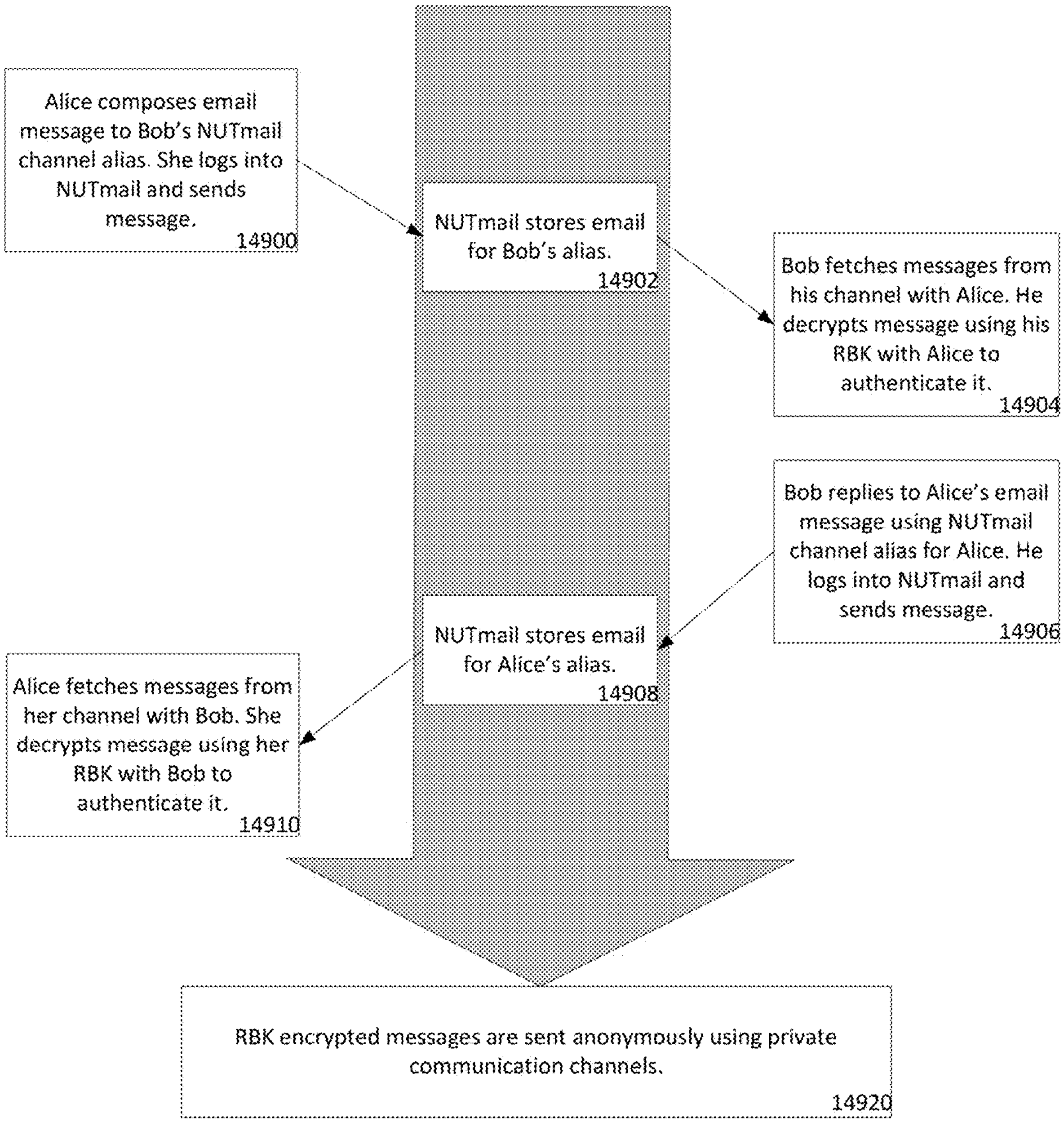

FIG. 149 charts the sequence of events when Alice and Bob send emails to each other via NUTmail.

Figure 150:
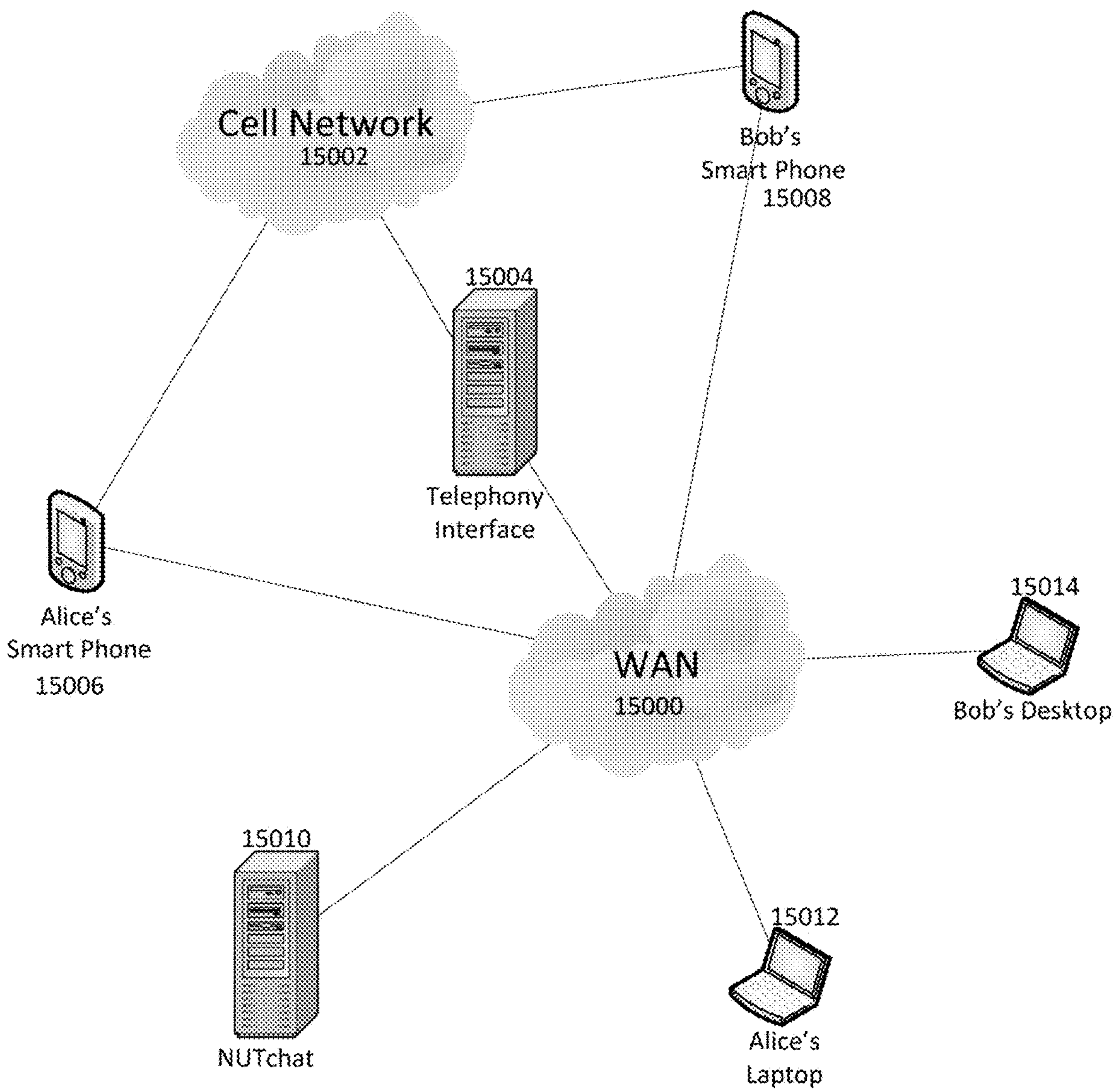

FIG. 150 shows an illustration of the network layout of a NUTchat Server.

Figure 151:
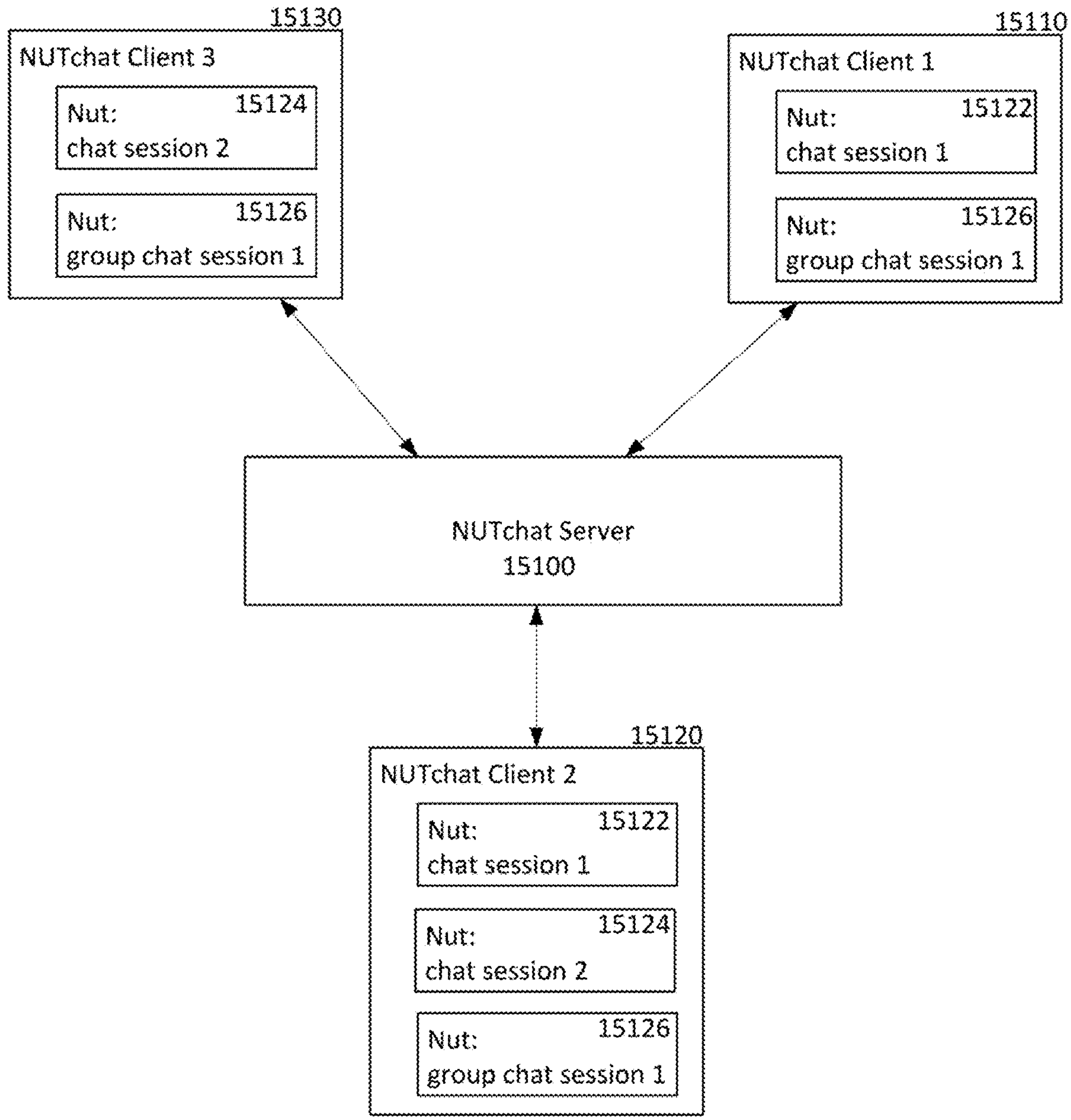

FIG. 151 shows a data flow diagram of three chat sessions hosted by a NUTchat Server.

Figure 152:
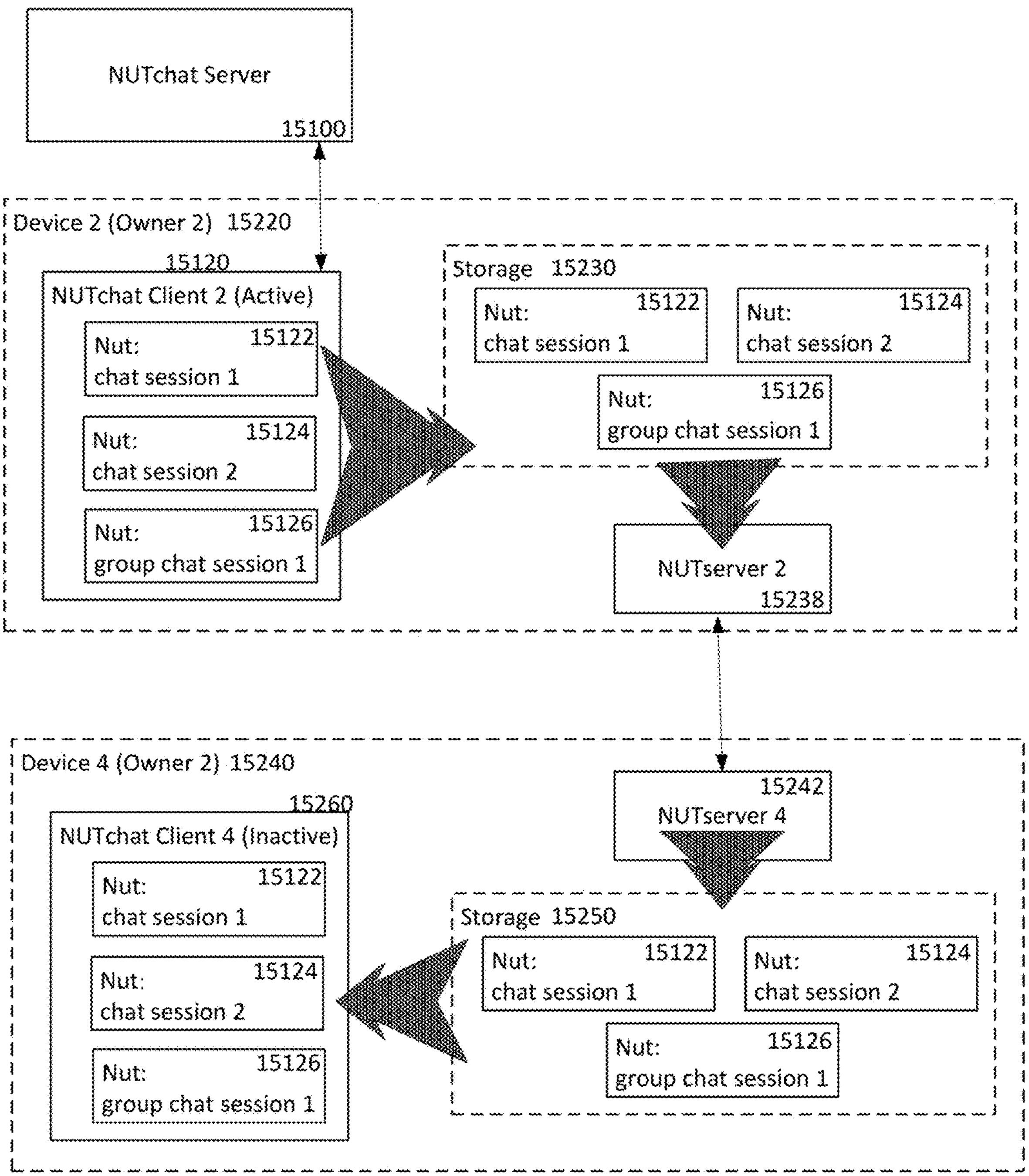

FIG. 152 shows a data flow diagram of chat history persistence and replication across NUTservers.

Figure 153:
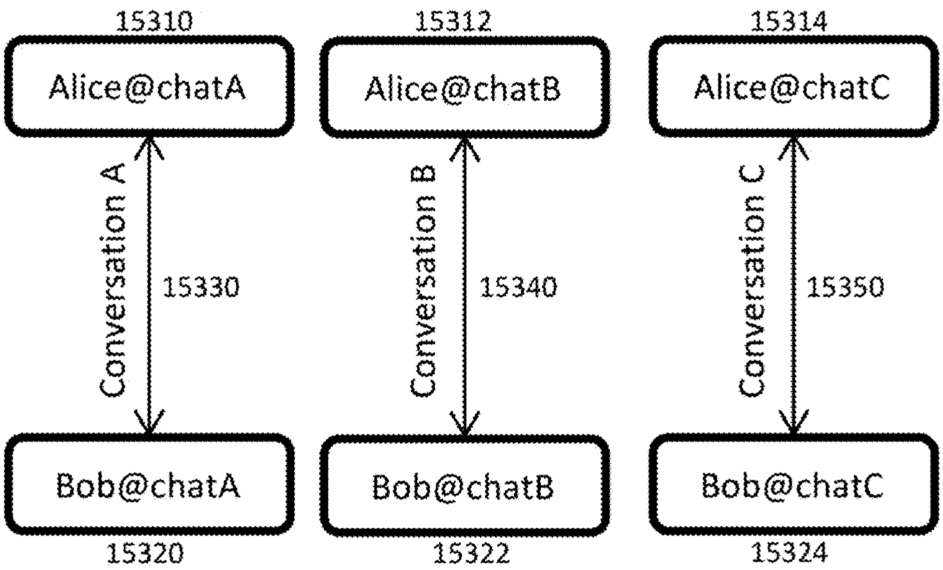

FIG. 153 shows a data flow diagram for three separate chat sessions using different chat IDs or chat services.

Figure 154:
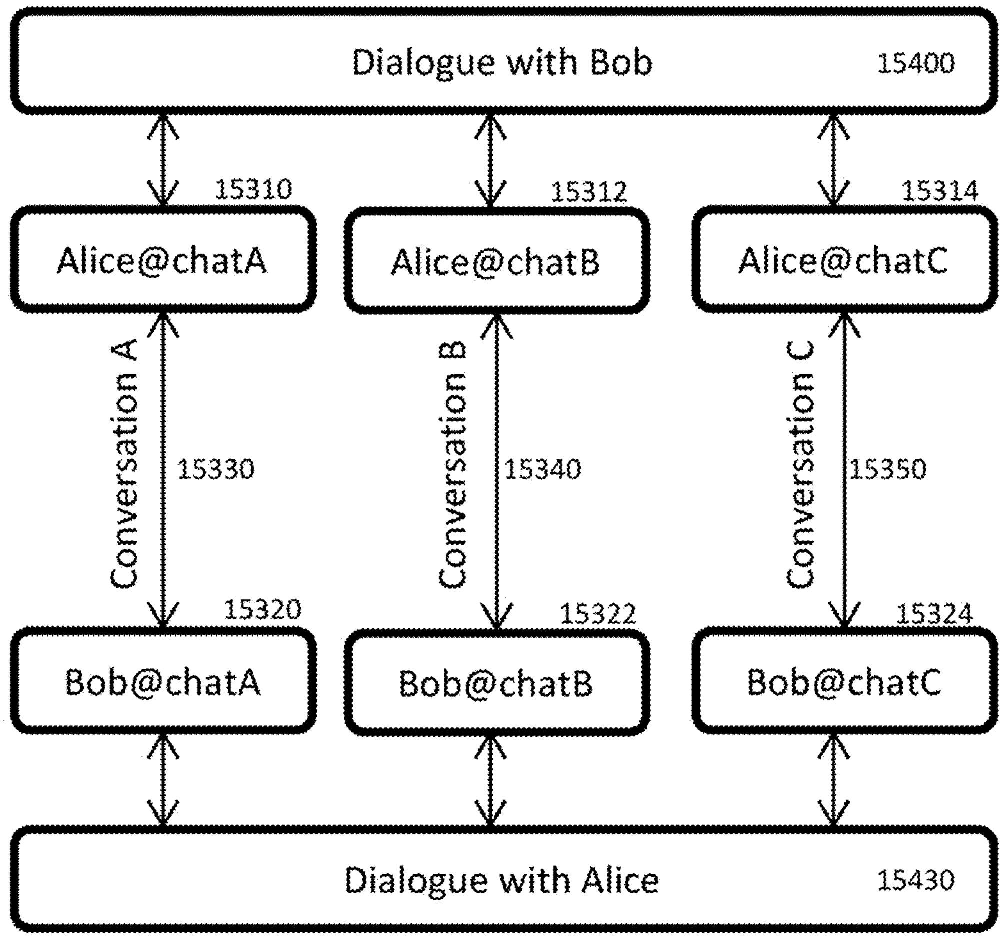

FIG. 154 shows a data flow diagram for a path agnostic Dialogue managed by a NUTchat client using three different chat pathways from FIG. 153.

Figure 155:
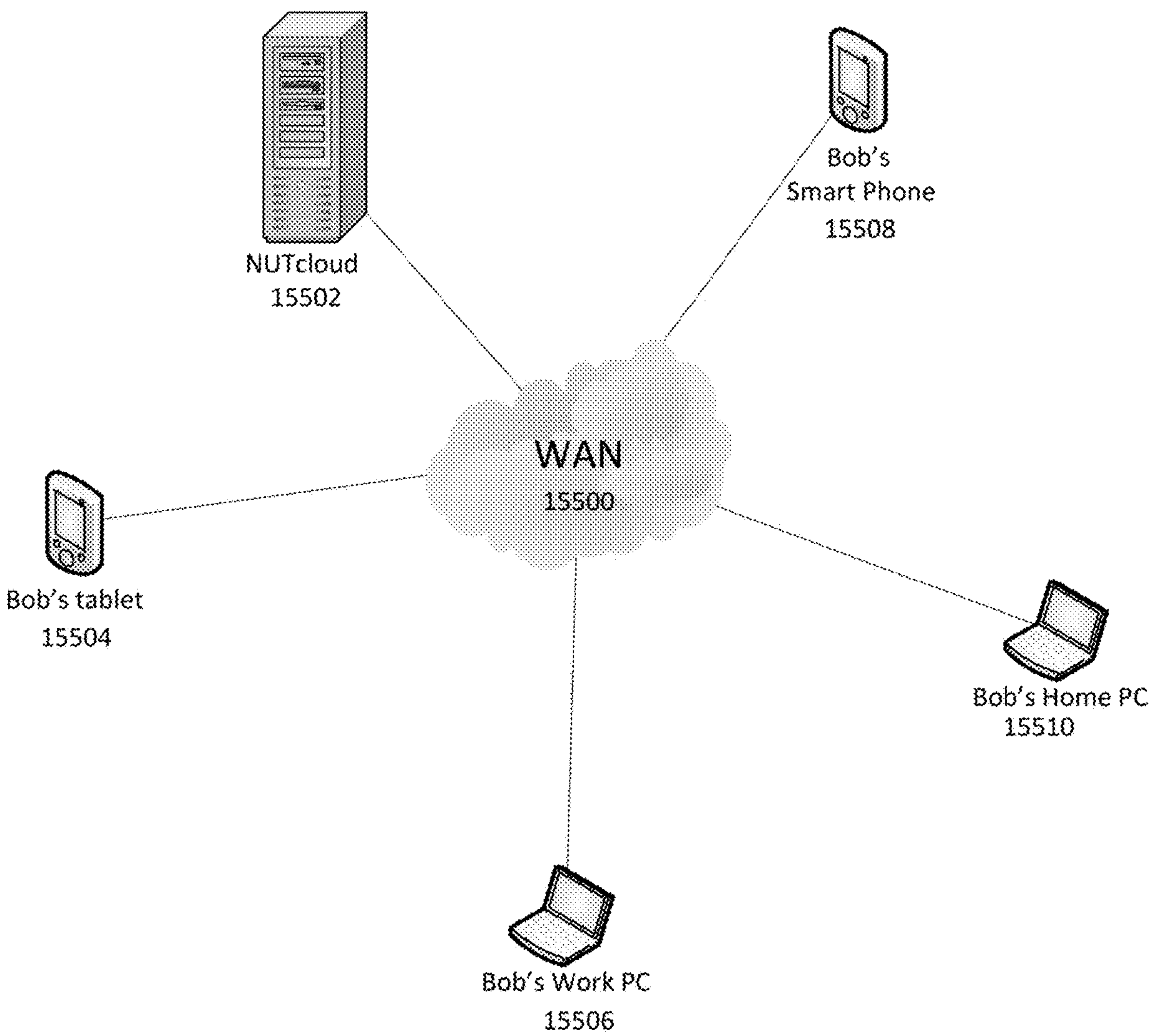

FIG. 155 shows an illustration of the network layout of a NUTcloud Server.

Figure 156:
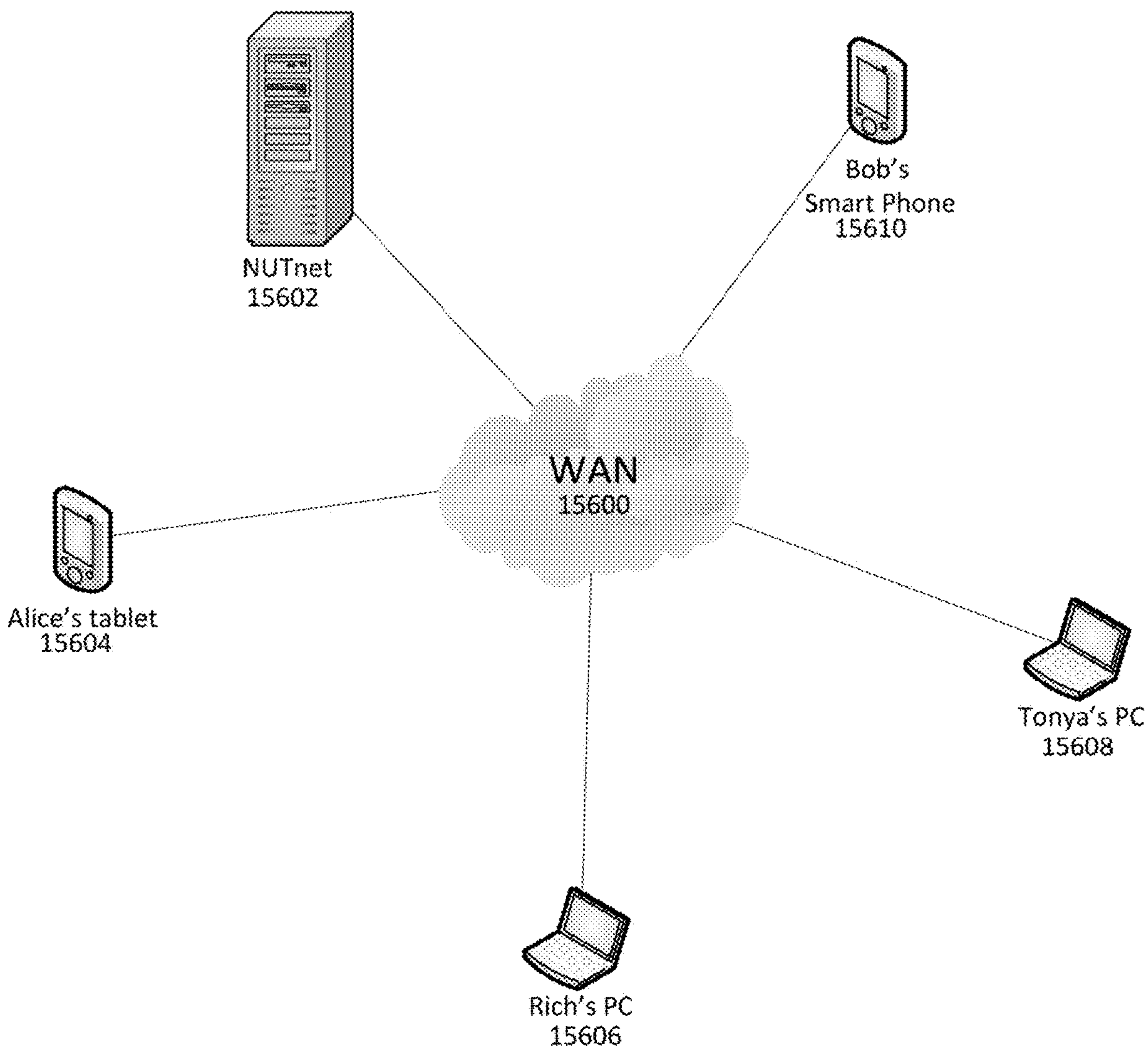

FIG. 156 shows an illustration of the network layout of a NUTnet Server.

Figure 157:
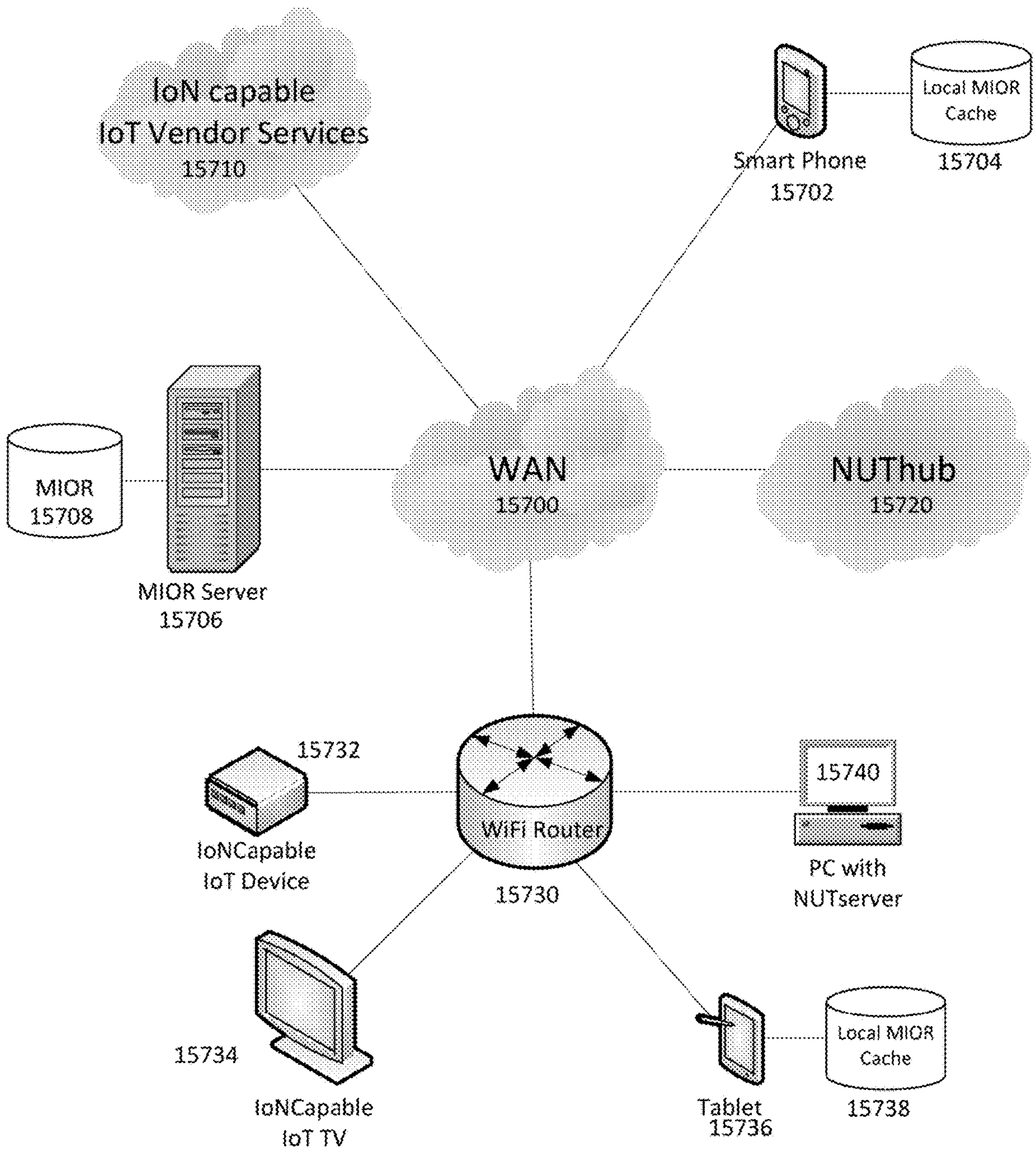

FIG. 157 shows an illustration of the network layout of a NUThub Server for the Internet of NUTS (IoN).

Figure 158:
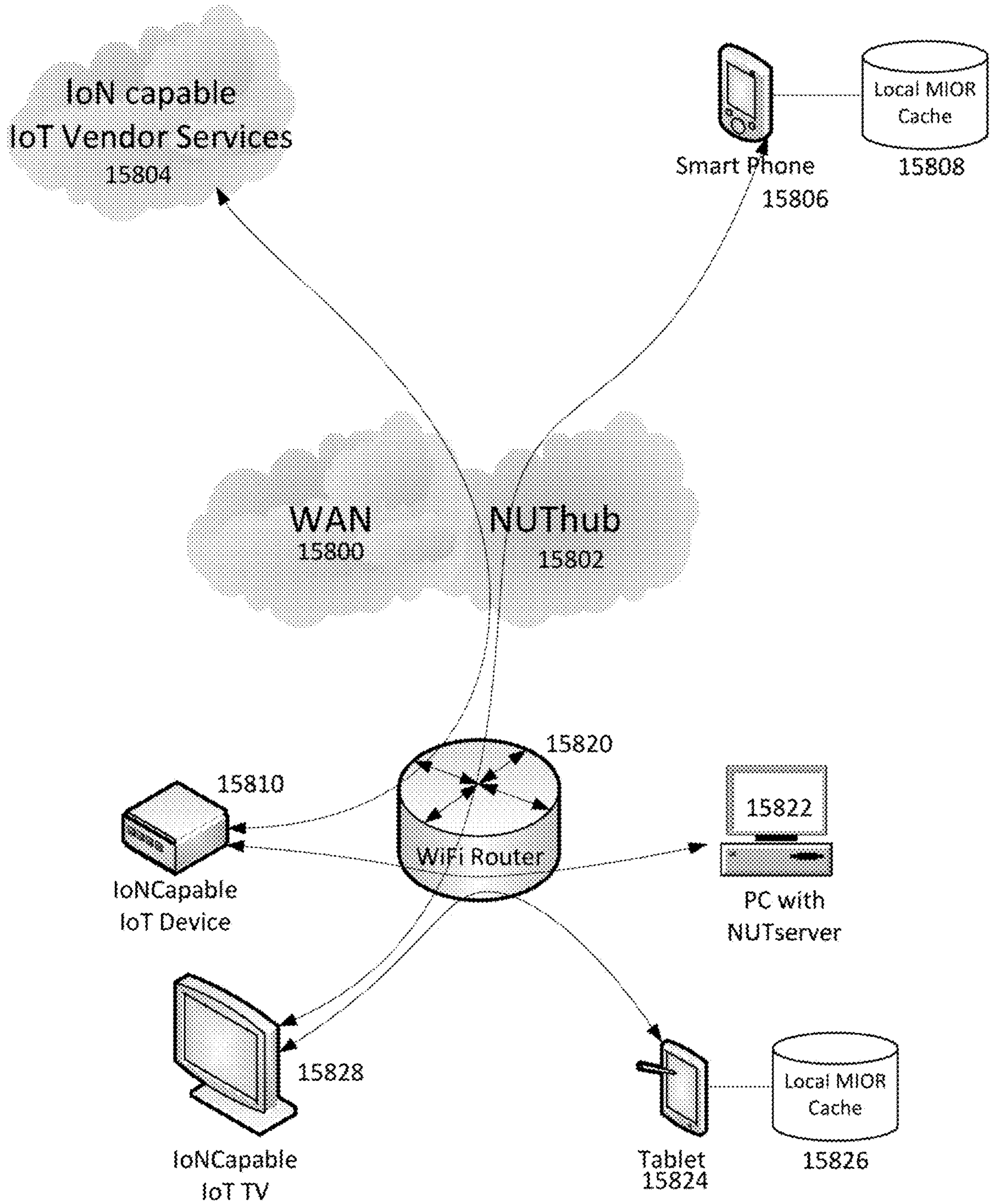

FIG. 158 shows an illustration of a Direct IoN network topology.

Figure 159:
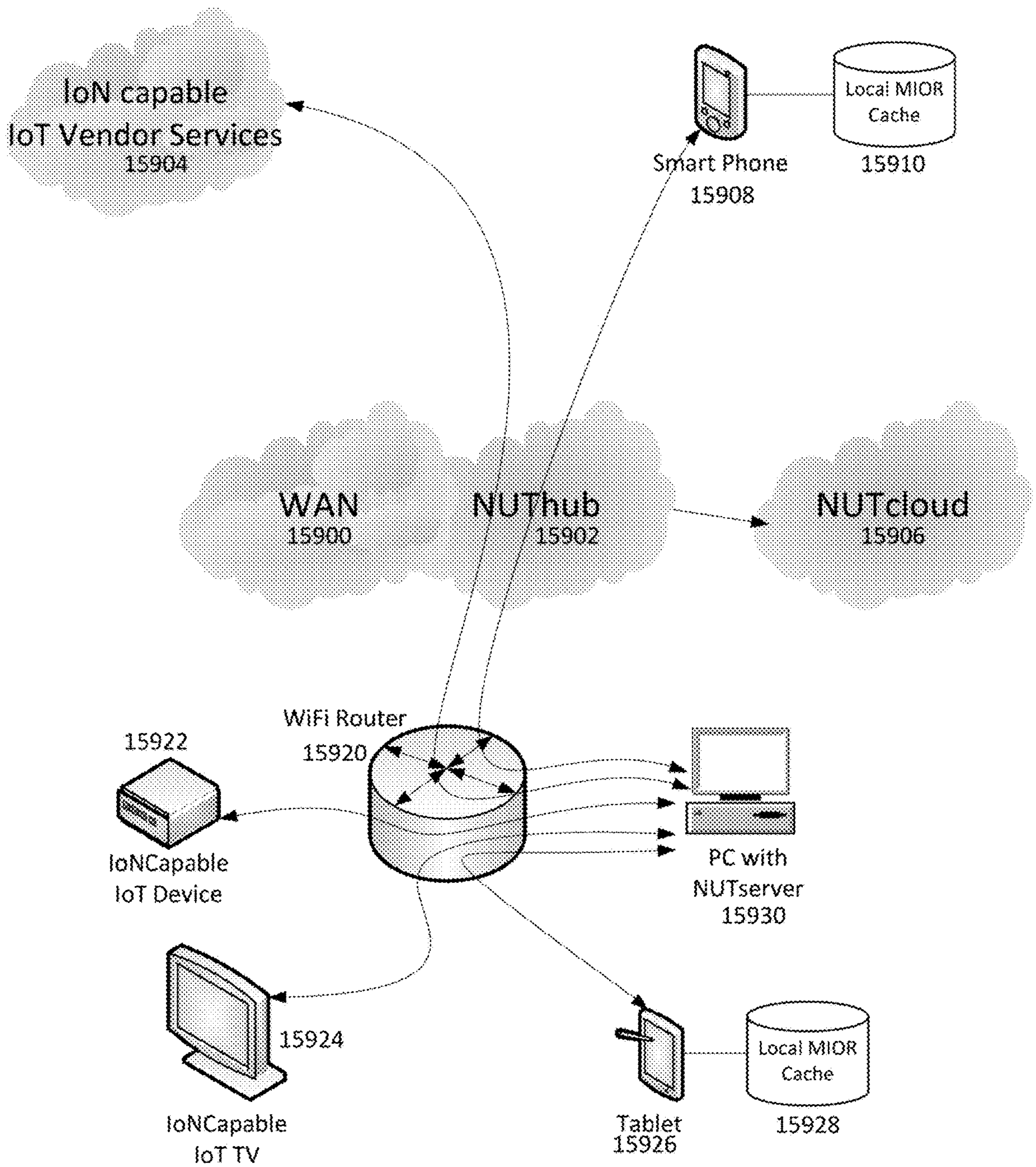

FIG. 159 shows an illustration of an Indirect IoN network topology.

Figure 160:
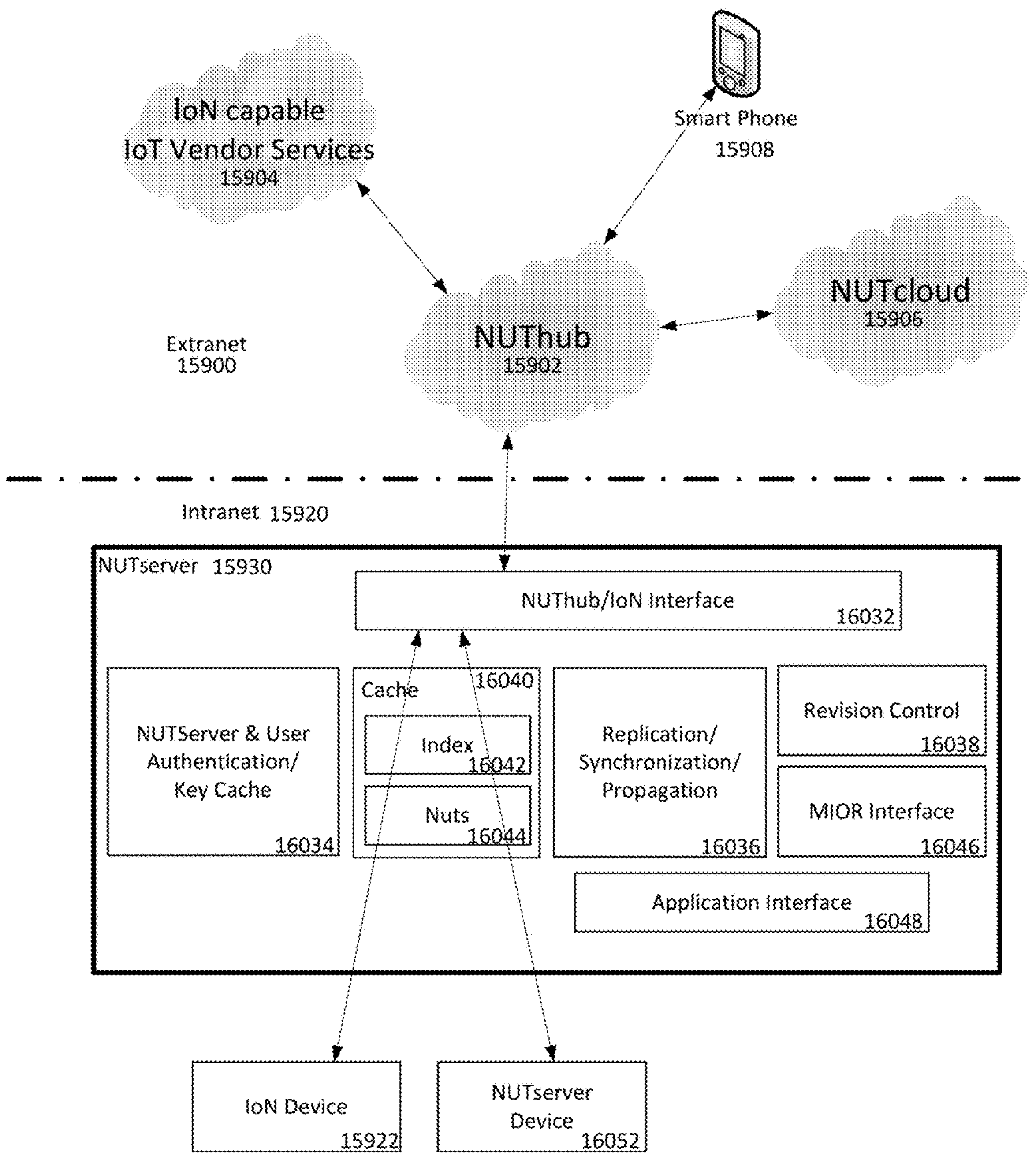

FIG. 160 shows an illustration of a NUTserver hub and its connections to the NUThub and IoN devices from FIG. 159.

Figure 161:
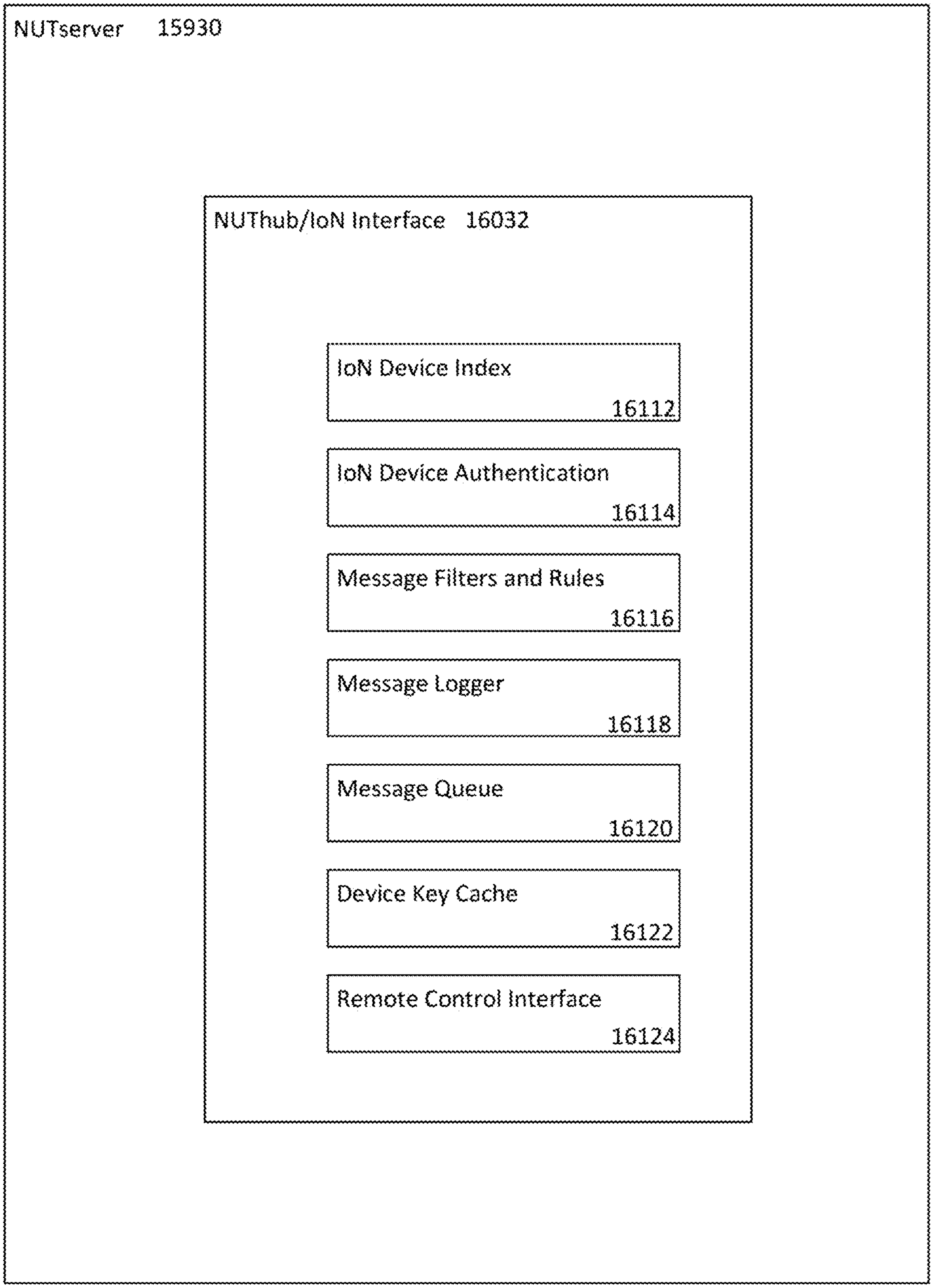

FIG. 161 shows a block diagram of the NUThub/IoN Interface in a NUTserver hub from FIG. 160.

Figure 162:
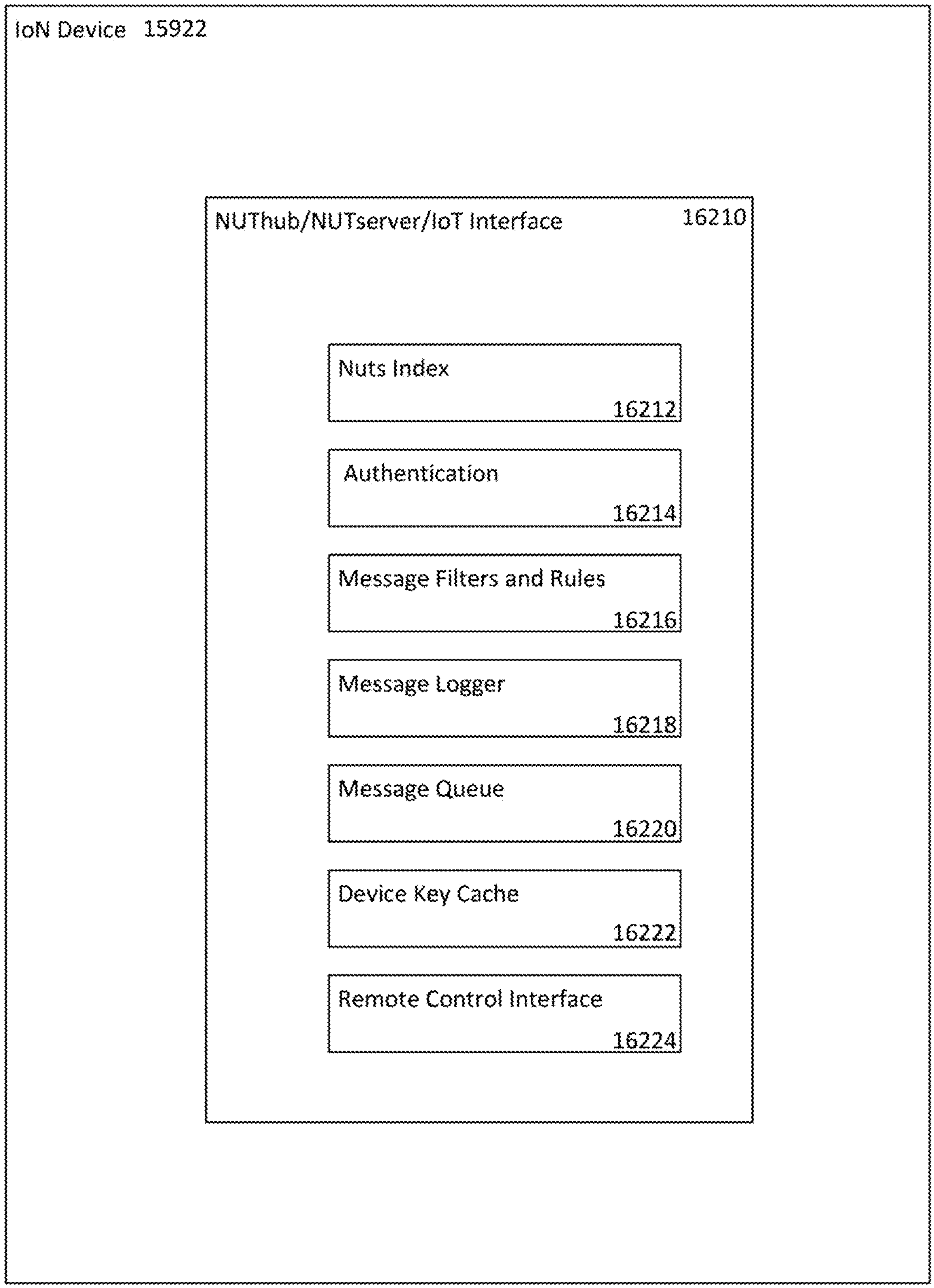

FIG. 162 shows a block diagram of the NUThub/NUTserver/IoT Interface in an IoN Device from FIG. 160.

Figure 163:
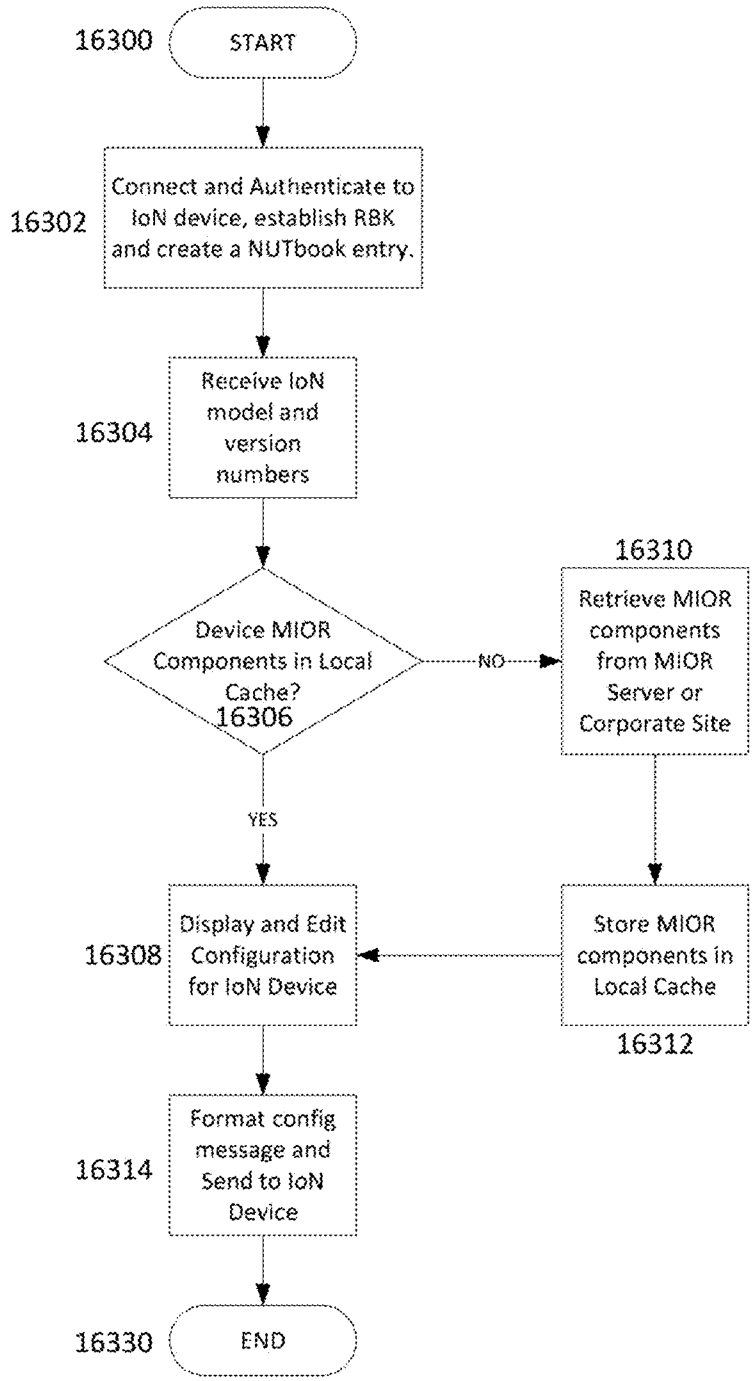

FIG. 163 shows a flowchart of the registration and configuration process for IoN/IoT devices.

Figure 164:
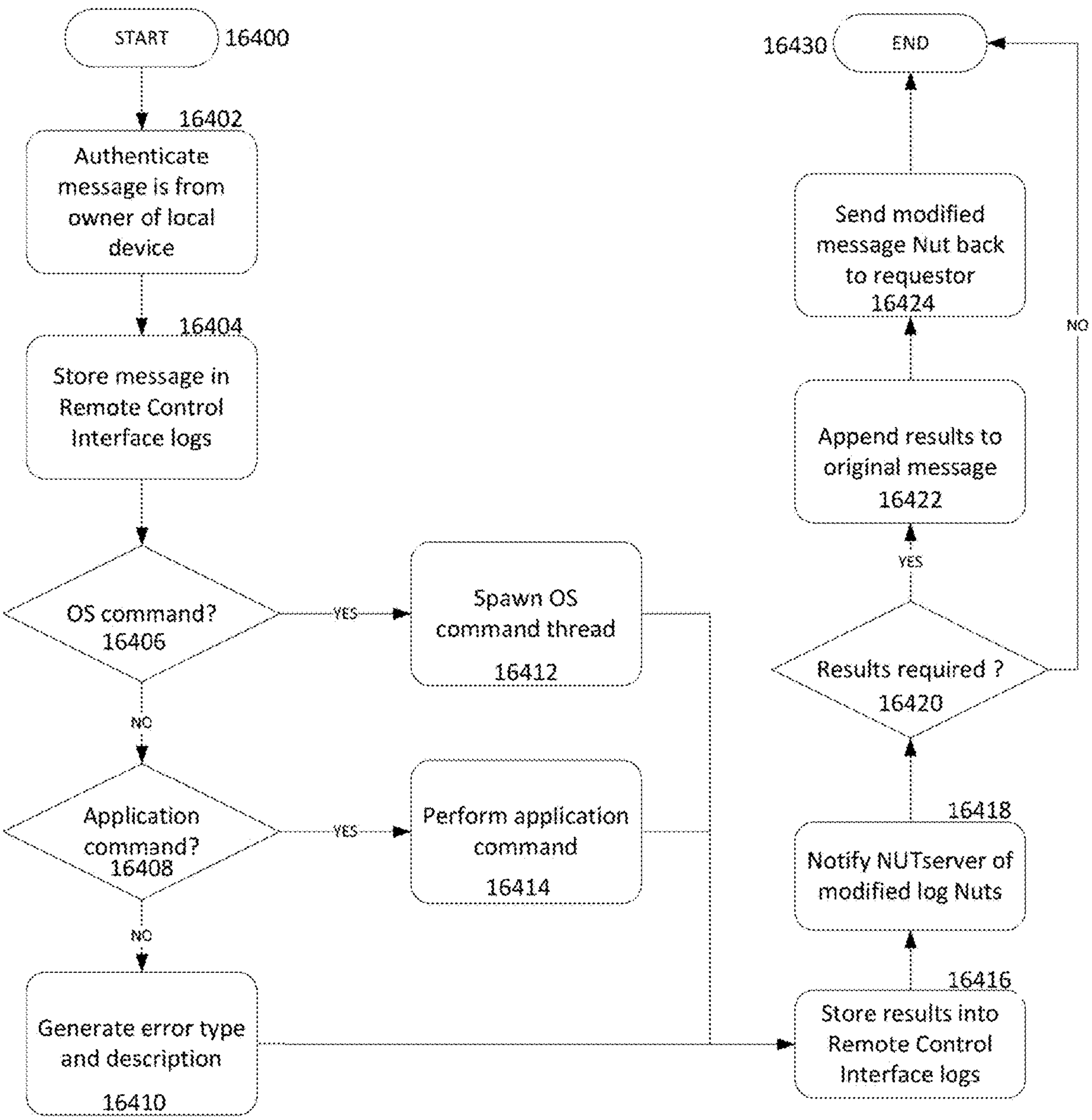

FIG. 164 shows a flowchart of how the Remote Control Interface may process Command Nuts from FIG. 161 and FIG. 162.

Figure 165:
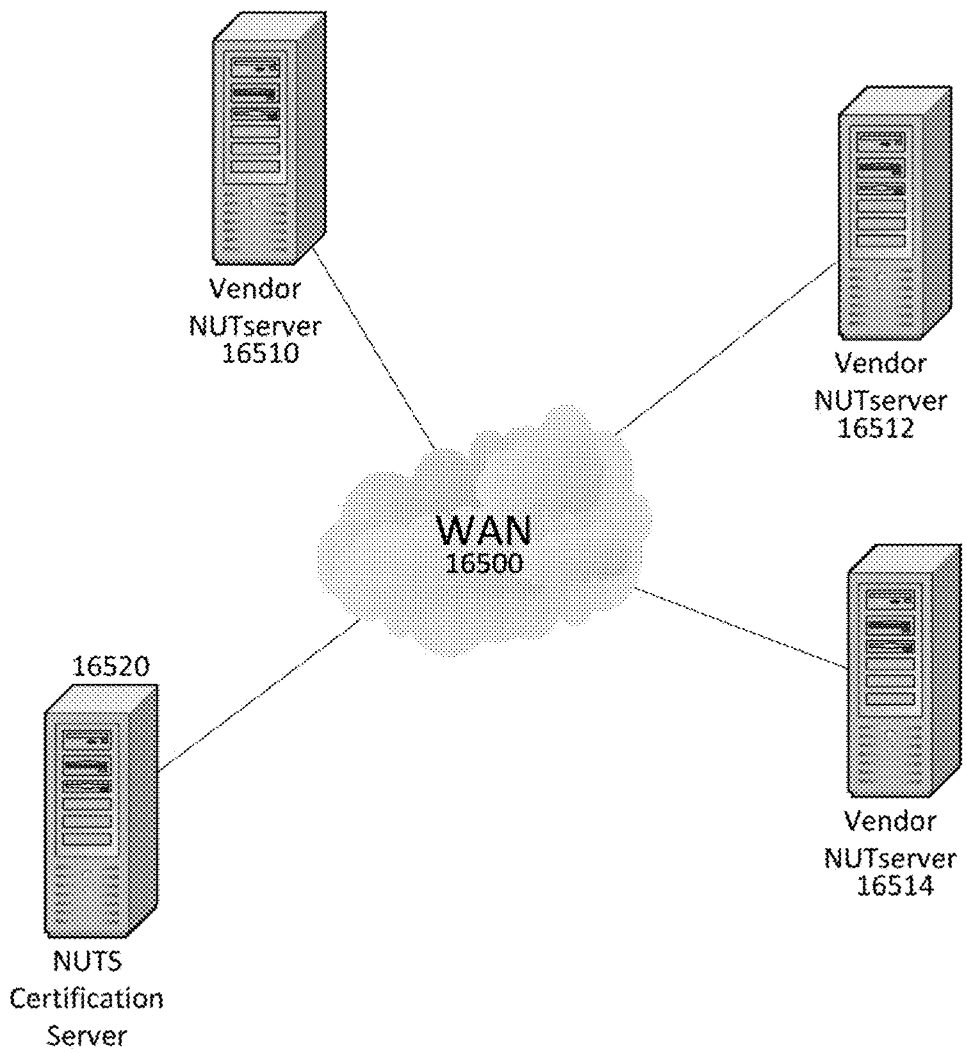

FIG. 165 shows an illustration of the network layout of a NUTS Certification Server.

Figure 166:
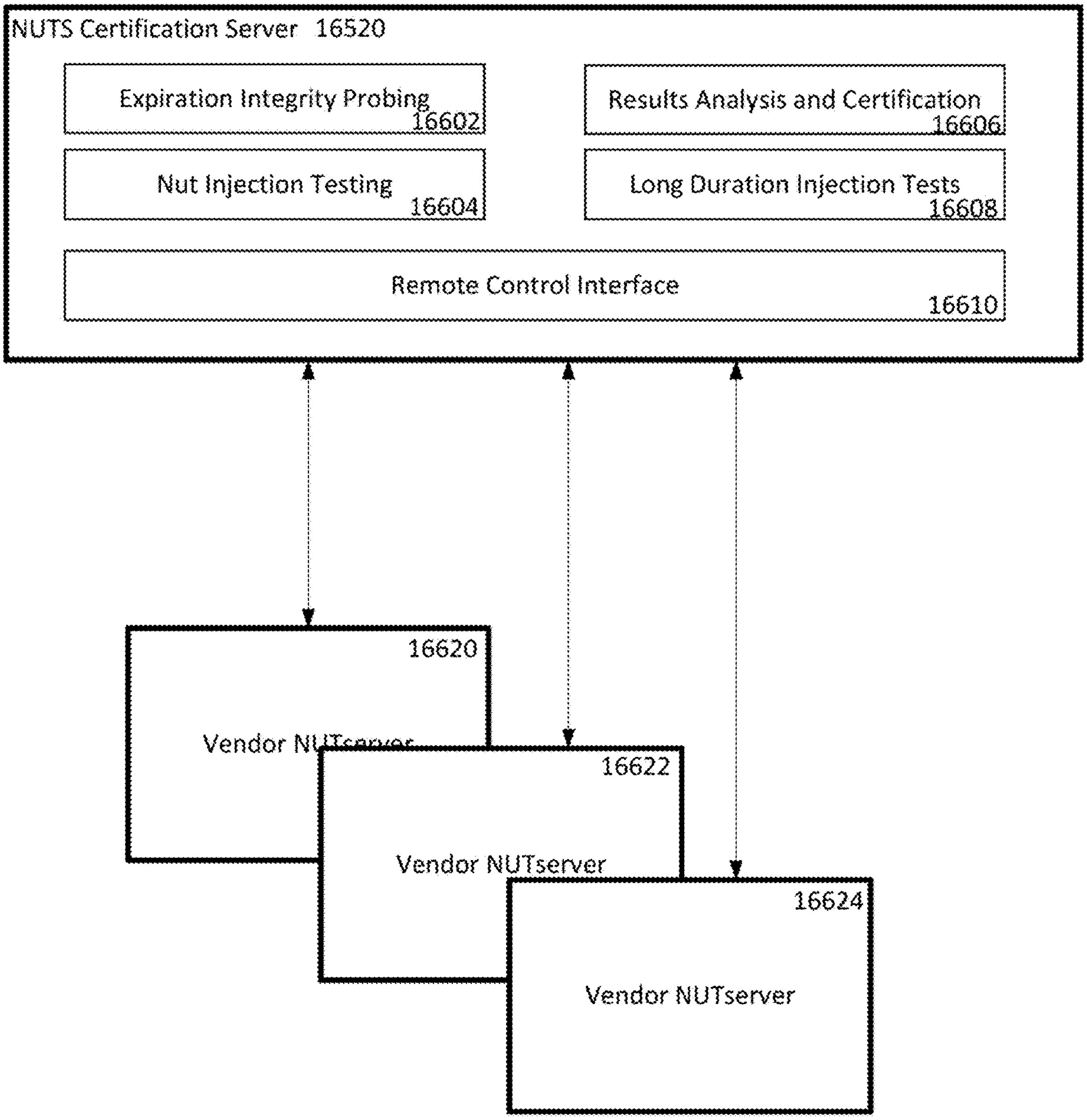

FIG. 166 shows a block diagram highlighting the functionalities of a NUTS Certification Server from FIG. 165.

Figure 167:
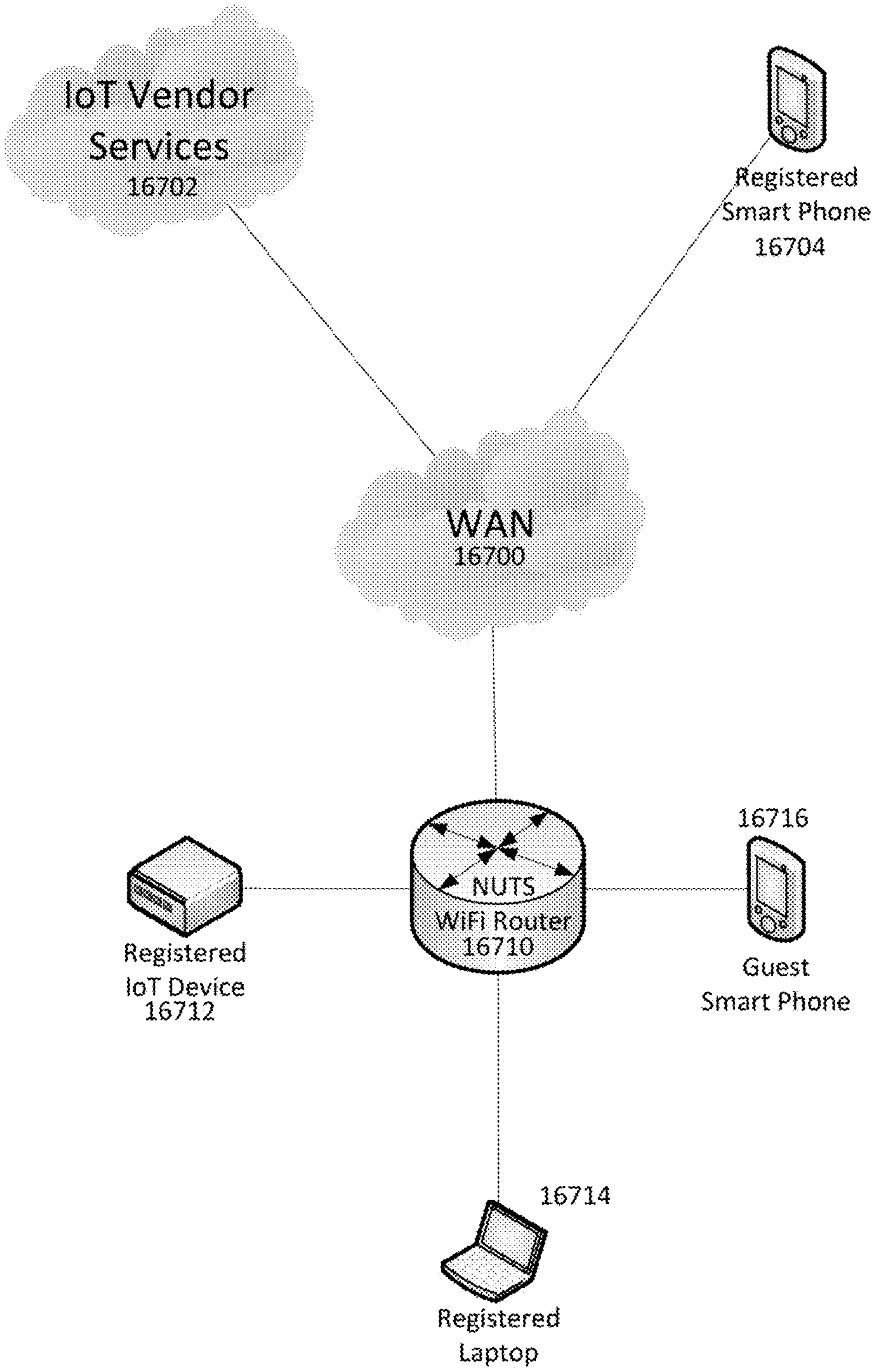

FIG. 167 shows an illustration of the network layout of a NUTS Based WiFi/Ethernet router.

Figure 168:
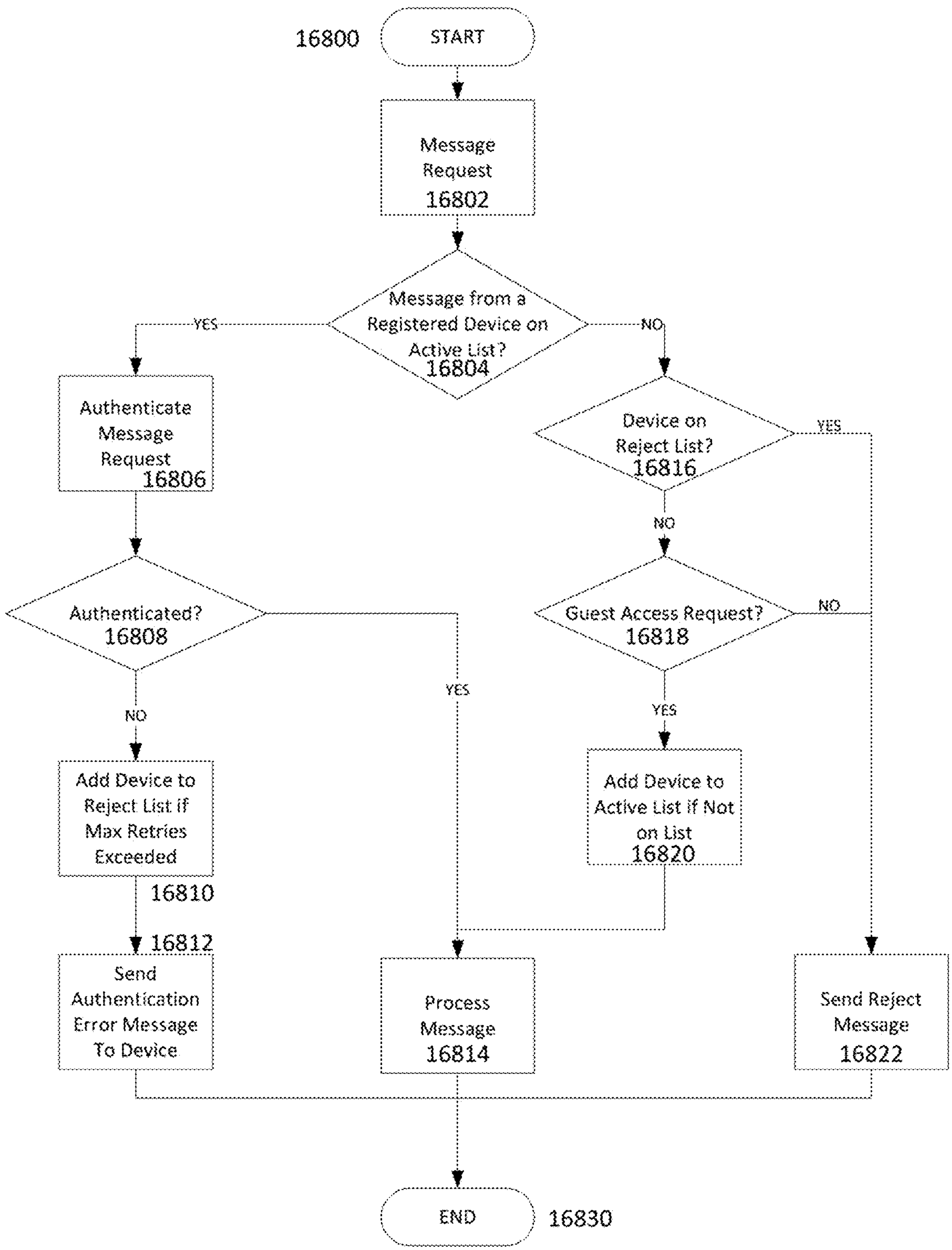

FIG. 168 shows a flowchart of how messages may be processed in a NUTS Based WiFi/Ethernet router from FIG. 167.

FIG. 169 shows a table of device categories for a NUTS Based WiFi/Ethernet router.

FIG. 170 shows a table of example device category attributes on a NUTS Based WiFi/Ethernet router.

Figure 171:
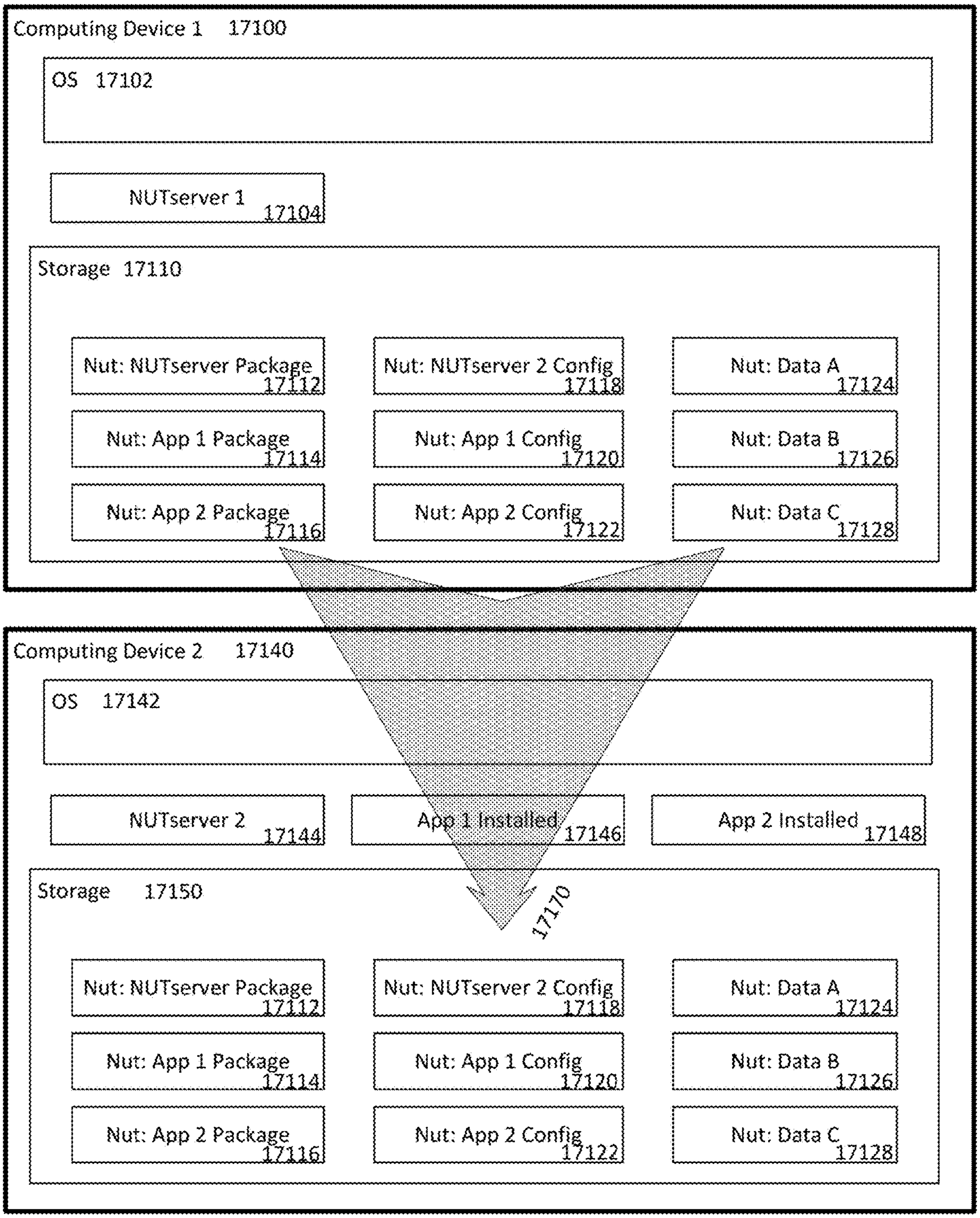

FIG. 171 shows a block diagram of how Application Wrapping enables device backups and duplication in an automated manner.

Figure 172:
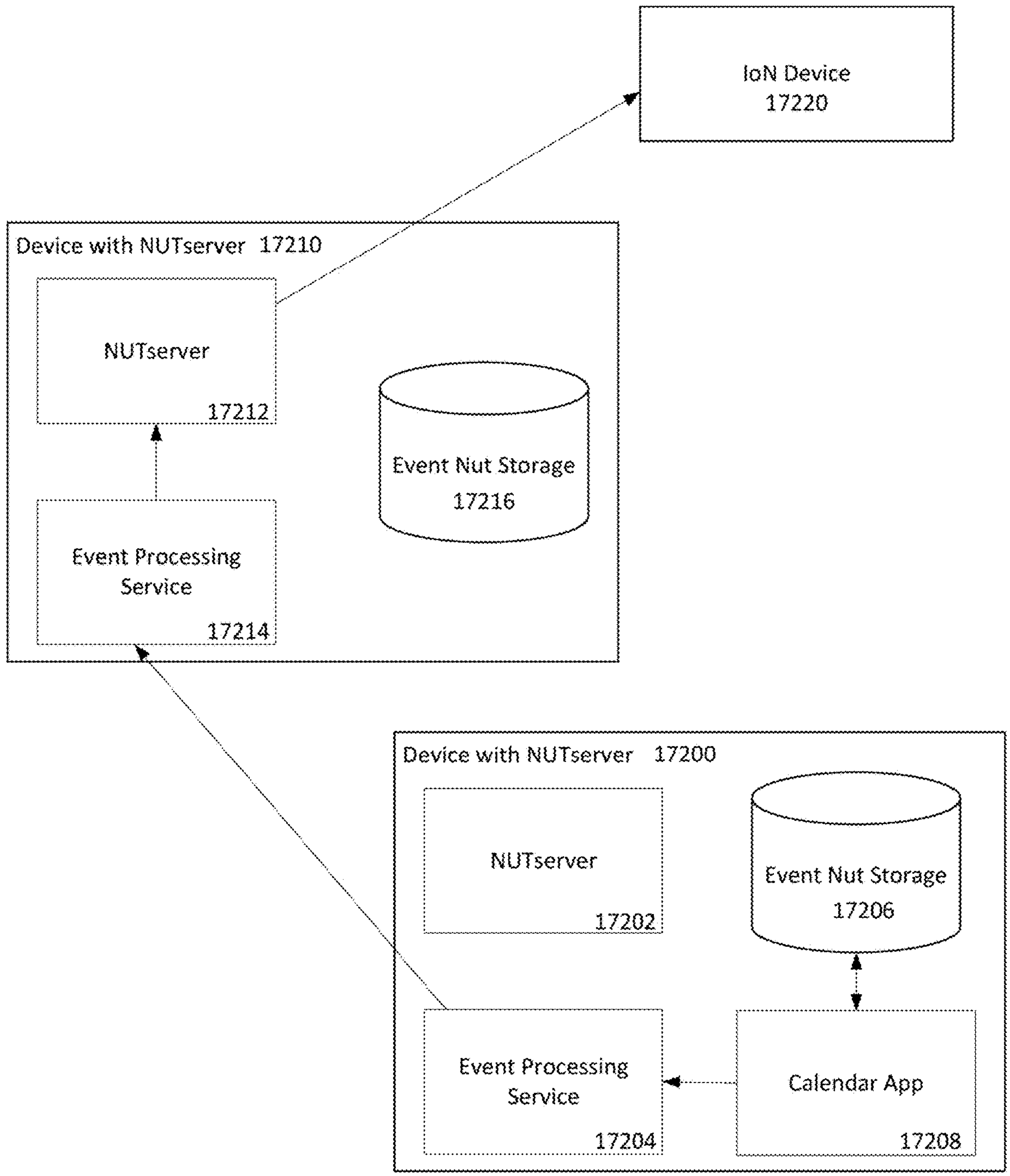

FIG. 172 shows a block diagram of the Event Processing Service (EPS) in two devices.

Figure 173:
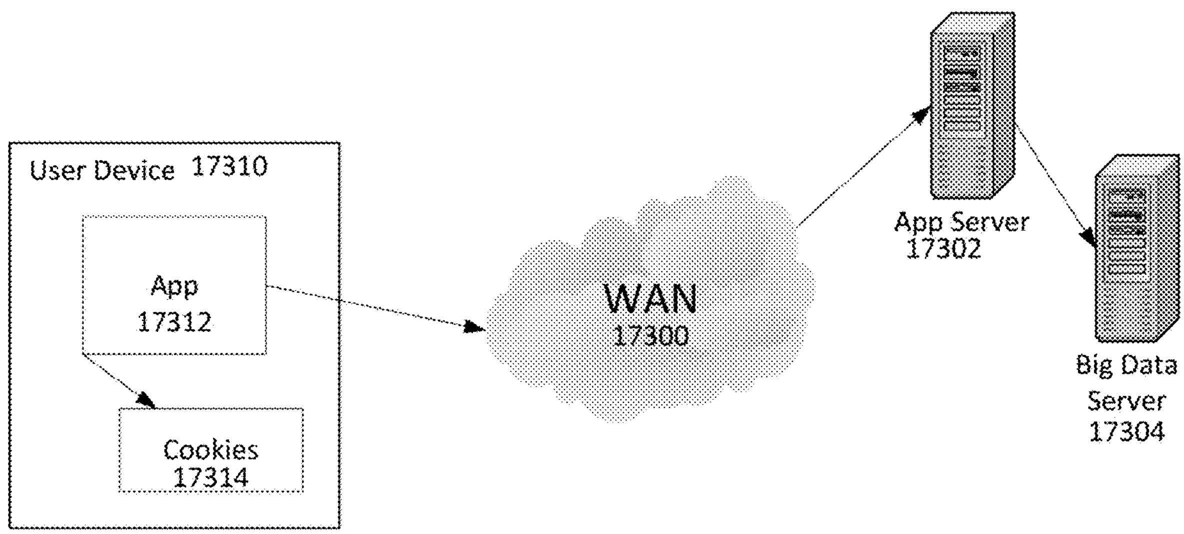

FIG. 173 shows a block diagram of a typical vendor network setup which may use tracking cookies and session histories stored on Big Data servers.

Figure 174:
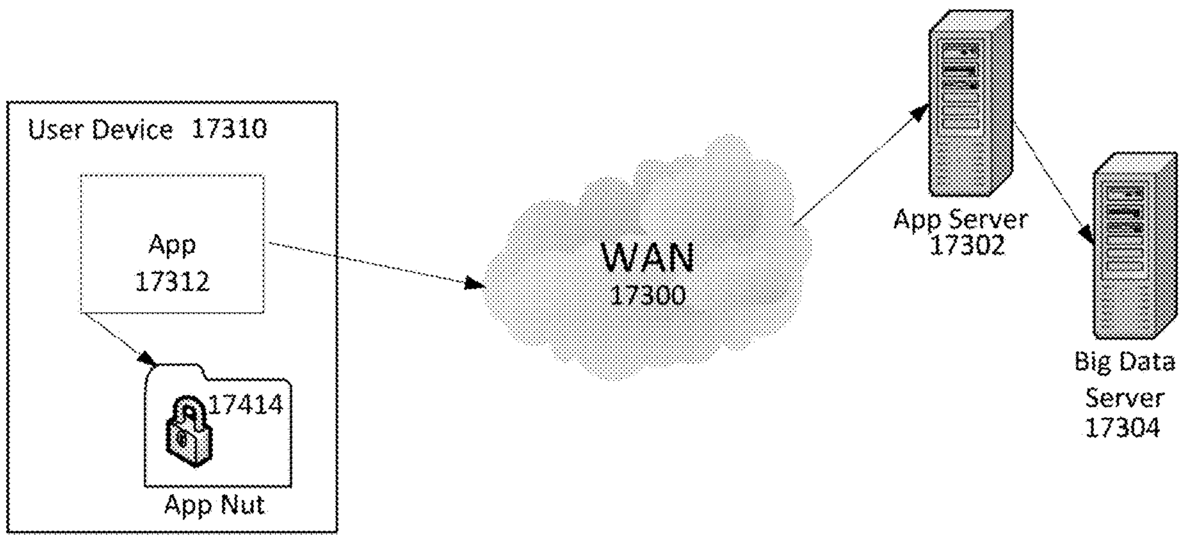

FIG. 174 shows a block diagram of a vendor network setup which may use App Nuts to record a copy of session histories locally as well as being stored on Big Data servers from FIG. 173.

Figure 175:
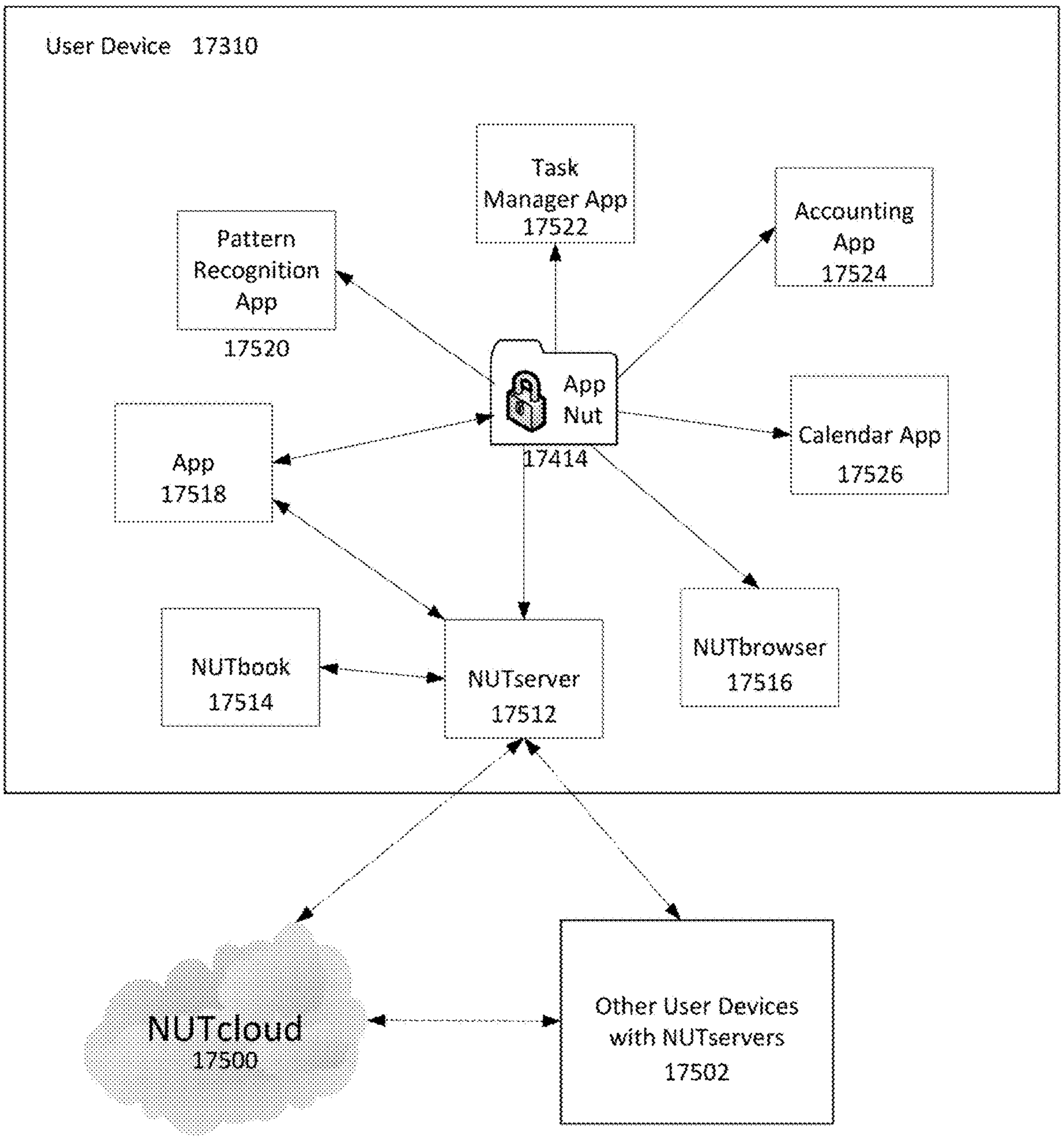

FIG. 175 shows a block diagram of the Contextual Computing that may be done locally utilizing the App Nut from FIG. 173 and FIG. 174.

Figure 176:
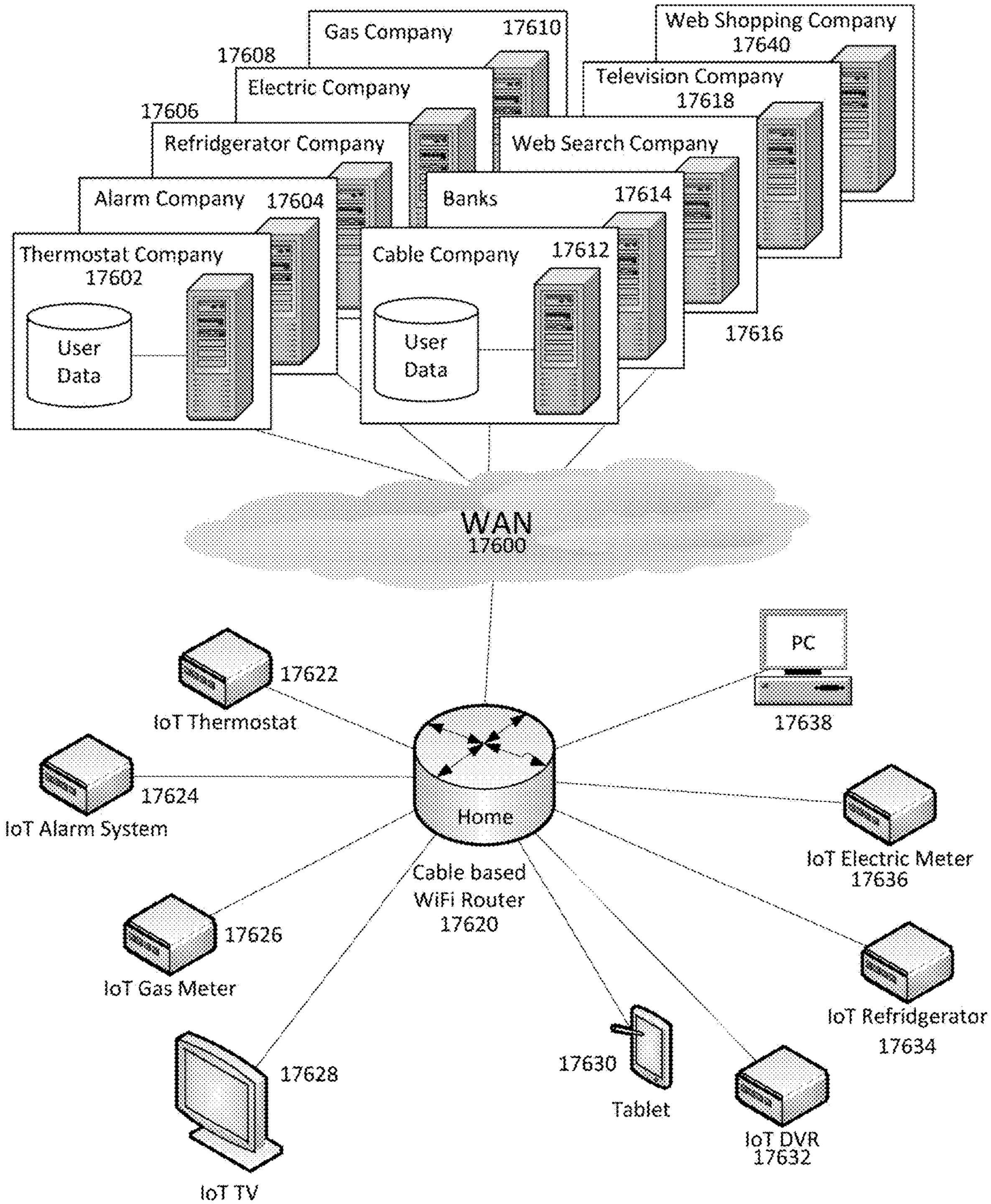

FIG. 176 shows an illustration of a personal home network topology comprising IoT devices and service providers.

Figure 177:
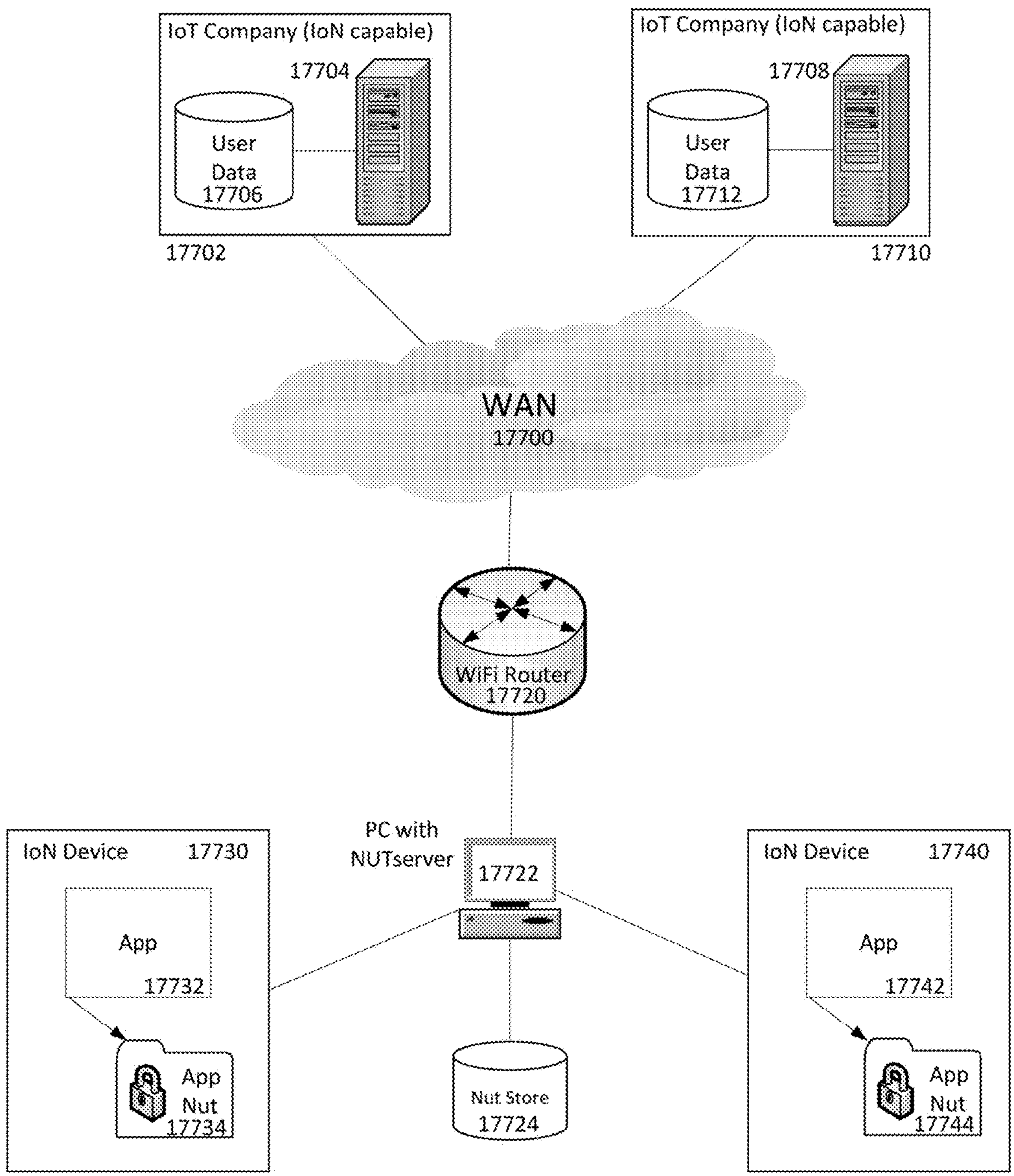

FIG. 177 shows an illustration of a personal home network comprising two IoN devices and their respective service providers in an Indirect IoN network topology to control the flow of data going out to the vendors.

Figure 178:
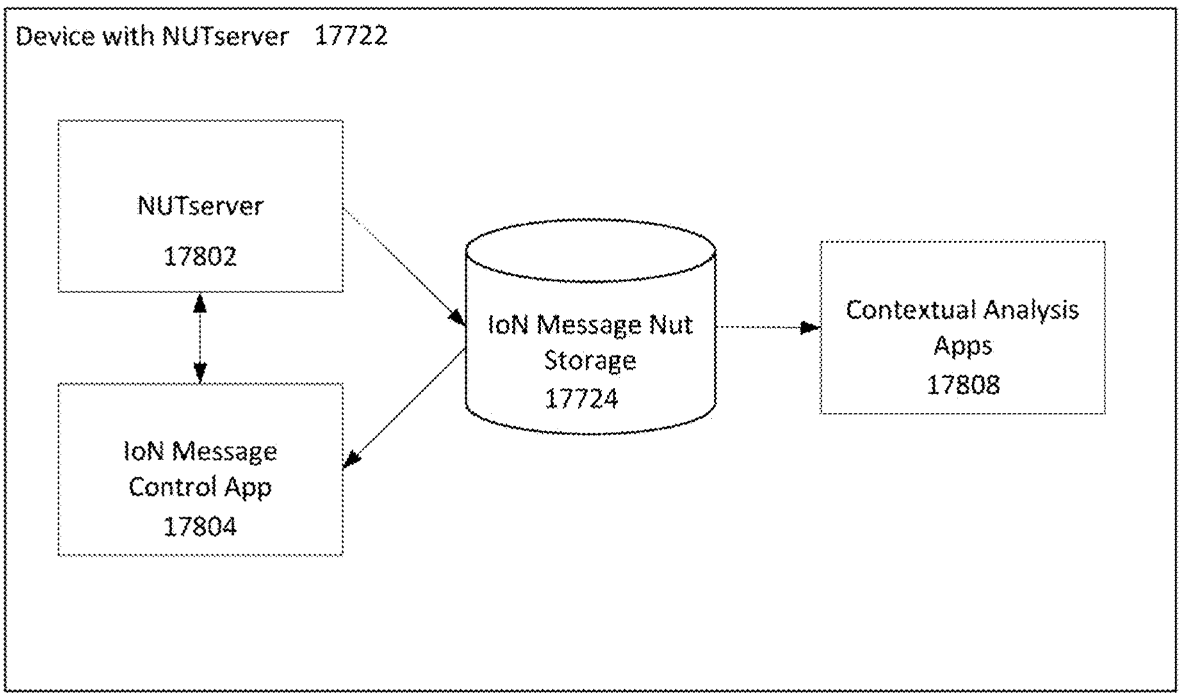

FIG. 178 shows a block diagram of how Contextual Analysis Apps may automatically filter outgoing IoN messages to protect the user's privacy in the NUTserver from FIG. 177.

Figure 179:
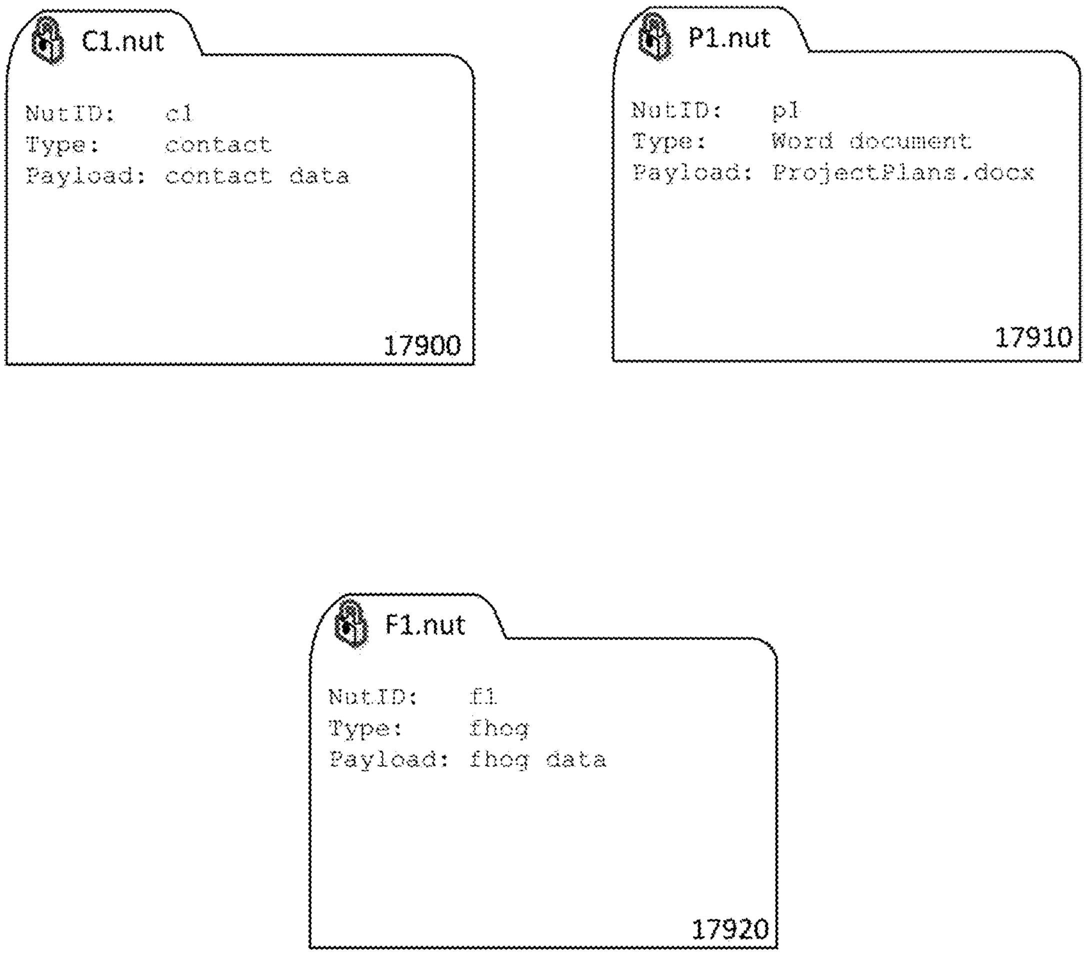

FIG. 179 shows three different nuts holding different payloads.

FIG. 180 shows a FHOG nut containing references to two other FHOG nuts.

Figure 181:
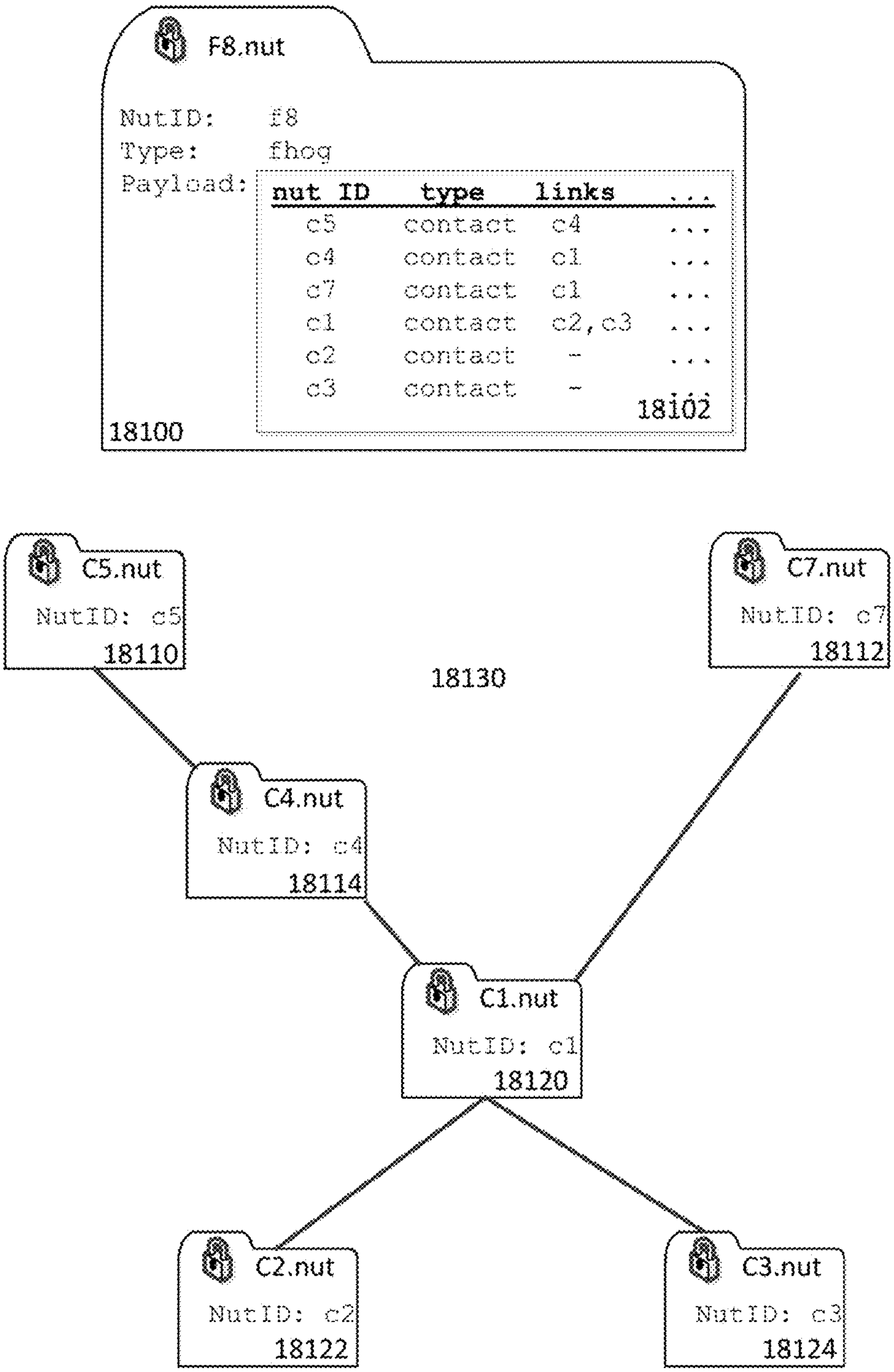

FIG. 181 shows a FHOG nut containing a relationship graph of various contact nuts.

Figure 182:
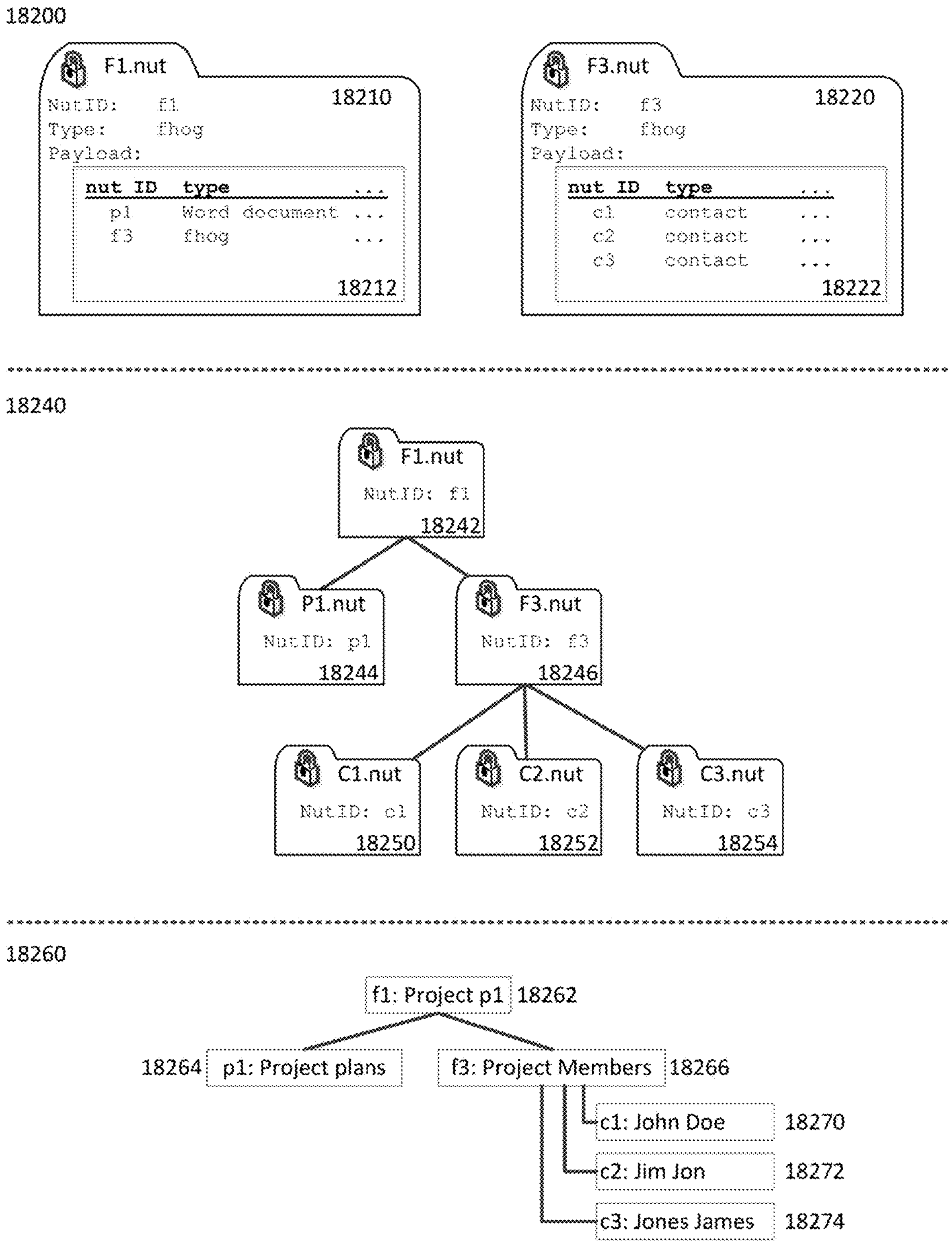

FIG. 182 shows an example of a traversable tree structure derived from a starting FHOG nut.

Figure 183:
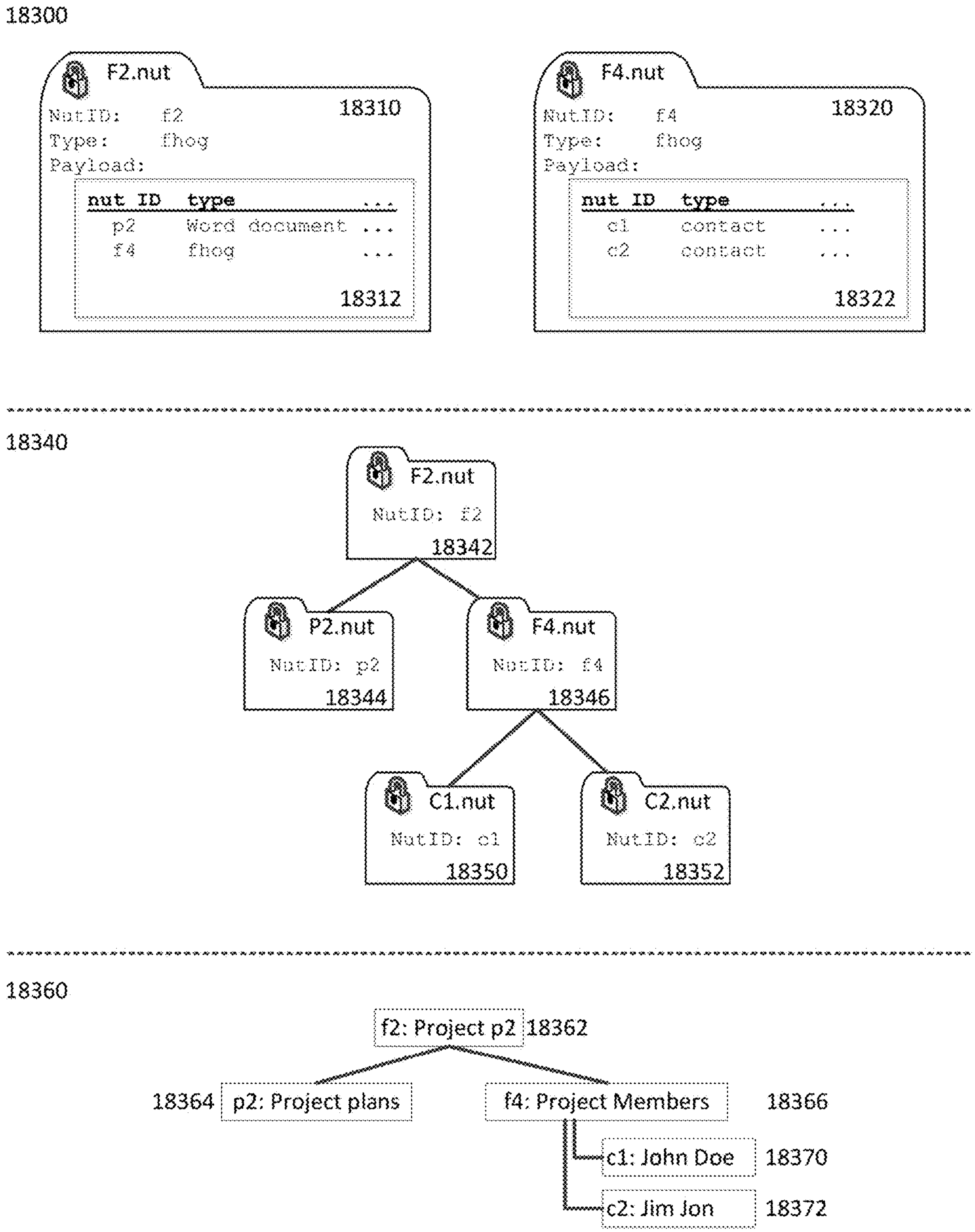

FIG. 183 shows an example of a traversable tree structure derived from a starting FHOG nut.

Figure 184:
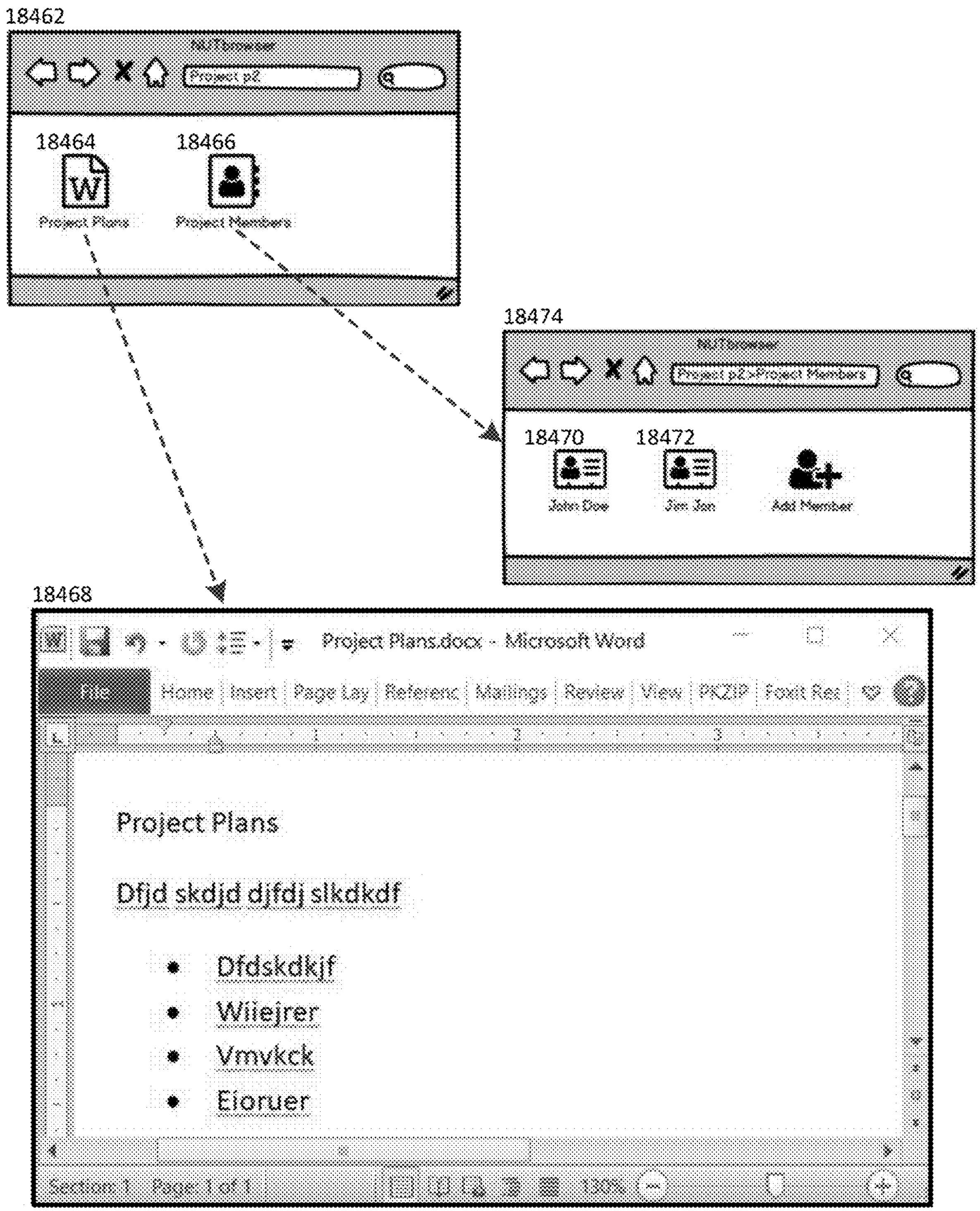

FIG. 184 shows a depiction of a GUI representation of a traversable tree structure derived from a starting FHOG nut.

Figure 185:
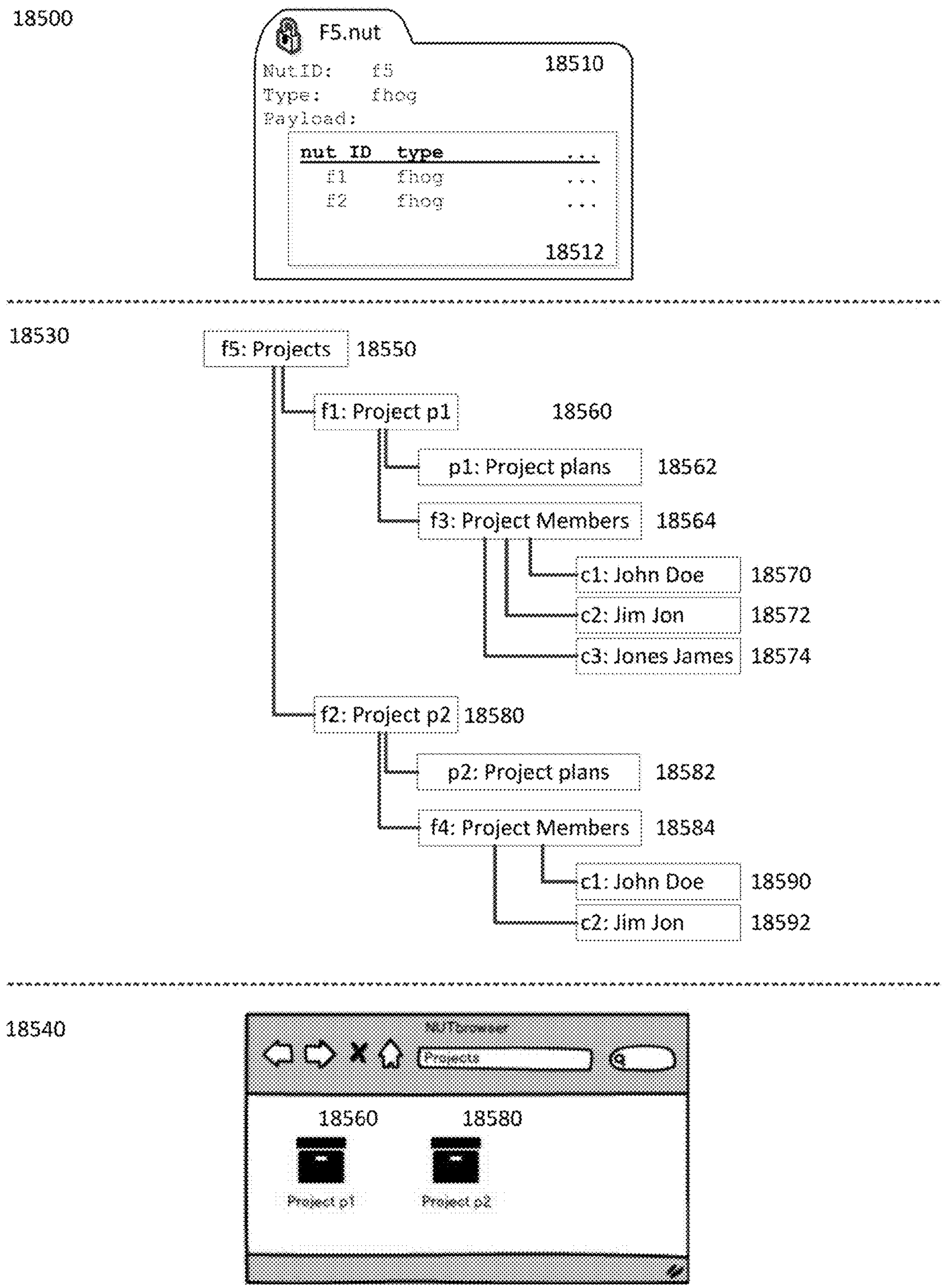

FIG. 185 shows a higher level FHOG nut and its resulting tree structure and GUI representation.

Figure 186:
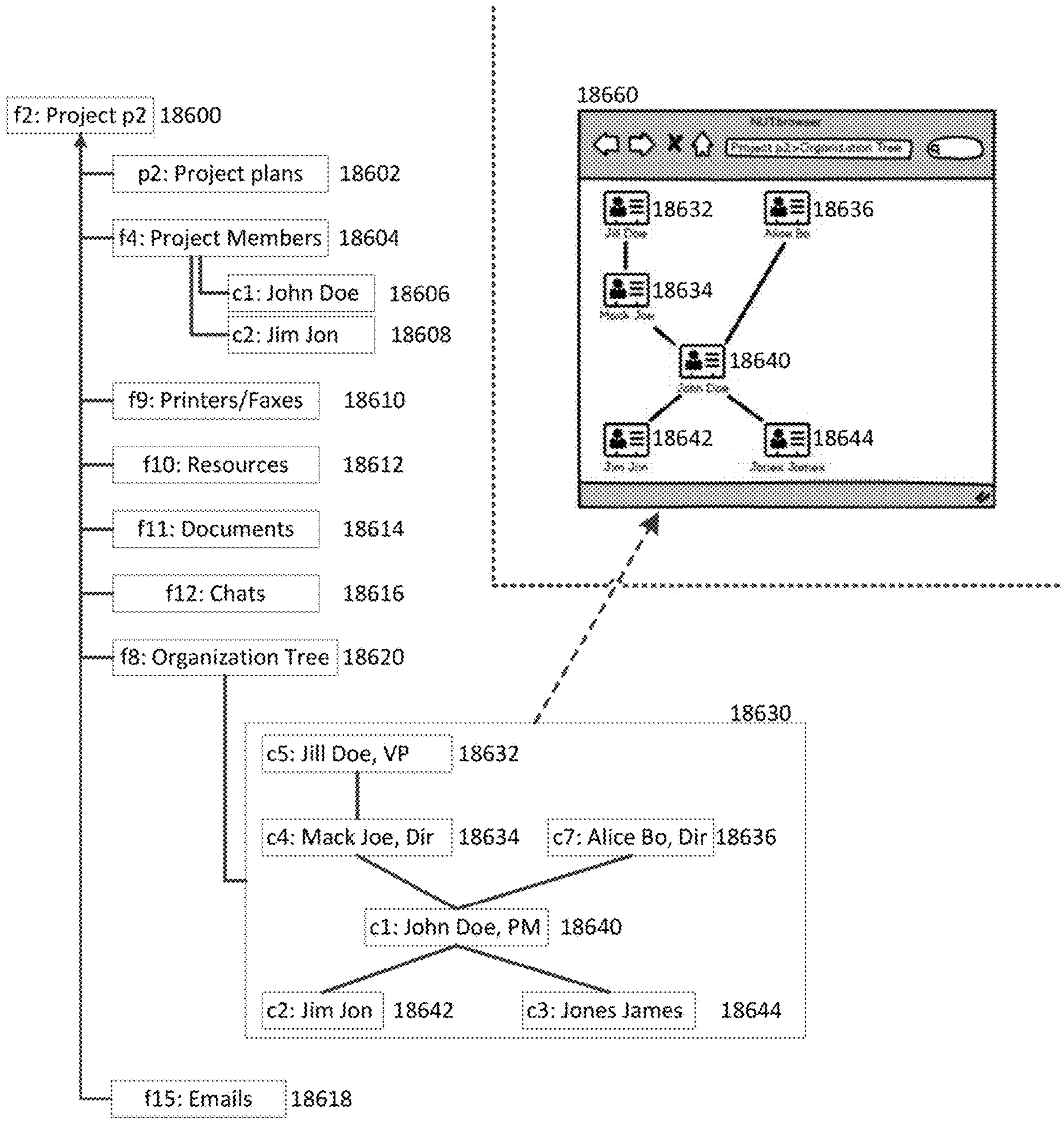

FIG. 186 shows tree structure derived from a FHOG nut with an example of a relationship FHOG nut.

Figure 187:
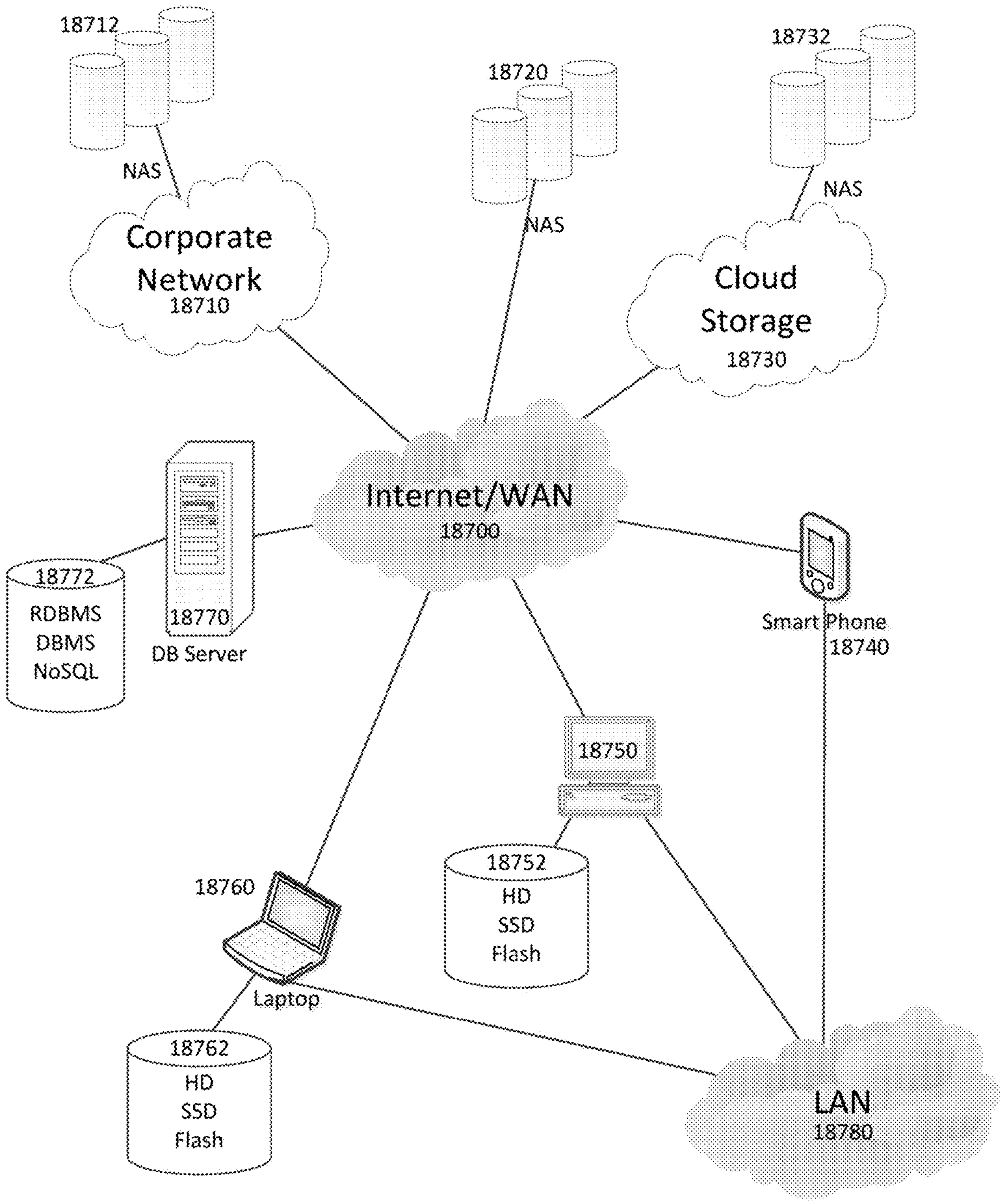

FIG. 187 shows an illustration of various networks and storage models.

Figure 188:
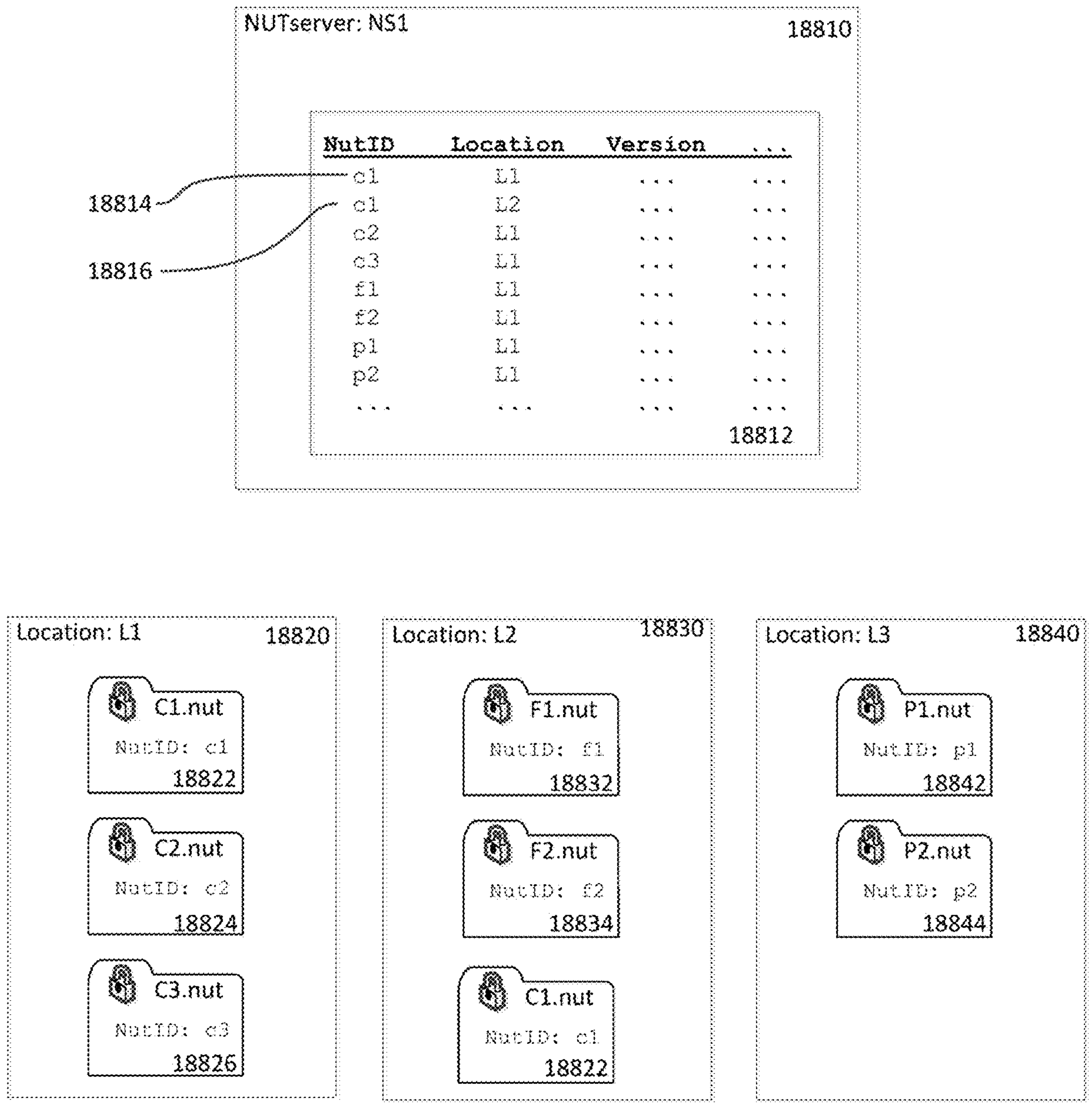

FIG. 188 shows a NUTserver's NutID index and an example of logical location of various NutIDs.

Figure 189:
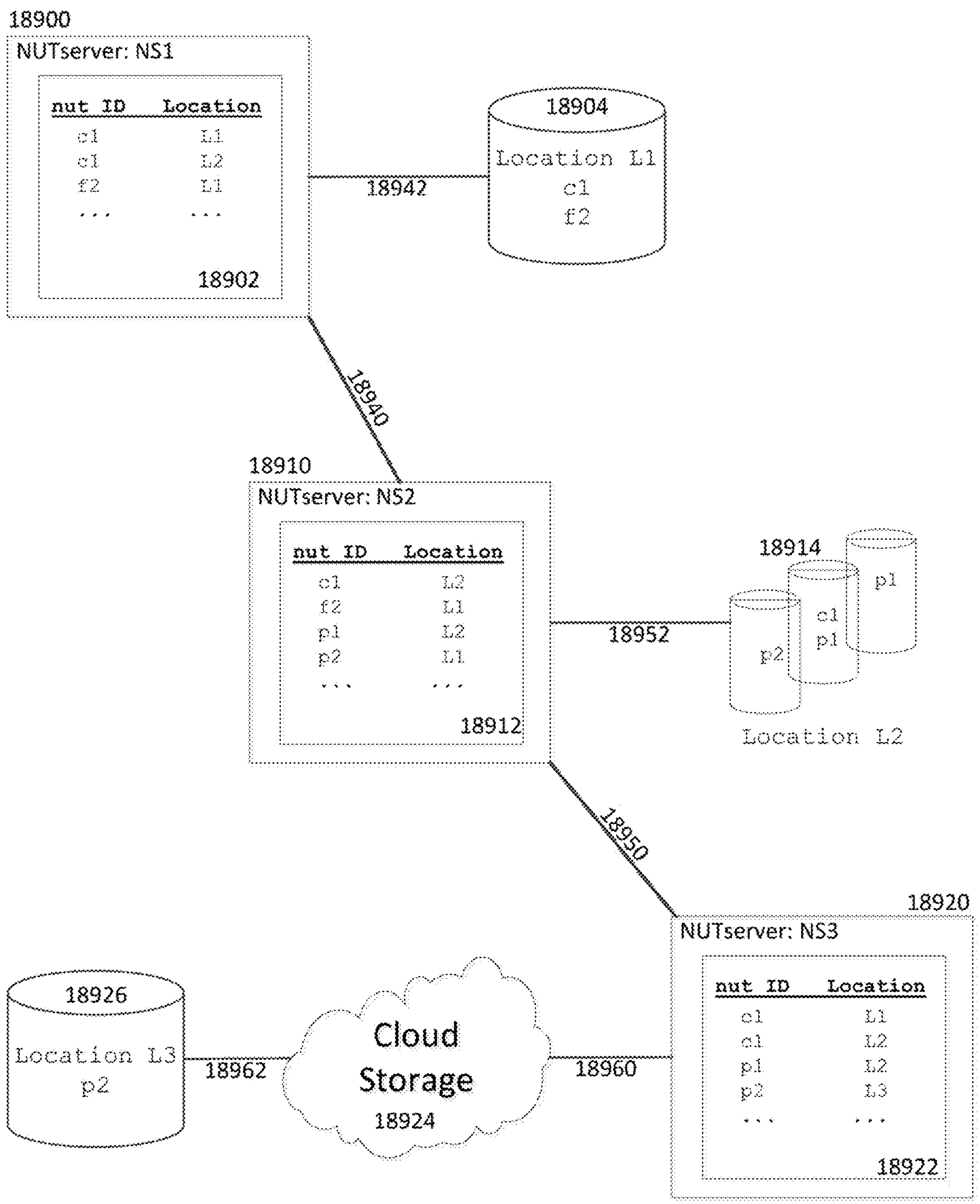

FIG. 189 shows a sample relationship of three NUTservers in a linked configuration each with its own logical storage models.

Figure 190:
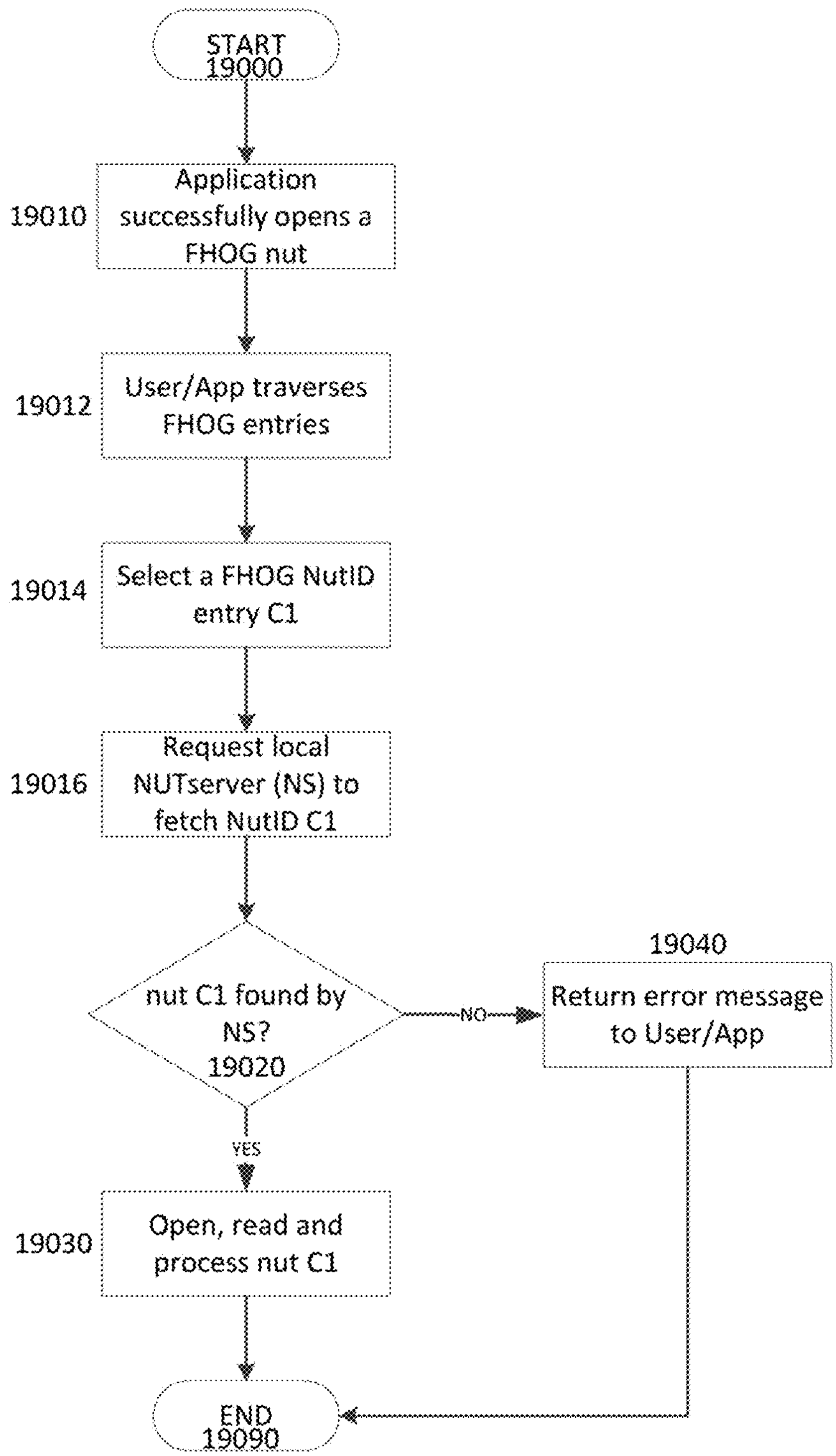

FIG. 190 shows a flow chart of an application traversing a FHOG nut's entries using the services provided by its local NUTserver.

Figure 191:
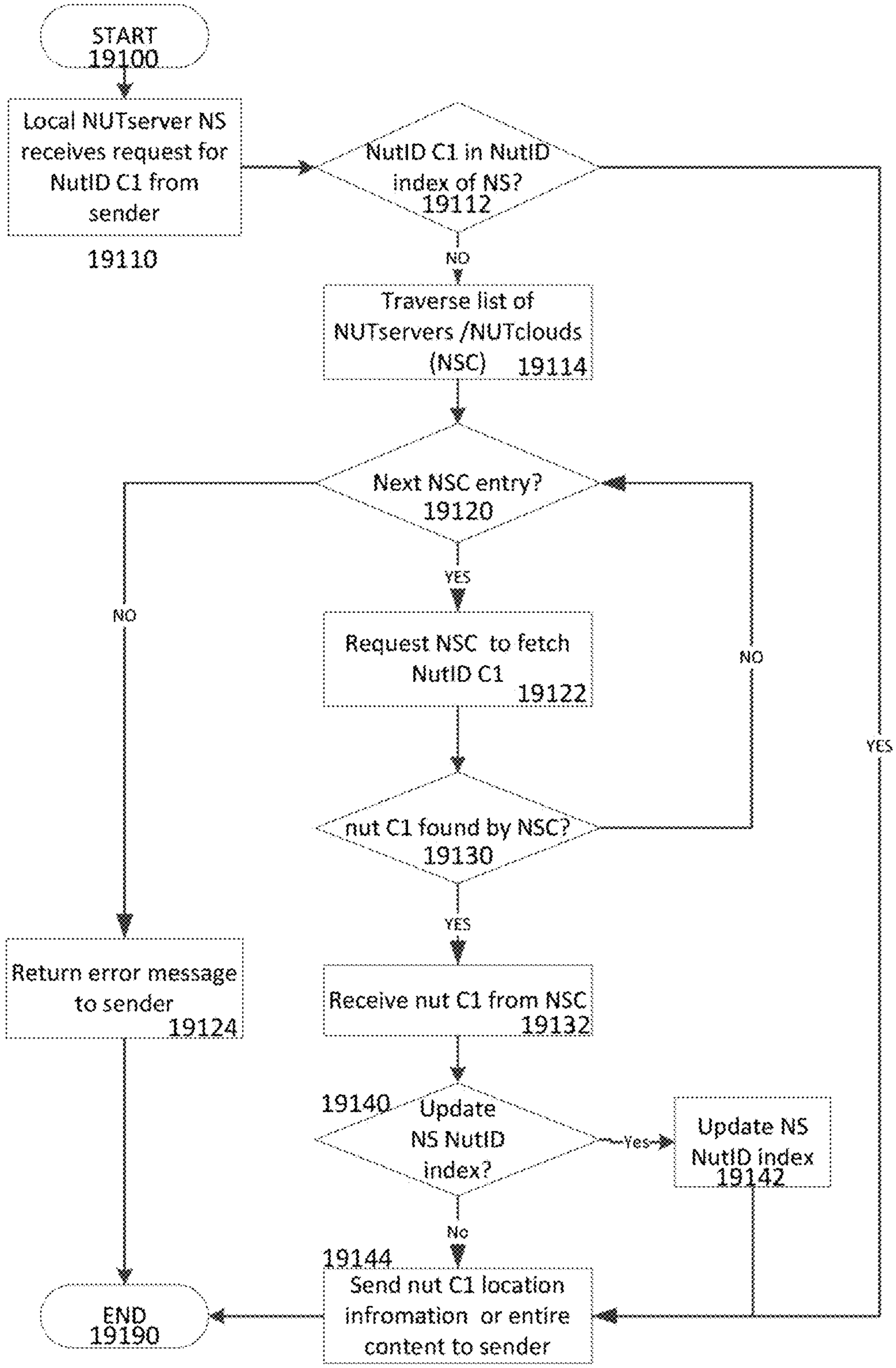

FIG. 191 shows a flow chart of a NUTserver attempting to locate a nut by its NutID across its list of linked NUTservers and/or NUTclouds.

Figure 192:
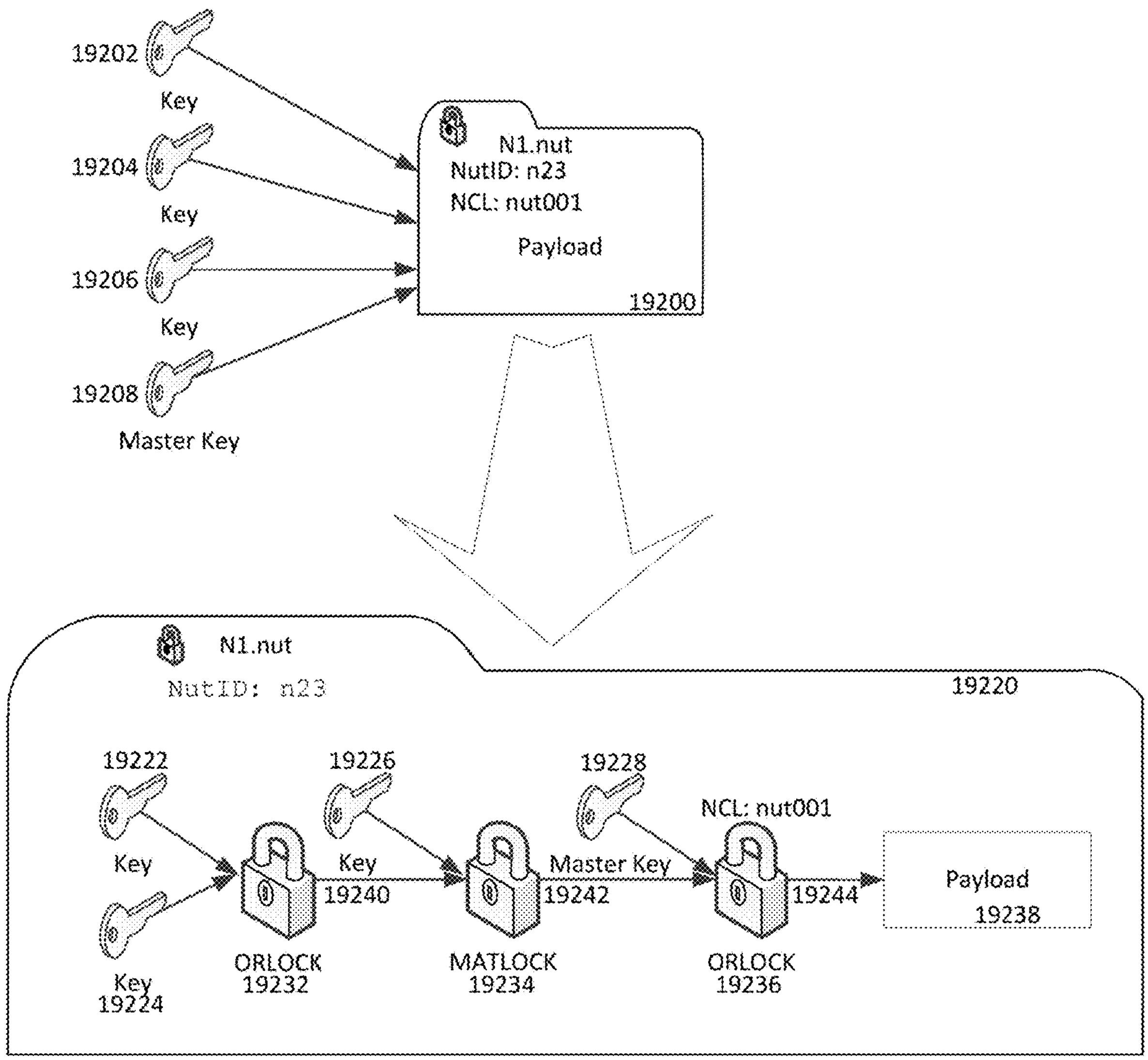

FIG. 192 shows the internal structures of a sample nut container.

Figure 193:
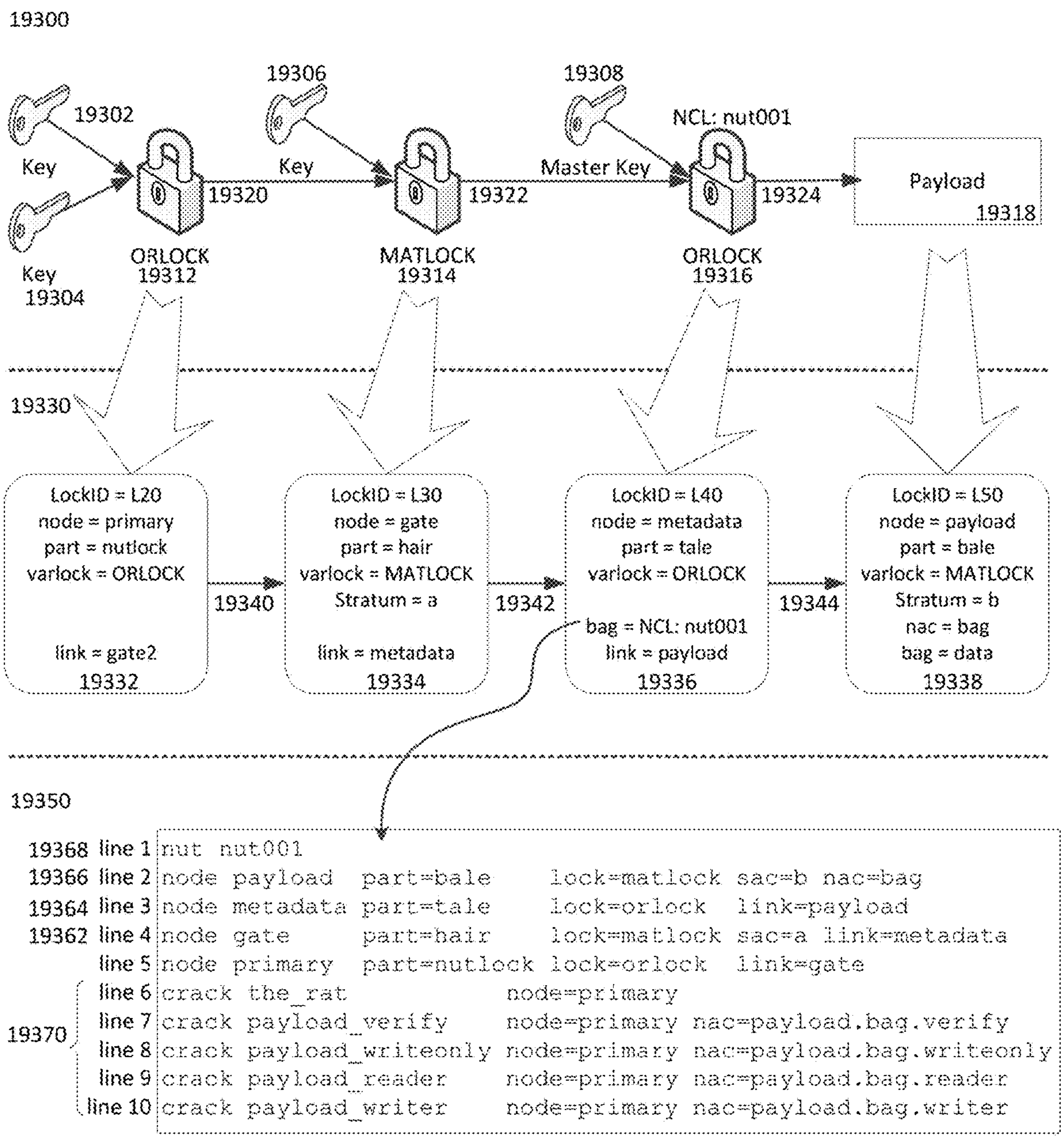

FIG. 193 shows the lock node structures of a nut structure and its corresponding NCL definition.

Figure 194:
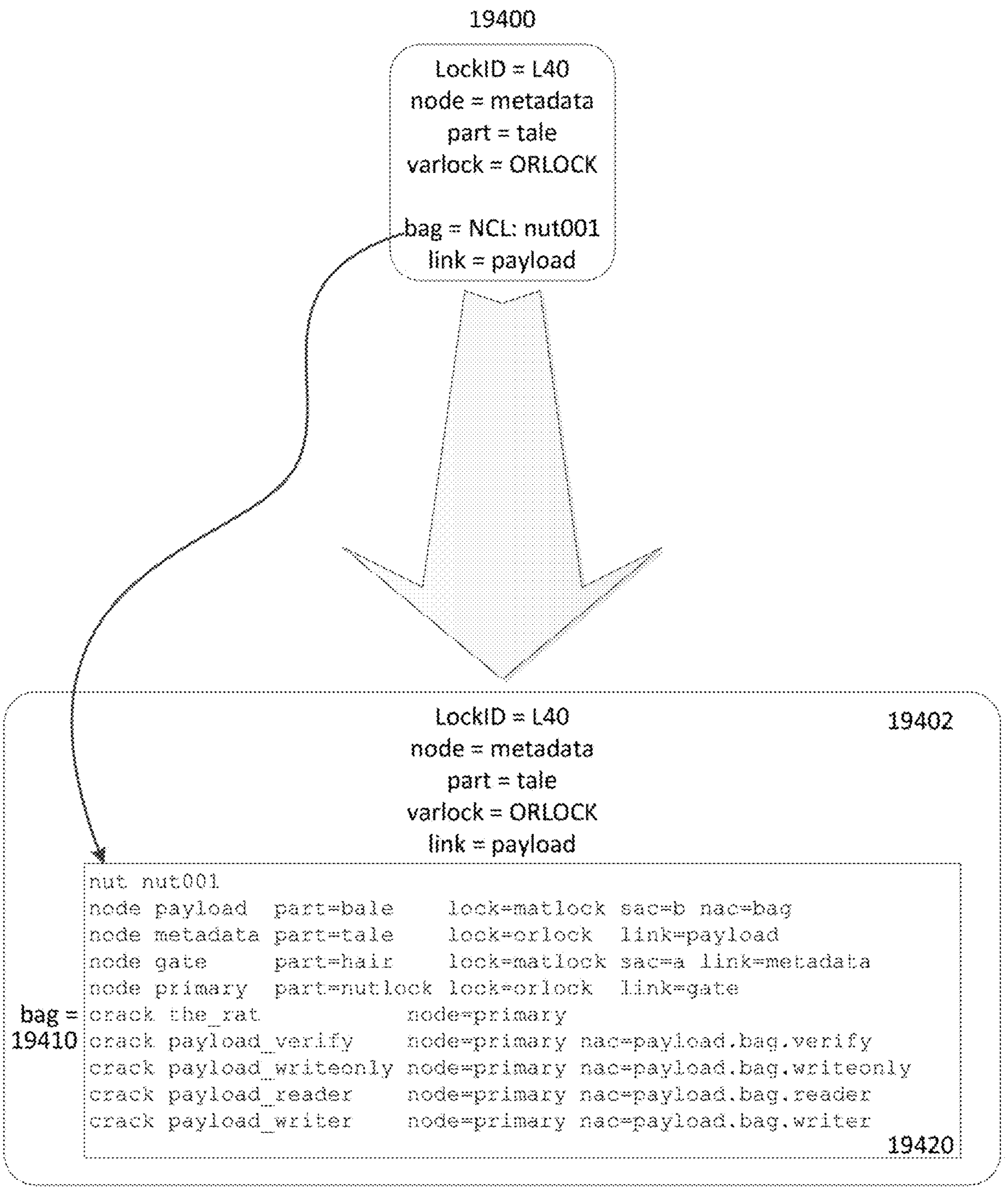

FIG. 194 shows the lock node holding an NCL definition.

Figure 195:
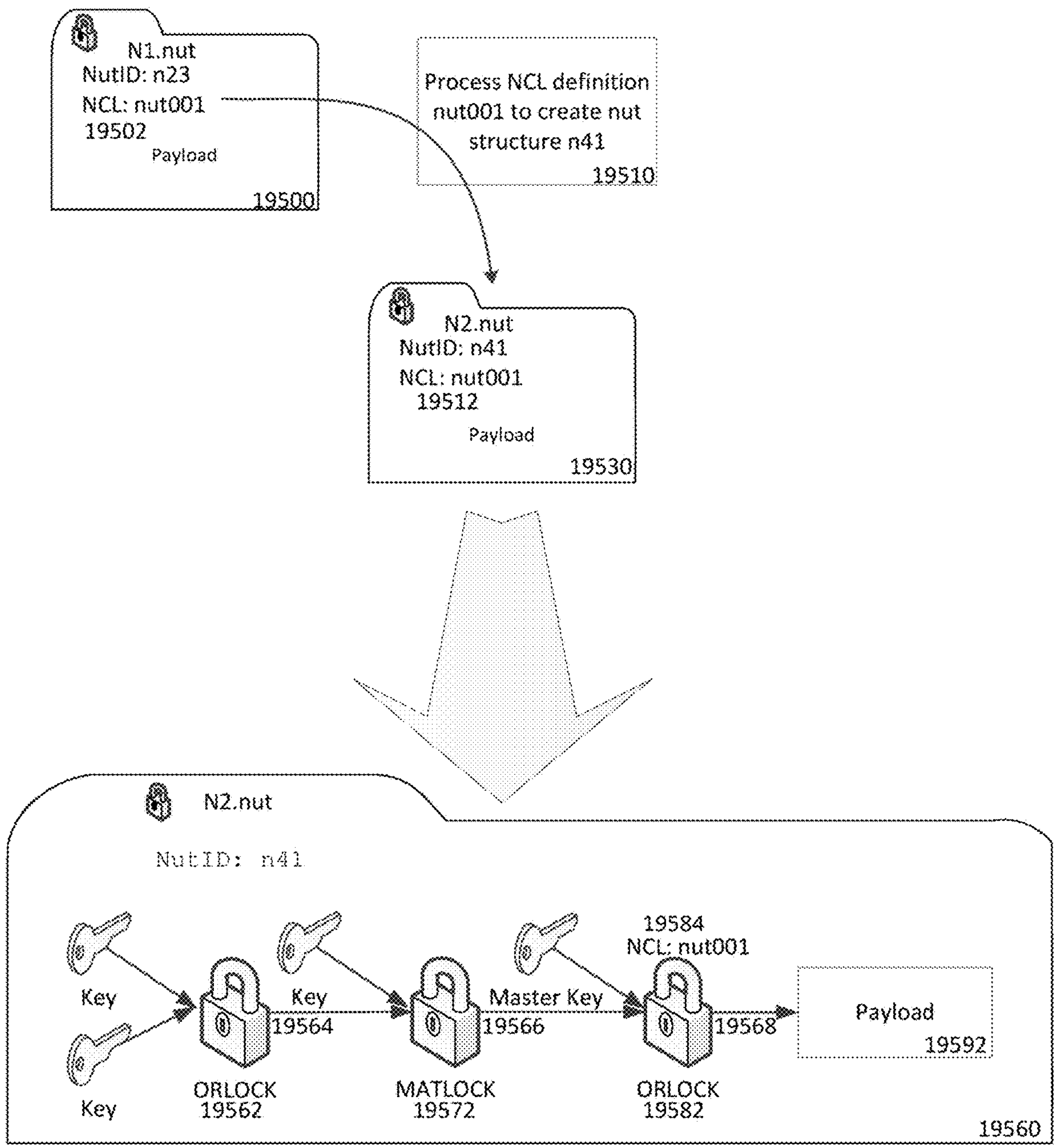

FIG. 195 shows the process whereby a nut's structure can be replicated by using the stored NCL definition.

Figure 196:
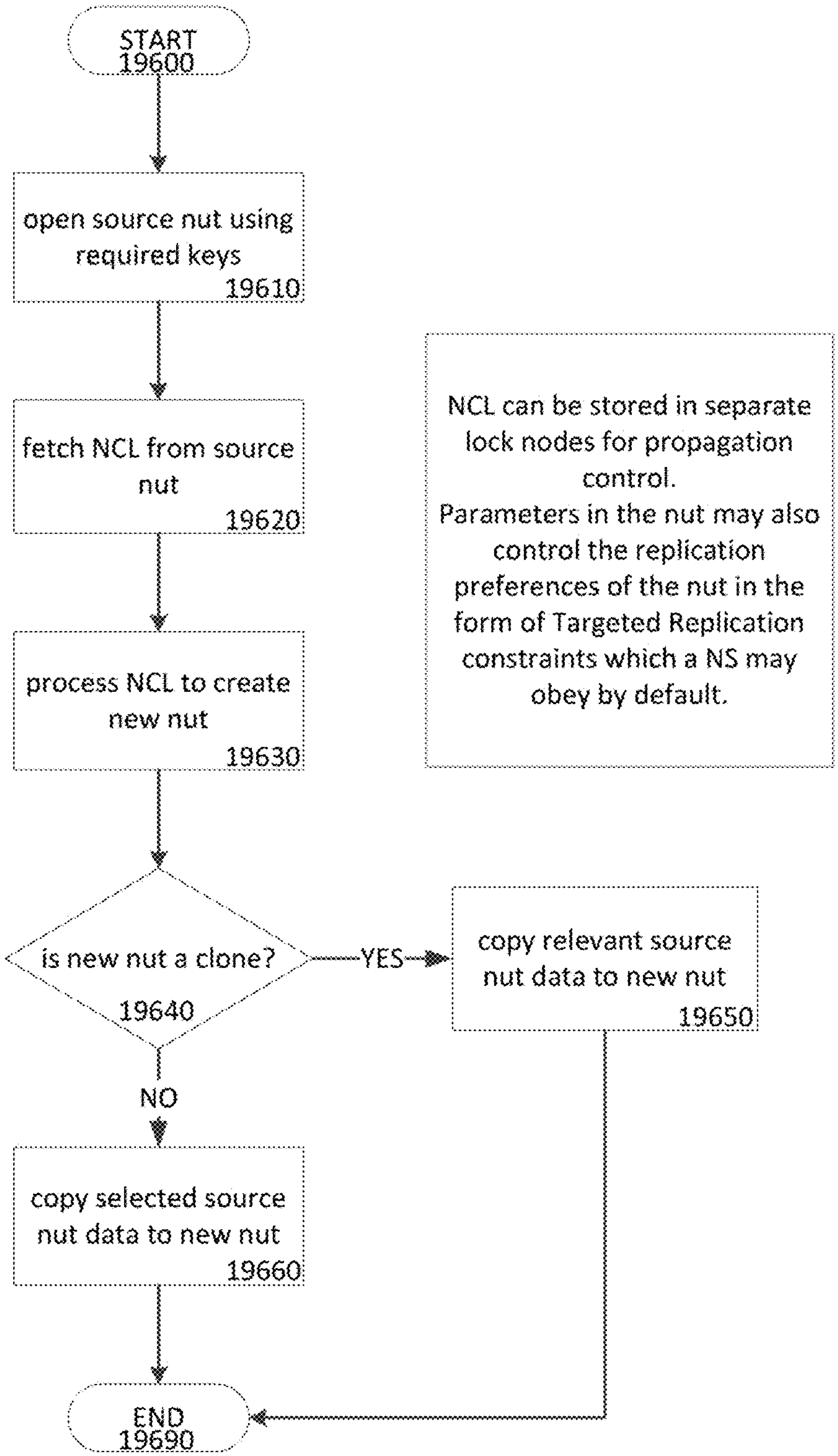

FIG. 196 shows the flow chart of cloning a nut or duplicating the source nut's internal structures by using its embedded NCL definition.

Figure 197:
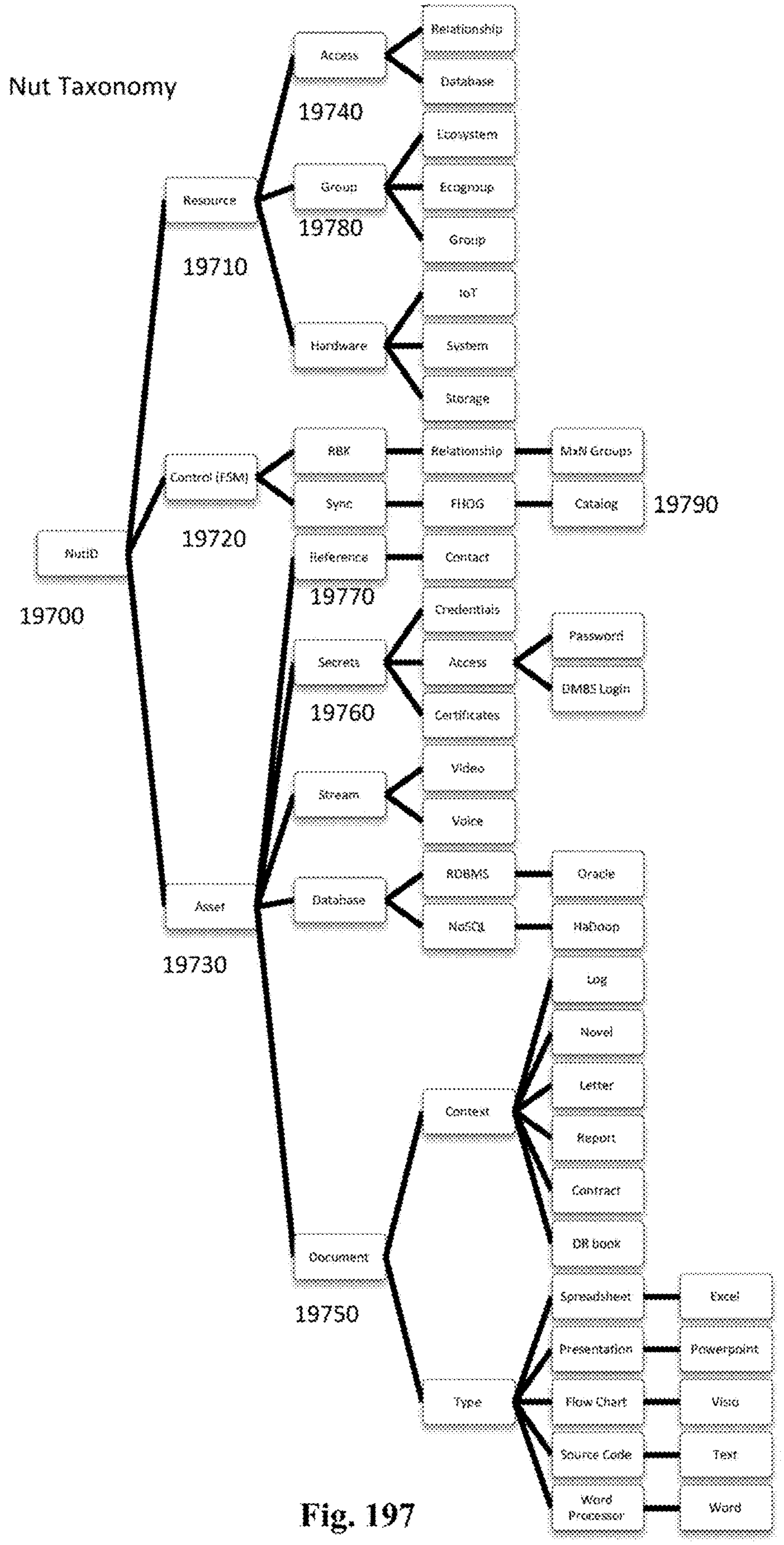

FIG. 197 shows a sample NUT Taxonomy based on NutIDs.

FIG. 198 shows a sample generic state table representing a Finite State Machine (FSM).

Figure 199:
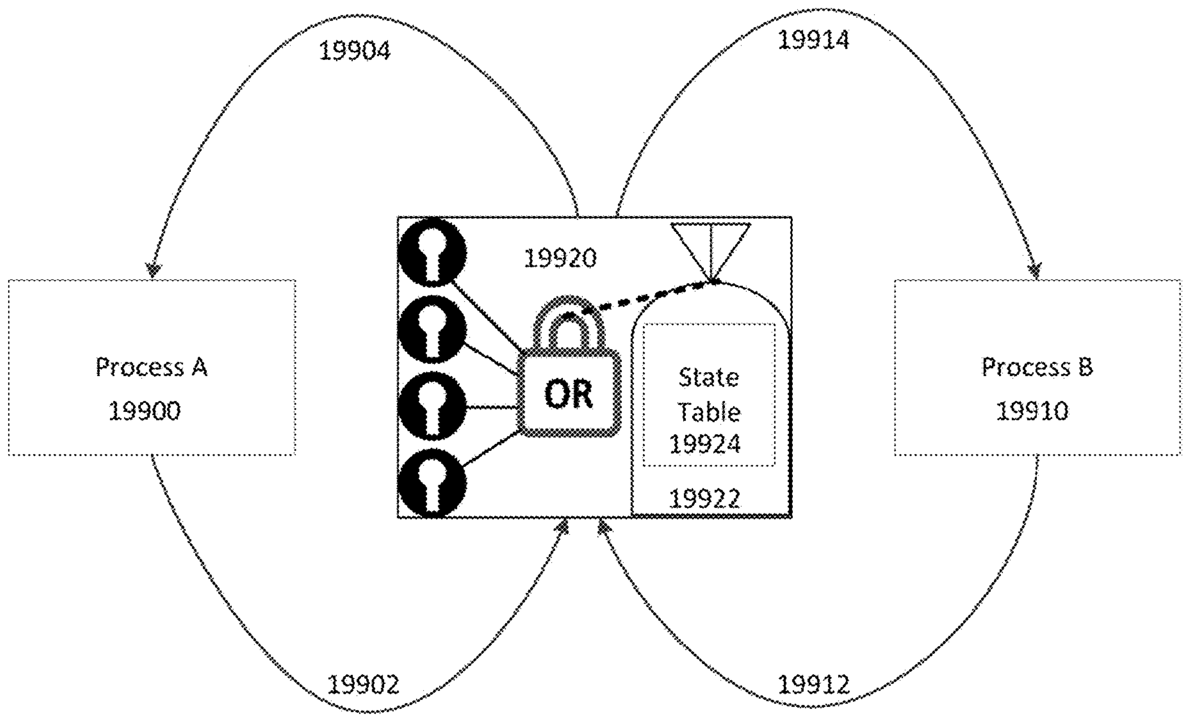

FIG. 199 shows how two processes may operate the FSM in a nut.

Figure 200:
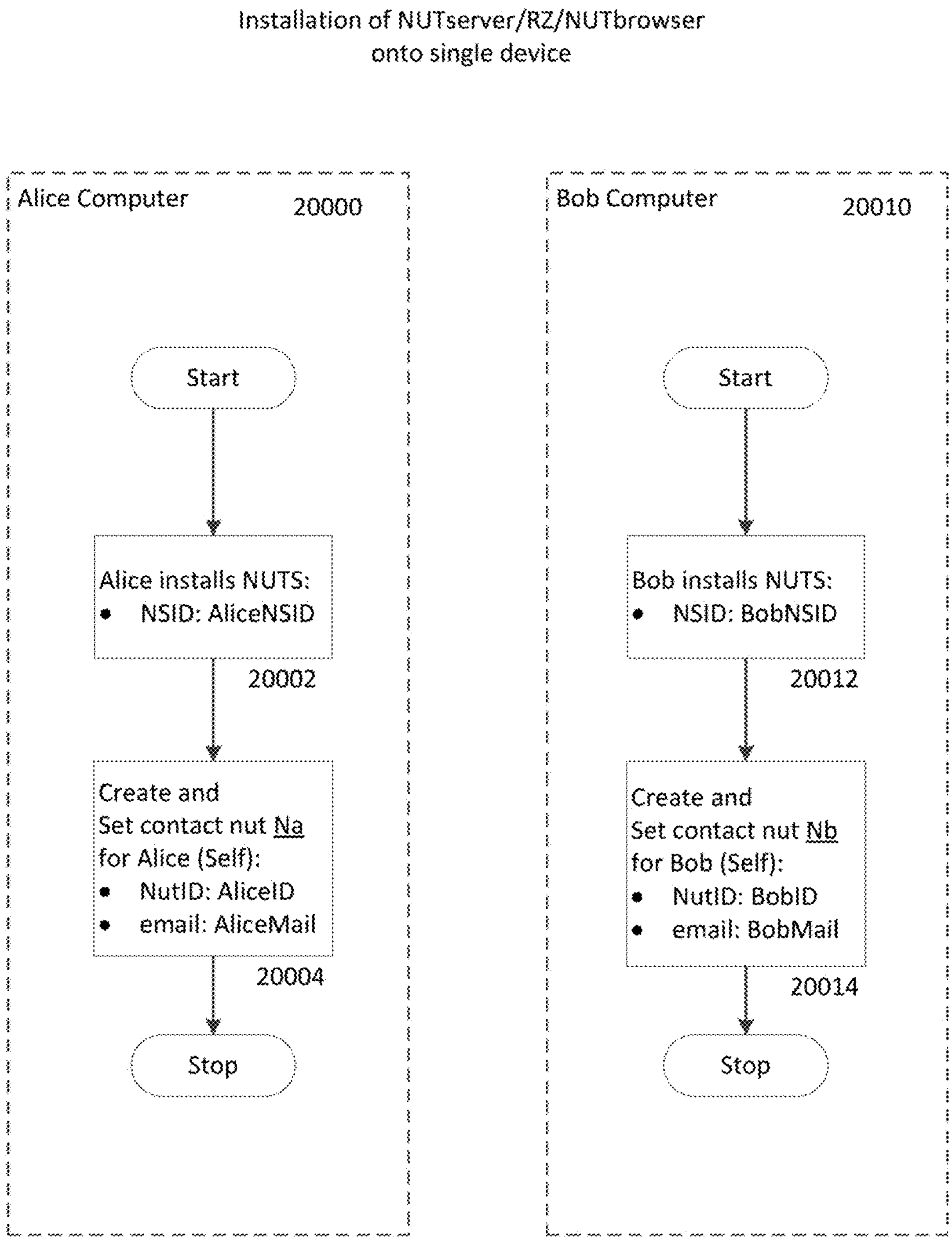

FIG. 200 shows the steps involved in installing a NUTserver (NS).

Figure 201:
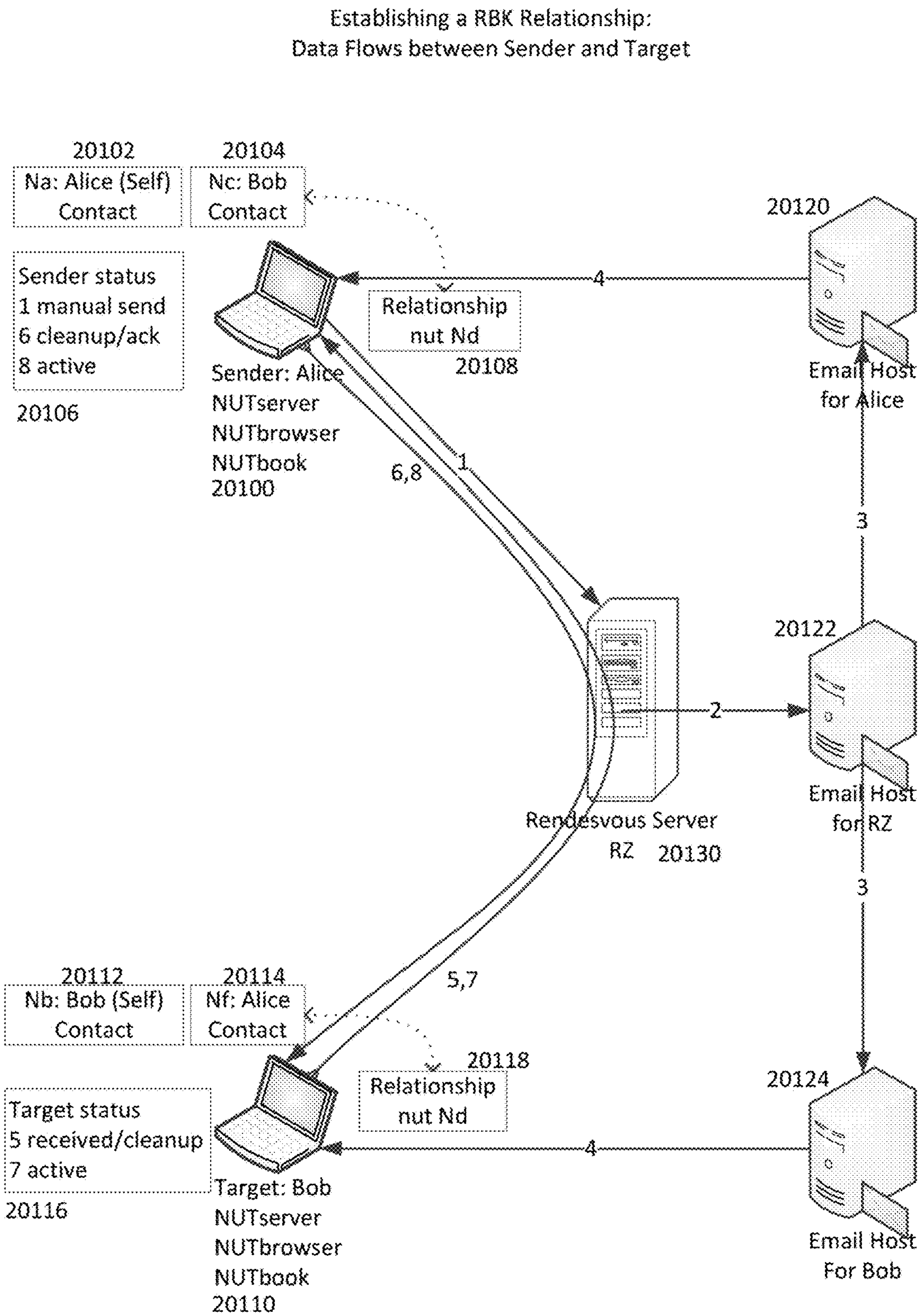

FIG. 201 shows the steps involved in establishing a relationship nut between Alice and Bob.

Figure 202:
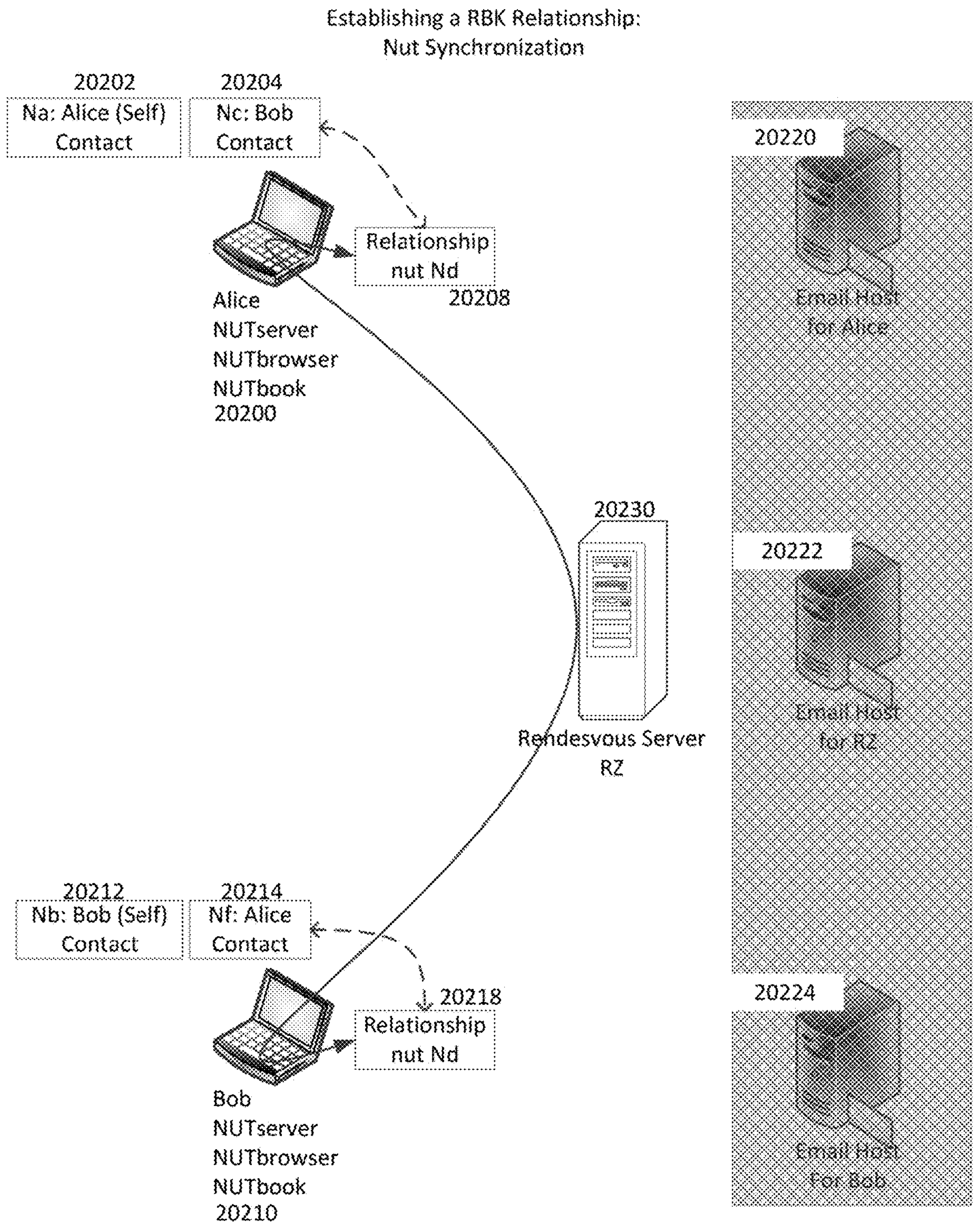

FIG. 202 shows the steps involved in establishing a relationship nut between Alice and Bob.

FIG. 203 shows the steps involved in establishing a relationship nut between Alice and Bob.

Figure 204:
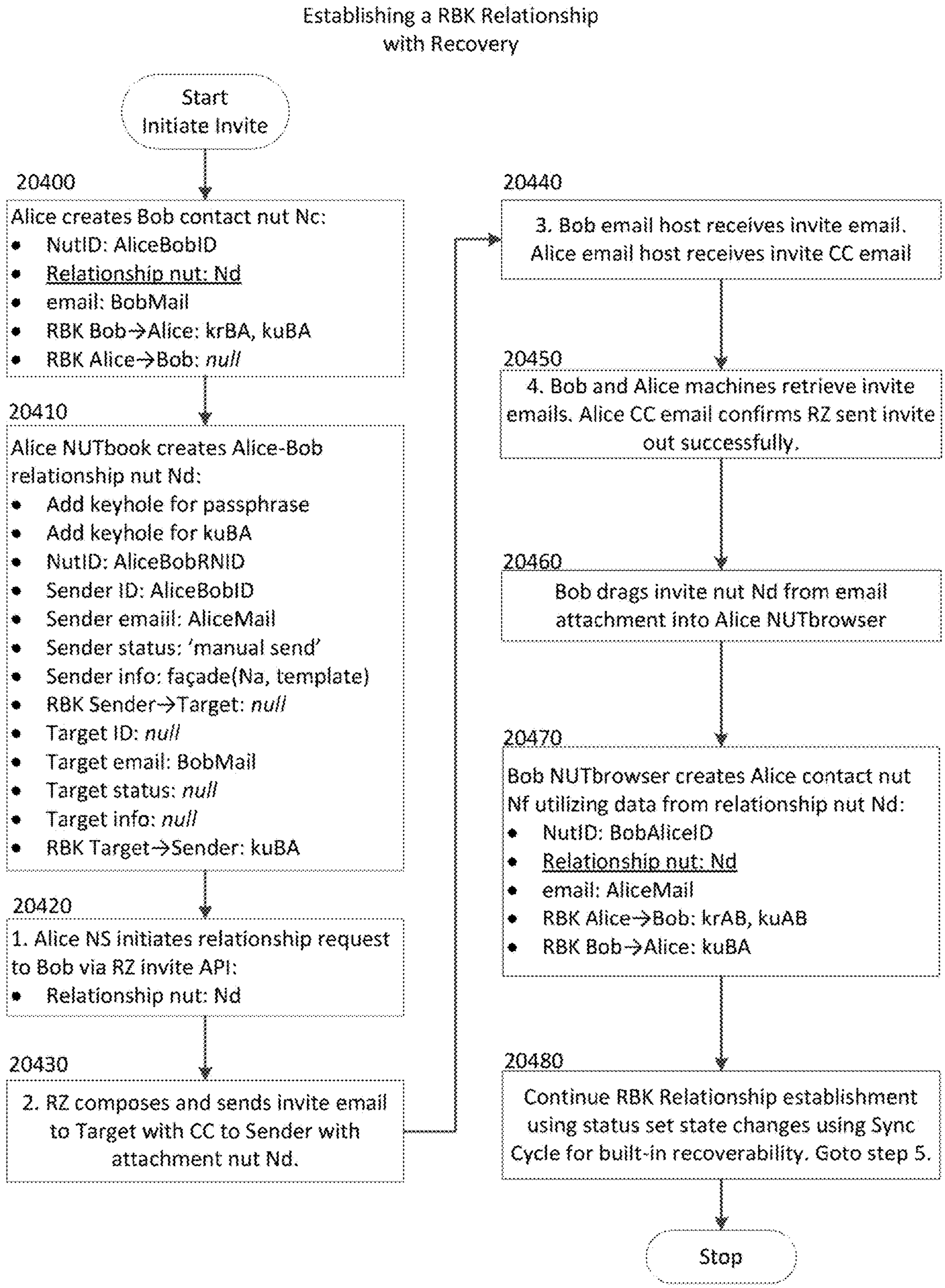

FIG. 204 shows the steps involved in establishing a relationship nut between Alice and Bob.

Figure 205:
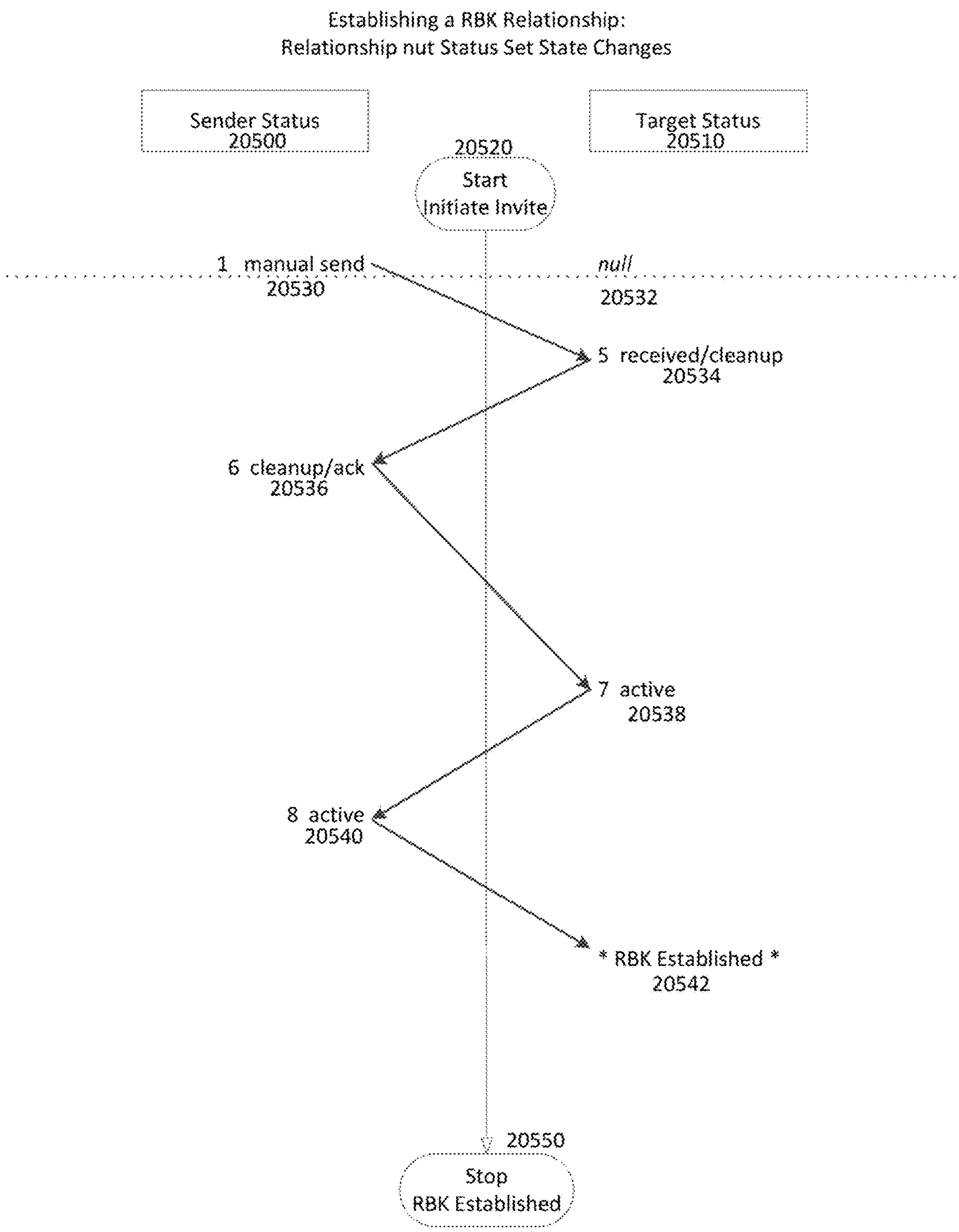

FIG. 205 shows the steps involved in establishing a relationship nut between Alice and Bob.

Figure 206:
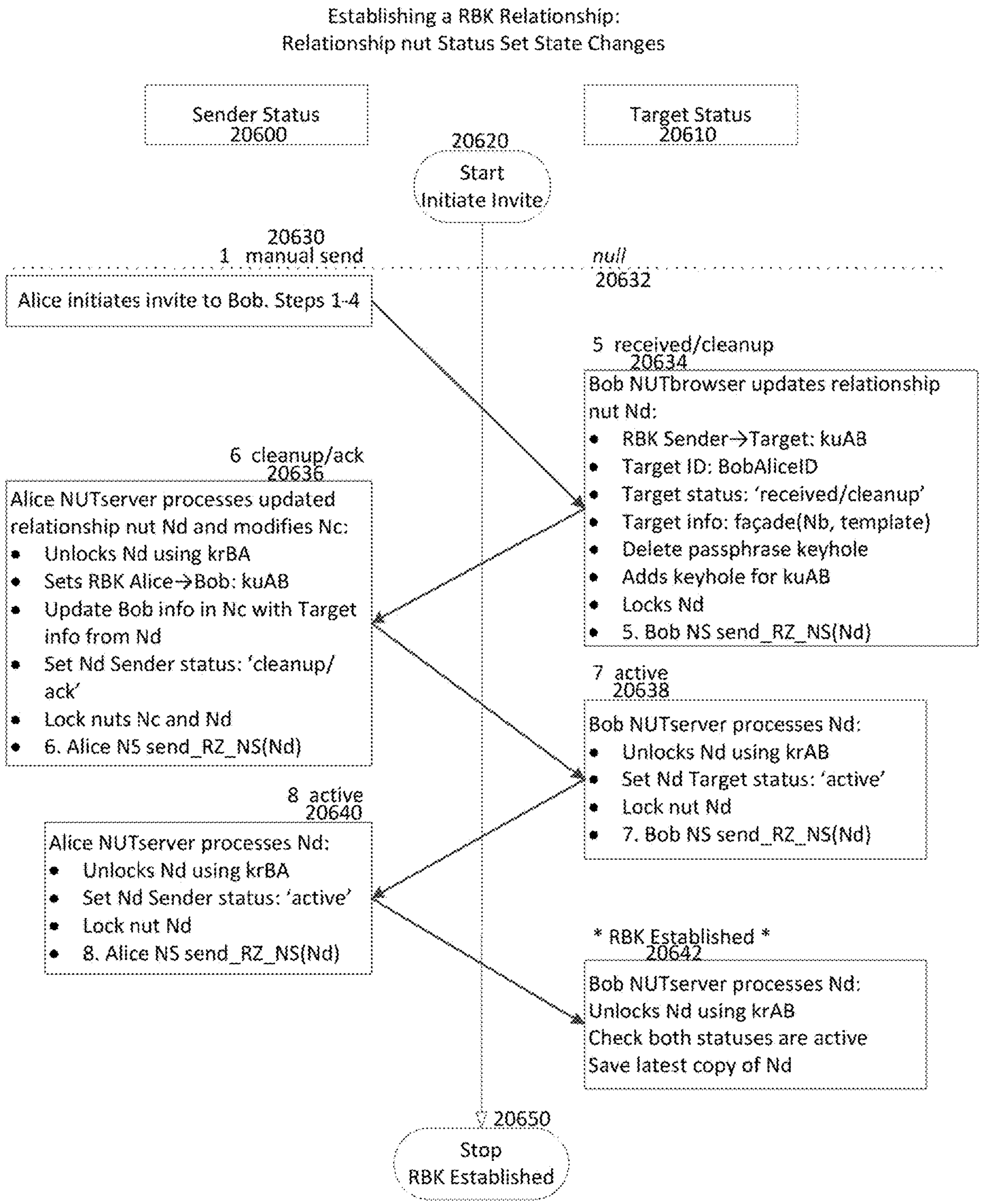

FIG. 206 shows the steps involved in establishing a relationship nut between Alice and Bob.

Figure 207:
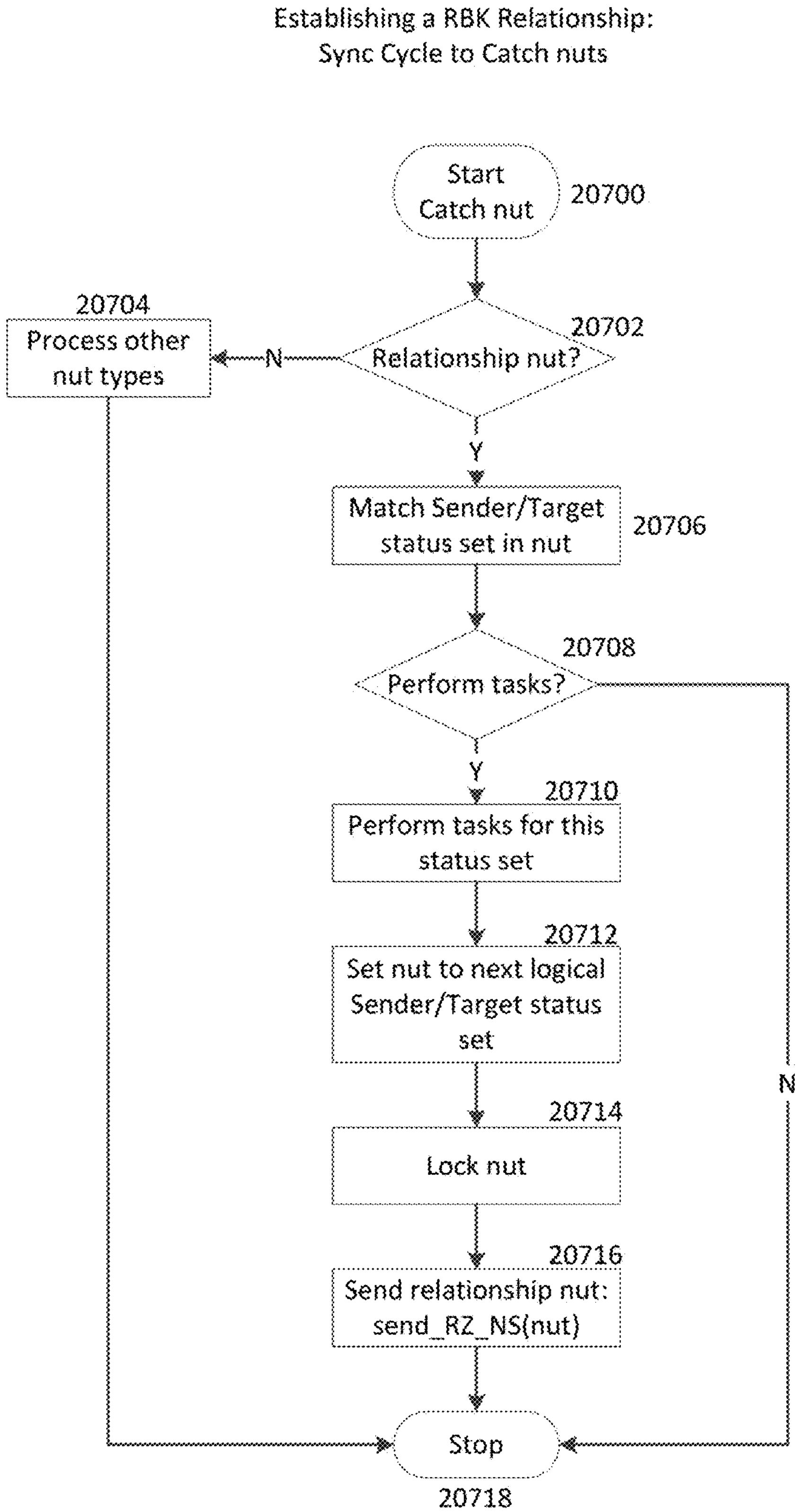

FIG. 207 shows the steps involved in establishing a relationship nut between Alice and Bob.

Figure 208:
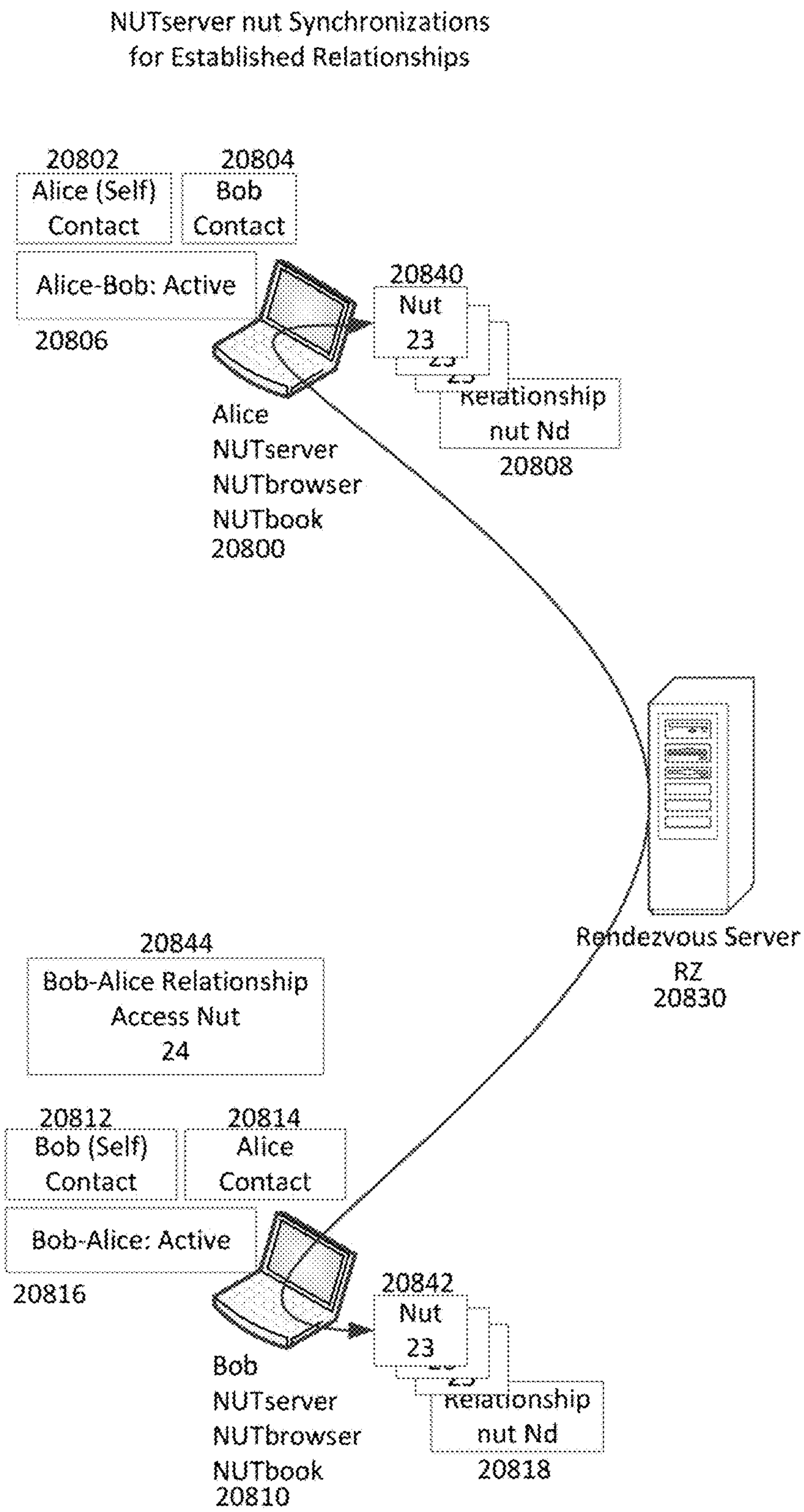

FIG. 208 shows the steps involved in establishing a relationship nut between Alice and Bob.

Figure 209:
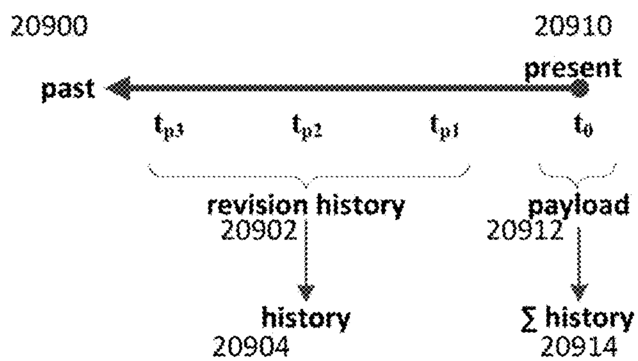

FIG. 209 illustrates a timeline for revision history purposes.

Figure 210:
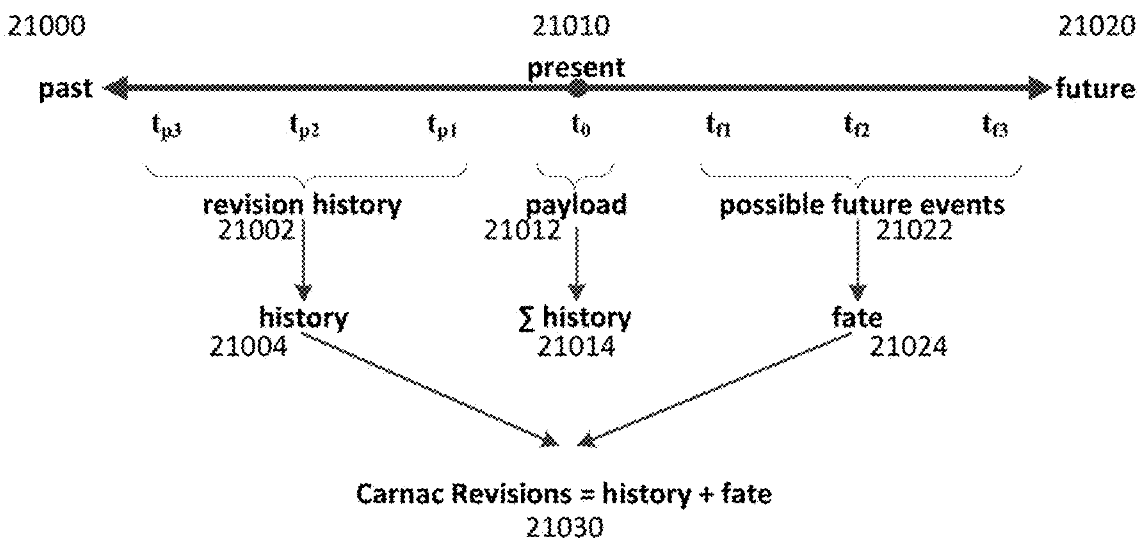

FIG. 210 illustrates a timeline that extends to the future.

Figure 211:
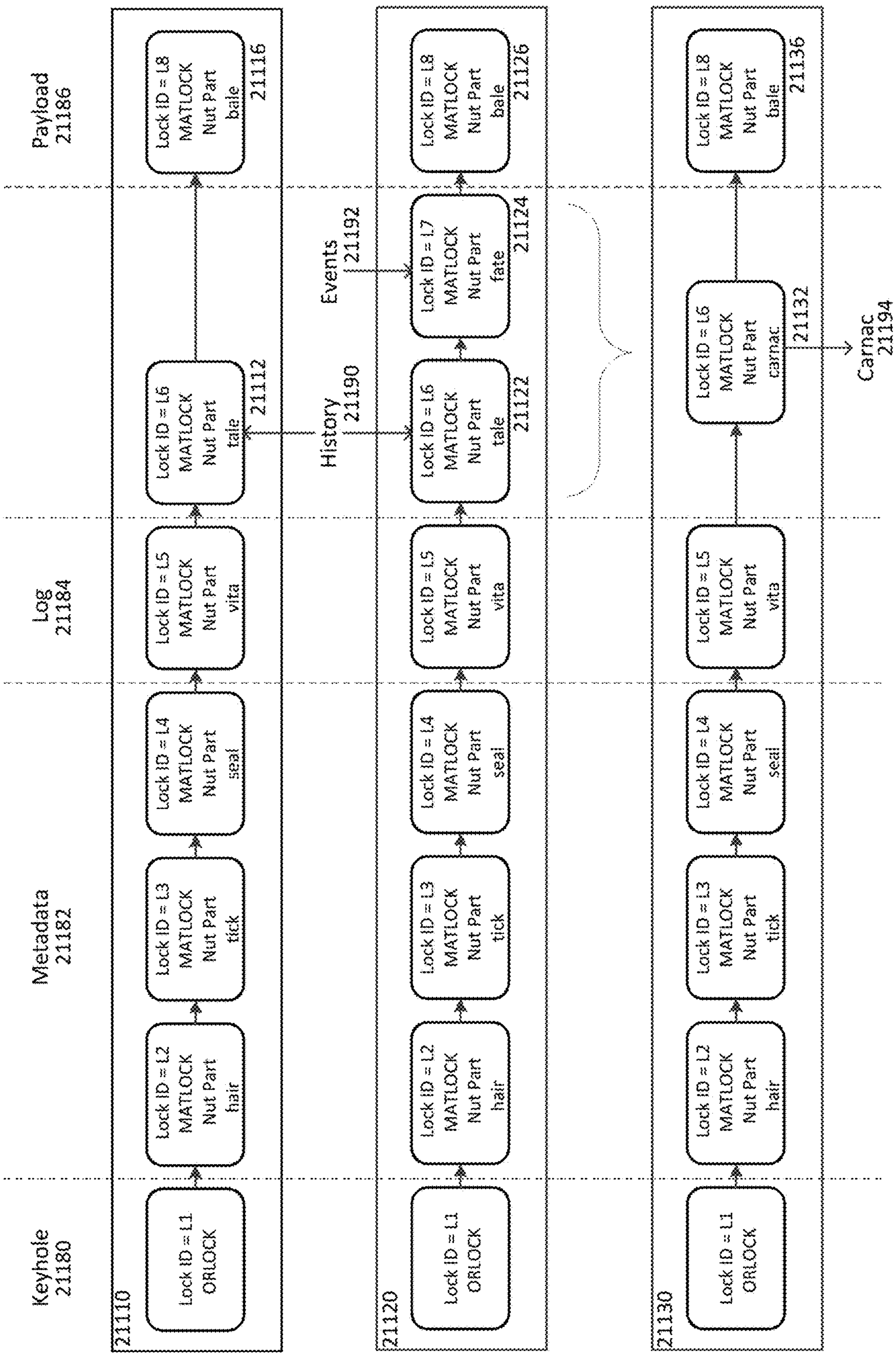

FIG. 211 shows three different variants of Carnac Revisions in a nut.

FIG. 212 is an expanded table of nut parts definitions.

Figure 213:
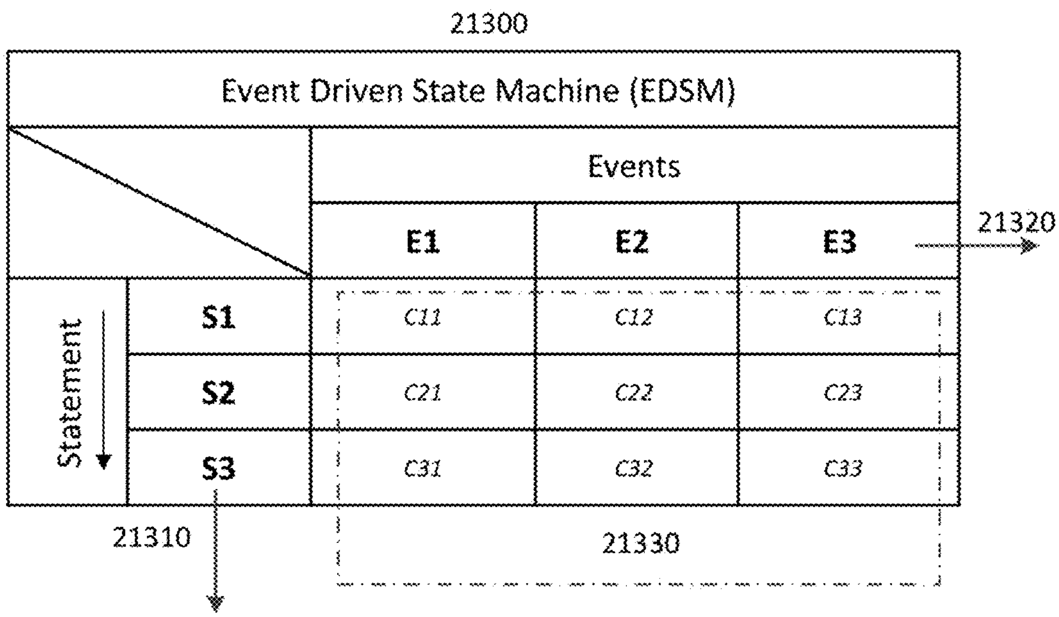

FIG. 213 shows a table view of an Event Driven State Machine (EDSM).

FIG. 214 illustrates an EDSM command language.

FIG. 215 shows examples of the Carnac Command Language (CCL).

FIG. 216 illustrates CCL for calculated delays.

FIG. 217 shows calendar event examples using CCL.

FIG. 218 shows CCL usage to control a set of IoT devices.

FIG. 219 shows CCL usage to control a set of IoT devices.

FIG. 220 shows an example of calendar mode CCL.

Figure 221:
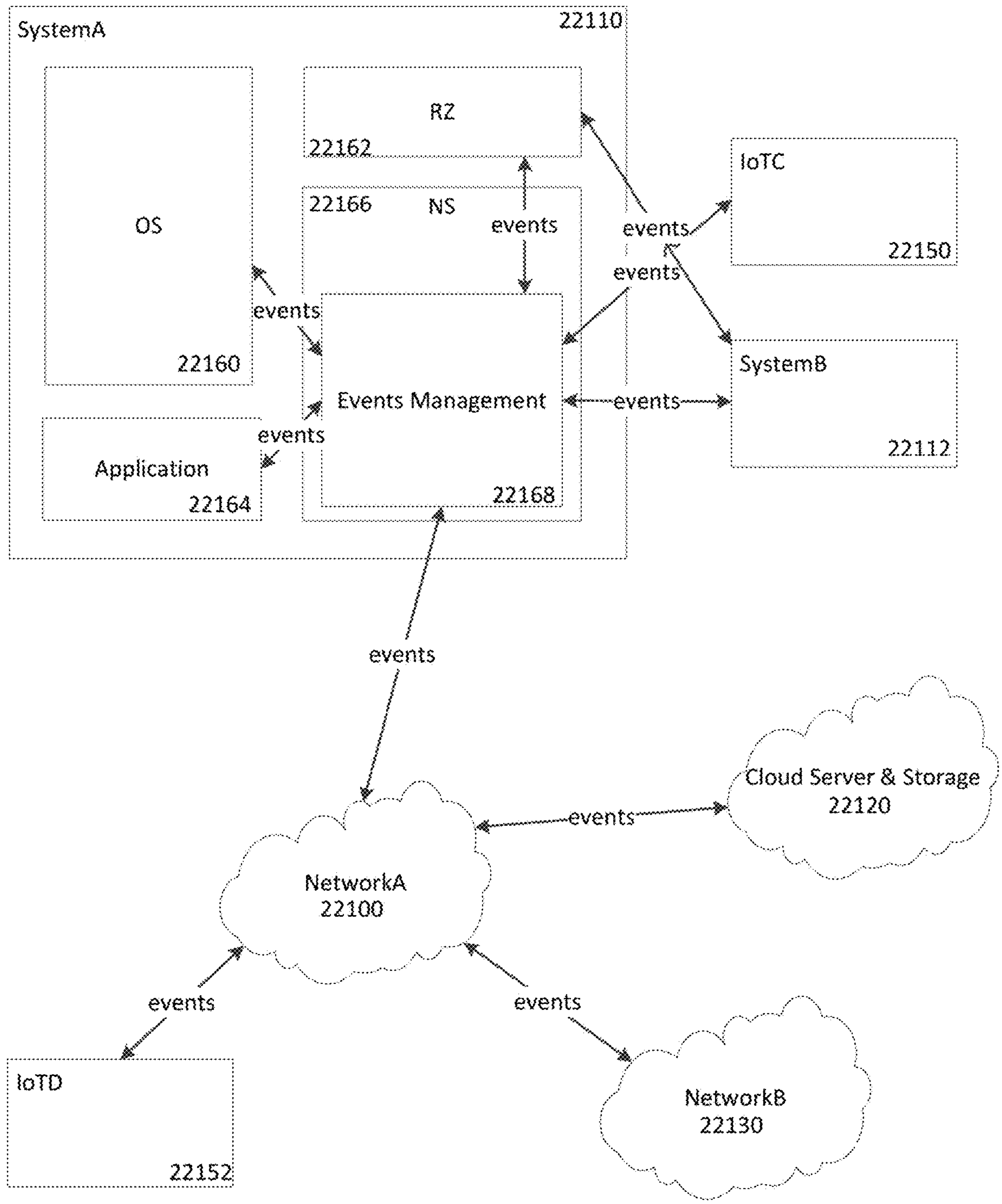

FIG. 221 shows the event space of CCL within a NUTS environment.

FIG. 222 shows some existing Access frameworks.

Figure 223:
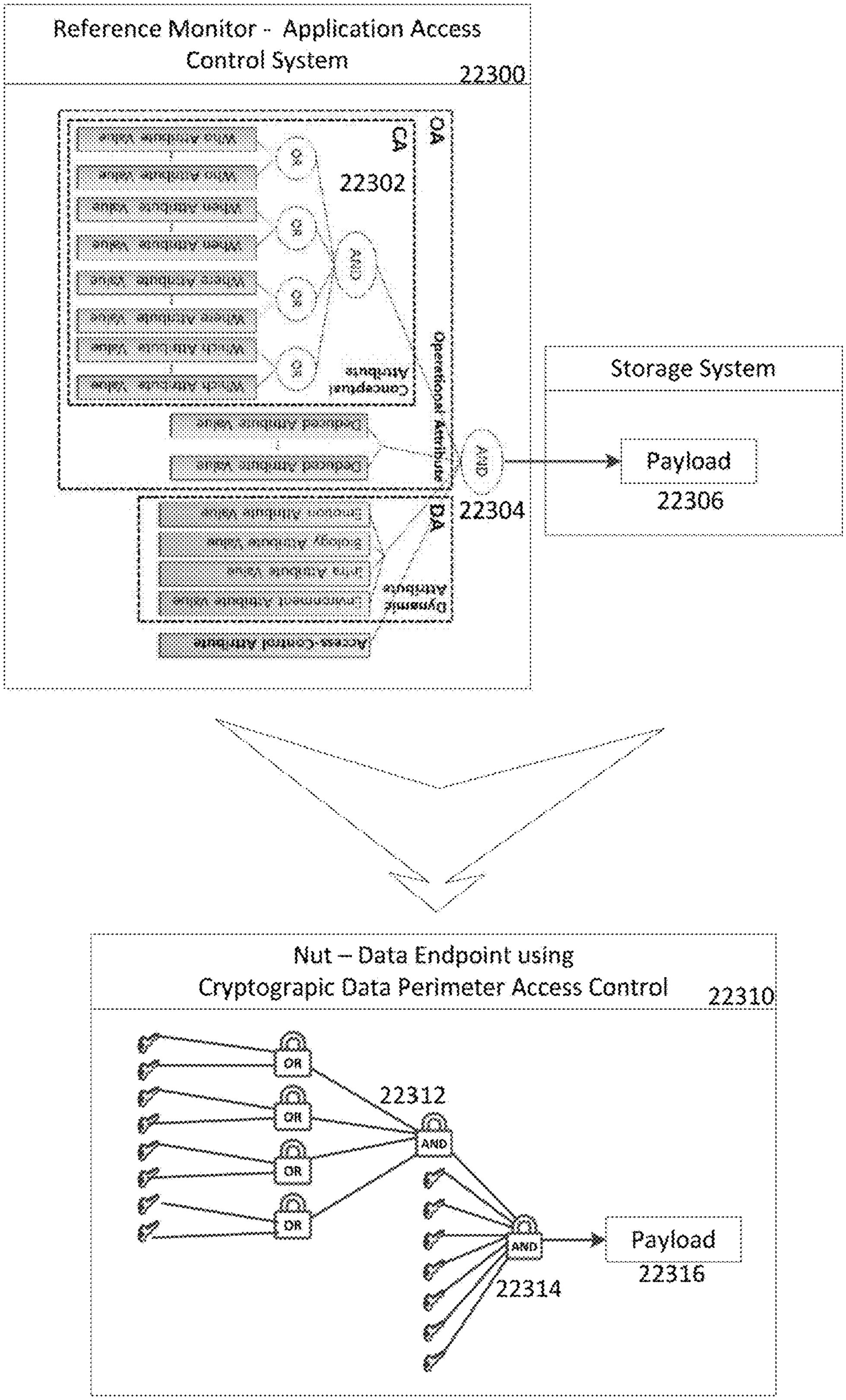

FIG. 223 shows how a nut expresses ABAC.

Figure 224:
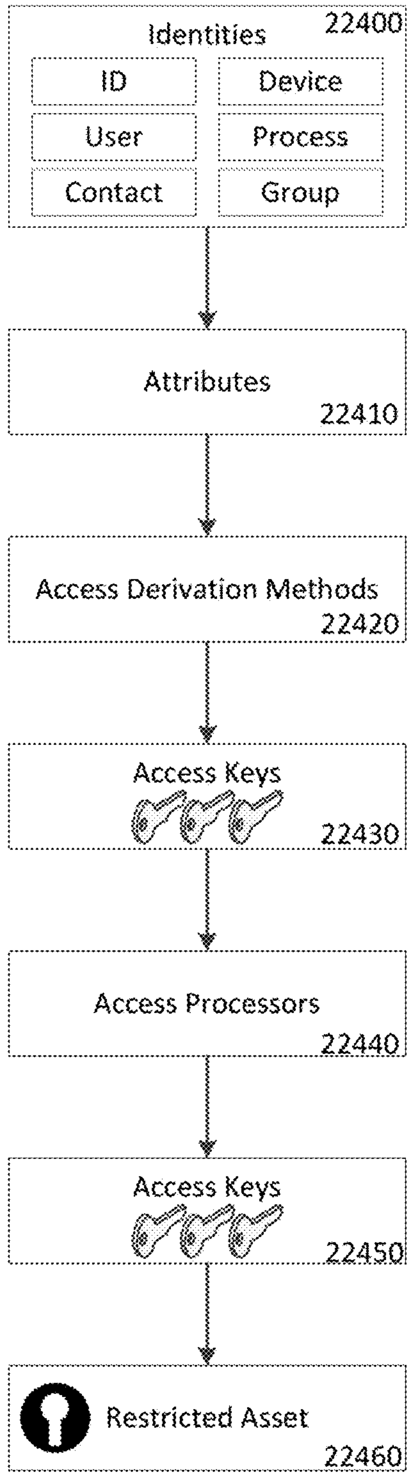

FIG. 224 shows the basic elements of the SAF.

Figure 225:
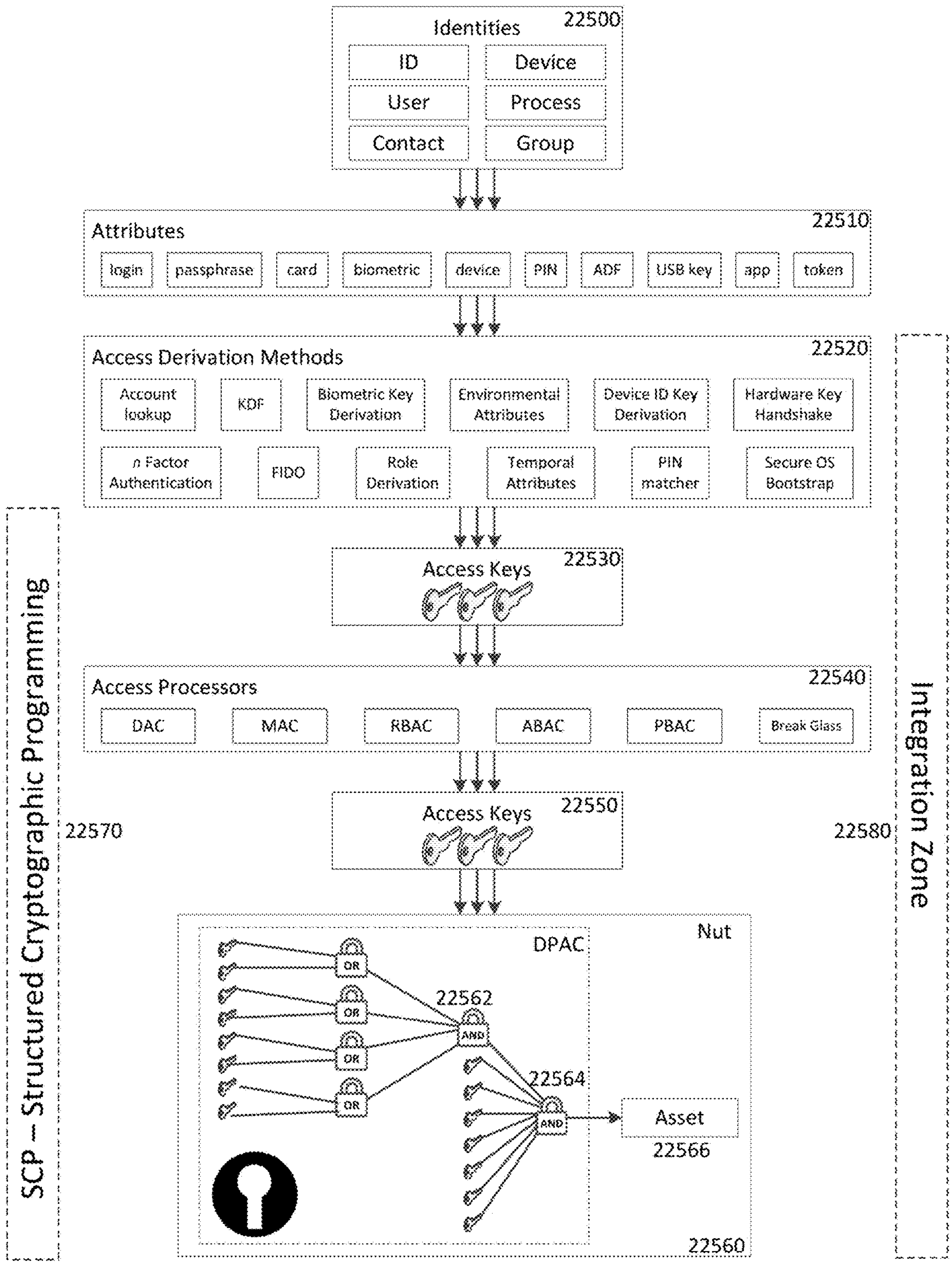

FIG. 225 shows a detailed view of SAF.

Figure 226:
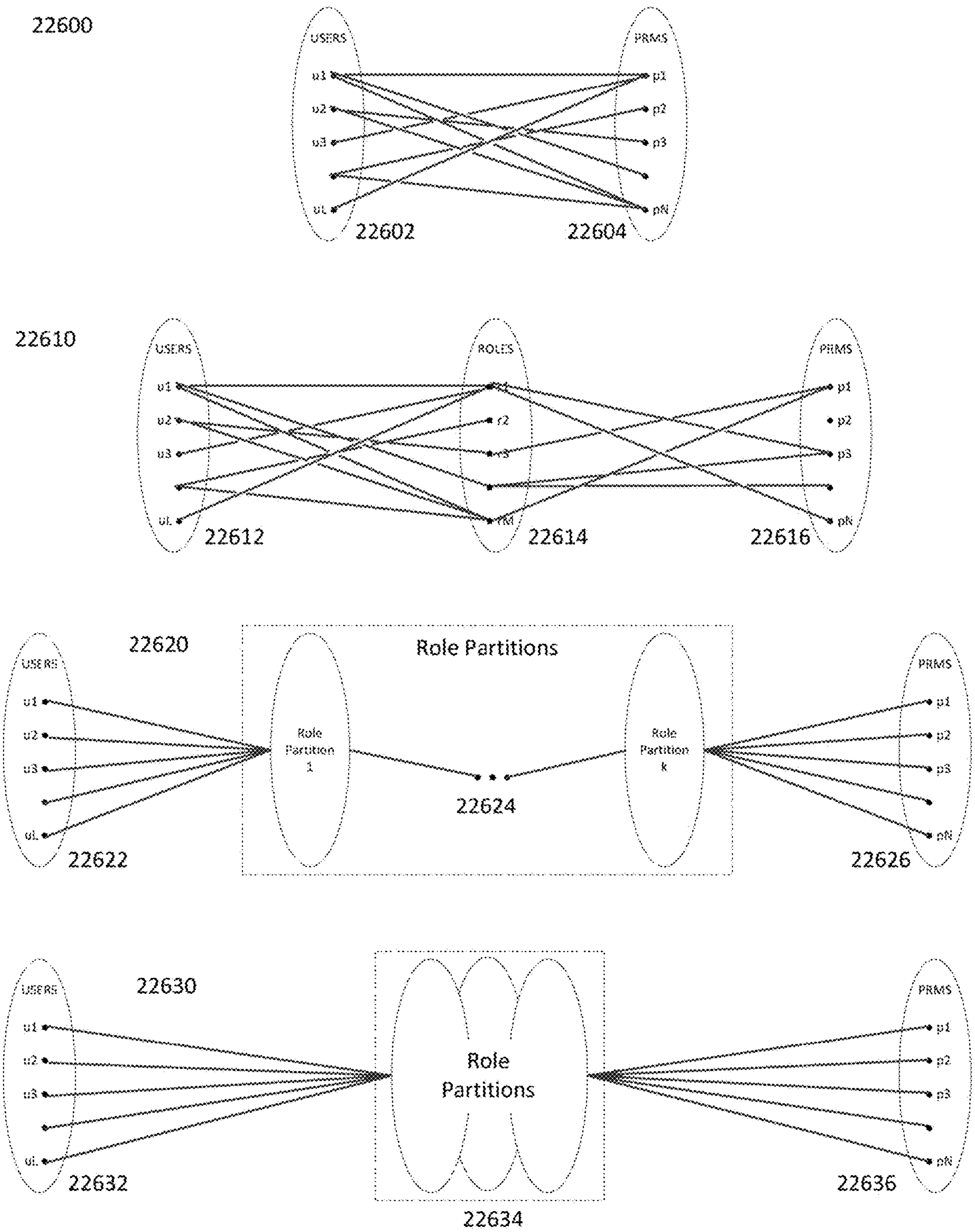

FIG. 226 shows role partitions.

Figure 227:
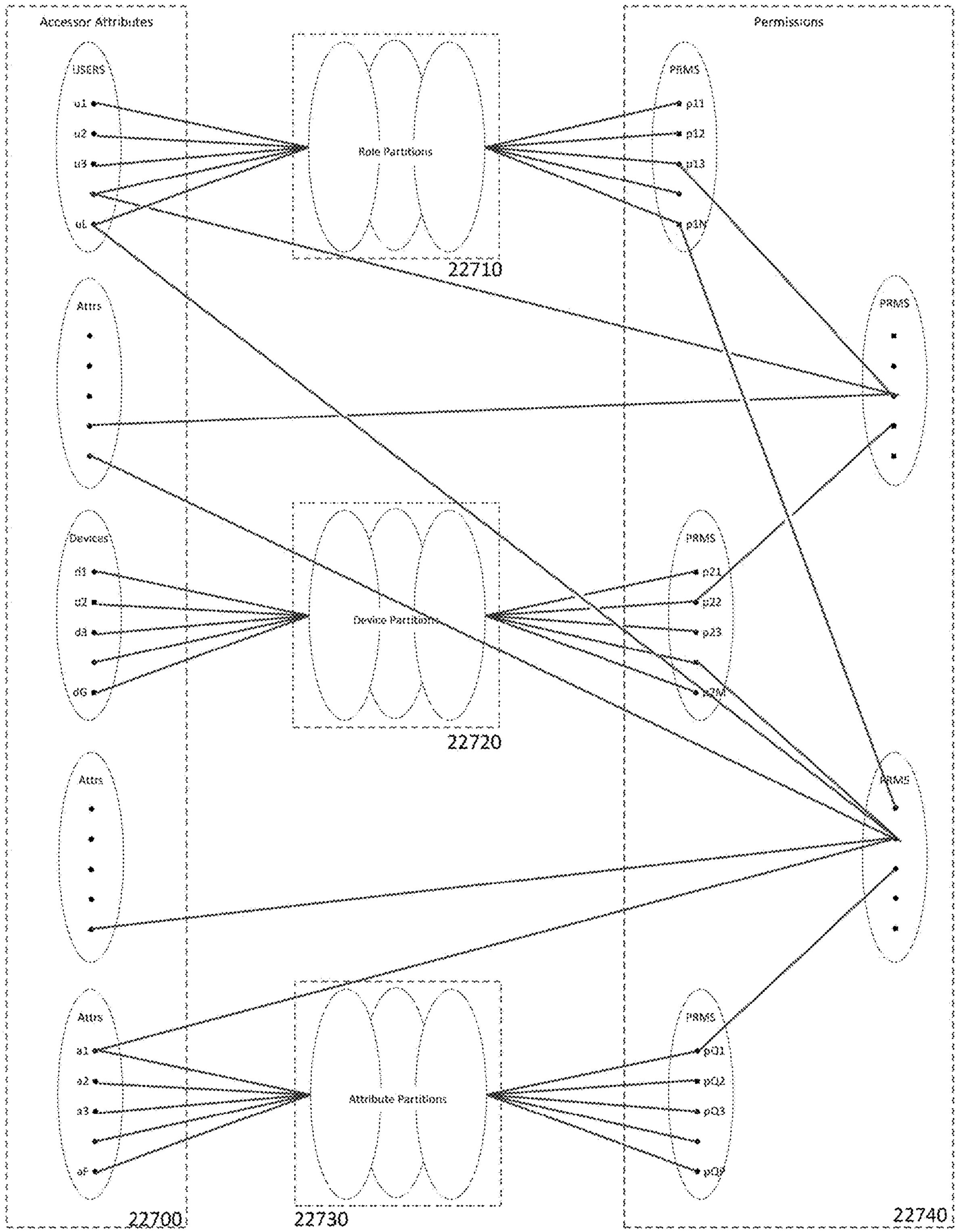

FIG. 227 shows extending the application role partitions to other groupings

Figure 228:
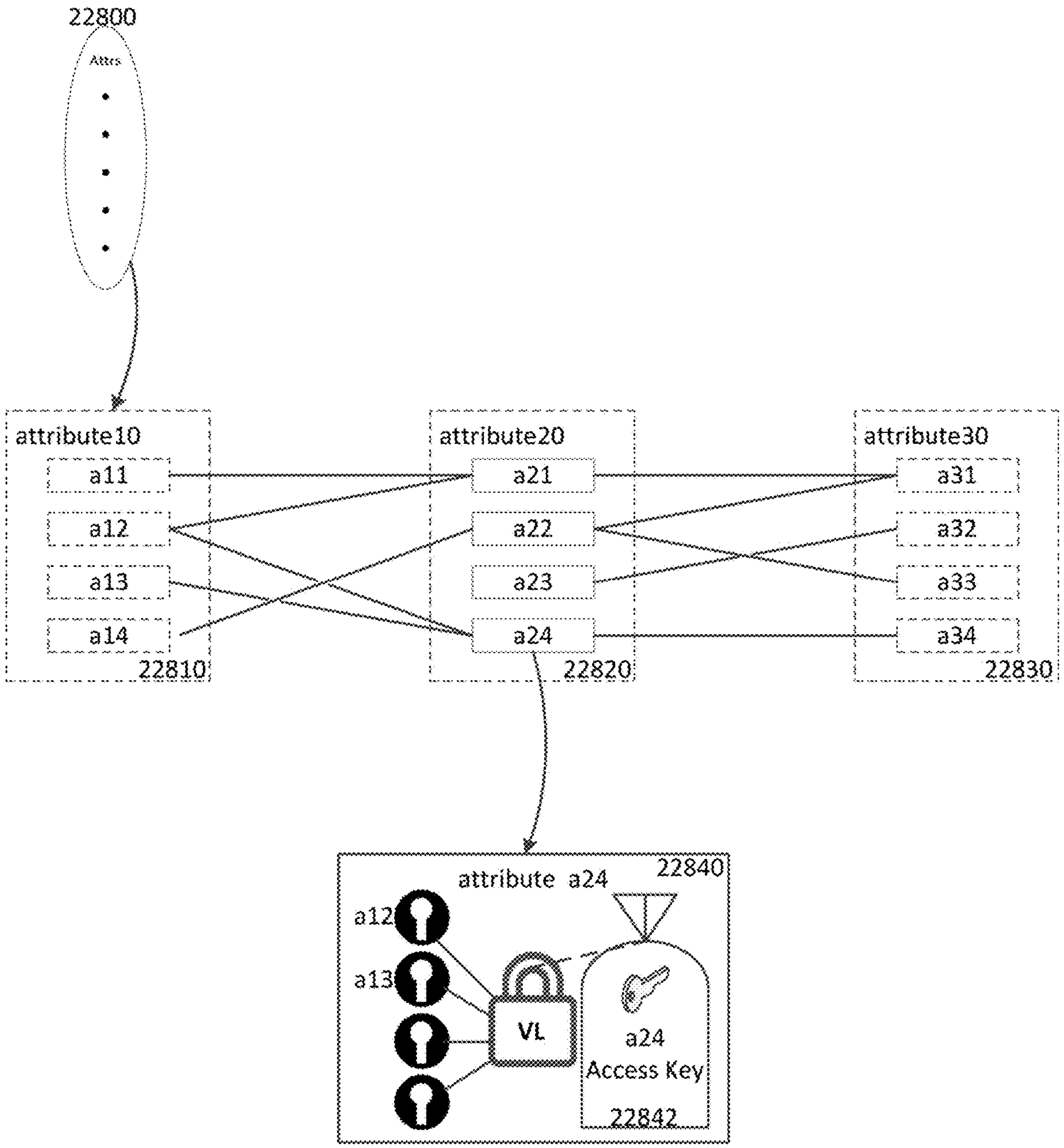

FIG. 228 illustrates the expression of attribute groups using nuts.

Figure 229:
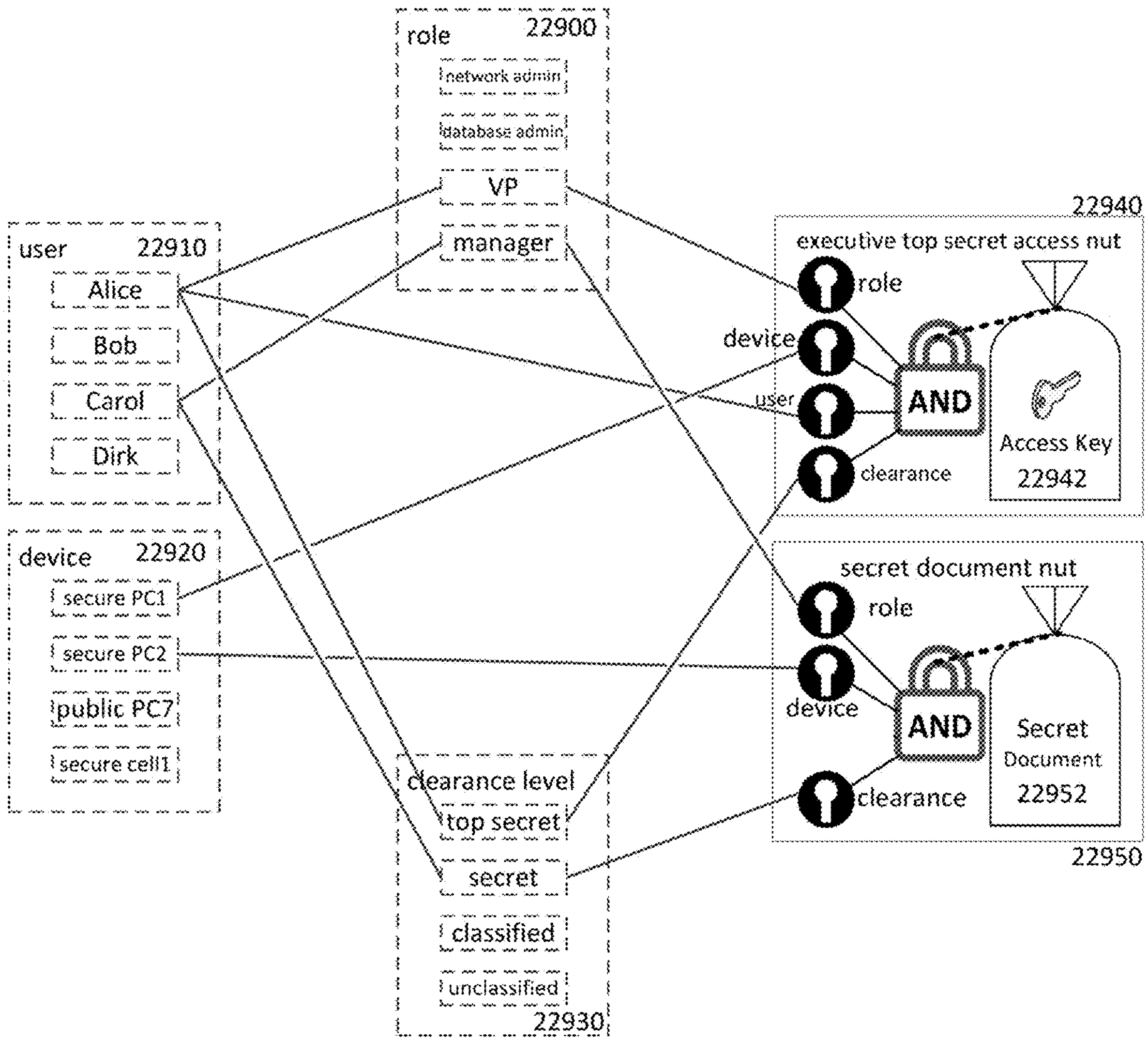

FIG. 229 illustrates the SAF using various attribute groups.

Figure 230:
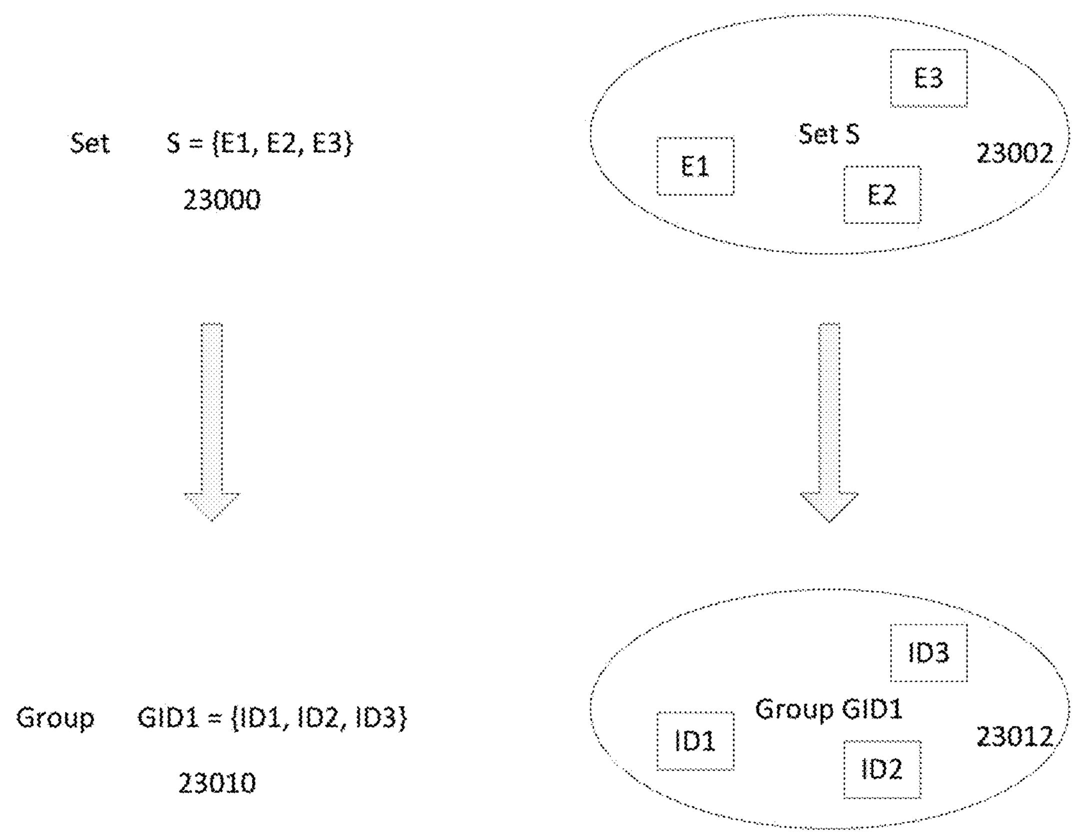

FIG. 230 illustrates sets and groups.

Figure 231:
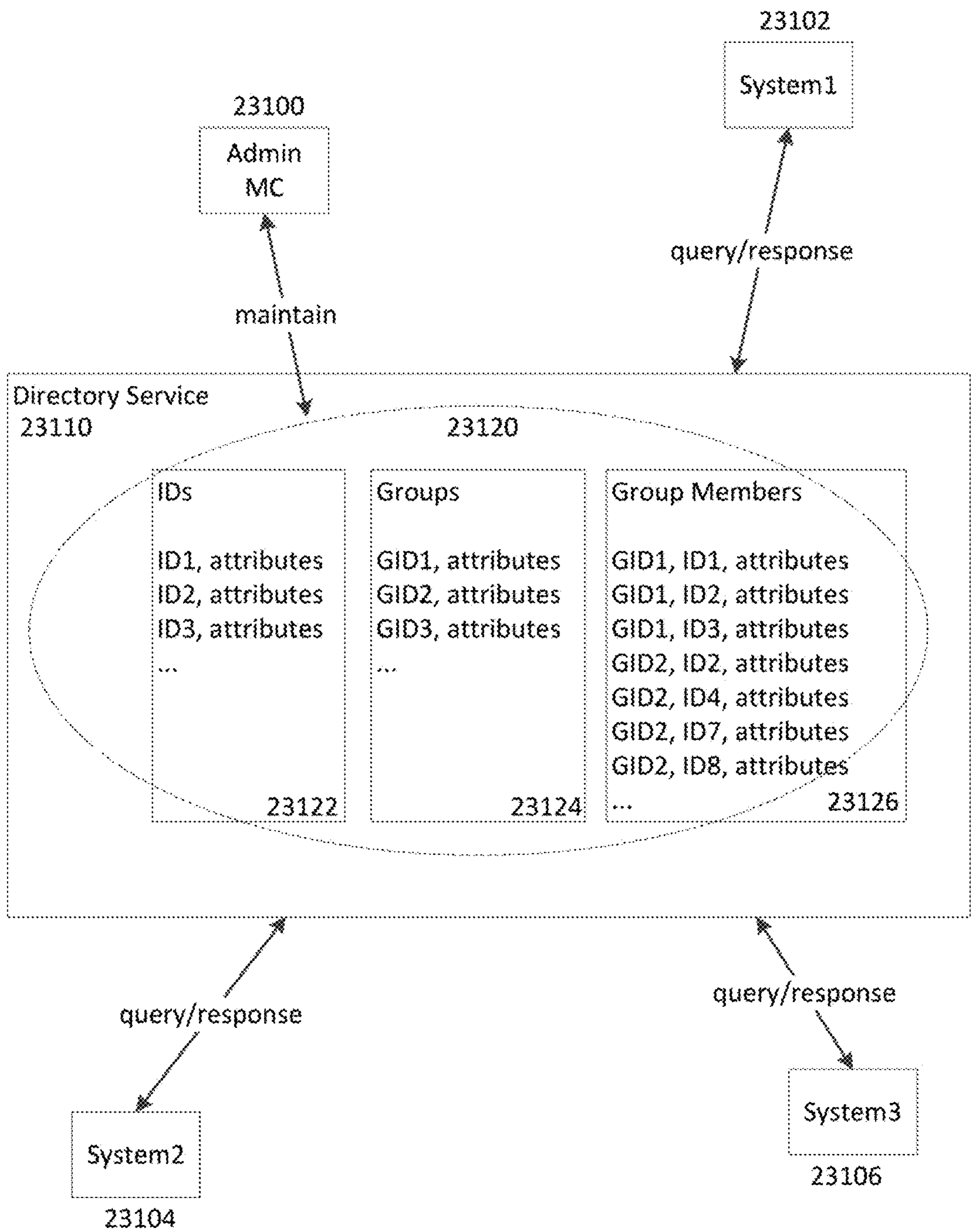

FIG. 231 shows a conventional group management layout.

Figure 232:
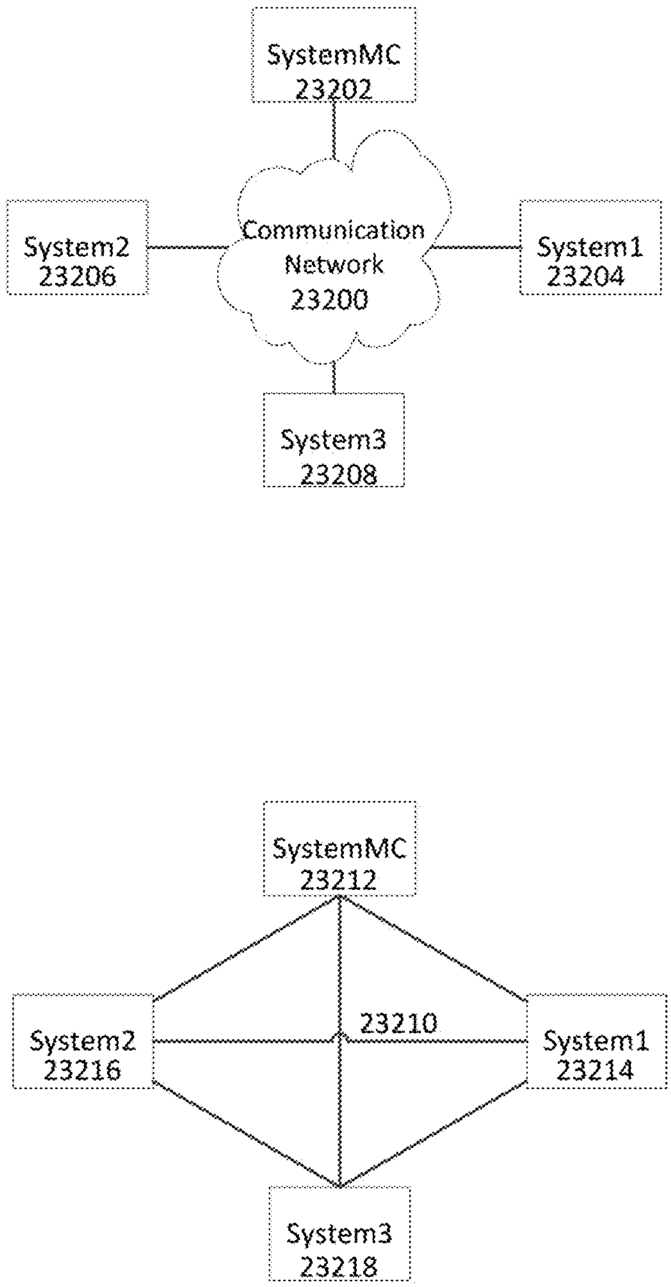

FIG. 232 show two configurations of a system of devices.

Figure 233:
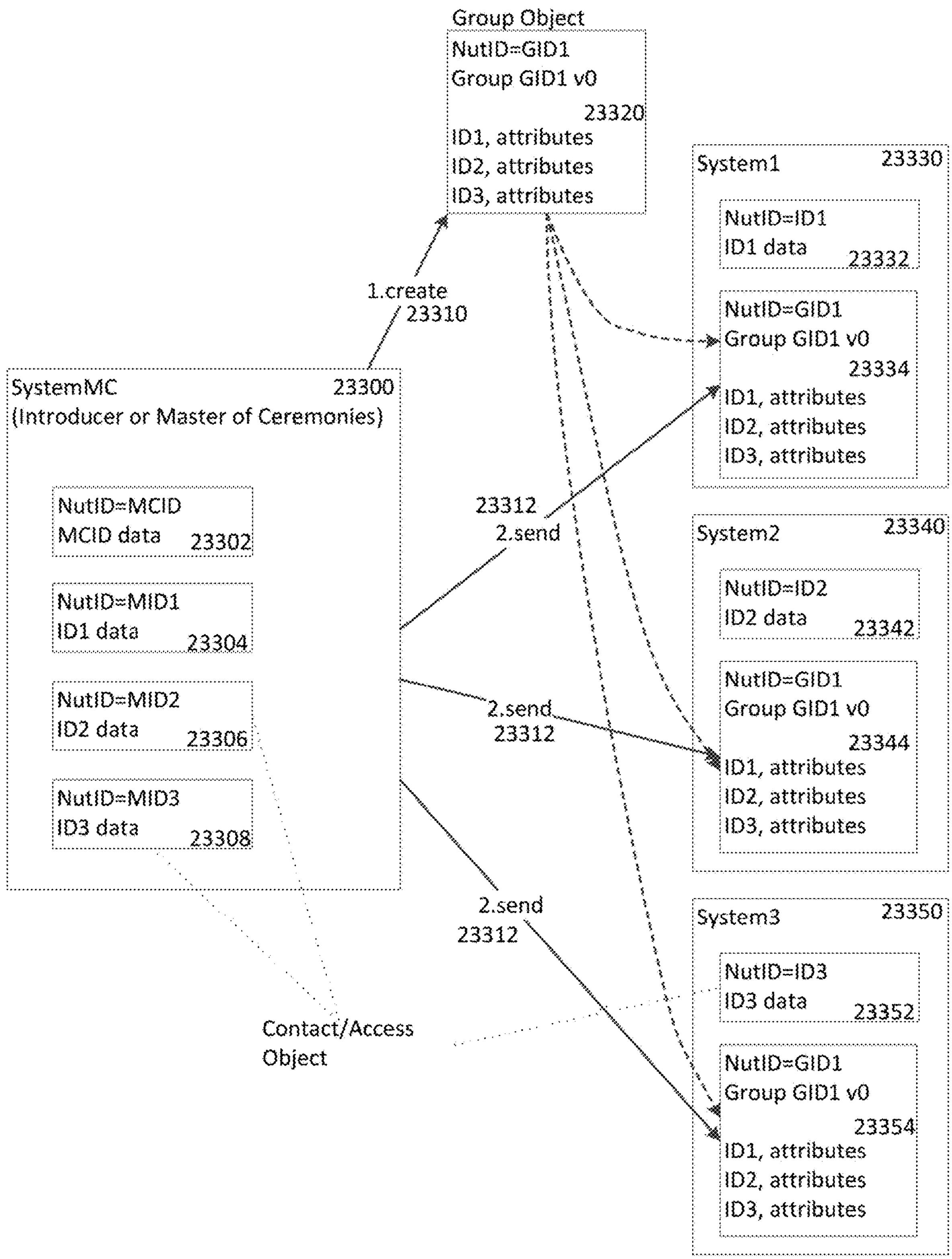

FIG. 233 shows a group object and its relationship to its members.

Figure 234:
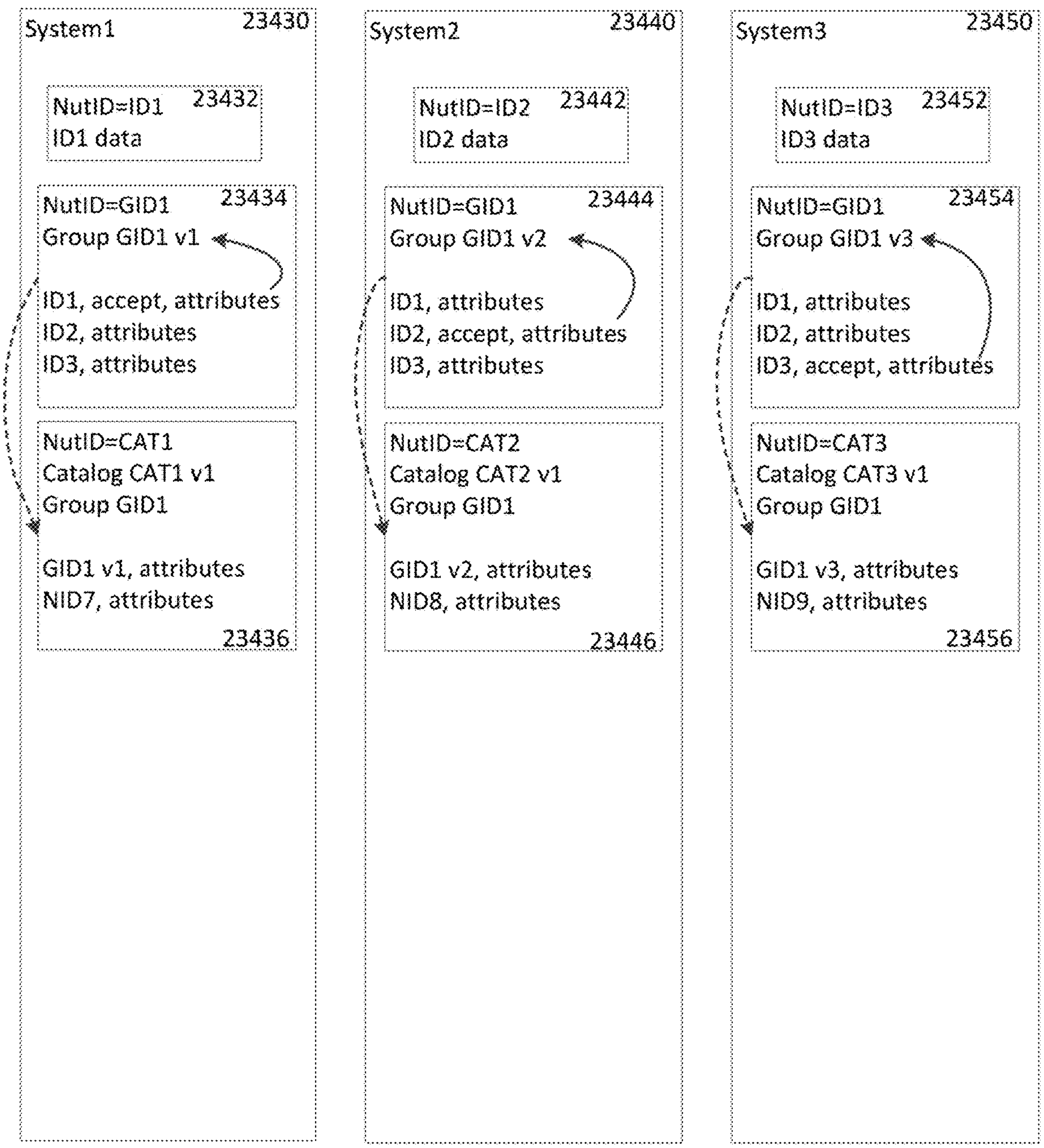

FIG. 234 illustrates group membership acceptance and group catalogs.

Figure 235:
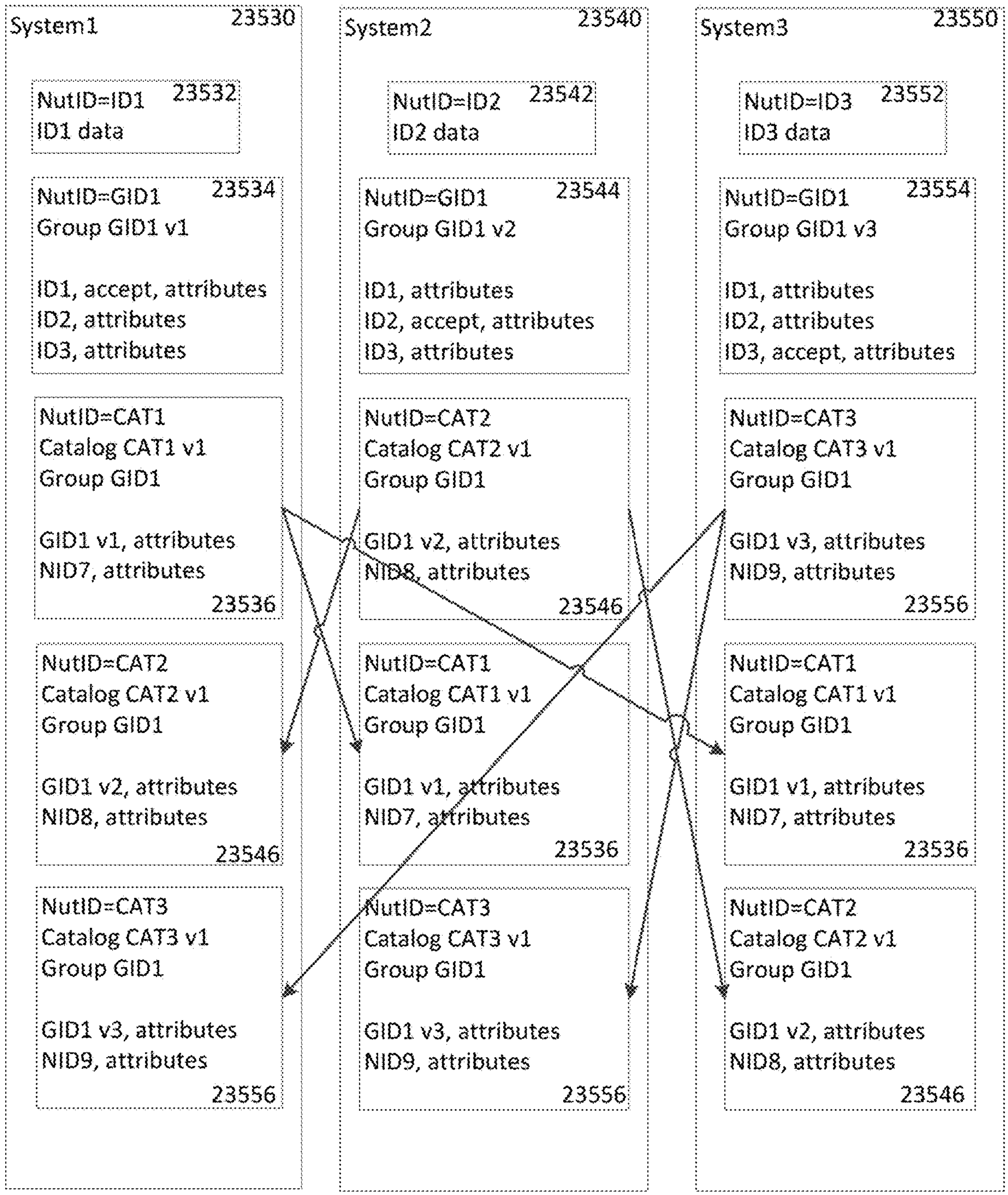

FIG. 235 illustrates how groups poll catalogs.

Figure 236:
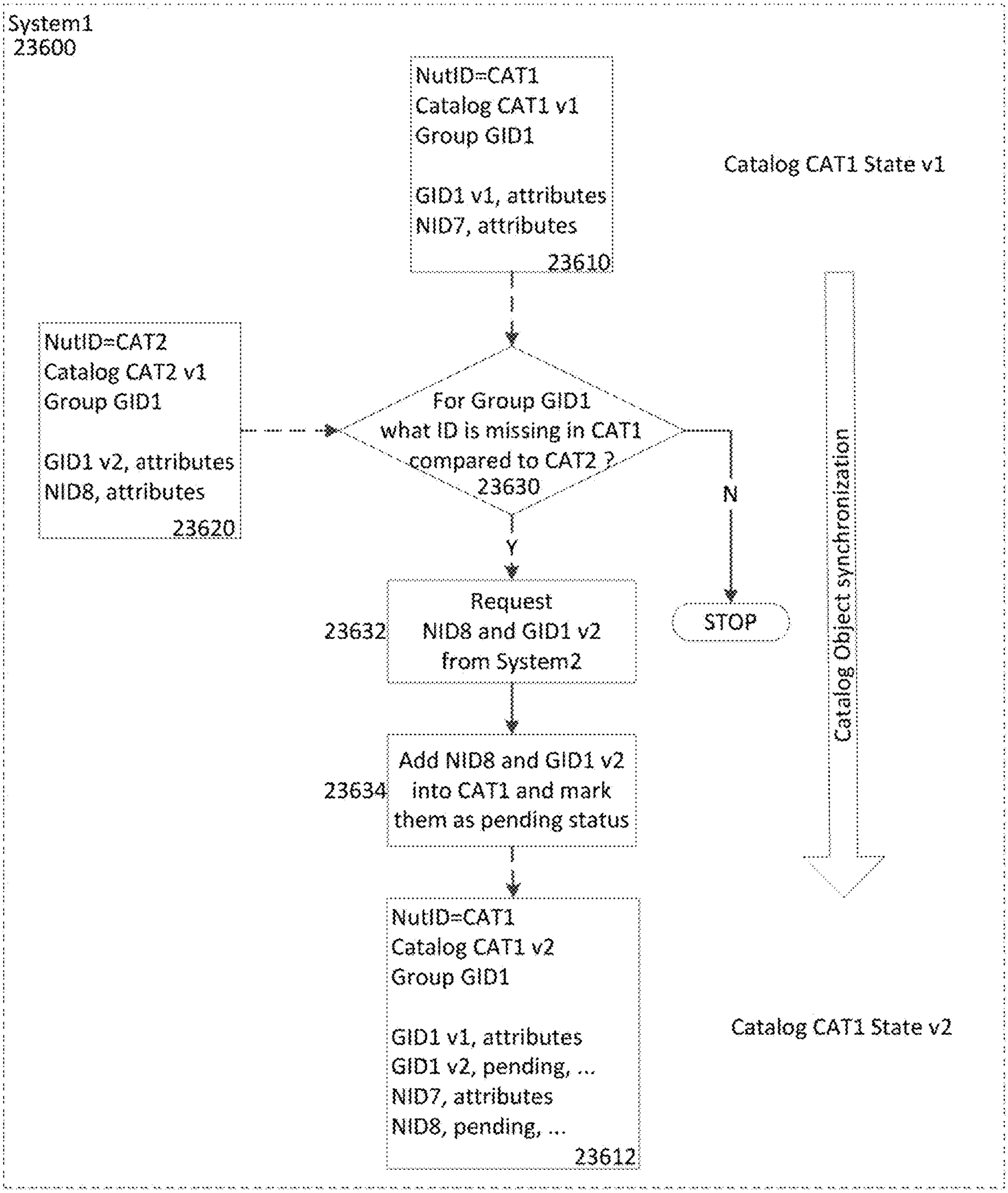

FIG. 236 shows a flowchart to compare a first set of catalogs on System1.

Figure 237:
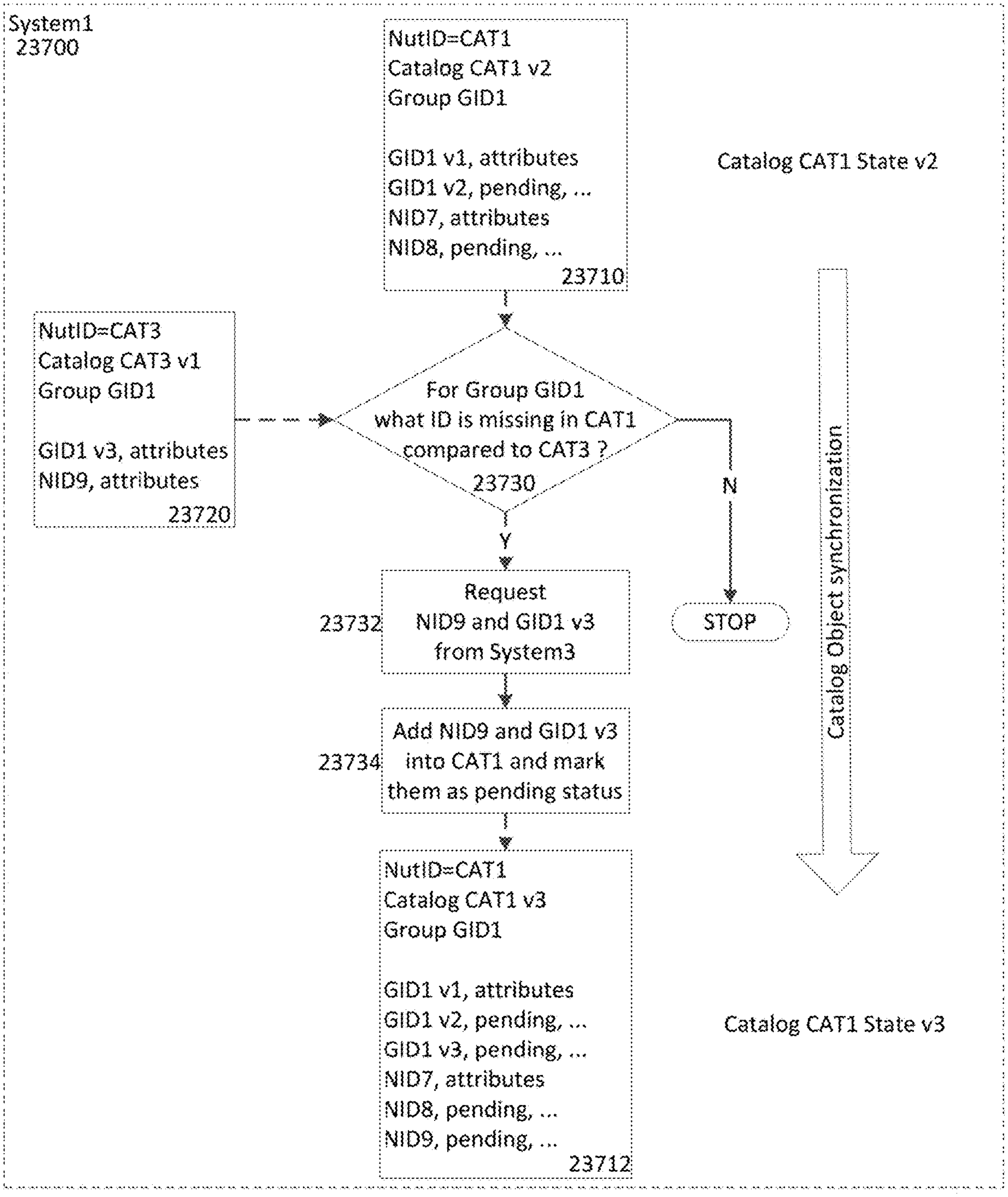

FIG. 237 shows a flowchart to compare a second set of catalogs on System1.

Figure 238:
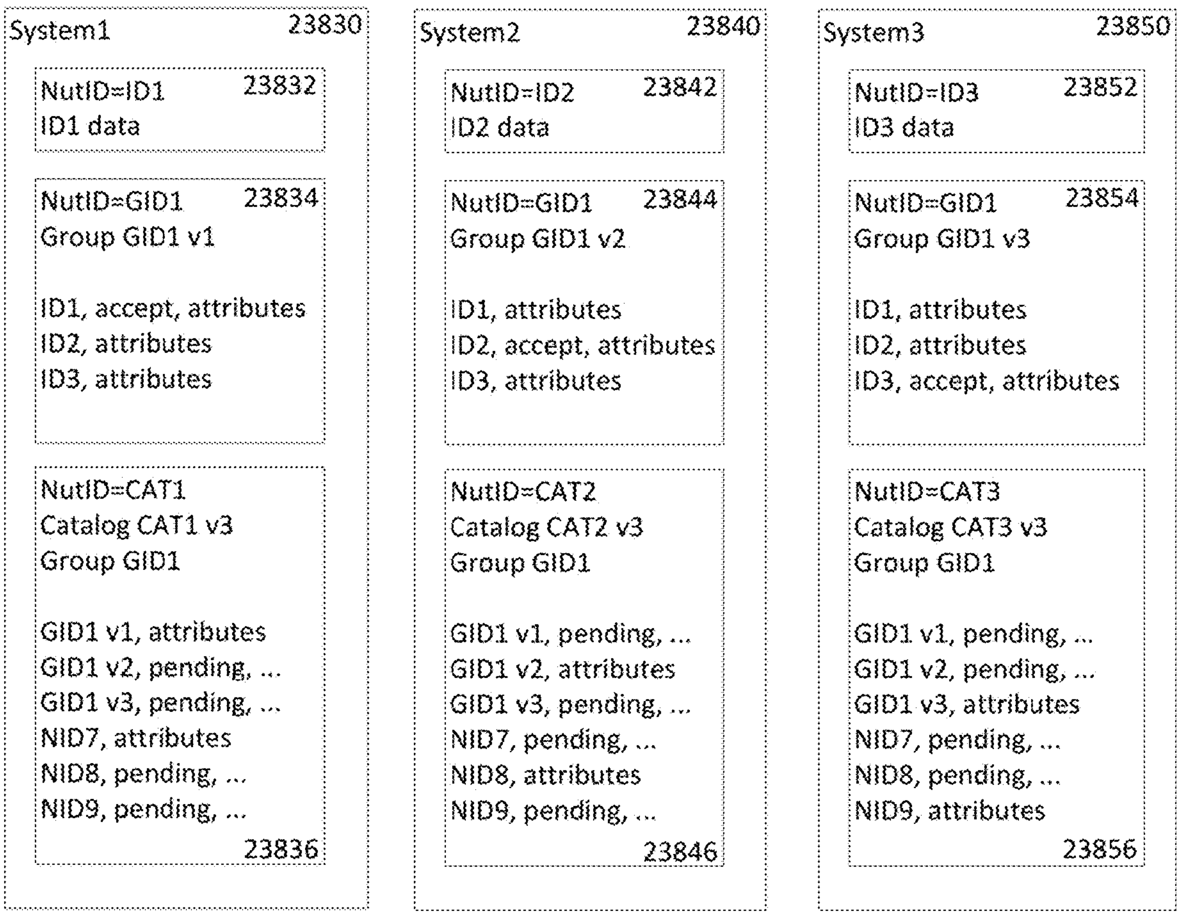

FIG. 238 shows the results of catalog polling and synchronizations.

Figure 239:
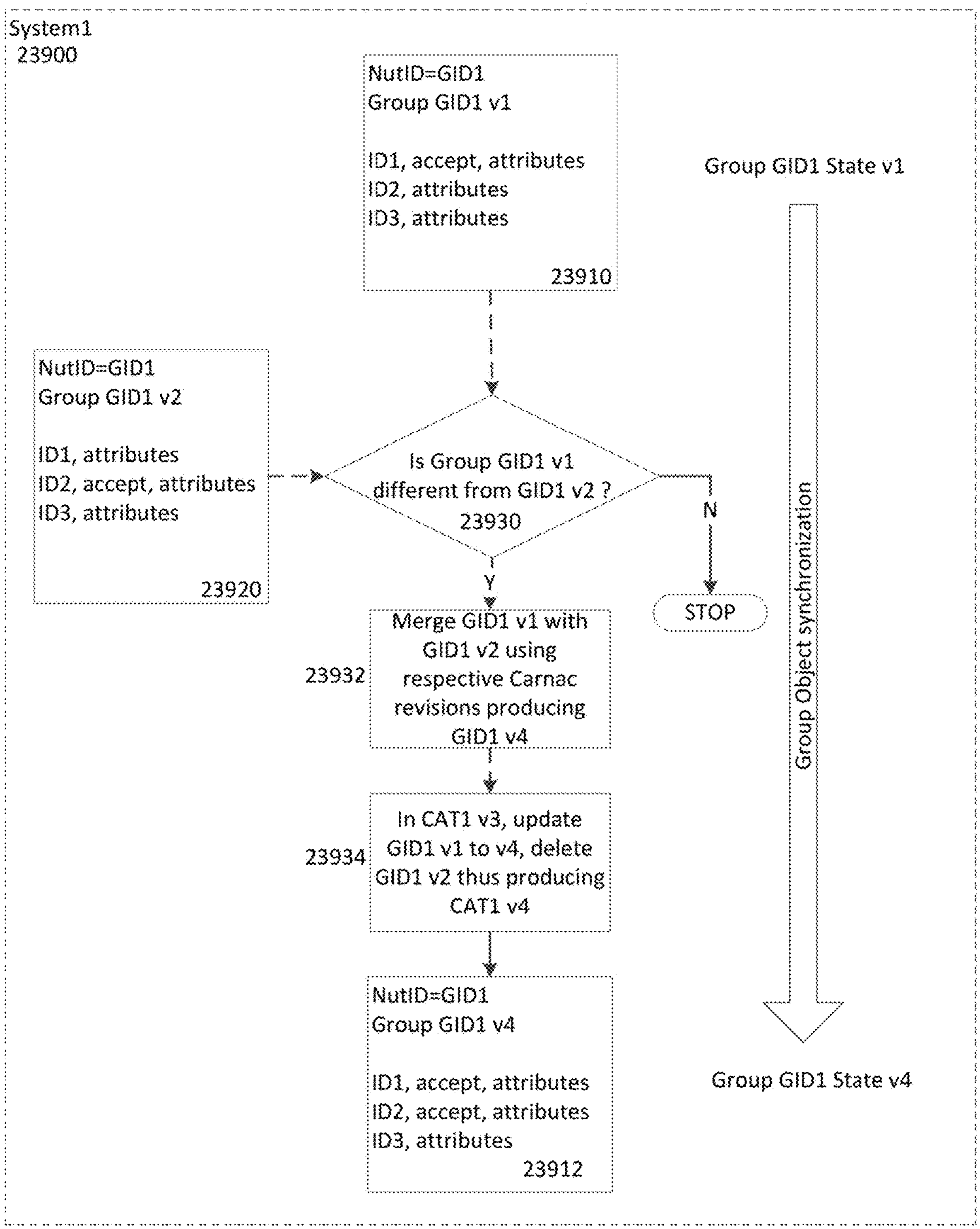

FIG. 239 shows the group object synchronization process on System1.

Figure 240:
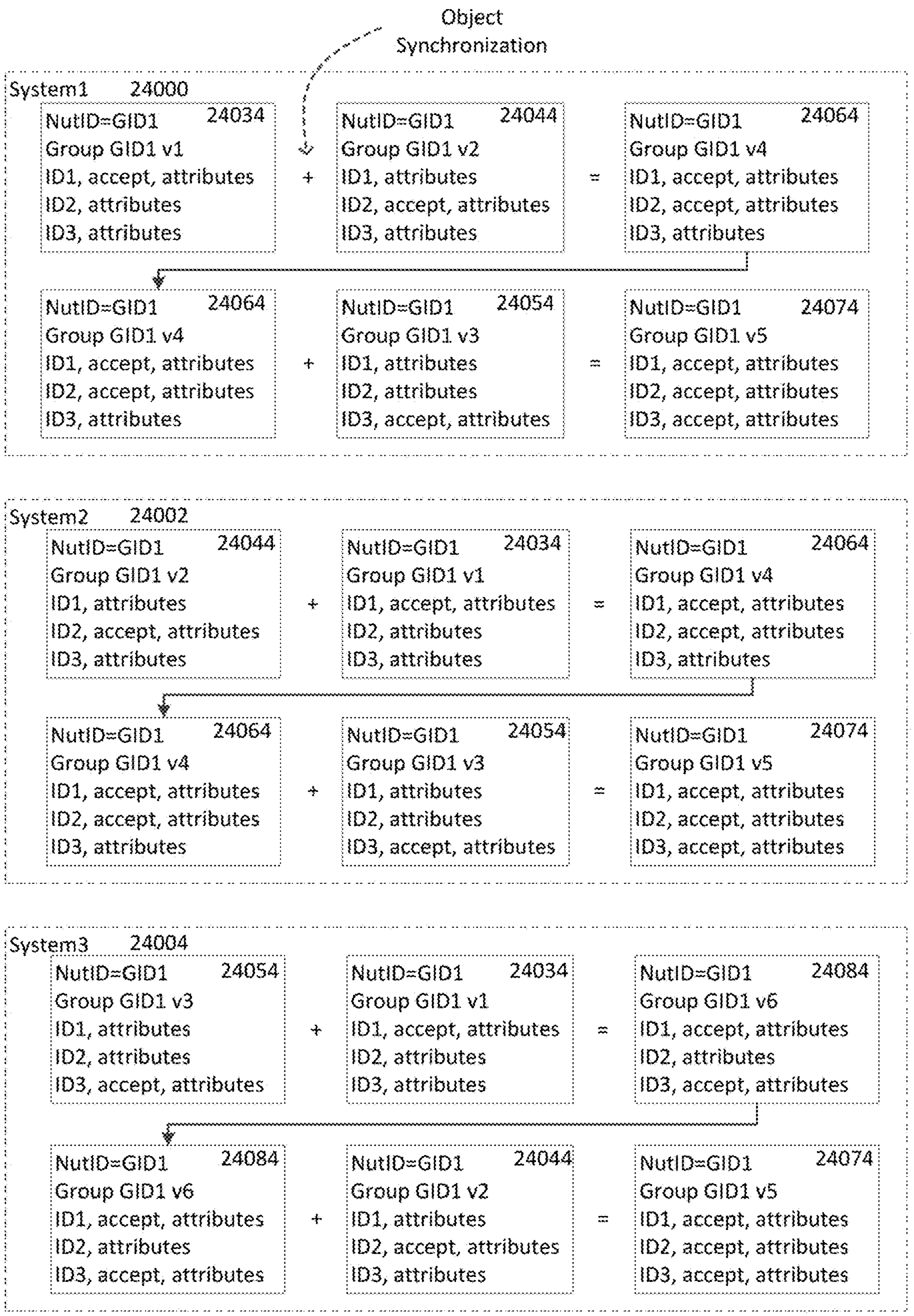

FIG. 240 shows group object synchronization processes across all three systems.

Figure 241:
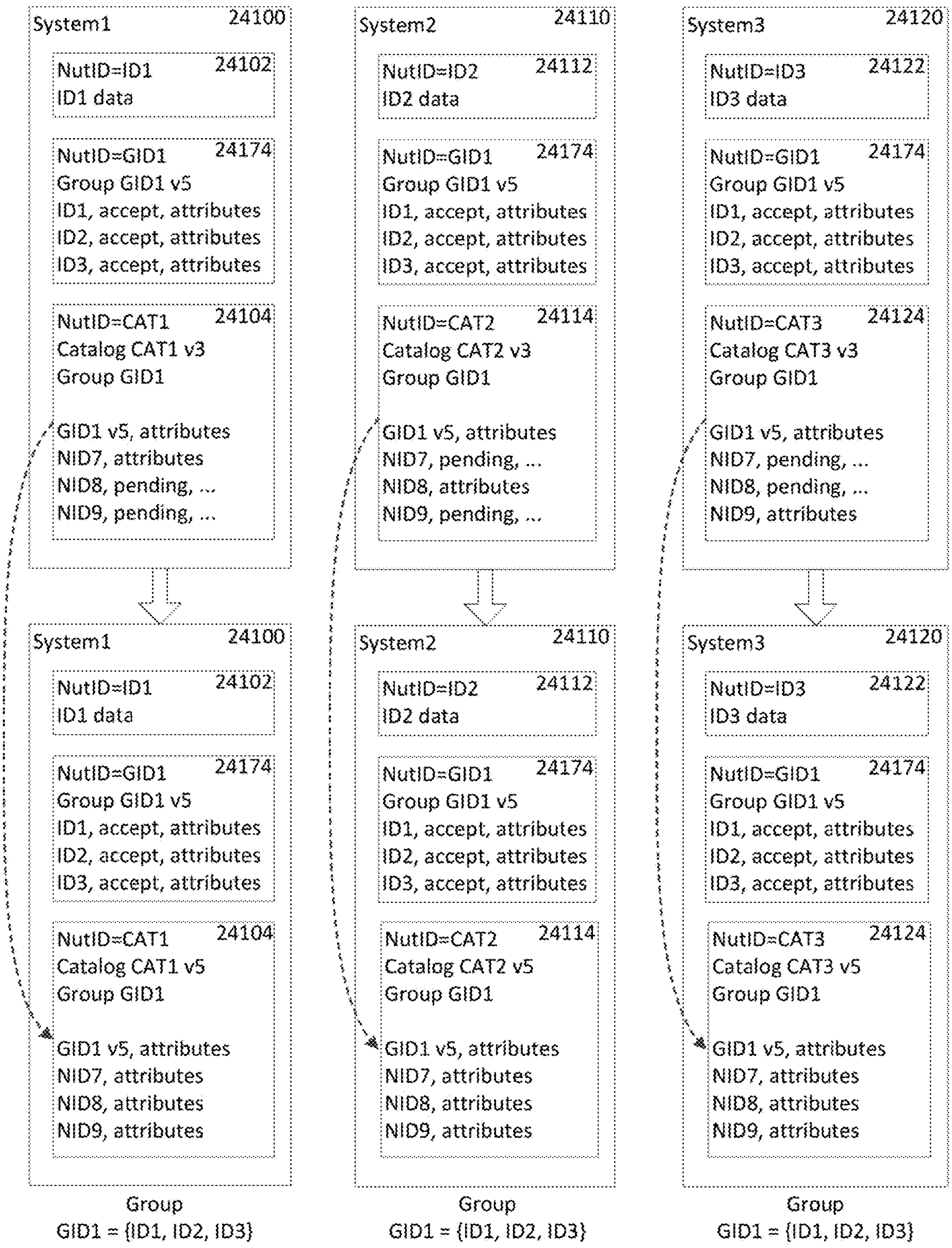

FIG. 241 illustrates the local catalog states being updated after object synchronizations.

Figure 242:
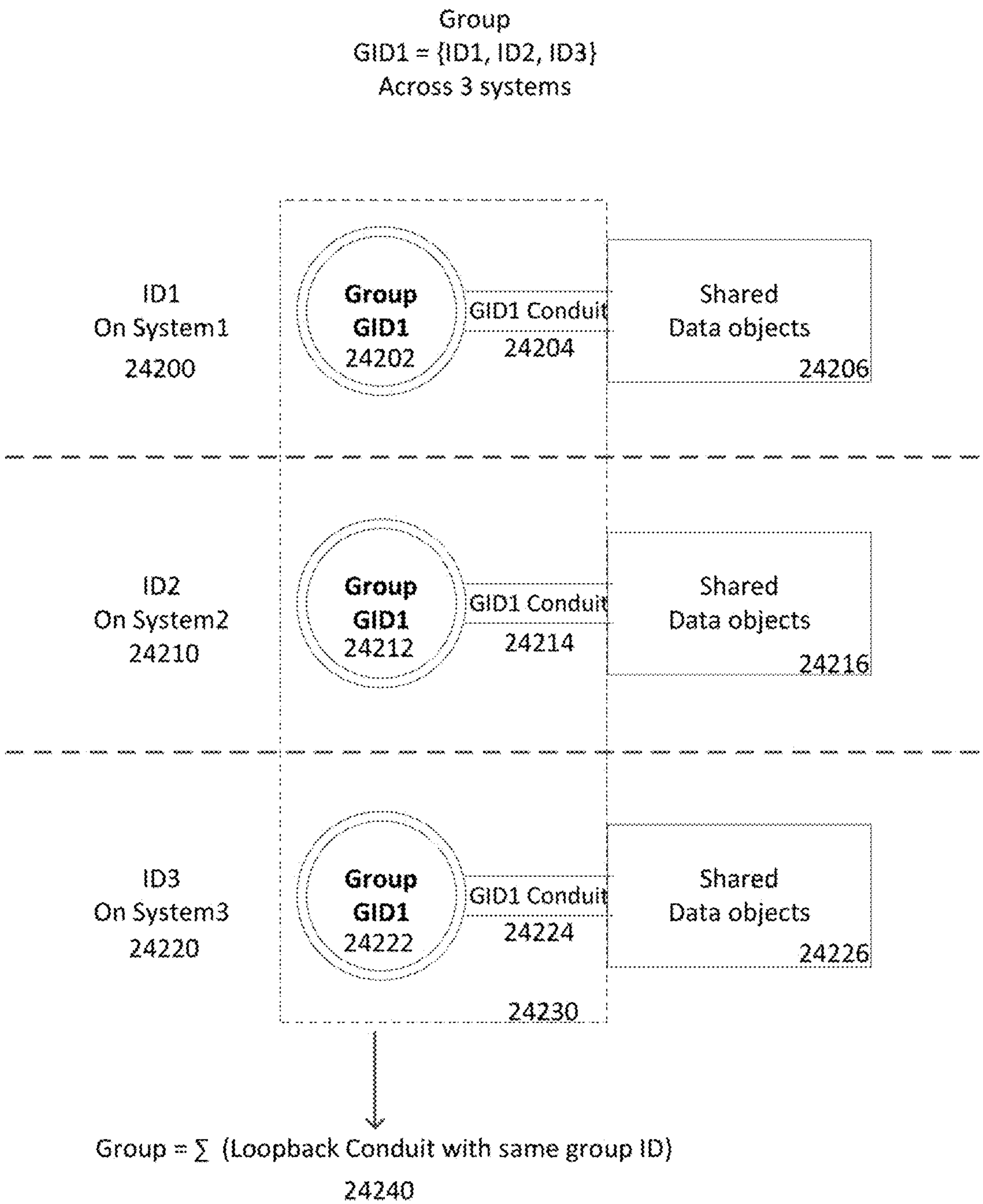

FIG. 242 shows a group defined across three systems using conduits.

Figure 243:
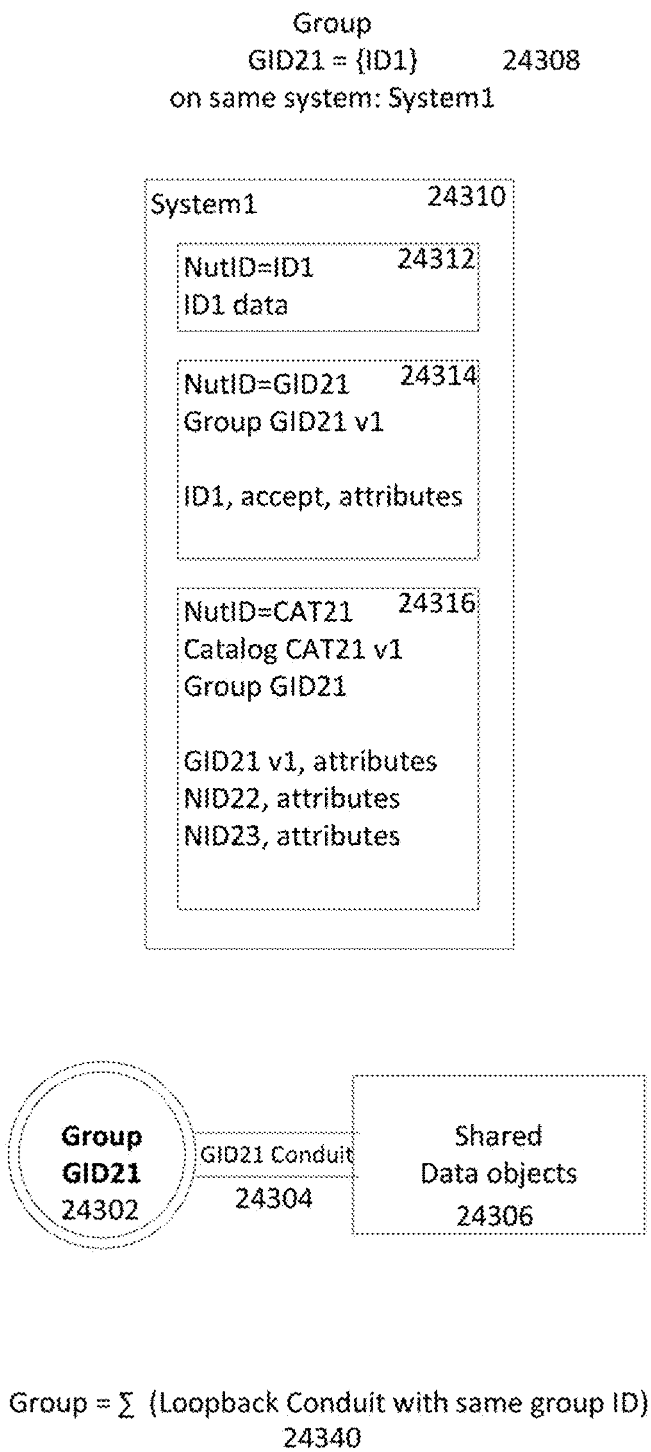

FIG. 243 illustrates a unitary group.

Figure 244:
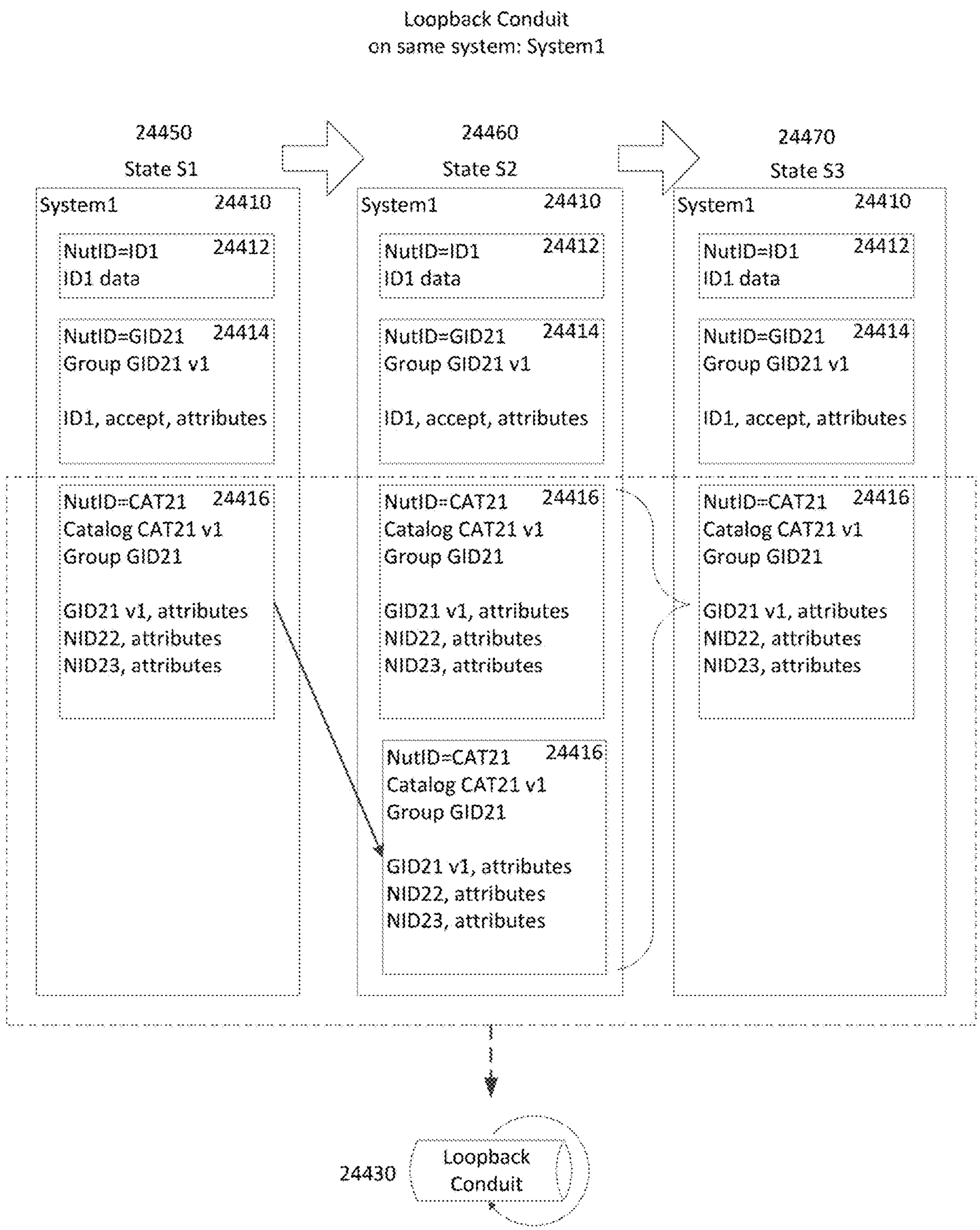

FIG. 244 shows how a loopback conduit works for a unitary group.

Figure 245:
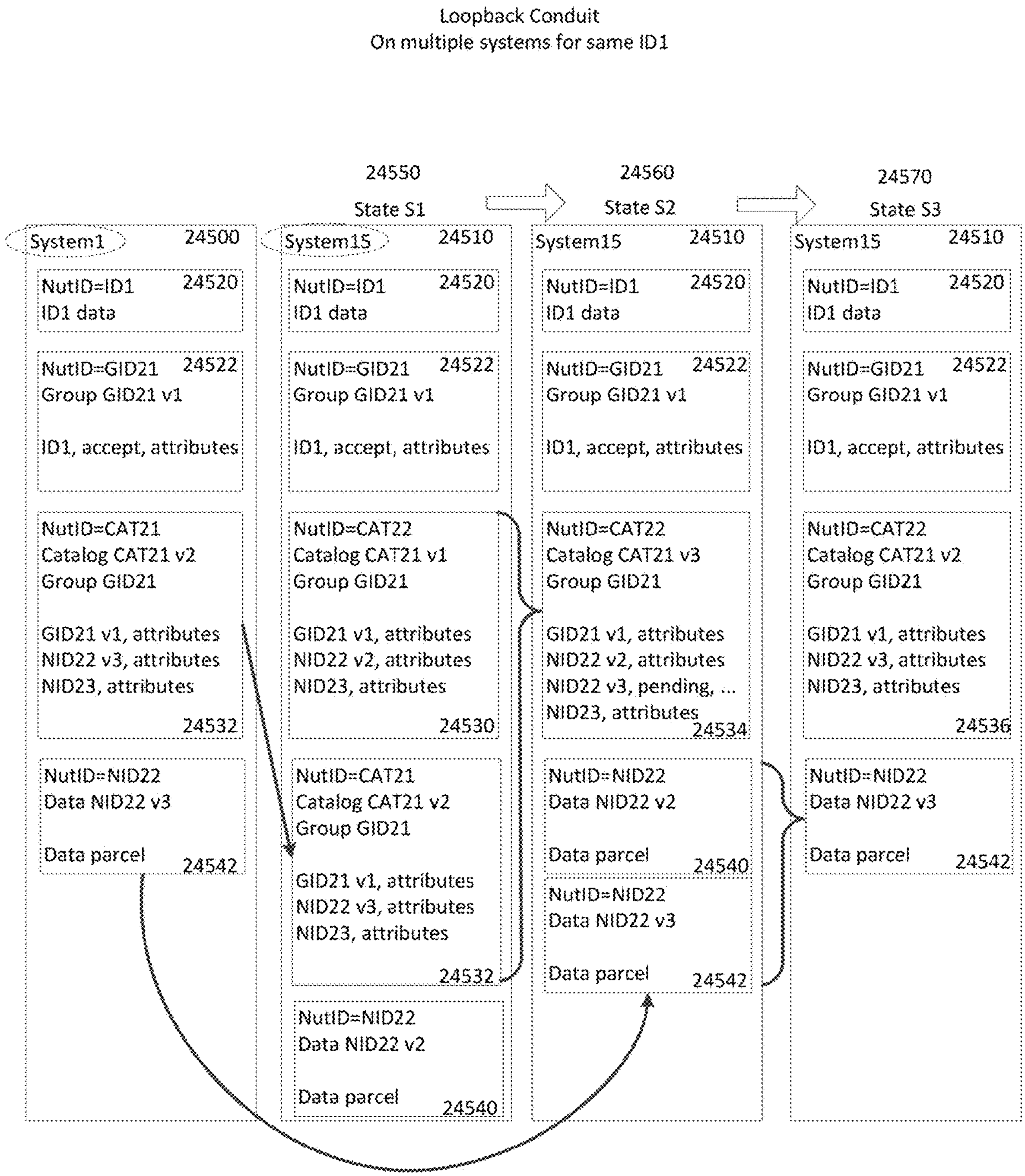

FIG. 245 shows how a loopback conduit works for a unitary group on two systems.

Figure 246:
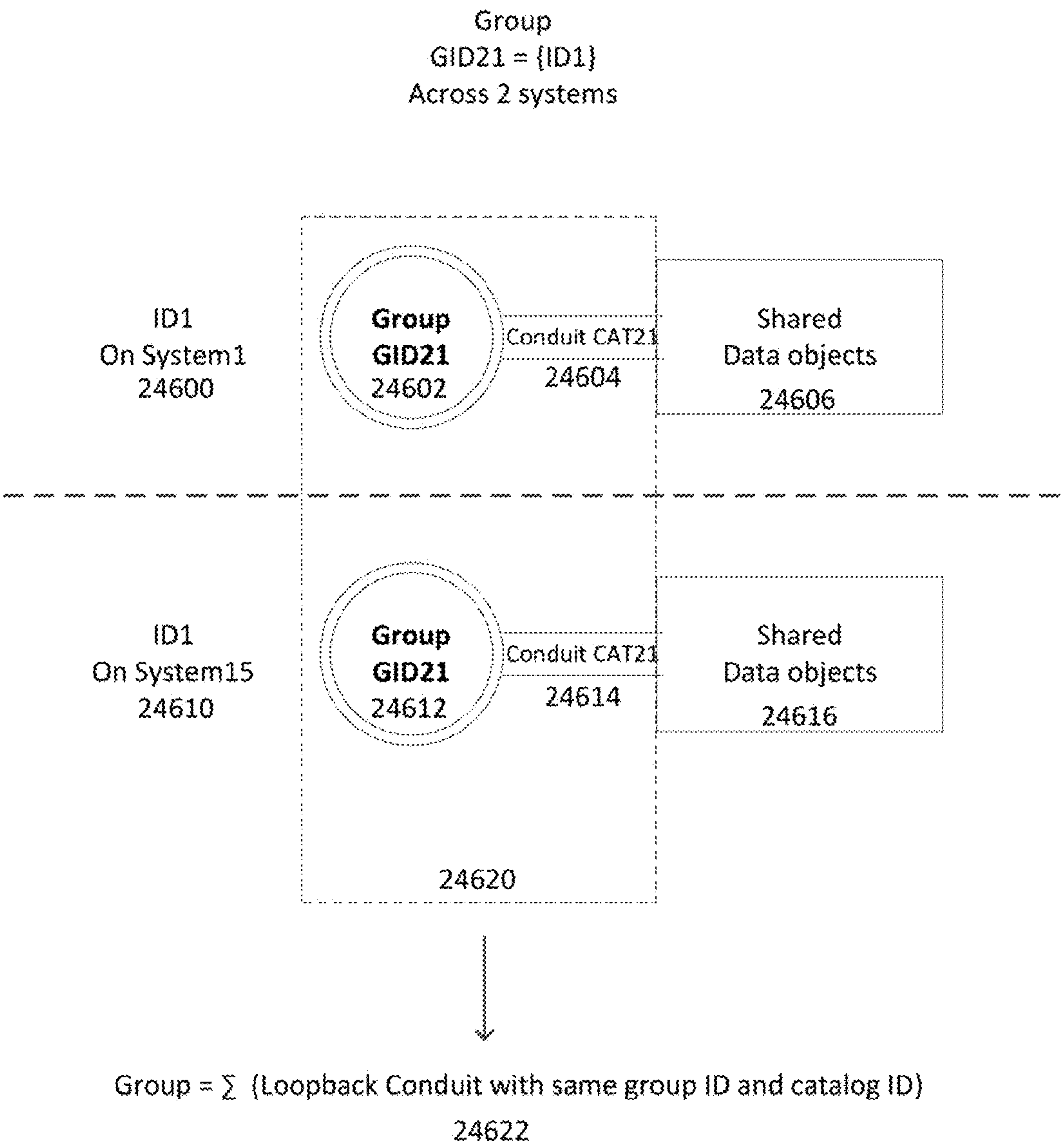

FIG. 246 shows a schematic view of a unitary group across two systems.

FIG. 247 shows the logical state of a system hosting two different groups.

Figure 248:
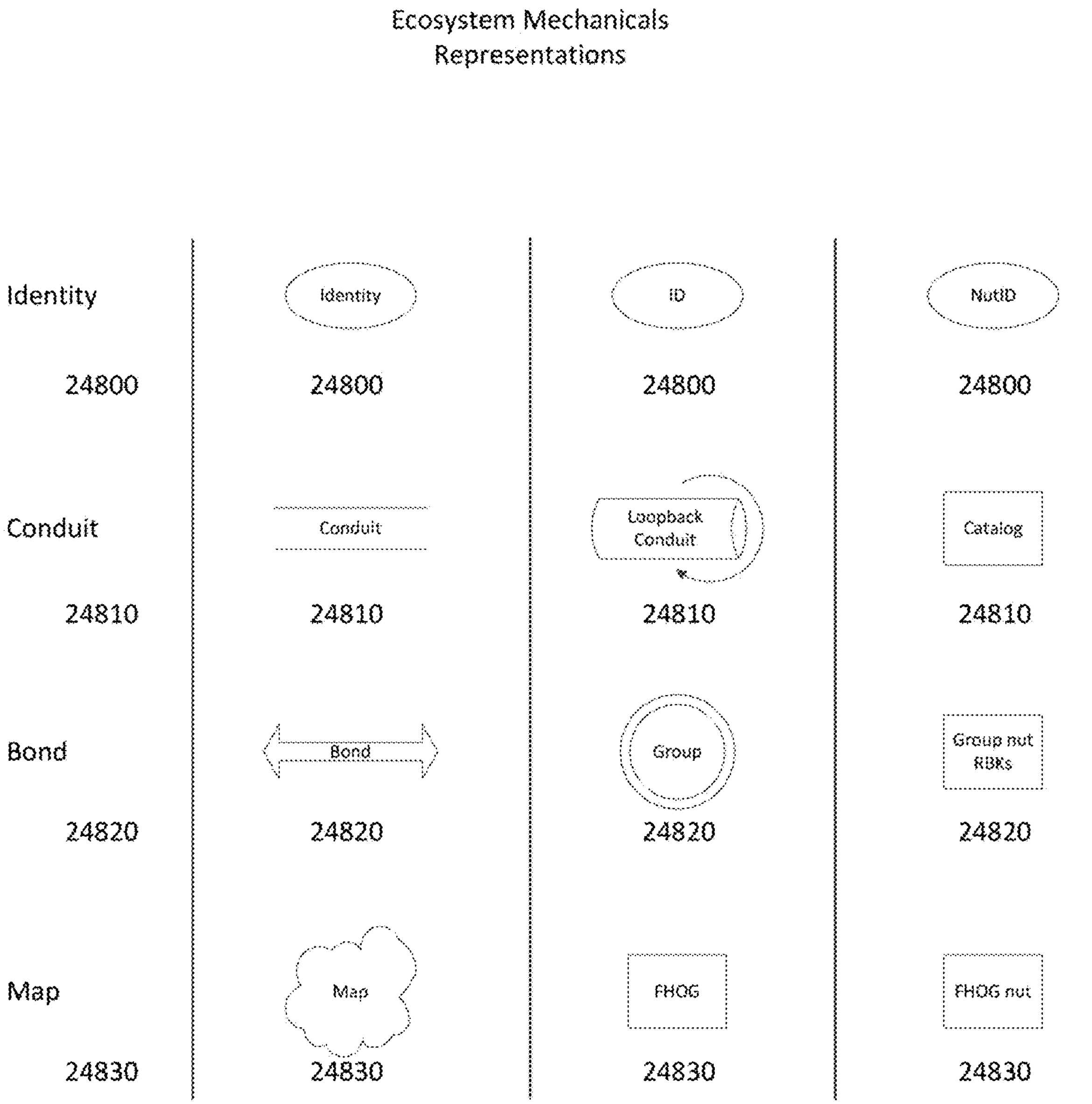

FIG. 248 categorizes the ICBM components of a NUTS ecosystem with regard to groups and synchronization.

Figure 249:
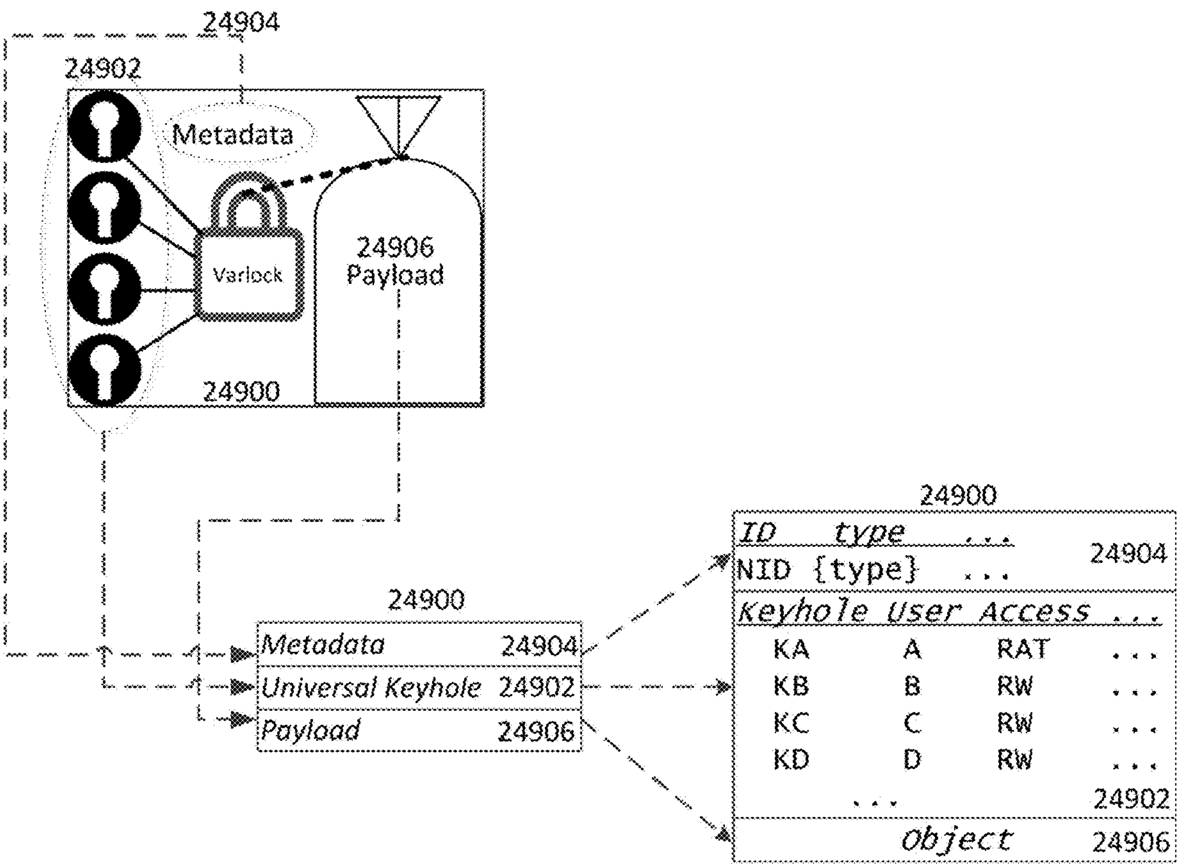

FIG. 249 illustrates representations of a nut and some of its parts.

Figure 250:
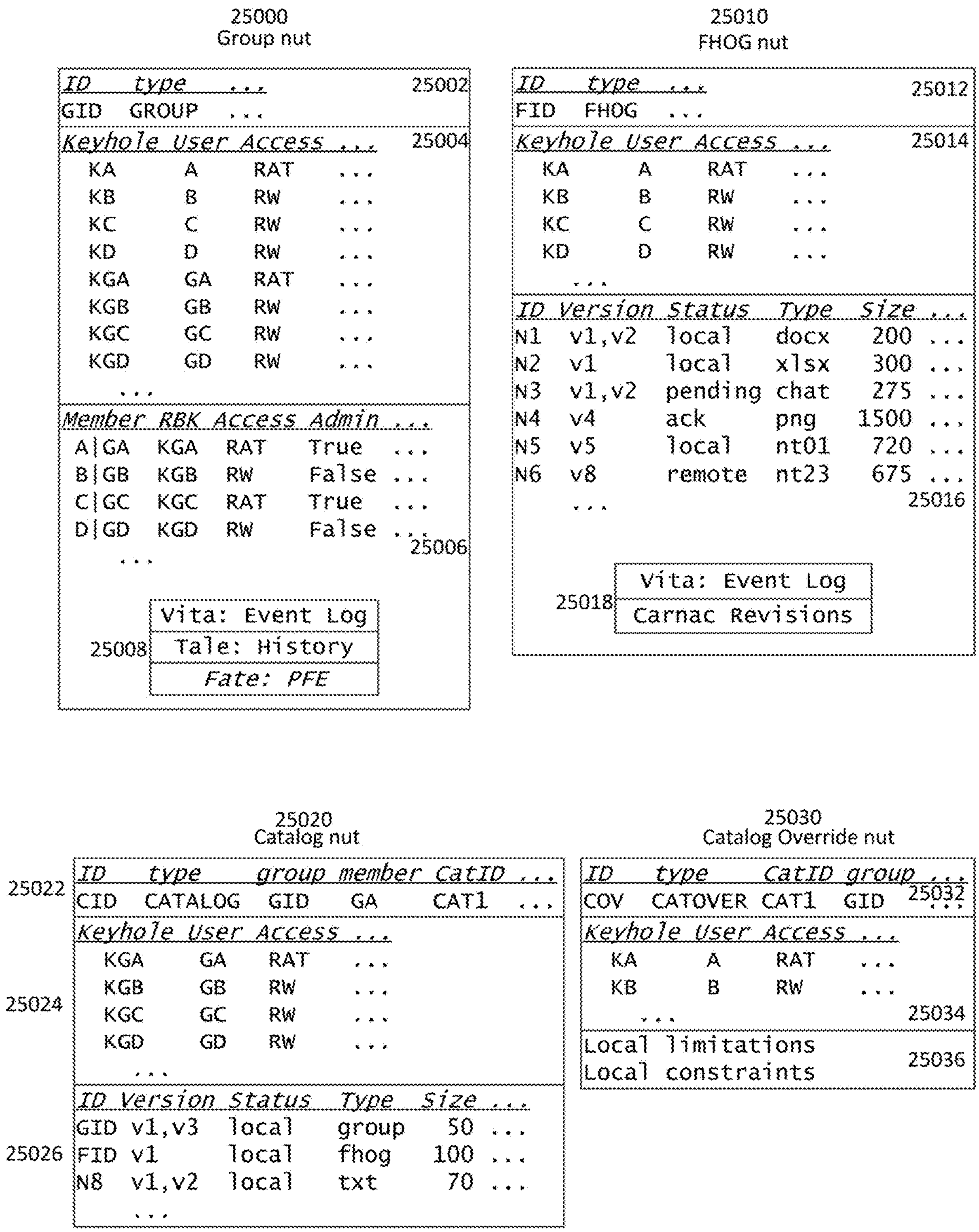

FIG. 250 shows examples of a group, FHOG, catalog and catalog override nuts.

Figure 251:
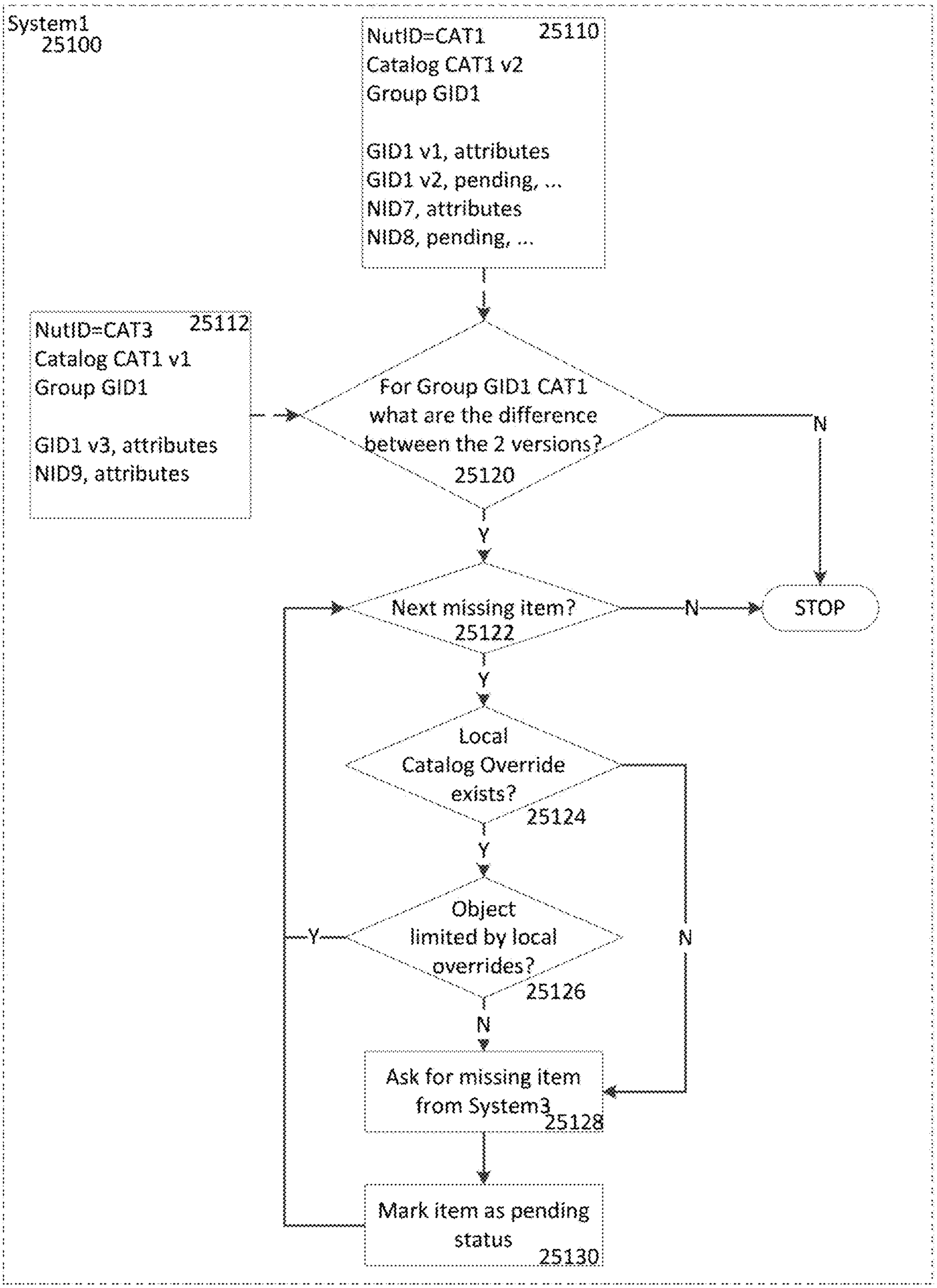

FIG. 251 shows a flowchart for processing catalog overrides during a catalog compare on System1.

FIG. 252 shows examples where groups are synchronized using nuts.

Figure 253:
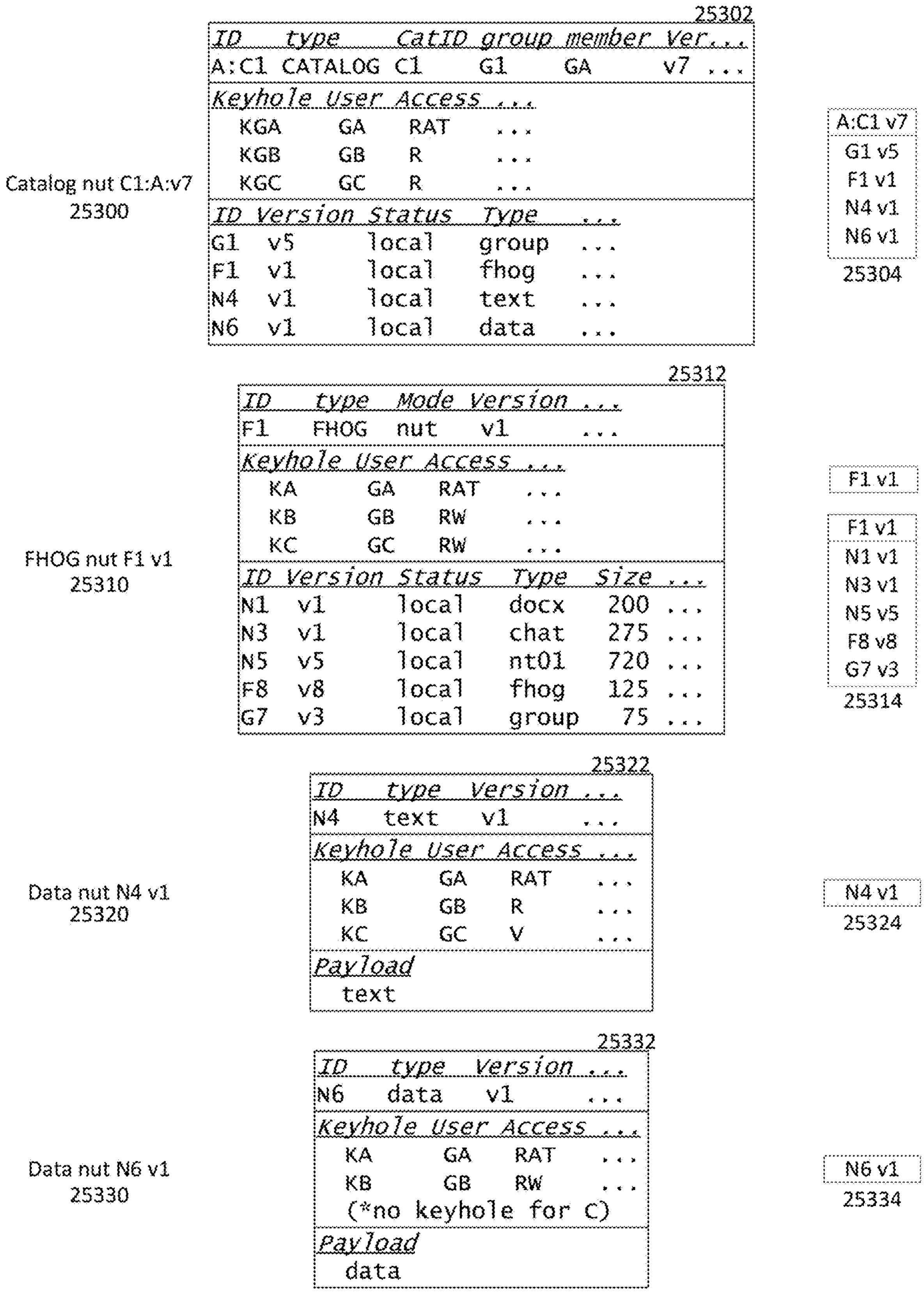

FIG. 253 shows nuts to be used by the example of FIG. 252.

Figure 254:
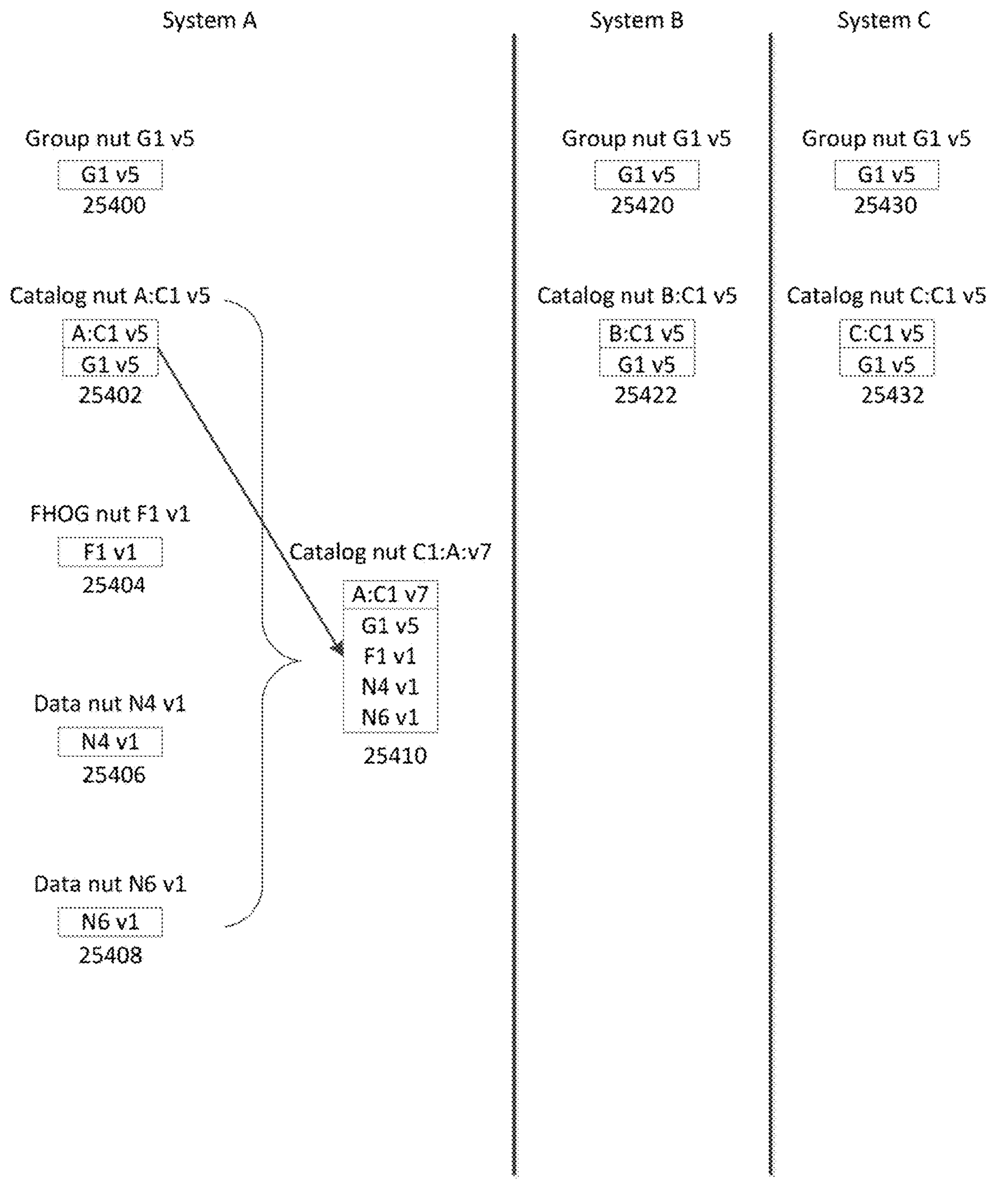

FIG. 254 shows the initial phase of a nuts-based group synchronization example.

Figure 255:
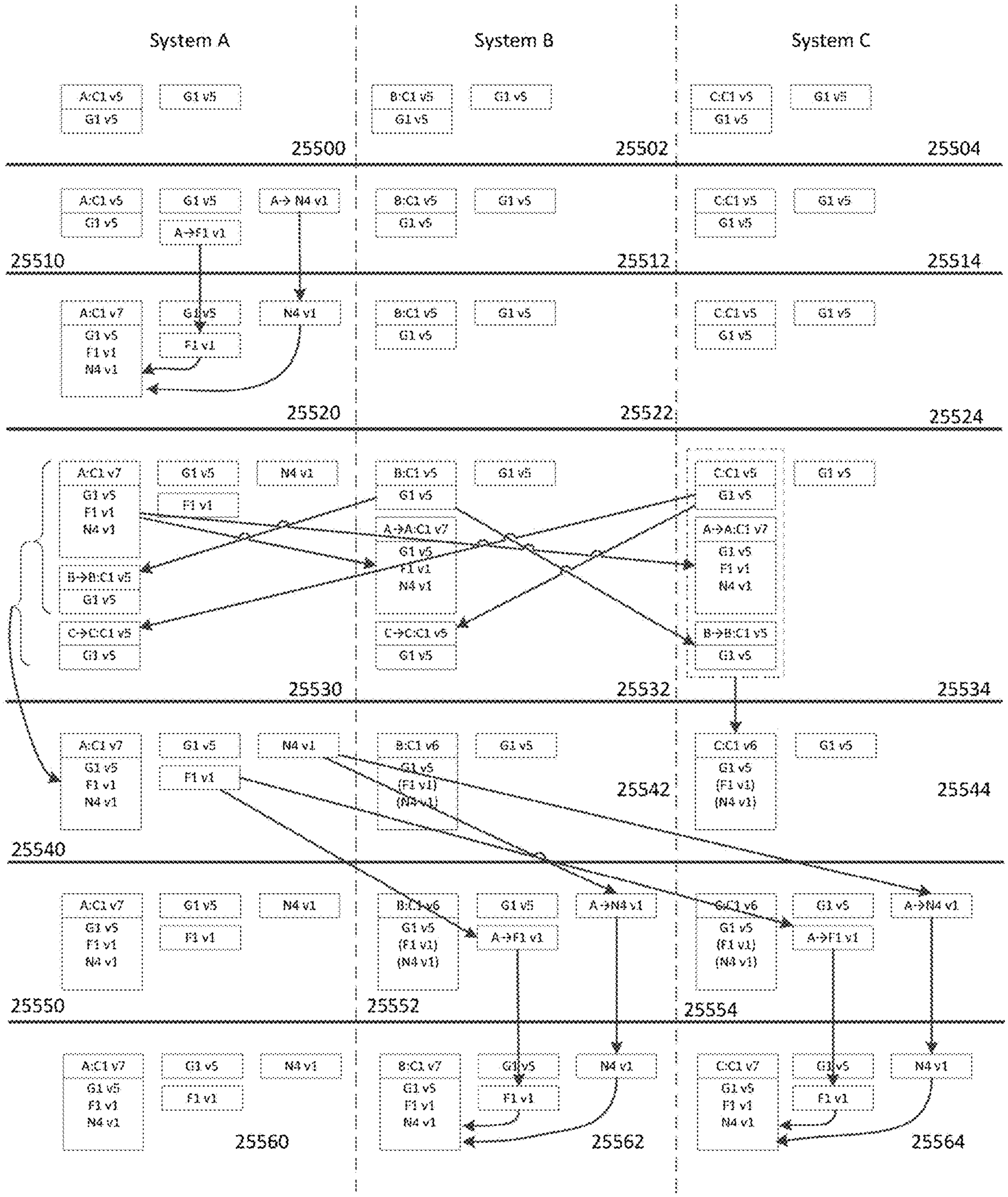

FIG. 255 shows the first panel set of group synchronization transitions.

Figure 256:
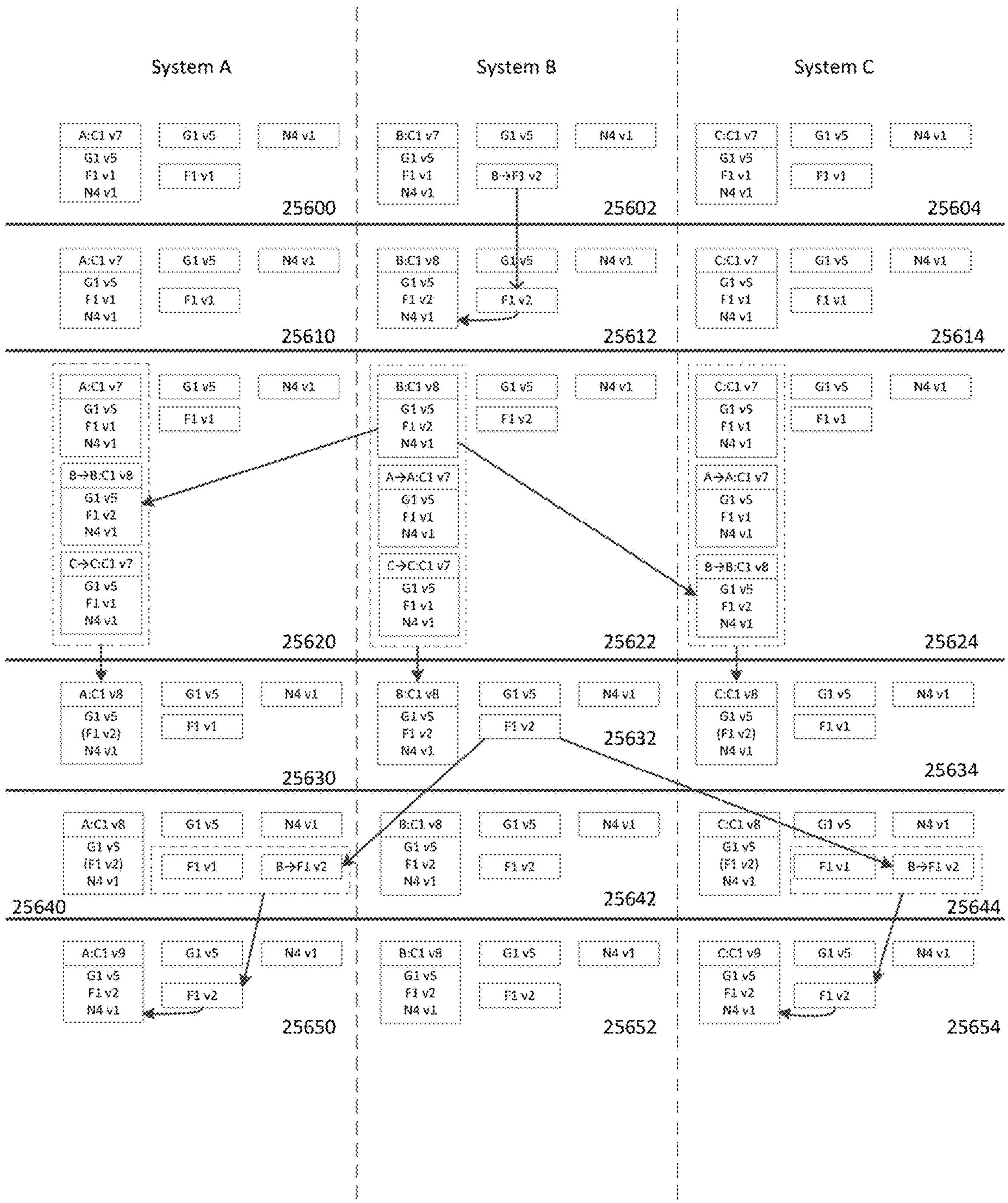

FIG. 256 shows examples where groups are synchronized using nuts.

Figure 257:
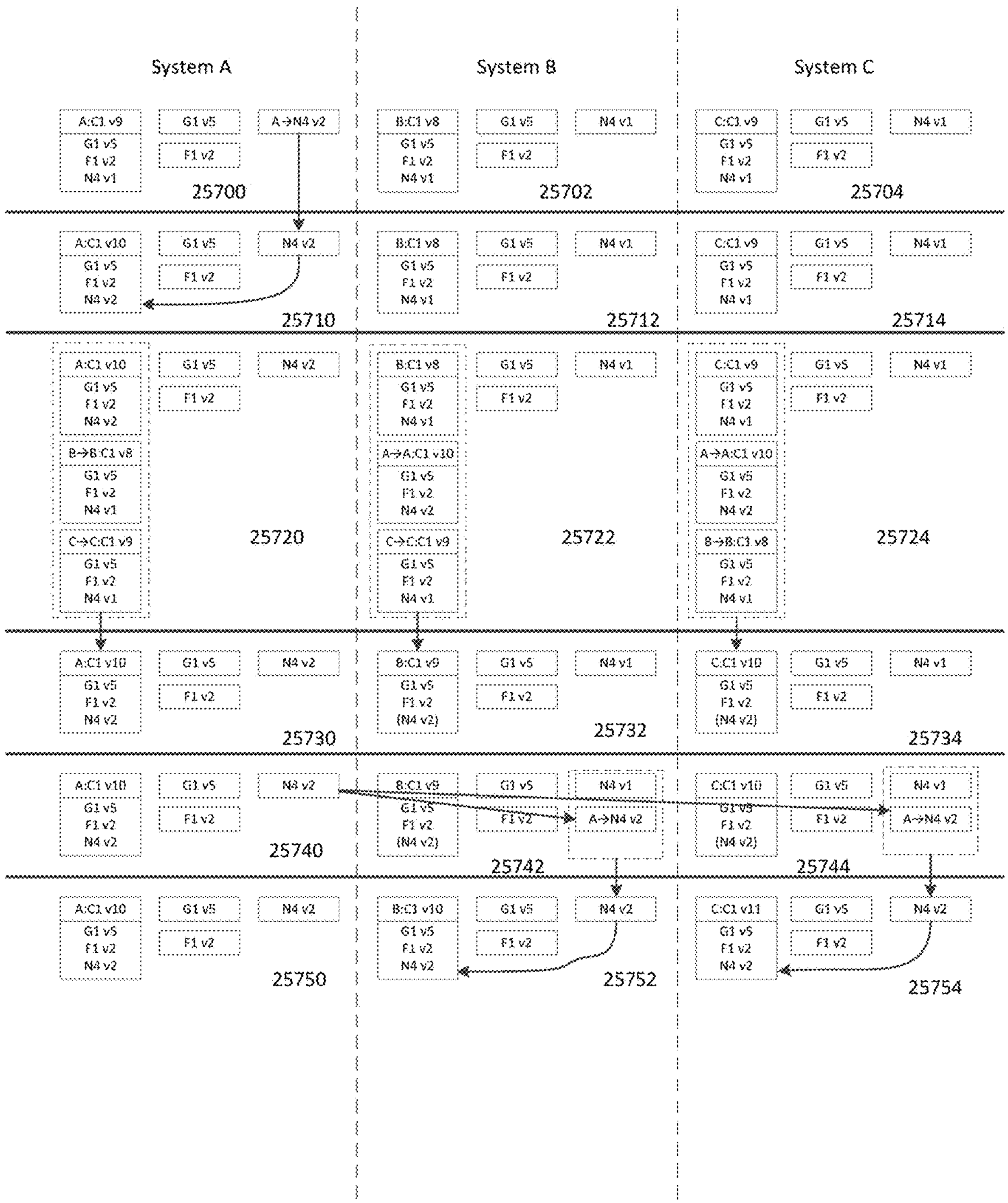

FIG. 257 shows how a VerifyOnly nut gets synchronized across a group.

Figure 258:
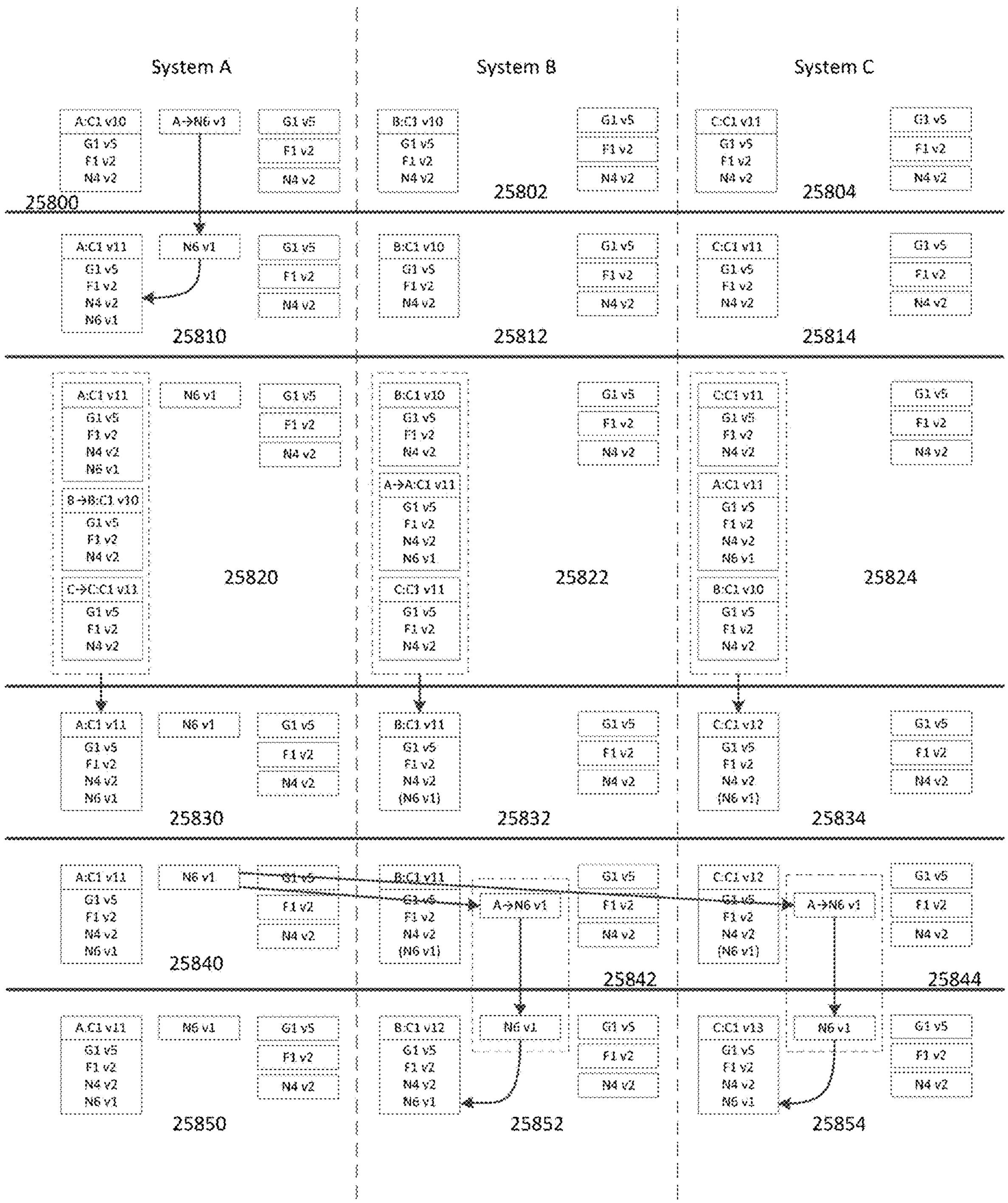

FIG. 258 shows how a nut gets synchronized across a group.

FIG. 259 illustrates RBK terminology in a three-person scenario.

Figure 260:
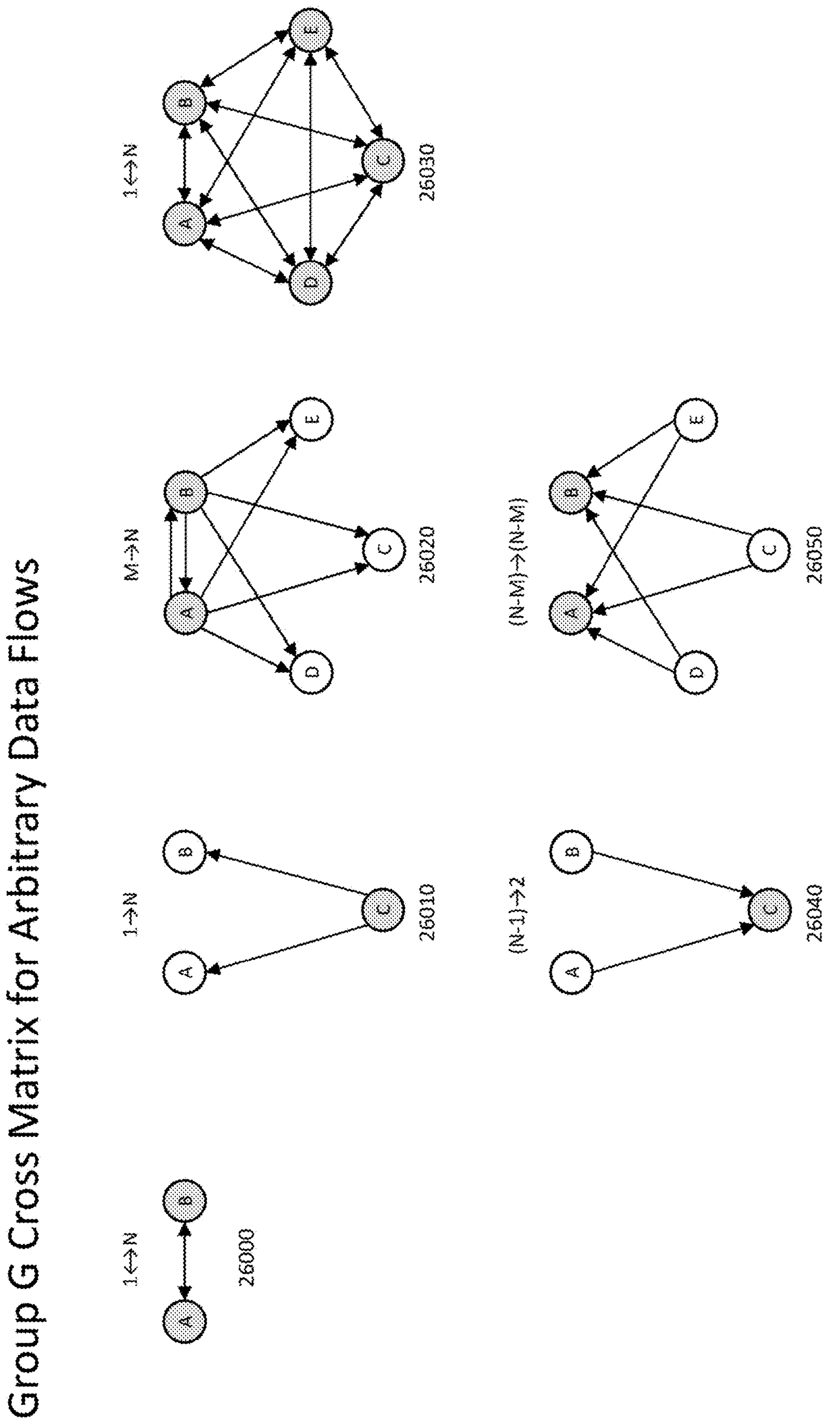

FIG. 260 illustrates data flow topologies for various group sizes.

Figure 261:
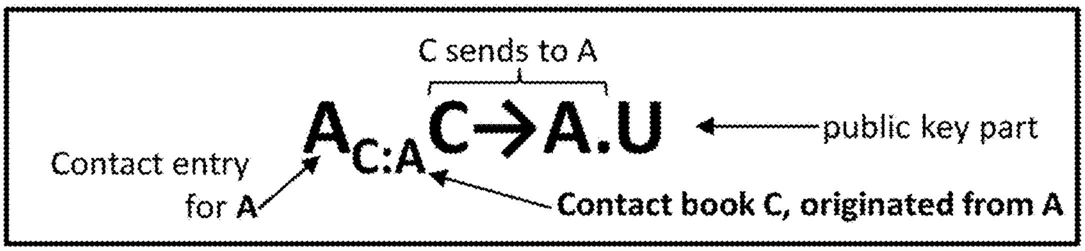

FIG. 261 shows a notation method for protected, directional, data flows in an arbitrary network of nodes.

Figure 262:
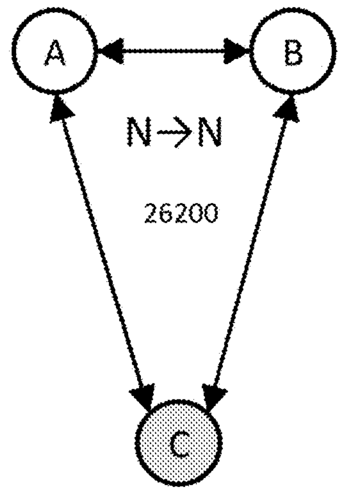

FIG. 262 shows a three-member network in an N→N data flow configuration.

FIG. 263 shows a three-member network in a custom data flow configuration.

FIG. 264 shows a five-member network in an 1 configuration.

FIG. 265 shows a five-member network in a custom configuration.

FIG. 266 shows a five-member network in a custom configuration.

FIG. 267 shows how a mini-NUTbook may be represented and stored in a group nut.

FIG. 268 shows adding a member to an existing group cross matrix of data flows.

FIG. 269 shows how a series of asynchronous updates to a shared nut may be detected and resolved.

FIG. 270 show two examples of version changes.

Figure 271:
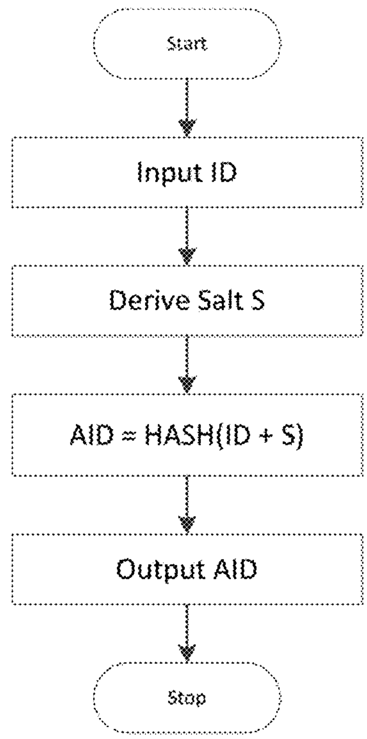

FIG. 271 shows a typical procedure for deriving an anonymous ID (AID).

FIG. 272 shows various mappings of anonymous IDs.

Figure 273:
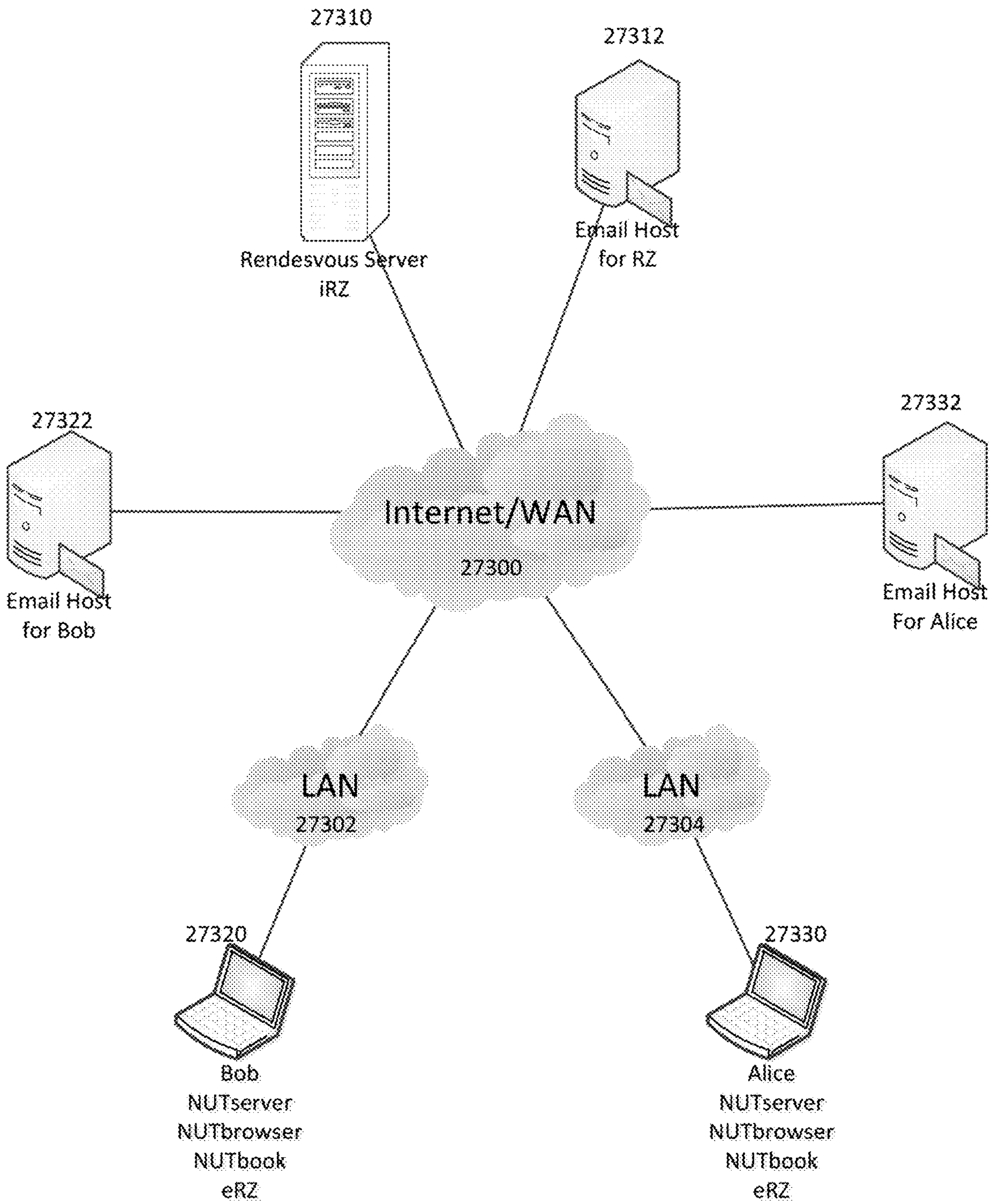

FIG. 273 is a network diagram showing three RZs.

Figure 274:
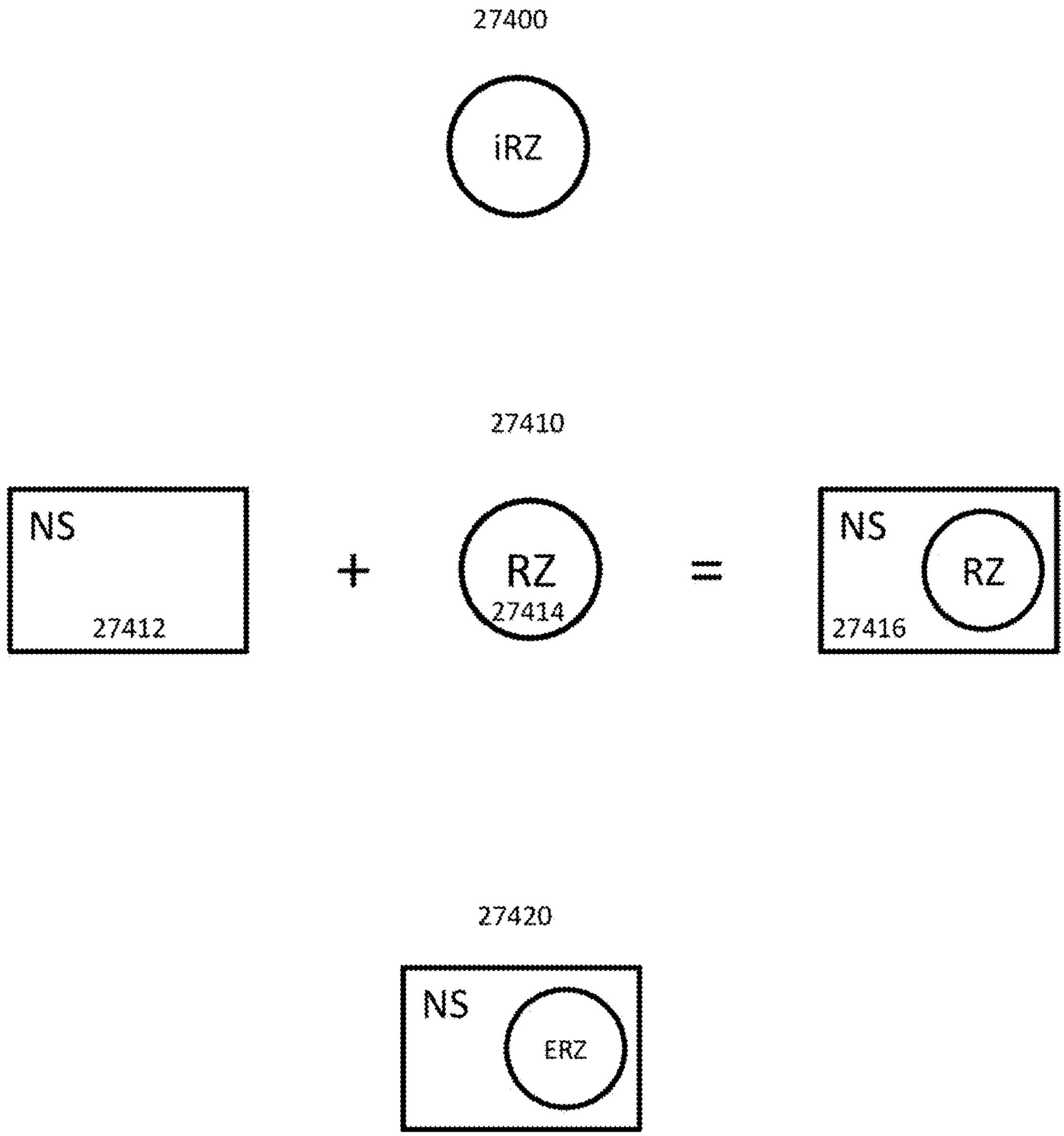

FIG. 274 illustrates three modes of an RZ.

Figure 275:
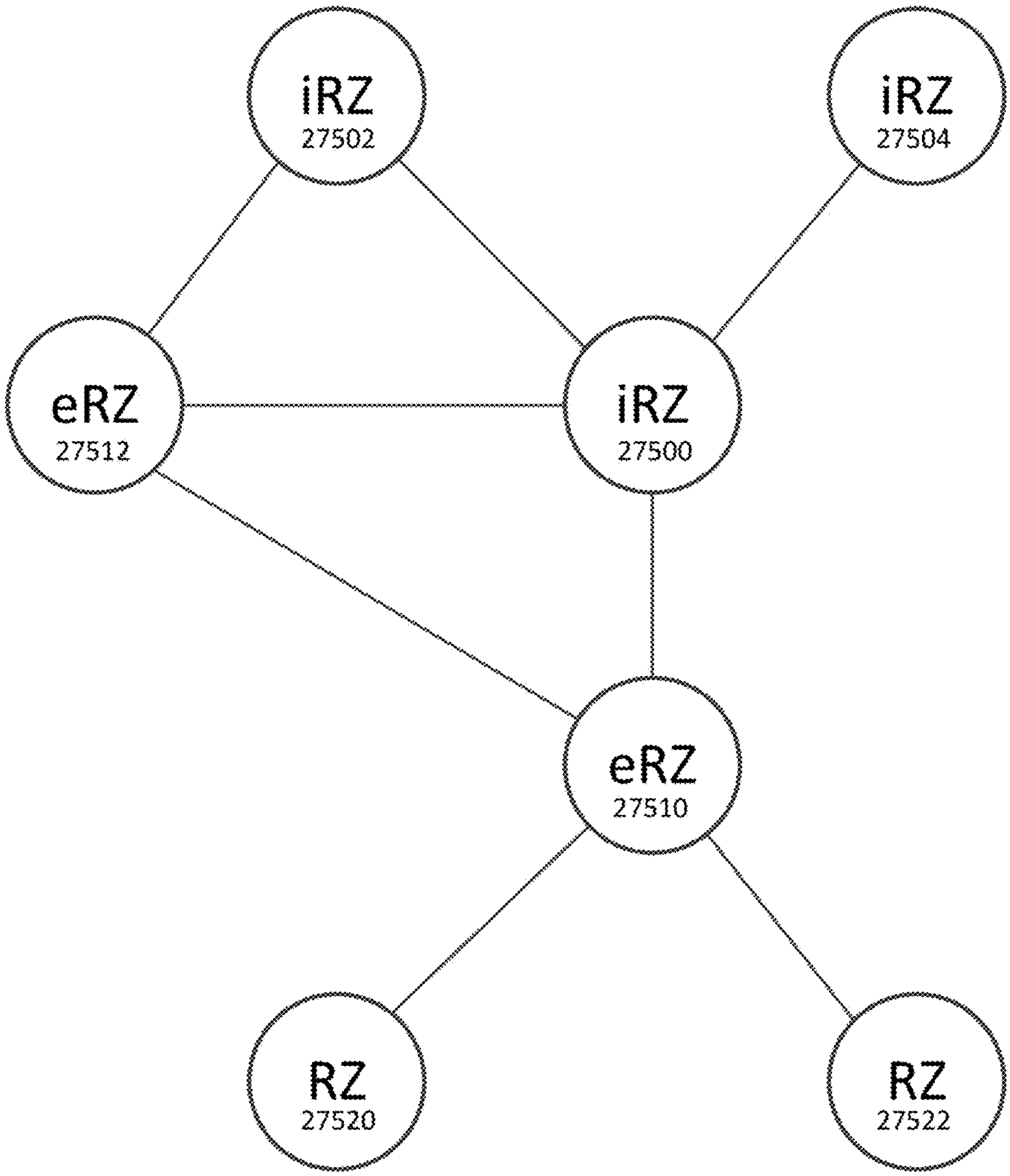

FIG. 275 shows the nature of RZ accessibility within a network of RZs.

Figure 276:
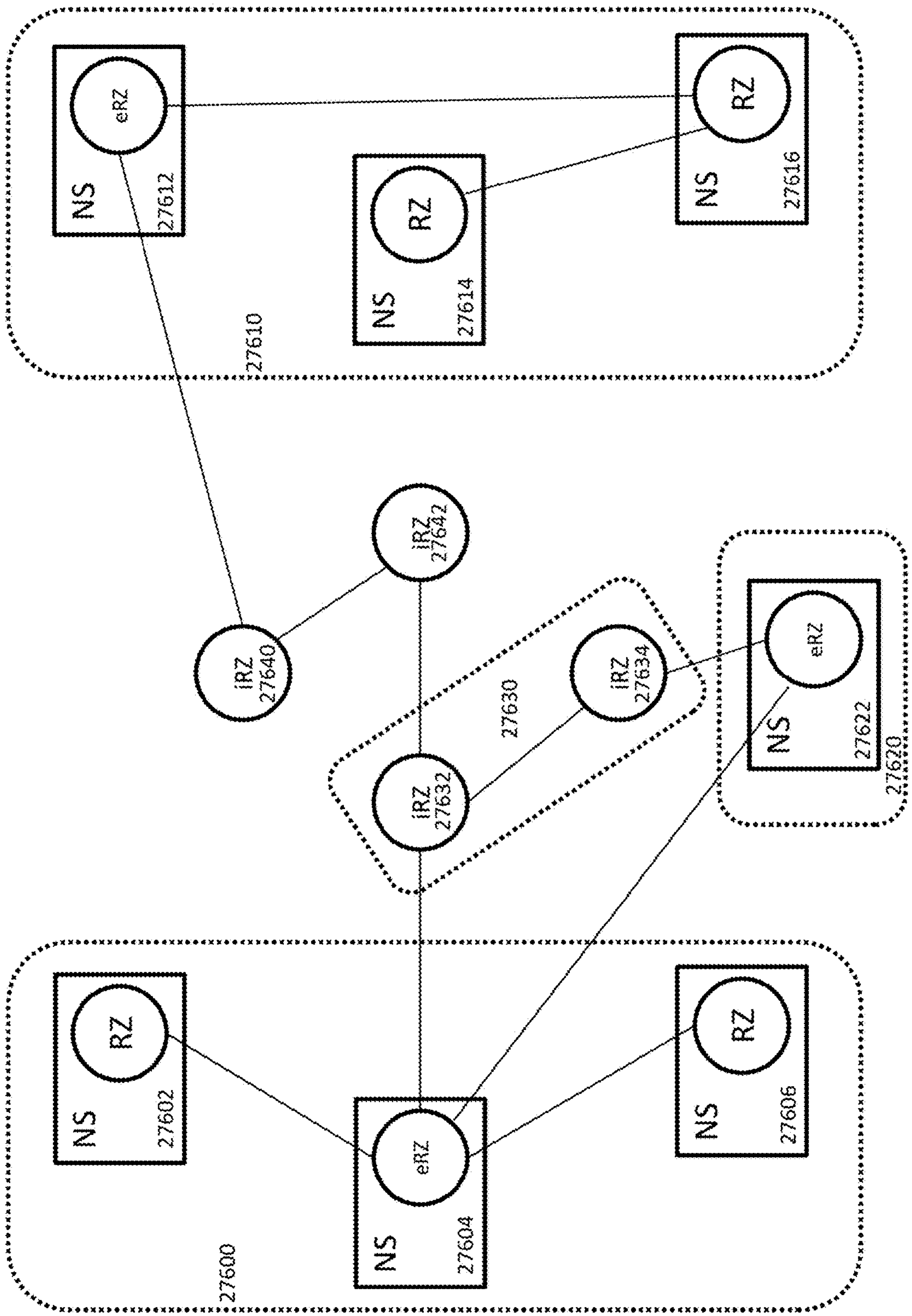

FIG. 276 illustrates a network of RZs.

Figure 277:
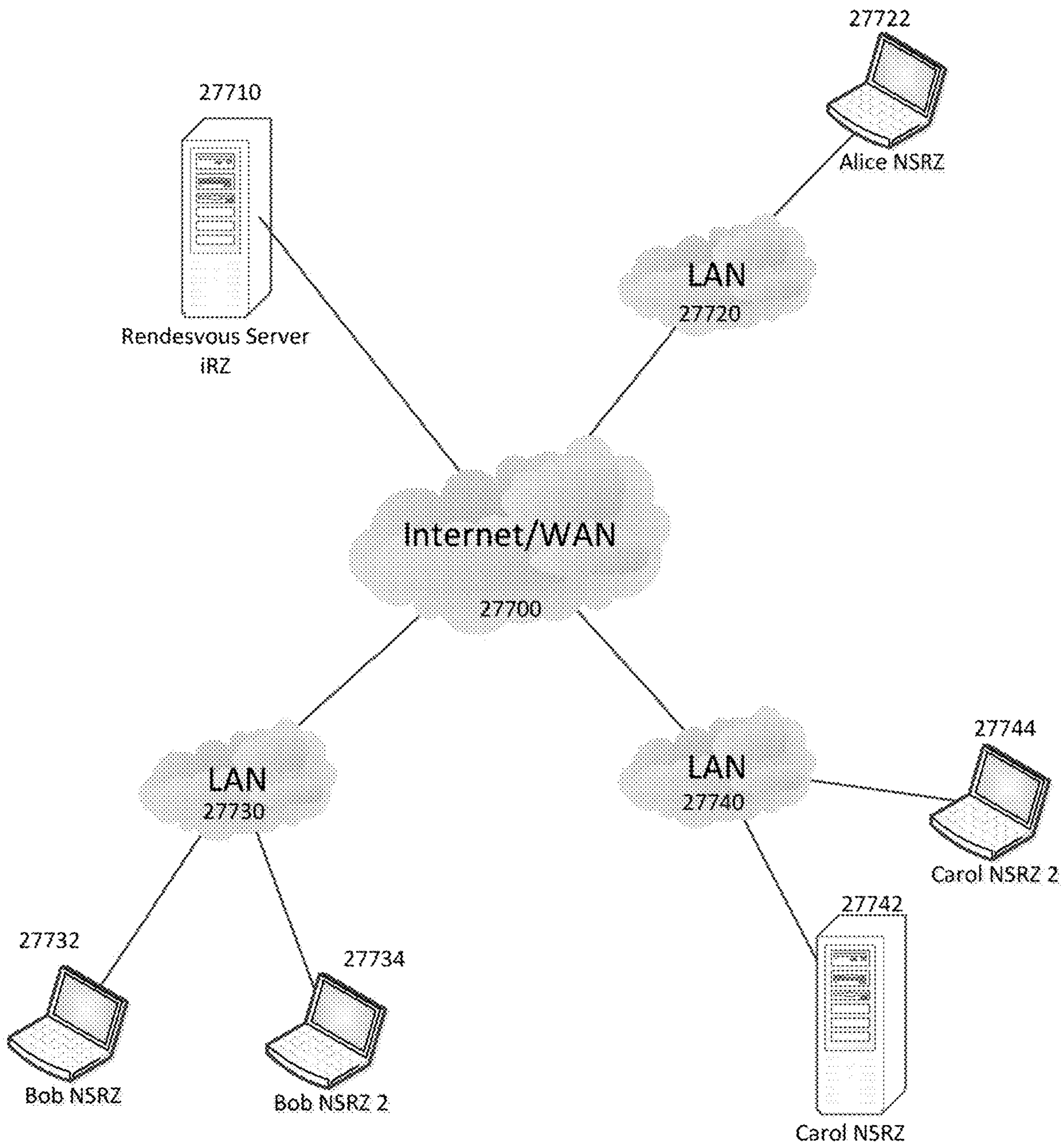

FIG. 277 shows a network diagram with three ecogroups of NSRZs.

Figure 278:
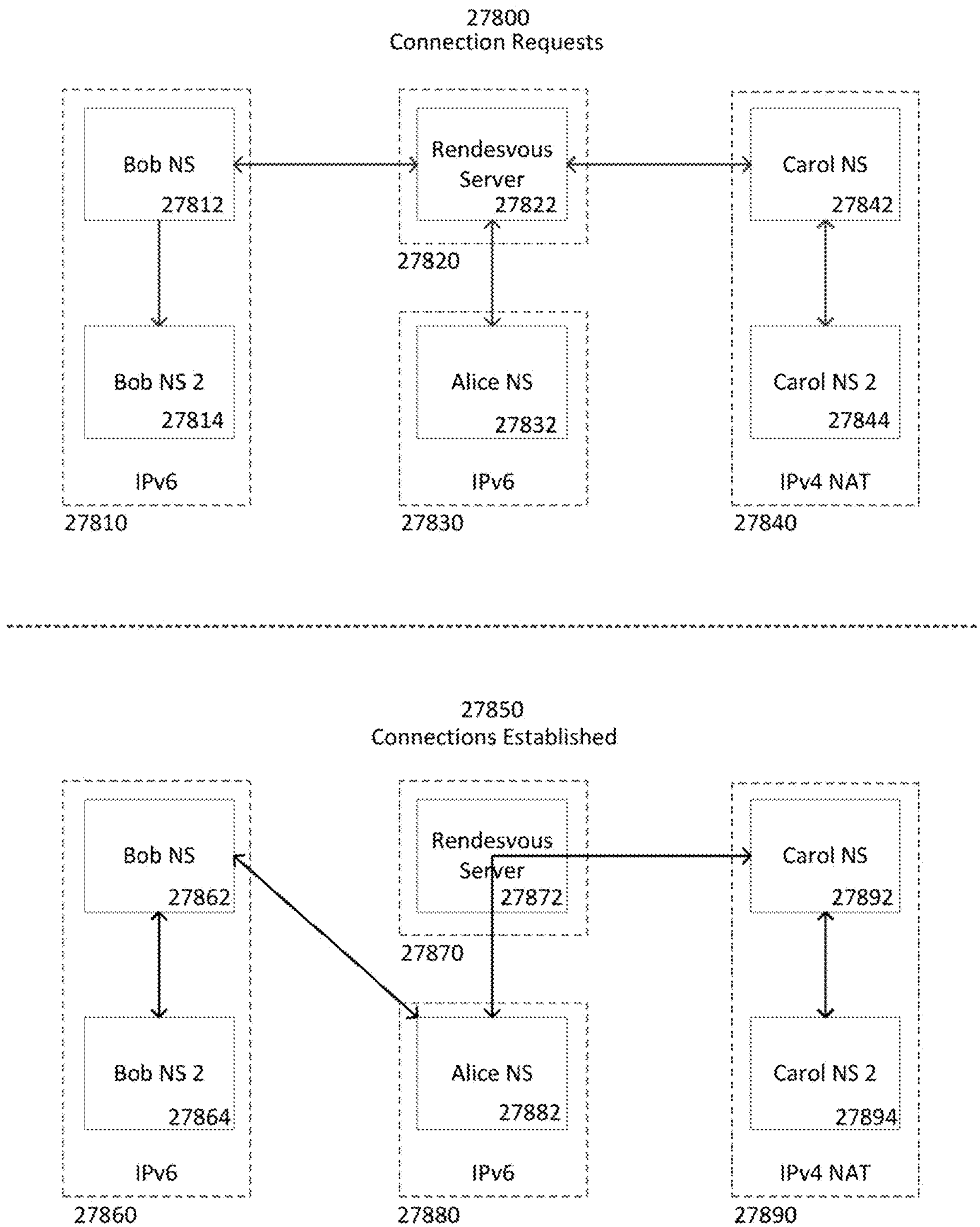

FIG. 278 shows a logical connection diagram of the network in FIG. 277.

Figure 279:
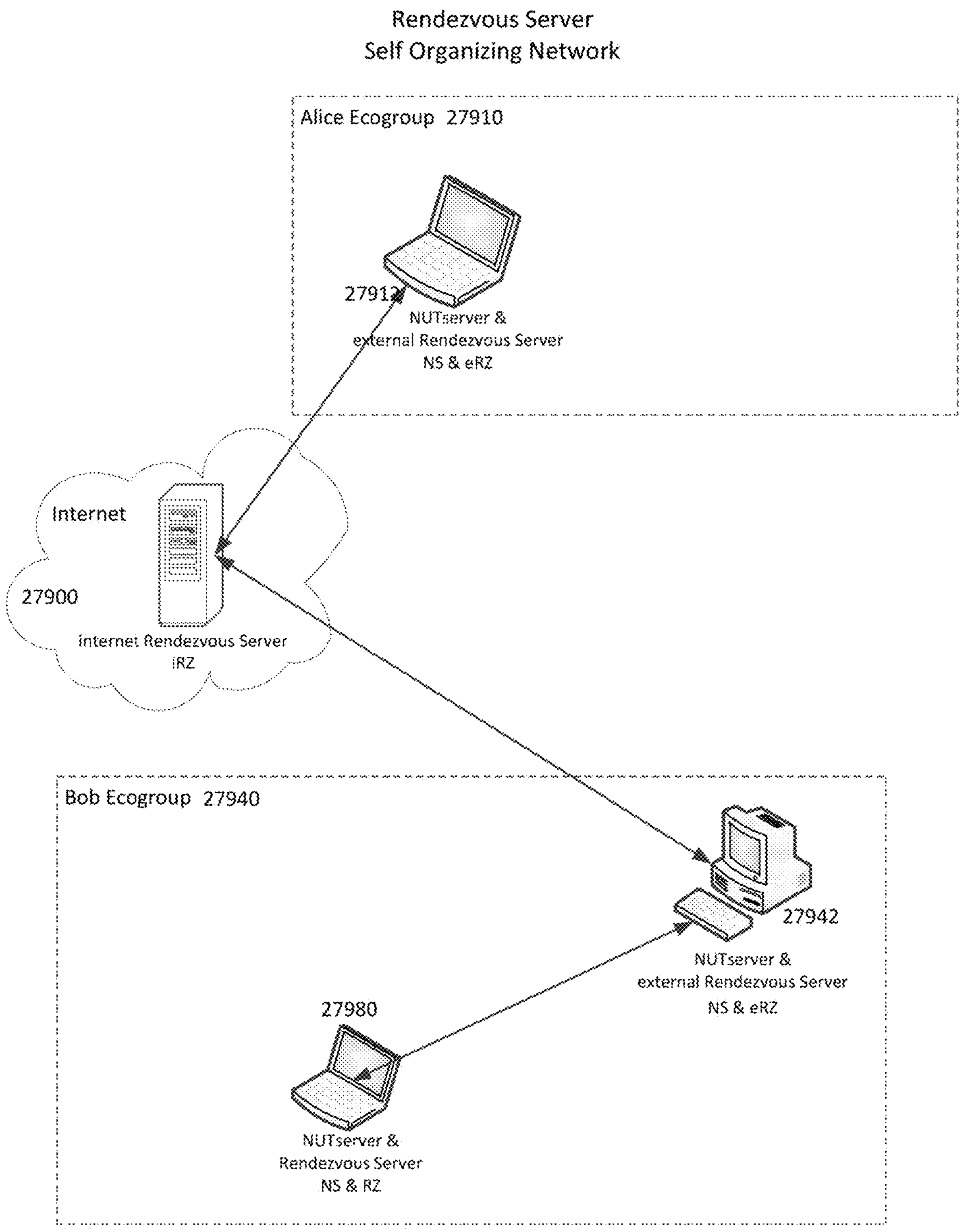

FIG. 279 illustrates various RZ network configurations.

Figure 280:
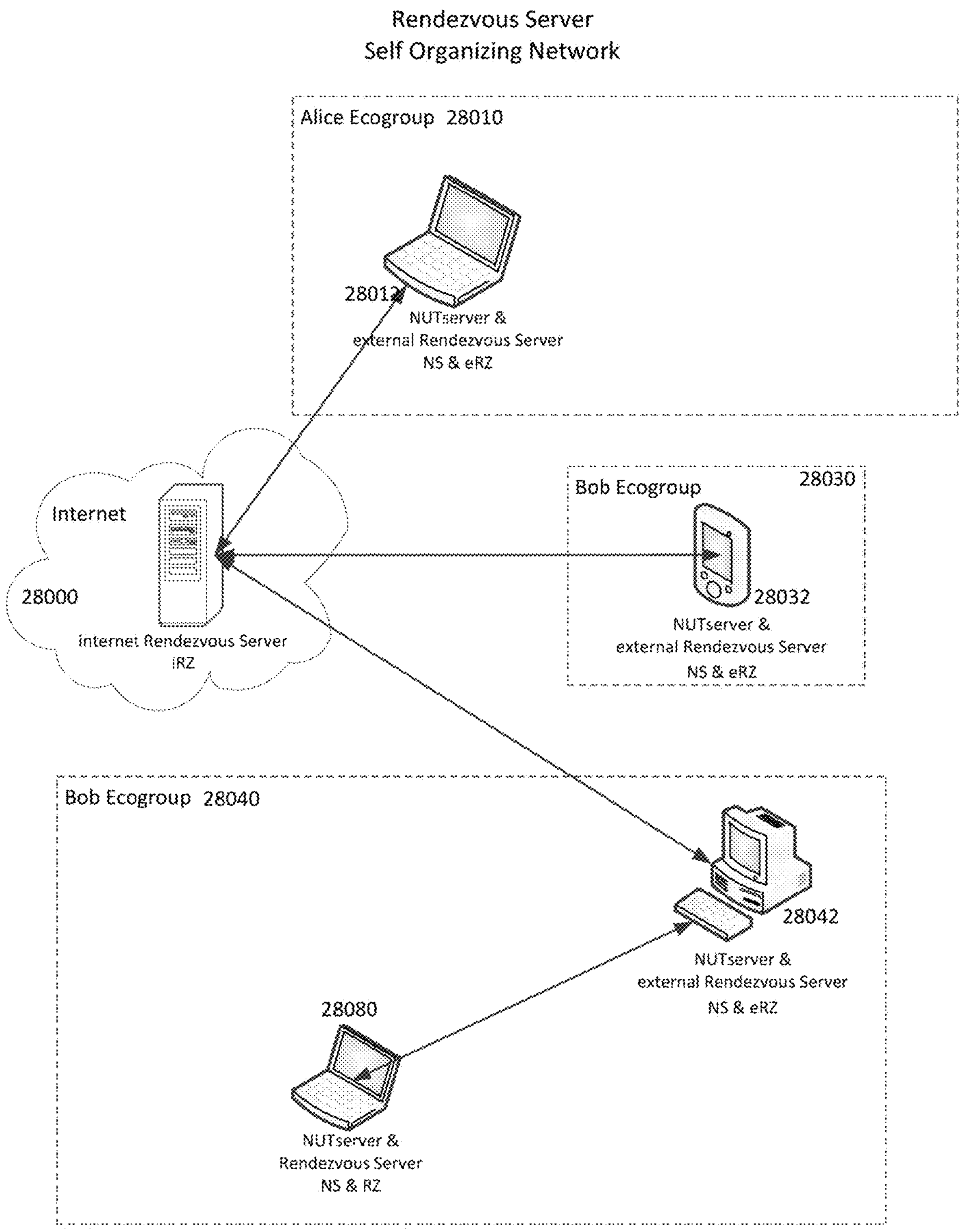

FIG. 280 illustrates various RZ network configurations.

Figure 281:
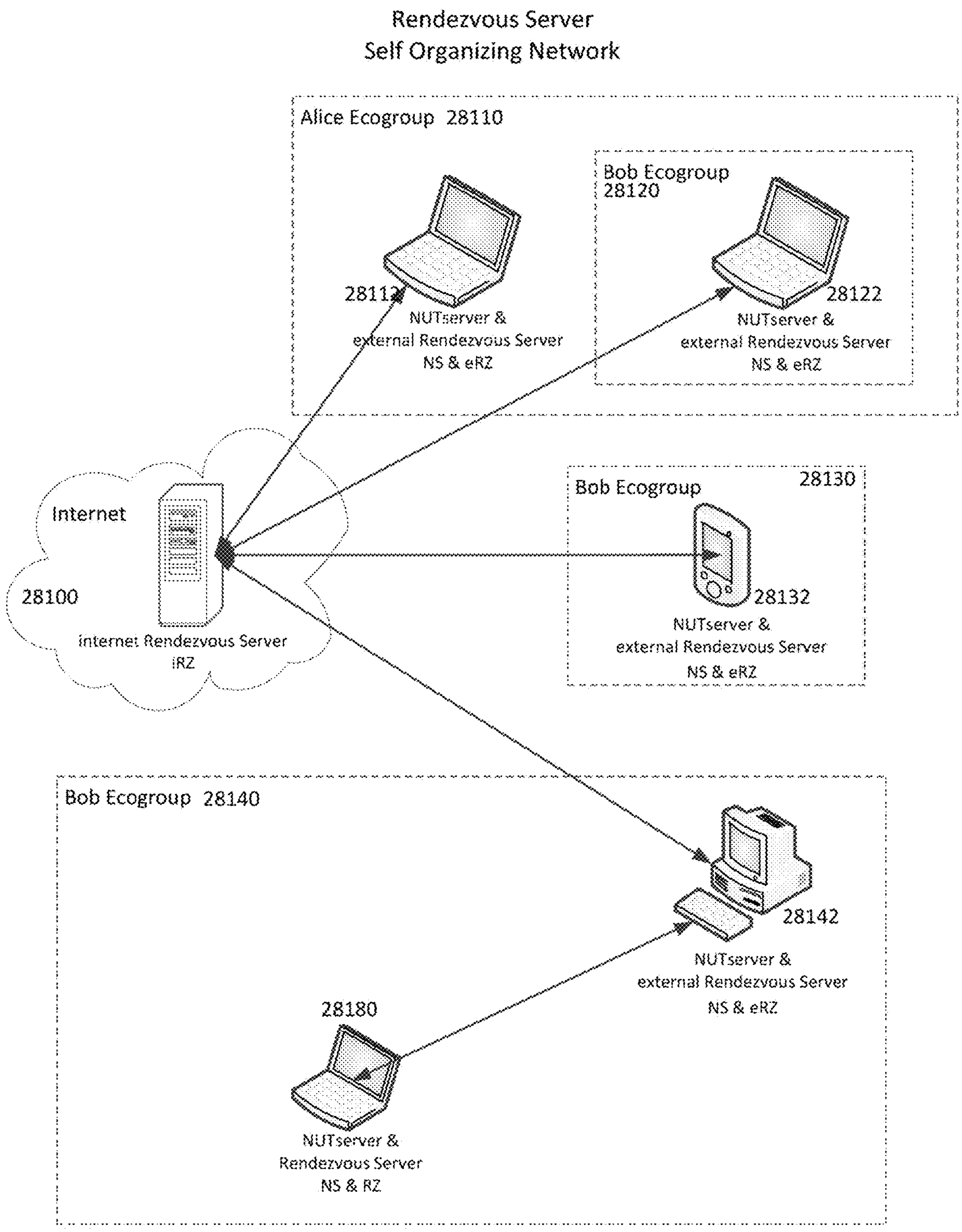

FIG. 281 shows Bob visiting Alice's apartment to do some work on his spare laptop.

Figure 282:
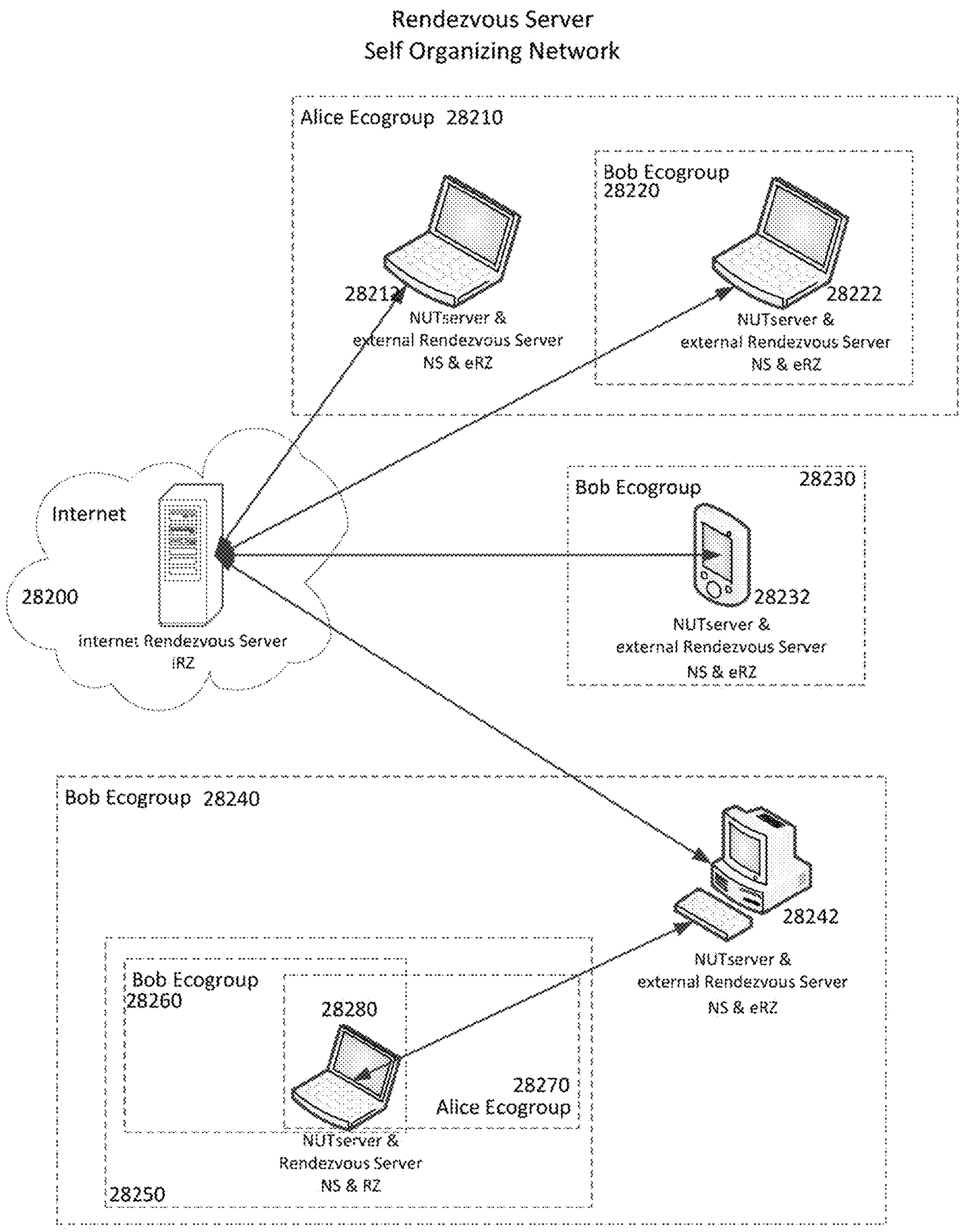

FIG. 282 shows Alice visiting Bob's apartment and she wants to use Bob's running laptop to access her ecogroup.

Figure 283:
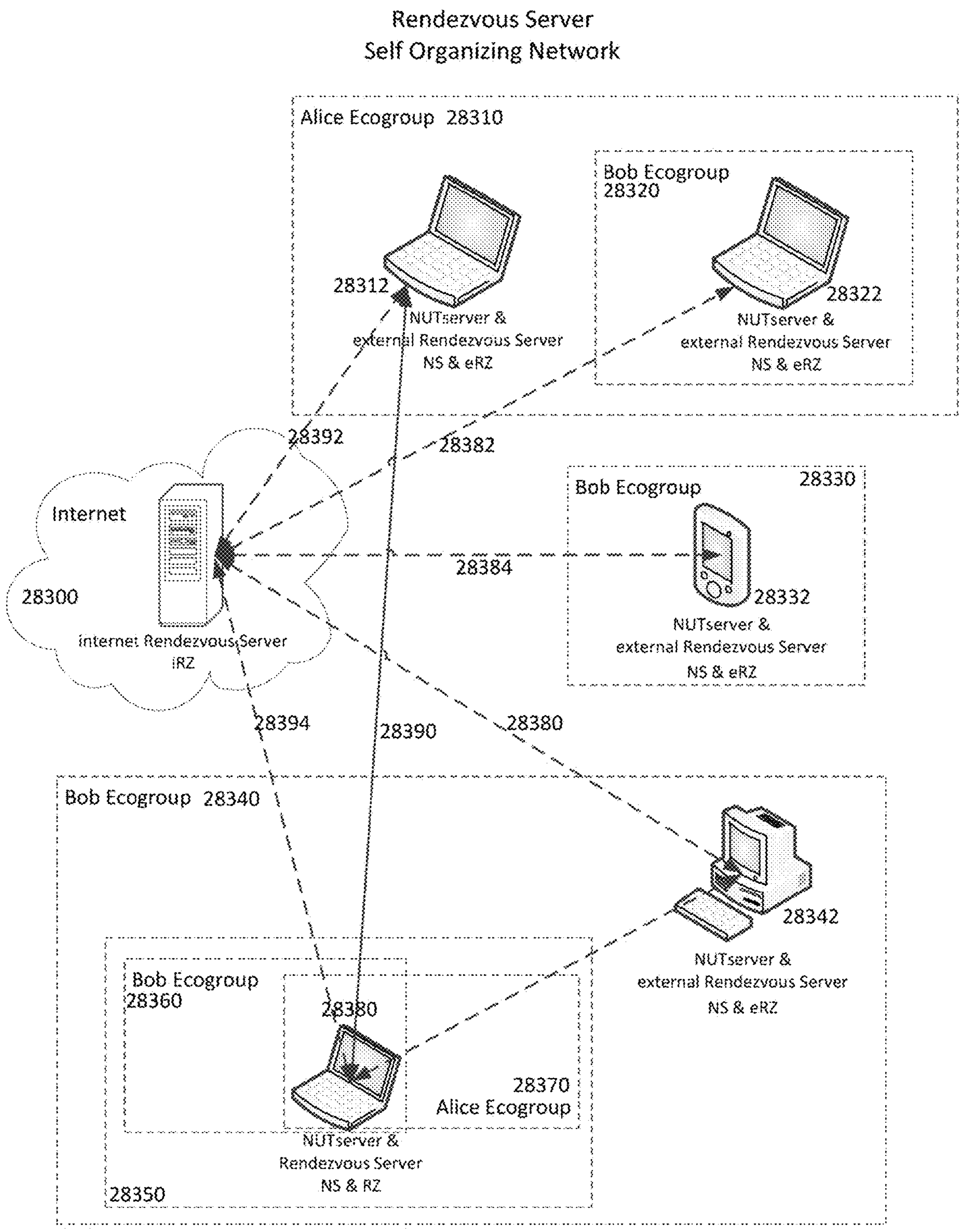

FIG. 283 illustrates how partitioned ecogroups may communicate via an iRZ.

Figure 284:
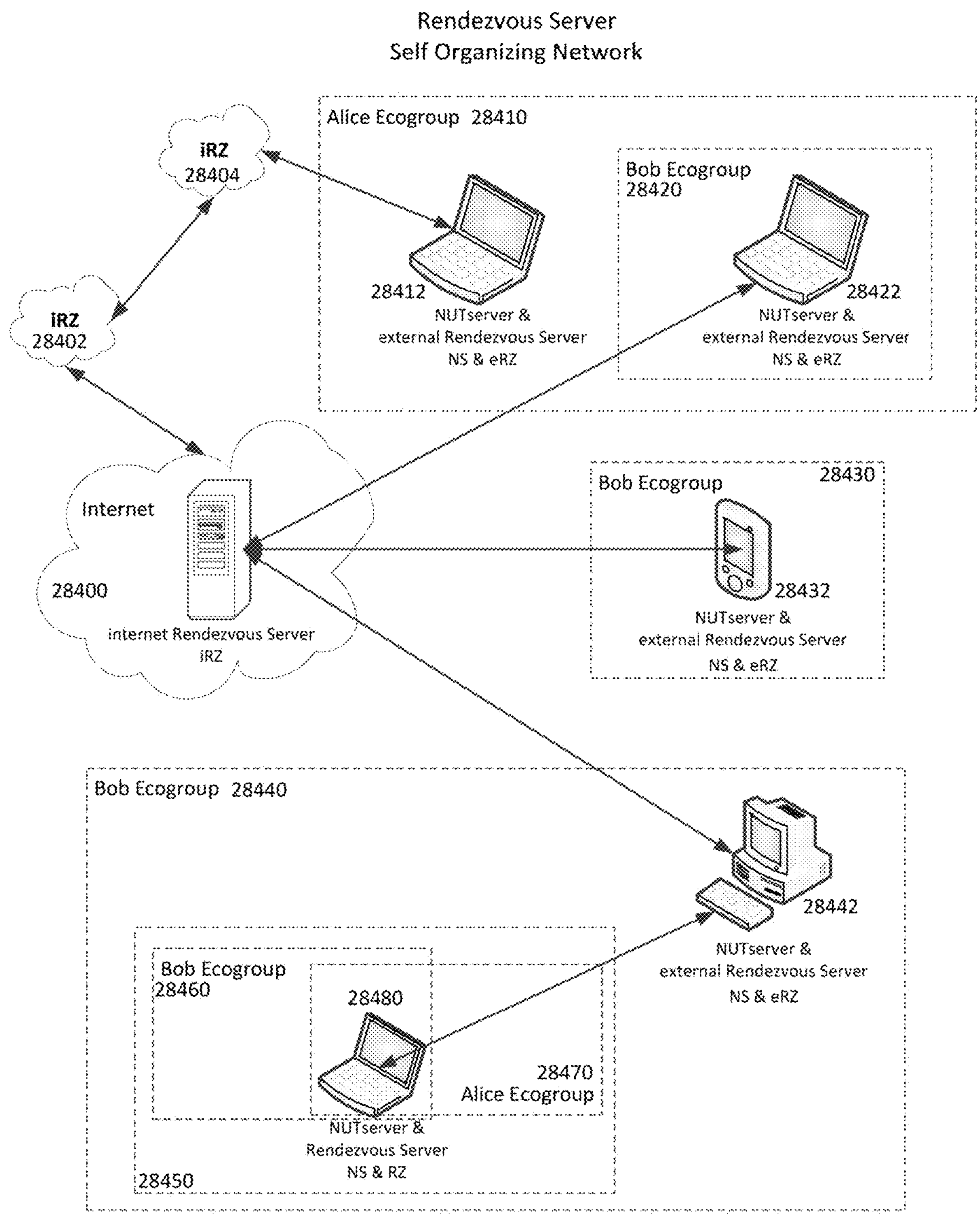

FIG. 284 illustrates a multiple iRZ network.

Figure 285:
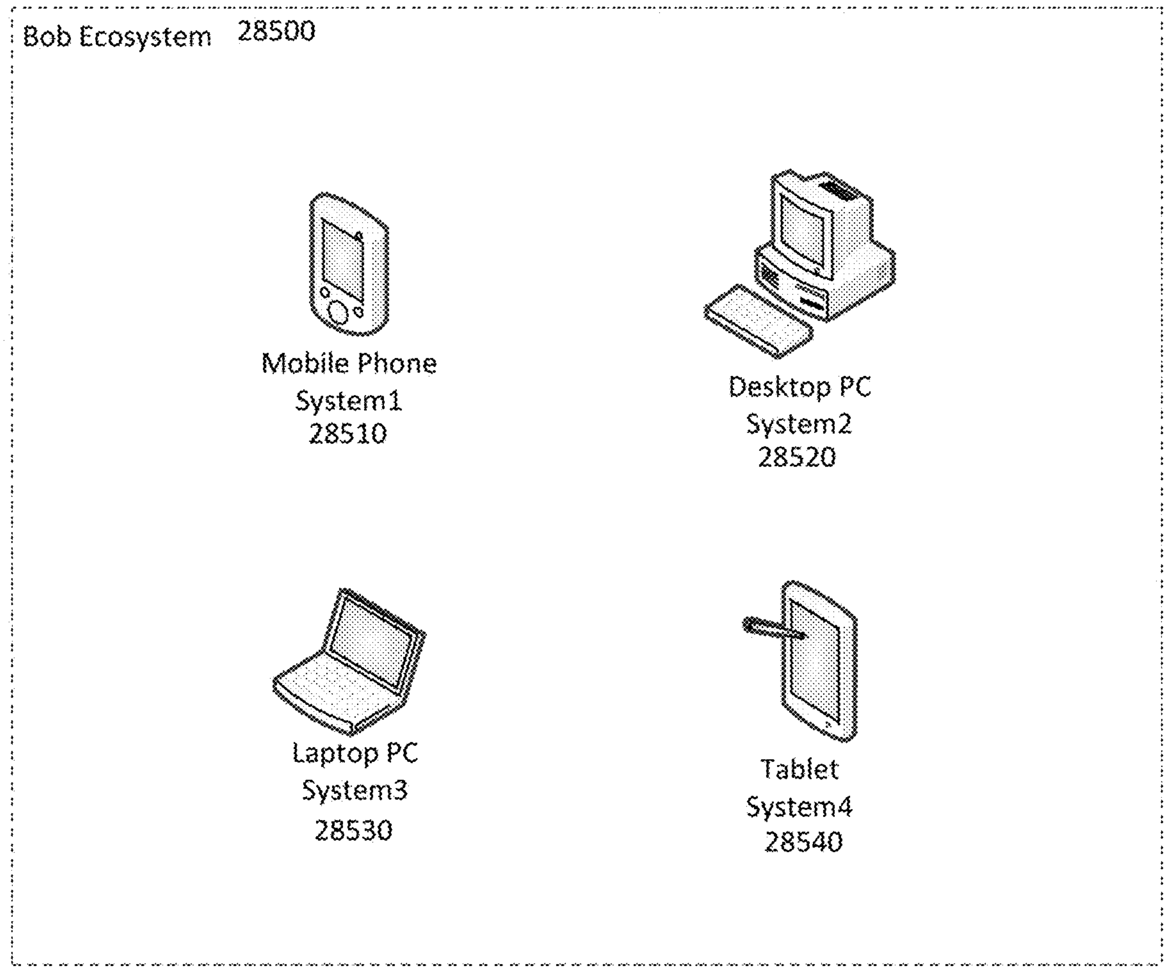

FIG. 285 shows the components of Bob's ecosystem.

Figure 286:
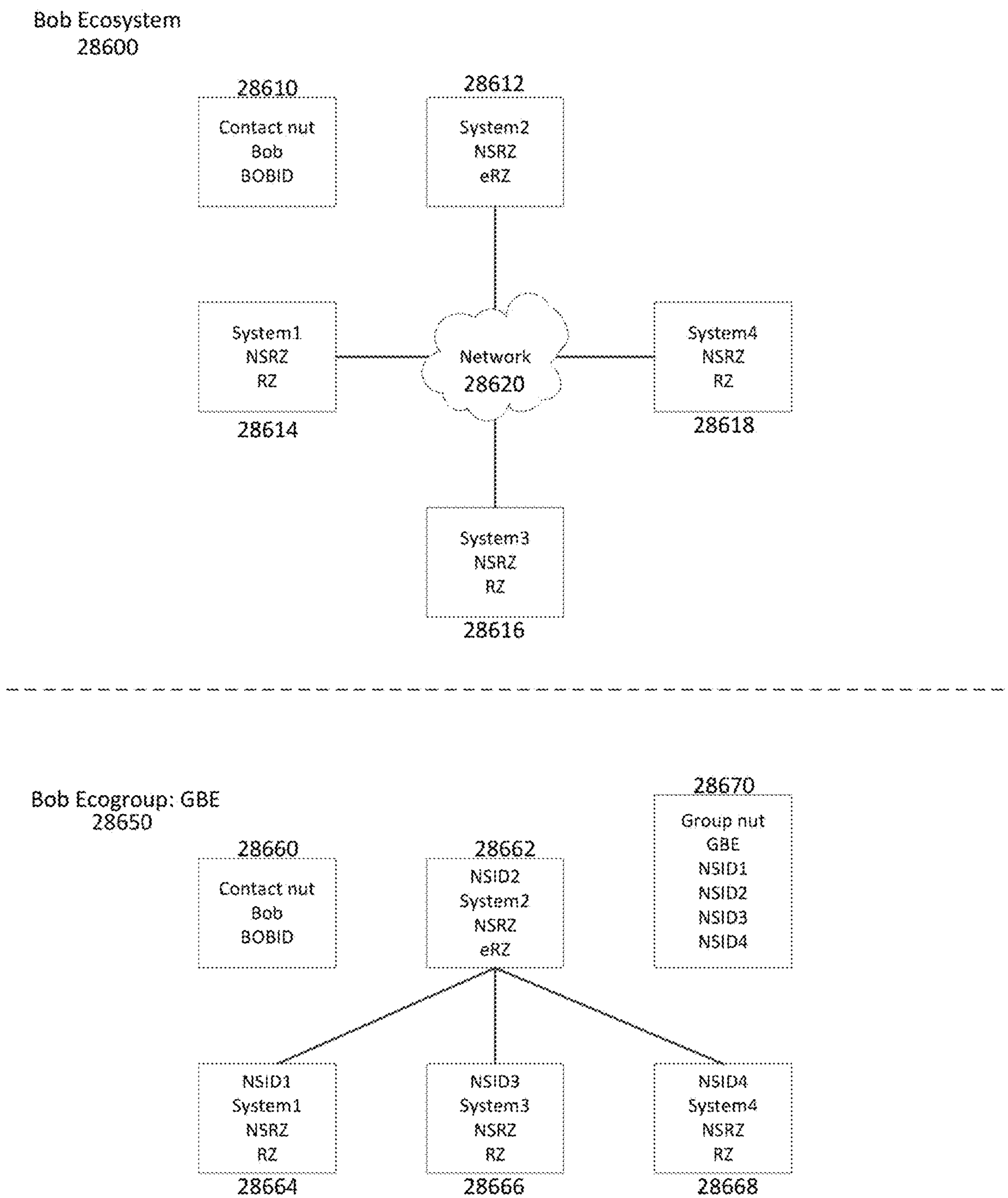

FIG. 286 shows some of the differences between an Ecogroup and Ecosystem.

Figure 287:
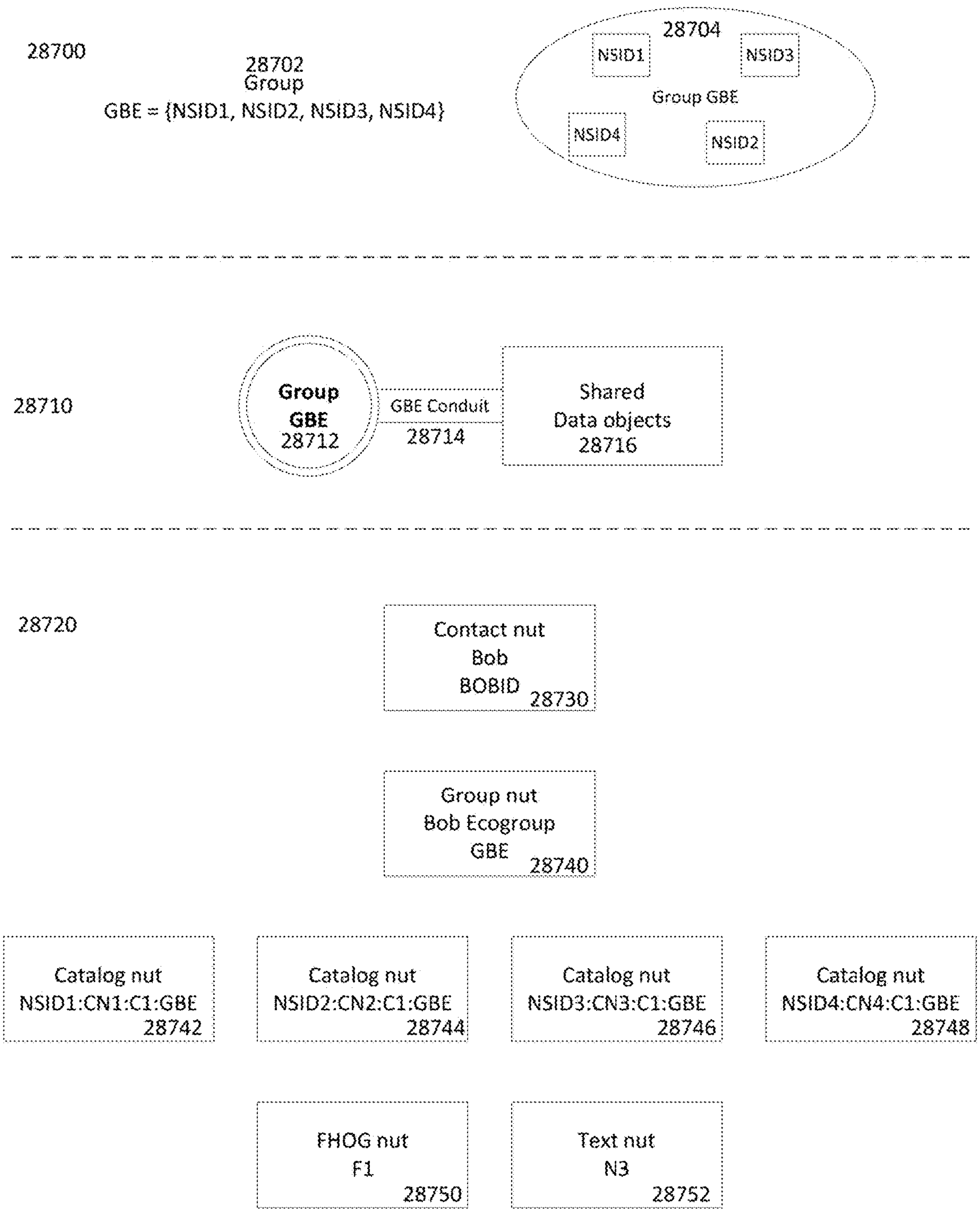

FIG. 287 shows the various components of Bob's Ecogroup GBE.

Figure 288:
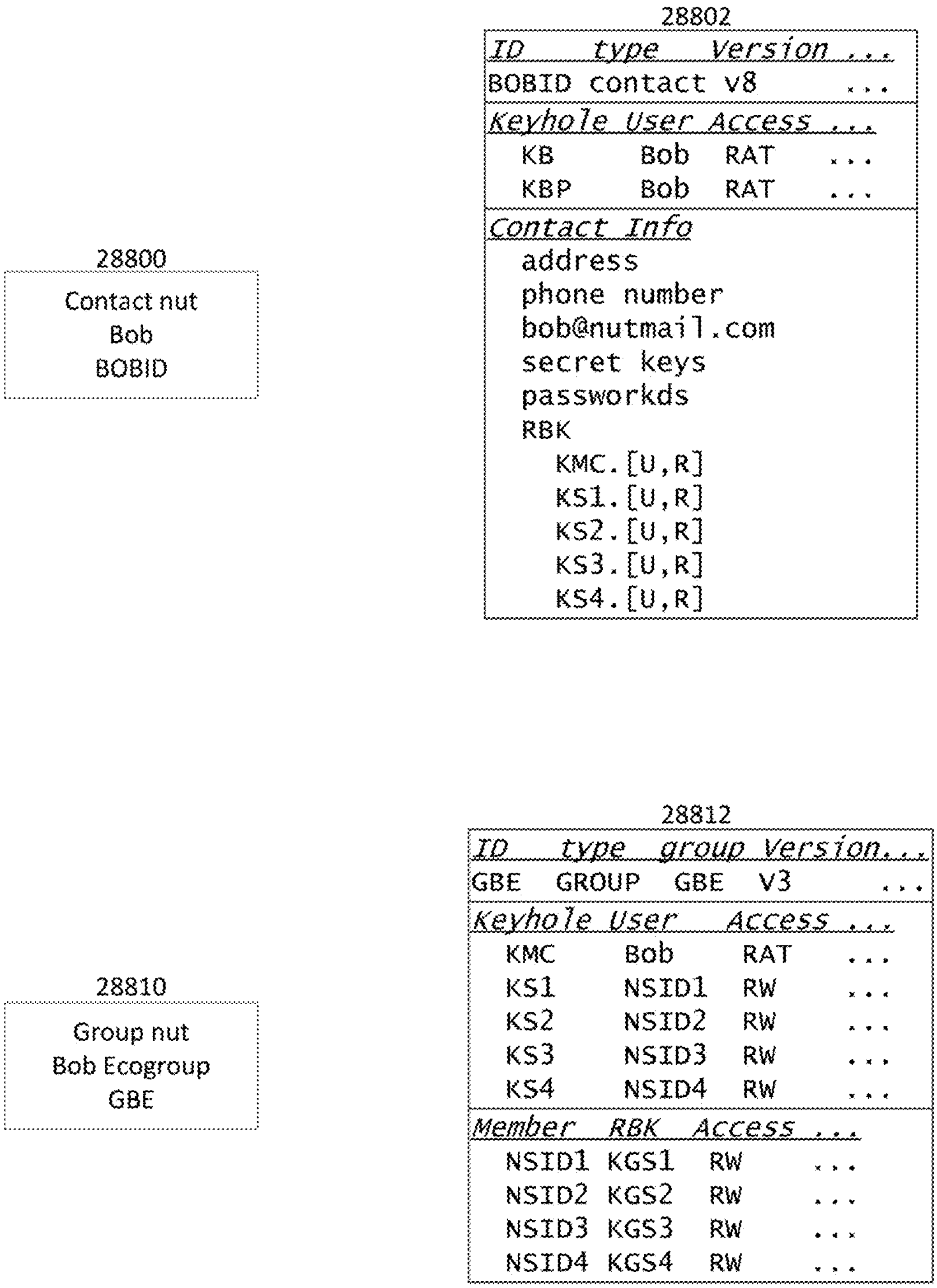

FIG. 288 shows the contact and group nuts for ecogroup GBE.

Figure 289:
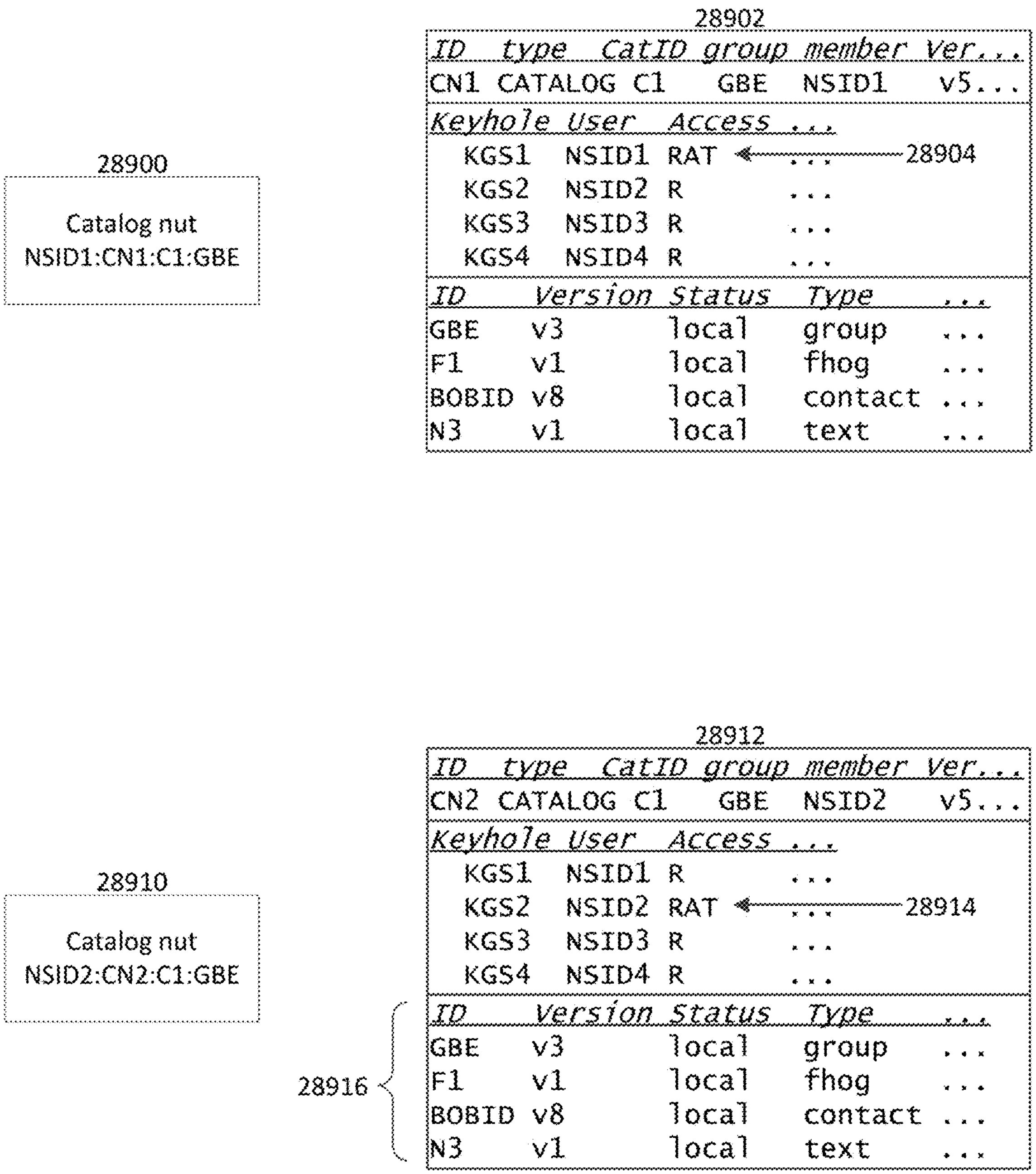

FIG. 289 shows the first two catalog nuts for Bob's ecogroup GBE.

Figure 290:
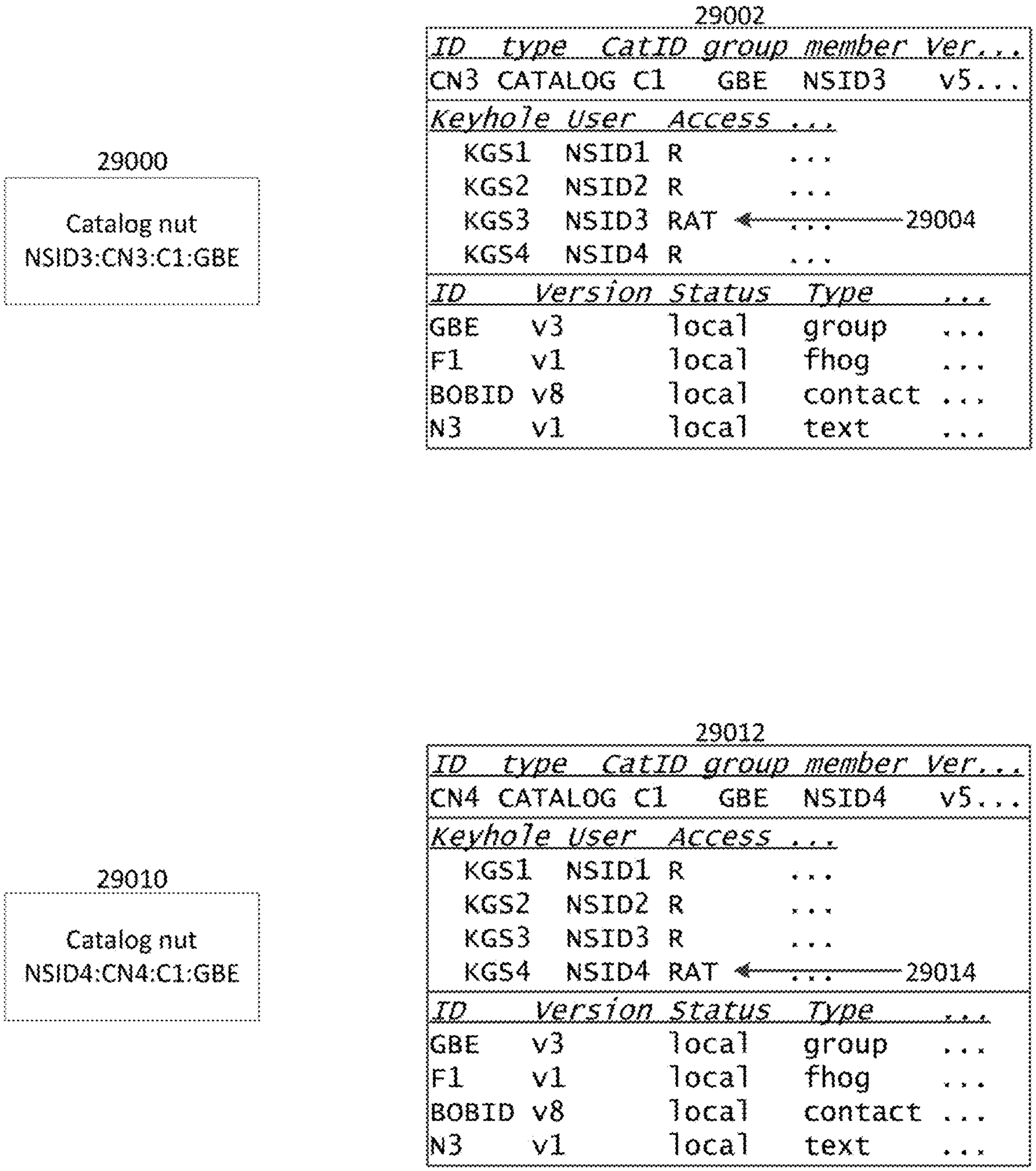

FIG. 290 shows the second two catalog nuts for Bob's ecogroup GBE.

Figure 291:
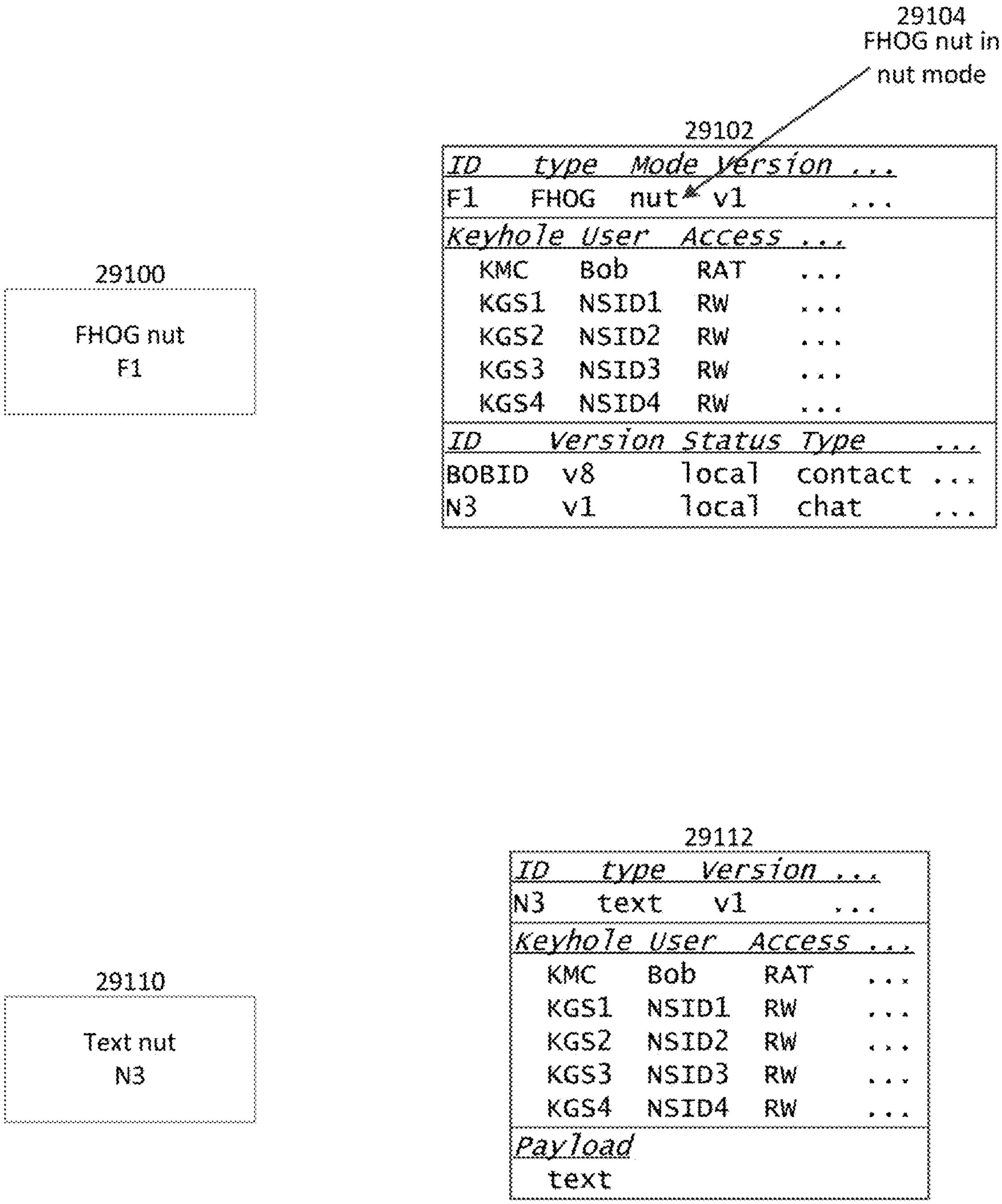

FIG. 291 shows the FHOG and text nuts for ecogroup GBE.

Figure 292:
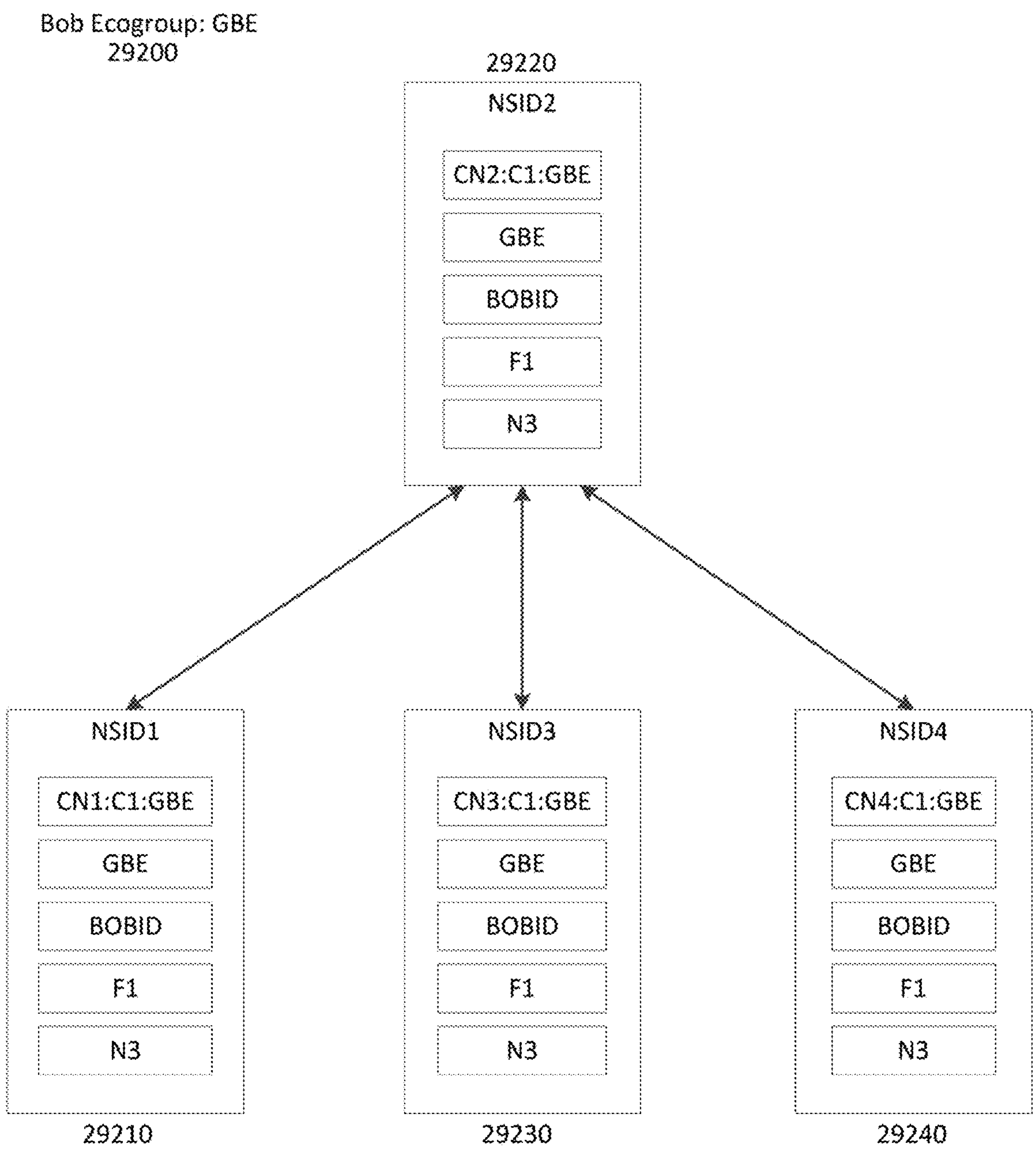

FIG. 292 shows the system locations of the nuts related to Bob's ecogroup GBE.

Figure 293:
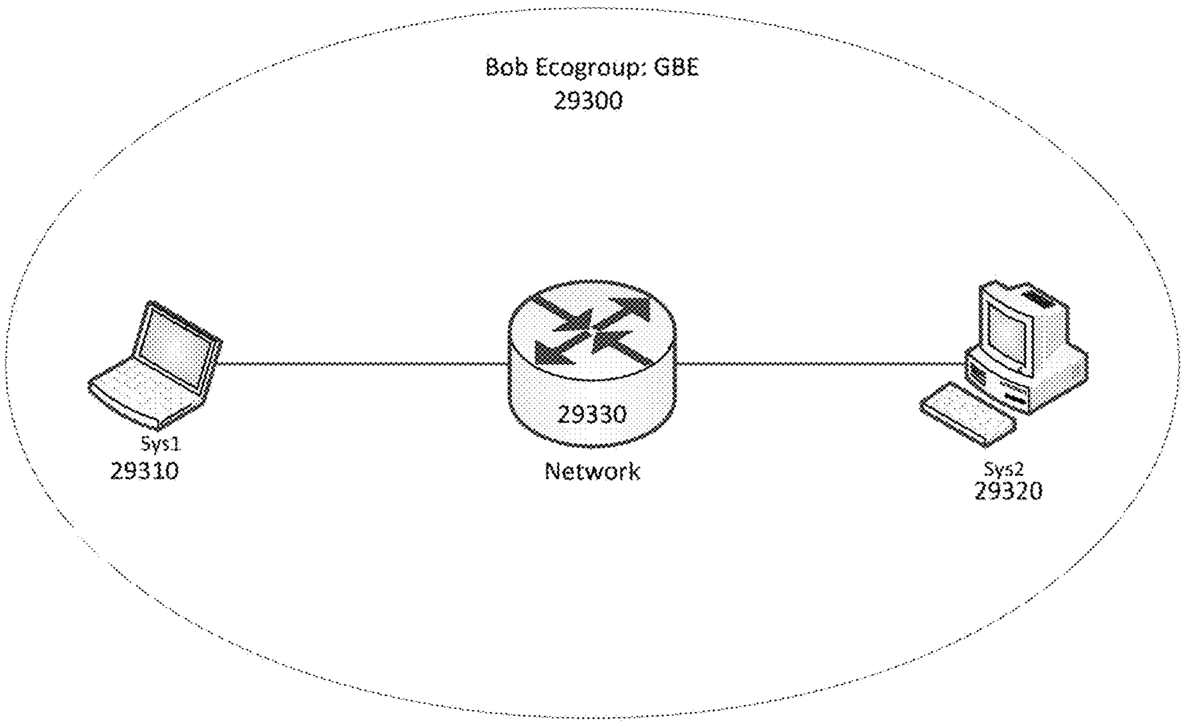

FIG. 293 shows Bob's ecogroup GBE comprising two systems.

Figure 294:
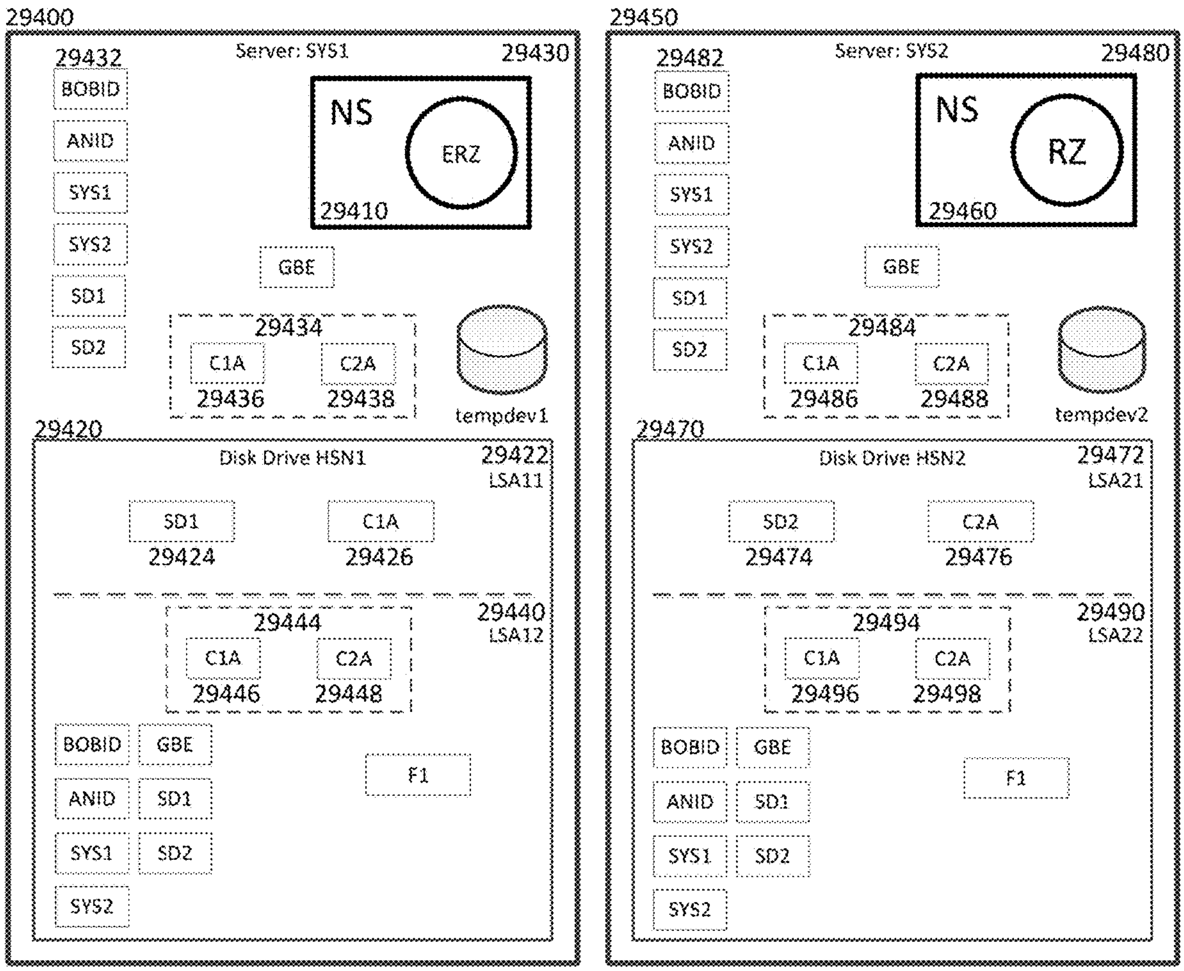

FIG. 294 shows the systems of ecogroup GBE.

Figure 295:
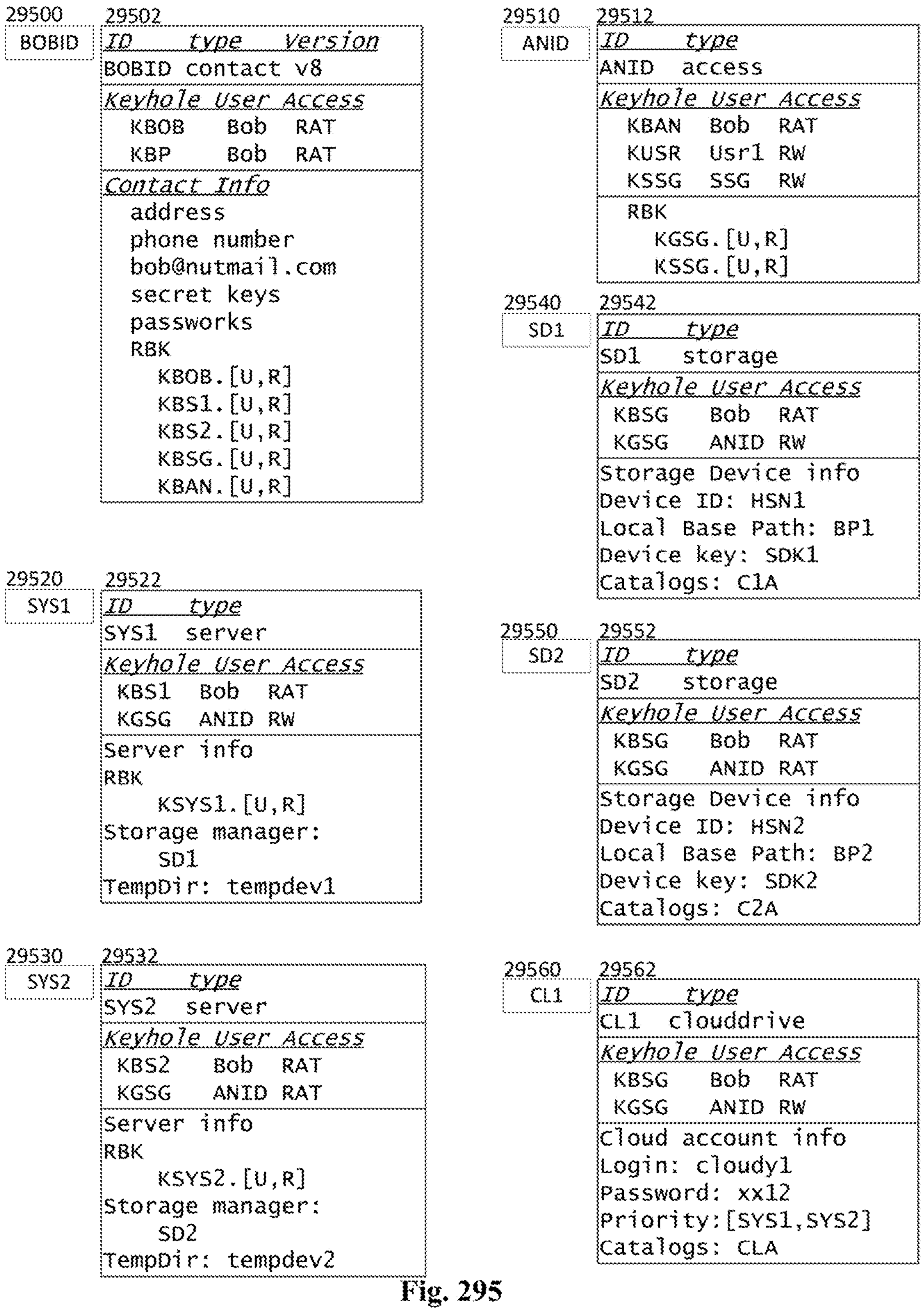

FIG. 295 specifies highlighted information from the nuts stored in ecogroup GBE.

FIG. 296 continues describing nuts in the GBE ecogroup.

Figure 297:
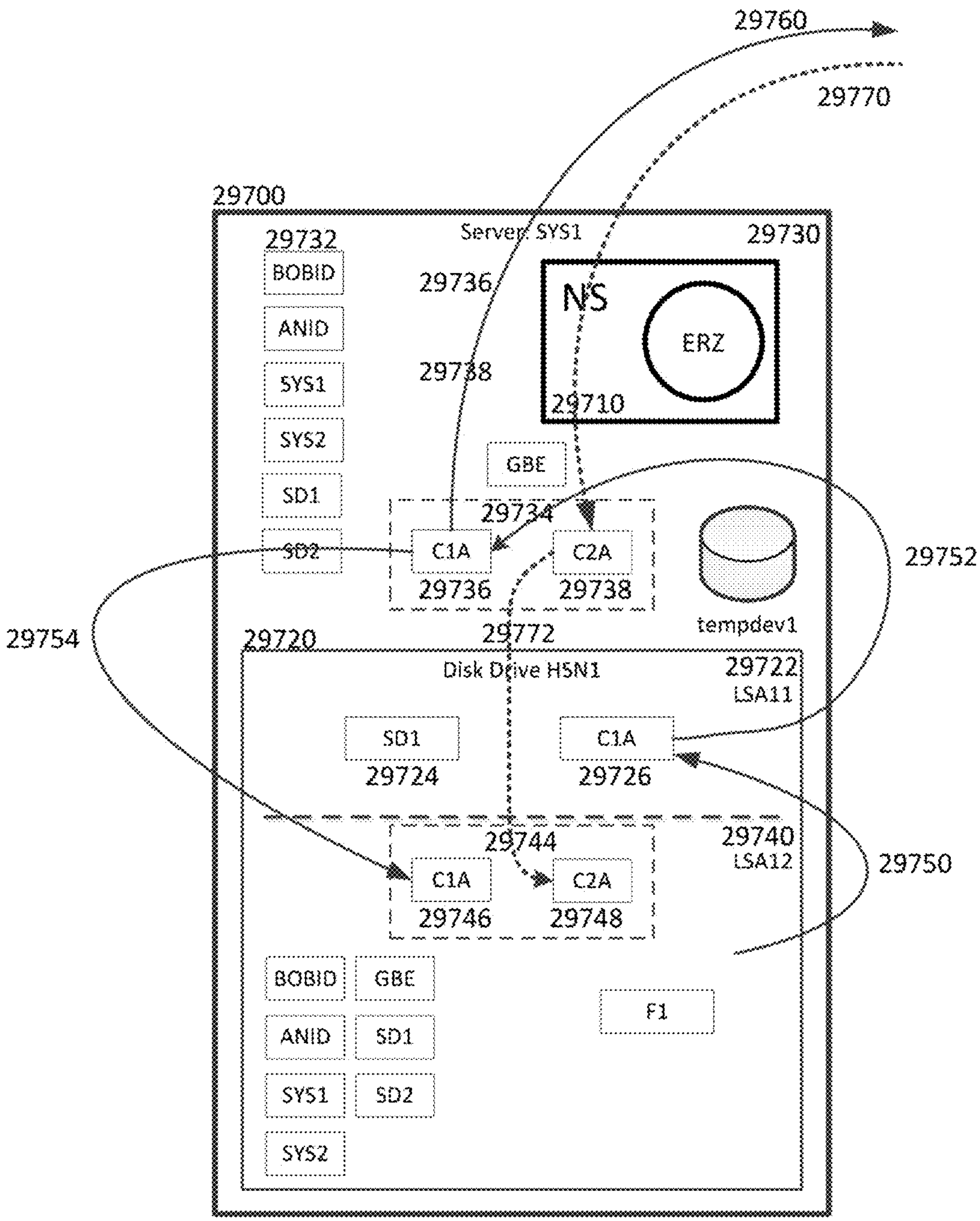

FIG. 297 shows the replication paths of storage device catalogs.

Figure 298:
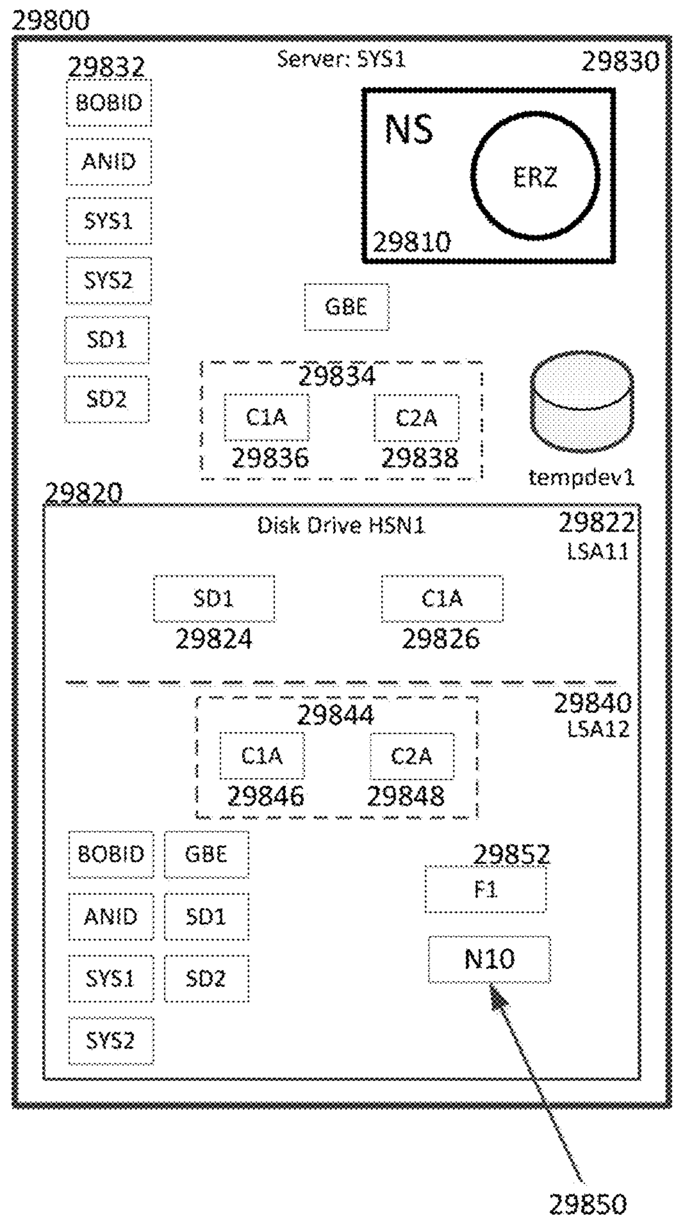

FIG. 298 illustrates ecogroup nut replication.

Figure 299:
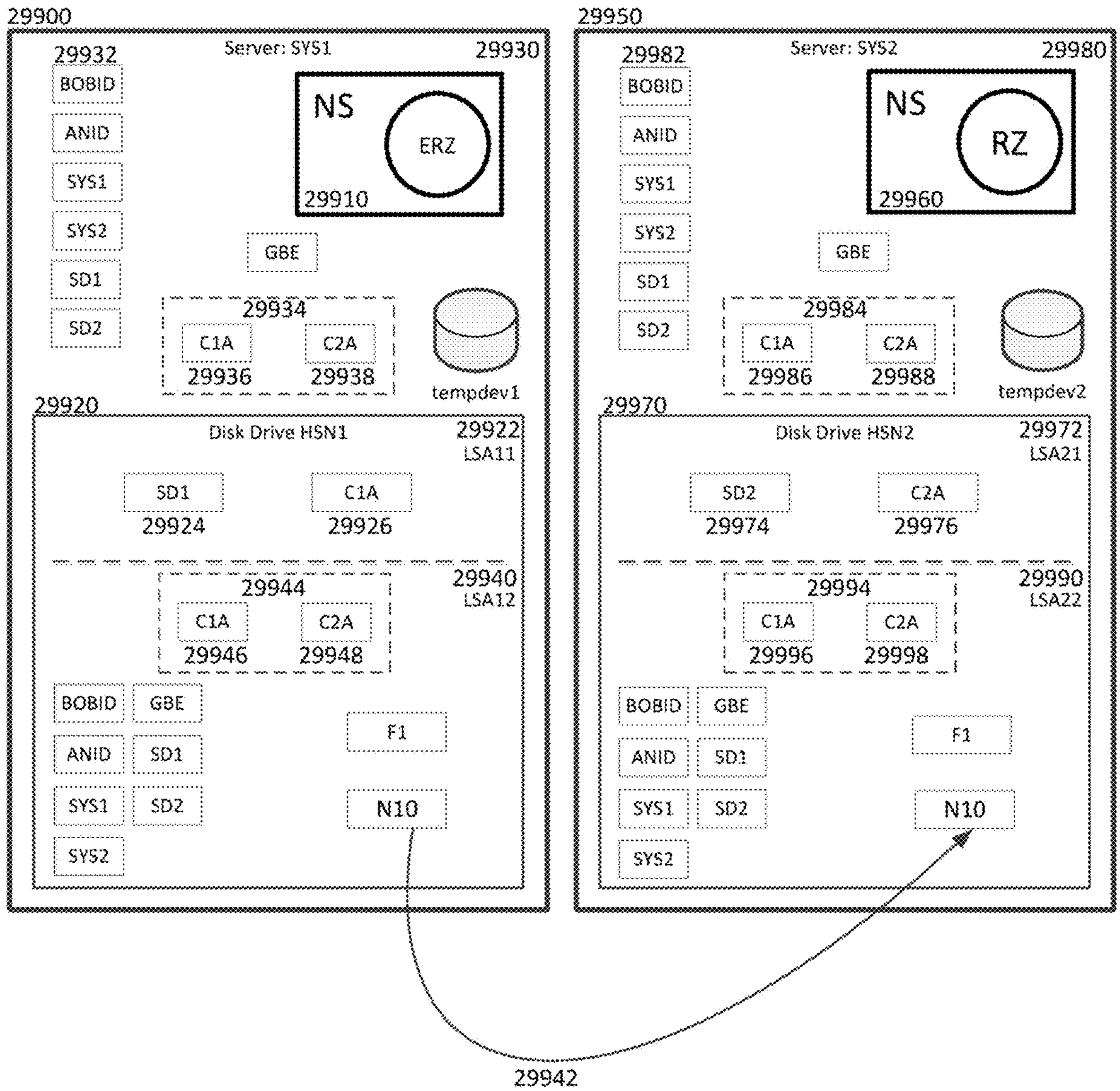

FIG. 299 continues the example from FIG. 298

Figure 300:
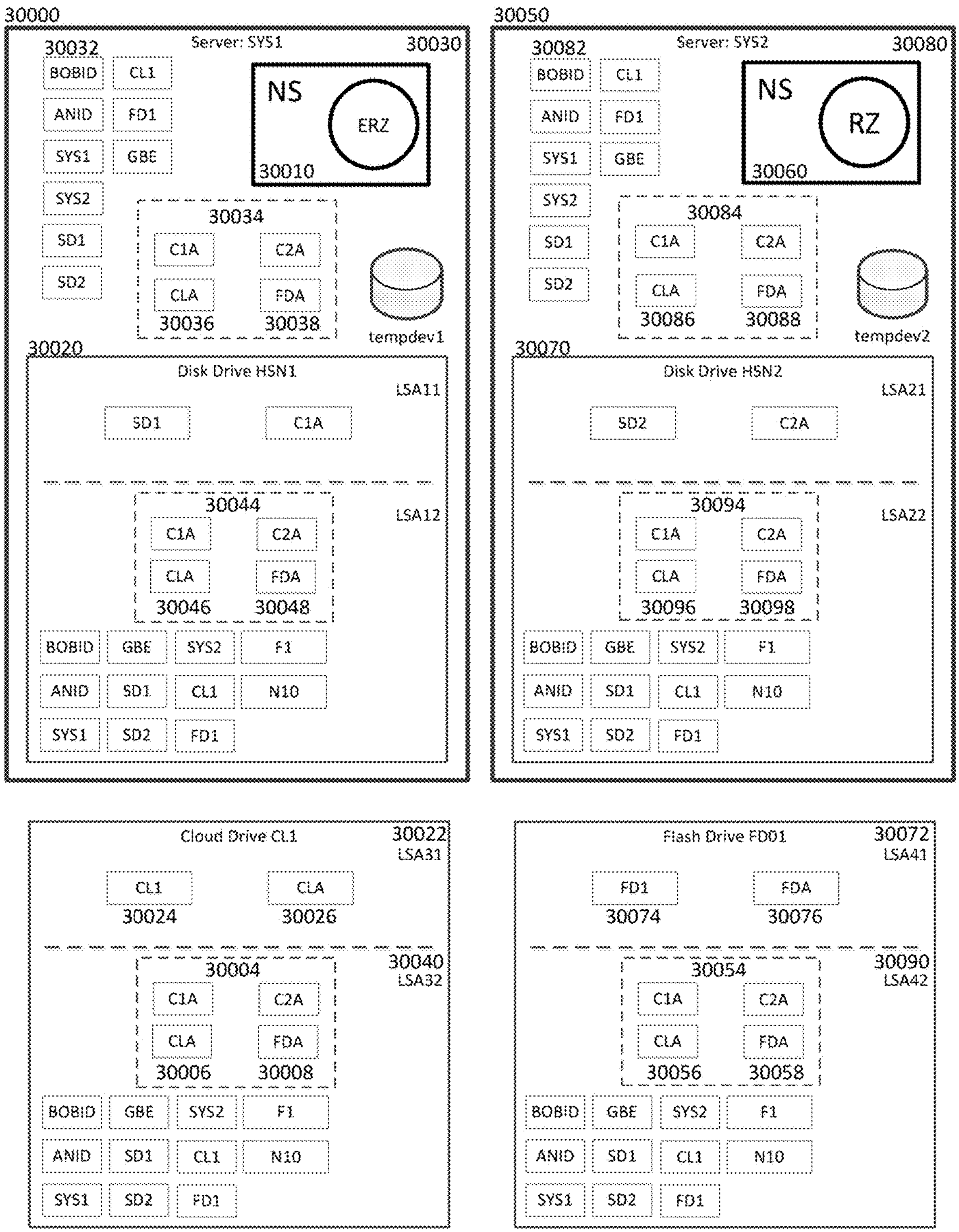

FIG. 300 illustrates a Storage Subsystem with a cloud drive and flash drive.

Figure 301:
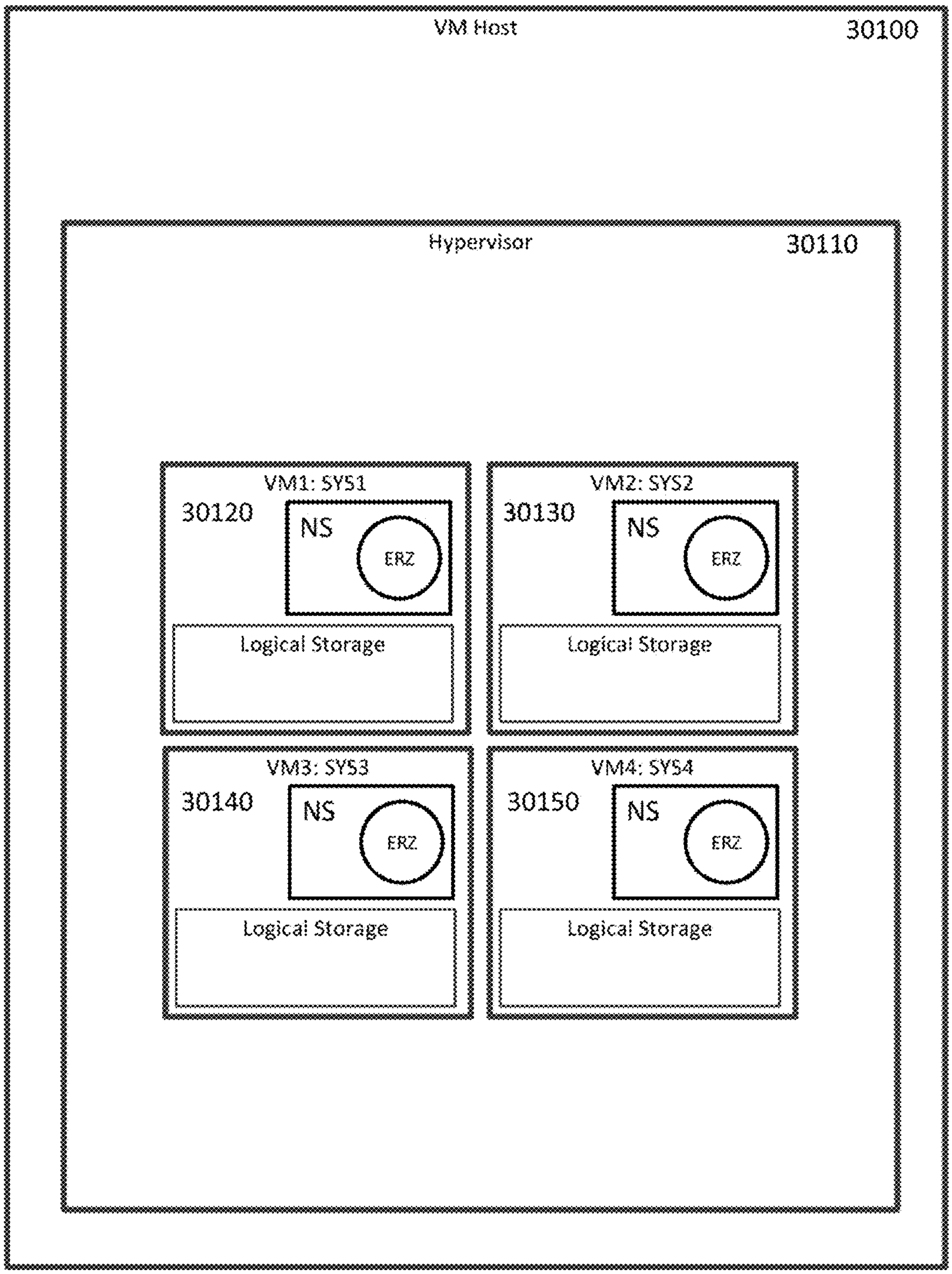

FIG. 301 illustrates a VM hosting multiple NUTS systems.

Figure 302:
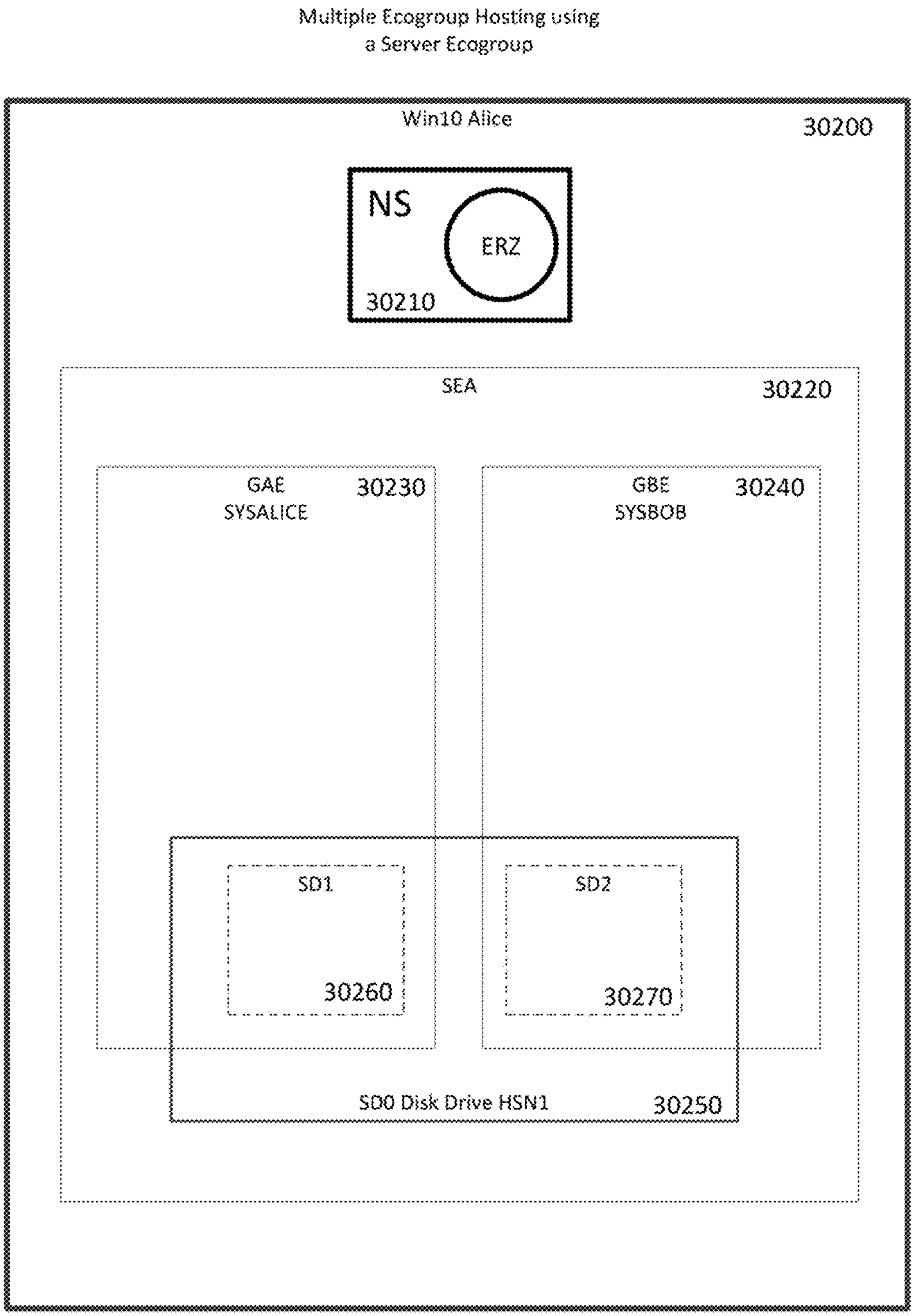

FIG. 302 shows multiple ecogroup hosting using a Server Ecogroup.

Figure 303:
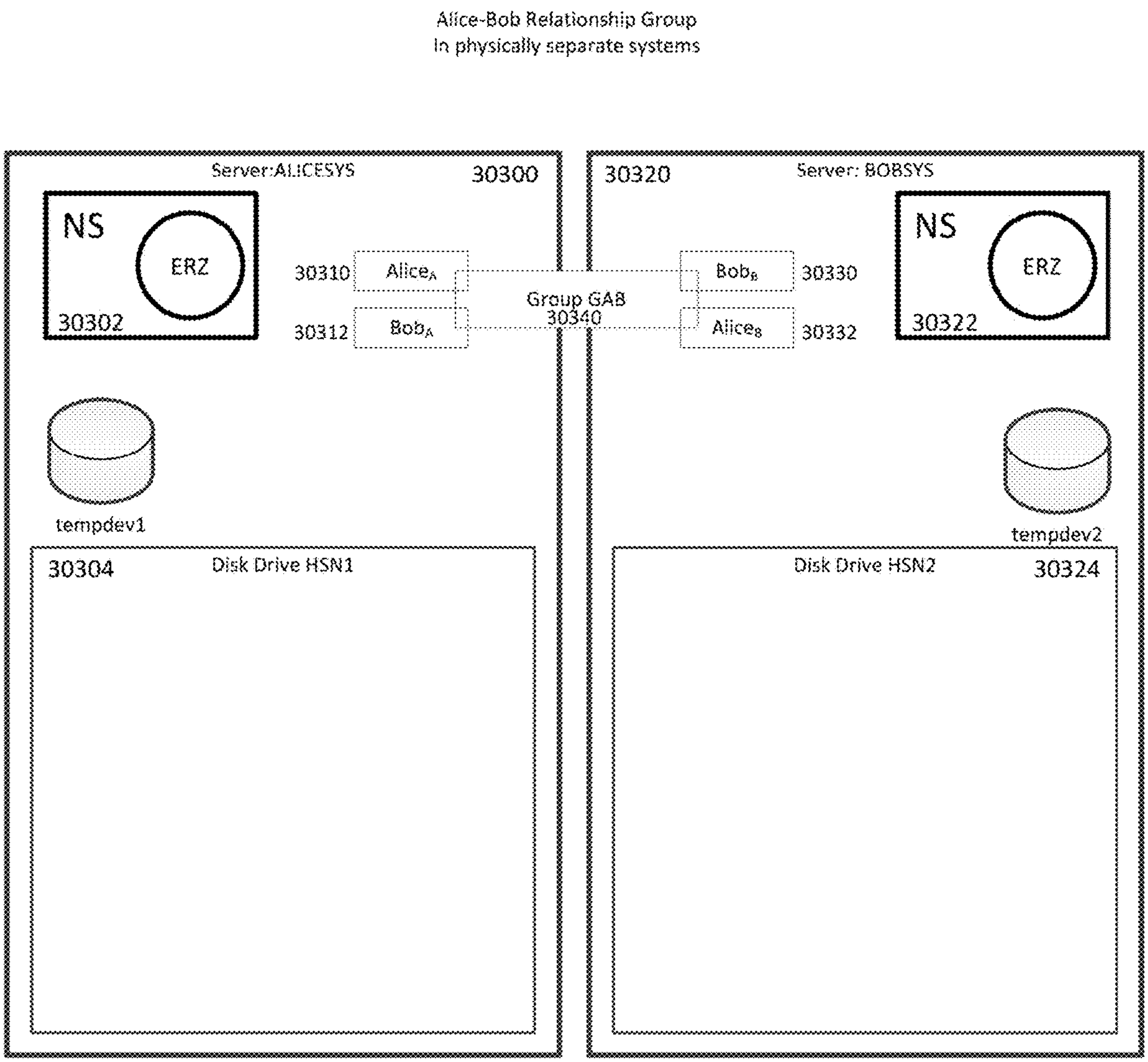

FIG. 303 shows a group of two across two separate systems.

Figure 304:
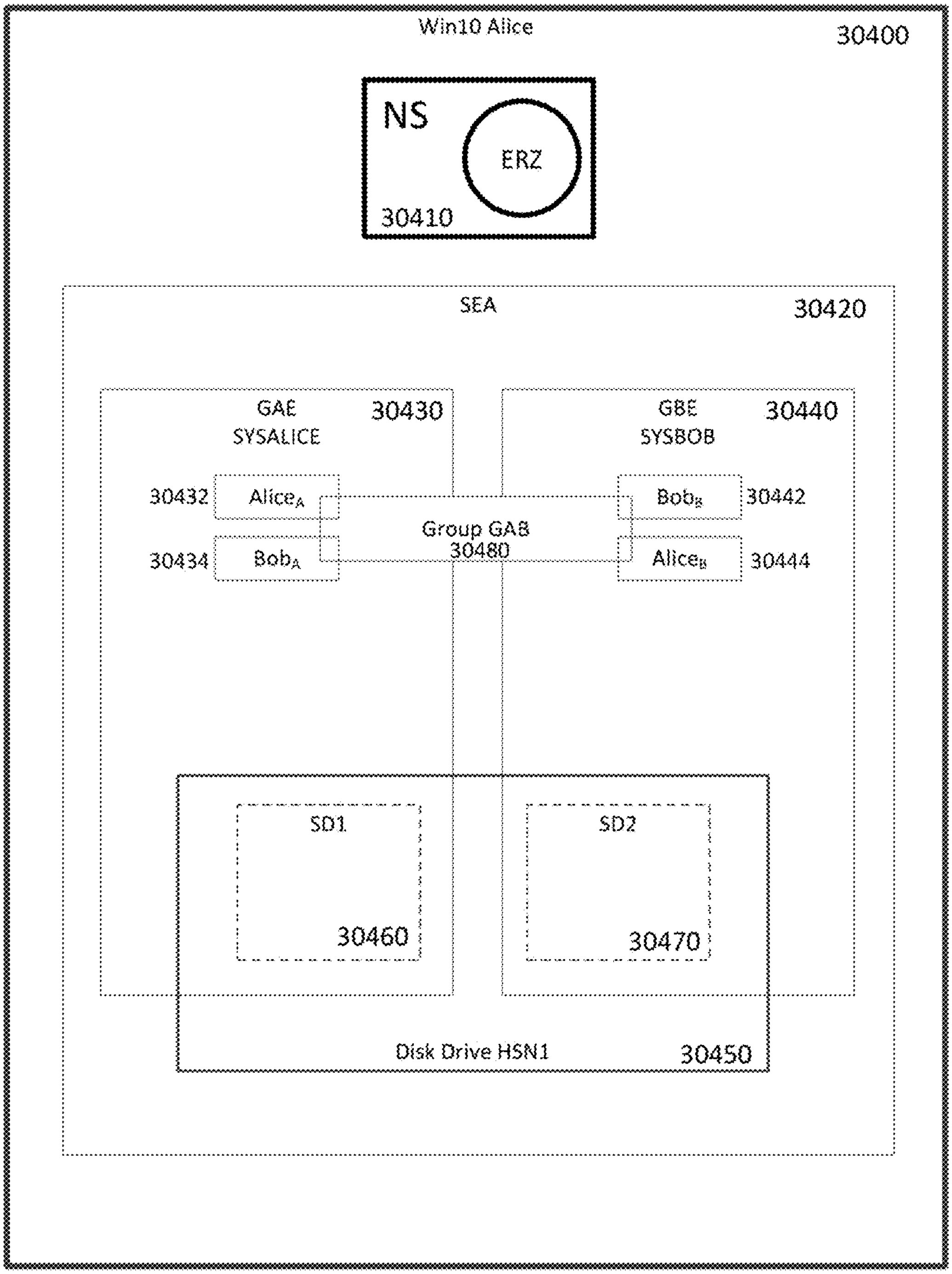

FIG. 304 shows a group of two across two separate Ecogroups hosted by a Server Ecogroup.

Figure 305:
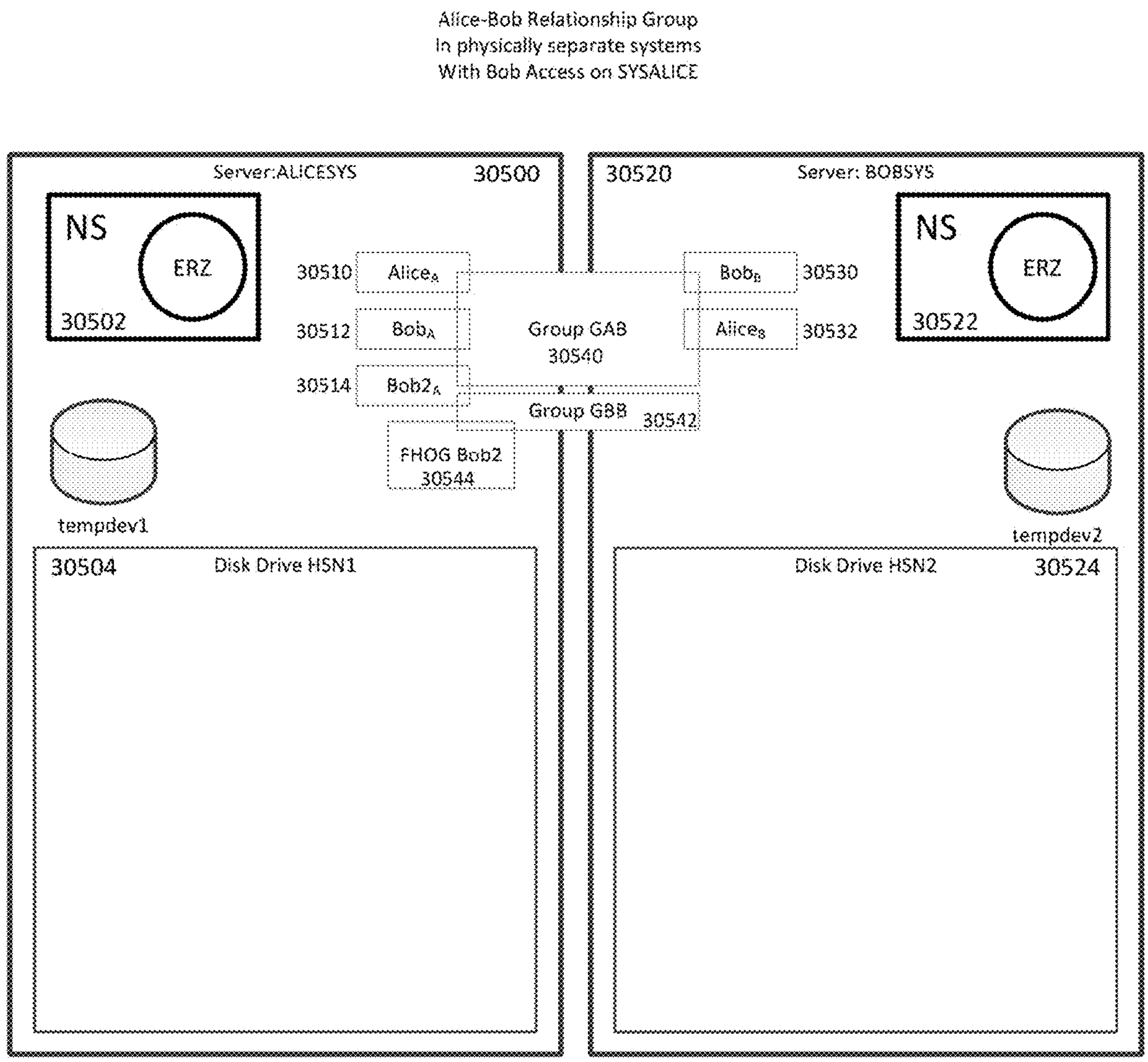

FIG. 305 shows a group of two across two separate systems.

Figure 306:
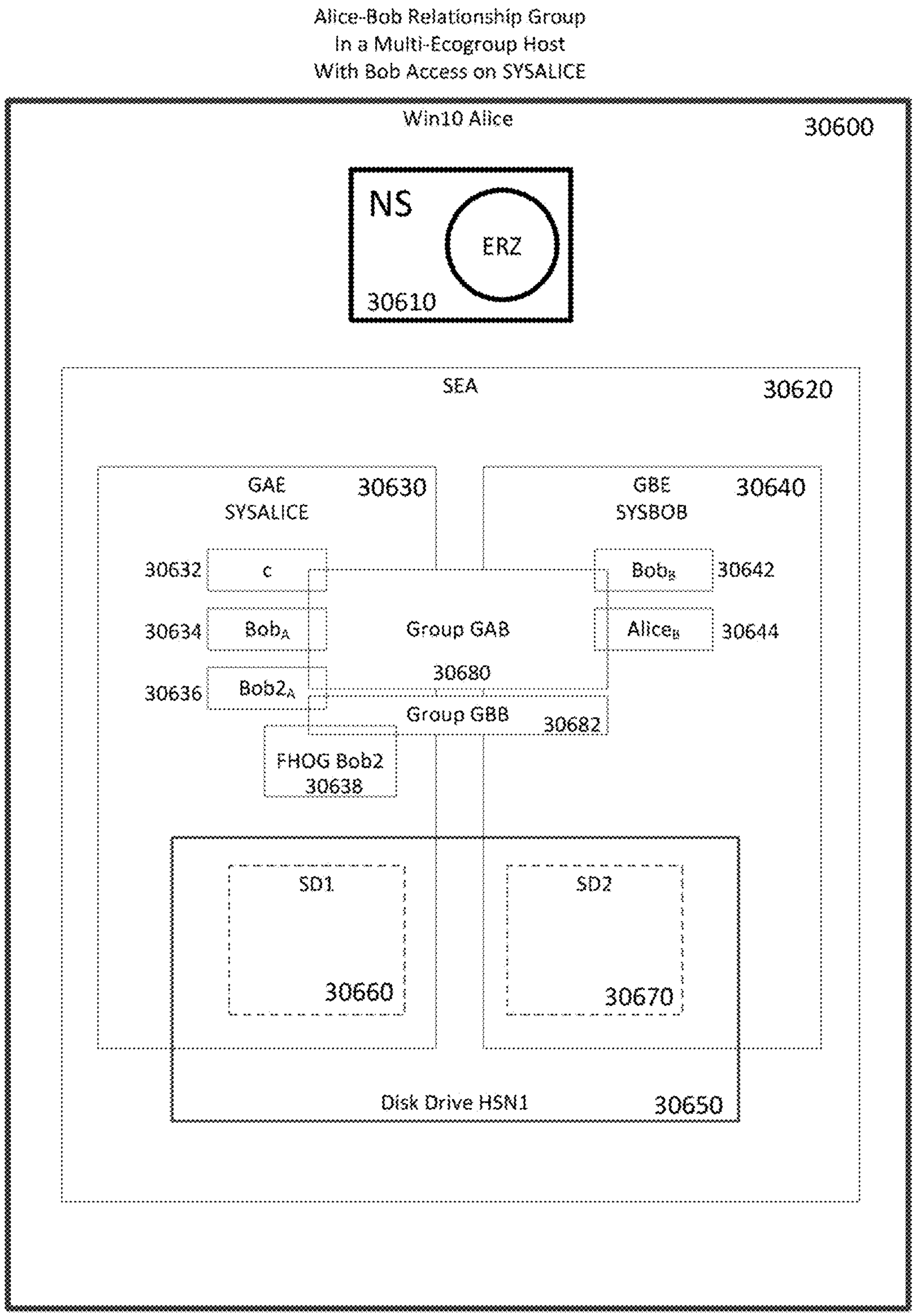

FIG. 306 shows a group of two across two separate Ecogroups hosted by a Server Ecogroup.

DETAILED DESCRIPTION

Table of Contents

Symbols & Abbreviations
Ciphers & One Way Hashes
Network Diagram
Device Diagram
Transmutations
Transmutation Types
Transmutation Structures
Transmutation Audit Records (TAR)
Structured Data Folding with Transmutations (SDFT)
Nut ID
Lock Graphs and Lock Nodes
Keyholes
Variable Locks
Stratum
Nut Access Control (NAC)
Lock Node Traversal
Modular I/O
Reading and Writing
Backward Compatibility
Forward Compatibility
Display
Application
Nut History
Nut Log
Relationship Based Keys (RBK)
Anonymous Relationships
NUTS Core Applications
NUTserver
MIOR Server
NUTbrowser/NUTshell
NUTbook
NUTS Based Services
NUTmail
NUTchat
NUTcloud
NUTnet
NUThub
NUTS Certification Server
NUTS Based WiFi/Ethernet Router
Application Wrapping
Event Processing Service
Contextual Computing
FHOG: Flexible Hierarchy Object Graphs
NCL: Nut Configuration Language
Nut Taxonomy
Finite State Machine (FSM
Carnac Revisions
Structured Access Frameworks (SAF)
Groups
RBK Key Notation
Group Data Flows
Version Markers
Anonymous Identifiers
Rendezvous Server
Ecogroups & Ecosystems
Storage Subsystems Management (SSM)
Multiuser Groups
Conclusion Symbols & Abbreviations The following symbols and abbreviations may be used throughout the descriptions and drawings. Those marked with a (*) may be NUTS specific:

AAKS *Access Attribute Key Set
AAKSUK *Access Attribute Key Set Unlock Key
AAPK *Access Attribute Propagation Key
acipher Asymmetric Cipher
AEAD Authenticated Encryption with Associated Data
AES Advanced Encryption Standard; also Rijndael
API Application Programming Interface
AKS *Access Key Set
ARK *Access Role Key
BIOS Basic Input/Output System
bz2 bzip2, Burrows-Wheeler compression algorithm
CA Certificate Authority
CAC Cryptographic Access Control
ChaCha20 symmetric key based stream cipher by Bernstein
CLI Command Line Interface
CMAC Cipher-based Message Authentication Code
CODEC COder/DECoder; encoding scheme for character data
COM Component Object Model
COR *Class of Readers; or Reader
CORBA Common Object Request Broker Architecture
COW *Class or Writers; or Writer
CPU Central Processing Unit
CRC Cyclic Redundancy Check
dign *(noun) a digital signature generated using an asymmetric private key
dign *(verb) to create a digital signature using an asymmetric private key
DK *Derived Key
DRM Digital Rights Management
DVD Digital Video Disk
DSA Digital Signature Algorithm
ECC Elliptic Curve Cryptography
eDK *encrypted Derived Key
EPS *Event Processing Service
FIPS Federal Information Processing Standards
HMAC Hash based Message Authentication Code
GPS Global Positioning System
GPU Graphics Processing Unit
GUI Graphical User Interface
GUID Globally Unique Identifier
gzip GNU zip compression HKDF HMAC based Key Derivation Function
ikm Initial key material
IMEI International Mobile station Equipment Identity
IoN *Internet of Nuts
IoT Internet of Things
IPC Inter Process Communication
IPv4 Internet Protocol version 4
IPv6 Internet Protocol version 6
I/O Input/Output
ima *KISS field name short for "I am a" or "I'm a": determines KISS mode
iv Initialization Vector: random number for cryptographic use
JSON JavaScript Object Notation
KBP *Key Based Permissions
Keccak SHA3 hash family
KISS *Key Interchange Specification Structure
LAN Local Area Network
lock *Implementation of Variable Locks as a class of transmutations
lzma Lempel-Ziv-Markov chain Algorithm
MAC Media Access Control (w.r.t. Ethernet)
MAC Message Authentication Code
MD5 Message Digest #5 by Rivest
MIO *Modular I/O
MIOR *Modular I/O Repository
MMS Multimedia Messaging Service
NAC *Nut Access Control
NCS *NUTS Certification Server
NFC Near Field Communication
NIST National Institute of Standards and Technology
NoSQL Non Standard Query Language; also non-relational Standard Query Language
nonce Number only used ONCE: random number for cryptographic use
NTFS New Technology File System (Microsoft)
NUTS *eNcrypted Userdata Transit & Storage
OAEP Optimal Asymmetric Encryption Padding by Bellare and Rogaway
OS Operating System
PBKDF2 Password Based Key Derivation Function #2 by RSA (PKCS)
PGP Pretty Good Privacy
PIM Personal Information Manager
PKCS Public Key Cryptography Standards by RSA Laboratories
PKCS1 V1.5 Version 1.5 of PKCS #1
PKI Public Key Infrastructure
PSS Probabilistic Signature Scheme
PUID Practically Unique ID
QA Quality Assurance
QUOPRI Quoted-Printable or QP encoding
RAM Random Access Memory
RAT *Root Access Tier, owner/creator of Nut; also RAT Writer, owner
RBAC Role Based Access Control
RBCAC Role Based Cryptographic Access Control
RBK *Relationship Based Keys
ROM Read Only Memory
RSA Rivest-Shamir-Adleman public key cryptosystem
SAC *Stratum Access Control
Salsa20 symmetric key based stream cipher by Bernstein
salt random number for cryptographic use
scipher Symmetric Cipher
SCP *Structured Cryptographic Programming
SCRYPT a password based key derivation function by Percival
SDF *Structured Data Folding
SDFT *Structured Data Folding with Transmutations
SHA Secure Hash Algorithm—Keccak hash variant
Shake Keccak hash variant
SMS Short Message Service
SOAP Simple Object Access Protocol
SPAM unsolicited bulk email; also junk email
SSD Solid State Drive
SSID Service Set IDentifier
SSO Single Sign On
tar Tape Archive: Unix command to store data onto tape or disk
TAR *Transmutation Audit Record
TOP *Transmutations Organizing Principle
tine *Shamir's Secret Sharing share, like tines on a fork
TMX *Transmutation
TOP *Transmutations Organizing Principle
URL Uniform Resource Locator
UTF Unicode Transformation Format
UTI Uniform Type Identifier
UUID Universally Unique Identifier
VPN Virtual Private Network
WAN Wide Area Network
WiFi WLAN protocol
WLAN Wireless LAN
XML eXensible Markup Language
Zlib zlib compression algorithm FIG. 1 shows a table of cipher key types and their respective symbols which may be used throughout the descriptions and drawings of this disclosure. A variable length text-based password or passphrase may be represented by symbol 102. Symbol 104 represents a key for a symmetric cipher comprising AES-256 or alternative cipher. Symbol 106 represents a key pair for an asymmetric cipher comprising RSA-2048 or alternative cipher. The public portion of an asymmetric key pair 106 may be depicted as symbol 108 and the private portion may be shown as symbol 110. A person having ordinary skill in the art may readily recognize that these ciphers may be well known and well tested algorithms and that other suitable methods may be substituted where these methods may be specified in this disclosure when standards change or an alternative may be desired.

Ciphers & One Way Hashes

Figure 2:
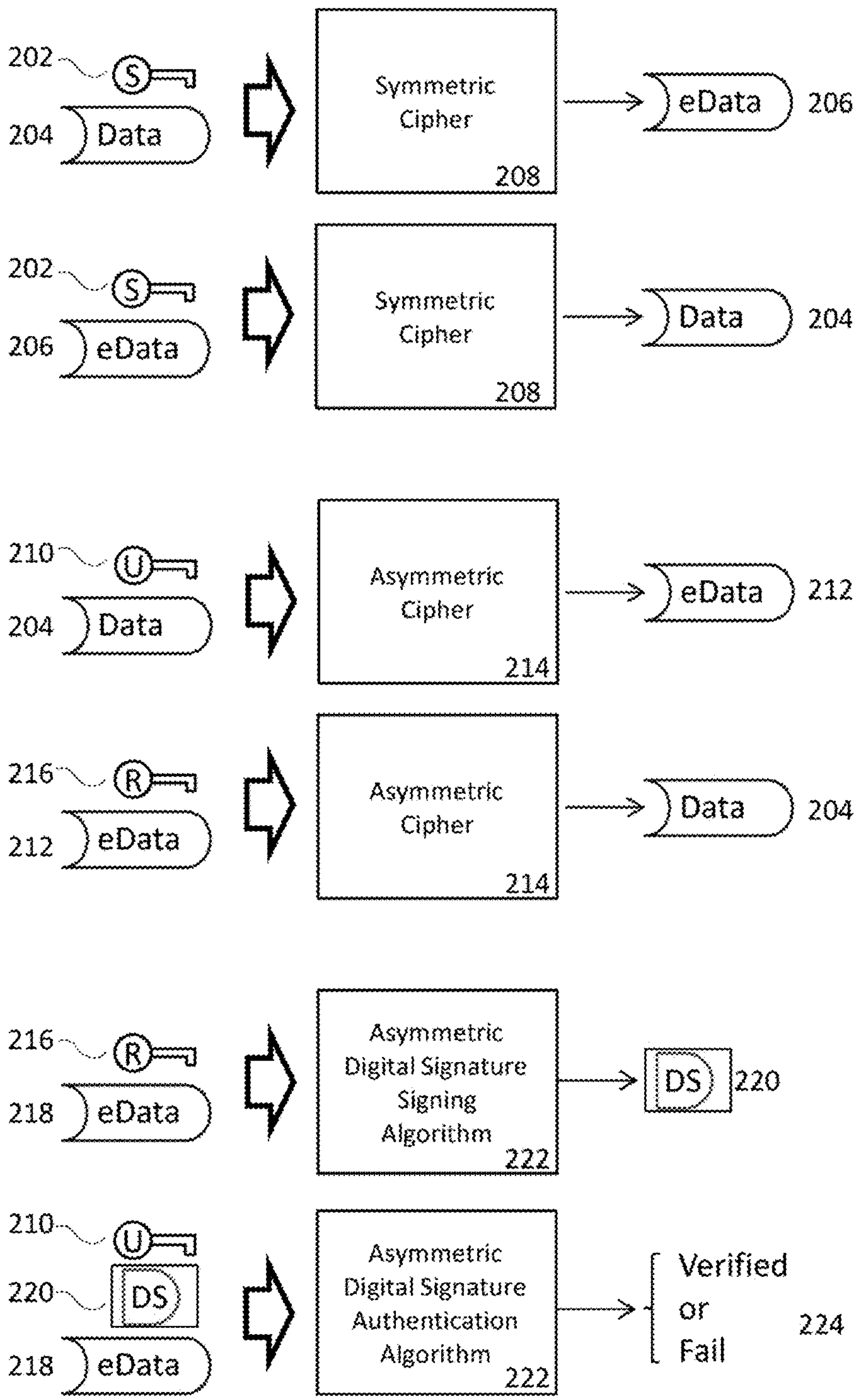
FIG. 2 shows a set of simplified flowcharts showing the data inputs, data outputs and logical operations that may be typically performed by different cipher methods.

FIG. 2 depicts the basic operations which may be performed by various types of ciphers. A symmetric cipher 208 in an encrypting mode may accept a symmetric key 202 and data 204 to produce encrypted data 206 or ciphertext. A symmetric cipher 208 in a decrypting mode may accept the same symmetric key 202 and ciphertext 206 to produce the original data 204. In implementations of a symmetric cipher, the encryption and decryption methods may be two separately named function calls or may be a singular call with a mode parameter as part of the inputs. A characteristic of a symmetric cipher may be that both encryption and decryption processes may utilize the same secret key 202.

An asymmetric cipher 214 in an encrypting mode may accept the public portion of an asymmetric key pair 210 and data 204 to produce encrypted data 212 or ciphertext. An asymmetric cipher 214 in a decrypting mode may accept the private portion of an asymmetric key pair 216 and ciphertext 212 to produce the original data 204. In implementations of an asymmetric cipher, the encryption and decryption methods may be two separately named function calls or may be a singular call with a mode parameter as part of the inputs. A characteristic of an asymmetric cipher may be that the encryption and decryption processes may utilize different parts of a key pair. In an implementation such as RSA-2048, a public key may be derived from the private key using a mathematical relationship therefore an RSA-2048 private key may be synonymous with the key pair and the public key may be extracted from it.

A digital signature method 222 in a signing mode may accept the private portion of an asymmetric key pair 216 and ciphertext 218 to produce a digital signature 220. The digital signature method 222 in an authentication mode may accept the public portion of an asymmetric key pair 210, digital signature 220 and ciphertext 218 to authenticate 224 whether the digital signature was created using the said ciphertext 218 and private portion of an asymmetric key pair 216. In implementations of a digital signature method, the signing and authentication methods may be two separately named function calls or may be a singular call with a mode parameter as part of the inputs. A characteristic of a digital signature method may be that the signing and authentication processes may utilize different parts of a key pair. In an implementation such as a digital signature method based on RSA-2048 key pairs, a public key may be derived from the private key using a mathematical relationship therefore an RSA-2048 private key may be synonymous with the key pair and the public key may be extracted from it. For brevity and conciseness, this document may interchangeably refer to a digital signature as a dign; an act of digitally signing a piece of data may be interchangeably referred to a digning; having digitally signed a piece of data may be interchangeably referred to as digned.

A digital signature method may be a type of message authentication code or MAC. MACs may be created with one way hash algorithms on data. A hash method such as SHA-512 may accept data content to produce a message digest of it which may be up to 512 bits in length. Authentication of MACs using methods such as SHA-512 entails recalculating the MAC on the said piece of data and comparing the provided MAC and the calculated MAC for equality. A technique known as keyed hash message authentication code or HMAC may take in an additional input of a cryptographic key along with the data content to produce an HMAC value.

Digital signature methods and/or hashing methods may be used in various parts of this disclosure to produce message digests that may be representative of the respective data.

Network Diagram

Figure 3:
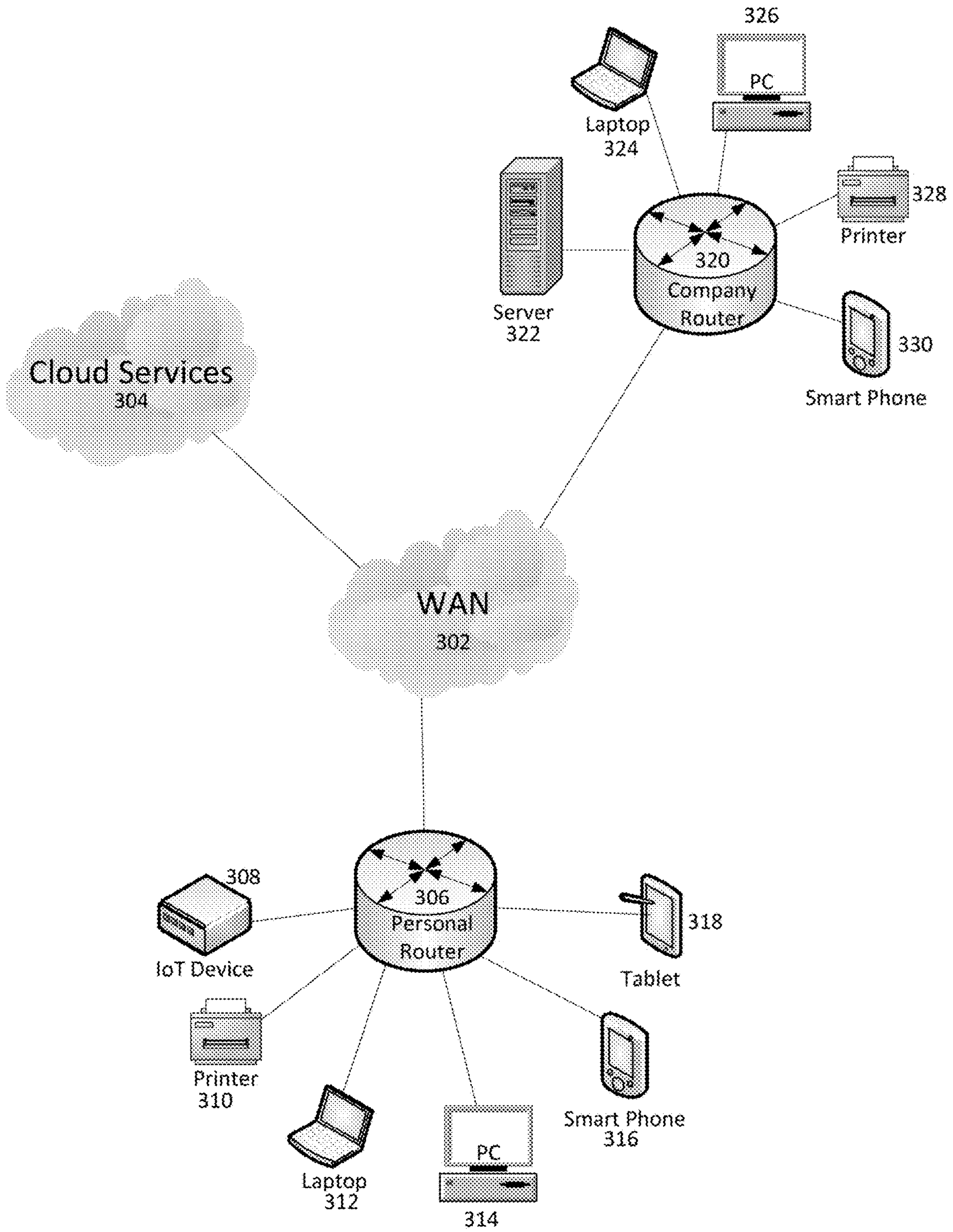
FIG. 3 shows an illustration of a general network layout where embodiments of this disclosure may function.

FIG. 3 represents a simplified network diagram in which various embodiments of this disclosure may be applied to in part or whole. A wide area network WAN 302 may be represented as a network cloud which may comprise many servers, routers and switching systems at various telecommunication centers working together to provide a simplified network cloud view to a user or company. Cloud Services 304 may be also pictorially simplified as a cloud which represents various commercial systems that may provide network services such as cloud storage and cloud processing; these services may be implemented to their own specifications but may comprise many instances of server farms, storage arrays and routers. A personal router 306 may be connected to the WAN 302 which may give individual users access to the Internet among a plurality of network connectible devices 308-318 that the user may have. A user may not be limited to the devices depicted on the diagram but may use any device that may utilize a router to access other devices on the same network or across the Internet. The router 306 may be a dedicated routing device to the Internet service provider or it may be a combination device providing routing and/or LAN and/or WLAN capabilities and may be referred to as a gateway. A corporate router 320 may be connected to the WAN 302 which may give institutional users access to the Internet among a plurality of network connectible devices 302-330 that the company may have. A company may not be limited to the devices depicted on the diagram but may use any device that may utilize a router to access other devices on the same network or across the Internet. The router 320 may be a dedicated routing device to the Internet service provider or it may be a set of interconnected and managed routers providing routing and/or LAN and/or WLAN capabilities and may be referred to as a gateway and/or intranet. The system and method described herein in various embodiments, may be used and applied to some or all parts of this network diagram.

Device Diagram

Figure 4:
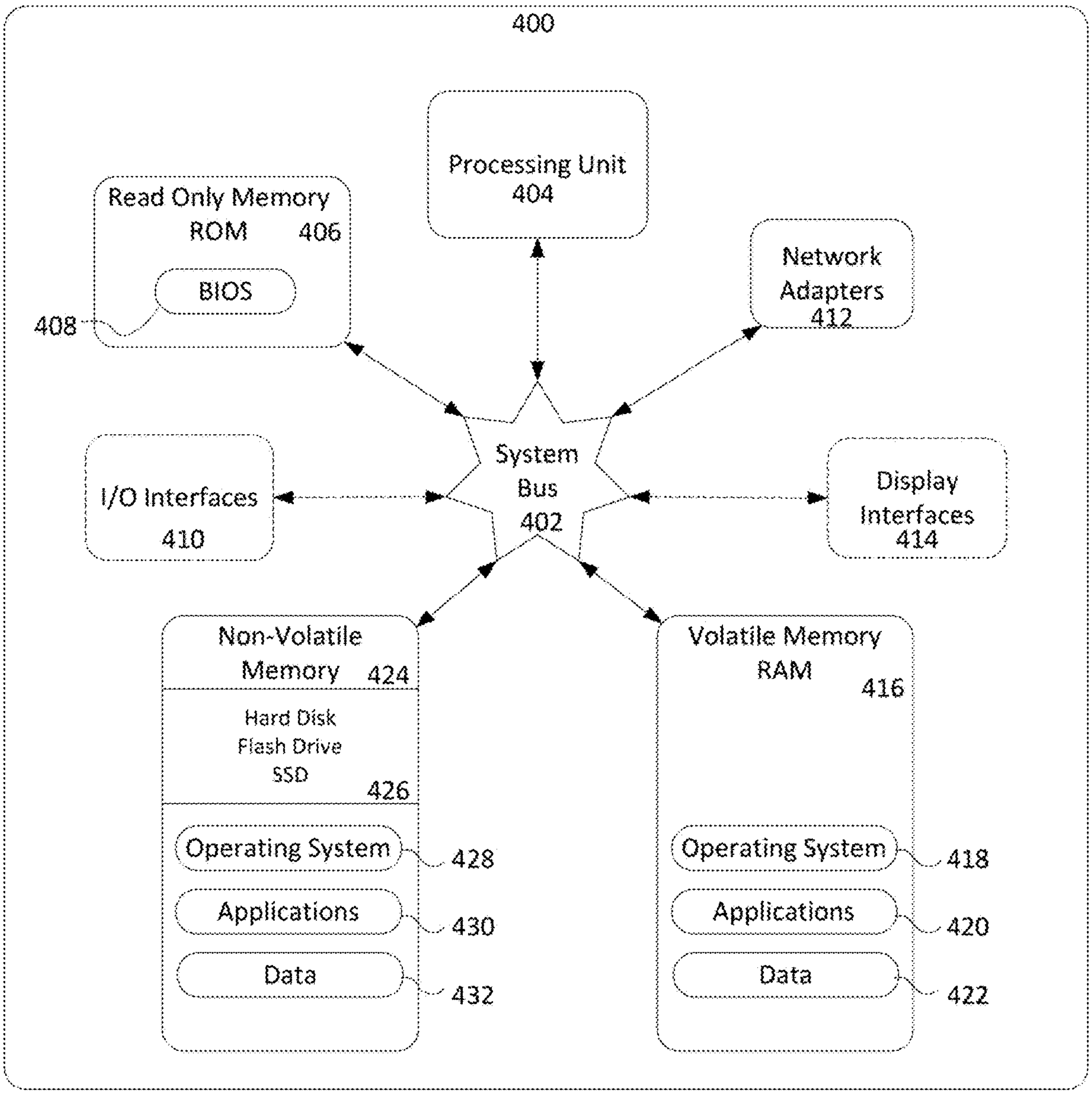
FIG. 4 shows an illustration of a computing device where embodiments of this disclosure may function.

A generic computing device 400 is depicted in FIG. 4. A processing unit 404 may be connected to a system bus 402 which may facilitate some or all internal communications and data transfers within the device. There may be several different types of system buses available but for simplicity they may be collectively referred to as the system bus 402. The processing unit may represent a single or multi-cored processor as well as arrays of processors such as those found in various specialized processing boards such as GPU boards and blade servers. Other components serviced by the system bus may be Network Adapters 412; I/O Interfaces 410; Display Interfaces 414; Read Only Memory ROM 406 which may store a BIOS program 408; Volatile Memory RAM 416 which may ephemerally store the running Operating System 418, running applications 420 and/or application data 422; and Non-Volatile Memory 424 such as hard drives, SSD and flash drives 426 which collectively may persistently store the installed Operating System 428, Applications 430, and/or data files 432.

Not all components of the depicted computing device may be necessary for some or all embodiments of this disclosure to be applicable and functional. For example, devices may not have any physical displays nor I/O Interfaces as those found on some IoT devices; routers and gateways may have very little in the way of physical hard disks. A necessary requirement for NUTS support and compatibility may be the ability to run NUTS compatible software which may comprise a processing unit, some form of storage and a system bus.

Transmutations

Transmutations may be a preferred method of organizing the many known data manipulation operations found in computer programming. NUTS may designate this as the Transmutations Organizing Principle or TOP. Furthermore, any systematic data manipulation operation may be analyzed using TOP and may be classified as a type of transmutation. Then, the transmutation may be categorized, normalized, structured, integrated and/or adapted to work cooperatively within the framework of TOP which may be called Structured Data Folding with Transmutations or SDFT. The insightful perspectives of TOP and/or operating on data with SDFT may allow for better and/or complex data designs to be implemented in a conceptually simpler and/or programmatically efficient manner. TOP and SDFT may be the preferred lower-level implementation mechanisms for NUTS components.

The analyses, methods and/or structures based on the transmutation of data may show how layering such concepts and designing their associated methods may define an implementable set of integrated data structures and algorithmic methods which may allow for the facile and systematic transmutations of data in a modular, portable, storable and/or self-describing way. Due to the layered and intertwining nature of such analyses, the descriptions of transmutations may have forward and backward references and may require the reader to reference different sections in order to gain a better appreciation of certain characteristics. Structured Data Folding with Transmutations (SDFT) builds upon transmutations using data structures and methodologies and may help enable the storability, transmissibility, modularity, portability, encapsulability and/or time compatibility of the transmuted data.

Within the NUTS design, SDFT is a set of low-level operations and may be considered a fundamental building block to more easily construct a Nut. However, SDFT may be used independently, in part or whole, to simplify certain tedious and/or repetitive data transmutations within an application. SDFT may enable computer communication protocols to dynamically switch transmutation sequences and/or transmutation parametric variances within the same session between two different applications. Currently, such single session dynamic switching may be a non-trivial programmatic exercise. It may not be a necessary requirement to use SDFT in order to build a Nut, but its features may help build a Nut more expediently, clearly and flexibly. SDFT may be further described as a data state transition methodology that allows for infinite variations of transition events with well-defined behaviors on the reversibility of the state transition sequences and may provide an iterative encapsulation technique to persist the necessary attributes and data in a simple context sensitive way. SDFT accepts and embraces the messiness of everyday programming issues and may present a pragmatic set of organizing principles where theoretical proofs may be subordinate to empirical proofs.

Figure 5:
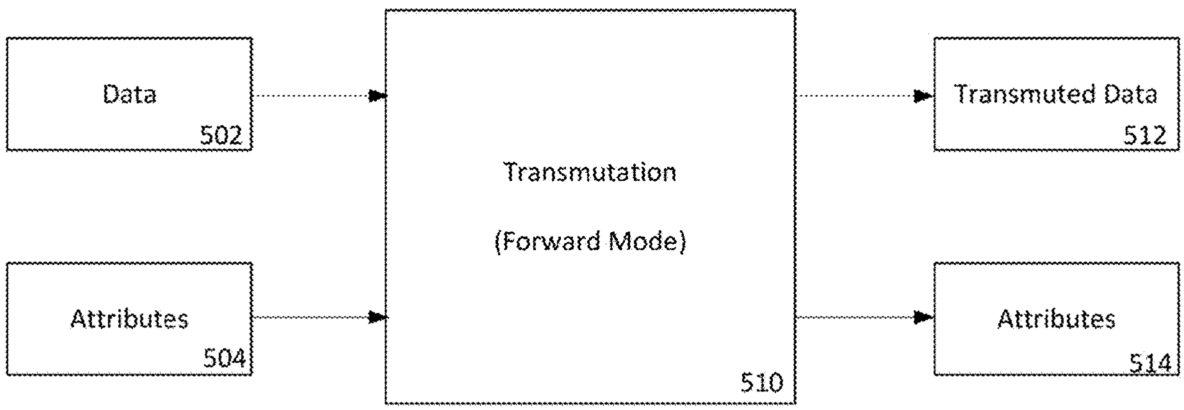
FIG. 5 shows an illustration of a transmutation in forward mode or normal operation

FIG. 5 shows how the Transmutations Organizing Principle may view any data operation as a data transmutation 510 which may require an input data source 502 and attributes 504 and which may output the transmuted data 512 and associated attributes 514. Any well-defined manipulation, operation, conversion and/or transformation of data may be classified as a type of transmutation 510. TOP may allow one to systematically construct a consistent set of methods of transmuting data in a modular, portable and/or self-describing way.

The table in FIG. 6 shows a sample set of common data operations and how they may be classified using TOP. Transmutations may encompass a class of fundamental data operations which may have been traditionally segregated in perception and in practice. Such may be the case when programmers discuss cryptography and data compressions, these two classes of data operations may typically be considered as two very separate and distinct operations on data. Beyond the algorithmic differences of each operation, through the perspective of TOP, these operations may be viewed as a type of ciphering transmutation and a compression transmutation. In the table, a 'JSON serialization' may be classified as a 'serialize' transmutation with an operation of 'json', therefore an executable transmutation command may be stated as 'serialize json'. An AES symmetric cipher encryption call on a piece of data may be classified as a 'scipher' transmutation with an operation of 'aes', therefore an executable transmutation command may be stated as 'scipher aes'. A person having ordinary skill in the art may readily recognize all the other types of data operations listed in the table and follow the organizing pattern of transmutation classification and operation categorization.

Figure 7:
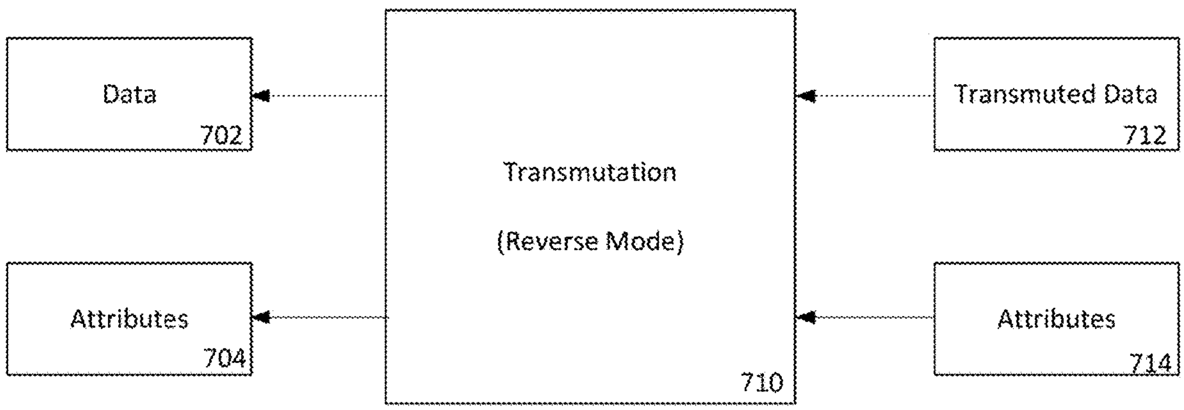
FIG. 7 shows an illustration of a transmutation in reverse mode.

FIG. 7 shows a diagram of a transmutation in reverse mode or reversal operation. This figure is identical to FIG. 5 except for the data flow arrows which flow in the opposite direction. A transmutation 510 may have a well-defined reversible algorithm as illustrated by block 710. A reversible transmutation 710 may require as input a transmuted data source 712 and attributes 714 and may output the original data 702 and associated attributes 704. A field of computing may exist called Reversible Computing which may exhibit similar concepts as a reversible transmutation. There may be some differences in the goals of each organizing principle. Reversible Computing may theorize the existence of a generalized reversible computing language whose operations may be implemented down to the silicon layers for a possible energy efficiency of general computations. Reversible transmutations may aim to concretely implement TOP for benefits such as, but not limited to, minimizing written code, minimizing programmatic errors, convenient key management, simplifying key generation, structuring portable self-describing data, normalizing data manipulation concepts, introducing programming language independent methods of performing transmutations, and/or simplifying the building of complex cryptographic data structures.

Figure 8:
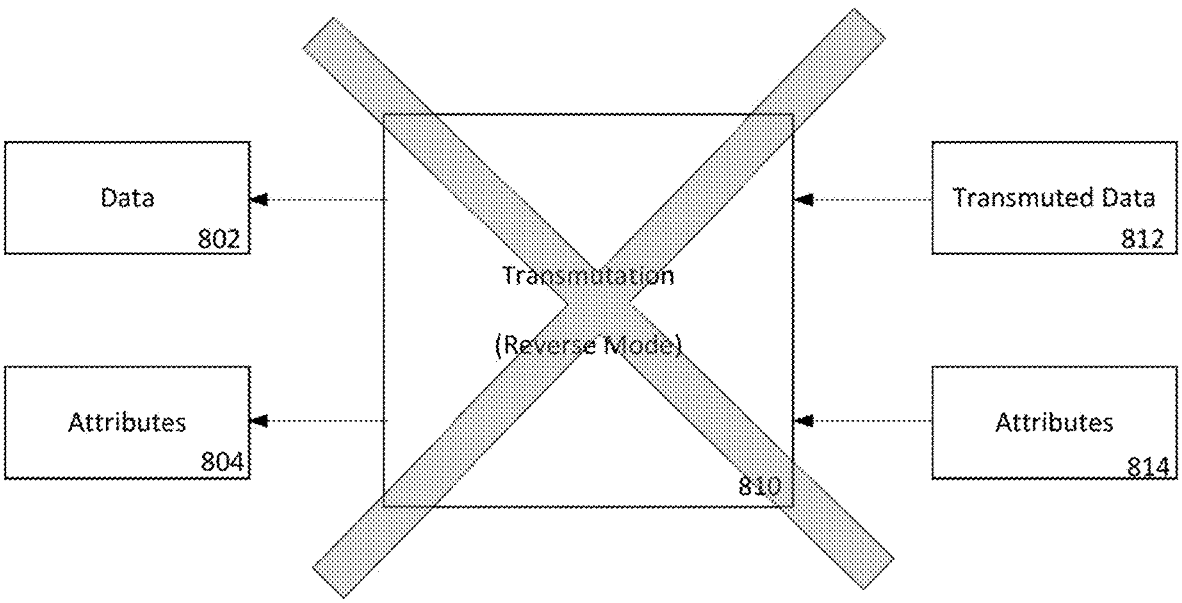
FIG. 8 shows an illustration of an irreversible transmutation

FIG. 8 shows a pictorial representation of an irreversible transmutation. A transmutation 810 in forward mode may perform a transmutation on data 802 and attributes 804 which may produce transmuted data 812 and attributes 814 but these outputs along with the type of manipulations the transmutation may perform on the inputs may be of an irreversible nature. Such irreversible transmutations may be exemplified by hashes, MACs, lossy data compressions and other one-way functions or data manipulations. TOP may introduce analysis techniques which may peripherally augment the characteristics of such irreversible transmutations and may produce operations which may define their reverse transmutation characteristics.

Figure 9:
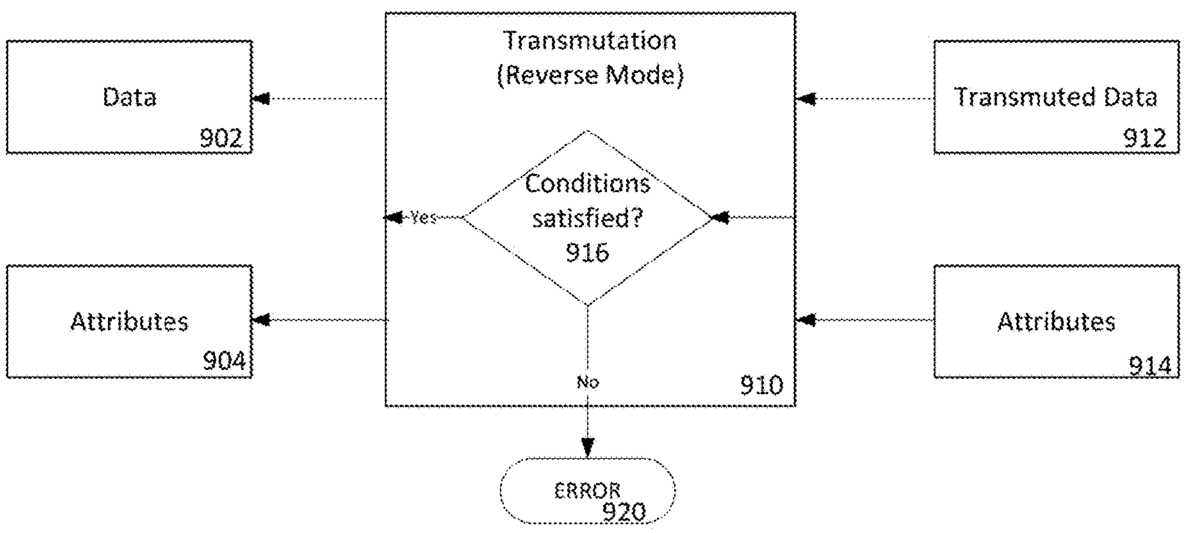
FIG. 9 shows an illustration of a conditionally reversible transmutation

FIG. 9 shows a block diagram of a conditionally reversible transmutation. Such a transmutation 910 may have a well-defined reversible algorithm but may require additional inputs and/or attributes 914 for the reversal operation to succeed. A conditionally reversible transmutation 910 may require as input a transmuted data source 912 and/or attributes 914 and may output the original data 902 and/or associated attributes 904, if and when, the requisite conditions 916 are satisfied, otherwise it may fail with an error condition 920. Ciphers which may require keys may be classified as conditionally reversible transmutations since the absence of the correct key (an attribute) may hinder the decryption of the ciphertext.

FIG. 10 is a table listing common data operations and functions and their respective transmutation classifications. A person having ordinary skill in the art may recognize some or all of the data operations and/or functions listed in the table. For exemplary purposes, the material presented in this document may reference the programming language called Python version 3.6 and its syntax, concepts, function and/or methods. Many of the cryptographic functions referenced in this disclosure may be found in the Python Standard, pyCryptodome, secretsharing and/or pyCrypto libraries. A person having ordinary skill in the art may find equivalent syntax, concepts, function and/or methods in most modern programming languages and their respective libraries. Note that a 'dign' is a transmutation for digital signatures; other mnemonics may be listed in the SYMBOLS & ABBREVIATIONS section of this document. Further detailed descriptions of each transmutation may be found in the table in FIG. 12.

FIG. 11 is a table of Codecs defined in Python v3.6. This list may not be complete due to the numerous Codecs in existence, the proliferation of new Codecs and/or the limitations of those defined in Python v3.6. A 'Codec' is short for Code/Decode and is a mapping for a character set in computing. A character is assigned an arbitrary but unique binary value within a single Codec; thus, a complete set of characters may define a single Codec. Not all characters within a given Codec may be human readable or printable. A common usage of Codecs is for the proper representation of different character sets of different languages. The 'encode' transmutation may be able to perform any of these Codec encoding operations on a given data string. The Codecs with names starting with 'utf_' may specify those conforming to the Unicode Transformation Format (UTF) which may be the organizing principle of international character sets for many internet-based standards.

FIG. 12 is a table listing the transmutations discussed thus far with their detailed descriptions. Additional transmutations may be defined within the framework using TOP as shown by the last six transmutations in the table: key, clean, TAR group, press, lock and mobius. Some of these additional transmutations may be specific to the Structured Data Folding with Transmutations (SDFT) library, some may be language specific and/or some may be operations related to NUTS. This may illustrate the flexible nature of TOP by allowing new transmutation types to be defined and classified to expand its repertoire. This flexible expansion feature is by design so that the SDFT library may accommodate new transmutation operations in the future. The expansion feature may also allow for older versions of transmutation operations to be retroactively added for backwards compatibility. A benefit of such flexibility may be the ability of SDFT processed data to acquire a characteristic of better time compatibility. Time compatibility of data may be defined as those characteristics which may enable stored data to be easily processed by the same or different application at some future point in time. Time incompatibilities may arise from, but are not limited to, application file format version differences, different character encodings, obsolete application file formats, data operation method differences, data operations sequencing differences and/or data operation specific parametric variances.

FIG. 13 shows a transmutation reversibility matrix. Each transmutation may be designated as being reversible, irreversible and/or conditionally reversible. The criteria for making such a designation may be based on the ideal intentions of the transmutation rather than its implemented and/or theoretical shortfalls in practice. In other cases, the designation may be arbitrary. This may be illustrated by a digest operation called MD4 which may produce 128-bit long hashes of source data. The MD4 hash may be considered a severely weak hashing algorithm as compared to a hash operation such as 512-bit SHA2 due to its susceptibility to collisions which may be an undesirable trait in hashing algorithms. The TOP perspective may be to recognize one of MD4's original intentions to be an irreversible unique hash and categorize it in that fashion. Such categorization may not exclude this type of transmutation from gaining a well-defined, engineered reversibility characteristic through additional TOP analysis as will be shown in a later section. The compress transmutation may fall under both reversible and irreversible designations based on the particular compression operation being performed. Many image and/or audio compression techniques may exhibit irreversibility due to their sampling nature; a 12 MB digital image may be compressed down to 360 KB for efficient transmission via a chat application, but due to the nature of human visual perception, the general impression of the image may be properly conveyed despite the permanent data loss. Such a compressed image may be irreversibly modified due to the tremendous amount of original data that may have been discarded during the transformation.

A reversible compression transmutation may be exemplified by a gzip compression; it may operate on the principle of identifying and reducing repetitive bit patterns within the binary data, but it may maintain enough information to reverse the process and reproduce the original data in its entirety. A conditionally reversible transmutation may be exemplified by the AES symmetric cipher; it may operate on the principle of taking in cleartext and a symmetric key and producing ciphertext. The decryption process may take the key and ciphertext to produce the original cleartext. Thus, the presentation of the correct symmetric key for the ciphertext may be the necessary condition which must be satisfied to decrypt the ciphertext or reverse the encryption process.

TOP may define a transmutation mode which may indicate the direction of a given transmutation operation as either Forward or Reverse. The forward mode of a transmutation may perform its normal process and/or its engineered forward process. The reverse mode of a transmutation may perform its inherent reverse process and/or its engineered reverse process. The table in FIG. 14 shows a matrix indicating the type of operation a transmutation may perform internally based on its transmutation mode. As a reference, the table lists the commonly known operation names such as 'serialize' and 'deserialize', or 'encrypt' and 'decrypt'. Note the engineered reverse processes of digest and dign: 'digest' and 'verification', 'sign' and 'authentication'. For the 'clean' transmutation where it may delete various internal data associated with its transmutation data structure, it may be impossible to reinstate such deleted data without proper additional data and/or the rerunning of the forward transmutation process on the original data to reproduce the deleted transitory data. The 'key' transmutation may perform key generation and/or management operations related to performing transmutations. As such, due to the inherent random nature of key generation, it may be impossible to theoretically and/or algorithmically reverse such a process in a deterministic fashion in finite time. The key management aspect of the 'key' transmutation will be discussed in detail in a later section when we address how transmutations may work within the context of Structured Data Folding (SDF); the key management aspect of a key transmutation may be difficult to engineer a reversible counterpart due to its characteristic of setting up the proper key structures for a successful processing in an SDF context.

Figure 15:
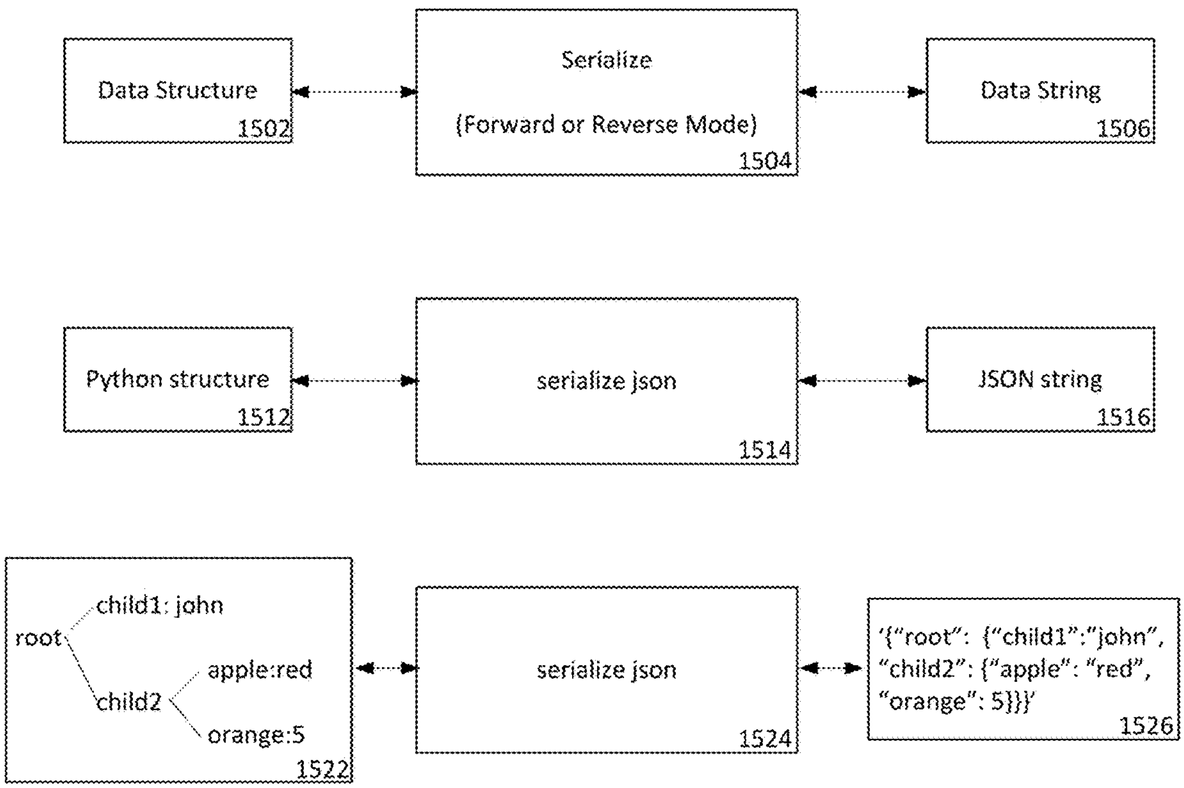
FIG. 15 shows a detailed example of a serialize transmutation

FIG. 15 shows a series three diagrams, each of which further details a serialize transmutation 1504 example which may be designated a reversible transmutation. In computer programming, a serialize and/or marshalling technique may take a complex language specific internal data structure and may systematically deconstruct and/or organize its contents in a linear fashion to produce an equivalent data string or set of data strings (henceforth referred to as a data string). The data string form may be more suitable for permanent storage, data transmission and/or further transmutations. A serialization by definition may require it to be completely reversible in a logical fashion to reconstruct the original content in the originating language or its equivalent. A Python structure 1512 may be transmuted using the JSON operation 1514 to produce an equivalent JSON string 1516 and the reverse process may be possible as shown by the bidirectional process flow arrows. A simple tree data structure is shown in 1522 which may exemplify a complex Python data structure. The serialize transmutation 1524 may produce the equivalent string 1526 from 1522. This output string 1526 may now be stored, transmitted and/or transmuted as the program progresses.

Figure 16:
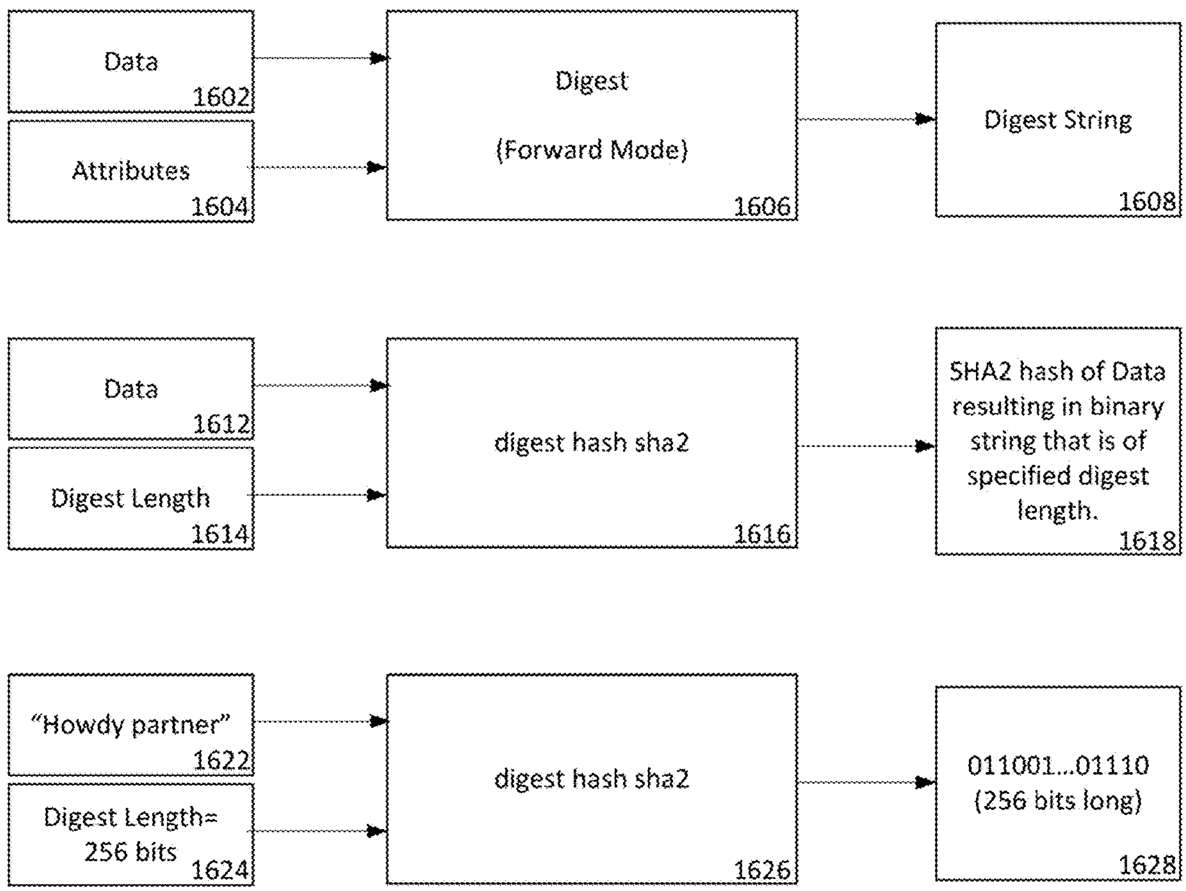
FIG. 16 shows a detailed example of a digest transmutation

FIG. 16 shows a series three diagrams, each of which further details a digest transmutation 1606 example which may be designated an irreversible transmutation. This example shows the SHA2 hash operation as a digest transmutation 1616 which may require as inputs data 1612 and a digest length 1614 as the attribute 1604. The SHA2 hash digest transmutation 1616 may produce a hash of specified length 1618. A Python data string 1622 and the desired digest length 1624 of 256 bits may be inputs to the SHA2 hash transmutation 1626 to produce a 256-bit long hash string 1628.

Figure 17:
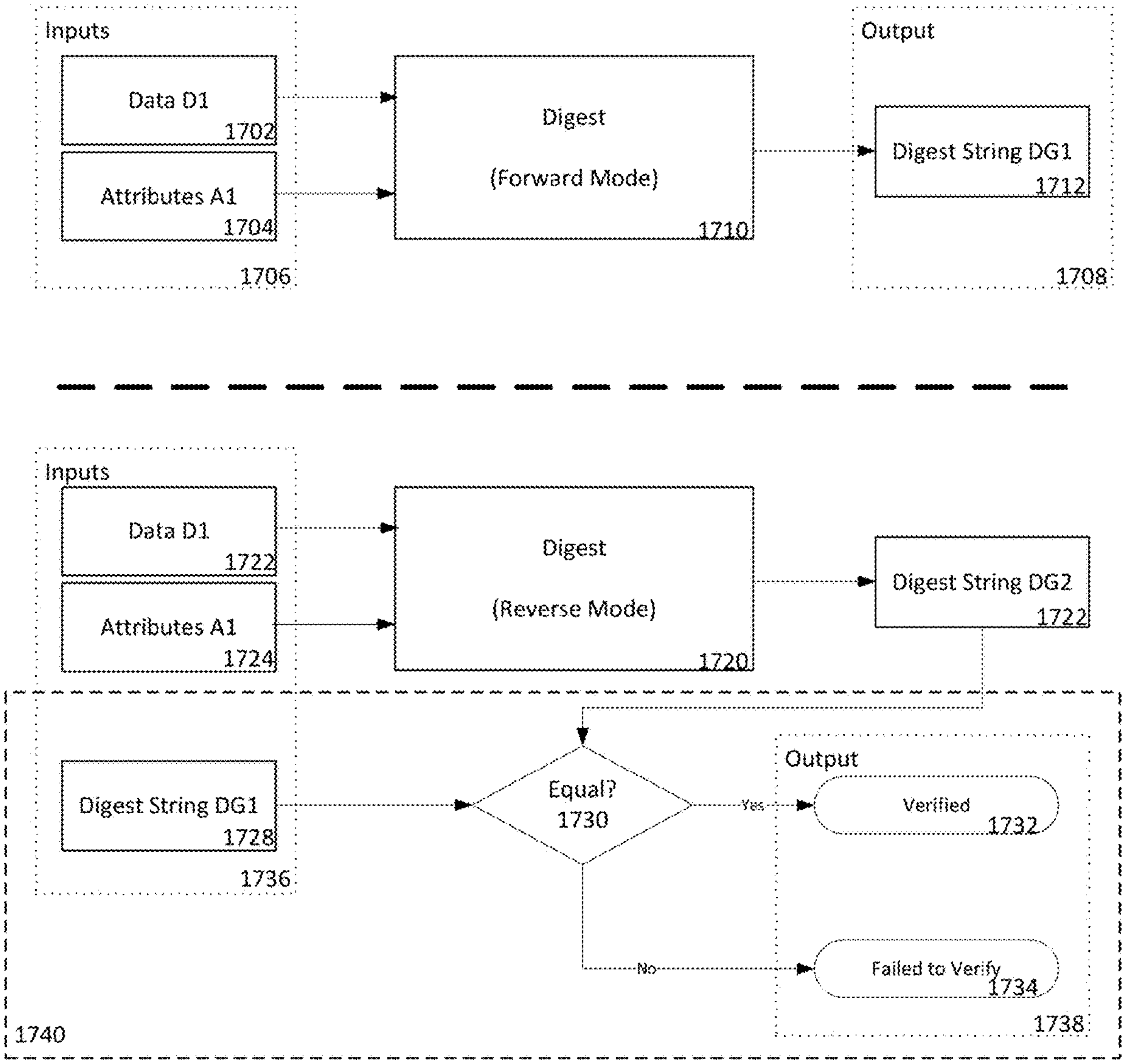
FIG. 17 shows a detailed example of a digest transmutation in reverse mode also known as a verification

FIG. 17 shows a detailed example of a digest transmutation in reverse mode also known as a verification. In TOP, this may be referred to as an engineered reversal of a transmutation. A digest transmutation 1710 may accept as inputs data D1 1702 and attributes A1 1704 to perform a forward mode digest transmutation 1710 which may produce as output 1708 a digest string DG1 1712. The reverse mode of this transmutation 1720 may accept as inputs 1736 data D1 1722, attributes A1 1724 and digest string DG1 1728 to perform a reverse mode digest transmutation 1720 which may produce as output 1738 a flag and/or value indicating whether the digest string DG1 1728 was Verified 1732 or has Failed Verification 1734. The process of verification 1740 may produce a digest string DG2 1722 by performing a forward mode digest transmutation 1720 on inputs D1 1722 and A1 1724. The output digest string DG2 1722 may then be compared for equality 1730 versus the input digest string DG1 1728. The result of the comparison 1738 may be presented in some form to show whether the reverse digest transmutation succeeded or not. In this way, the engineering of this digest reversal may require the forward mode of the transmutation to be re-processed and to comparing outputs rather than relying on any workarounds to finding a logical reversibility of such operations which may be difficult, time consuming and/or unattainable.

Figure 18:
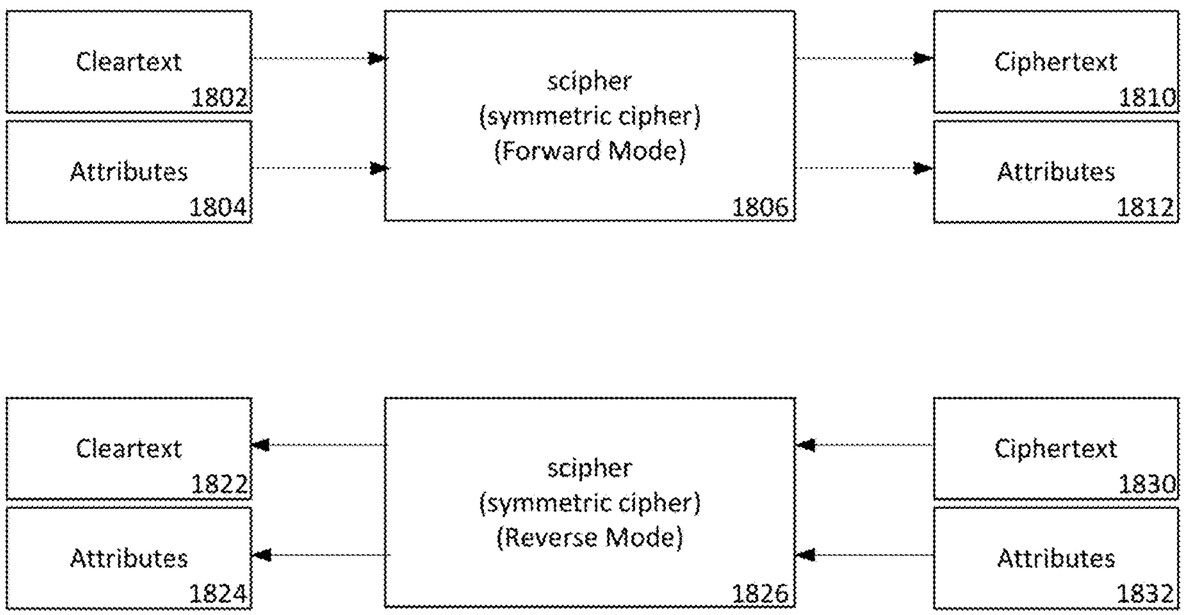
FIG. 18 shows an illustration of a scipher transmutation
Figure 19:
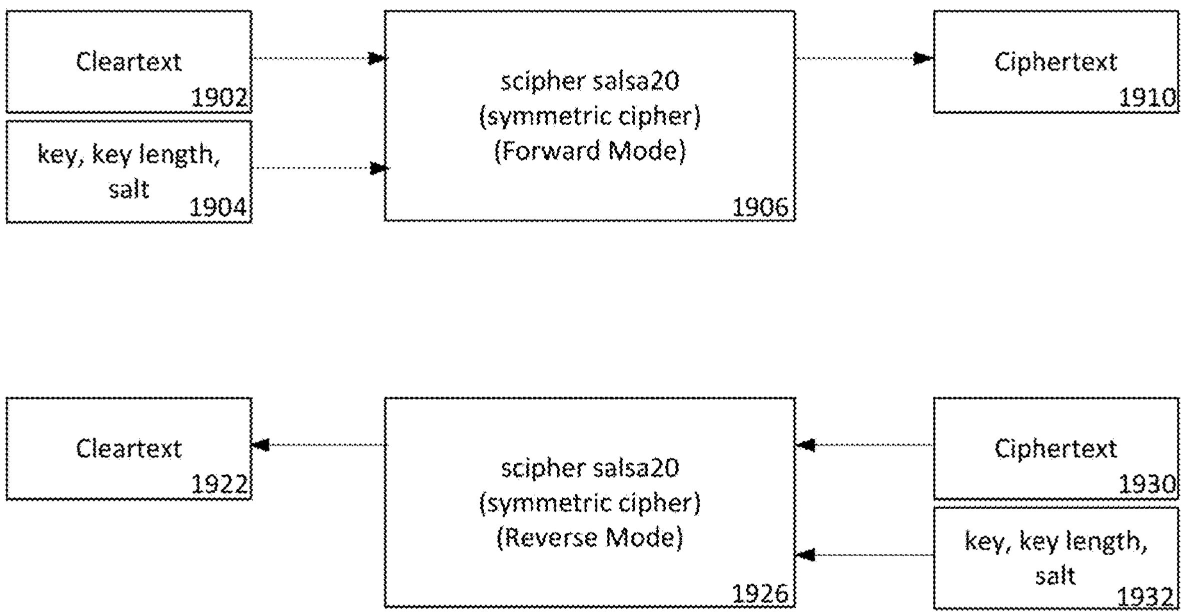
FIG. 19 shows an illustration of a salsa20 (scipher) transmutation
Figure 20:
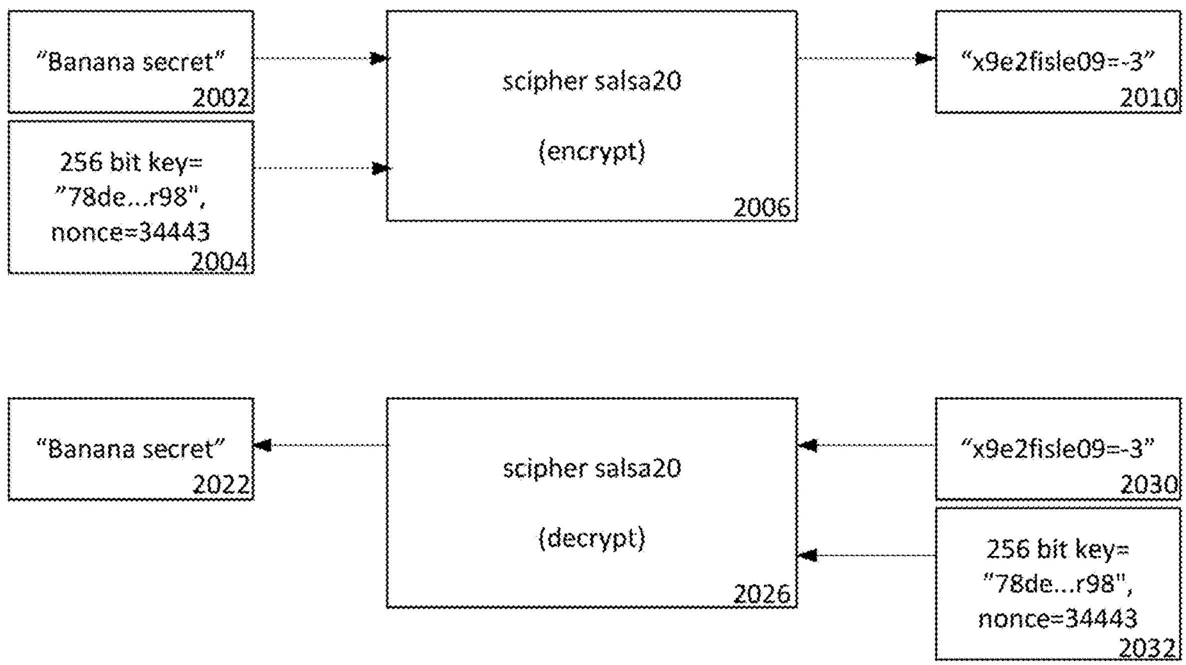
FIG. 20 shows a detailed example of a salsa20 (scipher) transmutation.

FIGS. 18, 19 and 20 show a detailed example of a scipher transmutation in forward and reverse mode also known as a symmetric cipher. A scipher transmutation in forward mode 1806 may accept as input cleartext 1802 and attributes 1804 to produce as output ciphertext 1810 and/or attributes 1812. A scipher transmutation in reverse mode 1826 may accept as input ciphertext 1830 and attributes 1832 to produce as output cleartext 1822 and/or attributes 1824. FIG. 19 illustrates how the salsa20 symmetric cipher may operate as a scipher transmutation. A scipher salsa20 transmutation in forward mode 1906 may accept as input cleartext 1902 and attributes 1904 to produce as output ciphertext 1910. The attributes for this particular cipher in forward mode may comprise a binary symmetric key, the length of the key and/or a salt value. This salsa20 forward (encryption) implementation may be a streaming cipher and no additional output attributes may be generated during the encryption process besides whatever hidden attributes the function may embed within its own output string. A scipher salsa20 transmutation in reverse mode 1926 may accept as input ciphertext 1930 and attributes 1932 to produce as output cleartext 1922. The attributes for this particular cipher in reverse mode may comprise a binary symmetric key, the length of the key and/or a salt value. This salsa20 reverse implementation (decryption) may be a streaming cipher and no additional output attributes may be generated during the decryption process. FIG. 20 illustrates how the salsa20 symmetric cipher may operate as a transmutation on sample data as may be represented within Python v3.6 and the PyCryptodome library function. A scipher salsa20 transmutation in forward mode 2006 may accept as input a data string 2002 and attributes 2004 comprising a 256-bit symmetric secret key and a nonce (as salt) to produce as output ciphertext 2010. In Python, the symmetric key may be represented as a 'bytes' datatype string and thus a key length attribute may be easily derived by the len( ) function on the key bytes string. A scipher salsa20 transmutation in reverse mode 2026 may accept as input ciphertext 2030 and attributes 2032 comprising a 256-bit symmetric secret key and a nonce to produce as output cleartext 2022. In Python, the symmetric key may be represented as a 'bytes' datatype string and thus a key length attribute may be easily derived by the len( ) function on key bytes string. The attributes 2032 may be required to be equivalent to the attributes 2004 in order for this conditionally reversible transmutation to properly process the ciphertext 2030 in reverse mode (decrypt) to recover the original cleartext 2002.

Tranmutation Types

In the following tables and examples presented in FIG. 21 through FIG. 35, each transmutation may not be limited to the operations specified in this table; any suitable operation may be analyzed through TOP and may then be integrated into the framework to extend the operational capabilities of the particular transmutation. Python v3.6 syntax and constructs may be used to illustrate examples in more detail. Equivalent data types, structures, syntax and/or methods may be found and substituted in different programming languages by a person having ordinary skill in the art. In some cases, a key/value option may not be relevant to a particular language or library and it may be ignored or modified as needed as long as the processing may produce equivalent results.

Serialize/Compress Transmutation

FIG. 21 shows a table of command specifications for serialize and compress transmutations 2102 and a set of sample transmutation commands showing its usage 2104. The table 2102 lists the transmutation name and the acceptable operation types for each transmutation. Any column header with a trailing '=' may indicate that the value presented beneath it may be presented in a key/value format in the command syntax construction. The 'Input' and 'Output' columns may specify the expected data types/structures for the transmutation/operation within the context of Python v3.6. For example, the command 'serialize json sortkeys=t' may perform the following data manipulation sequences: take as input any Python data structure, perform a json.dumps( ) on it with the 'sort_keys' flag set to True, then output a Python string with the serialized version of the data. The reverse mode of this command may expect a JSON formatted Python string as input, perform a json.loads( ) on it, then output a Python data structure. The 'sort_keys' flag informs the json.dumps( ) function to process the keys of any Python dictionary structure in ascending order. Python v3.6 may not guarantee a consistent processing order for a dictionary structure when processing by keys, therefore the resulting JSON strings may be inconsistent between multiple runs of this transmutation on the same data structure. Sorting the keys in a particular order within the serialization transmutation may provide a consistency in the processing sequence resulting in identical JSON strings as output between multiple runs on the same data structure. This may become very important for the purposes of determining whether two JSON strings are equivalent and as such may represent two equivalent pre-serialization data structures.

The compress transmutation in table 2102 shows several different lossless compression operations or reversible compressions. Any irreversible or lossy compression operations may extend the compression transmutation repertoire but for the purposes of discussing reversible transmutations, it may be neither interesting nor constructive to discuss a one-way function which may not provide a cryptographic purpose much beyond data size reduction. From a TOP perspective, lossy compressions may be analyzed and treated the same way as a digest transmutation which will be discussed in a later section. In the example in 2104, the command 'compress bz2' may perform a bz2 compression on a binary string input and may produce a binary string output which may or may not be smaller in size than the input string. Some data may no longer be compressible using a particular compression scheme; an example of this may be where a bz2 compressed string may be processed again and no further data size reduction may be achieved.

Encode Transmutation

FIG. 22 shows a table of command specifications for an encode 2202 transmutation and a set of sample transmutation commands showing its usage 2204. There may be numerous encoding schemes in computer science and the references in this table does not represent all known encoding schemes. The encoding schemes which are listed under the 'encoding=' column may be found in Python v3.6 and its associated standard libraries. A person having ordinary skill in the art may recognize the utility of having access to all these types of encodings towards solving an issue related to an application which may manipulate data. 'Codecs(98)' refers to the list of supported Codecs in Python v3.6 as of this writing and listed previously in the table in FIG. 11. The transmutation command 'encode strbin utf_8' may take as input a Python string, perform a utf_8 Unicode encoding on it and output the results as a Python bytes string. The transmutation command 'encode utf utf_16' may take as input a Python string, perform a utf_16 Unicode encoding on it and output the results as a Python string. The transmutation command 'encode binascii hex' may take as input a Python bytes string, perform a hexadecimal encoding on it and output the results as a Python string. The transmutation command 'encode base 64' may take as input a Python bytes string, perform a base64 binary encoding on it and output the results as a Python string. The transmutation command 'encode utf_8' is equivalent to 'encode utf utf_8'. These explanations may illustrate the consistency and types of permutations allowed in the encode transmutation command syntax.

Digest Transmutation

FIG. 23 shows a table of command specifications for a digest transmutation 2302 and a set of sample transmutation commands showing its usage 2304. A digest transmutation as shown in table 2302 defines three types of operations but are not limited to them: hash, hmac and/or cmac. The transmutation command 'digest hash md5 128' may take as input a source data string, perform an MD5 hash function on it and produce an output digest bytes string that is 128 bits in length. Note that the input source data string may not be modified and not overwritten during a digest transmutation call; the output digest bytes string may be additional data generated from a digest transmutation call and may be provided a separate memory space. The transmutation command 'digest hash sha2 512' may take as input a source data string, perform a SHA2 hash function on it and produce an output digest bytes string that is 512 bits in length. The transmutation command 'digest hash shake256 digestlen=332' may take as input a source data string, perform a SHAKE256 hash function on it and produce an output digest bytes string that is 332 bits in length. The transmutation command 'digest hmac sha2 256' may take as input a source data string, perform a HMAC function on it using a SHA2 hash and produce an output digest bytes string that is 256 bits in length. The transmutation command 'digest cmac aes 256' may take as input a source data string and a 256-bit symmetric key, perform a CMAC function on it using AES256 cipher and produce an output digest bytes string that is 128 bits in length. All of these digest transmutation example operations and types may be found in the standard Python library and/or the PyCryptodome library and may not represent all the variety of operations, types, digest lengths, key lengths and/or other parameters that may exist in a theoretical and/or implemented sense outside of these sample libraries. Any additional variations may be properly analyzed through TOP and integrated into a transmutation form. Such integrations for any transmutation form may require refactoring and retesting of the existing transmutation operations.

Acipher/Dign Transmutations

FIG. 24 shows a table of command specifications for an acipher and dign transmutations 2402, 2404, 2406 and a set of sample transmutation commands showing its usage 2410. The transmutation command 'acipher pkcs1_oaep 2048' may take as input a bytes string and a 2048 bit long RSA asymmetric public key, perform a RSA PKCS #1 OAEP cipher operation on it utilizing a 512 bit SHA2 hash, and may produce as output a ciphered bytes string that is 2048 bits in length. The transmutation command 'acipher pkcs1_v1_5 3072 may take as input a bytes string and a 3072 bit long RSA asymmetric public key, perform a RSA PKCS #1 v1.5 cipher operation on it, and may produce as output a ciphered bytes string that is 3072 bits in length. The reverse mode of these acipher transmutations may require as input the ciphertext as a bytes string and the private portion of the appropriate RSA key in order to produce the original cleartext.

The transmutation command 'dign pkcs1_v1_5 2048' may take as input a bytes source string and a 2048 bit long RSA asymmetric private key, perform an RSA PKCS #1 v1.5 digital signature operation on it utilizing a 512 bit SHA2 hash, and may produce as output a digest bytes string that is 2048 bits in length. Note the term 'digest bytes string' may be used interchangeably with 'digital signature bytes string' because TOP may view these outputs as providing a similar functionality and thus may store such a bytes string referred to by a 'digest' variable name. The transmutation command 'dign dss 1024 hashtyp=sha2' may take as input a bytes source string and a 1024 bit long DSA asymmetric private key, perform a DSS digital signature operation on it in a FIPS-186-3 mode utilizing a 512 bit SHA2 hash, and may produce as output a digest bytes string that is 1024 bits in length. The transmutation command dign dss 256' may take as input a bytes source string and a 256 bit long ECC asymmetric private key, perform a DSS digital signature operation on it in a FIPS-186-3 mode utilizing a 512 bit SHA2 hash, and may produce as output a digest bytes string that is 256 bits in length. The reverse mode of these dign transmutations may require as input the digest bytes string (digital signature), the source bytes string and the public portion of the appropriate asymmetric key in order to authenticate it.

Derive Transmutation

FIG. 25 shows a table of command specifications for a derive transmutation 2502, 2504, 2506 and a set of sample transmutation commands showing its usage 2510. The sample operations pbkdf2, hkdf and scrypt may also be known as key derivation functions and/or key stretching functions. The basic functionality of a derive transmutation may be to derive a symmetric key or keys of a desired length from a binary or character data string that may be known to the user; a common usage of a key derivation function may be to derive a properly formed symmetric cryptographic key(s) from a password or passphrase. The transmutation command 'derive pbkdf2 keylen=256 iterations=100000' may take as input a character data string (password or passphrase), perform a PBKDF2 operation on it using a SHA2 512-bit hash function, a randomly generated 512 bit initialization vector as a salt and an iteration count parameter set to 100,000, and may produce a corresponding symmetric key that is a 256 bits long bytes data string. The transmutation command 'derive hkdf keylen=256 numkeys=4' may take as input a bytes data string, perform a HKDF operation on it using a SHA2 512-bit hash function, a randomly generated 512 bit initialization vector as a salt, and may produce a corresponding set of four related symmetric keys each of which is a 256 bits long bytes data string. The transmutation command 'derive scrypt keylen=128 mode=login' may take as input a data string, perform a login mode SCRYPT operation on it using a randomly generated 512-bit initialization vector as a salt, and may produce a corresponding symmetric key that may be a 256 bits long bytes data string. The login mode of a derive scrypt transmutation may be shorthand for setting the three parameters n, r, and p to the values indicated in table 2506. These parameter values may be the suggested settings of the author of the SCRYPT algorithm.

The TOP approach to derive transmutations may suggest a bimodal operation. Data mode: if the transmutation may be engaged with no keystack (to be discussed in detail in a later section) and only a data source string of some type, it may transmute this input data source string and replace it with the output of the transmutation which may be in the form of a symmetric key(s). Key mode: if the transmutation may be engaged with a keystack and a data source of some type, it may transmute the corresponding key source material present in the keystack and may replace the key source material thereby deriving a cryptographically usable symmetric key(s) and placing it in the keystack. These statements may be clarified further in a later section when keystacks and key management are discussed within the context of a Transmutation Audit Record or TAR and dependent transmutations.

Scipher Transmutation

Using TOP, symmetric cipher operations may be classified as scipher transmutations, and as a group, these transmutations may present a set of associated attributes which may be extensive both in number and/or variety. The next three figures illustrate how TOP may systematically normalize and encapsulate each scipher transmutation with all its attributes into the same output string. This type of attribute embedding techniques may be found in various functions and libraries for many types of operations. However, there may be very few widely accepted standards for such embedding techniques. TOP may propose a consistent methodology which may apply to all scipher transmutations for the distinct purposes of supporting a feature called Structured Data Folding with Transmutations or SDFT. Whether such a methodology may become a widely used standard may be beyond the scope of this document, but the reader may recognize the possible benefits of its usage within the TOP framework especially when we later discuss TAR and SDFT constructs and methods.

FIG. 26 shows a table of command specifications for a scipher transmutation 2602 and a set of sample transmutation commands showing its usage 2604. The table shows three types of scipher operations: aes, chacha20 and salsa20. This is not a complete list of known symmetric ciphers but it may present a relevant variety of them to illustrate how TOP may organize them and propose their usage. Symmetric ciphers may have the following attributes associated with them more or less: key length (keylen), operating mode (mode), salt type (salttyp), salt length (saltlen), block size (Block), cipher operation type (type), and/or padding (pad). A key length may specify the length of the secret symmetric key which may be used in the cipher to produce ciphertext from cleartext. For AES ciphers, they may have at least ten different operating modes as shown in the table. Most symmetric ciphers may require the input of a salt (random value) of a particular type (iv or nonce) and particular salt length whose use may promote better semantic security. The symmetric cipher may provide at least three different operation types: block, stream and/or AEAD ciphers. Newer modes may be proposed and they may be integrated using TOP as an additional transmutation variant. Block mode ciphers may necessitate additional attributes comprising padding methodology, pad positioning, pad type and/or pad length.

In the examples in section 2604, a transmutation command 'scipher aes 256 mode=ofb' may take as inputs a bytes data string and a 256 bit symmetric key, encrypt the input data string using the AES-256 OFB mode streaming cipher with the presented key and a randomly generated 128 bit initialization vector, and produce an output string that may be composed of the ciphertext and all the associated attributes involved in the process embedded in the header of the output bytes string formatted in a consistent key/value format as specified in FIG. 27 (to be discussed in a later section). A transmutation command 'scipher aes 128 mode=gcm' may take as inputs a bytes data string and a 128 bit symmetric key, encrypt the input string using the AES-256 GCM mode AEAD streaming cipher with the presented key and a 128 bit nonce, and produce an output bytes string that may be composed of the ciphertext and all the associated attributes involved in the process embedded in the header of the output string formatted in a consistent key/value format as specified in FIG. 27. AEAD is an acronym for Authenticated Encryption with Associated Data and may be a standardized or well-known method of embedding an authentication functionality along with the ciphering capability of the symmetric cipher within a single function call. A transmutation command 'scipher chacha20 256' may take as inputs a bytes data string and a 256-bit symmetric key, encrypt the input string using the CHACHA20 streaming cipher with the presented key and a 64 bit nonce, and produce an output string that may be composed of the ciphertext and all the associated attributes involved in the process embedded in the header of the output string formatted in a consistent key/value format as specified in FIG. 27. A transmutation command scipher salsa20 128' may take as inputs a bytes data string and a 128-bit symmetric key, encrypt the input string using the SALSA20 streaming cipher with the presented key and a 64 bit nonce, and produce an output string that may be composed of the ciphertext and all the associated attributes involved in the process embedded in the header of the output bytes string formatted in a consistent key/value format as specified in FIG. 27.

FIG. 27 shows the output structure format for a scipher output string in a sequence of two steps where Step 1 illustrates the input format and Step 2 illustrates the output format. "Header" is the variable length key-value utf8 encoded parameter string of the scipher transmutation on the output message. In Step 1, a scipher may accept as input a message bytes string 'Message' of variable length with an optional padding of pad length usually placed at the end of the Message as needed. A Message may have been prepended with a salt value as may be recommended by the chosen cipher. The padding may be a necessary requirement of a block mode symmetric cipher. If no particular padding methodology is specified by the programmer, a default padding methodology may be used and appended to the end of the Message. This Message and padding may be referred to as the Plaintext. The chosen cipher may now process the input Plaintext and produce and output which may be called the Encrypted Message as shown in Step 2. The chosen scipher transmutation may now prepare the embedded Header as a printable key/value pairs in a character string format where the keys may represent the parameter type and the values represent their respective settings. The details of the key/value will be discussed in the next section. Once a Header string may be produced, the transmutation may calculate the length of this Header string referred to as the Header Size and may be formatted as a two byte long unsigned big-endian integer. Two bytes may range in value from 0 to $2^{16}$ (65,536) and may be sufficient to describe all the attributes for any symmetric ciphers for the foreseeable future in this particular format. Then Step 2 may proceed to create a Packed Message comprising Header Size, Header and Encrypted Message. This Packed Message may be the actual output string from the scipher transmutation therefore it may be considered to have successfully encapsulated and embedded all the attributes associated with the transmuted data. The data flows of a reverse scipher transmutation may follow this process in reverse: the transmutation command may specify the exact scipher transmutation to perform, a matching symmetric key and the Packed Message may be provided as inputs. The scipher transmutation may then unpack the Packed Message, read and store all attributes found in the Header, then prepare to decipher the Encrypted Message. A symmetric cipher may have no deterministic method to convey a successful decryption. A verification method may be used in an overlaid manner to determine such results. An example of a rudimentary method may be to extract the prepended salt value from the decrypted Message and compare it to the saved salt value from the Header. Matching salt values may indicate a successful decryption but may not guarantee it. AEAD mode symmetric ciphers may address this issue a degree better by embedding a MAC (CMAC, HASH or HMAC) of the data string (before or after the encryption) within the Encrypted Message and performing a comparison. More sophisticated methods may require the authentication of digitally signed hashes of some form of the Message using different keys. As may be shown in a later section, the use of SDFT and TARs may allow such sophistication in a procedurally simple and logical way. In all of these hash-based methodologies, it may be deterministically impossible to fully state the condition of a decryption attempt due to the weaknesses inherent in a hashing scheme to uniquely identify data universally. One deterministic method may be to compare the decrypted Message with the original Message for equality but there may be trade-offs of efficiency for lengthy messages.

FIG. 28 shows a table of parameter keywords and specifications for the header string in the output structure format of a scipher transmutation. The keywords chosen for this attribute table may be sufficiently self-describing and/or self-explanatory to a person having ordinary skill in the art. Examples of attribute values are shown in the column on the right. The first attribute listed, Header Size, may be the only attribute that may be presented as a 16-bit binary unsigned big endian integer value and may be the first field present in the Header. This Header Size may indicate the number of bytes that follow which may describe the attributes of this particular scipher transmutation in a printable format. The attribute format may have been chosen to be printable to allow for the variability of attribute value ranges and lengths. All attribute values which may exist naturally as a binary string in the running program comprising salt values (salt_val) and MAC strings (mac_val) may be encoded into base64 to satisfy the preference of printable characters.

Figure 29:
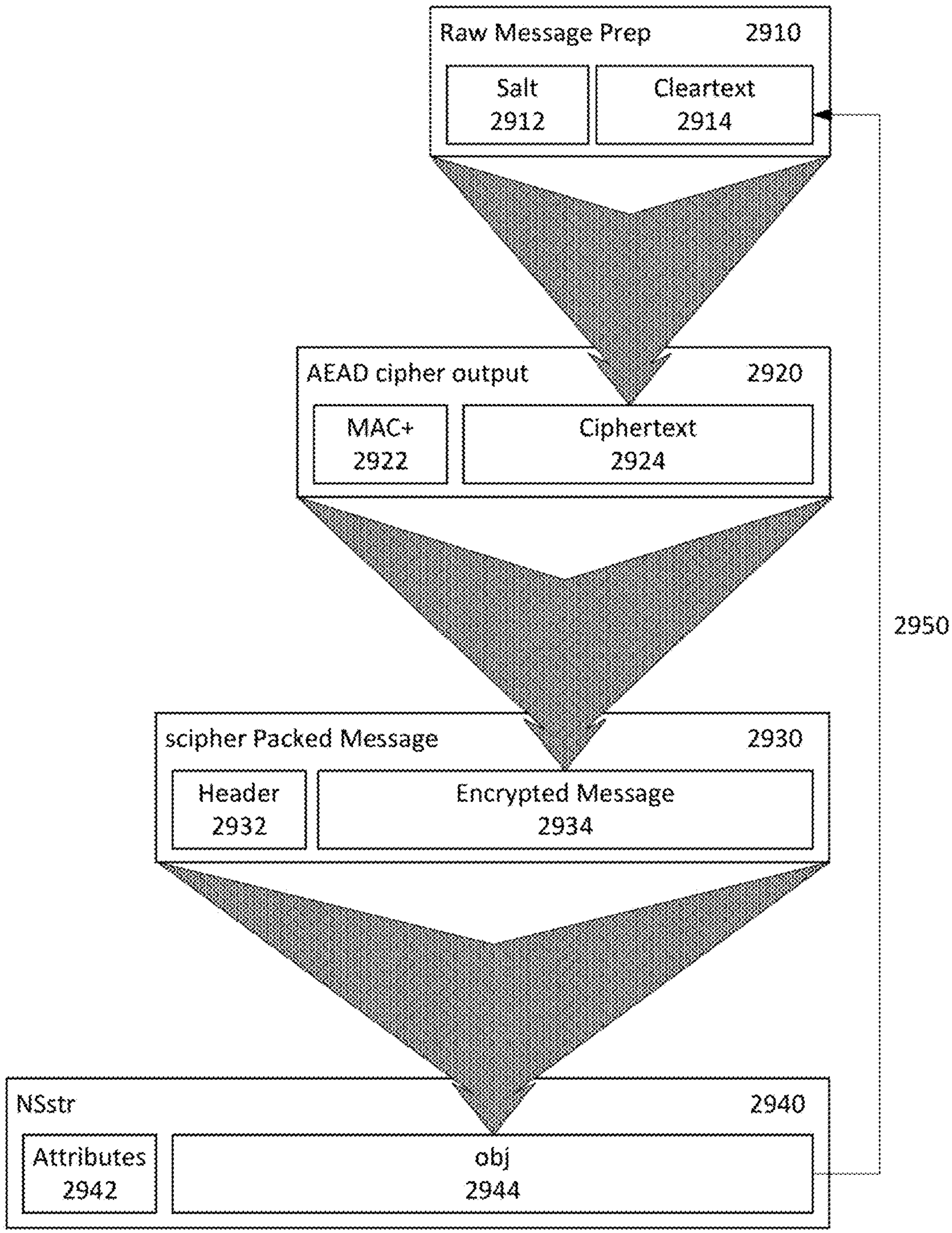
FIG. 29 shows an illustration of iterative embedded message encapsulations for an AEAD mode scipher transmutation.
Figure 32:
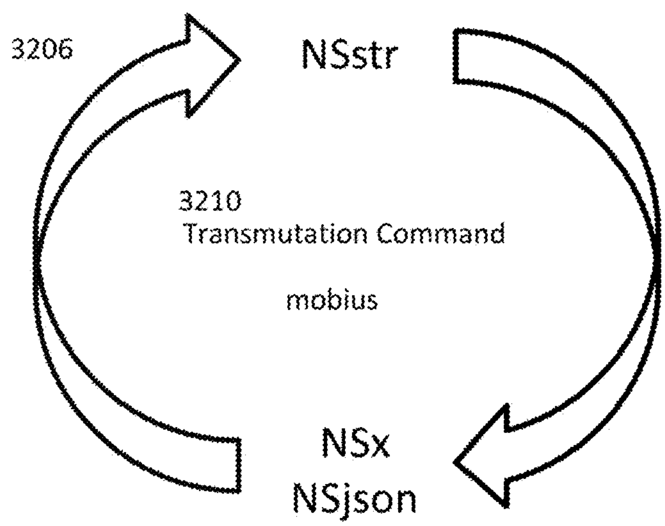

In this manner, the output string of a scipher transmutation may comprise one or more encapsulating layers of attributes depending on the particulars of the chosen scipher. FIG. 29 shows an illustration of iterative embedded message encapsulations for an AEAD mode scipher transmutation. An AEAD mode AES cipher may output the following layers listed from inner to outer layers. A message preparation layer 2910 may comprise the cleartext message to be ciphered 2914 combined with an appropriate salt value 2912. This prepared message 2910 may be encrypted with the chosen AEAD cipher which may then additionally produce a MAC value and additional data 2922 as part of the cipher process and we may refer to this combined message as the AEAD cipher output 2920. This AEAD cipher output 2920 may also be referred to as the Encrypted Message 2934. The Encrypted Message 2934 may have associated attributes from the scipher process which may be parameterized using the keyword/value Header method from FIG. 28 to produce a Header 2932 and this combination may be referred to as the scipher Packed Message 2930. This scipher Packed Message 2930 may be the output of the chosen scipher transmutation which may be stored into the obj pointer or variable 2944 of the NSstr structure 2940 that may be associated with the TAR that called the scipher transmutation. The structure of the NSstr will be discussed more fully in a later section. Also, other attributes 2942 may be stored in this data storage unit called the NSstr structure comprising the TAR, keystack, digest and/or status flags. The obj pointer or variable 2944 in the NSstr structure 2940 may have been the starting point of the cleartext message 2914, thus an iterative path 2950 may be possible and may exist for the object 2944 for as many nested encapsulations as needed by the TAR it may be processing which itself may be stored in the attributes 2942 of the NSstr structure 2940.

In the Header 2932 of the scipher Packed Message 2930, parameters comprising the description of the symmetric cipher, its mode and attribute values used may be completely and exactly described by the keywords listed in FIG. 28. In this regard, the TOP approach may not rely on the obfuscation and hiding of non-cryptographic processes and procedures for securing data but rather only on the theoretical and implemented security of the cipher being used as a transmutation. This may not seem significant on initial observation, but it may be shown later that such clarity of associated details of data transformations embedded into the output of the transformation itself may eventually lend itself to novel methodologies and designs which may rely more on self-describing data than hardwired programs to properly process it. This approach may help formulate one of the fundamental primitives in Data Centric designs and Data Centric models of operating on data at some of the lowest layers of data storage science. NUTS may rely heavily on Data Centric designs and models as may be shown in a later section.

FIG. 30 shows a table of command specifications for a lock transmutation 3002 and a set of sample transmutation commands showing its usage 3010. A lock transmutation is one of the additional transmutations as listed in the table in FIG. 12 and it may be an embodiment of a Variable Lock from NUTS as will be described in detail in FIG. 65-77. Variable Locks may present several different methods of cryptographically locking a secret message comprising sslock, orlock, matlock, xorlock and hashlock. A feature of Variable Locks may be the ability to input and use several cryptographic keys in the process of ciphering a secret message in a normalized, systematic and orderly way. The TOP approach may allow a compact method of implementing such locking techniques in a simple and convenient fashion. In the examples of section 3010, a transmutation command 'lock orlock 128 numkeys=10 scipherkeylen=128' may take as inputs a bytes data string and up to ten 128-bit identical symmetric keys, encrypt the input string using a 'scipher aes 128 mode=eax' transmutation command, and produce an output string comprising the ciphertext and associated embedded attributes. A transmutation command 'lock matlock 256 numkeys=5' may take as inputs a bytes data string and five 256-bit symmetric keys, iteratively encrypt the input string using a 'scipher aes 256 mode=eax' transmutation command for each key, and produce an output string comprising the ciphertext and associated embedded attributes. A transmutation command 'lock sslock 256 numkeys=4 threshold=2' may take as inputs a bytes data string and at least two 256-bit tines256 secret sharing keys, encrypt the input string using an implementation of Shamir's Secret Sharing method with the supplied secret shares, and produce an output string comprising the ciphertext and associated embedded attributes. A transmutation command 'lock sslock_b 256 numkeys=6 threshold=3' may take as inputs a bytes data string and at least three 256-bit tinesidx128 secret sharing keys, encrypt the input string using an implementation of Shamir's Secret Sharing method with the supplied secret shares, and produce an output string comprising the ciphertext and associated embedded attributes. A transmutation command 'lock xorlock 128 numkeys=6' may take as inputs a bytes data string and six 128-bit symmetric keys, derive a calculated key by iteratively performing XOR operations on the supplied keys, encrypt the input string using a 'scipher aes 128 mode=eax' transmutation command, and produce an output string comprising the ciphertext and associated embedded attributes. A transmutation command 'lock hashlock 192 numkeys=7' may take as inputs a bytes data string and seven 192-bit symmetric keys, derive a calculated key by performing a hash on the ordered concatenation of the supplied keys, encrypt the input string using a 'scipher aes 192 mode=eax' transmutation command, and produce an output string comprising the ciphertext and associated embedded attributes.

Each Variable Lock type description and mode of operation may be found in later sections on Variable Locks starting with FIG. 60. The TOP analysis and methods may allow for complex iterative locking variations potentially utilizing a plurality of cryptographic keys to be done in a concise logical manner and may allow for facile extensions of different types of locking algorithms in the future. And it may be shown later that the key management aspect of SDFT may allow a programmer to conveniently generate and manage such plurality of cryptographic keys with relative ease.

As presented in FIGS. 12, 13 and 14, TOP analysis and methods may allow a person having ordinary skill in the art to take a given data manipulation function and determine its suitability for normalization into a transmutation operation and type. The table in FIG. 12 may show a sampling of very well-known data manipulations and may very well be considered adequate for use by a wide audience of developers. However, in such cases where a data manipulation function may not be found in this table, it may be possible to analyze and tailor the function to operate withing the SDFT framework using TOP methods; functions such as but not limited to lossy compression, bit scattering, message dispersals, erasure coding (ECC) and message level RAID encoding and structuring. In most cases of such transmutation extensions, it may be unnecessary to recode or rewrite the actual data manipulation function. In fact, it may be counterproductive and procedurally weak to do that in most circumstances. The library containing the data manipulation function may be accessed by the Transmutation library and the TOP method may allow a developer to provide a normalizing wrapper function around the particular data manipulation function to behave well within the SDFT framework.

Transmutation Structures, Transmutation Audit Records (TAR) and Structured Data Folding with Transmutations (SDFT)

FIG. 31 shows the specifications of various transmutation structures in tabular format. The structural definition relies on a nested key based approach similar to how structures are defined within Javascript; this may be an intentional design choice so that its representation may be readily duplicated in a wide variety of programming languages and may not rely on the peculiarities of a particular language. For example, Python v3.6 allows for classes to be defined whereas some languages such as Javascript may not, therefore transmutation data structures may not rely on classes to define it for wider applicability. A transmutation structure may provide a well-defined working memory area whereby the inputs and outputs of a transmutation may be prepared, processed and/or stored. The main data storage unit or structure that may be used in most if not all transmutation operations is called the NSstr structure 3108. There may be at least one instance of NSstr associated with a transmutation call. All transmutation structures may have a 'typ' or structure type field specifying what structure it represents. The NSstr structure further may define a 'state' field specifying the state of the structure and/or its data. The 'obj' or object field may either hold a single value or it may be a pointer that references another area of memory. The obj field may be where the input data to most transmutations may be found. Also the obj field may be where the output data of most transmutations may be found. The 'digest' field, if it exists, may store the digest of the data stored or referenced by the obj field. The manner in which the digest may have been produced may be dependent upon the particular dign or digest transmutation and the supplied parameters and/or attributes to the transmutation command. The 'keystack', if it exists, may be a single instance of a KISS (Key Interchange Specification Structure, to be discussed in a later section) structure or it may be a list of KISS structures in a predetermined order that corresponds to its operating TAR. A keystack basically holds the secret key(s) of various types which may be needed by certain transmutations. The 'tar' field may point to an instance of an NStar structure 3106.

The NStar structure 3106 may specify the particular Transmutation Audit Records (TAR) that may be applied to the input data stored in the NSstr structure's obj field. A TAR may be a collection of transmutation commands in a logical order which may have been knowledgeably sequenced to process the data in NSstr in an orderly and well-behaved manner to produce a single 'folding' of the NSstr data. We may refer to this process of performing a TAR on an NSstr data structure as a 'ravel' function call. Conversely, an 'unravel' function call may 'unfold' a piece of folded data within the NSstr structure using the same TAR relying on the inherent characteristics of reversible transmutations. Therefore, the reversibility of transmutations may become a central feature in Structured Data Folding with Transmutations (SDFT). The SDFT methodology may use TARs on NSstr structures to iteratively transmute the object within much like an assembly line operation on data. Since the analysis may have been done on the reversible behavior of each transmutation command in the TAR, any TAR may therefore be called upon in a reverse mode or unravel function call. This topic may be discussed in more depth as additional necessary ingredients may be presented in the following sections that may make such operations possible.

The NSbin structure 3102 may serve a particular function that may or may not be only relevant to Python v3.6. In Python v3.6, a distinction may be made in the manner in which a string of data may be stored internally. It may be stored as a 'bytes' string or a character string. A bytes string datatype may indicate that the information held within the variable may be a series of binary bytes data. A character string may indicate that the information held within the variable may be a series of bits representing characters encoded in some type of encoding scheme. Python v3.6 may employ a sophisticated internal management scheme to best determine how to store a particular character string since different encodings may require different storage requirements per 'character'. An example may be that UTF-8 may use 8 bit long code units to represent each character whereas UTF-16 may use 16 bit long code units to represent each character; these variations may be necessary to convey different international character sets where the number of characters in a language may be quite different from the English alphabet and therefore may not fit into the permutations of 8 bits of data. The preferred internal serialization method of transmutations, TARs and SDFT may be JSON and JSON may not have native support to map Python 'bytes' datatype to one of its own. If a conversion is attempted, the JSON function call may fail abruptly with some indication that the particular datatype may not be supported. An NSbin structure may be specifically designed for this type of situation and may be substituted for any 'bytes' data strings and therefore may make the Python variable JSON compatible. A 'bytes' string may be encoded into a base64 character string and stored within the 'b64' field of an NSbin structure. The bytes string variable may now be made to point to this NSbin structure, overwriting the original bytes data. These may represent equivalent data but they may be in different encodings and structures. However, an end result may be that the NSbin structure may be entirely JSON compatible and may now be safely serialized using JSON functions without errors due to incompatible datatypes.

In the TOP approach, this 'bytes' data to NSbin structure conversion and substitution may be referred to as a 'press' transmutation from FIGS. 12 and 33. In Python v3.6, a press transmutation as listed in table 3302 may take any valid Python structure or variable and iteratively transmute every bytes string to an equivalent NSbin structure which may result in a Python structure devoid of any bytes datatypes. A person having ordinary skill in the art may customize an appropriate press transmutation for a language other than Python v3.6 and its JSON function call to remove such sources of data serialization errors. The reverse mode of 'press' may be referred to as 'depress' and may undo the conversion and substitution iteratively so that the data structure including its original datatypes may be restored.

The NSjson structure 3104 may serve a peculiarly useful function of only holding data that may be entirely JSON compatible. A quick glance at the fields defined for NSstr 3108 may alert one to a potential issue if the structure was directly submitted for JSON serialization due to its digest field potentially holding a digest value of the source obj in a binary string form or a bytes data string in Python v3.6. We refer back to FIG. 12 and reintroduce the 'mobius' transmutation for this particular issue. Note that any reasonable definition of the mobius transmutation prior to this point in this description may not be made entirely clearly to the reader due to the intertwining nature of transmutations and the TOP approach. The mobius transmutation in FIG. 32 may transmute a given structure from one form to another in a circular fashion but with a slight twist as in a mobius strip. The mobius transmutation may be an important enabler of Structured Data Folding with Transmutations by systematically converting a NSstr structure to a JSON serializable structure such as NSjson; the process of conversion may embed the operating TAR for the NSstr in its entirety along with the transmuted data thereby imbuing the resulting storable object a self-describing characteristic. The mobius transmutation may be an embodiment that performs the essence of structured data folding in the SDFT library in a convenient way. A developer may opt to perform SDF manually using a logical combination of transmutation commands excluding the mobius command, but the mobius command adds at least one extra logical step that may require a developer to perform that step outside of the SDFT library: the ability to serialize the NSstr data structure that it is operating on and from into another structure such as NSjson. A mobius transmutation may be the last transmutation command in a TAR. Because of its functionality, this may be the only logical place where the mobius transmutation may be placed. When a mobius transmutation is processed, it may take the NSstr structure that it may be operating from and on, and transmute it to a NSjson structure. The TAR embedded in the NSstr structure may no longer exist in an useful or accessible form therefore the mobius transmutation may be the last transmutation command of a given TAR to be processed. Simply, the mobius transmutation may press the NSstr structure, JSON serialize it, then store it in an NSjson structure which may be stored, transmitted, JSON serialized, folded, or any other valid data operation that may be performed on such structures. There may be a reverse mode to a mobius transmutation but another way to view this transmutation may to state that it is a circular transmutation: regardless of a forward or reverse mode, it performs a specific data transformation depending on the input data structure type. The table 3204 indicates an NSx structure of which NSjson may be a variant. If the need arises in the future for additional transmutation structures other than those defined in FIG. 31, and they may need to be accommodated into a mobius transmutation, this table illustrates how the mobius transmutation may behave for any transmutation structure other than NSstr. It may not be entirely obvious without actually programming with SDFT, but the mobius transmutation may logically imply that there may be no TAR processing possible from a recovered NSjson structure unless a mobius transmutation may be operated on it to convert it to its original NSstr structure which may hold the TAR that may have folded it. To initiate this mobius spin cycle with a NSjson structure, a mobius (reversal) may be kickstarted with a mobius function call from the SDFT library to produce an NSstr structure, access the embedded TAR and process the embedded TAR in reverse. This may further imply that the mobius transmutation command in the TAR, which by definition will be the first command to be processed in the reverse mode, may be safely ignored during processing since it may have been already performed by the kickstarting function call thereby it may not perform the mobius functionality more than once during such reversals. In this sequencing, failure to ignore the mobius transmutation in reverse mode may potentially produce an infinite oscillation of mobius calls which continuously convert NSstr to NSjson and back. It may seem a circuitous way of expressing such operations but it may produce fairly compact bidirectional TARs which may be systematically embedded in the output transmuted data thereby imbuing a self-describing characteristic to the folded data. This characteristic may be novel in that it may be acted upon much like interpreted scripts but both in forward or reverse modes to perform operations on the data in a consistent reproducible way across any language and/or operating systems which may support an implementation of an SDFT library.

FIG. 33 shows a table of command specifications for press, clean and key transmutations 3302, 3304 and a set of sample transmutation commands showing its usage 3310. A clean transmutation may be a housekeeping function that may delete transitory or temporary fields from within the NSstr structure. Certain transmutations may have a need for additional temporary fields during processing and may create additional fields within the NSstr structure to store and access them. The creation and use of such transitory fields within the NSstr may be done in a thoughtful manner after analyzing its coexistence within the TOP approach and minimizing its interference with the proper functioning of any other transmutations. There may be no reversal mode for a clean transmutation due to its functionality therefore it may be safely ignored. This reversal implication may be taken into consideration when proposing a new transitory field within the NSstr structure, the field may not exist in a reversal mode processing of the transmutation therefore no transmutation in reverse may depend on its existence for it to function properly. An important function of the clean transmutation may be to delete an internal copy of the full keystack used in the processing of the TAR; or it may delete only the secret keys within the keystack and convert the KISS structures to keyholes. This may be one the most critical transmutations in the SDFT TAR processing because the failure to properly clean the NSstr prior to preparing it for storage may result in the storage of any and all cryptographic keys which may have been used in the particular TAR processing and it may be inadvertently stored in cleartext along with the folded data. This situation may reveal the secret keys and compromise some or all the ciphered data within the folded data; this may not be the intended purpose of ciphering data.

In table 3304, a key transmutation is shown with some of its operations. This transmutation may be part of the key management functionality of SDFT and may operate primarily on the keystack field by referencing the tar field of an NSstr structure. A key check transmutation may examine the stored TAR and may generate a list of key templates. If a keystack is input, it may be compared against such key templates to determine if the correct key types in the proper sequence have been provided in the input keystack. For example, if a TAR requires two different 256-bit symmetric keys for two key transmutations which may require keys, it may generate two key templates of 'symmetric 256' in a list signifying that the TAR expects the keystack to contain such keys if it may be present. Table 3504 lists some of the various key types. An empty keystack or partially filled input keystack may also be properly processed. When no keystack may be input where a TAR requires some keys, then it may indicate a 'key generate' transmutation. The SDFT may engage in a key generate mode whereby the proper types of keys according to the derived key templates may be created and composed into a keystack for submission into the operating NSstr structure prior to TAR processing on the data stored in the obj field. A partial 'key generate' mode may be engaged when a partially filled keystack may be input. The key check and generate transmutations may cooperatively determine whether the partially supplied keys in the keystack may be of the proper type and in the proper sequence. Then it may proceed to generate the proper keys for the missing keys. This process may be referred to as the 'missing teeth' scenario of SDFT keystack management. There may be very few if any examples of a TAR with key transmutation commands because it may be considered so fundamental to the proper operation of the SDFT library on a NSstr structure utilizing a TAR that it may be implicitly performed by default in every call to ravel/unravel operations rather than make the programmer place it in every TAR. It may turn out that just by having the possibility of processing a TAR which may require a cryptographic key may be sufficient cause to implicitly do the check for proper keystack management consistently, implicitly and/or automatically. The TAR reversal process may process the keystack in an appropriately reverse order. Complications may arise due to the peculiarities of the derive transmutation in keystack mode which will be discussed in a later section on how the SDFT handles such situations referred to as TAR groupings for dependent transmutations.

FIG. 34 shows a table for the Key Interchange Specification Structure or KISS. This structure may have at least two modes of operation: key or keyhole. The attributes of a key may be specified by some or all of the fields defined in the table and additional fields may be added to extend the structure to support other key attributes as needed. The TOP approach to cryptographic operations may be to assert the view of each cryptographic transmutation to require a matching keyhole specifying the exact type of key required for that transmutation. The attributes may include but are not limited to a practically unique ID for the key itself, a question or hint for a passphrase or password, a description of the key, etc. If the key value may be present in the KISS structure, it may be referred to as just a key. If the key value may be missing in the KISS structure, it may be referred to as a keyhole. This may be indicated by the value in the 'ima' field. The field name may be a contraction of "I'm a" key/keyhole and may be read that way for clarity. The column titled 'In' may indicate the required values for creating a blank KISS structure and inserting a key into it for the purposes of placing it into the input keystack of an NSstr structure. The column titled 'Gen' may indicate those fields which may be created and filled automatically during a key generate transmutation from within the SDFT library. Throughout the SDFT discussion involving TARs, all key references may be synonymous with KISS structures of the appropriate type. It may be apparent that the keystack may closely correspond to the characteristics of the TAR being processed and that this method of stacking transmutation commands and stacking the necessary cryptographic keys in a specific form and sequence may allow for any input data to be iteratively processed through an infinite number of transmutation variations, transmutations' parametric variances and/or successive data foldings. At this point of the description of TOP, one may begin to understand the intertwined nature of the various components of SDFT and that a full appreciation of any particular part may not be revealed in an entirely linear manner.

FIG. 35 shows a table for KISS modes of operation 3502, a matrix showing key types/field generation mappings 3504 and key type definitions 3506. Table 3506 lists several types of keys recognized by SDFT but it may not be limited to these as new key types may be added and integrated as needed. At least three key types may need some explanation since these may be structured specifically for the SDFT library using well-known base key types. The key type 'symmetriclist' may be an array or list of symmetric keys and may be stored as the key value within a single KISS structure. This key type may support, but are not limited to, such transmutations as lock and derive. The secret sharing lock transmutations called sslock and sslock_b may respectively represent two different implementations of Shamir's Secret Sharing algorithm. The lock sslock transmutation may expect secret shares in a specific format comprising an internal index number and the key share in a 256-bit long key. This may be referred to within the SDFT library as a 'tines256' key type. The lock sslock_b transmutation may expect secret shares in a specific format comprising an internal index number and the key share in a 256-bit long key. This may be referred to within the SDFT library as a 'tinesidx256' key type.

Table 3502 is a matrix showing what characteristics may apply to a KISS structure in the two modes it can exist: key (or transmutation) or keyhole. In transmutation (key) mode, a KISS structure may be expected to store the actual cryptographic key to produce some version of ciphertext which may include keyed digests and/or digns. Therefore, its storage may be used informationally but needs to be embedded further using cryptographic functions to store it persistently in a secure manner. In keyhole mode, a KISS structure may be expected to have enough details to accept an appropriate cryptographic key as its value to produce some version of ciphertext which may include keyed digests, digns and/or derived keys. Therefore, its storage may be mandatory and may not need to be further secured by any embedding methodology since it may not contain a key value as a keyhole.

Figure 37:
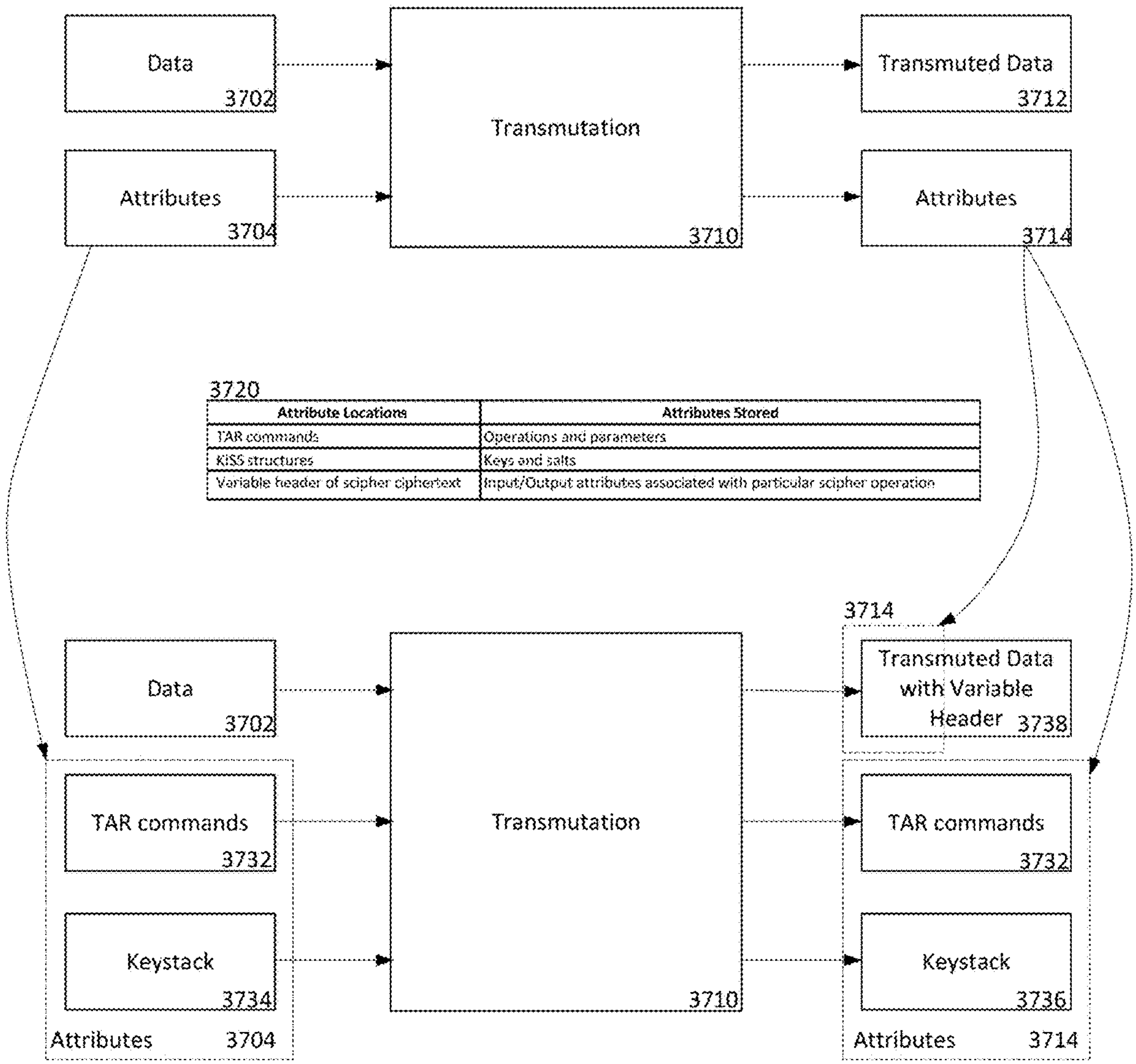
FIG. 37 shows block diagrams illustrating where transmutation related attributes are persisted and a table listing the type and locations of the attributes.

Table 3504 is a matrix showing which fields may be mandatory, relevant, input and/or generated by key type. Upon examining the table, it may be apparent that a KISS structure may hold salts pertaining to various cryptographic operations. This may seem redundant in light of the discussion on scipher embedded headers but that discussion of salts may not present the entire picture on salts. As shown in FIG. 37, the persistence of attributes 3704, 3714 associated with a transmutation may be dispersed among several data storage areas 3732, 3734, 3736 and 3738. The TOP approach may have shown that salts may be embedded in certain cryptographic operations along with the resultant output data since it may reveal no additional information about the ciphertext produced. However, when we examine key derivation transmutations processed in a keystack mode, we may find that it may be convenient and logical to store the associated salt value in the KISS structure. A typical method of use of a key derivation function may be to accept a passphrase as input, combine it with some salt value and produce an appropriately formed cryptographic key such as but not limited to a symmetric key. The usage of the salt in this case may be for semantic security. Therefore, it may be altogether possible that every keyhole that may accept the same passphrase may have a different salt in order that the resultant secret cryptographic key may be different from each other for whatever rational reason there may be. This derived key may be used in a temporary fashion and discarded after use thereby only leaving the keyhole as evidence of its existence. Since the product of the key derivation may not typically be saved permanently since it may be used as a secret key, it may beg the question, where may we store it? TOP may store it in the corresponding keyhole and may prefer that the SDFT store this keyhole along with the folded data thereby each keyhole that may accept the same passphrase may have the storage appropriated for its own instance of a salt value. The programmer may store the KISS keyholes in an external manner in entirely different way. The simplified transmutation diagram on the top of FIG. 37 which is the same as in FIG. 5, becomes more like the diagram on the bottom of FIG. 37 when the various components of TOP and SDFT may be introduced. Table 3720 summarizes the placement of the attributes.

Figure 41:
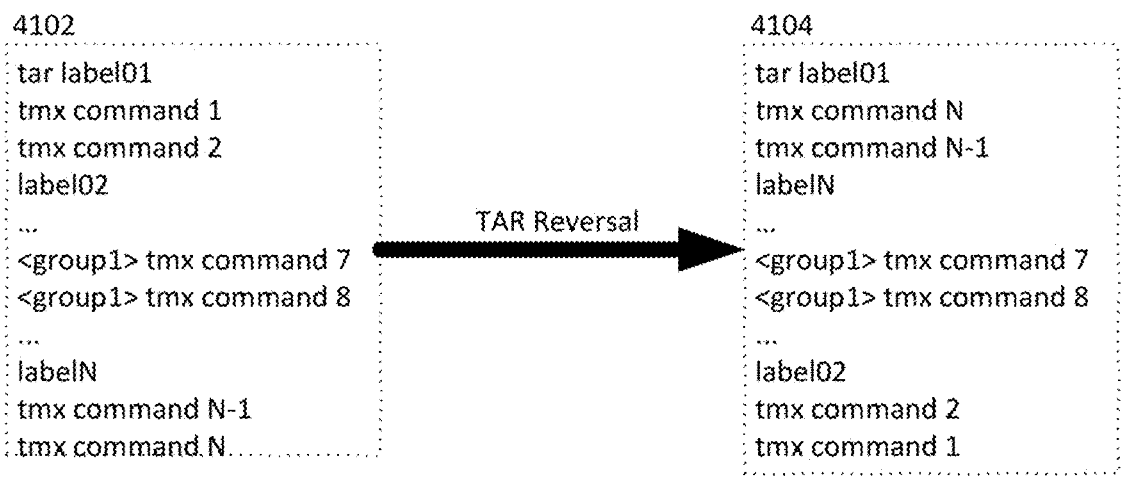
FIG. 41 shows how a TAR reversal is performed on a generic TAR.
Figure 42:
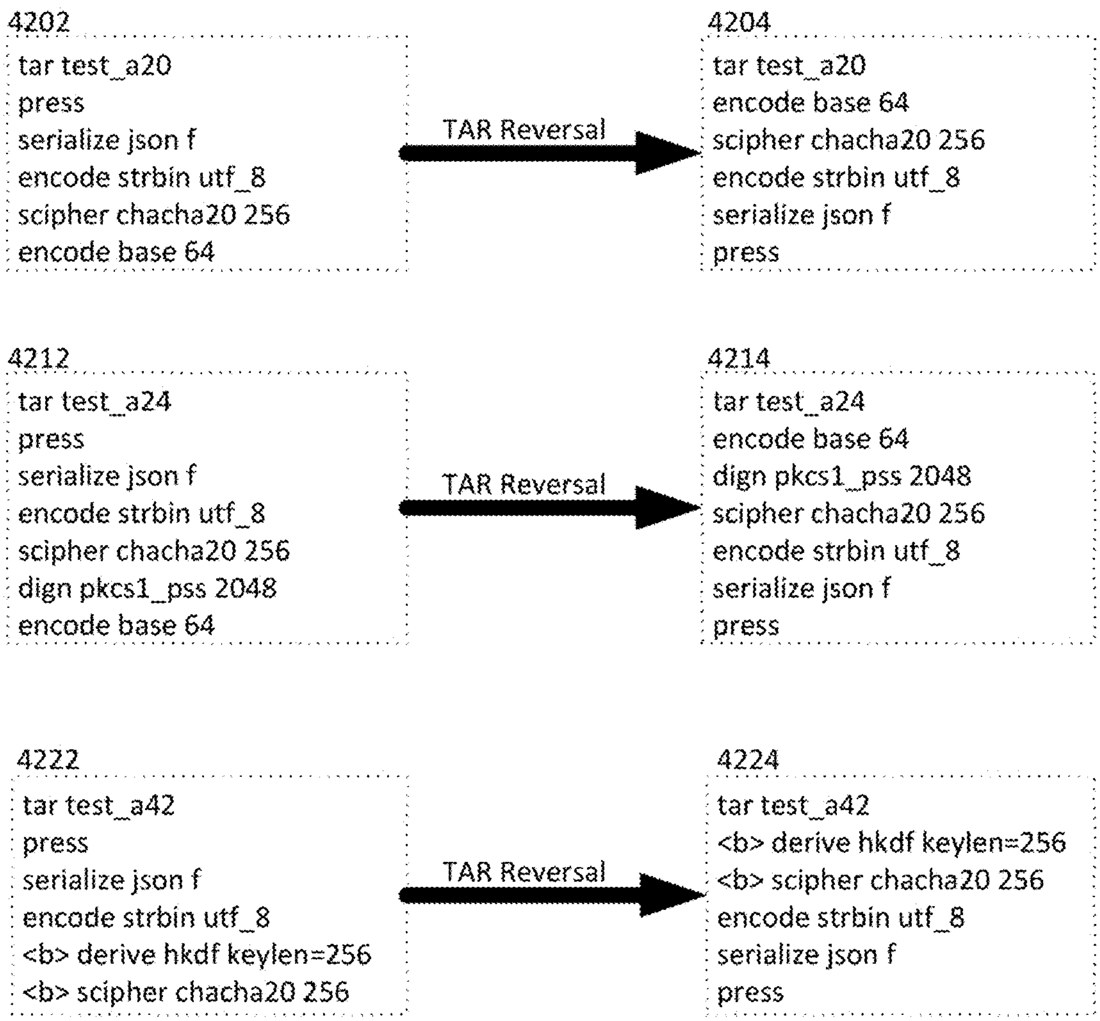
FIG. 42 shows examples of TAR reversals.

Much has been described previously concerning the syntax and variety of transmutation commands analyzed and available via TOP and SDFT, but what does a TAR actually look like in practice? FIG. 36 shows the structure of a TAR and lists several examples of TARs. Section 3602 specifies the general structure of a Transmutation Audit Record or TAR. A 'tar label01' declaration indicates the name or label of the TAR being defined just below it. All TAR commands follow the TAR label declaration and a blank line indicates the end of the current TAR definition. Therefore, many TARs may be declared in a single text file. The TAR definition section may include TAR labels on a line by itself or a transmutation command. This may be similar to a programming language compiler's macro features; it may be used as a convenience feature to combine well-known TAR constructs into a new TAR without having to actually copy the definition into the TAR itself. Transmutation commands may be inserted in a specific sequence to process the target NSstr structure in the desired way. TAR 'test_a01' may just press the Python data object into an equivalent structure devoid of any Python bytes datatypes; for other languages, it may or may not perform the same functions since 'press' may be language and/or environment specific. TAR 'test_a02' performs a press transmutation twice in succession. The second press transmutation may accomplish no functional changes to the data. This shows the TAR expansion at work. TAR 'test_a07' may press the data, serialize it into a JSON string, then convert it into a bytes type binary string using utf_32 encoding. TAR 'test_a17' shows what a terminating mobius transmutation may look like. TAR 'test_a20' presses the data, serializes it into a JSON string, converts it into a utf_8 encoded binary string, ciphers it using chacha20 with a 256-bit symmetric key and then converts the resulting binary ciphertext string into a base64 encoded character string. The symmetric key for the scipher transmutation may be expected in the keystack of the NSstr that may contain a single KISS structure holding a 256-bit symmetric key value. An alternative may be that no keystack may be provided and the ravel function proceeds to generate a valid keystack with a properly generated random 256-bit symmetric key, uses it to perform the scipher transmutation and allows the programmer to fetch a copy of the keystack (thus the key within) upon completion. TAR 'test_a42' shows an example of TAR groups and dependent transmutations: it will press the data, serialize into a JSON string, convert it to a binary string encoded in utf_8, derive a 256-bit symmetric key from a passphrase supplied in the keystack, then perform a chacha20 encryption on the data using the derived symmetric key. The last two transmutations may have a permanent dependency because the cipher relies on the derived key; therefore, this dependency may be grouped within the TAR with leading <tags> marked as such. In a forward mode, there may be no apparent influence of TAR groupings within a TAR definition except to highlight such dependencies in a visual manner. However, TAR groups may play a significant role when it comes to TAR reversals. When a TAR is being prepared for a TAR reversal process, TAR groups may be kept intact as a unit and its constituents may not be reversed. FIG. 41 and FIG. 42 illustrate several examples of TAR reversals. The TAR 'test_a64' may perform five scipher transmutations and a DSS dign transmutation. This TAR may expect a keystack filled with six keys of various types and lengths in a particular order. Illustrated in section 3610 may be a simplified representation of the key template that may correspond to TAR 'test_a64'. This key template may be used by the implicit key check and/or generate transmutations to validate any input keystacks and/or generate a valid keystack for proper processing of the TAR.

Figure 38:
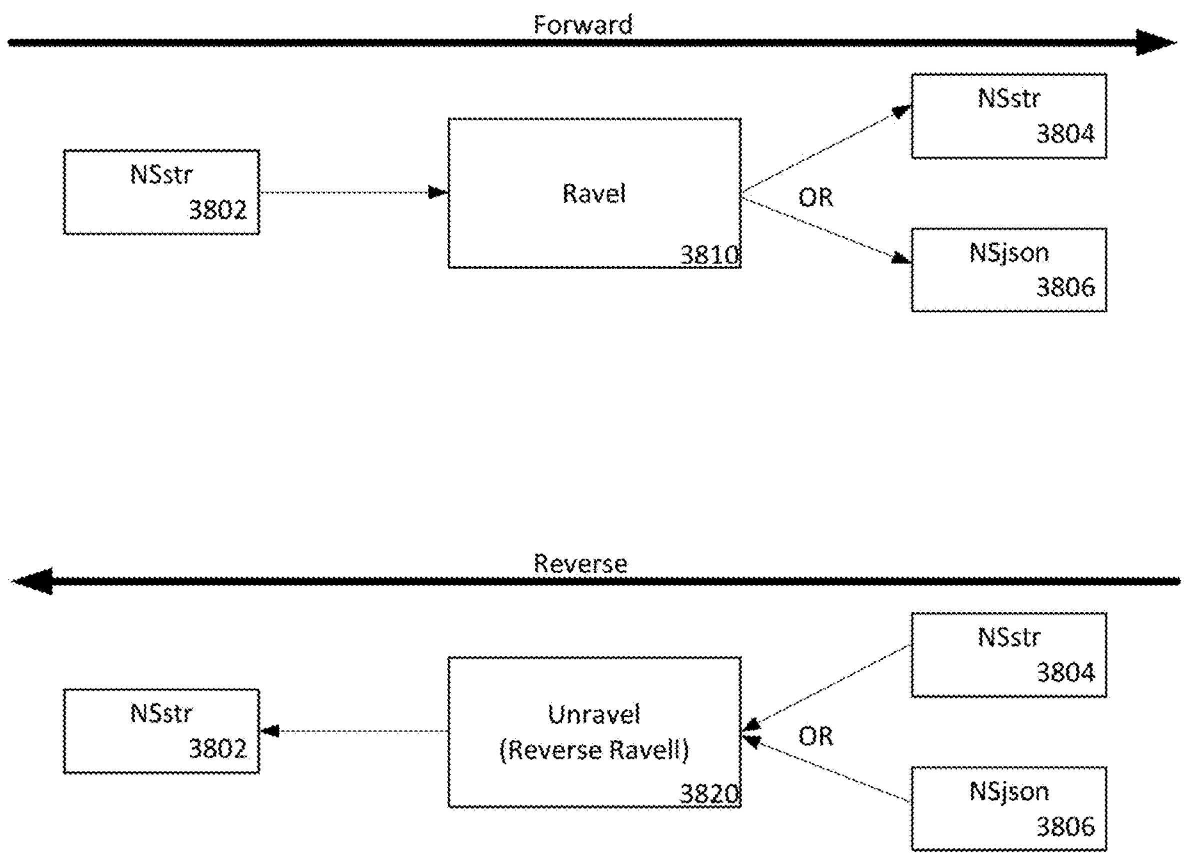
FIG. 38 shows block diagrams of SDFT operations ravel and unravel (or reversal of ravel).

FIG. 38 shows block diagrams of SDFT operations ravel and unravel (or reversal of ravel). Two central operations in SDFT may be 'ravel' and its inverse, 'unravel'. The ravel operation may process a given NSstr which may comprise some or all of the following items: data, TAR, keystack and/or other attributes. The ravel operation may 'ravel' or fold 3810 the source data within 3802 according to the sequence of transmutations listed in the TAR within 3802 and may eventually produce the output as a component within an NSstr structure 3804 or an NSjson structure 3806. The unravel operation may 'unravel' or unfold 3820 the source NSstr 3804 or NSjson 3806 structure according to the reversed sequence of transmutations listed in the embedded TAR and may eventually produce the output as an NSstr structure 3802. As will be shown, the symmetry of the ravel/unravel may be an interesting aspect of this design. Note the consistency of terminology and perspectives which may be used throughout TOP. A ravel operation in reverse may be equivalent to an unravel. This reversibility principle may not only simplify the analysis of such functions but it may percolate modular organizing methods which may lead to higher order concepts pertaining to the transmutation of data.

Figure 39:
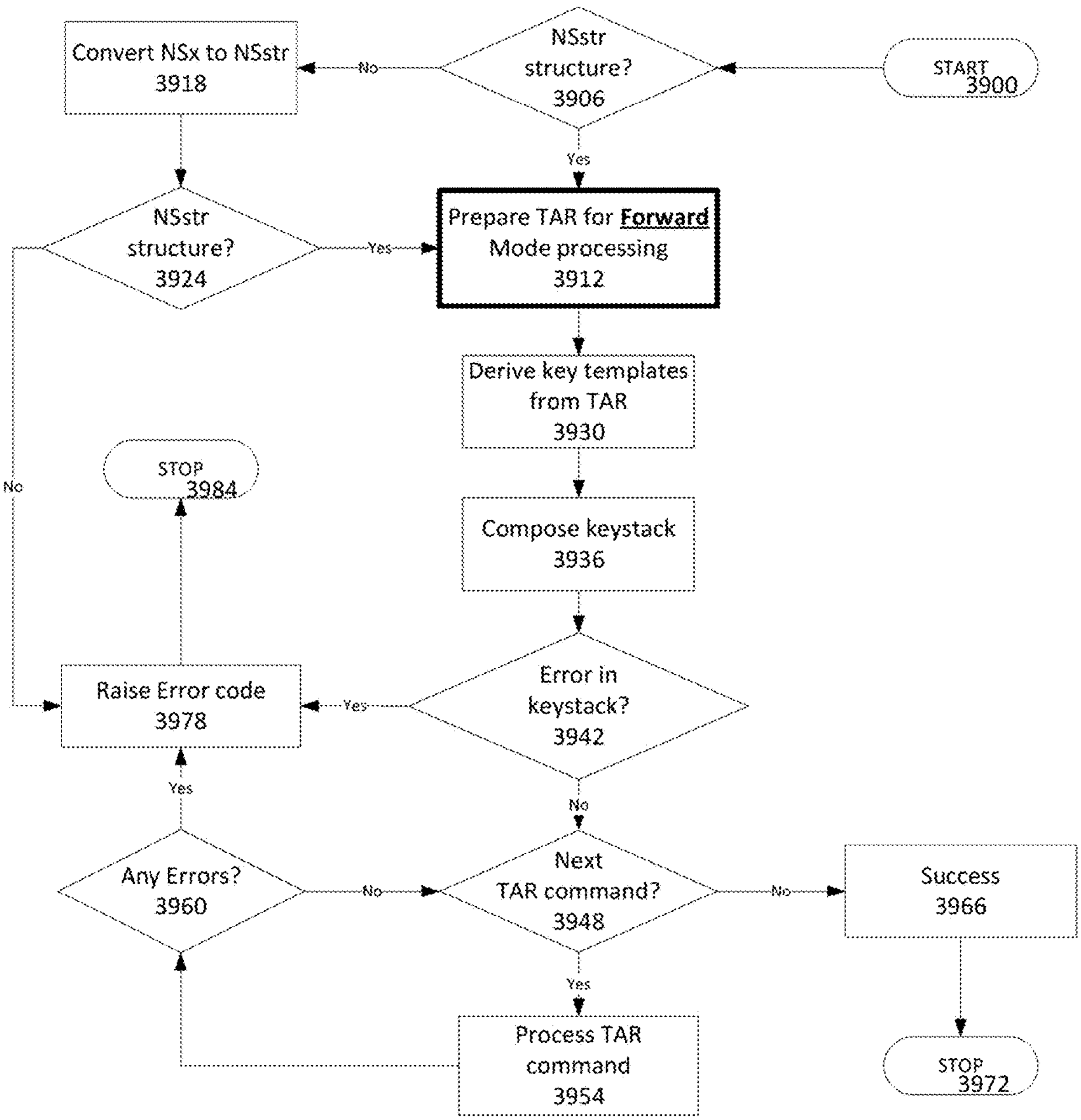
FIG. 39 shows a flowchart of a SDFT ravel operation.

FIG. 39 shows a flowchart of a SDFT ravel operation. Given an NSx structure, the ravel function or method call may perform the following operations on the data contained within utilizing either parameters provided with the call and/or a TAR embedded within the NSx where in this case 'x' stands for any transmutation structure. Similar to the key check/generate transmutations, a mobius transmutation may be considered so fundamental to this algorithm that it may be implicitly performed on any input data structure if the conditions are met 3906. Ravel may only properly perform its core operations on an NSstr structure therefore if an NSx structure may be passed that is not an NSstr, it may attempt a conversion to an NSstr structure 3918. The failure to produce a valid NSstr 3924 may raise an appropriate error code 3978 and abruptly terminate the process 3984. There may be at least three different methods by which the data within may be raveled or folded: first, within a valid NSstr, there may be a TAR contained indicating the transmutation sequences to perform on the data within the NSstr structure; second, the name of a TAR label may be passed into the ravel call as a parameter thereby indicating the preferred set of transmutations to perform on the data within the NSstr structure; third, a customized TAR list may be passed in as a parameter along with its given name in the ravel call thereby indicating the preferred set of transmutations to perform on the data within the NSstr structure. The preparation of the TAR 3912 may comprise expanding other TAR label references and/or properly ordering it for the mode of traversal which may be either forward or reverse. FIG. 41 and FIG. 42 illustrate several examples of TAR reversals. Then a key check transmutation may be effectively performed on the TAR and NSstr structure. A component of a key check transmutation may be to derive a list of key templates by examining the TAR 3930. Using the TAR, input keystack (which may be empty or partially populated) and/or key templates, the process may compose the keystack for proper traversal of the TAR 3936. This may comprise generating the missing keys of the correct type, sequencing keys in the proper order and/or checking input keys for proper structure and type. Any mismatches in input key types and corresponding derived key templates may produce an error condition 3942 leading to raising an appropriate error code 3978 and abruptly terminate the process 3984. The process may now iterate over each transmutation command in the TAR in a proper sequence 3948 and perform the specified transmutation 3954 on the data contained within the NSstr. Any errors that may be encountered during a transmutation command execution 3960 may raise an appropriate error code 3978 and abruptly terminate the process 3984. When the end of the TAR sequence is reached 3948 with no errors, then the ravel operation may be deemed a success 3966 and the process may exit gracefully 3972.

Figure 40:
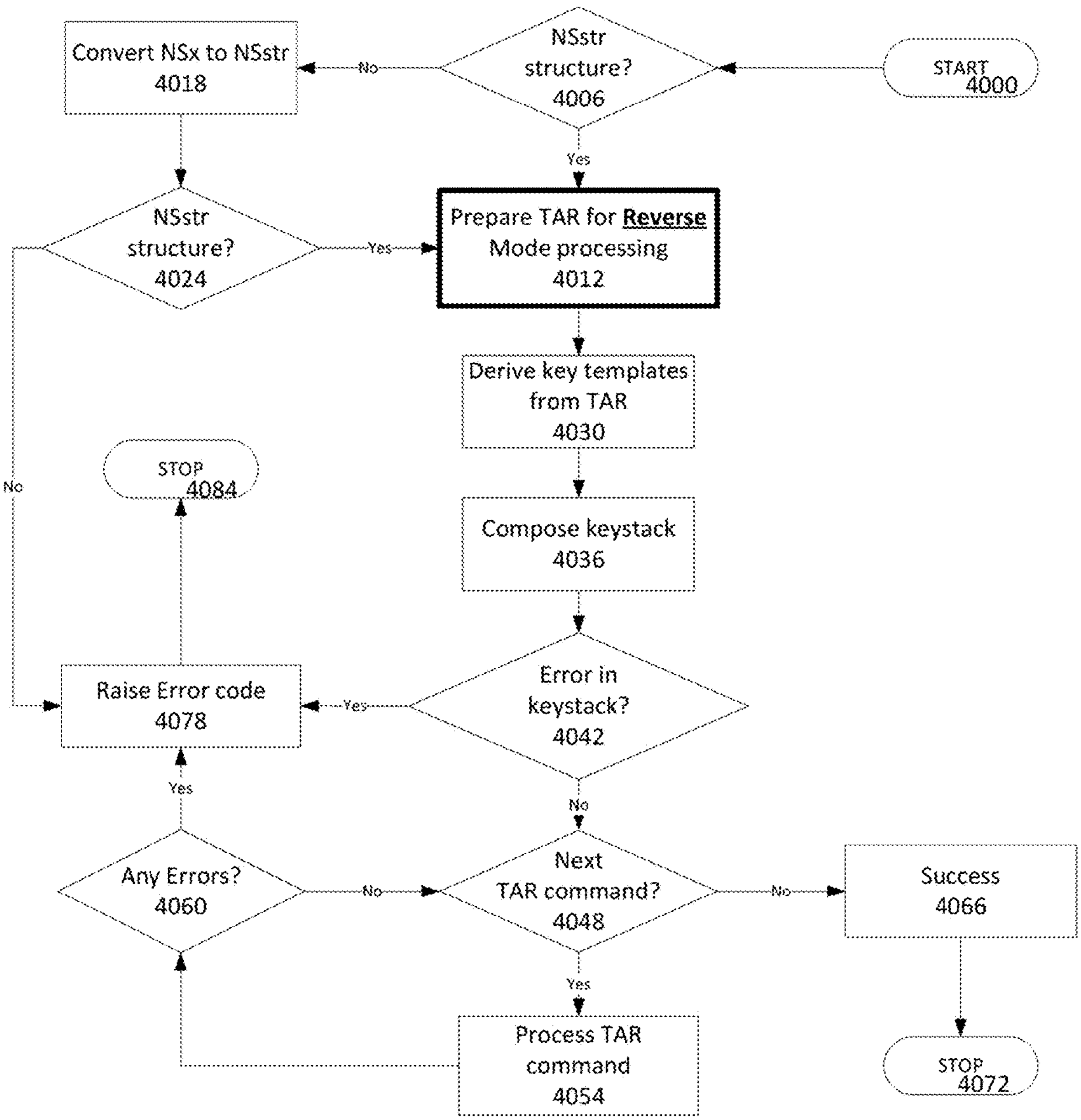
FIG. 40 shows a flowchart of a SDFT unravel operation.

FIG. 40 shows a flowchart of a SDFT unravel operation. Rather than specifying the unravel process in detail, we may illustrate the symmetry of the reversibility of transmutations by comparing the flowcharts in FIG. 39 and FIG. 40. The only difference between the two flow charts may be the TAR preparation steps 3912 and 4012. Since every transmutation may have been analyzed and structured using TOP to perform in a well-behaved manner in a bidirectional way, the unravel process may not need to be very different from the ravel process except for how the TAR may be presented. It may be implemented as the same code but have a slight deviation when a reverse flag may be indicated and perform the proper reverse sequencing of the TAR when encountered. Such a call in Python v3.6 may take the form 'obj.ravel( . . . , reverse=True)'. The symmetry may allow the actual implemented code to be much smaller and/or may present fewer opportunities for programming errors. A conceptual benefit may be the clarity and simplicity of thought when constructing new TARs for specific purposes: the programmer may rely on a proper TAR sequence to be entirely reversible within its limitations and may not have to give much thought to that portion of the application. A benefit may be that the programmer's workload for creating a specific set of data transmutations may be effectively reduced by at least half since he no longer may need to create the reversing code of such data manipulations. The building of complex ciphering and locking mechanisms may require an immense number of data manipulations utilizing a large number of cryptographic keys. The Transmutation Organizing Principle (TOP) methods may help achieve more cohesive and unitized methods of approaching such complexity in discrete, less error-prone ways; thus, it may allow for, but may not be limited to, more consistent, reliable, secure, portable, understandable, comprehensive, flexible, extensible and/or complicated code and/or data.

FIG. 43 shows a table of transmutations mapped to a key type template it may generate or require during TAR processing. Referring back to the discussion on key management, one of the main operations of key management may be to analyze the given TAR and produce a corresponding list of key type templates which may detail the type and specifications of each key that may be necessary in a successful processing of the given TAR. Table 3506 lists at least nine types of key types defined within SDFT. Table 4300 shows a mapping of each transmutation operation which may require a key and the corresponding key type or 'keytyp' it may require by the ravel/unravel process. A key template may have several attributes associated with each key type such as but not limited to key lengths or 'keylen'. For brevity and simplified illustrations sake, we may indicate a 256 bit long symmetric key as having a key template which may be represented as 'symmetric keylen=256' or 'symmetric 256' but in actual implementation may utilize any available data structure mechanisms in the programming language to store such values in an organized manner. In Python v3.6, a possible structure for a key template may be represented by an array of dictionaries where each dictionary entry in the array stores a single key template with each attribute corresponding to a dictionary key and the attribute value corresponding to the value associated with that key in the dictionary. Within SDFT, all key templates may be temporary structures and may be subject to repetitive regenerations via the key check transmutation and it may not be necessary to permanently store such key templates. In this way, SDFT may properly analyze any keys inserted into a keystack for processing prior to letting a cryptographic transmutation to outright fail due to key type/structure incompatibilities. A prevalent theme in TOP and SDFT may be the view that the obfuscation of data manipulation sequences may not be a reliable component in securing any sensitive payloads but rather may be relegated to the strength of the chosen cipher and its operating attributes and/or characteristics.

FIG. 44 shows TAR examples and the key templates generated from each. The left column in table 4402 lists a TAR example 'A'. The right column indicates the key type templates generated for each transmutation command that may require a cryptographic key as an attribute input. In this example, TAR 'A' may require two cryptographic keys in the indicated sequence. The left column in table 4404 lists a TAR example 'B'. The right column indicates the key type templates generated for each transmutation command that requires a cryptographic key as an input. In this example, TAR 'B' may require four cryptographic keys in the indicated sequence. This process may be known as key template generation from a TAR.

FIG. 45 shows TAR examples and the key templates generated from each and the expected list of KISS structures to be input (put) or generated (gen). The list of KISSes is also referred to as the keystack. We can take the two examples from FIG. 44 and show the next step in the key management aspect of a ravel/unravel call. A keystack may be expected or generated in the form of a list of KISS structures corresponding to each key type template as shown by 4510. When the TAR 'A' processing reaches the 'scipher salsa20 256' transmutation command, the process may expect to find an input 256 bit long symmetric key in the keystack as indicated by KISS A1. When the TAR 'A' processing reaches the 'dign dss 1024 digestlen=512' transmutation command, the process may expect to find an input 1024-bit dsa key in the keystack as indicated by KISS A2. The KISS list for TAR 'B' may be read and understood to be done in a similar manner. If no such expected key may be found in the keystack, the TAR processing may expect a generated key to be found instead. This implicit key generation may be beneficial to the programmer since the only requirement to generate any type of acceptable key for a given keyed transmutation is to be able to declare it within a TAR. There may be no additional steps needed to generate a specific key for a specific cryptographic function. Calling a ravel with an empty keystack may result in the output NSstr structure to hold a fully compliant keystack with appropriately generated keys to match the TAR and be able to fold the data within. It is strongly recommended and advisable that this keystack composed of KISS structures may then be stored separately in a secure manner away from the folded data and/or it may be further modified in some way and be folded again and secured using a TAR with a cryptographic transmutation thus encrypting it further. The repetitive encryption and encapsulation of keystacks may be useful when dealing with many cryptographic keys to manage and secure. TAR 'B' may produce a keystack of four KISSes and it may be convenient to securely store the entire keystack into a key repository; however, the programmer may want to encrypt the keystack of four keys using a single key for convenience. This may be accomplished by creating a new NSstr, inserting the four key keystack into the data obj field, picking an appropriate cryptographic TAR and performing a ravel call on the NSstr structure. This series of steps may produce a keystack with a single KISS structure containing the locking key to the folded NSstr structure holding the four key keystack.

Figure 46:
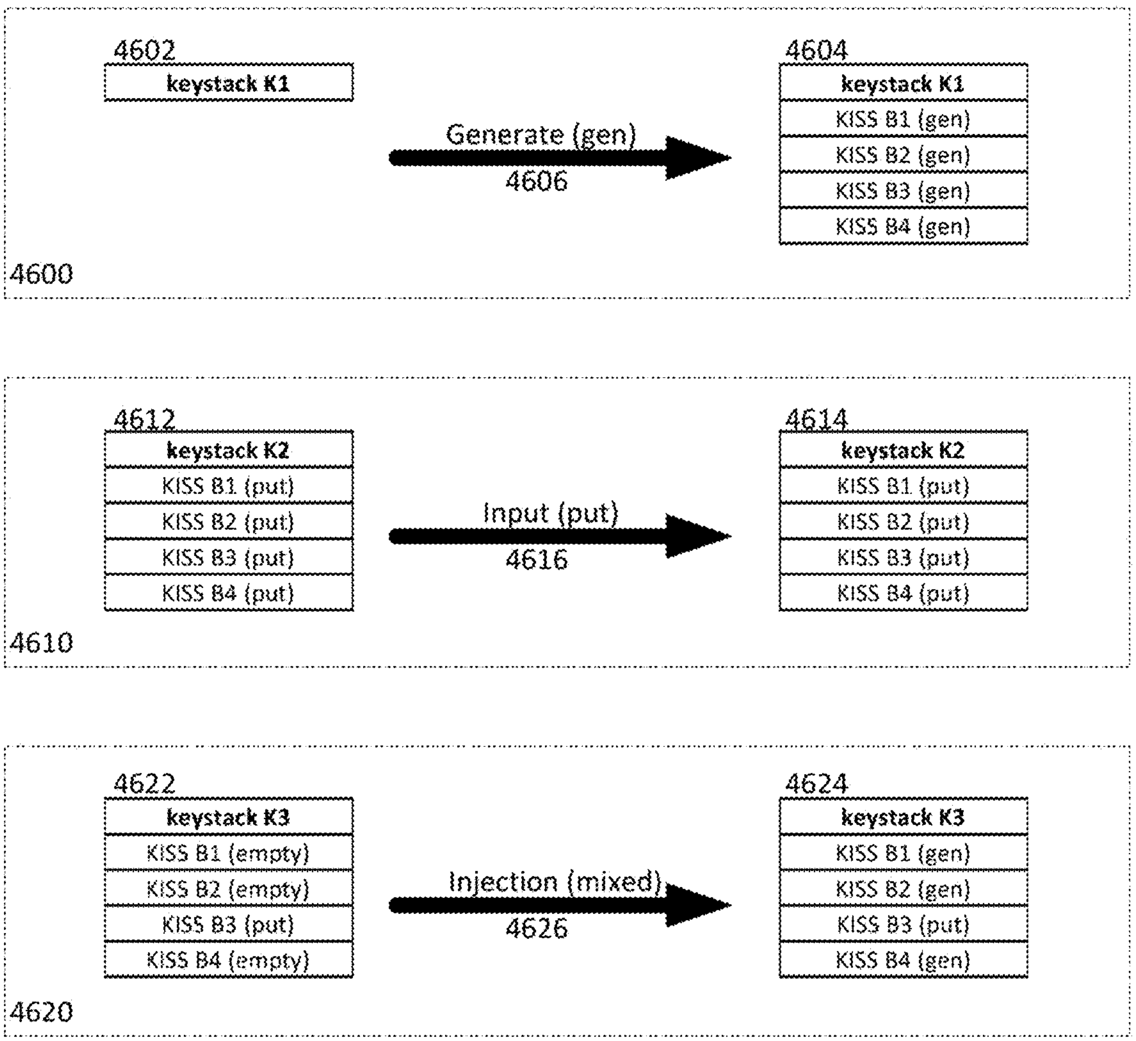
FIG. 46 show the three modes of keystack operation within SDFT TAR processing: generate (gen), input (put) and injection (mixed).

FIG. 46 show the three modes of keystack operation within SDFT TAR processing: generate (gen), input (put) and injection (mixed). Section 4600 illustrates what may occur when a keystack 4602 is empty in the processing of TAR example 'B'. The ravel process may take the key type template for TAR 'B' 4508 and generate 4606 the appropriate number of randomly generated cryptographic keys of the same type and in the same order as found in the key type template as shown in 4604. Section 4610 illustrates what may occur when a keystack 4612 is input (put) 4616 into the processing of TAR example 'B'. The ravel process may take the key type template for TAR 'B' 4508 and check it against the provided keystack 4612 to validate the number, type and ordering of keys, and then it may allow its use during the processing of TAR 'B' as shown in 4614. Section 4620 illustrates what may occur when a keystack 4622 is presented into the processing of TAR example 'B' with only one key provided, KISS B3 or also referred to as a partially filled keystack or the 'missing teeth' scenario. The ravel process may take the key type template for TAR 'B' 4508 and check it against the provided keystack 4622 to validate the number, type and ordering of keys. During the iterative validation of each key type template vs. keystack entry, any empty KISS structure may be deemed to be a special type of validation failure and may be further construed as an implicit key generate transmutation for that key type template. The ravel process may then inject 4626 a newly generated key of the appropriate type into the empty position of the keystack and continue in the key validation iteration. Upon completing this step, a mixed keystack (may be referred to as a mix of input and generated keys, the missing teeth scenario, or key injection) may be presented and used during the processing of TAR 'B' as shown in 4624.

Figure 47:
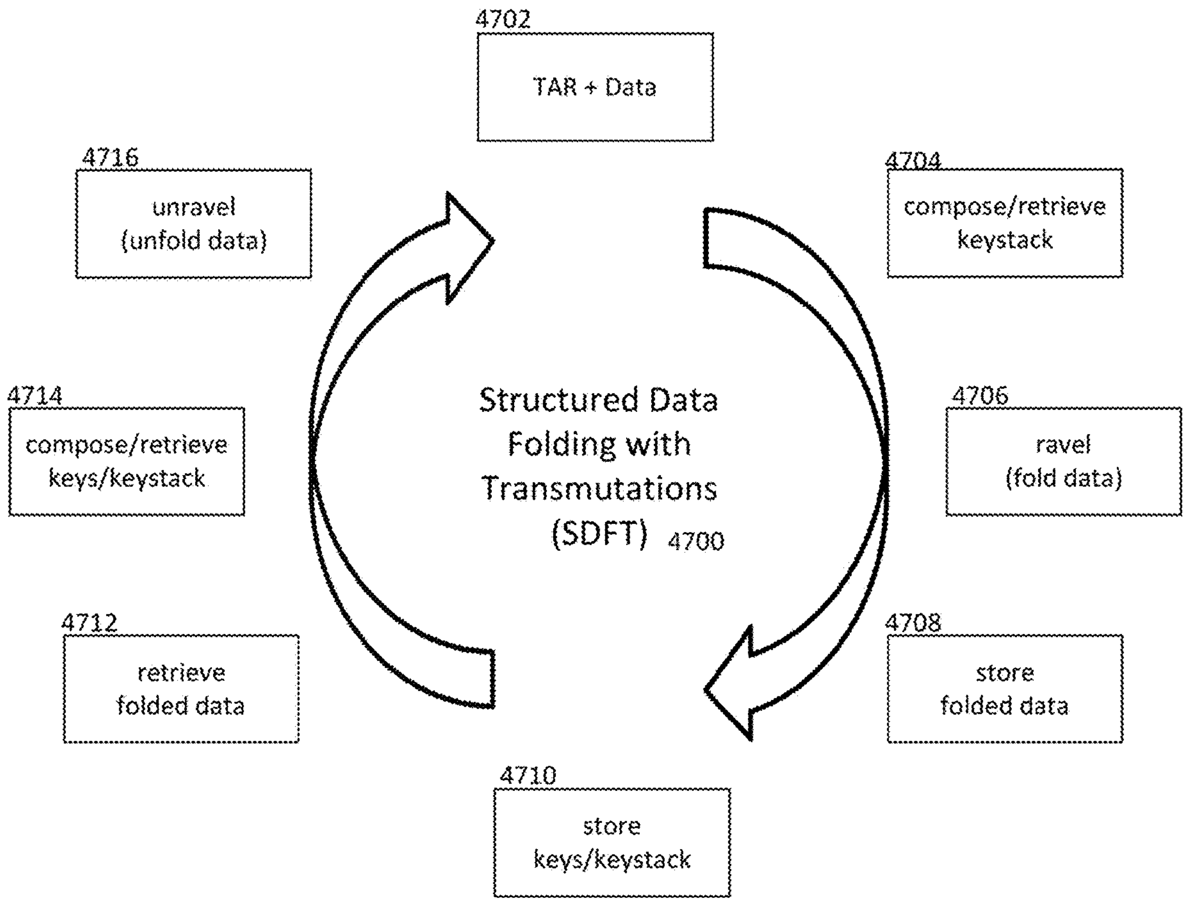
FIG. 47 shows an illustration of how keystacks may be generated and used in the life cycle of data and its TAR.

FIG. 47 shows an illustration of how keystacks may be generated and used in the life cycle of data and its TAR. The use of SDFT on data 4700 may allow it to be iteratively transmuted in an orderly fashion according to a variable set of transmutations as defined by a specific TAR 4702. The TAR may be structured in such a way as to allow for cryptographic key type analysis and thus produce key templates detailing the number and type of keys needed by the TAR. The key template may then reference in the composition 4704 of the input keystack whether all, some or no necessary keys may be present. When a required cryptographic key may be missing, the composition process may generate a new key for use. The TAR, data and keystack may then be passed into a ravel call 4706 to perform a folding of the structured data according to the TAR. The folded data may then be stored 4708 by any means. The keys in the keystack may be stored 4710 in a separate secure location. When the folded data needs to be referenced, the application may retrieve it from its storage place 4712, retrieve the keys or keystack from its secure storage 4714, pass the folded data and keystack into an unravel call 4716, and access the data in its original form from the unravel output structure 4702. This may be indicative of one complete cycle of Structured Data Folding with Transmutations. There may be many other pathways for any data structure to be transmuted and folded, but in essence some form of this cycle may be necessary to complete in order to fully retrieve the original data within SDFT.

The storage of the keys and/or keystack 4710 may involve a folding of the keystack utilizing a cryptographic TAR in order to protect it with fewer keys, just one key and/or different keys. The folded keystack data may become part of another structure which may eventually be folded itself. Data may be folded iteratively in a cascading manner to build internal data structures where precise piecemeal folding may lead to precise piecemeal encryptions. This ability to direct complex cryptographic data transmutations in a precise, organized and/or methodical way may lead to better and/or simpler designs for the protection of sensitive data using more sophisticated transmutation schemes. The simplicity and clarity of TAR syntax may lead to better understanding of the operations being done to the target data by others.

An important benefit of SDFT may be the systematic handling of key management within the context of combining various cryptographic operations on a given piece of data as in 4704 and 4714. The programmer may be somewhat relieved of the minutiae of generating each key and manually manipulating its storage and/or sequencing during such processes. In the application of cryptographic functions, these minutiae may quickly add up to become a massive number of small details or attributes that the application (thus the programmer) must track, analyze, store and/or use. The SDFT methods may allow a given application to track, analyze, store and/or use fewer individual attributes of cryptographic functions because it may allow those attributes to be embedded within the context of the data and/or keystack it has operated on and produced as output, thereby it may provide a pairwise coupling of the folded data along with the transmutations which may have folded it. The transplanting of data manipulation instructions from the application to the data may allow for simpler applications and/or applications with more sophisticated uses of cryptographic functions. SDFT may enable a better alternative to express Structured Cryptographic Programming (SCP) methods as will be discussed in the NUTS section.

Figure 48:
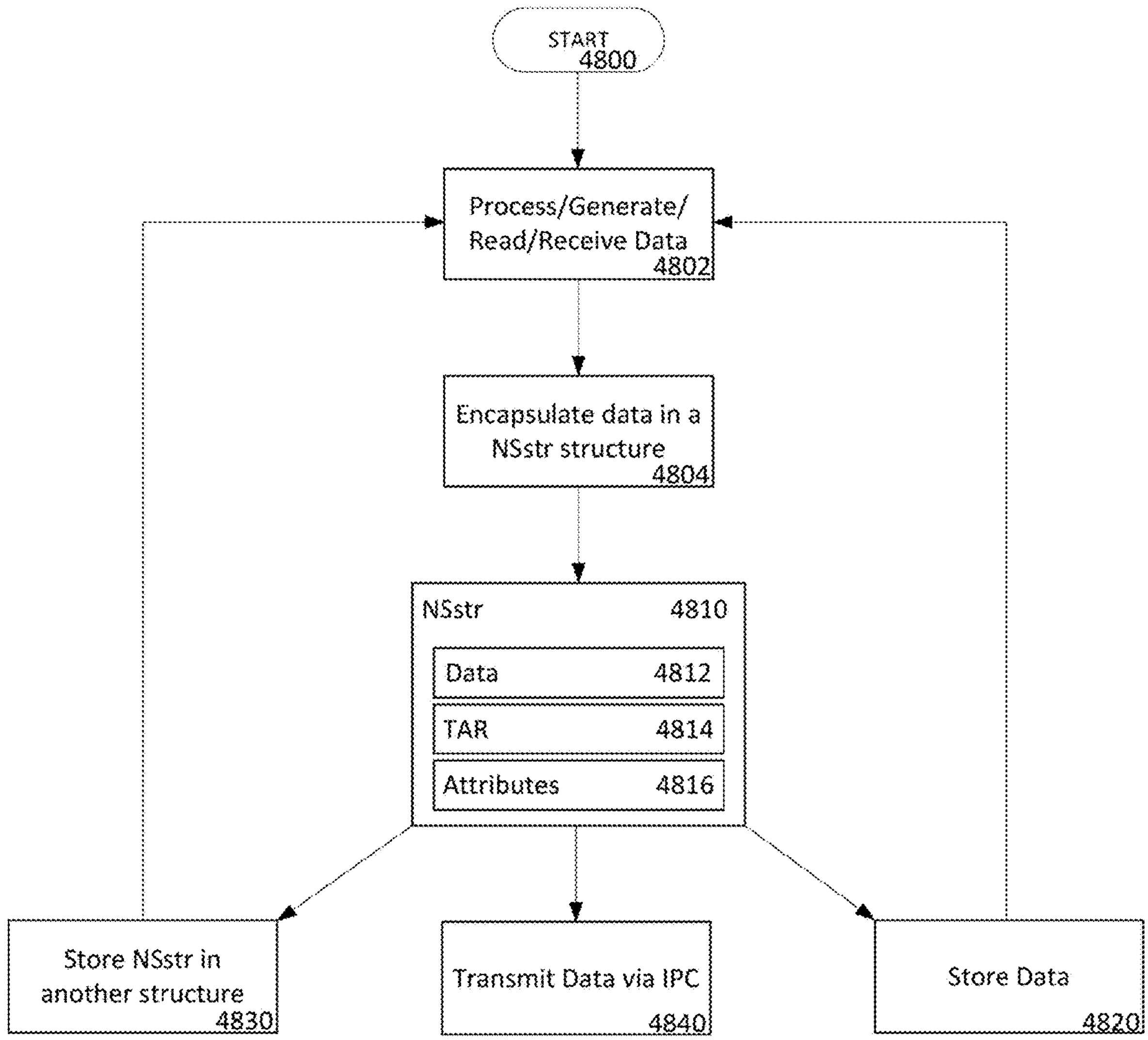
FIG. 48 shows an illustration of operations which may occur on data stored in an NSstr structure.

FIG. 48 shows an illustration of operations which may occur on data stored in an NSstr structure. Any data referenced by a pointer and/or stored in a variable 4802 may be encapsulated 4812 into an NSstr structure directly, using an instantiation method and/or using a method/function call 4804. Then the NSstr structure 4810 may encapsulate a TAR 4814 and its associated attributes if necessary 4816. Attributes may comprise keystacks, digests, transmutation parameters and/or temporary variables. This may provide the minimum complete set of information necessary to process the NSstr through an SDFT ravel/unravel operation to perform the TAR on the data contained within using the attributes that may have been provided 4810. In TOP parlance, we may refer to this as a folding of the data. The output of SDFT may be returned as the same NSstr structure 4810 or an NSx structure such as NSjson. This output may then be stored 4820 in some persistent and accessible way, transmitted to another computing device using an Inter Process Communication (IPC) method 4840, and/or stored into another internal data structure 4830. The cycle may begin anew for the stored data 4820 and 4830 at a later point in the application. For transmitted data 4840, the cycle may be initiated by the reception of such data packets 4800.

Figure 49:
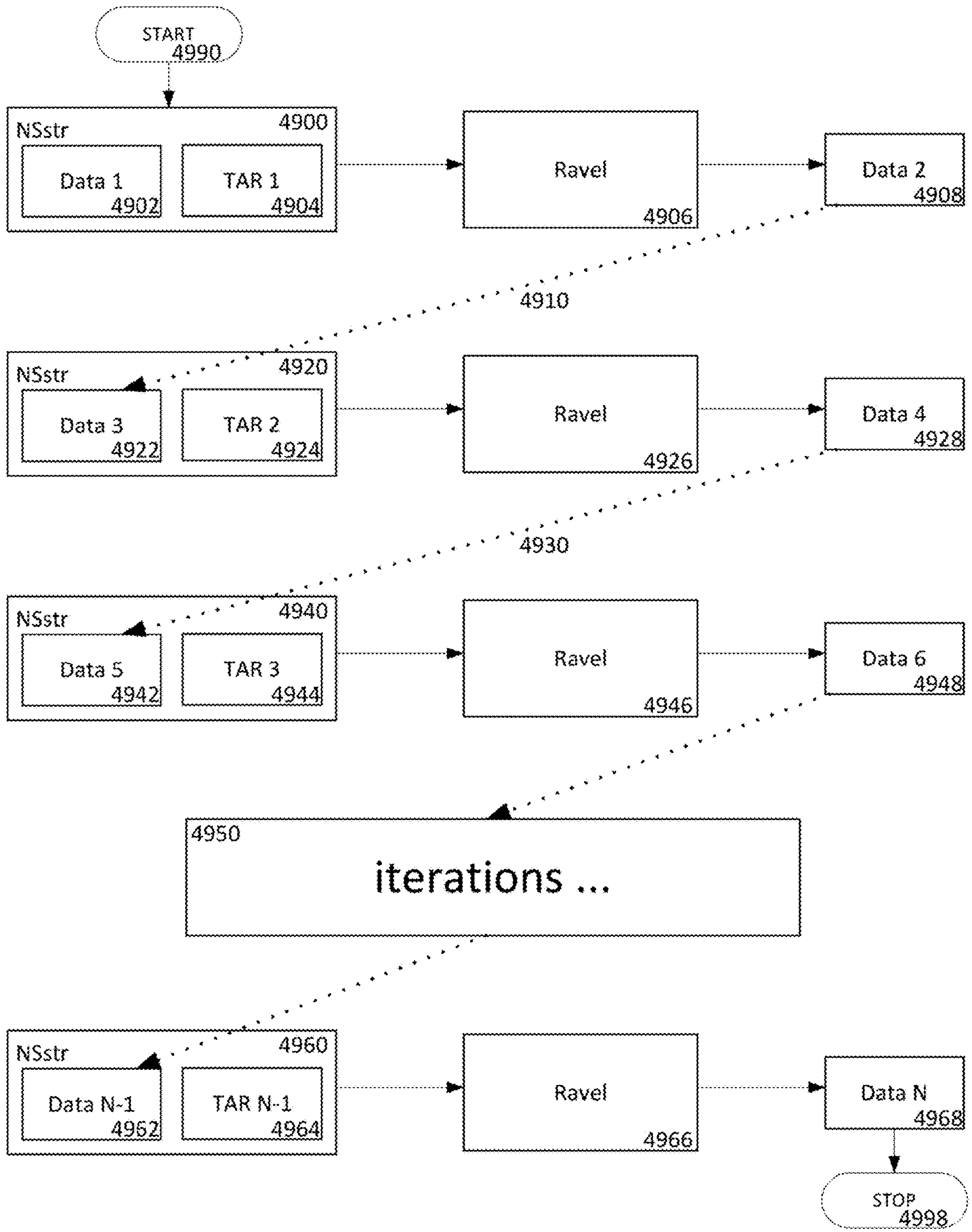
FIG. 49 shows a flow diagram of SDFT usage to iteratively fold data.

FIG. 49 shows a flow diagram of SDFT usage to iteratively fold data. The series of simplified diagrams shows the systematic folding of data using SDFT ravel calls for N successive data foldings. An NSstr structure 4900 containing at least data 4902 and TAR 4904 may be folded by calling ravel 4906 to produce output data 4908 which may be modified and/or further encapsulated into an NSstr structure 4920 containing at least data 4922 and TAR 4924 which may be folded by calling ravel 4926 to produce output data 4928 which may be modified and/or further encapsulated into an NSstr structure 4940 containing at least data 4942 and TAR 4944 which may be folded by calling ravel 4946 to produce output data 4948 which may be modified and/or further encapsulated . . . this process may be iterated as necessary 4950. Note that in this complex series of structured data foldings, any TAR in any step may be modified separately from the application code by simply modifying the TAR instructions stored in some text file or its equivalent. An equivalent programmatic expression without SDFT of such iterative encapsulations with the possibility of transmutation sequence and/or parametric variances for each step may be comparatively long, error prone and/or difficult to comprehend.

Figure 50:
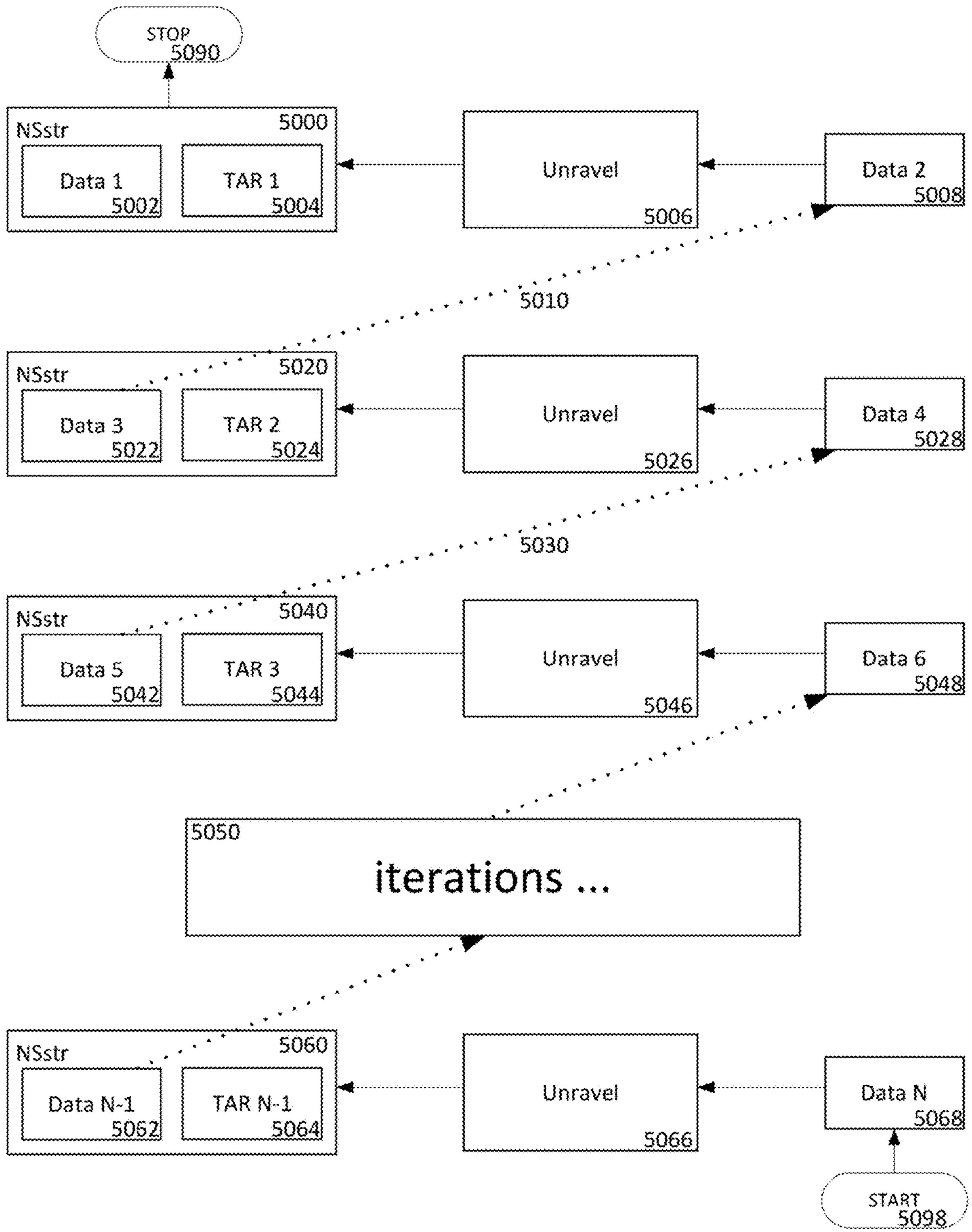
FIG. 50 shows a flow diagram of SDFT usage to iteratively unfold data.

FIG. 50 shows a flow diagram of SDFT usage to iteratively unfold data. The series of simplified diagrams shows the systematic unfolding of data using SDFT unravel calls for N successive data unfoldings. It is the exact reverse sequence of flow of FIG. 49 and may thus be understood as such. As shown previously in FIGS. 39 and 40, the unravel call may be identical to the ravel call except for the preparation of the TAR and the state of the data being fed into it. Note that in this complex series of structured data unfoldings, no additional reverse TARs may be necessary in order to achieve the unfoldings. All necessary TARs necessary to unravel each folded data may be found embedded within the folded construct. A closer examination of the NStar structure 3106 shows an 'expd' field defined as 'List of TAR commands-expanded form'. This may be a crucial feature of the reversibility in SDFT: the output of TAR preparation steps 3912 and 4012 may produce a full set of operable transmutation commands devoid of label references and any other external references and may be considered a complete description of the transmutations which the transmuted data may have been subjected to. This may be viewed as a static snapshot of the TAR set for the folded data thereby assuring that a proper unfolding may be performed on the folded data regardless of any changes to the TAR definitions in an external location. It may imply that TAR definition files may grow over time with a large number of TAR definitions but the storage of the operating TAR definition may be saved by the SDFT process in such a way as to preserve its reversibility regardless of changes to such external definition files (which may not be a recommended practice). This design may promote a systematic way to address time compatibility of stored data in a better way.

Figure 51:
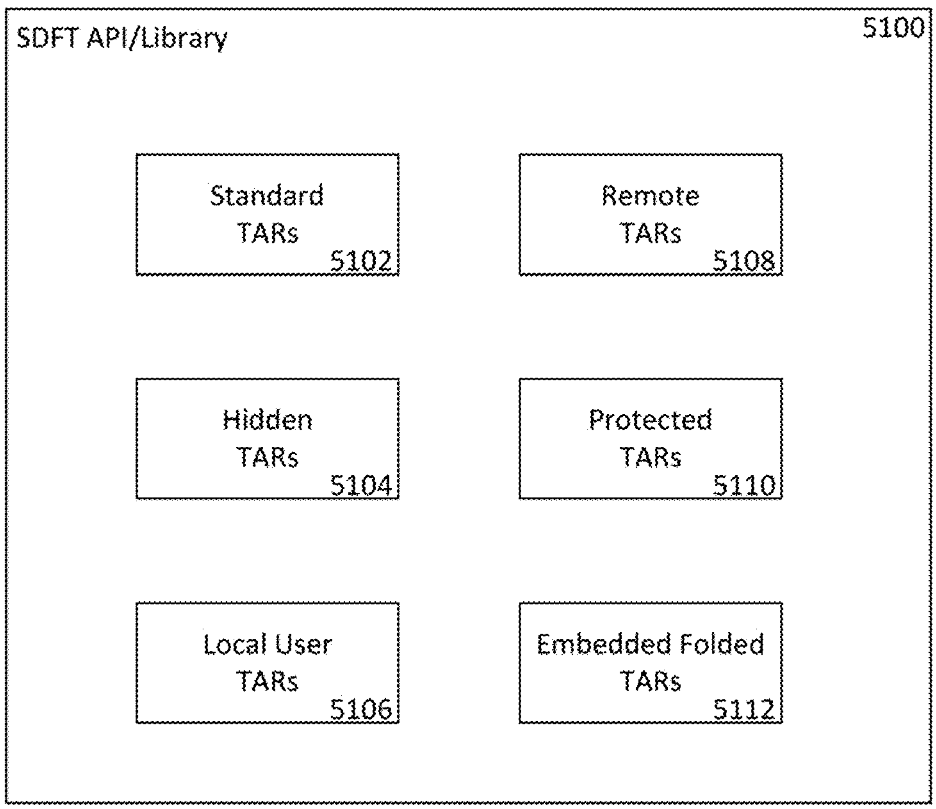

FIG. 51 shows an illustration of the SDFT API/Library and the various types of TAR definition files it may have access to. A TAR definition may exist in many forms such as but not limited to text files, Nuts, encrypted files, databases, server processes, and/or in running memory. A TAR may be defined at any time by the programmer as a customized TAR definition in a ravel call and may thus be a temporary TAR. For those TAR definitions which may be stored persistently, the diagram 5100 may illustrate the various forms of these but may not be limited by these shown. Standard TARs 5102 may be TAR definitions which may be provided as a package along with the SDFT library installation for the any OS/language pairing. Hidden TARs 5104 may be TAR definitions which may be customized TAR definitions that may only exist in access restricted locations and/or accessed by expressed permission. These may be the preferred method of TAR definitions within a private network or custom application installation. The use of Hidden TARs may be kept hidden even within the output of a ravel and no expanded form of the TAR may be found embedded in such folded data but just a reference to it by TAR label. The obligation to maintain the Hidden TARs may reside on the administrators of such groups since data folded with Hidden TARs may not necessarily contain the transmutation set needed to unfold it. Hidden TARs may seem familiar as the equivalent method of obfuscating the data manipulation sequences within a program. Local User TARs 5106 may be TAR definitions which may be customized TAR definitions that may only be accessed under the user's or programmer's account privileges. These may be temporary or developmental TARs that a programmer may be formulating for permanent addition to one of the TAR definition storage forms at a later time. Remote TARs 5108 may be TAR definitions which may be accessed with or without permission access from a remote server or storage site. Such topology may be necessary due to limited local storage or due to a policy of centralizing key TAR definitions into a centrally managed area. This may also be a method of constantly checking to see if the Standard TAR definitions may be the most recent versions. Protected TARs 5110 may be TAR definitions which may be located in any appropriate, accessible place but may be encrypted for authorized access only. A separate authentication and/or authorization process may need to be traversed successfully in order to gain access to Protected TARs. Another form of a Protected TAR may be stored within a Nut container which may require a proper key(s) to gain access into it. Embedded Folded TARs 5112 may be the expanded TAR definitions preserved along with the folded data from a ravel call.

FIG. 52 shows an example Python script to perform manual data folding. FIG. 53 shows an SDFT example of a TAR definition and its usage in a Python script. FIGS. 52 and 53 may together show an example of how SDFT differs from a more straightforward programmatic approach using Python v3.6. These example Python scripts may illustrate the major differences in the basic calling sequences for each task at hand using each methodology. We may start with a sample data set 5210. The operations to perform on the data may be specified in tasks 5220 expressed in plain language as shown in lines 02-06. Usually these may be entered into the program itself as comment lines for readability. Section 5250 shows the actual Python code to perform the tasks and section 5260 shows the reverse processing of the tasks to recover the original data 5210.

Using SDFT, the data set 5310 is the same as 5210. Section 5320 expresses the tasks 5220 as a TAR definition labeled 'test_a70'. Section 5350 ravels the data and writes the folded data to a file. Section 5360 reads the folded data from a file and unravels it.

There are 18 lines of Python code for FIG. 52 and only 8 lines of code in FIG. 53. It may be apparent that any changes in the types and number of data transmutations may affect both sections 5250 and 5260. The method in FIG. 52 requires the programmer to maintain several variables, the sequence of tasks and/or the proper calling of each function or method. The reverse process in 5260 requires the programmer to make sure all operations are called in the correct reverse order and the parameters fed in the correct way for each function or method call. Any changes to the tasks in 5220 may result in programming changes to sections 5250 and 5260. Any additional tasks in 5220 may result in additional program lines to sections 5250 and 5260. More temporary variables may be created and used as necessary for these additions or changes to the tasks.

In the SDFT method in FIG. 53, any changes in tasks may be directly reflected in the TAR 5320. Therefore, any additional transmutation modifications may only vary the length of this section. The ravel and unravel calling lines 10 and 14 stay unchanged. The reversal process in 5360 of TAR 5320 need not be specified beyond the original TAR definition in 5320. In fact, sections 5350 and 5360 may stay undisturbed for any TAR definition chosen except for line 10 where the TAR definition label is specified in the ravel method call.

In terms of readability and comprehensibility of the tasks being performed, the reader may prefer the TAR 5320 over the actual program code in sections 5250 and 5260. The tasks specified in 5220 are not code and may usually be expressed as comments within the Python code. Any changes to the program code in sections 5250 and 5260 must be manually coordinated with the comments by the programmer otherwise confusion may ensue if another programmer was to attempt to understand the code with inaccurate comments and vice versa. A TAR 5320 may be considered self-describing in a clear and compact way.

The data stored by lines 15-16 in section 5250 has no embedded metadata describing how it may have been transmuted. The transmutation methodology is hardwired in sections 5250 and 5260 as actual code. Any such data written in this manner may be completely dependent on the existence of the same or similar code for its proper retrieval and recovery. These code sections or its equivalents must be maintained for all time for the data it transmuted to be recoverable for all time. It may be the equivalent of a Hidden TAR method.

The data stored by line 11 in section 5350 may contain an embedded, expanded TAR definition which may have transmuted the folded data. The transmutation methodology may be paired with the folded data thereby making it transportable. The recoverability of the folded data may be considered independent of the code that created it 5350 and 5360. Any code that may properly process the embedded TAR definition in the folded data may recover the original data. This type of functionality may allow for better time compatibility for changing transmutation sequences over time as older folded data may self-describe and thus self-prescribe how it may be recovered.

Figure 54:
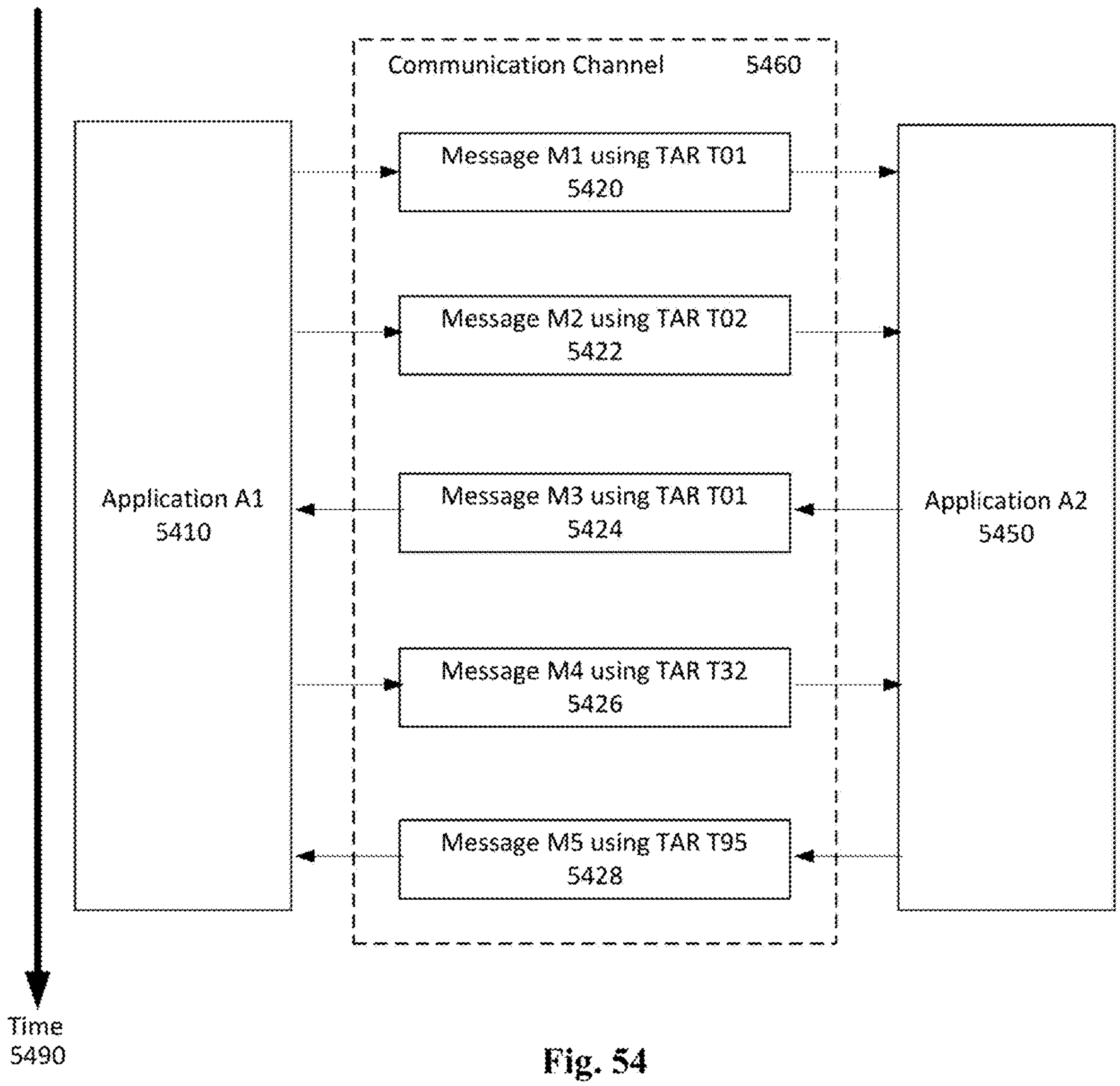
FIG. 54 shows block diagrams of dynamic TAR switching within a single communication session.

FIG. 54 shows block diagrams of dynamic TAR switching within a single communication session. In the TOP approach, a higher-level communication protocol may be viewed as the passing of transmuted data from one computing process to another. Since transmutations may allow many of the most frequently used cryptographic functions, it may be used to create secure messages for IPC. Theoretically, each message may be transmuted and folded using a different TAR. Each different TAR definition may be considered as its own protocol by modern standards of protocol definitions. Using SDFT, TARs can be switched dynamically on a per folded message basis between two applications as illustrated in FIG. 54. Any mixture of TAR sources as shown and described in FIG. 51 may be used as long as each application may have access to those TAR definition sources. The rich set of embedded, folded metadata such as but not limited to KISS structures as keyholes specifying an exact key identifier for each key needed in an embedded cryptographic transmutation may allow SDFT based communication protocols to offer security on a more sophisticated and potentially more secure level.

TOP analysis and methods which may result in a framework called SDFT may allow stored data to contain its own portable instruction set which may have produced it. This framework may define a data folding and may provide methodologies and/or embodiments to fold data using a conceptually and logically consistent reversible transmutation processing method expressible as a Transmutation Audit Record (TAR) which may be embedded within the stored data in an organized fashion. The resulting folded data may then be modified in some way and may then be repeatedly folded as needed to achieve the desired application or data form result. Short of describing TAR as a programming language, it represents a set of cooperative data manipulations in a concise form which may allow for infinite variations of transmutation sequences and/or the infinite variations of transmutation attributes within a given TAR and/or attributes. SDFT may allow for variable scoping for datasets similar to the way programming languages isolate local variables using scoping concepts and techniques. Through TOP, protocol variances may be viewed in a higher conceptual construct which may lead to data that may be self-describing and possibly may be accessible and readable from a wide variety of applications that may access its methodologies via an available SDFT library adapted for their programming environment. Furthermore, these characteristics which may be imbued into folded data may allow for the dynamic switching of protocols within a single communication session or single stored data object. The TOP approach may be utilized as a fundamental building block for the NUTS ecosystem and in the composition of a Nut. NUTS may be fully implemented independent of SDFT but that may be inadvisable.

NUT ID

Figure 55:
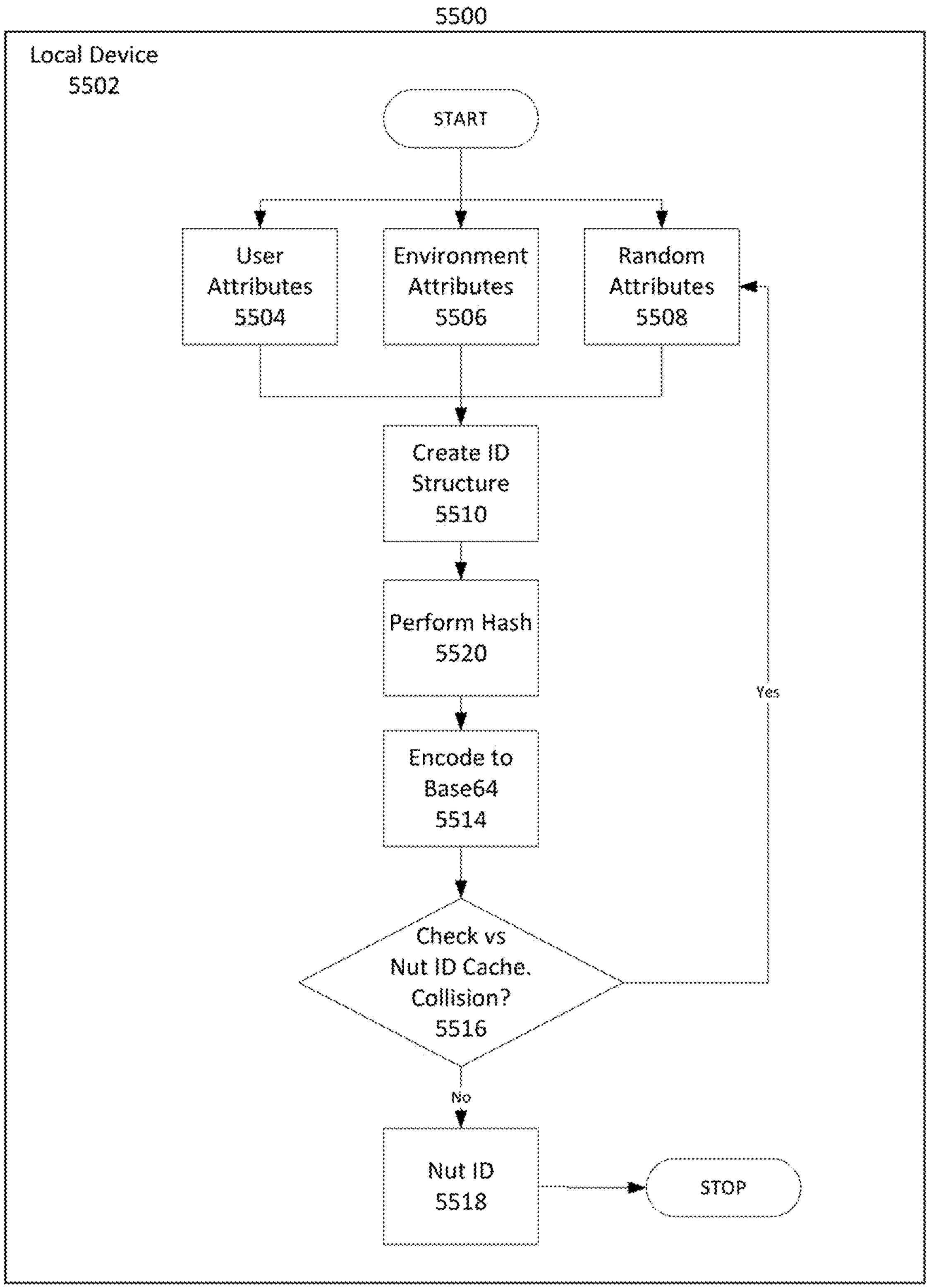
FIG. 55 shows a flowchart of an example process for generating a Nut ID.

The NUTS design may enable the identifiability of data regardless of location. This may require a universally unique ID (UUID) but it may not be achievable in a guaranteed manner without some form of centralization, therefore we may settle on the notion of a practically unique ID with sufficient length and entropic properties to provide a low probability of ID collisions. FIG. 55 shows a flowchart of an example of a process for generating a Nut ID 5500. Here a local device 5502 may be running an application which may invoke a function to generate a practically unique ID from data pieces such as but not limited to user attributes 5504, environment attributes 5506 and/or random attributes 5508. User attributes 5504 may include data items such as but not limited to user login information, group ID, company ID, user ID and/or user password hash. Environment attributes 5506 may include data items such as but not limited to MAC address, IP address, device information, system time, OS information, directory paths and/or files, atomic clock synchronized time values, GPS synchronized time values, declared environment variables, thread ID, CPU runtime, IMEI number, phone number, application name and/or process ID. Random attributes 5508 may include data items such as but not limited to session counters, UUID, clock cycle counts, randomly generated numbers, mouse movement, keyboard activity, file system state, partial or complete screen area hashes, process up-time, OS up-time, and/or session duration. These data pieces may be gathered and stored in an ID structure 5510 which may then be serialized using JSON or alternative marshalling techniques. Then the resultant binary string may be hashed 5520 using a hashing algorithm such as SHA-512 (from the SHA-2 family of hash algorithms published in FIPS PUB 180-2 by NIST in 2001) or alternative hashing method which may produce practical uniqueness with a suggested minimum length of 512 bits to lower the probability of ID collisions. The binary hash may be encoded into a base64 (or alternative encoding scheme) text string for portability and readability 5514 which may produce a text string 86 characters long more or less. The encoding scheme may comprise any method that may result in a printable and human readable form and may be accepted by the plurality of programming languages and software systems as a text string. Depending upon the modality in which the function may have been called, the resulting encoded hash string may be checked for duplication against any accessible Nut ID cache 5516. If there may be a collision of ID values then the process may be repeated with new random attributes 5508 until a non-colliding ID may be generated; collisions may be expected to be rare occurrences. The output string of this logical operation may be called a Nut ID 5518.

This process may be called locally within the running program or may be implemented within a server application residing locally or remotely serving client application requests for new Nut IDs. A possible benefit of a server model implementation may be its ability to access larger caches of existing Nut IDs to check against and may produce a Nut ID with a lower probability of collision. Nut ID duplication checking is not mandatory since the hash length and properly gathered data components in the ID structure 5510 may provide sufficient entropy. There may be a general concept of compartmentalization throughout some or all digital infrastructures such as the Internet with IPv4/IPv6 addresses, domains, directory hierarchies and access control groups. In a similar way, a Nut ID may be practically unique but it likely might be used within the context of a compartment constructed by an external system or relationship and thus the chances of collision may be many orders of magnitude smaller than the mathematical probabilities offered by the permutations in a given length of bits of the Nut ID. In cases where a different length may be desired, it may be accomplished by substituting the SHA-512 hash with an alternative hash algorithm in a modular parameterized fashion by a person having ordinary skill in the art.

Given the process by which a practically unique ID may be generated in the form of a Nut ID, what may be identified by it? In NUTS parlance, this may be known as Nut ID stamping. There may be at least two structures within NUTS that may be consistently stamped with Nut IDs: Lock Nodes and Nuts. A Nut ID assigned to a Lock Node may be called a Lock ID. A Nut ID assigned to a Nut may be called a Nut ID. A Lock Node may be an internal building block of a Nut. A Lock Node may be a self-contained, standalone locking mechanism which may protect its payload known as a Bag.

A Nut may be a data structure composed of one or more Lock Nodes. Therefore, a Nut may hold any parcel or parcels of data in whole or part thereof. Nuts may be used throughout the NUTS environment to identify in a practically unique way some or all associated software, data and/or hardware represented in binary form. A consequence of Nut ID stamping may be that every Nut may be uniquely identified implying that every data parcel stored within a Nut may be uniquely identified by that Nut ID regardless of where the Nut may be physically located.

Figure 56:
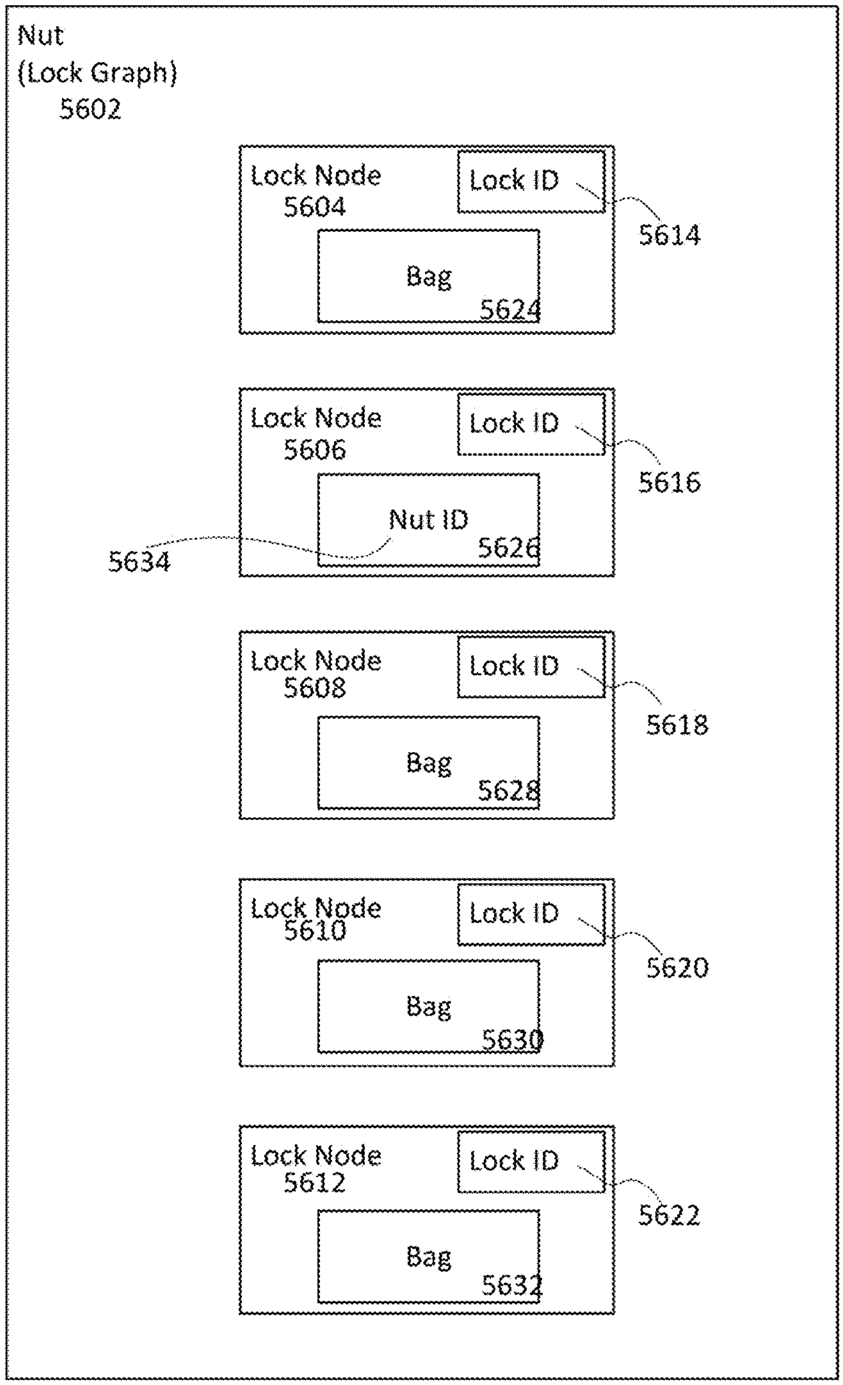
FIG. 56 shows a block diagram showing where Nut IDs and Lock IDs may be used within a Nut.

FIG. 56 shows a simplified schematic of a Nut data structure. This diagram may highlight the usage and relative placements of Lock IDs and Nut IDs within the Nut data structure. The specific Lock IDs 5614-5622 may be assigned in this Nut and they may be different values. The Lock Nodes 5604-5612 may be respectively identified by Lock IDs 5614-5622. In a typical Nut data structure formation such as this example, a Nut 5602 may be a group of Lock Nodes organized into a graph like data structure called a Lock Graph. A particular Nut 5602 may be identified by its Nut ID 5634 which may be stored in the Lock Node's 5606 Bag 5626 and the Nut ID may be considered the payload of this Lock Node which may be different from the payload of the Nut which may be stored in one or more of the other Lock Node Bags. Every Lock Node 5604-5612 structure may contain a payload area called a Bag 5624-5632. This shows the relationship between a Nut and its Nut ID and where one may find these items stored in a typical Nut container.

Figure 57:
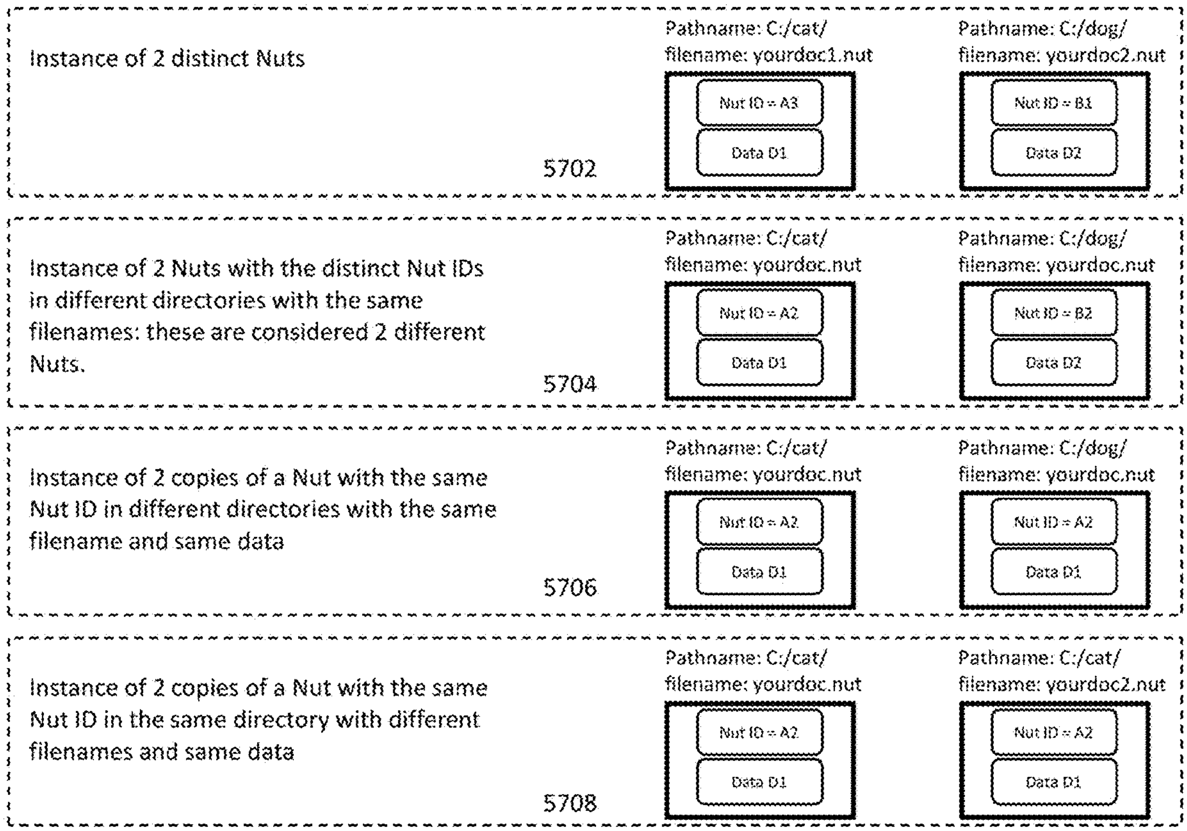
FIG. 57 shows example relationships between Nut IDs, path names and payload data.

FIG. 57 shows examples of relationships between Nut IDs, path names and/or payload data. There may be several Lock Nodes in a Nut which may be used to store metadata of the Nut, the metadata about the Nut payload and/or the Nut payload. The metadata portions may be stored in the Bags of various Lock Nodes in the Nut. 5702 shows a scenario where there may be two distinct Nut payloads D1 and D2 each stored in distinct Nuts identified by Nut IDs A3 and B1 respectively. Two-character Nut IDs are used for illustrative purposes even though it may have been specified previously that a Nut ID may be a base64 encoding of a 512 bit hash which may produce a text string up to 86 characters long. Nuts A3 and B1 also have distinct pathnames in an NTFS file system. 5704 shows two distinct Nuts having the same filename but different pathnames. 5706 shows two copies of the same Nut with same filenames in different directories. 5708 shows two copies of a Nut with different filenames sitting in the same directory. This may not be an exhaustive listing of some or all the permutations of these attributes but it may show the flexibility of having a metadata item permanently associated with each payload such as a Nut ID.

Data embedded within a Nut file which may be identified by an associated Nut ID may give rise to a novel feature of this methodology: the ability to automatically create dynamic filenames based on parameterized rules in the metadata. The filename may be representative of the normal identifying string for the file as well as a formulated summary of its other attributes such as but not limited to modification date and time and/or number of writes for the day. This may give a more accurate and convenient way of identifying a file and its state in time without having to delve into normally hidden attributes such having to look at the file properties in a directory browsing application. It also may allow the embedding of file and data attributes into the container holding the file rather than rely on the attribute capture capabilities of a file system which may vary from one file system to another. An example: a user may create a Nut with Nut ID #234 that may store a text document, the text document may always be identified by Nut ID #234 but the user may set up a dynamic filename comprising a base name+date of last modification+count of writes for the day such as "diary_20151115_1.txt". On the same day, when he may save to disk after modifying it a bit, the filename may show "diary_20151115_2.txt" and the old filename may no longer exist in the directory. This methodology may automatically create a new filename that may indicate some state information of the stored data. The properties of the Nut ID which may be practically unique and may be separate from pathname+filename designations may allow such a feature to be implemented without any external references. One of the benefits of such a feature may be the oft used method of copying and archiving previous states of a working document with a date stamp. An author may find a directory stuffed with a file for each day that he may have worked on his document. Using the dynamic filename method, he may only have one Nut file in his directory with the date stamp of the last time he wrote to it. The history (state) saving aspect of the manual method may be preserved within the Nut itself using the Nut History feature presented in a later section. This concept of the Nut ID being the main identification of content may be used later by the NUTserver to perform replication and synchronization operations on dispersed Nuts.

Lock Graphs & Lock Nodes

NUTS technology may address the storage, protection and access control of data in a layered, integrated, modular and/or iterative approach which may be defined as Structured Cryptographic Programming (SCP). The overall design of a Nut's internals may be described and defined and then each defined structure may be subsequently described in detail. Some features may be described in a layered fashion and then an integration description may be provided to show how the individual features may work together. SDFT may be utilized throughout the NUTS design to improve the organization of complex cryptographic structures and the systematic embedding of attributes associated with each folded data structure. It may be shown in various embodiments how SDFT enables SCP designs to be implemented with relative ease compared to the equivalent manual methods.

There may be four different methodologies that may control access of a Nut: Keyhole, Variable Lock, Stratum Access Control (SAC) and/or Nut Access Control (NAC). Some or all of these methodologies in part or whole may be layered and/or integrated together in novel ways within a Nut which may provide the full functionality of a reference monitoring system in an internalized and/or independent manner. These four layers may be embodied in a complex data structure called a Lock Node which may be designed to be modular, insular and/or linkable.

A Keyhole may be a data structure that may accept any number of cipher keys each of which may have an associated Encrypted Key Map. The embodiment is not limited to the cipher key types it may currently recognize and accept: passphrase, symmetric key and asymmetric key pair. Any simple or complex method, or any process that may specify a sequence of bits as a secret key may be integrated into a Keyhole. The Encrypted Key Map may contain several sets of keys, one set for each layer of access control within the Nut: Variable Lock, SAC and/or NAC.

A Variable Lock may provide different types of locking mechanisms in a normalized structure which may protect data in a Lock Node. These Variable Locks may comprise ORLOCK, MATLOCK, SSLOCK, XORLOCK and HASHLOCK. This disclosure is not limited to these predefined lock types but may be expanded or contracted to accommodate any appropriate locking scheme that may be normalized into its structure.

The Stratum Access Control may regulate penetration access into individual Lock Nodes in a Lock Graph. This feature may give rise to a property in Nuts called Gradient Opacity which may be the ability for a Nut to allow various levels of metadata to be viewed given appropriate access attributes.

NUT Access Control or NAC may employ Role Based Cryptographic Access Control (RBCAC) techniques to finely control modifications and authentications of a Nut's internals.

Structured Cryptographic Programming may be the design of data structures which may allow facile and flexible interactions between different methodologies to express a variety of access models. The security mechanisms may be entirely embodied in ciphered data and their associated ciphers, therefore, there may be no external application dependencies on the access control of the Nut such as a reference monitor. In some embodiments, a Lock Node may be used individually to protect field level data in any part of a payload. The internals of the Nut container may potentially make use of a plurality of cipher keys to embody a particular security model.

A Nut may be a directed graph data structure called a Lock Graph composed of nodes called Lock Nodes. Each Lock Node may be identified by a Lock ID which may be created by the same function for generating the Nut ID therefore they may both have the same characteristics. The Lock Nodes may be stored in a hashed array which may be referenced by their Lock IDs. Each Lock Node may have pointers linking to other Lock IDs or a null pointer. Using well established programmatic graph extraction and traversal techniques, a Lock Graph may be derived from the hashed array of Lock Nodes. A Lock Node which does not have other Lock Nodes pointing to it may be a Keyhole Lock Node (entry or External Lock Node). A Lock Node which may have a null pointer may be a terminal Lock Node of the Lock Graph and may store the Nut's payload or a reference to the payload. A Lock Node may have multiple Lock Nodes linking to it. Under most circumstances, a Lock Node does not link back to an earlier Lock Node in the Lock Graph or itself. A circular link reference may be unusual but may be accommodated through customized programming for custom Nuts if such a structure is warranted.

Some if not all data structure described herein to support the functionalities of a Nut may be implemented using complex data structures within the chosen programming language. If an SDFT functional library is available for the chosen programming language, it may be readily applied to fold and encapsulate any and all applicable complex data structures or subparts thereof to minimize data manipulation code, clarify the data manipulation methods, reduce the probability of coding errors, and take advantage of the implied SDFT features embedded in every folded data structure.

Note that due to the data centric nature of this disclosure, most flowchart type diagrams may be a mixture of traditional flowchart elements mixed in with data components which may be referred to as data flow diagrams or data flowcharts. Also, the intertwining nature of the Lock Node design layers may make it difficult to expose the logical operations of its components in a completely linear manner without making forward referencing statements therefore some re-reading may be required on the part of the reader.

Figure 58:
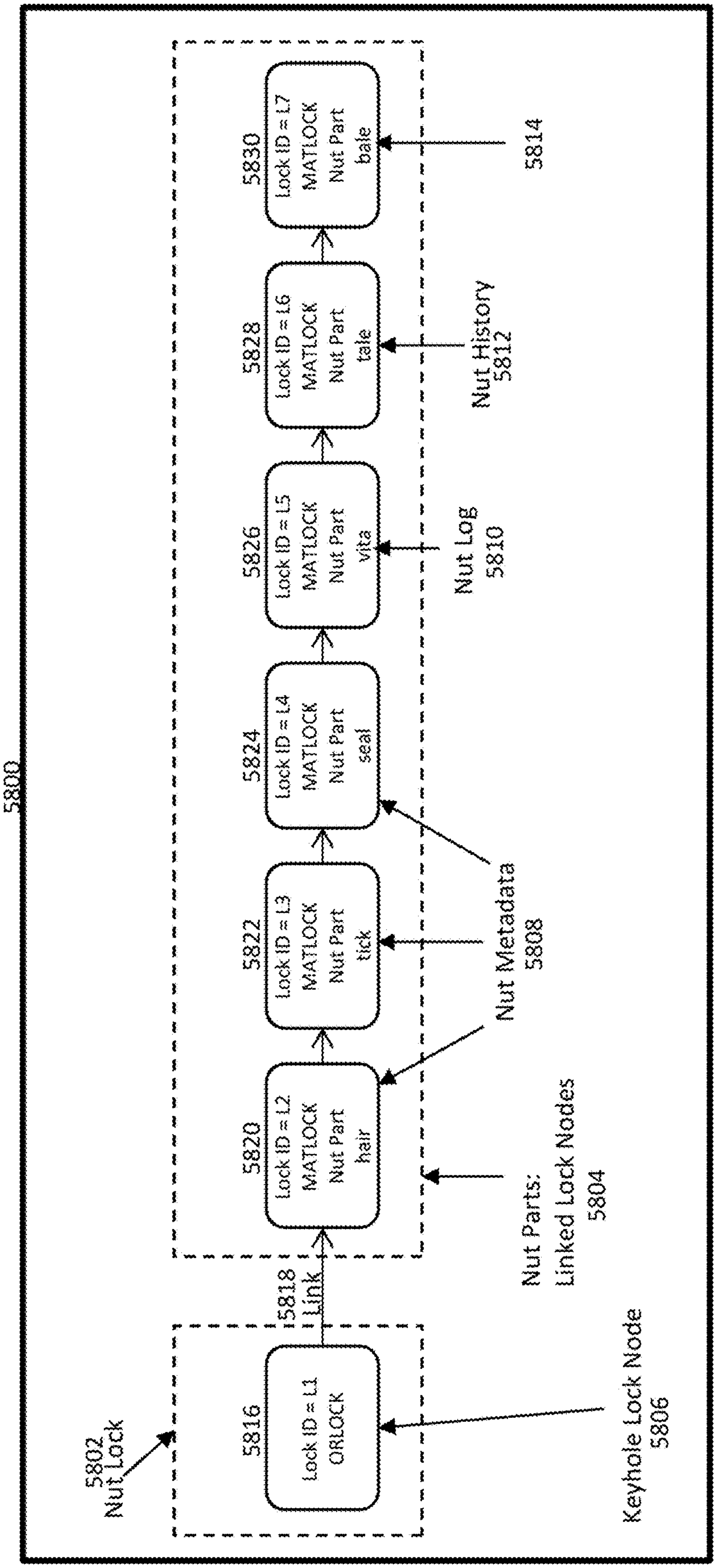
FIG. 58 shows a block diagram of an embodiment of a Nut or Lock Graph comprising logical sections: Nut Lock and Nut Parts.

FIG. 58 is an embodiment of a Nut or Lock Graph 5800 comprising two logical sections employing the multiple purpose aspects of modular Lock Nodes: Nut Lock 5802 and Nut Parts 5804. The Nut Lock 5802 section of the Lock Graph may allow for complex cryptographically linked locks to be constructed for a given Nut using one or more Lock Nodes. There are currently five types of Lock Nodes defined in this disclosure corresponding to the five types of Variable Locks mentioned: ORLOCK, MATLOCK, SSLOCK, XORLOCK and HASHLOCK. Each Lock Node type may be referring to the type of Variable Lock internal locking mechanism that may be utilized in the heart of a particular Lock Node to protect the encryption keys to the storage area and other Lock Node metadata and parameters. Lock transmutations as disclosed in FIG. 30 may be an embodiment of Variable Locks and may be used in the building of a Lock Node. Successfully unlocking and traversing the Nut Lock 5802 portion of the Lock Graph may lead to the Nut Parts 5804 section of the Lock Graph 5800. There may be several Lock Nodes that comprise the Nut Parts 5804: hair 5820, tick 5822, seal 5824, vita 5826, bale 5828, and/or tale 5830. The Nut Parts 5804 may contain the Nut payload 5830 and/or metadata 5820-5828. The number and type of Nut Parts for a Lock Graph may vary depending on the type of data the Nut may be storing and/or the design of the Nut for some desired behaviors and characteristics. In this example, unlocking the Keyhole Lock Node 5806 (5816) may result in proper cipher keys that may be inserted into the Primary Keyhole of the linked 5818 Lock Node 5820. Unlocking Lock Node 5820 may result in proper cipher keys that may be inserted into the Primary Keyhole of the linked Lock Node 5822. Unlocking Lock Node 5822 may result in proper cipher keys that may be inserted into the Primary Keyhole of the linked Lock Node 5824. Unlocking Lock Node 5824 may result in proper cipher keys that may be inserted into the Primary Keyhole of the linked Lock Node 5826. Unlocking Lock Node 5826 may result in proper cipher keys that may be inserted into the Primary Keyhole of the linked Lock Node 5828. Unlocking Lock Node 5828 may result in proper cipher keys that may be inserted into the Primary Keyhole of the linked Lock Node 5830. Lock Node 5830 may link to a null pointer therefore it may be the terminal Lock Node or the innermost layer of this Lock Graph or Nut. The unlocking of a Lock Node may comprise the unraveling of a folded data structure representing the Lock Node using SDFT methods (unfolding). Each Lock Node may contain a plurality of folded data structures where the action of unlocking a Lock Node may be equivalent to the unfolding of the applicable data structures.

Figure 59:
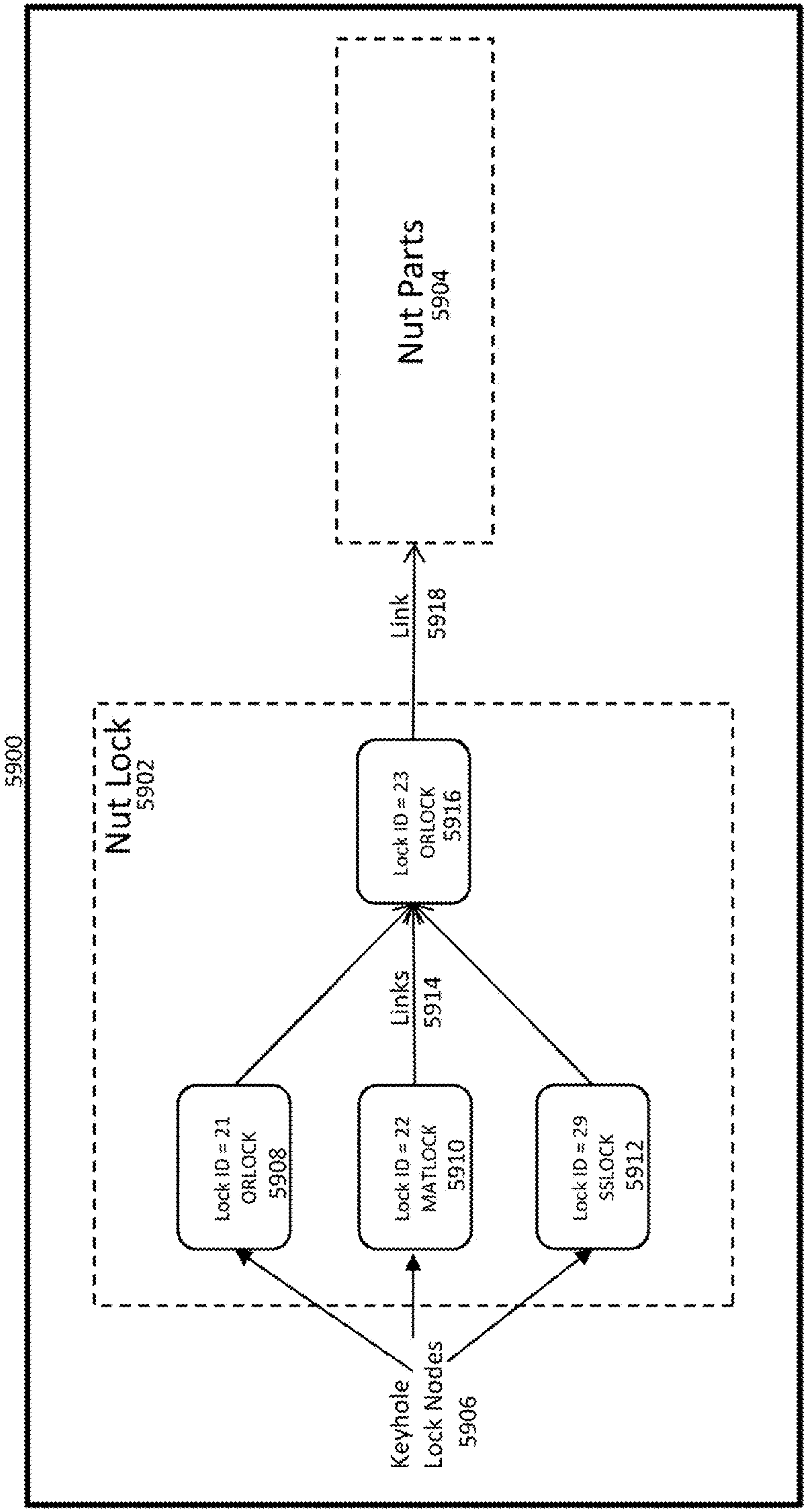
FIG. 59 shows a block diagram of an alternative embodiment of a Nut Lock in a Nut comprising three Keyhole Lock Nodes.

FIG. 59 shows a simplified Nut schematic 5900 of a Lock Graph embodiment comprising logical sections Nut Lock 5902 and Nut Parts 5904. This example explores a Nut Lock 5902 comprising four Lock Nodes 5908, 5910, 5912 and 5916. Lock Nodes 5908-5912 may be the Keyhole Lock Nodes 5906 of this Nut since some or all of them may be external facing nodes and may accept external cipher keys called Primary Keys. A user may have Primary Keys associated with one or more of these Keyhole Lock Nodes. The Nut ID of the Nut storing a Primary Key as its payload may act as a key ID that may be automatically matched up with the identifier marking the keyhole it belongs to amongst the Keyhole Lock Nodes 5906. Passphrase keys may be identified by key IDs or a text string which may or may not hold a question as its identifier. Complex multi-level passphrases may be constructed using proper keyhole identifiers and clear text Nut metadata portions with the appropriate question lists. Linkages between Lock Nodes such as 5914 and 5918 may be opened in a similar manner where the successfully unlocked Lock Node may produce an output key(s) with an identifier. In this particular example, unlocking any one of the Keyhole Lock Nodes may reveal the proper cipher keys that may be inserted into the keyhole of the linked 5914 Lock Node 5916. From this point forth, the unlocking of the nodes comprising the Nut Parts 5904 may proceed similarly to the process described for Nut Parts 5804. This Nut Lock 5902 construction may convey the building block nature of Lock Nodes and the flexibility of its combinations by showing that three distinct pathways may exist to unlock the payload of the Nut 5900 with each pathway requiring different conditions to be met in order to proceed with the unlocking process.

Figure 60:
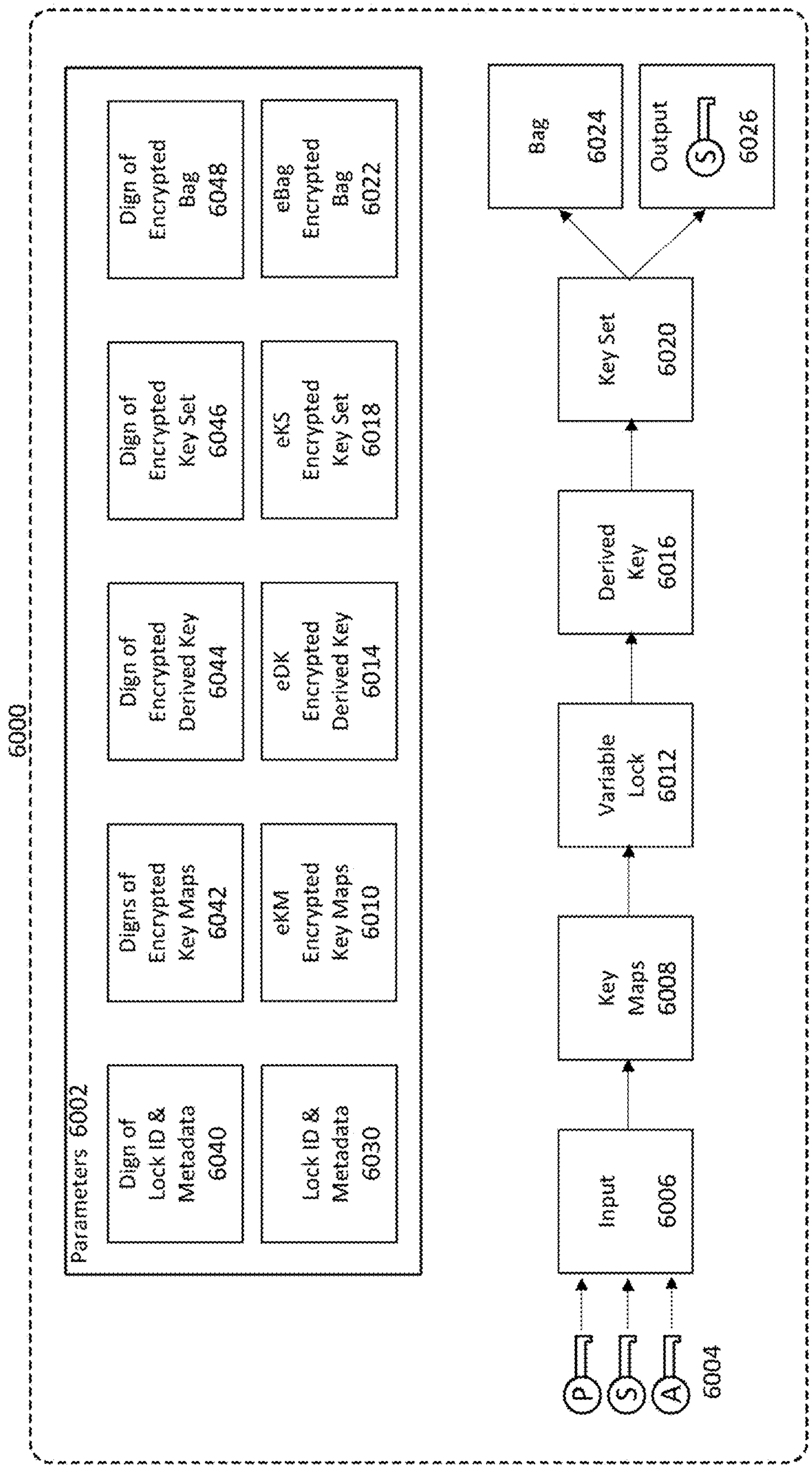
FIG. 60 shows a block diagram of the internal data structures of a Lock Node.

In FIG. 60, a Lock Node 6000 may be a data structure comprising the following sections: Parameters 6002, Input 6006, Key Maps 6008, Variable Lock 6012, Derived Key 6016, Key Set 6020, Bag 6024 and/or Output 6026. The Parameters section 6002 may hold the Lock Node's metadata, Lock ID 6030, and encrypted strings of the Key Maps 6010, Derived Key 6014, Key Set 6018, Bag 6022, and digns of the said encrypted strings created by the appropriate Access Role Keys (forward reference may be described in the discussion for FIG. 83 element 8334) for the Lock Node. The design principles may be similar to the flow in a Lock Graph with the unlocking of each section which may lead to keys that may help open the next section but then each component within the Lock Node may provide a specific function. The digns on the encrypted strings may be used by readers (an Access Role) to authenticate a particular section prior to a decryption attempt. The digns may be created by the writers (an Access Role) of the particular section using the encrypted string of the section when there may be some modifications to preserve or to indicate that a proper writer access key holder generated the dign. Furthermore, each of the above-mentioned encrypted strings may be embodied by the use of SDFT methods to fold data structures using TARs containing cryptographic transmutations. Given the number and variety of encrypted strings described in this section, SDFT methods may drastically reduce the burden of managing cryptographically related attributes by the programmer when coding.

Keyholes

Figure 61:
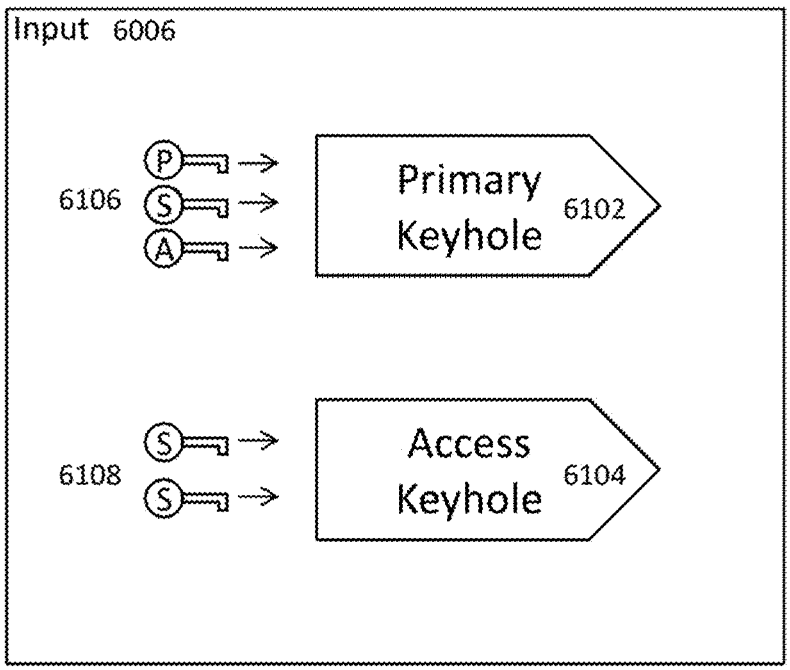
FIG. 61 shows a block diagram of the internal data structures of an Input Section of a Lock Node shown in FIG. 60.

In FIG. 61, the Input section 6006 of the Lock Node may provide two different key holes: Primary Keyhole 6102 and Access Keyhole 6104. Structurally, a Primary Keyhole 6102 may accept any number of cryptographic keys comprising four different key types: symmetric, asymmetric public, asymmetric private, and passphrase. The Access Keyhole 6104 may accept symmetric and/or passphrase key types. The Primary Keyhole and the Access Keyhole may internally utilize one or more KISS data structures as shown in FIG. 34 each operating in a keyhole mode (ima='keyhole') to represent the keyhole for each unique key that it may accept.

Figure 62:
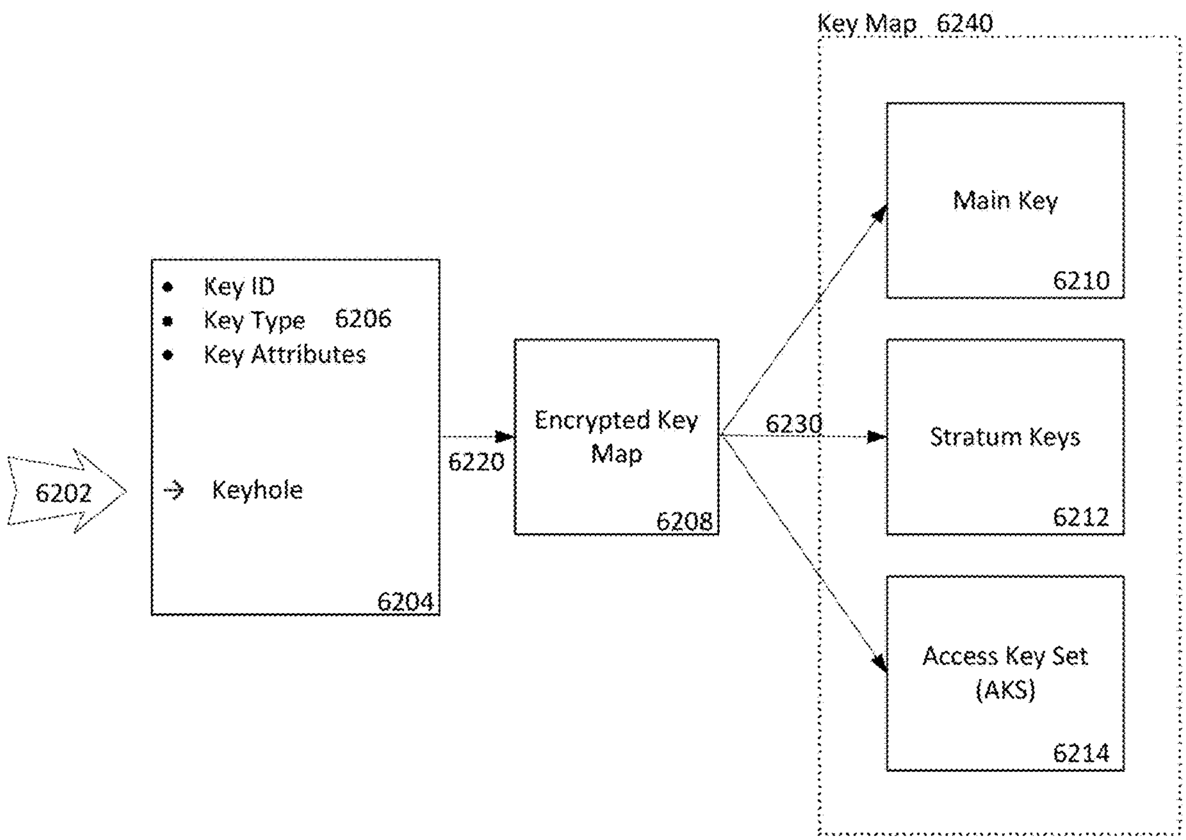
FIG. 62 shows a data flow diagram showing the relationship of the internal data structures of a Primary Keyhole of an Input Section shown in FIG. 61 when a valid Primary Key may be inserted into the keyhole.

FIG. 62 shows a single cryptographic key 6202 which may have an associated key ID, key type and key attributes 6206 and may be also designated as a Primary Key. The key ID may be any identifying string. The Primary Key and any other keys mentioned in this disclosure may each be internally represented by a KISS data structure as shown in FIG. 34 operating in a key mode (ima='key') with the key→value field populated with the key and other matching attribute fields filled in as needed. A Primary Keyhole 6204 may accept a Primary Key 6202 that may decrypt an encrypted Key Map 6208. The decrypted Key Map 6240 may be a structure which may comprise three sections: Main Key 6210, Stratum Keys 6212 and Access Key Set (AKS) 6214. The Main Key structure 6210 may contain a symmetric key or tine which may be called the Main Key, expiration date/time for the Primary Key 6202, countdown timer for the Primary Key and/or action instructions upon expiration of the Primary Key. The symmetric key or tine may be used by the Lock Node's Variable Lock. For a Keyhole Lock Node, the Key Map structure may additionally hold Stratum Keys 6212 and/or AKS 6214. The Stratum Keys 6212 may hold a set of keys to be inserted into the Lock Graph's Strata Lock Nodes, those Lock Nodes which may be identified by its Stratum designation. The AKS 6214 may hold a set of keys to be inserted into its own Access Keyhole 6104 for a Keyhole Lock Node. The encrypted Key Map 6208 may be a SDFT folded data structure which may contain the Main Key 6210, Stratum Keys 6212 and Access Key Set (AKS) 6214 structures.

Figure 63:
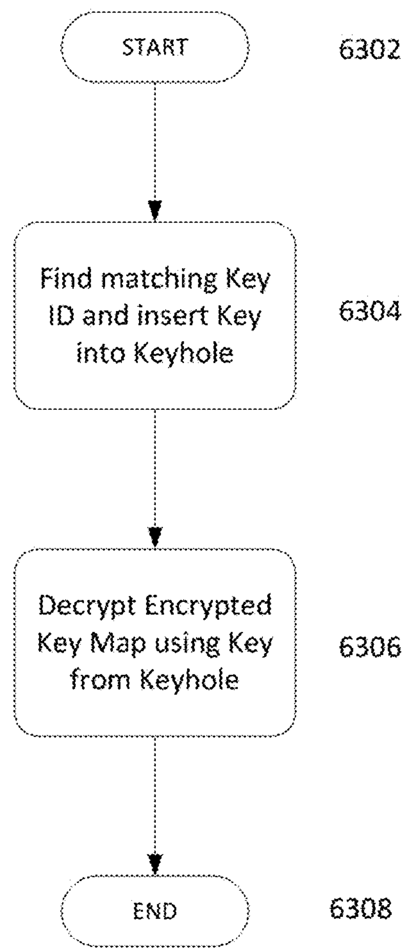
FIG. 63 shows a flowchart of the key insertion process for any Lock Node and for any cipher key.

FIG. 63. shows a flowchart of the key insertion process for any Lock Node and for any cipher key. Step 6304 may be a search across some or all the listed Lock Nodes in a Nut for a given cipher key and its associated key ID. Once a cipher key is inserted into the proper keyhole 6304, step 6306 may attempt to decrypt and unfurl the Encrypted Key Map for that key. The decryption and unfurling of the Encrypted Key Map may be equivalent to the unraveling of an SDFT folded Encrypted Key Map for such embodiments.

Upon a successful unlocking and unfurling of an Encrypted Key Map 6208 for a Keyhole Lock Node, 1) the Stratum Keys may be inserted into each Lock Nodes' Primary Keyhole matching the stratum designation found in each Lock Node's Parameters section, 2) the Access Key Set's (AKS's) Access Attribute Key Set Unlock Keys (AAKSUK) may be inserted into the Access Keyhole of the of the Lock Node. This Primary Key unlocking (or unraveling) may occur for as many Primary Keys may have been inserted into the Lock Node after which we may have a set of decrypted (or unfolded) Key Maps collectively making up a set of Main keys for possible use by the Variable Lock of the Lock Node.

Figure 64:
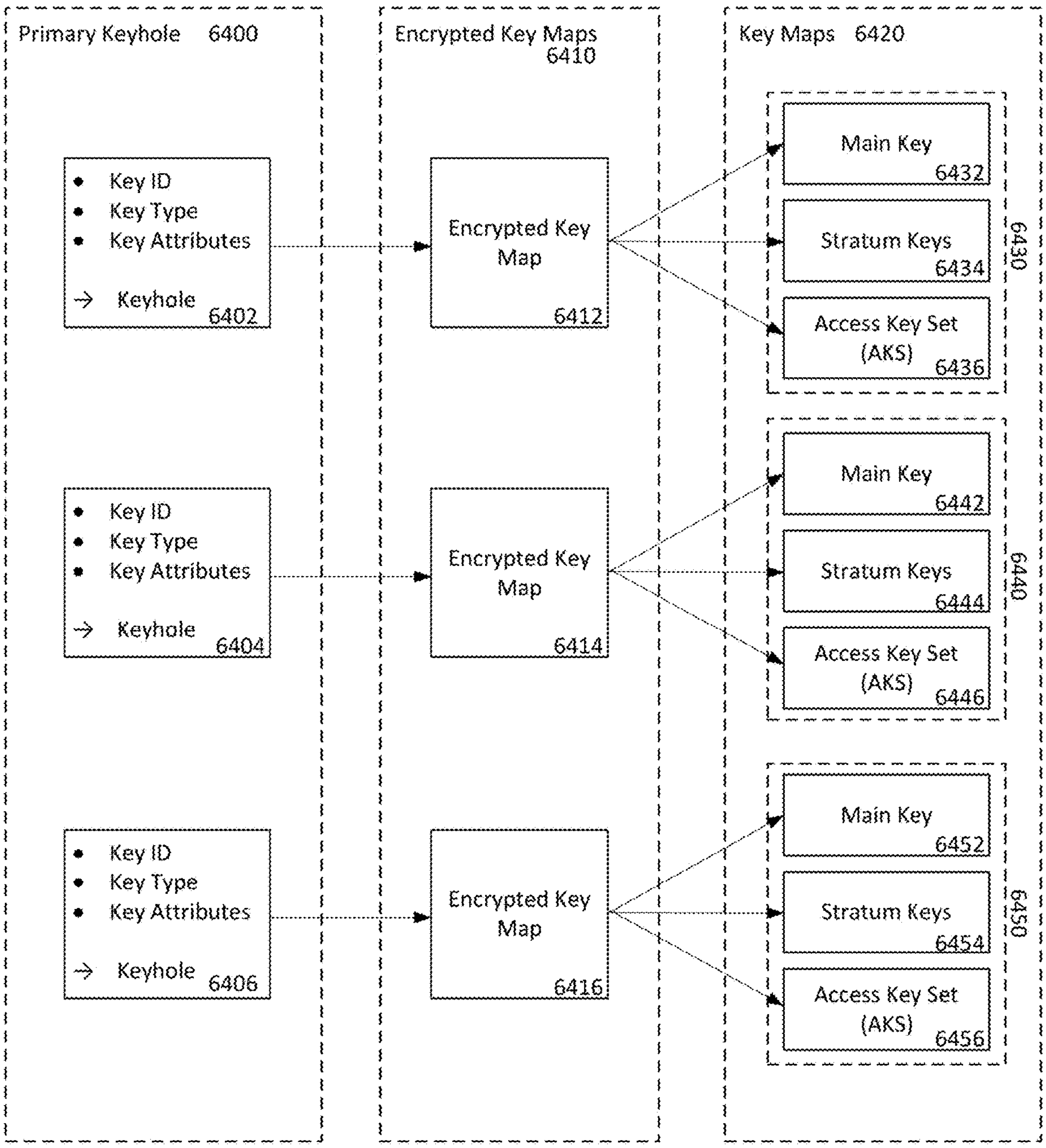
FIG. 64 shows an example where three Primary Keys may be inserted into a Primary Keyhole.

FIG. 64 shows an example where three primary keys 6402-6406 may be inserted into the primary keyhole 6400. Each key (→) may be matched up with its identifying key ID and may be inserted into a slot in a hashed array or KISS keyhole structure. The Key Type may indicate a key type such as but not limited to symmetric, asymmetric public, asymmetric private and passphrase. In some embodiments of a Nut, a user may specify any type of key that may have a corresponding cipher methodology suitably modularized for NUTS integration. These key cipher methodologies may include fingerprint scans, iris scans, palm prints, voice prints, handwriting patterns, facial recognition, DNA characteristics, physical key devices, hardware secured keys, software/hardware based Zero Knowledge Protocol keys and/or NFC keys. If an asymmetric private key is inserted such as may be used in RSA-2048, it may represent both the public and private portions, the public portion may be extracted from the private portion and may be used to encrypt the primary key's Encrypted Key Map therefore the decrypt operation may require a private asymmetric key to be presented. As plainly shown for one key (→) inserted into one keyhole 6402, its Encrypted Key Map 6412 may be decrypted using the key type cipher methodology to reveal the Key Map structure 6430 which may contain three distinct sets of keys 6432, 6434 and 6436. This decryption step may be done for each key 6404 and 6406 to produce the respective corresponding key map sets 6440 and 6450. Each decryption step may also be equivalent to unraveling an SDFT folded structure for such embodiments. For a passphrase key type, the key may be the passphrase and the key attributes may indicate the passphrase derivation function to use and the appropriate parameters for the function comprising the number of iterations to perform to produce the symmetric key that may decrypt the Encrypted Key Map. For embodiments utilizing SDFT, such passphrase attributes may also be matched up with a corresponding TAR to access the appropriate derive transmutations with matching attributes. To put the example into perspective with the Lock Node diagram 6000, the Input section 6006 may contain the Primary Keyhole 6400, the Encrypted Key Maps 6010 may be represented by 6410 and Key Maps 6008 section may be represented by 6420.

Variable Locks

The next part of the Lock Node may be the Variable Lock as shown in element 6012 of FIG. 60. The Variable Lock may be the locking mechanism that may help protect the contents of the Lock Node stored in the Bag 6024. The Variable Lock may allow a Lock Node to utilize any one of several different types of cryptographic locking techniques familiar to a person having ordinary skill in the art. For example, these different lock types may comprise an ORLOCK, MATLOCK, XORLOCK, HASHLOCK and/or SSLOCK. This may be accomplished by normalizing the inputs and/or outputs of each locking method to fit into a common data flow model thereby each locking method may be replaced with one another seamlessly. Similarly, the Primary Keyhole and the Key Map structures may act as data normalizers for the number of keys and key types flowing into a Variable Lock. A Lock Node may be imprinted with a set of parameters 6002 indicating what type of Variable Lock it may be implementing 6030. Once this value is set, a Lock Node may rarely change this setting although it may be possible to rekey and/or reset Lock Nodes by the RAT (owner of the Nut). The SDFT library describes an embodiment of Variable Locks as listed in FIG. 30 and its accompanying specification which may be used in this section for convenience but the use of the Lock Transmutation is not a necessary requirement to fulfill this functionality of a Lock Node.

Figure 65:
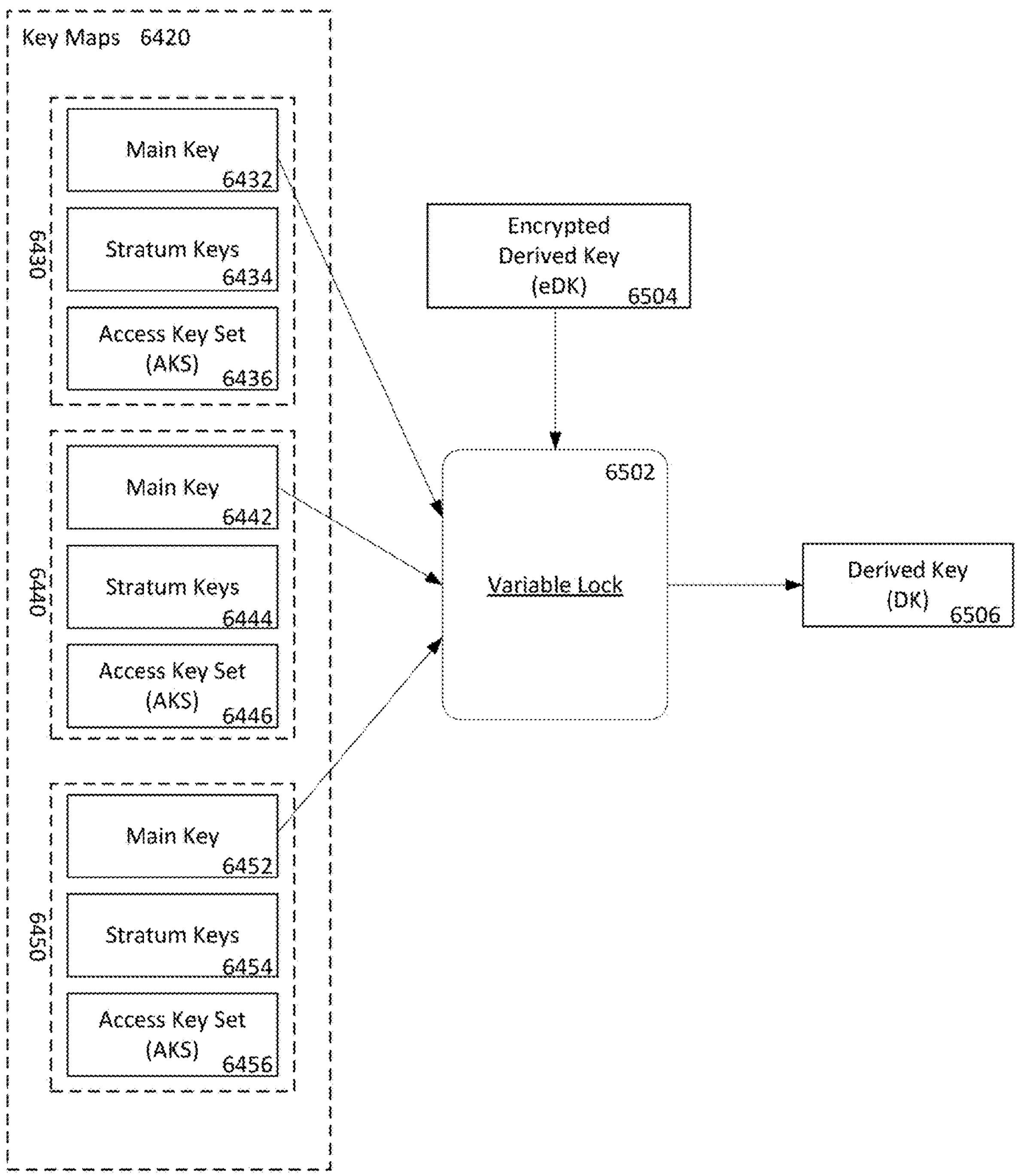
FIG. 65 shows a data flow diagram of a Variable Lock decrypt operation continuing from the example shown in FIG. 64.
Figure 66:
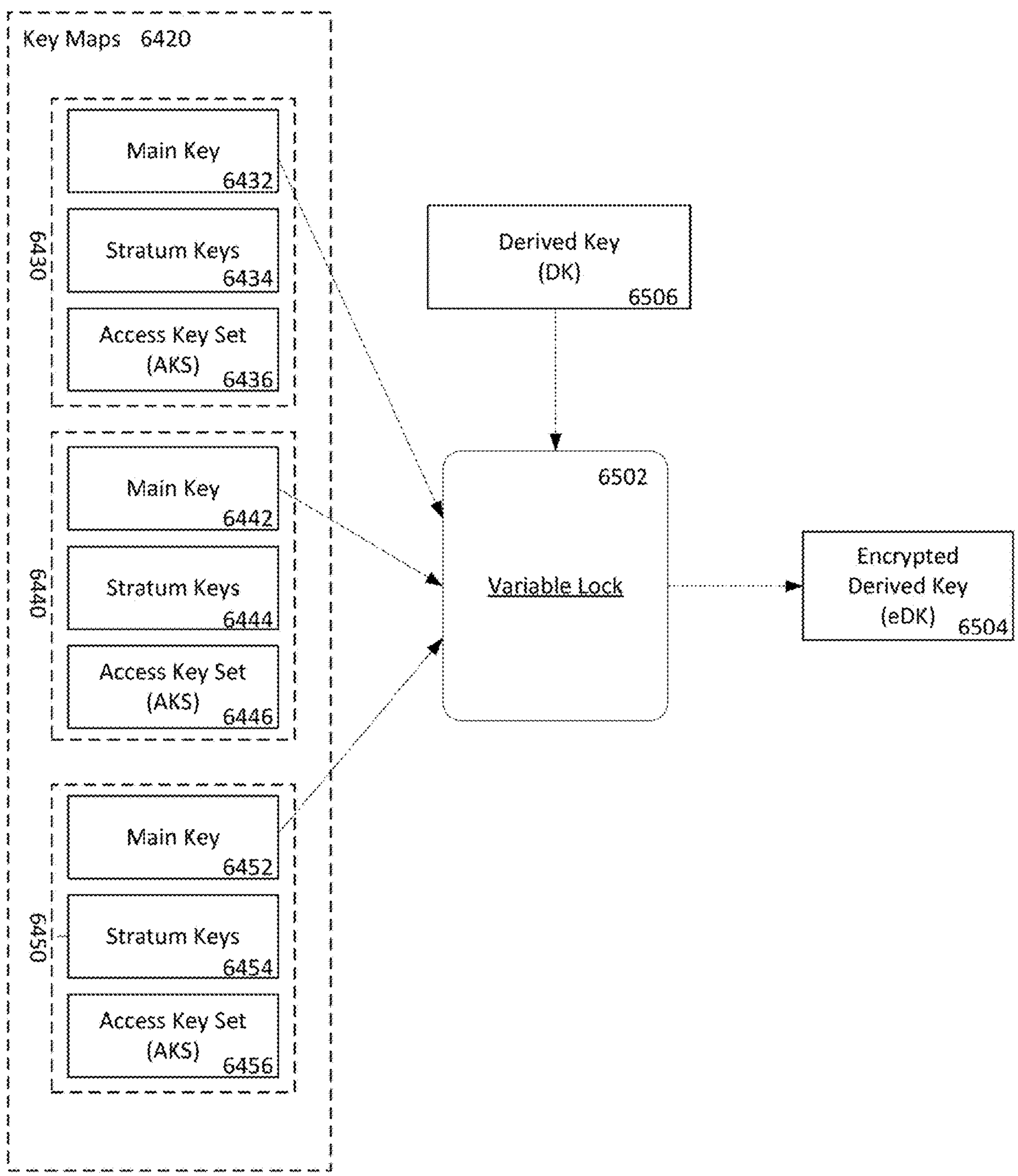
FIG. 66 shows a data flow diagram of a Variable Lock encrypt operation continuing from the example shown in FIG. 64.

Continuing the traversal of the Lock Node in FIG. 64 where we ended up with three Main Keys 6432, 6442 and 6452. We may explore how its Variable Lock may operate in FIG. 65. The Variable Lock 6502 may protect a Derived Key (DK) 6506 by encrypting it as the Encrypted Derived Key (eDK) 6504. Some or all Main Keys 6432, 6442 and 6452 may be symmetric or tine key types and may feed into the Variable Lock 6502. Depending on the Variable Lock type which may be specified in the Lock Node Parameters section 6002 and 6030, the appropriate Variable Lock function may be called to perform the cipher/decipher operation on the DK or eDK. FIG. 65 shows a decryption operation of eDK 6504 into DK 6506 by the Variable Lock 6502 which may use the Main Keys 6432, 6442 and 6452. FIG. 66 shows an encryption operation of DK 6506 into eDK 6504 by the Variable Lock 6502 using the Main Keys 6432, 6442 and 6452. In an embodiment using SDFT, the DK may be data that is protected by a TAR employing a Lock Transmutation by a data folding; therefore, unfolding such a structure reveals the Derived Key contained within.

The table in FIG. 67 summarizes some of the key characteristics the Variable Locks mentioned. As the term Variable Lock may imply, any locking technique that may be normalized into this model may be added as an additional Variable Lock type. Alternatively, any locking technique may be excluded. The table in FIG. 30 may correspond to the table in FIG. 67 and shows how SDFT may embody the Variable Lock designs in its Lock Transmutations.

The metadata section 6030 of the Lock Node may be a common component that may be involved in some or all Variable Locks. There may be various digns (digital signatures) of Lock Node sections which may have been created by an appropriate Access Role Key (ARK) such as 6040-6048 (forward reference). Some of all of these digns may be created by a Nut owner who may be anyone holding a Root Access Tier (RAT) Access Role Key in particular the RAT private key through its AKS. Everyone with a valid Primary Key may have a RAT public key that may enable them to authenticate various RAT digns throughout the Lock Node to make sure the Nut components may not have been compromised. In the diagrams, sometimes the RAT public key may be referred to as the RAT Reader key and the private key may be referred to as the RAT Writer key. Later in this document, further discussions concerning the Nut Access Control layer may explore, specify and/or clarify these features in more depth. As previously mentioned in the section on SDFT and TARs, the digns of encrypted data may be part of a folded data structure's TAR specification which may embed the protected data, its dign and the TAR which created it. It plainly implies that a systematic use of SDFT within the Lock Node may be advantageous to the programmers workload.

Figure 68:
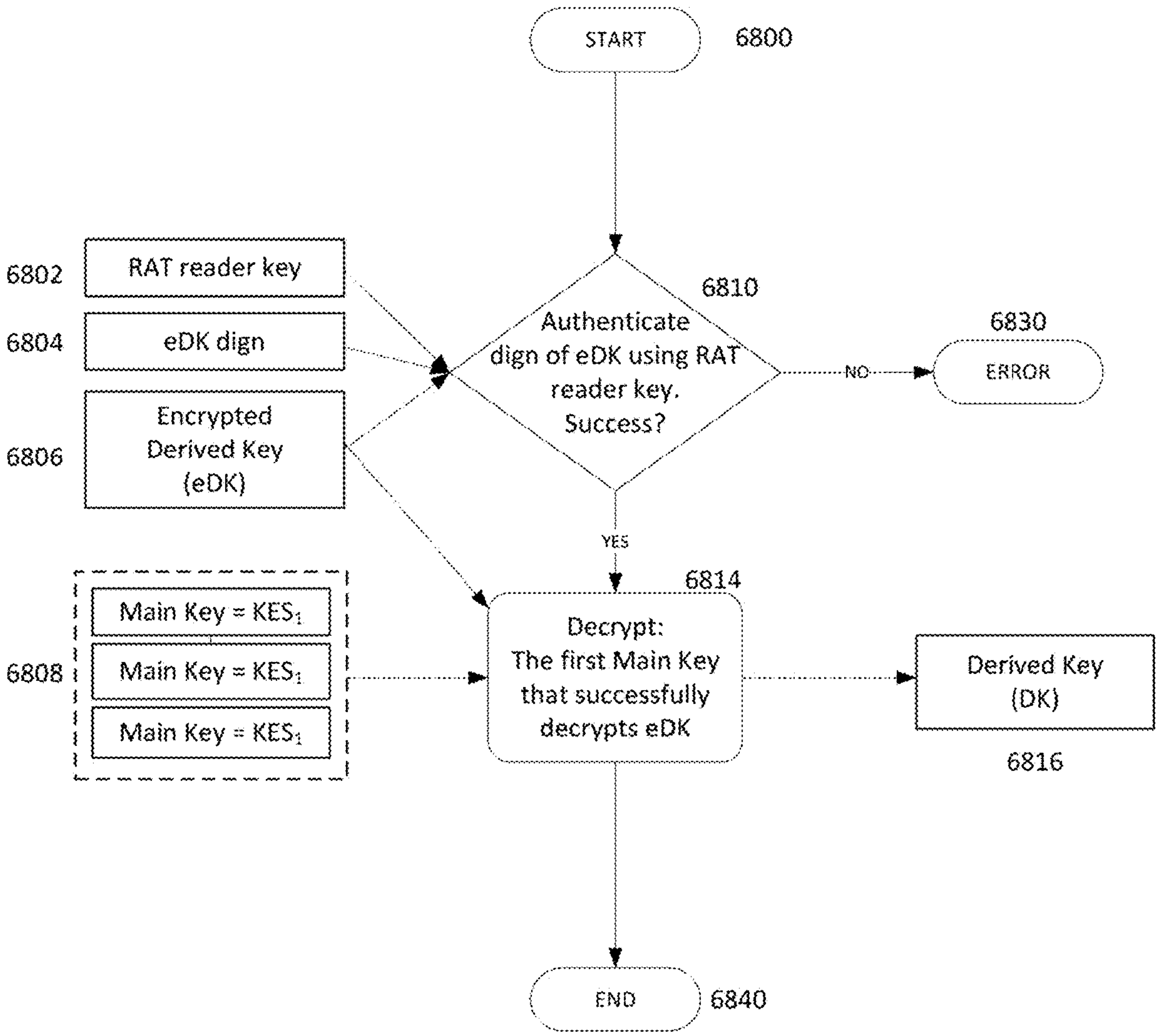
FIG. 68 shows a data flow diagram of an ORLOCK decryption operation.

An ORLOCK in FIG. 68, also known as an OR lock, is a Variable Lock that may accept any number of symmetric cipher keys called Main keys 6808 and may systematically attempt to decrypt 6814 the eDK 6806 using a symmetric cryptographic cipher such as AES-256 or alternative cipher. The Parameter section 6002 may indicate the cipher method to use for this logical operation or the preferred TAR when using SDFT methods. The first successful decryption of the eDK may produce the Derived Key (DK) 6816 and may result in the successful unlocking of the ORLOCK. Prior to a decryption attempt in any Variable Lock, the dign of the eDK 6804 may be authenticated using the eDK 6806 and the RAT Reader key 6802. If the authentication is successful 6810, then the decryption process may continue, otherwise an error 6830 may be raised and the attempt may be halted. The Main Keys 6808 may be identical keys such as but not limited to symmetric 256-bit keys. In this arrangement, the essence of an OR lock may be isolated and normalized into Keyhole and Variable Lock structures to make it modular. In a folded structure, the authentication step may be part of the TAR and may be implicitly attempted by the act of unraveling.

Figure 69:
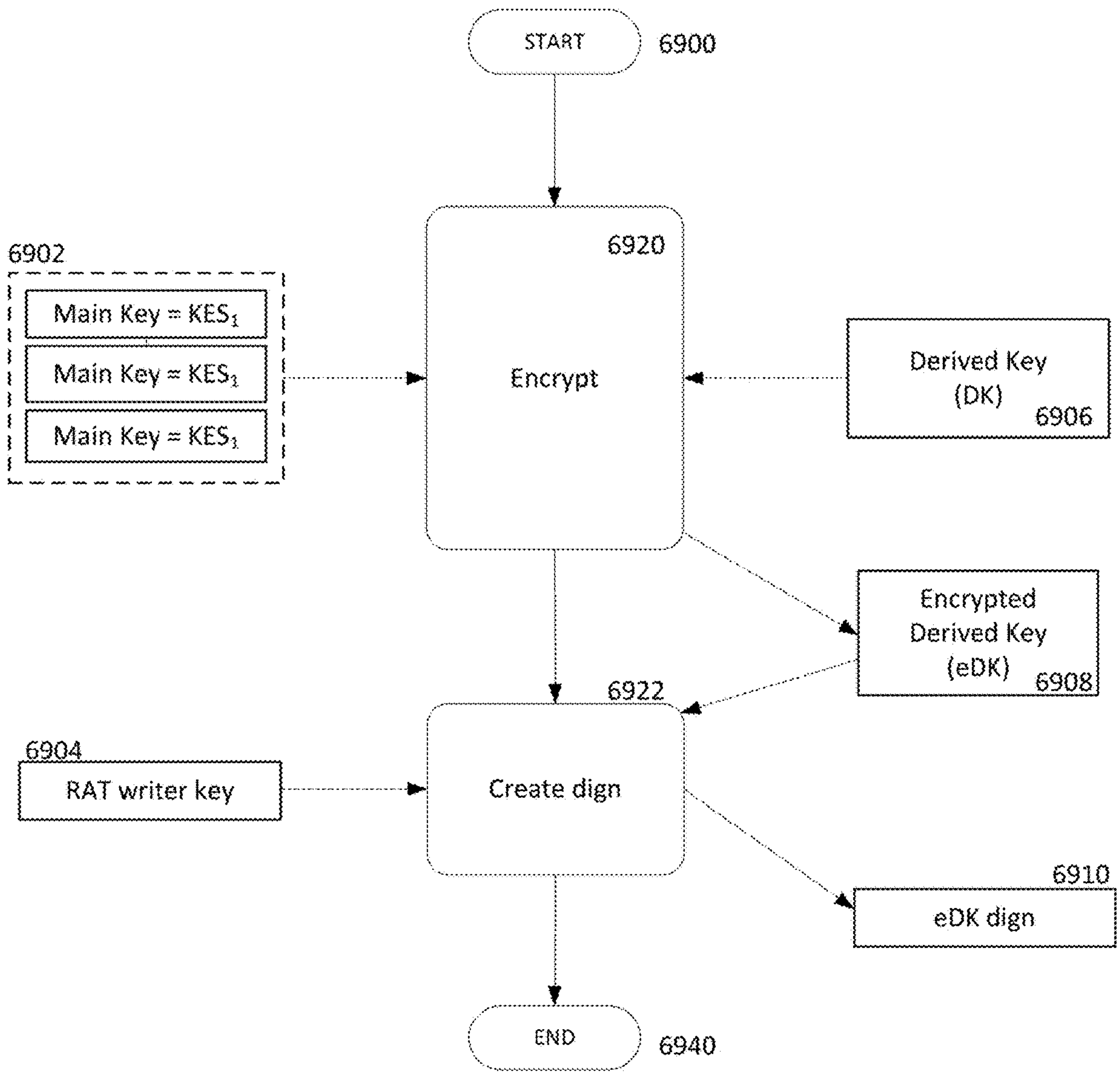
FIG. 69 shows a data flow diagram of an ORLOCK encryption operation by a Nut owner.

FIG. 69 depicts the encryption operation of an ORLOCK from the viewpoint of a RAT Writer or Nut owner. It may take any Main Key 6902 and may perform an encryption operation 6920 on DK 6906 using an appropriate cipher to produce an eDK 6908. Then using its RAT Writer key 6904, eDK 6908 and an appropriate digning algorithm 6922, it may create a dign of eDK 6910 which may be stored in the Lock Node parameters section 6044. SDFT methods may fold many of these attributes in a compact way along with the eDK into a single data object to be stored in the Parameters section. The encryption process for non-RAT members of a Lock Node may be simple; they may either erase the application memory contents of the Lock Node since they may not create an authentic dign on anything implying they may not successfully change its contents and dign it, or they may use the already decrypted DK 6908 and they may encrypt the relevant contents of the Lock Node but may leave the eDK 6910 untouched since nothing may be changed that may be relevant to the eDK dign. This may show that only RAT Writers may be able to replace the value of the DK 6906 or rekey it. When using SDFT methods, non-RAT members of a Lock Node may opt to leave the original folded data containing the eDK in the Parameters section and erase the unfolded structure holding the DK.

Figure 70:
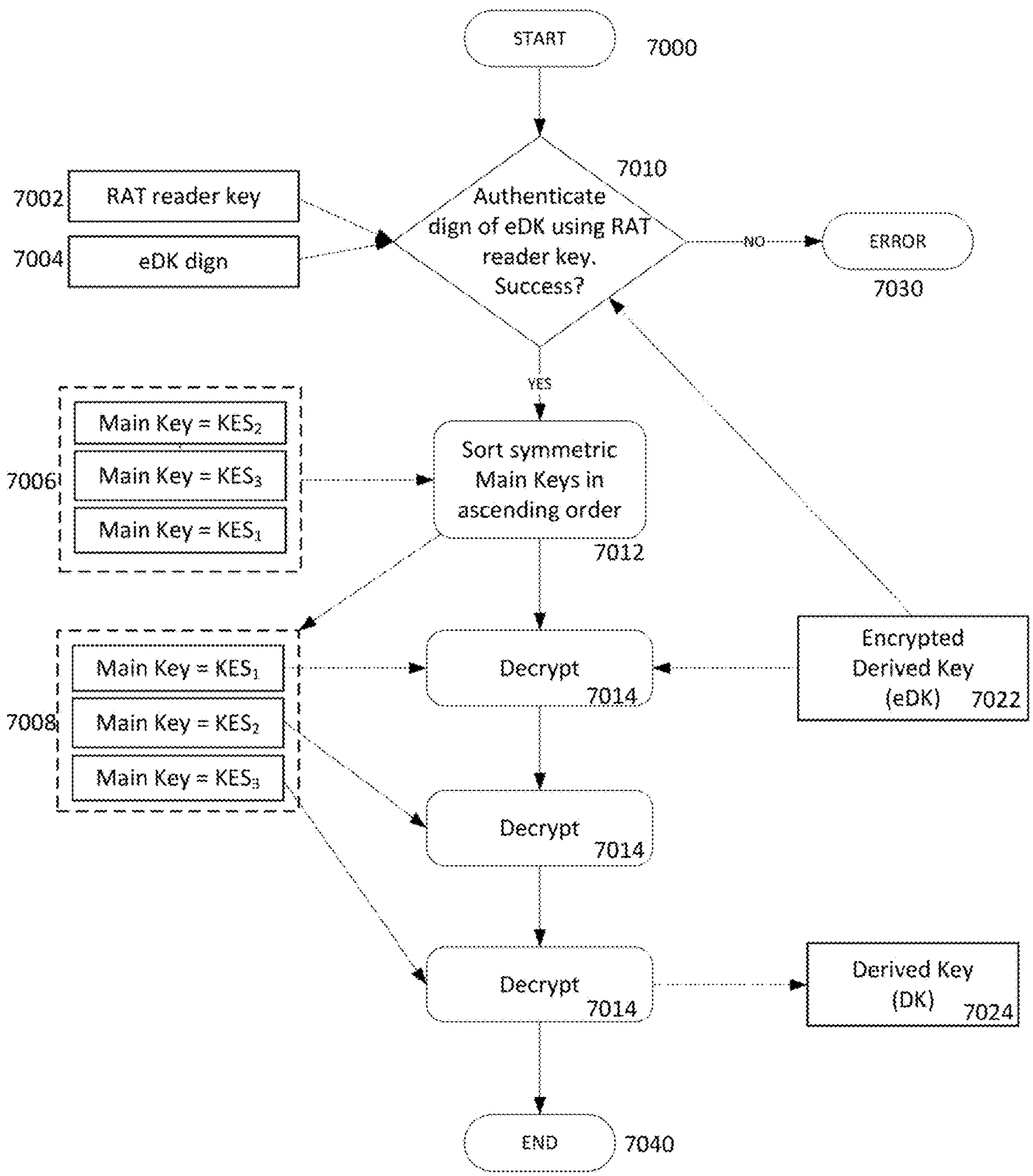
FIG. 70 shows a data flow diagram of a MATLOCK decryption operation.

A MATLOCK in FIG. 70, also known as a matroyshka lock, cascade lock or AND lock, is a Variable Lock that may accept a fixed number of symmetric cipher keys called Main keys 7006 and may successively decrypt the eDK 7022 using each Main key 7008 in ascending order using an appropriate cryptographic cipher 7014 such as AES-256 or alternative cipher. The Parameter section may indicate the exact cipher to use for this logical operation and the number of Main keys that may be required, or the preferred TAR when using SDFT methods. The successful ordered iterative decryptions of the eDK 7022 may produce the DK 7024 and may result in the successful unlocking of the MATLOCK. Prior to a decryption attempt in any Variable Lock, the dign of the eDK 7004 may be authenticated using the eDK 7022 and the RAT Reader key 7002. If the authentication is successful 7010, then the decryption process may continue otherwise an error 7030 may be raised and the attempt may be halted. In this arrangement, the essence of a matroyshka lock may have been isolated and normalized into Keyhole and Variable Lock structures to make it modular. In a folded structure, the authentication step may be part of the TAR and may be implicitly attempted by the act of unraveling.

Figure 71:
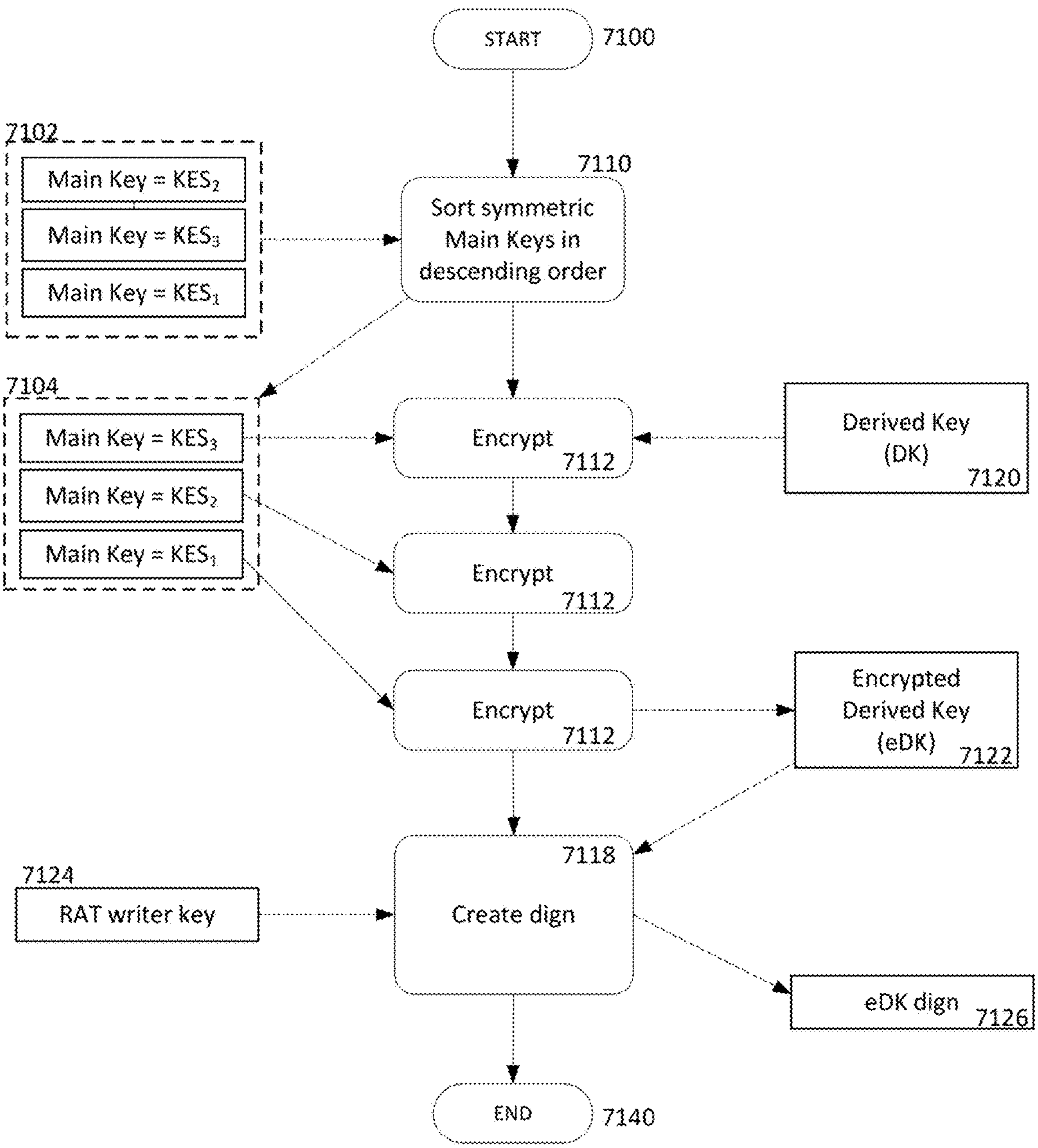
FIG. 71 shows a data flow diagram of a MATLOCK encryption operation by a Nut owner.

FIG. 71 depicts the encryption operation of a MATLOCK from the viewpoint of a RAT Writer or Nut owner. It may take some or all of the Main Keys 7102 presented and may sort them in descending order 7110. Then, it may iteratively perform encryption operations 7112 on DK 7120 using an appropriate cipher to produce an eDK 7122. Then using its RAT Writer key 7124, eDK 7122 and an appropriate digning algorithm 7118, it may create a dign of eDK 7126 which may be stored in the Lock Node Parameters section 6044. SDFT methods may fold many of these attributes in a compact way along with the eDK into a single data object to be stored in the Parameters section. The encryption process for non-RAT members of a Lock Node may be simple; they may either erase the application memory contents of the Lock Node since they may not create an authentic dign on anything implying they may not successfully change its contents and dign it, or they may use the already decrypted DK 7120 and they may encrypt the relevant contents of the Lock Node but may leave the eDK 7126 untouched since nothing may be changed that may be relevant to the eDK dign. This may show that only RAT Writers may be able to replace the value of the DK 7120 or rekey it. When using SDFT methods, non-RAT members of a Lock Node may opt to leave the original folded data containing the eDK in the Parameters section and erase the unfolded structure holding the DK.

Figure 72:
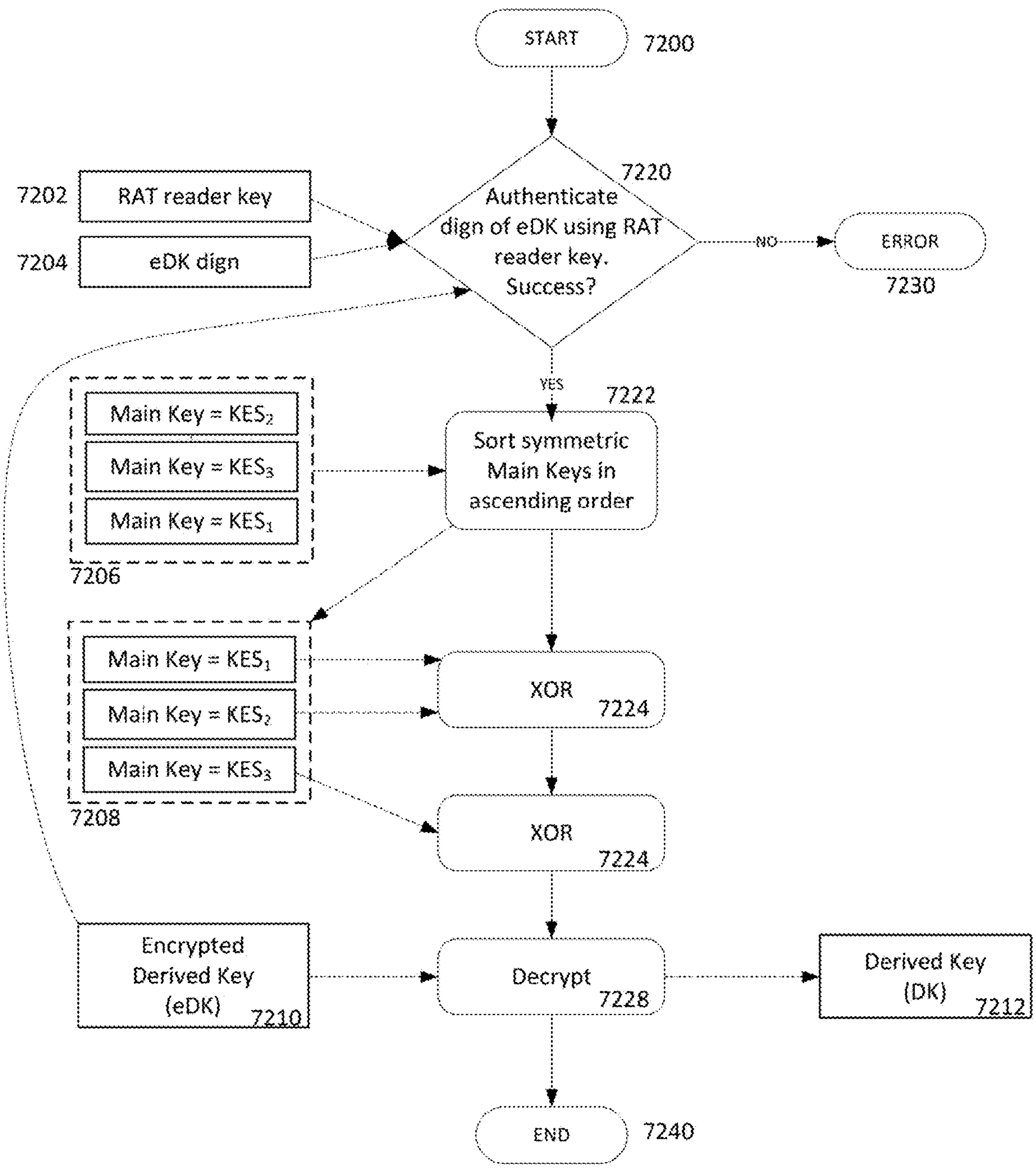
FIG. 72 shows a data flow diagram of an XORLOCK decryption operation.

A XORLOCK in FIG. 72, also known as a XOR lock, is a Variable Lock that may accept a fixed number (>1) of symmetric cipher keys called Main Keys 7206 and may produce a calculated key by successively applying XOR operations 7224 on each Main key 7208 in ascending order 7222. Then it may attempt to decrypt 7228 the eDK 7210 using the calculated key from 7224 with an appropriate cipher such as AES-256 or alternative cipher. The Parameter section 6030 may indicate the exact cipher to use for this logical operation and the number of Main Keys that may be needed which may be no less than two keys, or the preferred TAR when using SDFT methods. The successful decryption of eDK 7210 may produce DK 7212 and may result in the successful unlocking of the XORLOCK. Prior to a decryption attempt in any Variable Lock, the dign of the eDK 7204 may be authenticated using the eDK 7210 and the RAT Reader key 7202. If the authentication is successful 7220, then the decryption process may continue otherwise an error 7230 may be raised and the attempt may be halted. In this arrangement, the essence of an XOR lock may have been isolated and normalized into Keyhole and Variable Lock structures to make it modular. In a folded structure, the authentication step may be part of the TAR and may be implicitly attempted by the act of unraveling.

Figure 73:
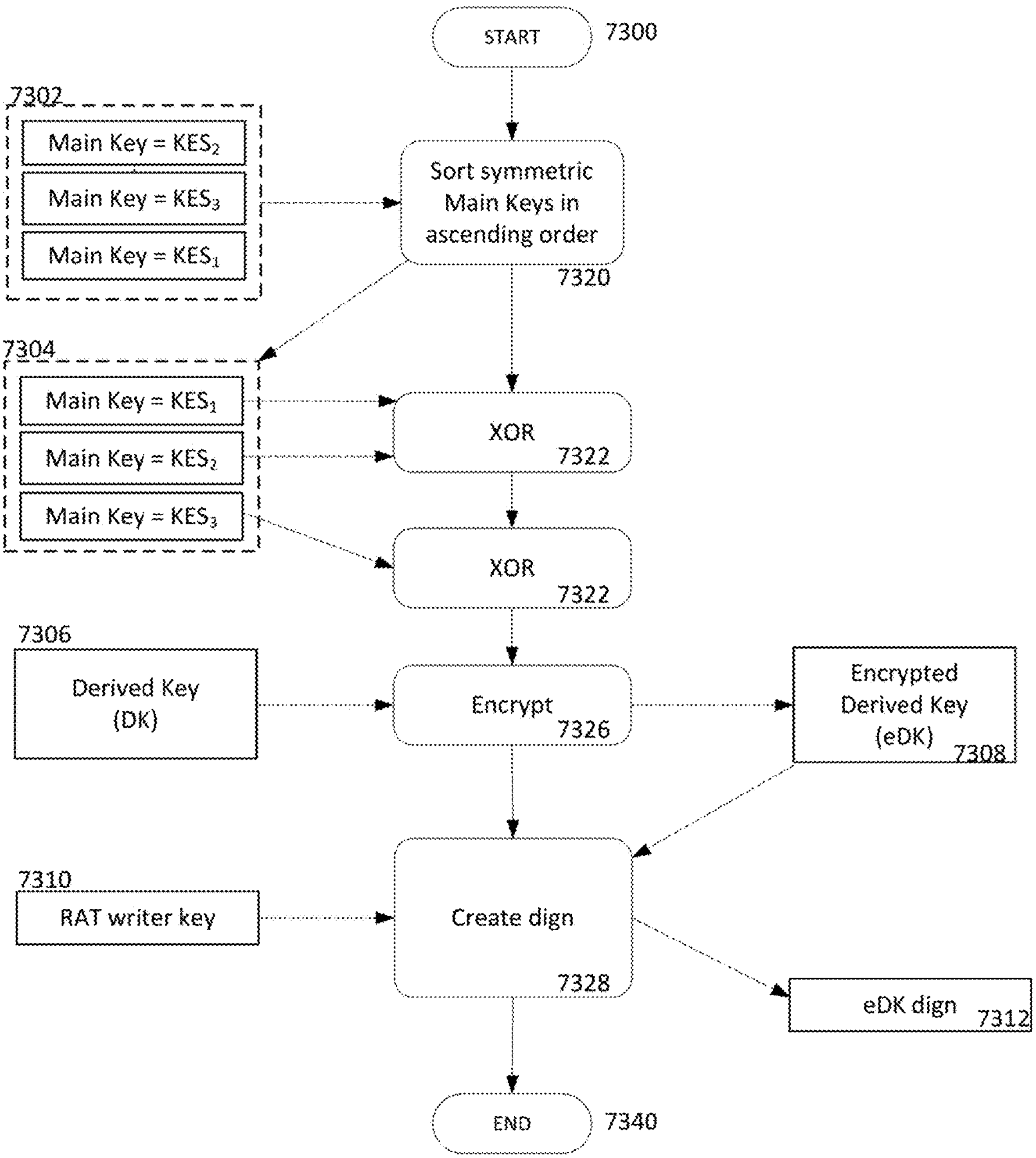
FIG. 73 shows a data flow diagram of an XORLOCK encryption operation by a Nut owner.

FIG. 73 depicts the encryption operation of a XORLOCK from the viewpoint of a RAT Writer or Nut owner. It may take some or all the Main Keys 7302 presented and may sort them in ascending order 7320. Then, it may iteratively perform XOR operations 7322 on the Main Keys 7304 to produce a calculated key which may be used to encrypt 7326 the DK 7306 to produce the eDK 7308. The RAT Writer key 7310, eDK 7308 and an appropriate dign algorithm 7328 may be used to create a dign of eDK 7312 which may be stored in the Lock Node parameters section 6044. SDFT methods may fold many of these attributes in a compact way along with the eDK into a single data object to be stored in the Parameters section. The encryption process for non-RAT members of a Lock Node may be simple; they may either erase the application memory contents of the Lock Node since they may not create an authentic dign on anything implying they may not successfully change its contents, or they may use the already decrypted DK 7306 and they may encrypt the relevant contents of the Lock Node but leave the eDK 7312 untouched since nothing may be changed that may be relevant to the eDK dign. This may show that only RAT Writers may be able to rekey the DK 7306. When using SDFT methods, non-RAT members of a Lock Node may opt to leave the original folded data containing the eDK in the Parameters section and erase the unfolded structure holding the DK.

Figure 74:
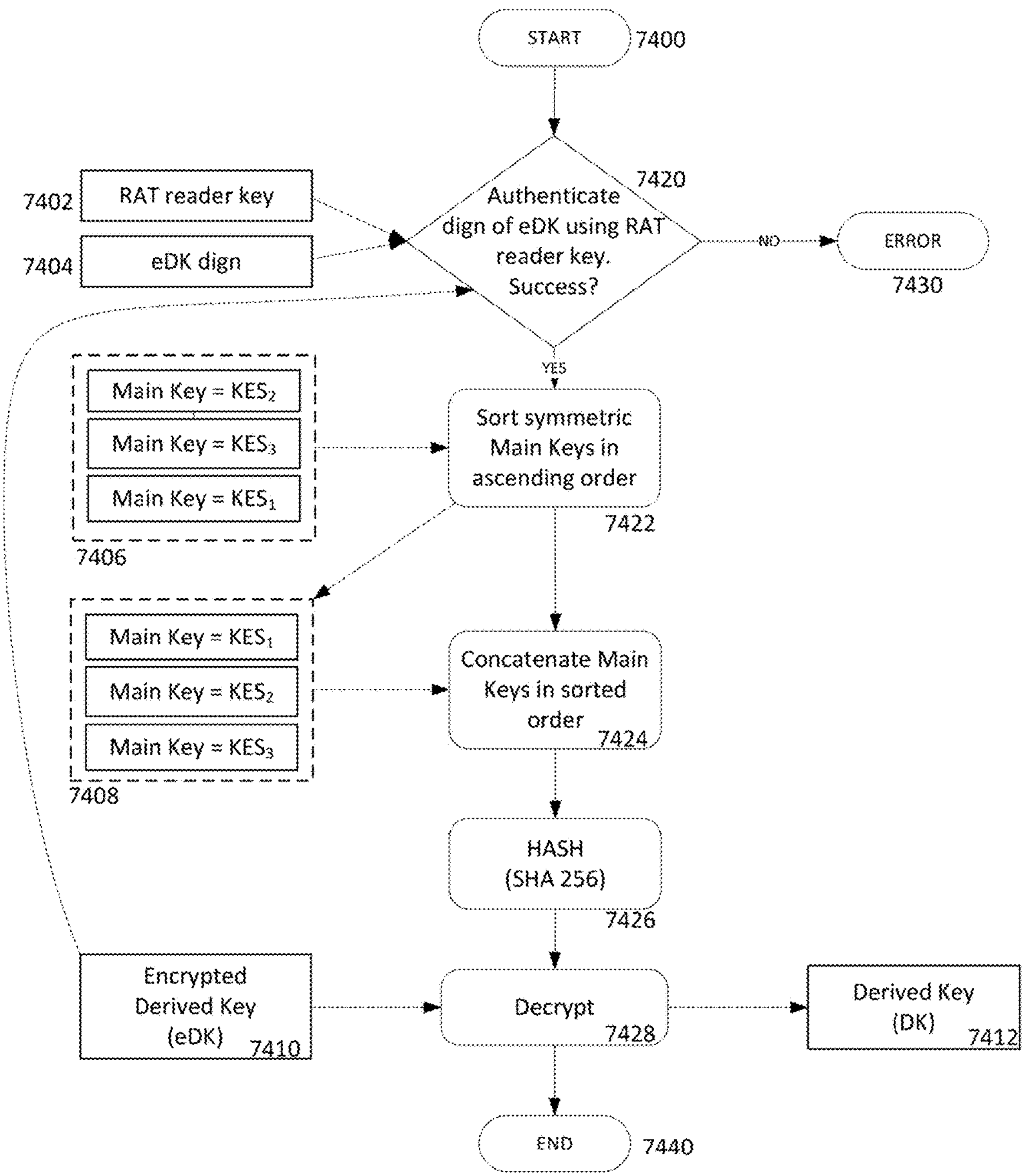
FIG. 74 shows a data flow diagram of an HASHLOCK decryption operation.

A HASHLOCK in FIG. 74, also known as a hash lock, is a Variable Lock that may accept a fixed number of symmetric cipher keys called Main Keys 7406 and may create a calculated key by concatenating 7424 some or all the Main Keys presented in a particular order 7422 and then it may apply a hashing algorithm 7426 on the string. Then it may attempt to decrypt 7428 the eDK 7410 using the calculated key with an appropriate cryptographic cipher such as AES-256 or alternative cipher. The Parameter section 6030 may indicate the exact cipher and hash to use for these logical operations, the number of Main Keys needed and/or the sorting order of the Main Keys, or the preferred TAR when using SDFT methods. The successful decryption of the eDK 7410 may produce DK 7412 and may result in the successful unlocking of the HASHLOCK. Prior to a decryption attempt in any Variable Lock, the dign of the eDK 7404 may be authenticated using the eDK 7410 and the RAT Reader key 7402. If the authentication is successful 7420, then the decryption process may continue otherwise an error 7430 may be raised and the attempt may be halted. In this arrangement, the essence of a hashing lock may have been isolated and normalized into Keyhole and Variable Lock structures to make it modular. In a folded structure, the authentication step may be part of the TAR and may be implicitly attempted by the act of unraveling.

Figure 75:
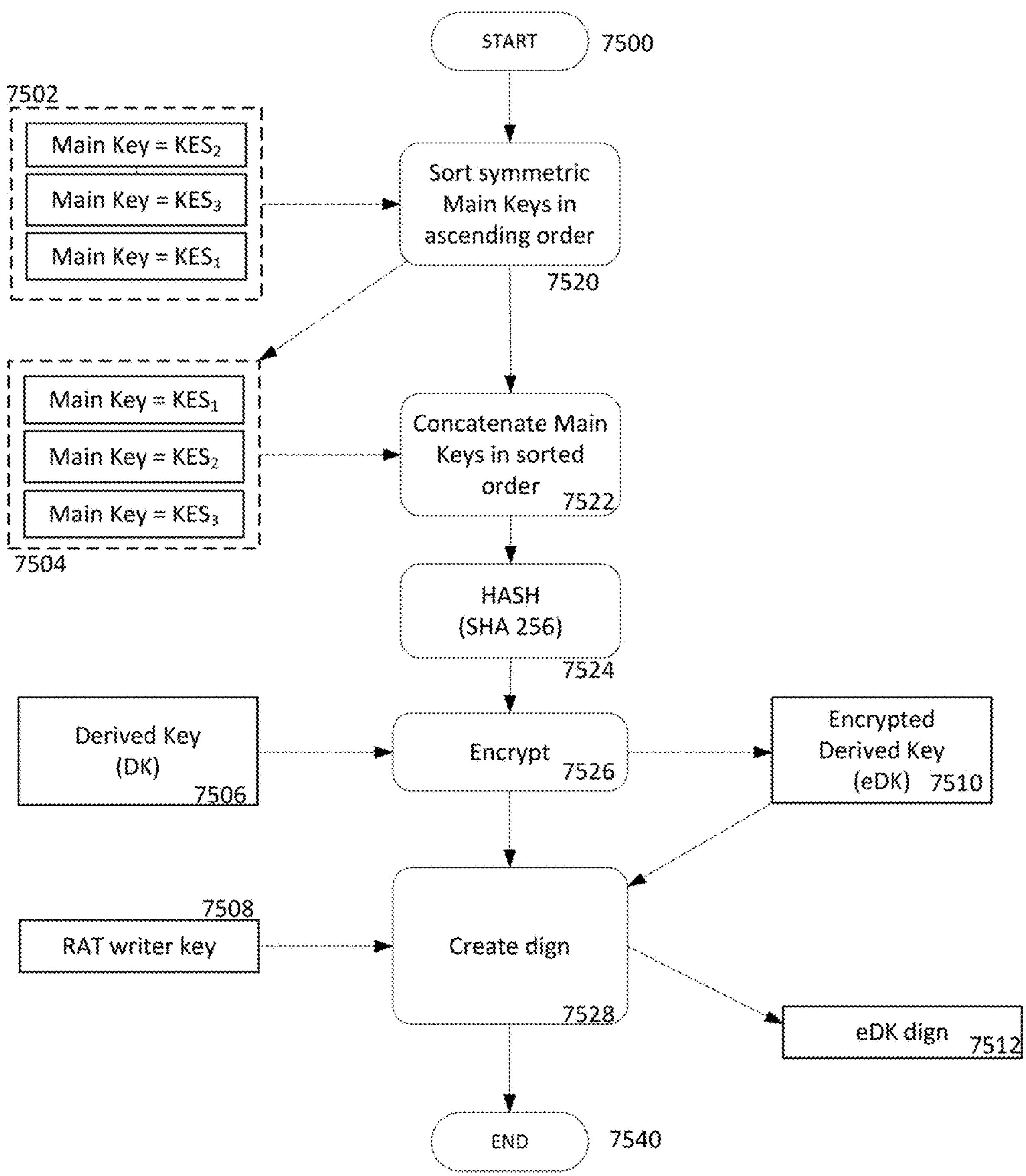
FIG. 75 shows a data flow diagram of an HASHLOCK encryption operation by a Nut owner.

FIG. 75 depicts the encryption operation of a HASHLOCK from the viewpoint of a RAT Writer or Nut owner. It may take the Main Keys 7502 presented and may sort them in ascending order 7520, then may concatenate them 7522 and then may produce a calculated key by performing a hash operation 7524 on it. This calculated key may be used to encrypt 7526 the DK 7506 and may produce the eDK 7510. The RAT Writer key 7508, eDK 7510 and an appropriate dign algorithm 7528 may be used to create a dign of eDK 7512 which may be stored in the Lock Node parameters section 6044. SDFT methods may fold many of these attributes in a compact way along with the eDK into a single data object to be stored in the Parameters section. The encryption process for non-RAT members of a Lock Node may be simple; they may either erase the application memory contents of the Lock Node since they may not create an authentic dign on anything implying they may not successfully change its contents, or they may use the already decrypted DK 7506 and they may encrypt the relevant contents of the Lock Node but leave the eDK 7512 untouched since nothing may be changed that may be relevant to the eDK dign. This may show that only RAT Writers may be able to rekey the DK 7506. When using SDFT methods, non-RAT members of a Lock Node may opt to leave the original folded data containing the eDK in the Parameters section and erase the unfolded structure holding the DK.

Figure 76:
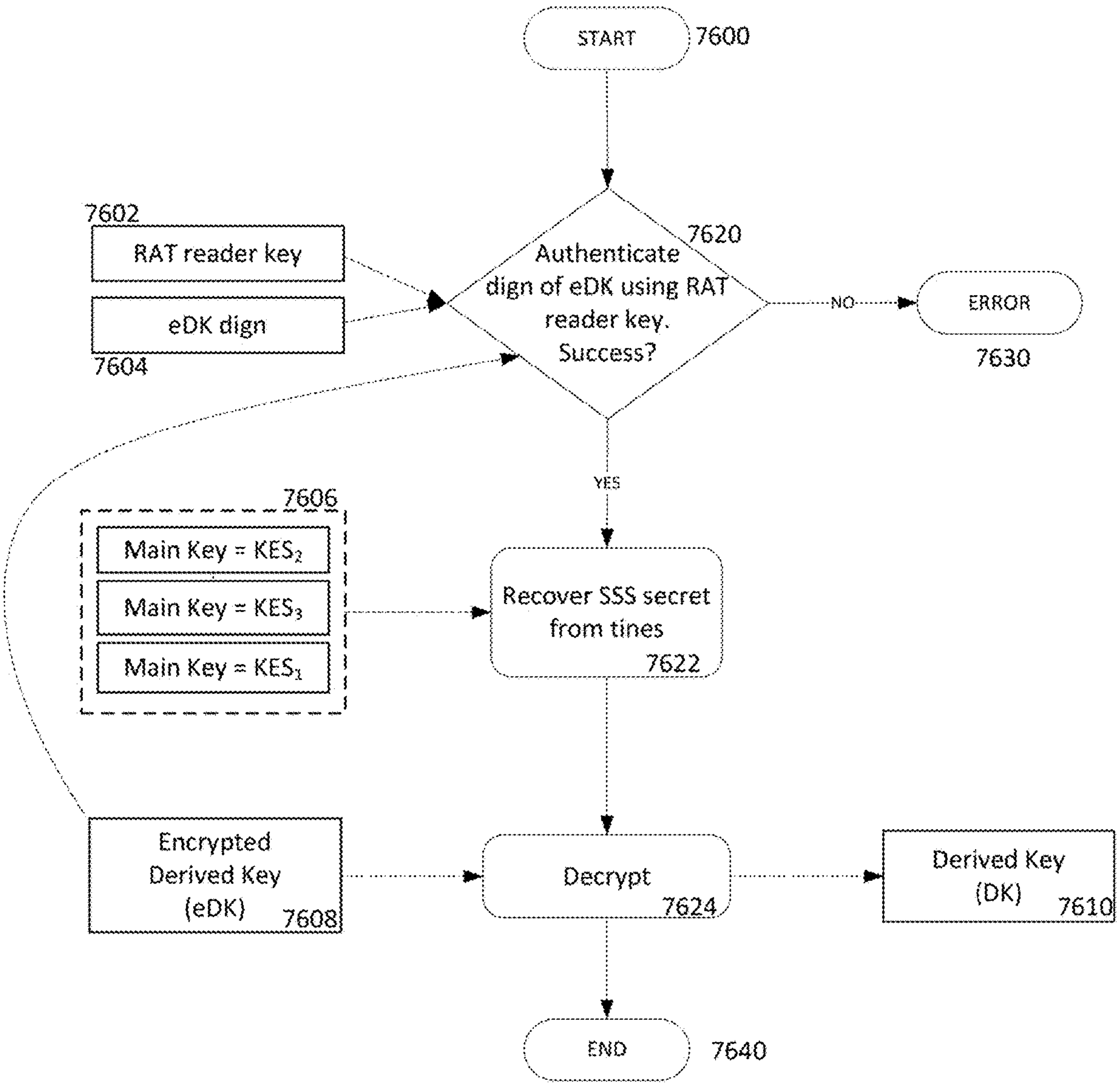
FIG. 76 shows a data flow diagram of a SSLOCK decryption operation.

A SSLOCK in FIG. 76, also known as a secret sharing lock or Shamir's secret sharing scheme, is a Variable Lock that may accept k of n Main keys 7606 each of which may be a distinct tine or secret sharing share and where 1>p+1≤k≤n and p+1 may be the minimum number of keys required called the threshold. To recover the secret key, some or all tines from the decrypted Key Maps 7606 may be provided to an appropriate secret sharing cipher 7622 such as Shamir's Secret Sharing Scheme or alternative cipher. The recovery may be successful if some or all the tines may be valid and there may be a sufficient number of them. Then it may attempt to decrypt 7624 the eDK 7608 using the recovered secret key with an appropriate cryptographic cipher such as AES-256 or alternative cipher. The Parameter section 6030 may indicate the exact ciphers to use for the secret sharing and ciphering operations as well as the number of shares (n) and threshold count (p+1) for the secret sharing cipher, and/or the preferred TAR when using SDFT methods. The successful decryption of eDK 7608 may produce DK 7610 and may result in the successful unlocking of the SSLOCK. Prior to a decryption attempt in any Variable Lock, the dign of the eDK 7604 may be authenticated using the eDK 7608 and the RAT reader key 7602. If the authentication is successful 7620, then the decryption process may continue otherwise an error 7630 may be raised and the attempt may be halted. In this arrangement, the essence of a secret sharing lock may have been isolated and normalized into Keyhole and Variable Lock structures to make it modular. In a folded structure, the authentication step may be part of the TAR and may be implicitly attempted by the act of unraveling.

Figure 77:
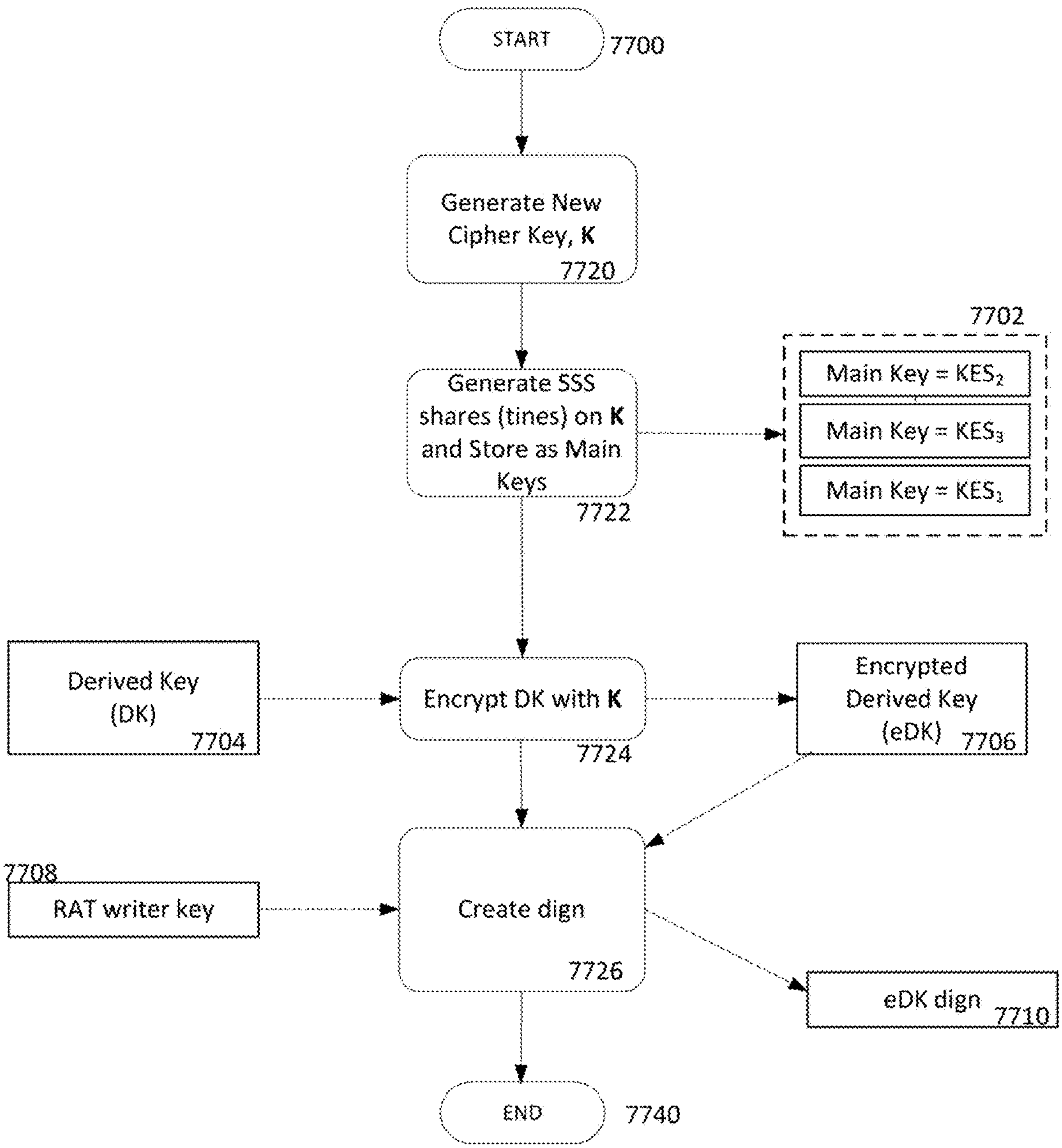
FIG. 77 shows a data flow diagram of a SSLOCK encryption operation by a Nut owner.

FIG. 77 depicts the encryption operation of a SSLOCK from the viewpoint of a RAT Writer or Nut owner who may be encrypting the Lock Node for the first time or who may be in the process of rekeying the Variable Lock. A new secret cipher key, K, may be generated 7720 and then the desired number of shares (tines) may be created from K using an appropriate secret sharing methodology which may be specified in the parameters 6030. These tines may be then stored as Main Keys 7702. In step 7724, the key K may encrypt DK 7704 producing eDK 7706. The RAT Writer key 7708, eDK 7706 and an appropriate dign algorithm 7726 may be used to create a dign of eDK 7710 which may be stored in the Lock Node parameters section 6044. SDFT methods may fold many of these attributes in a compact way along with the eDK into a single data object to be stored in the Parameters section. The encryption process for non-RAT members of a Lock Node may be simple; they may either erase the application memory contents of the Lock Node since they may not create an authentic dign on anything implying they may not successfully change its contents, or they may use the already decrypted DK 7704 and they may encrypt the relevant contents of the Lock Node but may leave the eDK 7706 untouched since nothing may be changed that may be relevant to the eDK dign. This may show that only RAT Writers may be able to rekey the DK 7704. When using SDFT methods, non-RAT members of a Lock Node may opt to leave the original folded data containing the eDK in the Parameters section and erase the unfolded structure holding the DK.

The descriptions of the Variable Locks and the illustrations of their various logical operations may show how a Lock Node may employ Primary Keyholes 6102 in the Input Section 6006, Encrypted Key Maps 6010, Key Maps 6008, Variable Locks 6012, Encrypted Derived Keys 6014 and/or Derived Keys 6016 to create a robust data structure that may allow for different locking techniques to be normalized and modularized so that substituting one for another may require some parameter 6030 changes and/or rekeying. The normalization of the different locking methods may assure that user Primary Keys for the Nut may be untouched and that a single user Primary Key may be employed in many different locking techniques in different Nuts unbeknownst to the user and which locking techniques may be deemed appropriate for the protection of the particular Nut payload. Sections were highlighted where SDFT methods may prove advantageous in the embodiment of some of these complex data structures. Here are some examples. An ORLOCK may allow multiple users to gain access to the Lock Node's Bag: this may be a form of group access or one of the keys may represent a master key. A MATLOCK, XORLOCK or HASHLOCK may assure that a certain number of keys may be present in order to unravel its Bag: a sensitive corporate secret may require two specific senior executives to supply their respective secret keys to view its contents. An SSLOCK may require a minimum number of secret keys may be present in order to gain access into its Bag: a corporate payment system may be accessed by a minimum number of authorized personnel but it may not be operated alone.

By compartmentalizing each Primary Keyhole with its corresponding Key Map, the Key Map may contain attributes for the Primary Key such as but not limited to expiration date/time, countdown timer and/or expiration action. If any of the expiration attributes have been set off, then a corresponding expiration action may be set to be performed upon Primary Key expiration. For example, a typical expiration action may be to delete the Key Map of the Primary Key. The deletion of a Key Map may not interfere with any other registered Primary Keys of the Keyhole Lock Node due to its compartmentalized design. Reinserting the expired Primary Key may no longer be recognized as a valid key because there may be no matching Key Map for it. Of course, such Primary Key deletions should be done carefully in regard to the type of Variable Lock being employed: deletions may be acceptable for ORLOCKs and some SSLOCKs but it may be counterproductive to MATLOCKs, XORLOCKs and HASHLOCKs since it may create a lock-out situation for that Lock Node.

The interplay of complex data structures which may utilize a plurality of cryptographic techniques for the purpose of protecting its contents in a variety of ways and layers may pose significant challenges in the implementation details due to the unusually large number of variable attributes required and/or produced per cryptographic operation. It is in such circumstances where the utility and elegance of SDFT shines and may provide convenient organizing methods and structures to assist in overcoming such implementation challenges. For instance, a single authenticated ciphering of data may require the following attributes to be stored somewhere: key type, key length, cipher type, cipher mode, initialization vector, key ID, padding, padding type, padding length, block length, digital signature or keyed MAC string (digest), matching key ID for digest, digest length, digest key length, digest method. Multiply this by each ciphering operation described in the Lock Node specification thus far presented (the Lock Node has several more components to be discussed in later sections) and it may be an enormous number of attributes to keep track of. In many instances, application programmers and designers may be aware of such quandaries and challenges and may opt to simplify the coding process by selecting a handful of ciphering methods and associated attribute values and using them throughout their implementation in a global fashion. Such simplifications may lead to undesirable consequences such as but not limited to less security, less flexibility, less features, more incompatibilities, and computer code that may be harder to maintain or modify.

Stratum

Figure 78:
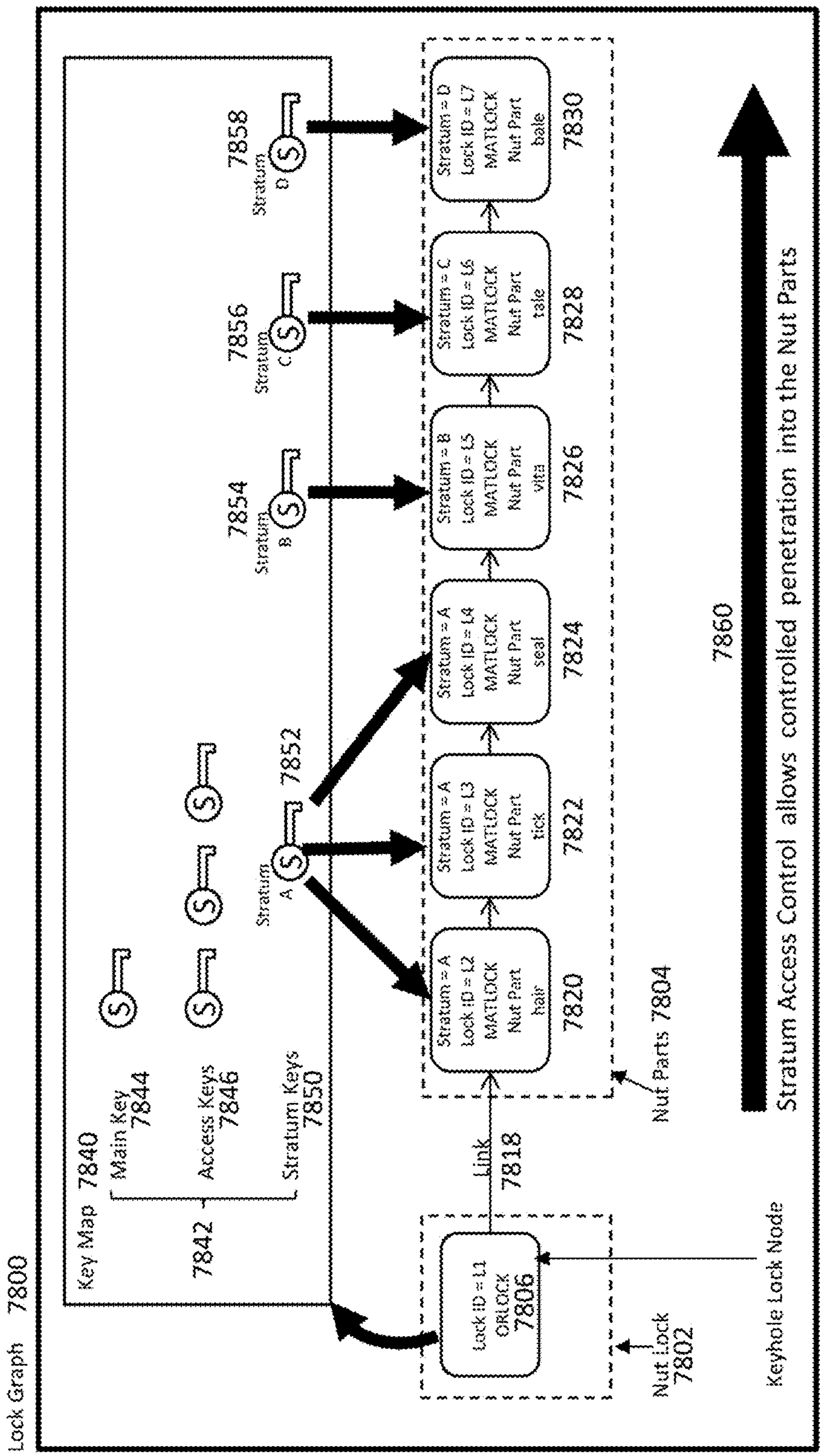
FIG. 78 shows a block diagram of a Nut highlighting Stratum Keys.

FIG. 78 shows a block diagram of a Nut (Lock Graph) 7800 highlighting Stratum key usage. Each Lock Node in the Nut Parts 7804 section may be assigned a stratum ID. Lock Nodes 7820-7824 are stratum ID 'A', Lock Node 7826 is stratum ID 'B', Lock Node 7828 is stratum ID 'C' and Lock Node 7830 is stratum ID 'D'. The designation of strata may be arbitrary but may follow a pattern of grouping together various Nut Parts by privacy sensitivity: the deeper the stratum, the more sensitive the data contained in the Lock Node may be. By the precise use of Stratum Access Controls (SAC), one may implement a Gradient Opacity of a Nut. For illustrative purposes, the stratum IDs depicted in FIG. 78 are simple letters but in practice may be any set of identifiable strings such as but not limited to Nut IDs (as in the practically unique ID from FIG. 55).

Figure 79:
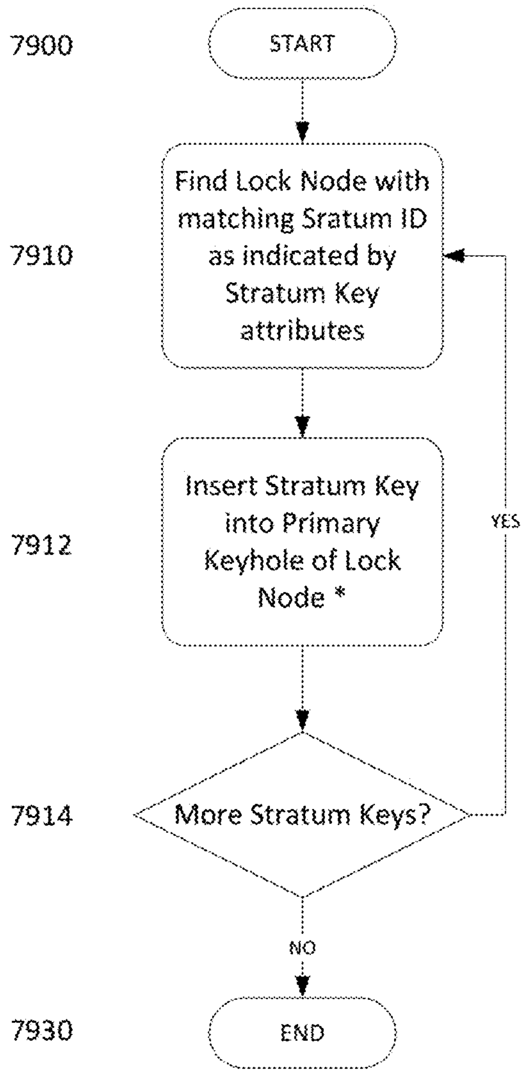
FIG. 79 shows a flowchart of how a Stratum Key may be inserted within a Nut.

Any Lock Nodes comprising the Nut Lock 7802 may be assigned a stratum. When the Keyhole Lock Node of the Nut 7806 is properly unlocked or unraveled, it may reveal a Key Map 7840 which may comprise up to three key sets 7842 (similar to FIG. 62). This section may concentrate on the Stratum Keys 7850 (6212) and how they may function within a Lock Graph. In this example, we may find four stratum keys 7852, 7854, 7856, 7858 which may correspond to stratums 'A,B,C,D' respectively. Each stratum key may be stored in the Stratum Keys 7850 section with the associated stratum ID. We may follow the flowchart presented in FIG. 79 that shows how each stratum key may be used. Once some or all the stratum keys may have been inserted into the Primary Keyholes of their matching Lock Nodes, the process may be finished and we may wait for the traversal of the Lock Graph to continue beyond the Nut Lock section 7802.

The Stratum Keys may work in conjunction with a MATLOCK Variable Lock as shown in some or all the Lock Nodes in the Nut Parts 7804 section. When using SDFT methods, a MATLOCK may be indicated by a 'lock matlock' transmutation in the preferred TAR of the section involved. Each Stratum Key may be a mandatory key in a MATLOCK for the Lock Node in question (* in FIG. 79). If either the Lock Node Output linking key or the Stratum key may be missing, then the particular Lock Node may not be unlocked as per definition of a MATLOCK. Therefore, some or all deeper strata beyond that level may not be opened as well. By controlling which Stratum Keys may be stored in a Key Map 7840 of the Primary Key, the Nut owner may explicitly control how far someone may penetrate the Lock Graph 7860 with precision. The Stratum Access Control layer may work independently from the Nut Access Control layer and it may work in conjunction with the Variable Locks method.

The methods by which SAC and Keyholes may work may imply that if multiple keys may be presented into a Keyhole Lock Node such as 7806, there may be multiple Key Maps 7840 being revealed and possibly multiple Stratum Key sets 7850 that may get inserted into the various Lock Nodes. The stratum keys of a single stratum ID may be identical keys, thus inserting the same key into a Lock Node that may utilize a MATLOCK may result in one key being inserted under that ID, basically the same key may be overwritten several times in the keyhole. This may be an additive access attribute property of Stratum Keys.

The Stratum Keys and Nut Access Control (discussed in the next section) both may exhibit an Additive Access Attribute property or characteristic. The insertion of Primary Keys of differing access levels into the Primary Keyhole of a Lock Graph may result in the access level of the Lock Graph that may represent the combination or union of the access levels of all the valid inserted Primary Keys. One powerful use of this property may be in the distribution of keys for a given Lock Graph in a segmented fashion where a combination of Primary Keys may be needed in order to gain a very specific level of access into the Lock Graph. This may contrast with a mode of operation where a Primary Key may present the complete picture of given access for that key holder.

Nut Access Control

Nut Access Control or NAC is an access control method using cryptographic data structures that may work independently from Variable Locks and Stratum Access Control. NAC may use a combination of Role Based Access Control (RBAC) and Cryptographic Access Control (CAC) which we may refer to as Role Based Cryptographic Access Control (RBCAC) or Key Based Permissions (KBP). NAC attribute key sets may be localized to a single Lock Node's internals, however, there may be mechanisms in a Lock Node to propagate the NAC attributes along the rest of the Lock Graph which may allow the key holder a consistent level of accessibility throughout the associated Lock Nodes. These NAC attributes may be found in an unlocked or unraveled Keyhole Lock Node for the Primary Key which may have been inserted from an external source. Similar to the Stratum Keys, NAC keys may exhibit an additive access attribute property.

KBP may be deployed using well known properties of Public-key cryptography such as creating digital signatures (dign) and authenticating them asymmetrically on a string of data using algorithms such as RSASSA-PSS (RSA probabilistic signature scheme with appendix based on the Probabilistic Signature Scheme originally invented by Bellare and Rogaway) or alternative algorithm. The basic premise of KBP may be that given a private/public key pair, the private key holder (writer) may create a digital signature (dign) on a parcel of data using the writer's private key and then the public key holder (reader) may use the writer's public key possessed by the reader to authenticate that the dign was created by the writer on the parcel of data. If the authentication fails then something may have been compromised such as the public key, the parcel of data or the dign or some or all of them. The writer may be responsible for creating an updated dign on the target data parcel upon every modification of it and the reader may be responsible for authenticating the dign and the target data parcel prior to "reading" or decrypting the data parcel. This process may reasonably assure the reader that he may be reading something that may have been created or modified by someone who may have the counterpart private key (writer). In Role Based Cryptographic Access Control (RBCAC), there may be an asymmetric key pair for each defined access role and the "writer" of the role may get the private part of the key and the "reader" of the role may get the respective public part of the key. By segregating the dataset by function and digning each functional dataset using different key pairs, access roles may be precisely defined and may be assigned to various key holders by distributing the appropriate key parts. NUTS' RBCAC may allow for the coupling of one or more symmetric keys with the defined role's asymmetric key pair to provide an additional layer of control over the target dataset. The holders of a coupled symmetric key may decrypt and read the target dataset for that role. This coupled symmetric key may encrypt the target dataset on top of the encryption by the symmetric key revealed by the unlocking of the Variable Lock and the subsequent keys in the eKS. Alternatively, the existence of a coupled symmetric key may override the use of the revealed encrypting key from the eKS and may be the only key to symmetrically cipher the target dataset. This alternative may be preferable for large target datasets since it will not be encrypted more than once. The coupled symmetric key may be used to control the reading access to a target dataset.

The use of SDFT in an embodiment of NAC may significantly simplify the coding tremendously. The encryptions and digns may be embedded into logically cohesive TARs appropriate for the functions to be performed and the unraveling process of SDFT may automate much of the detailed processing of such operations. Any localized attributes associated with the TARs may be folded together with the target data or be further folded with another TAR to simplify its protection and storage.

The table in FIG. 80 shows an example of how Key Based Permissions may work with three defined roles, Readers, Writers and Verifiers, and five role players: A, B, V, X and Y. All role players in possession of the coupled symmetric key S may have the ability to encrypt or decrypt the data using the symmetric key S. The Class of Writers (COW), X and Y, may have the ability to create a dign on the encrypted data using asymmetric private key R. Using asymmetric public key U, the Class of Readers (COR), A and B, may have the ability to verify that the corresponding digital signature was created by someone from the Class of Writers on the encrypted data and they may have the ability to decrypt the data using symmetric key S. Therefore, the ability to create a valid dign may imply that you may have the ability to modify the data and all other Readers may authenticate that the dign may have been created by a valid Writer. The number of roles defined depends on the access control granularity desired by the owner but some or all defined roles may utilize the methodology as described for FIG. 80. A role player who only possesses the asymmetric public key U may be known as a Verifier; the Verifier may have the capability to traverse an entire Nut but may be unable to decrypt the target data corresponding to the role class. For example, a COR Verifier may only authenticate that the payload of the Nut may have been properly modified by a proper COW role player by using the COW public key on the dign but she cannot decrypt the payload since she does not have a copy of the decryption key S.

The NAC may precisely affect and control the viewable and modifiable aspects of content thereby that of a Lock Node thereby that of a Nut. The table shown in FIG. 81 lists some parts of a Nut but may contain more or less parts as desired: hair, tick, seal, vita, face, tale and/or bale. There may be some forward references in the table to Nut Logs and Nut History which may be explained in detail later in the document. Each row may represent a Lock Node and the data defining the Nut Part may be held in the Bag of that Lock Node. The column titled Bag Opacity may show the cipher mode of the Lock Node's Bag which may be controlled by the Lock Node's metadata. The Bag may be encrypted or not (clear) based on the metadata settings which may be referred to as the Bag Opacity. If some or all of the Nut Parts in the table in FIG. 81 exist in a given Nut, then each Nut Part which may be represented by a Lock Node may be linked in sequence from the top down using Lock Node linking pointers and linking keys. The traversal down the column of this table with respect to the Bag Opacity of each Nut Part may be referred to as the Gradient Opacity of a Nut. Holders of a proper external Primary Key may gain access into a Nut by eventually unlocking the Variable Lock of the Lock Node. Depending on the SAC settings of the Primary Key, a key holder may be limited to how far they may traverse into a Nut. The NAC may affect which Primary Keys may be allowed the ability to read, modify and/or authenticate each Nut Part by the careful placement of coupled symmetric cipher keys, the precise use of asymmetric key pairs, and using digital signature methods.

FIG. 82 shows a table listing the Key Based Permission access roles that may be defined and available for a typical Nut. The access roles may not be limited by this list as there may be more or less access roles defined depending on the needs of the Nut owner. The table lists four sections of a Nut that may be identified but is not limited to it: Bale, Vita, Tale and All. The All section may refer to anything not covered explicitly by another access role. This may entail some or all the internal workings of a Lock Node such as but not limited to digns on Key Maps, eDKs and/or encrypted Bags not specified by a key pair representing a separate access role. For this discussion, a key pair may comprise the asymmetric key pair and a coupled symmetric key. The existence of the coupled symmetric key may depend on the existence of an access class Verifier role. The holder of the All private key may be called a RAT (Root Access Tier) or the owner of the Nut. Each Primary Key may have a Key Map which may contain a copy of the RAT Reader public key for authentication purposes. The Bale may be held in the Bag of the Lock Node holding a payload of a Nut such as a document. This key pair may be specifically named Class of Writers (COW) and Class of Readers (COR) due to its frequent use. This key pair may control which Primary Key may have the ability to modify a payload of the Nut. In a similar fashion, the Nut Log may be held in the Bag of the Vita part of a Nut and may be controlled by a Logger/Log Reader key pair. The Nut History may be held in the Bag of the Tale part of a Nut and may be controlled by a Historian/History Reader key pair. A Verifier role for each access role class may have access to at least one public key associated with that role in order to authenticate the dign associated with it. A Verifier role may imply that there may be a coupled symmetric key associated with the access role class which it does not have access to. A maintenance process may be given access to a combination of defined verifier roles within a Nut to check the validity, consistency and/or authenticity of the Nut part but not be able to read the contents of the protected data. The key pairings are not limited to these sets and may be expanded or contracted based on requirements. Any encrypted and/or unencrypted strings of a Lock Node may have a dign created on it by its own specific key pair, and, all the Lock Nodes in a Lock Graph may employ this level of specificity which may lead to an extreme level of access control granularity; however, such an extreme level of access control granularity may mute the effectiveness of the access control on such Nuts.

The Parameters section of the Lock Node may specify the digital signature algorithm to apply and the length of the asymmetric key (defaults to a minimum of 2,048 bits for RSA-2048). Alternatively, SDFT usage may allow for a specific TAR to represent such preferences and the TAR label may be stored in the Parameters section instead. The encrypted Bag of the Lock Node that may be holding a payload of the Nut may not be digitally signed by a RAT Writer using the RAT Writer key but rather by a key holder having COW access which may include the RAT Writer. Primary Key holders may be given access to the RAT Reader key via their Access Key Set in their Key Map of the Keyhole Lock Node and a corresponding Access Attribute Propagation Key (AAPK); this RAT Reader key may allow any legitimate Primary Key holder to authenticate any dign within the Lock Node which may be in the province of RAT authority (exemplified by a Primary Key holder who may have access to the RAT Writer key). Any failure to authenticate any RAT dign may imply that the corresponding string or folded data may have been compromised, or the RAT Reader key may be invalid, or the Primary key may be no longer valid or some or all of the reasons mentioned. The application may show this warning and may not proceed beyond it since the integrity of the Nut may have been compromised and further decryption attempts may be unlikely to succeed or may result in showing compromised data.

Figure 83:
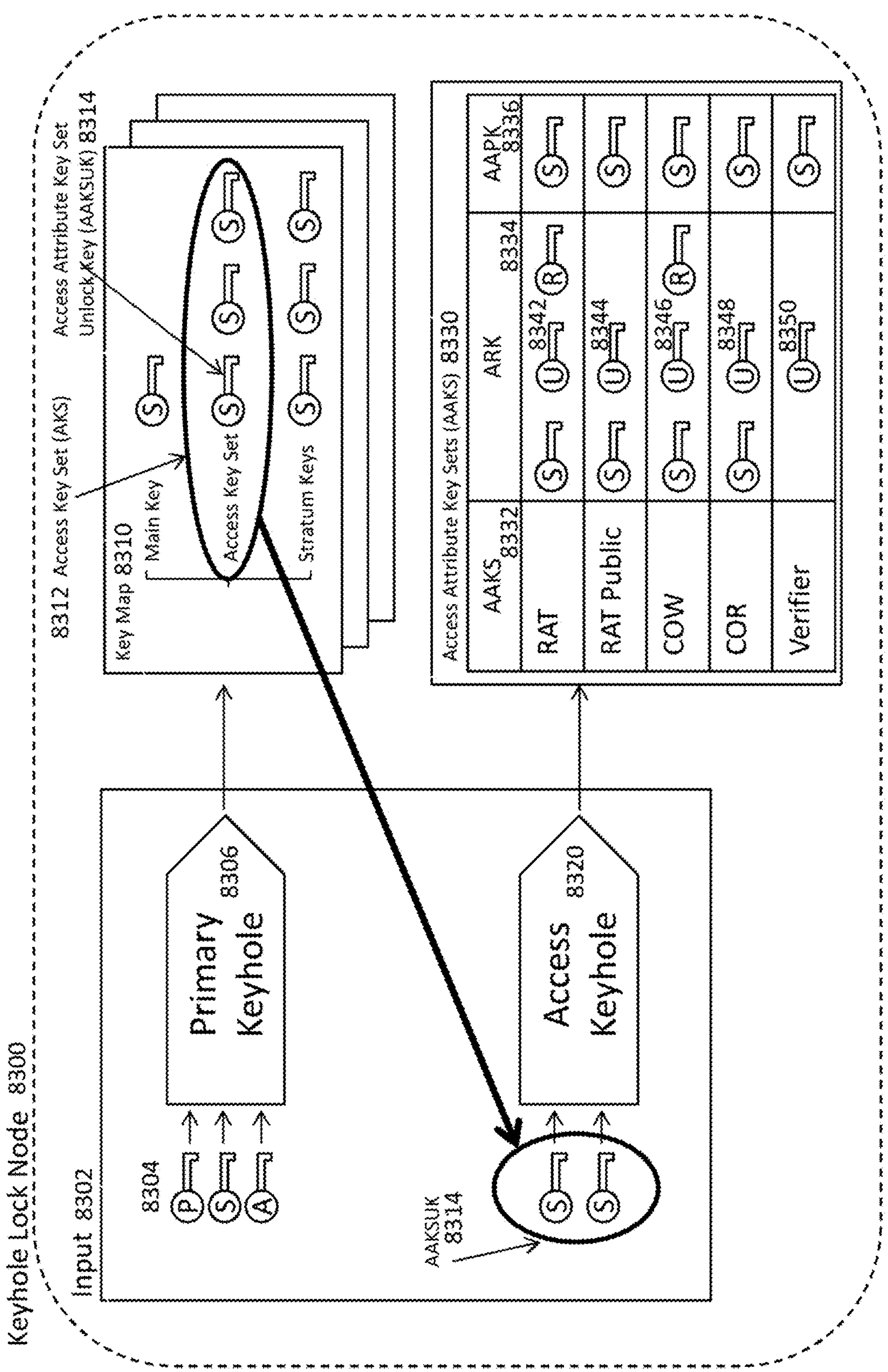
FIG. 83 shows a block diagram of how the initial set of Nut Access Control access keys called Access Attribute Key Set Unlock Keys (AAKSUK) may be inserted into the Access Keyhole for each valid Primary Key.

FIG. 83 shows how a Nut attains its initial set of NAC access keys. Starting with the Keyhole Lock Node 8300, a Primary Key 8304 may be inserted into the Primary Keyhole 8306 and may decrypt or unfold the Encrypted Key Map which may reveal the Key Map structure 8310, there may be an Access Key Set (AKS) 8312 which may contain a set of keys composed of Access Attribute Key Set Unlock Keys (AAKSUK) 8314 which may be symmetric. Each individual AAKSUK symmetric key may correspond to an access role as shown in the table in FIG. 82. Each AAKSUK in the AKS may be then inserted into the Access Keyhole 8320 in the same Input section 8302 of the same Lock Node 8300 as the initial Primary Keyhole 8306; therefore, the Key Map 8310 may hold a set of keys in the AKS 8312 that may feed its own Access Keyhole 8320. This may be a special property of Keyhole Lock Nodes (external facing Lock Nodes) and may not be applicable to internal Lock Nodes in most cases. In the Access Keyhole 8320, each properly inserted AAKSUK 8314 may decrypt or unfold to reveal a corresponding Access Attribute Key Set (AAKS) 8330 comprising access role description 8332, Access Role Key (ARK) 8334 and/or Access Attribute Propagation Key (AAPK) 8336. The ARK 8334 may specify a key pair part that corresponds to the role being given: public (reader) or private (writer). The AAPK 8336 may be a symmetric key that may act as the AAKSUK into the next linked Lock Node's Access Keyhole. The set of AAKSUKs may make up a set of AAKSs which may define the Primary Key's NAC access attributes and ultimately its access in the Lock Node. In this diagram, the AAKS 8330 may specify the access attributes of a Nut owner because it contains the RAT private key and the COW key. The additive attribute property of AAKSUKs (thereby the additive attribute property of NAC) may be illustrated in this diagram; there may be an AKS 8312 for each Primary Key 8304 which may be inserted into the Primary Keyhole 8306 so every insertion of an AAKSUK 8314 into the Access Keyhole 8320 may be additive. Identical AAKSUKs may just overwrite the existing one by the Access Keyhole which may lead to a union of unique AAKS when some or all presented Primary Keys may have been processed. This may result in a cumulative access attribute effect when Primary Keys of differing access attributes may be inserted at the same time.

Figure 84:
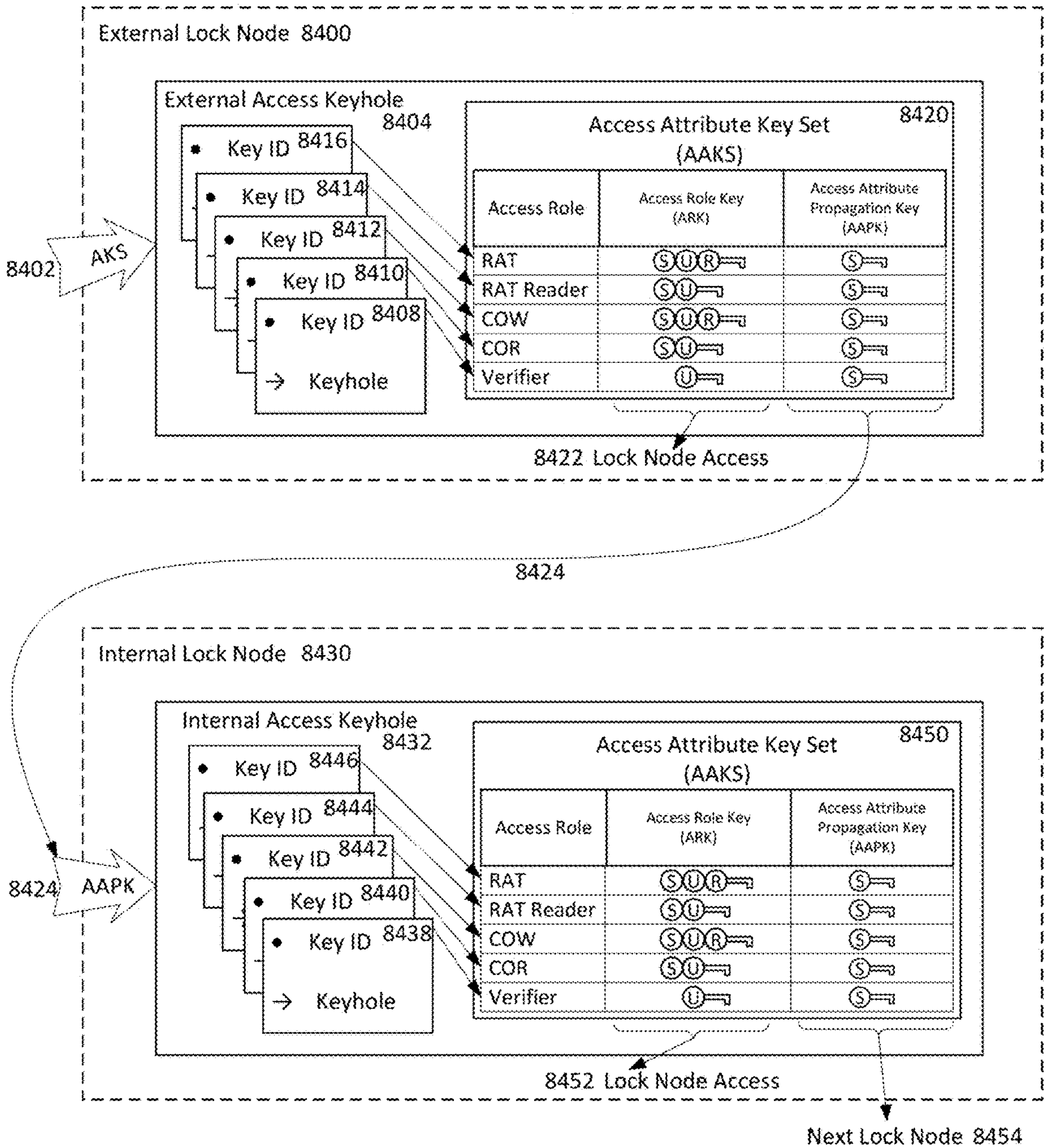
FIG. 84 shows a block diagram of the propagation of NAC access attributes from External Lock Nodes to Internal Lock Nodes.

FIG. 84 illustrates how the AAPKs may be used to propagate the NAC attributes throughout the rest of the Lock Nodes in the Lock Graph. The Keyhole Lock Node 8400 may have been properly unlocked and some or all the AKS 8402 may have been inserted into the Access Keyhole 8404 which may result in the AAKS 8420. The Access Attribute Propagation Keys (AAPK) 8424 may then be inserted into the Access Keyhole 8432 of the next linked Lock Node. Notice that this may be similar to the way the Keyhole Lock Node's Access Keyhole may have been populated but the keys come from a linked Lock Node rather than from the AKS which may or may not be found in its own Primary Keyhole. The Internal Lock Node's 8430 Primary Keyhole (not shown) may have an empty AKS in its Key Map except for RAT access level keys. By following this propagation methodology, the access attributes of the Primary Key may be present in every opened Lock Node in the Lock Graph. The Lock Node may isolate and localize some or all or its internal control mechanisms such as having different sets of AAKS being generated for its own use within the Lock Node even though the access role maybe the same such as COW. Even the AAKSUK and AAPK symmetric keys may be different as long as they may be mapped properly. It may be the premise of well-defined Nuts to assign the RAT with a complete set of AAKS for the entire Lock Node and for that to be propagated properly throughout its Lock Graph. For reference, there may be a complete set of AAPK and ARK which may be encrypted by the RAT public key and may be stored in the Lock Node's Parameters section so only the RAT may reveal it when it may need to rekey a Lock Node.

Figure 85:
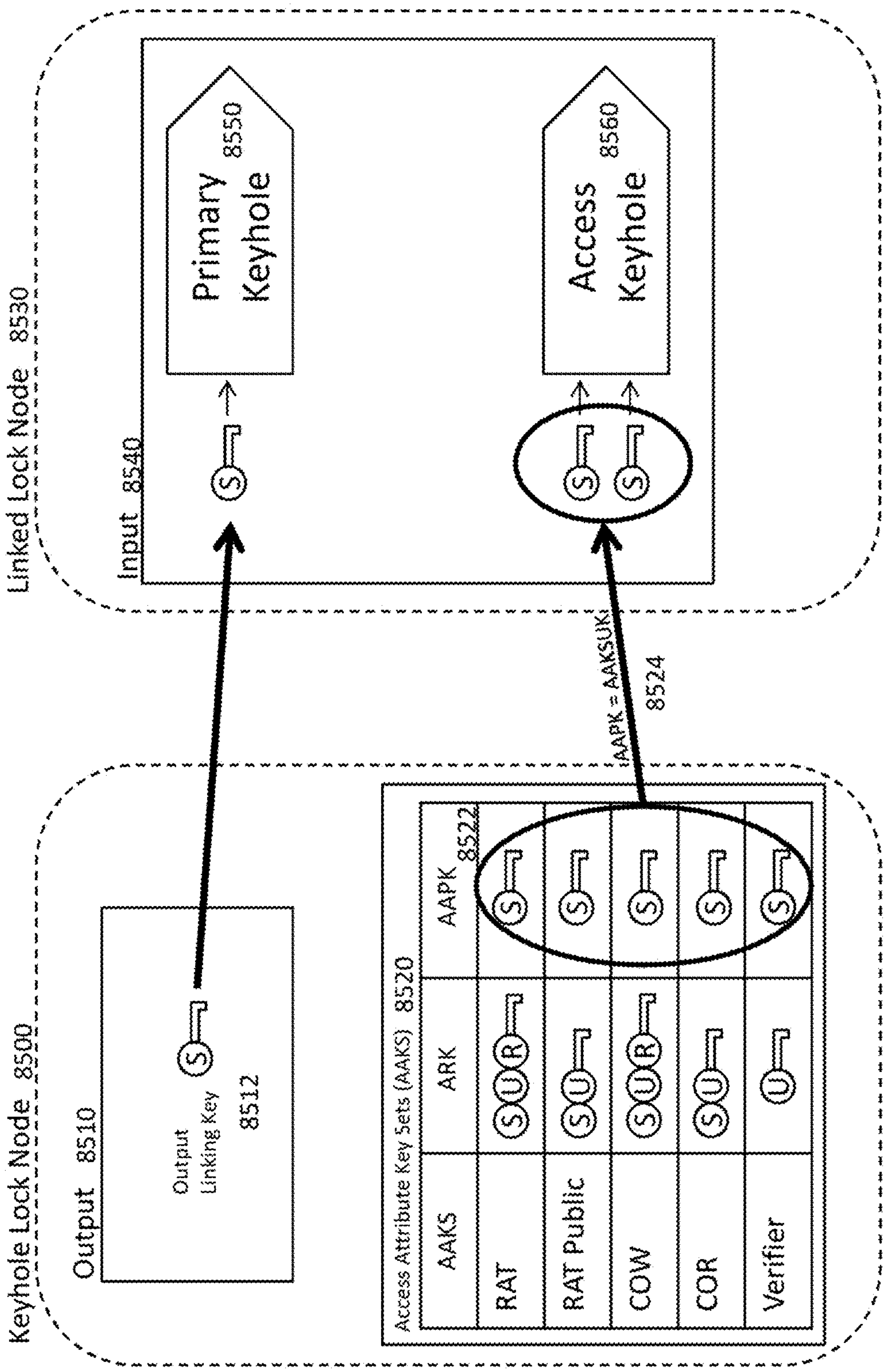
FIG. 85 shows a block diagram of the propagation of NAC access attributes from External Lock Nodes to Internal Lock Nodes and the insertion of the Output Linking Key into the Primary Keyhole of the linked Lock Node.

FIG. 85 illustrates the propagation of access attributes using AAPK from an External Lock Node 8500 to an Internal Lock Node 8530. The diagram shows where the various keys may come from to feed the linked Node's Primary 8550 and Access Keyholes 8560. The Output section 8510 may reveal a linking symmetric key 8512 for the Primary Keyhole 8550 of the linked Lock Node 8530. The AAPK 8522 may be inserted 8524 into the Access Keyhole 8560 of the linked Lock Node 8530.

Figure 86:
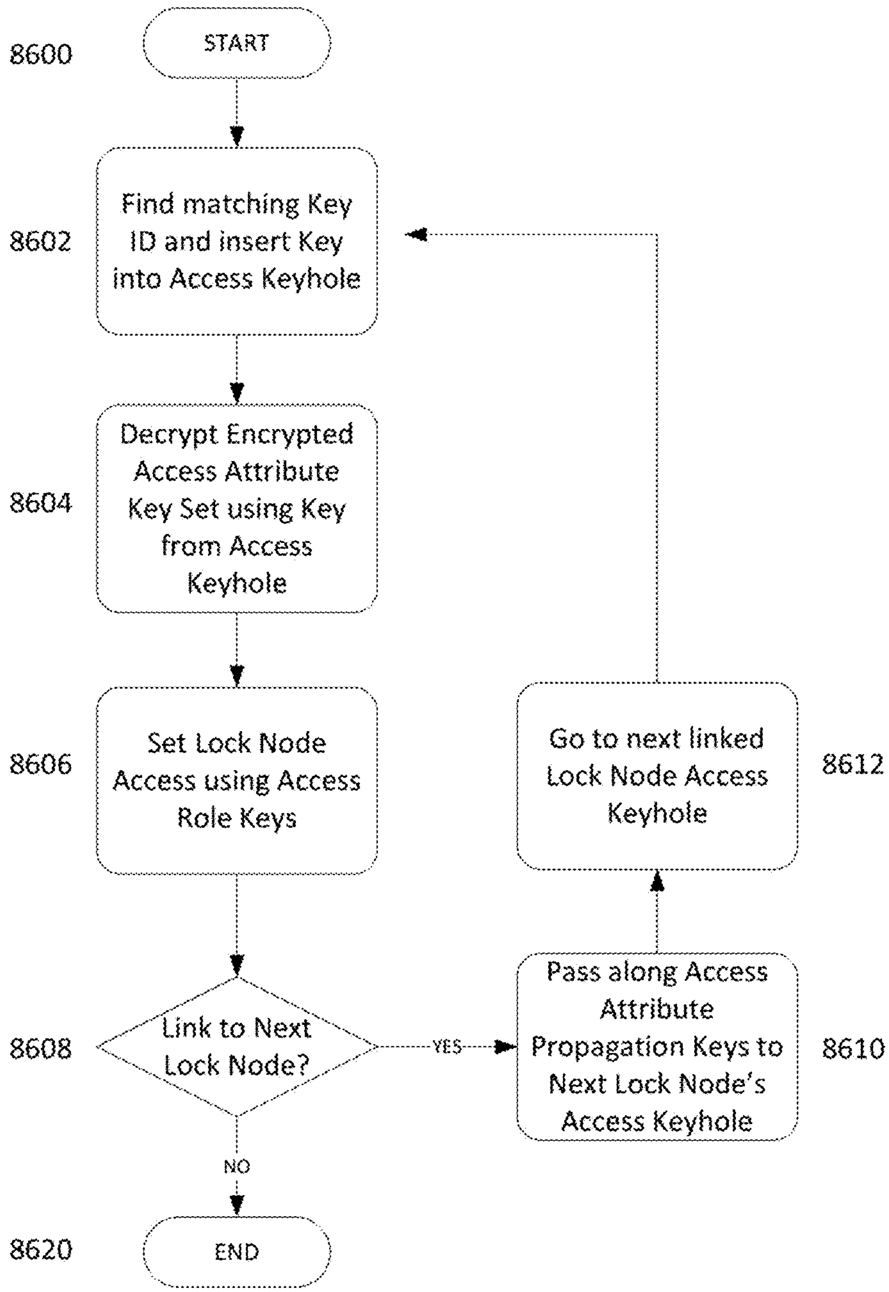
FIG. 86 shows a flowchart for inserting keys into an Access Keyhole.

FIG. 86 shows a flowchart for inserting keys into an Access Keyhole which may have been covered in detail using examples in the previous sections.

FIG. 87 shows a table of Key Based Permissions for an alternate embodiment. This table may expand upon the table presented in FIG. 80 by further defining a Write asymmetric key pair ($U_W$, $R_W$) and a per instance Data ciphering symmetric key $S_n$ The three keys from FIG. 80 may be alternatively represented as a Dign asymmetric key pair ($U_D$, $R_D$) and a default Data ciphering symmetric key $S_0$. The additional keys may allow the ARK to define a WriteOnly access role which may write into a Lock Node's Bag but may not read any other part of the Bag. A WriteOnly role may have access to the keys $R_D$, $U_D$, $U_W$ and $S_n$. When a WriteOnly role wants to save message $T_n$ into a Lock Node's Bag, it may create a single instance symmetric encrypting key $S_n$ to encrypt $T_n$ producing encrypted message $E_n$. Then the single instance symmetric encrypting key $S_n$ may be encrypted using an asymmetric cipher with key $U_W$ to produce encrypted key $K_n$. Both $E_n$ and $K_n$ may now be saved within the Lock Node's Bag. The WriteOnly role may also create a dign using the $R_D$ key and save it. Message authentication may be alternatively or additionally performed by the proper application of an authenticating SDFT TAR sequence which may embed and automatically fold such information for compactness and organizational simplicity. Such TAR sequences may allow for an alternative method of message authentication using any keyed MAC transmutations. Once the WriteOnly role player may be done writing and the in-memory instance of $S_n$ may be destroyed, the role player may no longer have access to the $S_n$ key to decrypt message $E_n$ since the WriteOnly role may not possess the asymmetric private key $R_W$. Only those access roles which may possess a copy of the asymmetric private key $R_W$, such as the Reader and Writer roles, may decrypt the encrypted key $K_n$ to obtain $S_n$ and may use it to operate on encrypted message $E_n$ to obtain the original message $T_n$. The authentication methodology may additionally include hash or dign chaining similar to the way Merkle trees work to make the process of authenticating more efficient for payloads comprising numerous individual messages. WriteOnly role access may not prevent an unauthorized truncation or overwriting of previous messages on the Lock Node being operated on by the local system; however, the NUTS ecosystem may help prevent or highlight such occurrences by engaging its Nut history, replication and synchronization features in various cooperative ways. This will be discussed later in the section on NutServers and Revision Control modules.

The limited role capabilities of WriteOnly and Verifier presented by the table in FIG. 87 may help alleviate some of the issues associated with the pervasive "God Key" conundrum within computer systems security. This may be a well-known class of problems where in one case a system administrator may be given the "God Key" or all access credentials to a system or set of systems in order to maintain, upgrade, repair, install and/or troubleshoot the system(s) at hand. There may be a tendency in the industry to automatically correlate technical ability with elevated security clearances due to the relatively small number of very capable and experienced system administrators with a proper security clearance check. This type of practice may fail to address the dynamic nature of trustful relationships where the trust level between two parties may change over time in a unilateral manner that may not be detectable by the other or may be intentionally hidden from the other. By the careful use of WriteOnly and Verifier access roles, payloads may be protected from unauthorized access at all times for data in transit or at rest. The application of these two access roles may allow an institution to separate the conjoined nature of technical ability and security clearance to fully manage each aspect more appropriately and independently. The WriteOnly role may allow persons and processes to add to the Log component of a Nut as evidence of handling but may not allow them to read the payload or edit the Log. Additionally, the WriteOnly role may have access to both Dign keys and may create authentication strings and verify them. The Verifier role may allow persons and processes to check a Nut for internal consistency and authenticity without allowing any access to the payload. Lock Nodes may be systematically modified, adapted and inserted within any database system such as but not limited to NoSQL or RDBMS to enact such granularity of access controls at the field, record, table and/or database levels. The compactness, flexibility, features and/or independence may allow Lock Nodes to exist in computerized appliances as embedded access gateways into the appliance itself. This may be discussed in more detail in a later section on the Internet of Nuts.

NAC features may encompass a complete set of permutations on the actions that may be taken on a target payload. A simple cross reference matrix of permitted actions along with its NAC implementation may be shown as follows:

| Actions | Read | Write | Verify |
|---|---|---|---|
| Read | READER | WRITER | READER |
| Write | WRITER | WRITEONLY | WRITEONLY |
| Verify | READER | WRITEONLY | VERIFIER |

The READER and WRITER roles may have the implicit ability to Verify or authenticate the dign contained within the Lock Node's Bag.

To summarize the three methods of protection for a Lock Node: Variable Locks, Stratum Access Control and/or Nut Access Control. The Variable Lock may primarily protect the Bag of the Lock Node which may be used to carry some data content. The Stratum Access Control may define how deep a user may penetrate into Lock Graph Strata. The Nut Access Control may specify which parts of a Nut may be modified, viewed, written and digitally signed by a user. Some or all of these layers may be controlled by embedded or folded key sets within the Keyhole mechanism of a Lock Node. The Keyhole mechanism may be a flexible entryway which may allow for a wide variety of cipher keys to be inserted and processed for a variety of functions. Some or all of these components may work together and/or separately to offer a rich set of access controls that may be customized on a per Nut basis and may be modularly constructed to exhibit the locking behavior that may be desired for the content to be protected. The Lock Node's modularity also may afford the simplicity of building many complex locking structures because of its iterative, compact and modular design. Although many different algorithms may be used to fully unlock and utilize a Nut, the information to initiate the mechanisms may be represented by ciphered data portions that may be stored entirely within the Lock Nodes of a Nut therefore its access control mechanisms may be portable and may travel with its payload independent of any external reference monitors. These mechanisms may further be embodied by various SDFT methods and structures to help simplify the implementation and better manage the complexity of the internal coding and/or data details.

A Nut's access control models may be a combination of Mandatory Access Control (centralized), Discretionary Access Control (user centric) and others. It may resemble the Discretionary Access Control model in the way it may store some or all of its access attributes within itself and the methods by which the owner may directly set the access levels per Nut in order to facilitate transportability. It may also accommodate some or all Mandatory Access Control models and may integrate into some or all such environments due to its flexibility provided by its Keyholes, Variable Locks and other mechanisms. Furthermore, it may exhibit other characteristics such as but not limited to Gradient Opacity, Additive Access Attributes and/or modular Lock Node linking which may be novel to NUTS.

Lock Node Traversal

Figure 88:
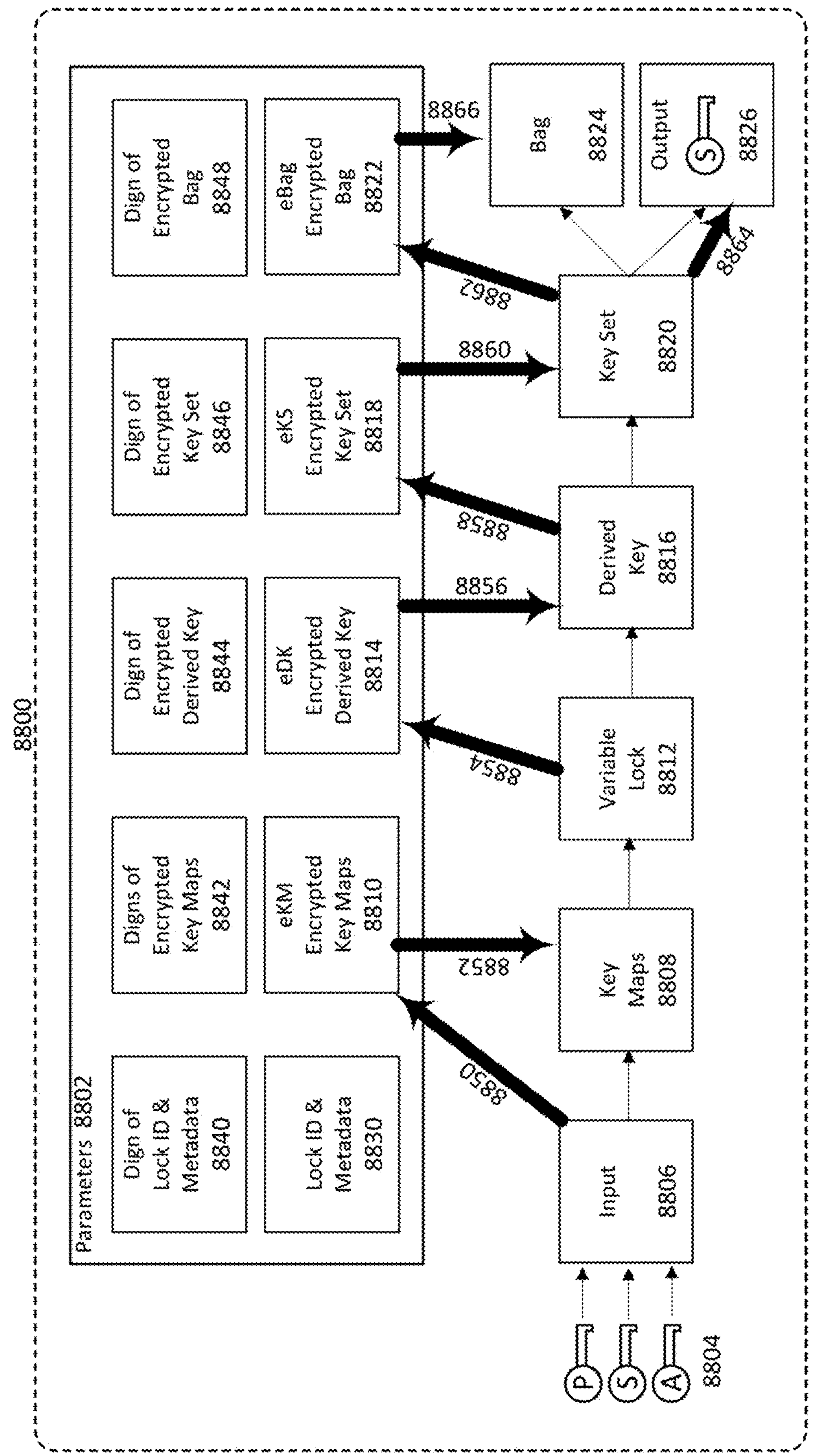
FIG. 88 shows a data flow diagram of the internal decryption data flows of a Lock Node.

Now we may traverse the entire Lock Node and see how things may be unveiled along the way. FIG. 88 depicts a simplified diagram which shows the decryption data flows within a Lock Node 8800. References may be made to elements of other figures involved in this interwoven and integrated depiction of a Lock Node unlocking process such as FIGS. 62, 78, 83, 84, 85 and 88. References may be made to the same Lock Node section numbered by different element numbers but may represent a different view of the same section being examined in a drill down type of approach. The sequencing of the logical operations which may be required in the Lock Node unlocking process may be further optimized for efficiency and/or other purposes. The process of unlocking a Lock Node, thereby eventually a Lock Graph or Nut, may involve these steps which may be described in this example such as but not limited to the use of Primary Keys to get access privileges and decryption keys to the Lock Node, the authentication of the Lock Node, the propagation of access privileges throughout the Lock Graph, the logical operation of a Variable Lock and/or the decryption of the stored data; these steps may be expanded, contracted or reordered as may be needed. If appropriate, certain mechanisms within the Lock Graph and Lock Node may benefit from an appropriate application of SDFT methods.

Primary Keys 8804 may be inserted into the Input section 8806 and each Primary Key may use its associated cipher method to attempt to decrypt its matching Encrypted Key Map 8810 and unfurl it into a Key Map 8808 structure. Each Key Map 6240 may produce a Main Key 6210 which may be used by the Variable Lock 8812. Within each Key Map 7840 (equivalent to 6240) may be a set of Stratum keys 7850 and each Stratum key (such as 7852-7858) may be inserted into the matching Strata Lock Nodes (such as 7820-7830) of the Lock Graph in the respective Input section's 8302 Primary Keyhole 8306 (in this example, a Stratum key such as 7852-7858 may be equivalent to a Primary Key in 8304); Stratum designated Lock Nodes such as 7820-7830 may employ a MATLOCK which may require a minimum of two keys to open it: the Stratum key such as 7852 and the Output linking key such as 8512 which may be found in the Output section 8510 or 8826. For a Keyhole Lock Node 8300, within each Key Map 8310 may be a set of Access Attribute Key Set Unlock Keys (AAKSUK) 8314 called the Access Key Set (AKS) 8312 and each AAKSUK key may be inserted into the Input section 8302 Access Keyhole 8320 of the current Keyhole Lock Node 8300. Once a set of Access Attribute Propagation Keys (AAPKs) 8336 may have been attained in this manner, they 8522 (equivalent to 8336) may be inserted into the next linked Lock Node's 8540 Access Keyhole 8560. Now we may have an Access Attribute Key Set (AAKS) 8332 which may contain the Access Role Keys (ARK) 8334. The ARK may define the Primary Keys' 8304 access roles for the entire Lock Graph. The digns of the various Lock Node sections such as 8840-8848 may be authenticated using these ARKs. The Dign of the Lock ID & Metadata 8840 may be authenticated using the RAT Public ARK 8344 (this may the public portion of a RAT asymmetric key pair as may have been described in the NAC specifications) and the authentication algorithm specified in section 8830. To authenticate, section 8830 may be submitted into the authentication algorithm along with the corresponding dign 8840 and RAT Public ARK 8344. If the authentication fails, then section 8830 may have been compromised and the Lock Node unlocking process may raise an error and may stop processing. If successfully authenticated, then each Dign of the Encrypted Key Maps 8842 may be authenticated for each Encrypted Key Map corresponding to a valid inserted Primary Key. To authenticate, each eKM 8810 string may be submitted into the authentication algorithm along with the corresponding dign 8842 and RAT Public ARK 8344. If an authentication fails, then the eKM may have been compromised and the Lock Node unlocking process may raise an error and may stop processing. If all appropriate eKMs have been successfully authenticated, then each Dign of the Encrypted Derived Key 8844 may be authenticated. To authenticate, each eDK 8814 may be submitted into the authentication algorithm along with the corresponding dign 8844 and RAT Public ARK 8344. If an authentication fails, then the eDK may have been compromised and the Lock Node unlocking process may raise an error and may stop processing. If all appropriate eDK have been successfully authenticated, then each Dign of the Encrypted Key Set 8846 may be authenticated. To authenticate, each eKS 8818 may be submitted into the authentication algorithm along with the corresponding dign 8846 and RAT Public ARK 8344. If an authentication fails, then the eKS may have been compromised and the Lock Node unlocking process may raise an error and may stop processing. If all appropriate eKS have been successfully authenticated, then each Dign of the Encrypted Bag 8848 may be authenticated. To authenticate, each eBag 8822 may be submitted into the authentication algorithm along with the corresponding dign 8848 and COR ARK 8348. If an authentication fails, then the eBag may have been compromised and the Lock Node unlocking process may raise an error and may stop processing. If all appropriate eBag have been successfully authenticated, then this Lock Node may be deemed fully authenticated. Note that the eBag may be authenticated using the Class of Reader (COR) Access Role Key 8348. This may hold true for Lock Nodes holding a payload of the Nut, but for Lock Nodes holding Nut metadata in their Bags, the RAT Public ARK may instead be used to authenticate it. Then based on the Variable Lock type indicated in the Lock Node's Parameter section 8830, an appropriate Variable Lock algorithm 8812 may be attempted on each encrypted Derived Key string (eDK) 8814 using the set of Main keys 7844 from the Key Maps 8808. Successfully unlocking the Variable Lock 8812 by decrypting an eDK 8814 may result in one or more Derived Keys (DK) 8816. Each Derived Key may decrypt a corresponding encrypted Key Set string (eKS) 8818 which may be stored in the Parameters 8802. Decrypting an eKS may produce a corresponding Key Set 8820 structure which may hold an Output section 8826 structure and a Bag key. The Output linking key(s) which may be found in the Key Set 8820 structure may be stored in an Output section 8826 and it may function as a key that may be inserted into the Primary Keyhole of a linked Lock Node 8530 if any. The Bag key may decrypt the encrypted Bag string (eBag) 8822 that may be stored in the Parameters section using an appropriate cipher. A decrypted Bag may hold data such as but not limited to a payload of the Nut (Lock Graph), metadata about the payload, metadata of the Nut, metadata of the Bag, any combination of these and/or other data. A Bag metadata may indicate whether the Bag 8824 holds a Nut Part or Nut payload. If a Bag holds a Nut Part, it may indicate which Nut Part it may represent and other appropriate Nut Part metadata and/or other data. If the Bag holds a payload of the Nut, it may indicate whether the stored data may be actual data or a reference to it and if so what type of reference it may be, what the reference may be and/or where it may be located.

Figure 89:
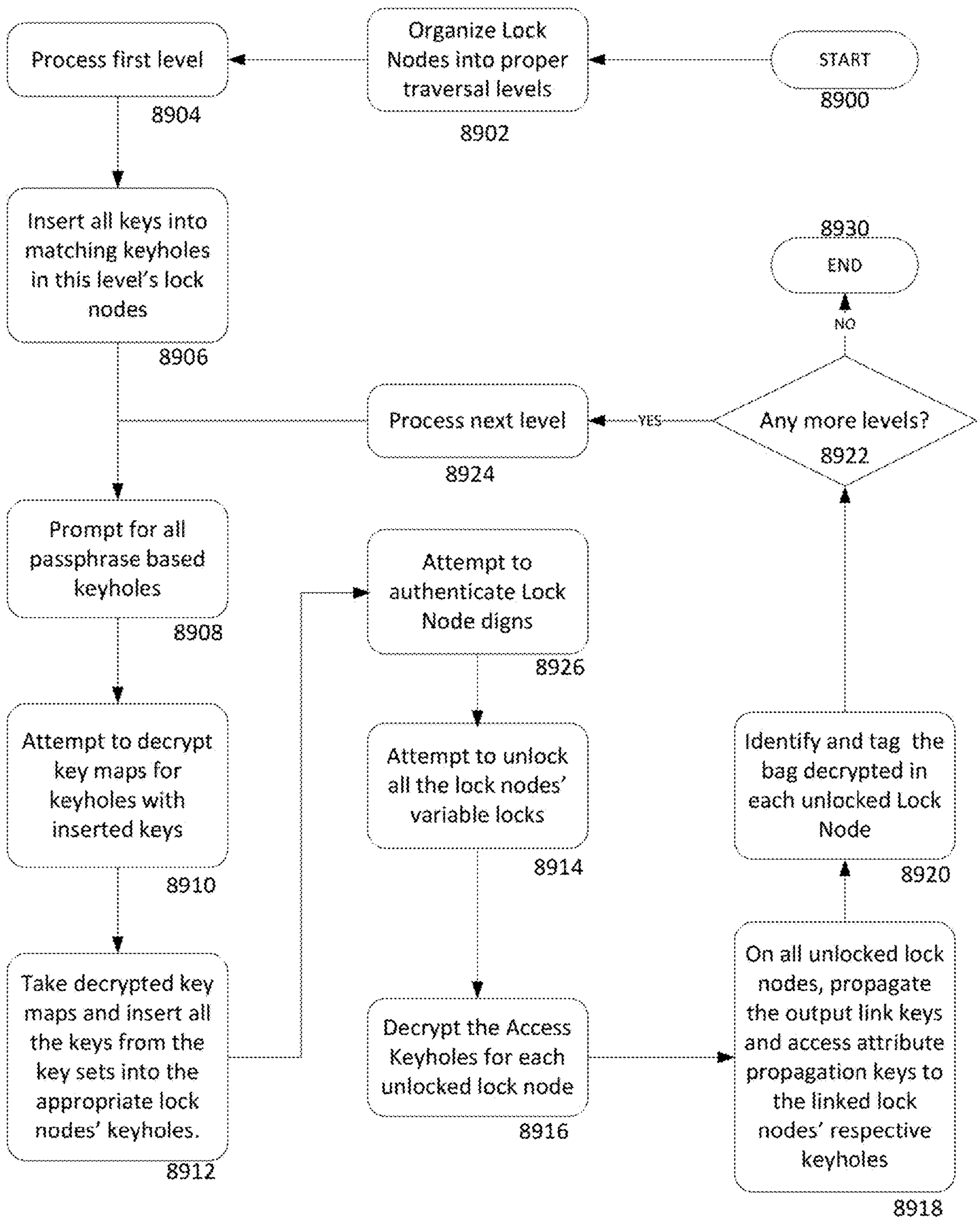
FIG. 89 shows a flowchart to unlock a Nut.

This series of steps may be repeated for each Lock Node in the Lock Graph in order to unlock the Nut. FIG. 89 shows the general flowchart of Nut unlocking. Most of the steps may have been detailed in the previous example but some steps may need further clarification. Step 8902—Organize Lock Nodes into proper traversal levels: since Lock Nodes may be stored in a row-based form in a list type structure, the actual topology of the Lock Graph may be extracted and constructed using the linkage information which may be stored within each Lock Node. Once the graph may be constructed, then one or more additional passes may be done to properly assign graph levels so that Lock Nodes may be traversed in the proper sequence. Step 8908—Prompt for some or all passphrase-based keyholes: during the processing of an Input section, if a passphrase based keyhole is encountered with an empty key (passphrase), then it may prompt for the passphrase. This default behavior may be modified to call another function or bypass any empty passphrase keyholes. Any logical step or process in the flowchart may have errors that may be raised and may lead to the process being halted and these are not specified in detail because this is a higher-level flowchart: for example, any process which attempts an operation may fail and may halt the algorithm. The rest of the flowchart may follow along the path of the previous example.

Figure 90:
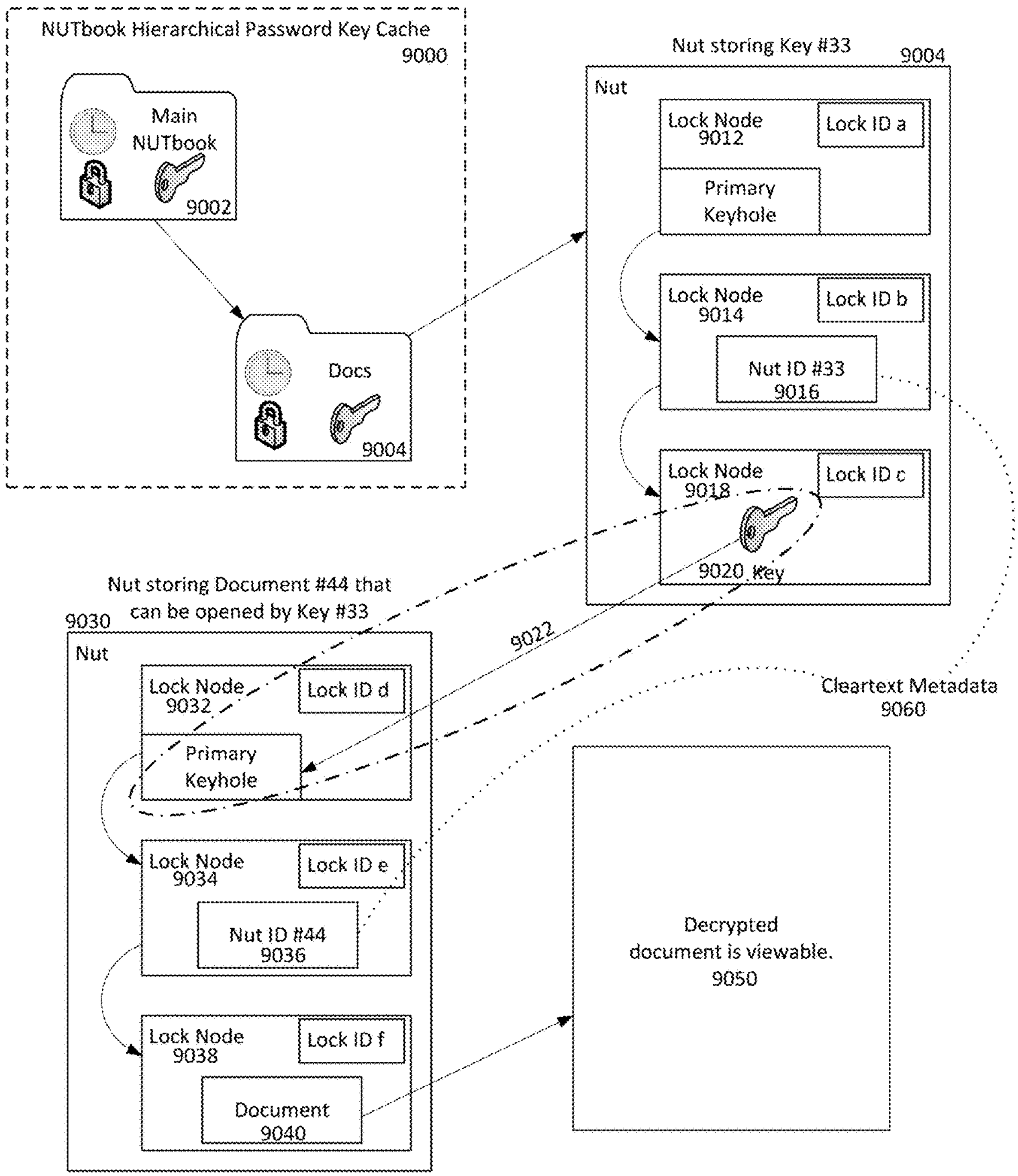
FIG. 90 shows a block diagram of an embodiment of a NUTS based system and how a document stored in a Nut may be unlocked.

FIG. 90 illustrates how a NUTS based system may open a document contained in a Nut. A forward reference is introduced: NUTbook 9000 may be a data collections organizing application that may use Nuts and may essentially act as a personal PKI when it comes to storing and organizing collections of passwords, cipher keys and/or certificates. The file symbols such as 9002 and 9004 may be used throughout the diagrams to represent a Nut file. There may exist within a NUTbook system a Main NUTbook access key Nut 9002 which may be unlocked to get some minimal functionality from the application. The key may be stored within Nut 9002 and may be called the Main NUTbook key and the unlock mechanism into the Nut 9002 itself may comprise a passphrase. There may be a hierarchical key relationship with the Main NUTbook key 9002 and a Documents access key 9004 such that in order to access any document holding Nuts in this configuration, the Document access key may be needed. Therefore, the hierarchy may be set as needing the Main NUTbook key 9002 to open and access the Documents access key 9004. The Nut holding the Documents access key may have Nut ID #33 9016. Therefore, the key which may be stored in the payload 9020 may be referred to as Key ID #33: both the Documents access key and the Nut ID of the Nut holding it may be referenced by the same ID, in this case #33. The document 9040 may be stored in a Nut 9030 with Nut ID #44 9036. Similarly, the document may be referred to as document #44. When a user decides to open document #44, one of the keyholes in the Primary keyhole 9032 may specify that it may need Key ID #33 to open it. Nut #33 9004 may be requested from the NUTbook and in order to open that, it may need Nut 9004 to be opened. For that Nut to be opened, Nut 9002 may need to be opened. Suppose the user may have already initialized his NUTbook with a passphrase to Nut 9002 and the NUTbook may have cached the Main NUTbook key in memory. Then opening Nut 9004 only may require the additional passphrase for the Documents level access of the NUTbook and once it may be opened, the cascade of Nut unlockings may occur to eventually reveal the decrypted document #44 9050. The NUTbook may cache the Documents access key for a finite amount of time to expedite document fetching during a session but certain events such as inactivity, hibernation, screen lock, timeouts, and/or explicit locking may require the passphrase to be entered again for documents access. This section introduced the NUTbook application and hierarchical passwords concepts which may be further discussed in a later section. The series of steps which may be needed to open a single document may be many but some or all the logic employed may be based on the Lock Nodes and its iterative processes and most of it may be hidden from the user. The end result may be that a piece of data may be stored in a Nut like 9030 and its security may be consistent in some or all environments.

Figure 91:
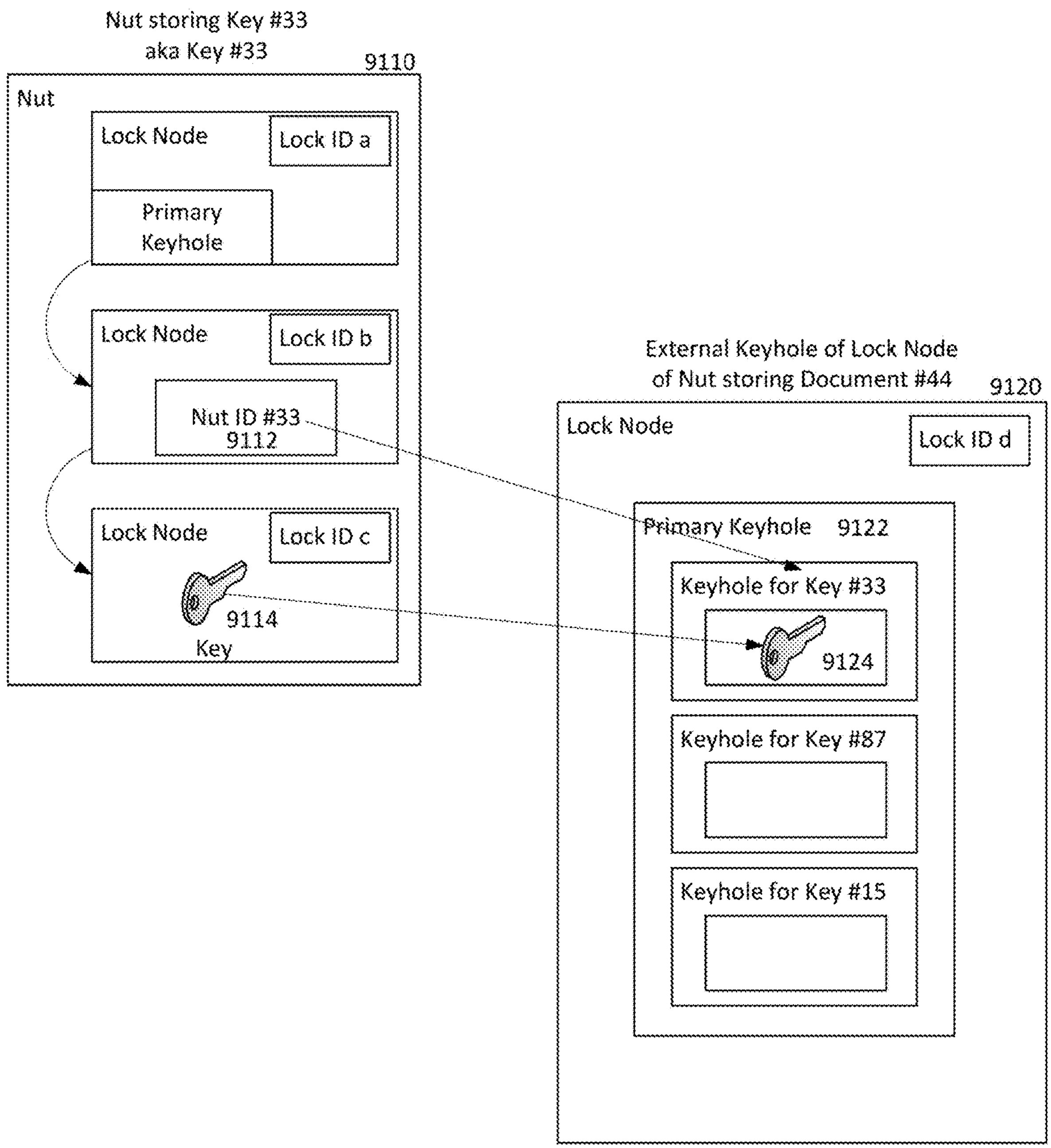
FIG. 91 shows an illustration of the common usage in NUTS parlance to refer to a Nut's payload by the Nut ID of the Nut holding it. Here a cipher key may be referred to by the Nut ID of the Nut holding it.

FIG. 91 illustrates the common usage in NUTS parlance to refer to a Nut's payload by the Nut ID of the Nut holding it. Here it shows how a keyhole 9124 tagged for Key #33 may be actually looking for a Nut 9110 with Nut ID #33 9112 and it may expect Nut #33 to be holding a single key 9114 that may be inserted into the keyhole 9124. It may be interesting to note that in many of these diagrams and examples, the filename of a Nut file, if the Nut may be stored in a file, may be rarely referred to in most operations.

The next set of diagrams shows various example embodiments of a Lock Graph which may highlight the flexibility and expressiveness of the Lock Node and Lock Graph model using Variable Locks and Lock Node linking.

Figure 92:
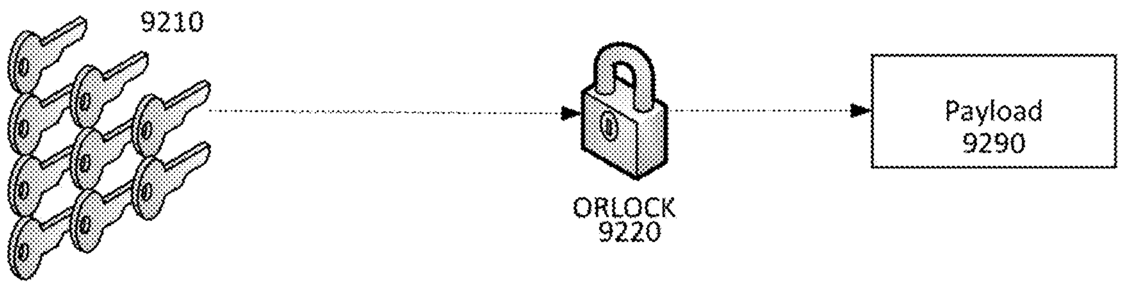
FIG. 92 shows a simplified embodiment of a list of recipients locking model.

FIG. 92 shows a simplified embodiment of a list of recipients locking model: any one key 9210 may unlock the ORLOCK Lock Node 9220 which may reach the Lock Node carrying the Payload of the Nut 9290. Note that for simplicity, a Lock Node may be pictorially represented as a padlock but in reality, it is a fully functioning Lock Node which may be storing some metadata for the Nut.

Figure 93:
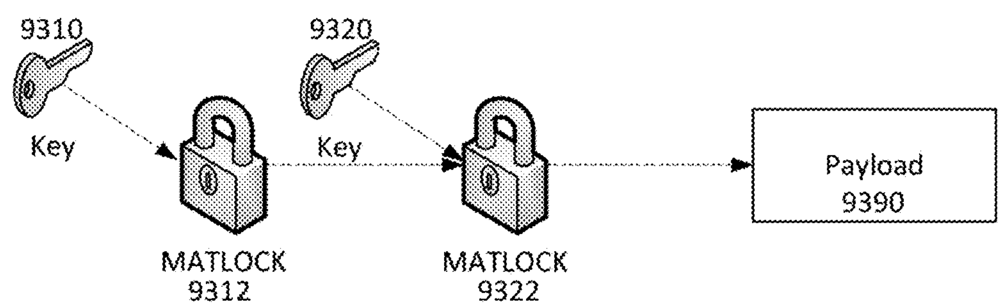
FIG. 93 shows a simplified embodiment of an ordered locking model.

FIG. 93 shows a simplified embodiment of an ordered locking model: key 9310 may be presented first then key 9320 second which may allow access to the Payload of the Nut 9390. MATLOCK Lock Node 9312 may require a single key whereas MATLOCK Lock Node 9322 may require both key 9320 and the linking key from Lock Node 9312.

Figure 94:
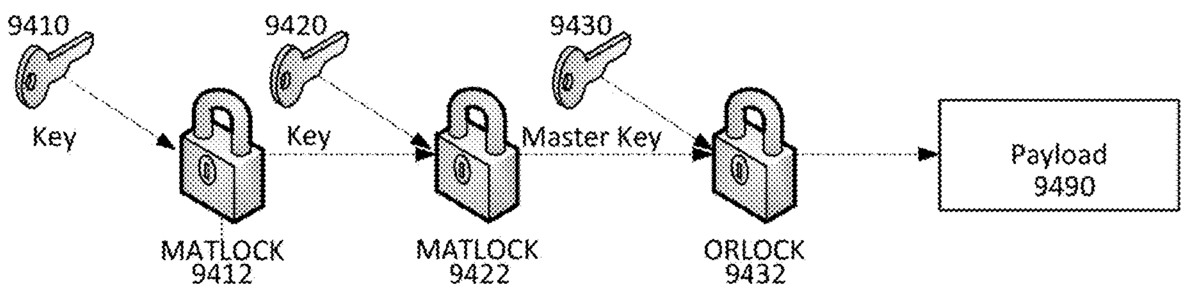
FIG. 94 shows a simplified embodiment of an ordered locking model with master key.

FIG. 94 shows a simplified embodiment of an ordered locking model with master key: key 9410 may be presented first then key 9420 second which may allow access to the Payload of the Nut 9490. Or, master key 9430 may be presented to ORLOCK Lock Node 9432 directly which may allow access to the Payload 9490. The ORLOCK Lock Node 9432 may allow either the linking key or the master key to unlock it.

Figure 95:
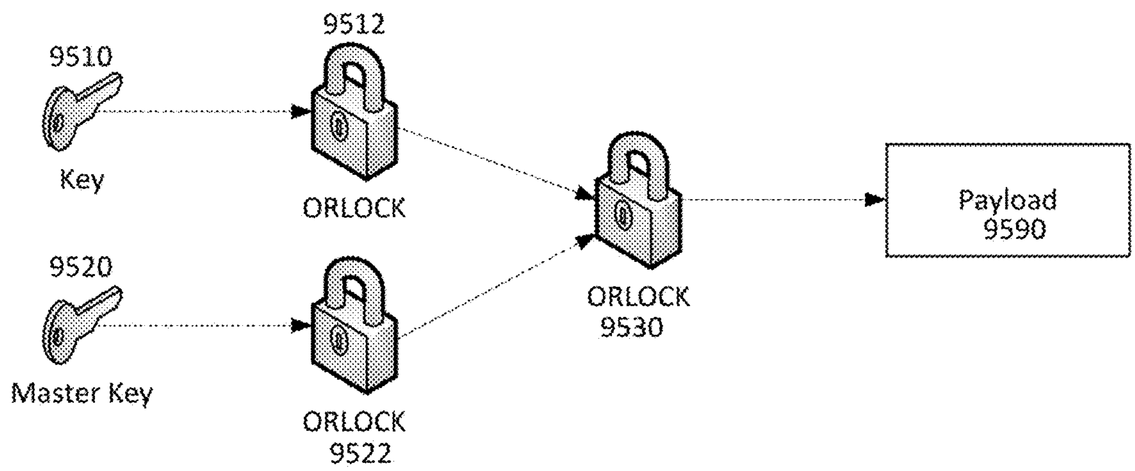
FIG. 95 shows a simplified embodiment of a locking model with master key.

FIG. 95 shows a simplified embodiment of a locking model with master key: key 9510 or master key 9520 may be presented together or separately which may allow access to the Payload of the Nut 9590.

Figure 96:
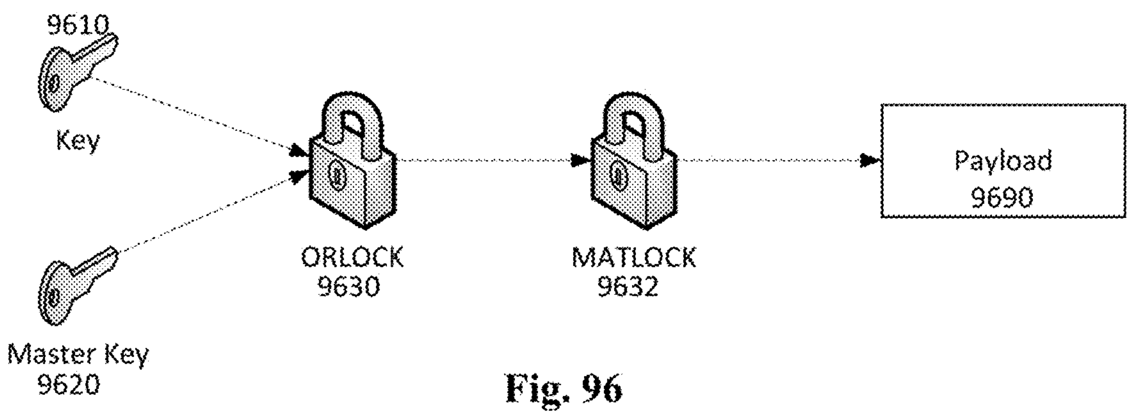
FIG. 96 shows a simplified embodiment of a locking model with master key.

FIG. 96 shows a simplified embodiment of a locking model with master key: key 9610 or master key 9620 may be presented together or separately which may allow access to the Payload of the Nut 9690. A MATLOCK placement in the Lock Graph 9632 may indicate that there may be certain Stratum controls in place for this Nut and it may be a Nut Part storing some Nut metadata.

Figure 97:
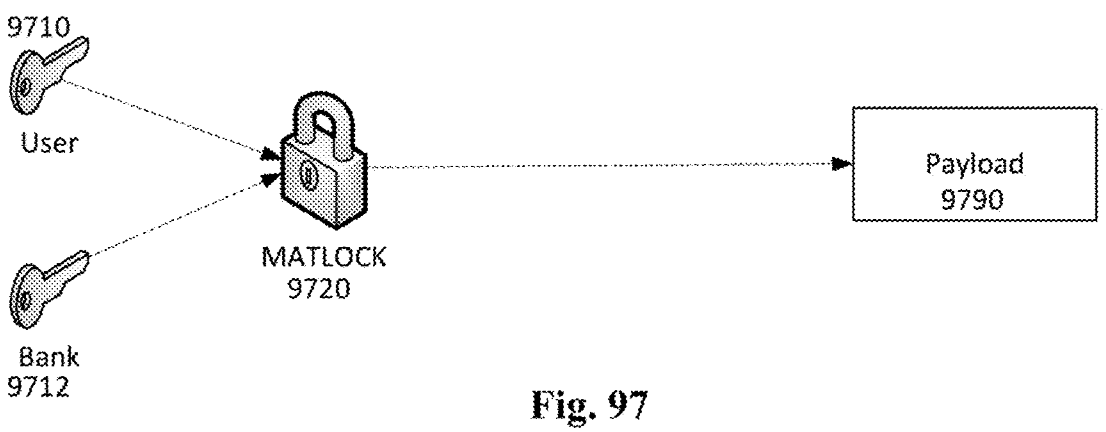
FIG. 97 shows a simplified embodiment of a safe deposit box locking model.

FIG. 97 shows a simplified embodiment of a safe deposit box locking model: key 9710 and bank key 9712 may be presented together which may allow access to the Payload of the Nut 9790.

Figure 98:
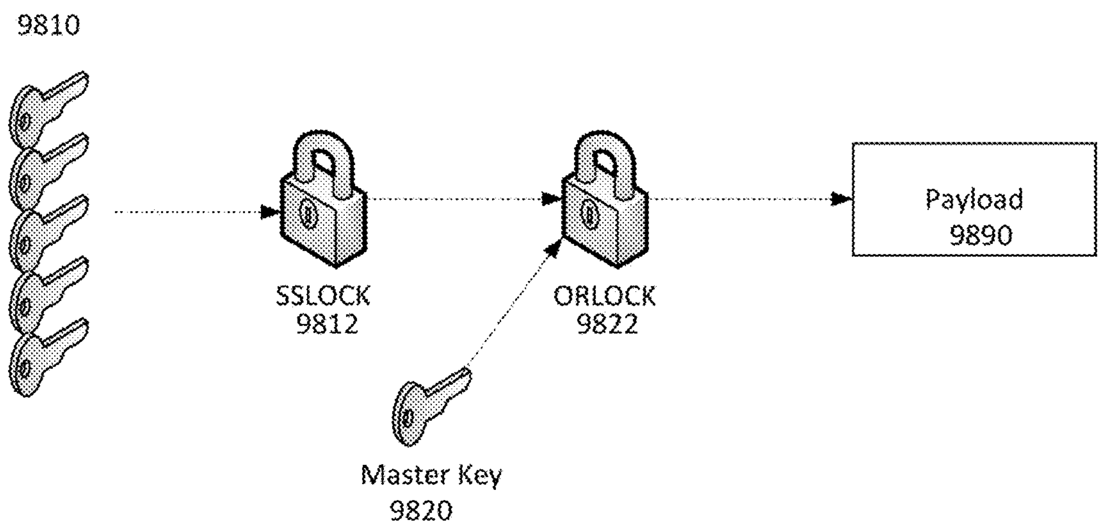
FIG. 98 shows a simplified embodiment of a secret sharing locking model with master key.

FIG. 98 shows a simplified embodiment of a secret sharing locking model with master key: from a set of keys 9810, a number of keys meeting or exceeding the secret sharing threshold may be presented together which may allow access to the Payload of the Nut 9890. Or, master key 9820 may be presented to ORLOCK Lock Node 9822 directly which may allow access to the payload 9890. The keys 9810 may be any combination of passphrases, symmetric keys and/or asymmetric keys since the Keyhole/Key Map structures may hide the tines that may be needed by the secret sharing scheme being utilized in the SSLOCK Lock Node 9812.

Figure 99:
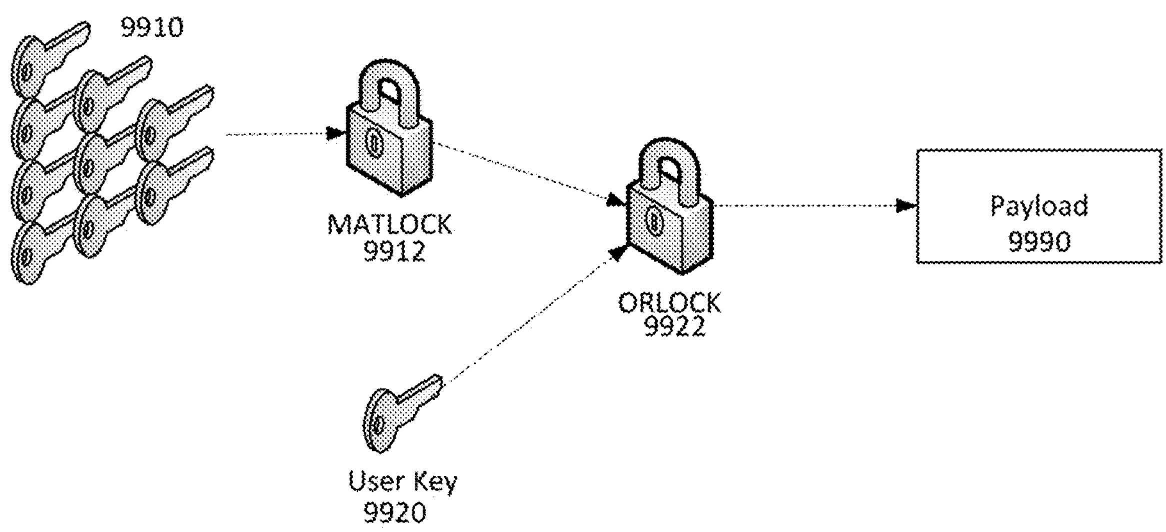
FIG. 99 shows a simplified embodiment of a "PrivaTegrity" type locking model.

FIG. 99 shows a simplified embodiment of a "PrivaTegrity" type locking model: user key 9920 may be presented to the ORLOCK 9922 which may allow access to the payload 9990. Or, nine keys 9910 may be presented together to the MATLOCK 9912 which may allow access to the Payload of the Nut 9990. The "PrivaTegrity" model may have been proposed in early 2016 by David Chaum to implement a text messaging system that may securely transmit messages using keys known to its users but it may have a collusionary backdoor system which may involve up to nine different keys being held by nine international jurisdictions in order to give law enforcement access to specific messages if and only if all nine jurisdictions may agree that it may be vital and may be legally warranted.

Figure 100:
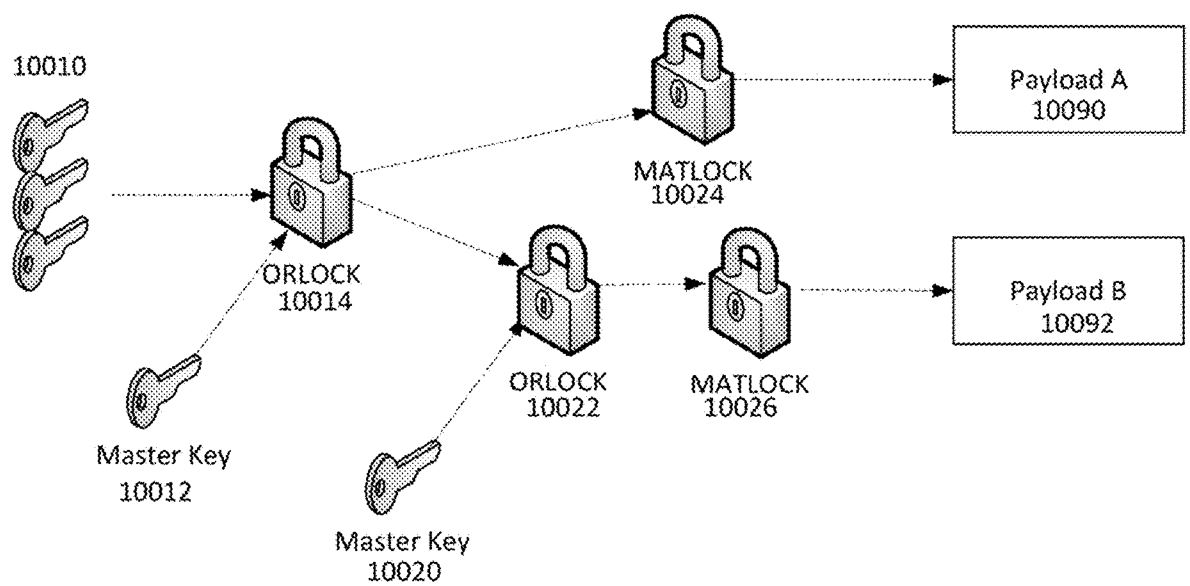
FIG. 100 shows a simplified embodiment of a multi-Nut configuration where multiple payloads may be stored within a single Nut.

FIG. 100 shows a simplified embodiment of a multi-Nut configuration where multiple payloads may be stored within a single Nut: user keys 10010 or master key 10012 may access one payload or both which may depend on their Stratum access controls. Master key 10020 may only access payload 10092 due to its traversal path through the Lock Graph. This Lock Graph may display the flexibility of the modular Lock Nodes and its access control layers working together. Separate data parcels may be protected in different ways some or all within this single Nut. If the master keys 10012 and 10020 may be the same, it may allow the key holder access to both payloads.

Figure 101:
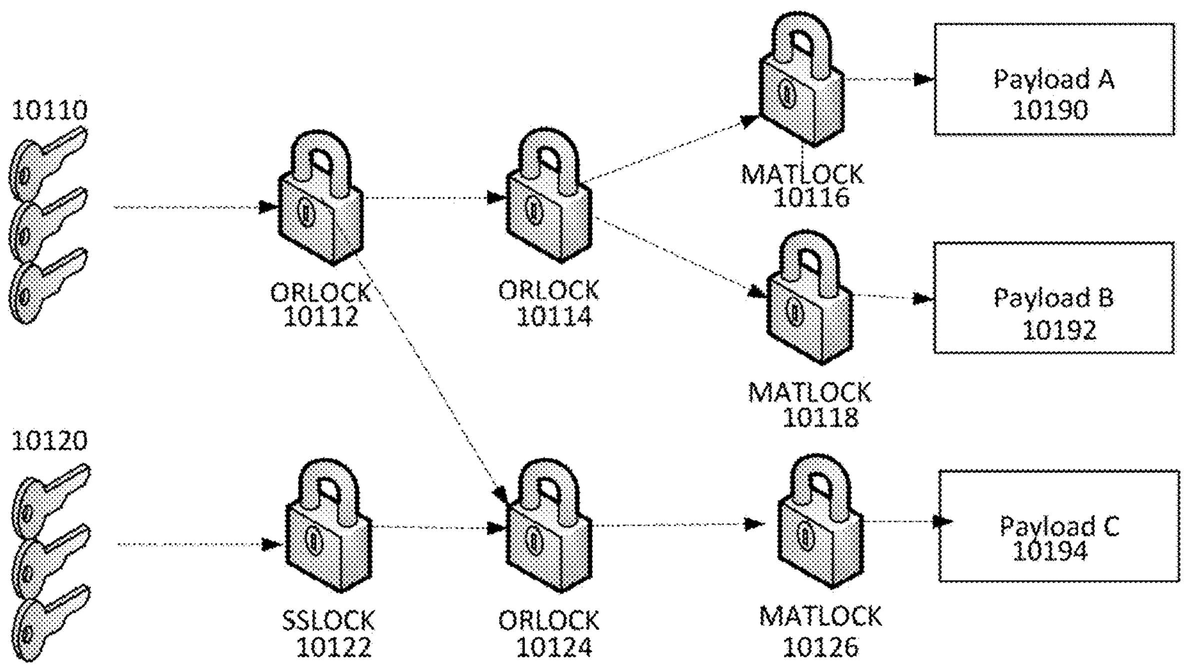
FIG. 101 shows a simplified embodiment of a multi-Nut configuration where multiple payloads may be stored within a single Nut.

FIG. 101 shows a simplified embodiment of a multi-Nut configuration: any of the user keys 10110 may access some or all three payloads which may depend on their Stratum access controls. The keys 10120 for SSLOCK 10122 may only access payload 10194 due to its Lock Node linking. This Lock Graph may display the flexibility of the modular Lock Nodes and its access control layers working together and/or individually. Separate data parcels may be protected in different ways within this single Nut. The flexible nature of this disclosure may permit infinite variations of locking configurations.

Figure 102:
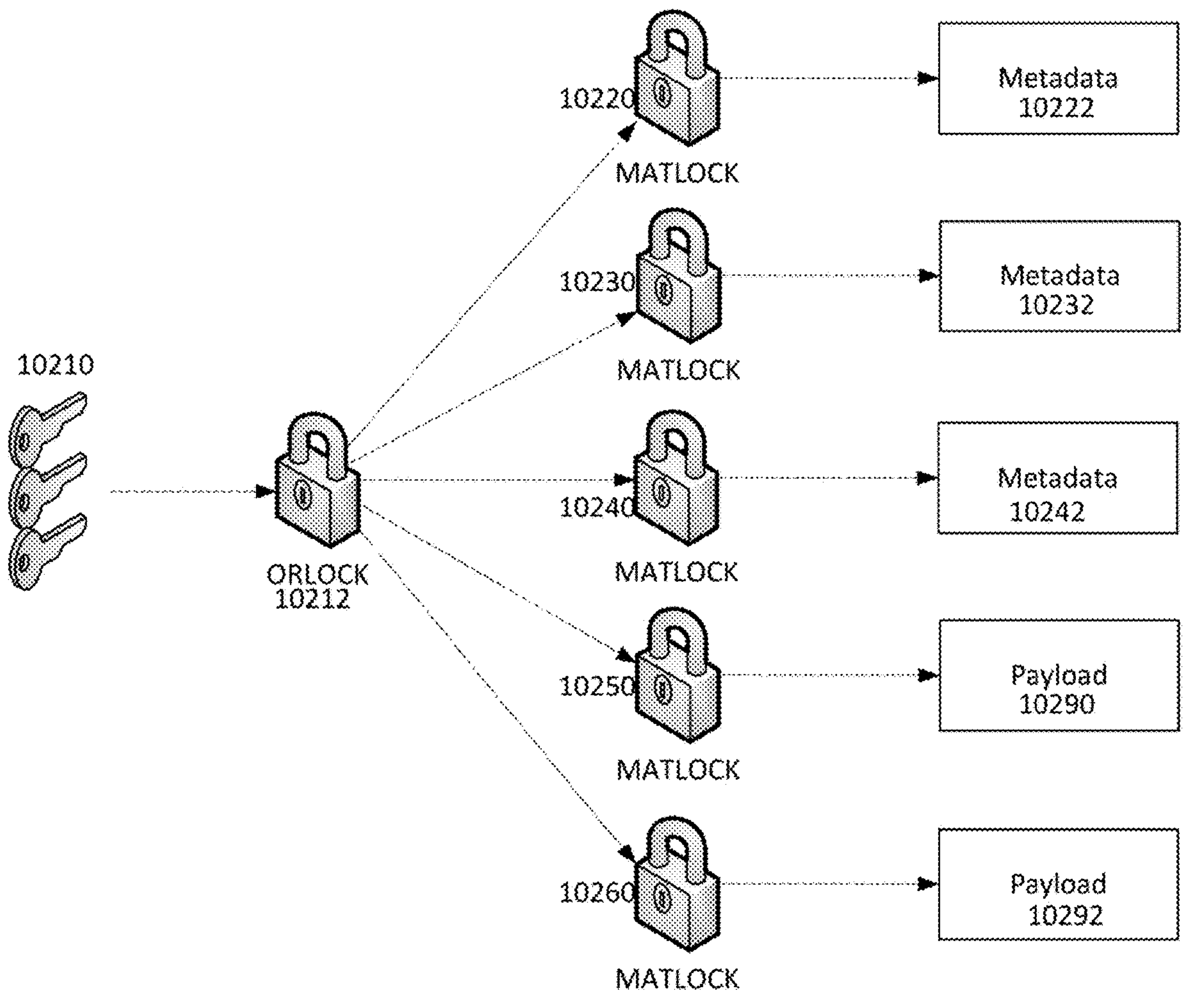
FIG. 102 shows a simplified embodiment of a direct locking model with multiple payloads.

FIG. 102 shows a simplified embodiment of a direct locking model with multiple payloads: this lock graph may show a flat topology for a Nut rather than the usual linear one. The ORLOCK 10212 may be the interesting node in that there may be several ways to implement the multiple linking keys needed to connect it to five different Lock Nodes. In one embodiment, the Output section of the ORLOCK node 10212 may contain five output keys. In another embodiment, an output linking key map may be embedded as a Key Map in the Keyhole and then may be propagated into the Output section. Furthermore, the Stratum Keys may also play a role as to which keys may access the various nodes.

Figure 103:
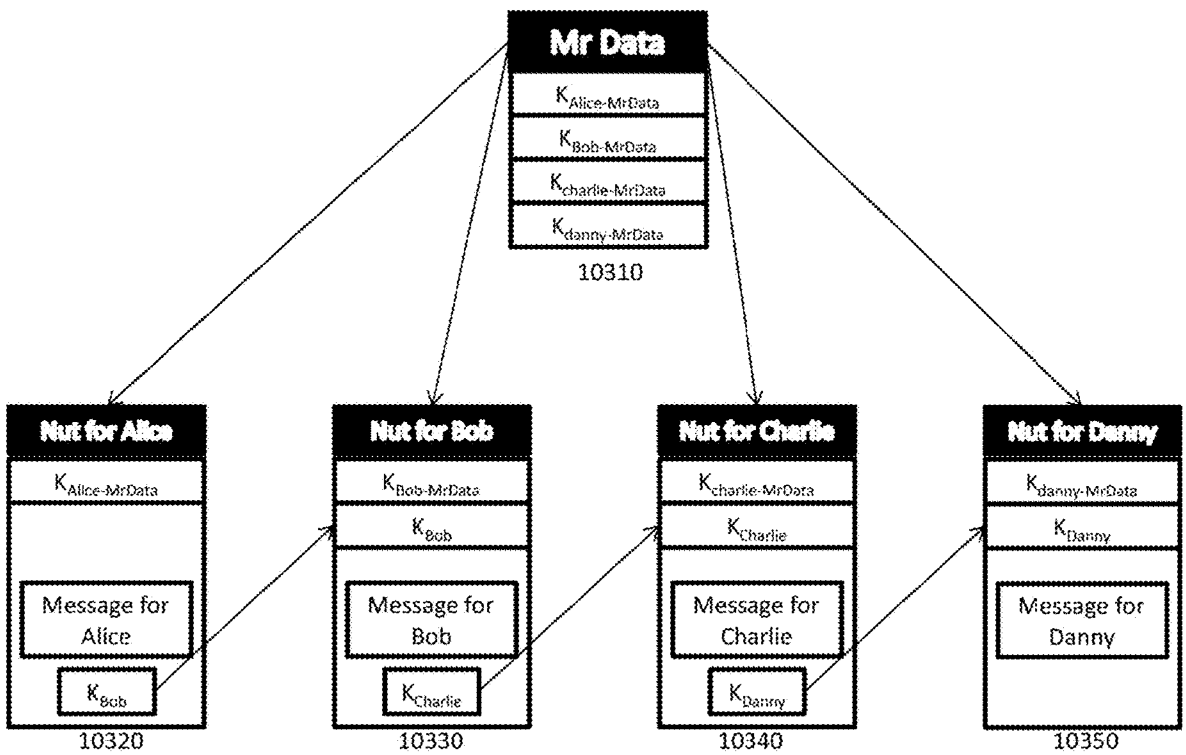
FIG. 103 shows a simplified embodiment of an ordered message passing exhibiting collusion resistant design.

FIG. 103 shows a simplified embodiment of an ordered message passing example: it may be a collusion resistant design using Nuts and Relationship Based Keys (RBK. A forward reference). Mr. Data 10310 may have a relationship each with Alice, Bob, Charlie and Danny. Some or all the participants may know each other. His relationship may be symbolized by having relationship based keys with each person. Mr. Data may want to send a set of secret instructions to each person but he may want the messages to be read in a certain sequence without the possibility of peeking ahead by collusion amongst the participants. Therefore, Mr. Data may construct these four Nuts with specific contents in each. The Nut sent to Alice 10320 may only be opened by Alice because it may be locked using the RBK set between Alice and Mr. Data. Inside 10320 may be a message for Alice and a key for Bob, $K_{Bob}$. She may read her message and may send Bob the key $K_{Bob}$. The Nut sent to Bob 10330 may employ a MATLOCK which may only be opened using two keys simultaneously: Bob's RBK key between Bob and Mr. Data and the key $K_{Bob}$ from Alice. Inside 10330 may be a message for Bob and a key for Charlie, $K_{Charlie}$. He may read the message and may send Charlie the key $K_{Charlie}$. The Nut sent to Charlie 10340 may employ a MATLOCK which may only be opened using two keys simultaneously: Charlie's RBK key between Charlie and Mr. Data and the key $K_{Charlie}$ from Bob. Inside 10340 may be a message for Charlie and a key for Danny, $K_{Danny}$. He may read the message and may send Danny the key $K_{Danny}$. The Nut sent to Danny 10350 may employ a MATLOCK which may only be opened using two keys simultaneously: Danny's RBK key between Danny and Mr. Data and the key $K_{Danny}$ from Charlie. Inside 10350 may be a message for Danny. He may read the message and Mr. Data's plan for ordering the messages may have worked.

In the cybersecurity field, a 'back door' feature may bring forth negative connotations in the various dialogues surrounding the topic. Traditionally, back door mechanisms may have been implemented at the application levels which may have allowed unfettered access to the data being processed by that application. This type of application-level access may have been construed as a severe compromise to the security of the data processed by that application depending upon which party gained access to that back door entry. The perception of compromise in such situations may have been well founded due to the prevalence of such applications mostly handling unencrypted data within its own application memory thereby potentially granting access to cleartext data to the back door user. In NUTS and in particular in a Nut's locking model, some may view the use of a Master Key as a type of back door into a Nut; however, technically it may be quite different because in all locking models of a Nut, all doors (keyholes) are front doors and requires the proper cryptographic key to gain access into the Nut. The NUTS API or any NUTS related application embodiment may not have an intended back door designed at the application level. There may be numerous legitimately good reasons to have Master Key entries available to Nuts, but all such entries may only be defined by a secret key and may be directly noticeable by a cursory examination of any Lock Node's Input Section. Therefore, any application attempting to install a back door type functionality within a NUTS related application may only do so after first gaining access to a Master Key for the target set of Nuts, and it may only be applicable to those Nuts where that Master Key is valid. This may illustrate the flexibility, compartmentalization, protection and/or resiliency of the data centric approach to the security of a Nut.

In some or all methods of access control in NUTS there may be involved a pattern of hiding cryptographic keys within encapsulated data structures whose unfolding may reveal other keys which may allow access to a target dataset. In the embodiments illustrated in this disclosure, most of these key hiding methods may use data encapsulation and or data folding methods. The method of hiding access keys may be a preference made by the implementer or it may be a parameterized setting withing each nut. These methods may comprise data folding, data encapsulation, attribute-based encryption, functional encryption, authorization tokens from reference monitors, or any other method that may provide selective cryptographic revealing of subsequent access keys when provided with access material that decrypts or unlocks its cryptographic mechanism. The demonstrative embodiments in this disclosure may have been chosen for their simple and straightforward mechanics and their well-known characteristics. Other equivalent mechanisms may streamline or make more efficient certain aspects of the embodiments but they may still essentially provide the same functionalities, that of controlling access to access attributes that may grant access to a target dataset with precision and may be independent of any reference monitors by default. Any equivalent access attribute revealing methodology may be substituted for the methods illustrated so far to provide the same level of protection for the contents of a nut.

This may conclude the section about the Nut container and its internal workings. The internal mechanisms may be embodied directly or by the usage of SDFT methods which may ease the coding and management of such an embodiment. The payload of the Nut may be what the Nut ultimately may protect which may be any storable digital data such as but not limited to a text file, a binary application, an image file, access keys to a remote system, executable scripts, credentials to establish a computer-to-computer connection securely, entire databases, operating systems, links to other Nuts, streaming data and/or text messages. Due to the Nut's ability to describe what it may be holding through its rich configurable metadata, the standard list of common file types may fall far short of its holding capabilities. The Lock Node architecture may allow for payloads to span Nuts thus it may result in unlimited logical container sizes. If solid state NUTS compatible chips or circuitry may be available, it may be possible to turn a physical device into a Nut itself thus the device may only be accessed by the key holder. A series of such devices may constitute entire networks and intranets that may be operable only with proper authentication. The flexible nature of the modular Lock Node design may permit infinite variations of locking configurations for a Nut. In the following sections, various systems and/or methods may be introduced which may use Nuts as the basis of secure storage to show how some common services and methodologies may be expanded, improved and re-designed to offer capabilities that may have seemed beyond the reach of the average user.

Modular I/O

Figure 104:
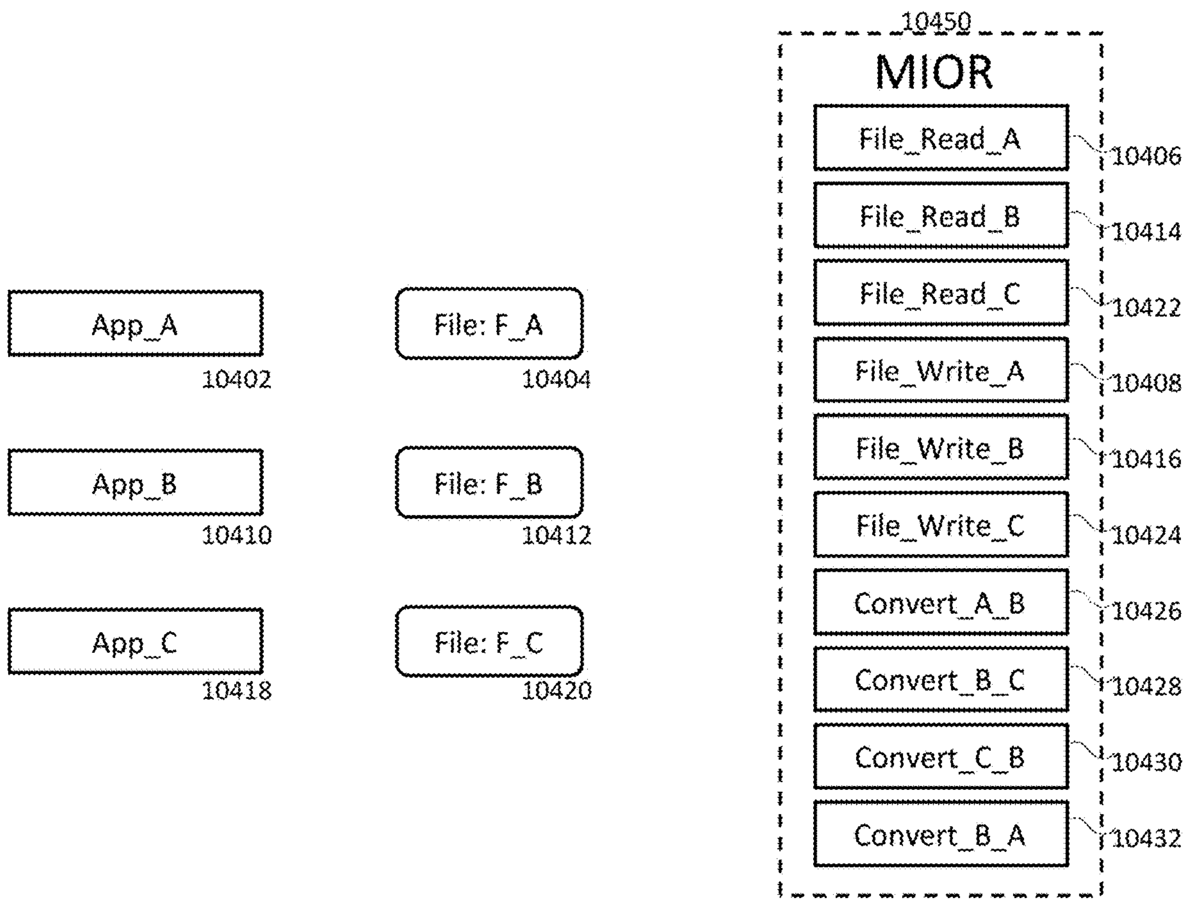
FIG. 104 shows a block diagram of typical components of Modular I/O.

A significant amount of a programmer's efforts may be spent on making sure data may be properly brought into a program, transformed in its running memory space, calculated and/or edited and then may be properly stored persistently. A nasty byproduct of this mode of application development may be that of the eventual obsolescence of file formats and their various versions. Owning, possessing and controlling one's own data may be useful and admirable goals but of what use is it if you may not read it properly? The ability to read a format, write a format, act on the read data and/or display the data read may constitute some of the fundamental components of a typical program. Modular I/O (MIO) may be a system and/or method of modularizing these logical operations into a repository of modular components which may be used by anyone who may access it. A byproduct of MIO may be the ability to create file format conversion modules which may allow users to access past versions of file reading and writing routines so that their older data may be readable. This may be called backward compatibility. A concept of forward compatibility may be offered as well but the utility of this feature may be dependent on the skillfulness of the programmer who may design the application modules. It may be a preferred embodiment of a MIO system that some or all modules may be encapsulated in Nuts therefore the authentication, protection and/or access control of each module may exist by default. FIG. 104 shows the typical components in Modular I/O. Element 10450 may be a Modular I/O Repository (MIOR) which may be a server process that may store and organizes MIO components. A MIOR may be embodied as a local and/or remote server type application that may act as an intelligent cache for such modules. In other embodiments a MIOR may have a local cache on the local device so it may better facilitate commonly requested MIO modules. A typical application 10402 that may read and/or write to a file 10404 may be conceptually and programmatically broken up into modules to read 10406 and to write 10408 the file. File 10404 may be formatted in a specific format "A" that may be specific to application 10402. Similarly, this figure shows two other applications 10410 and 10418 with corresponding data files 10412 and 10420 and their respective read and write modules 10414, 10422, 10416 and 10424 which may be stored in the MIOR 10450 for the specific formats that they may be in "B" and "C". The MIOR may contain other modules that may perform different tasks or procedures for the application. Depicted by 10426-10432 may be file conversion modules which may perform transformations from one file format to another as specified by its respective labels: module Convert_A_B 10426 may take data read into an application's memory from file format "A" by file reading module 10406 and then it may transform the memory structure to that resembling a memory structure that may be created by the file reading module File_Read_B 10414.

Modular I/O: Reading and Writing

Figure 105:
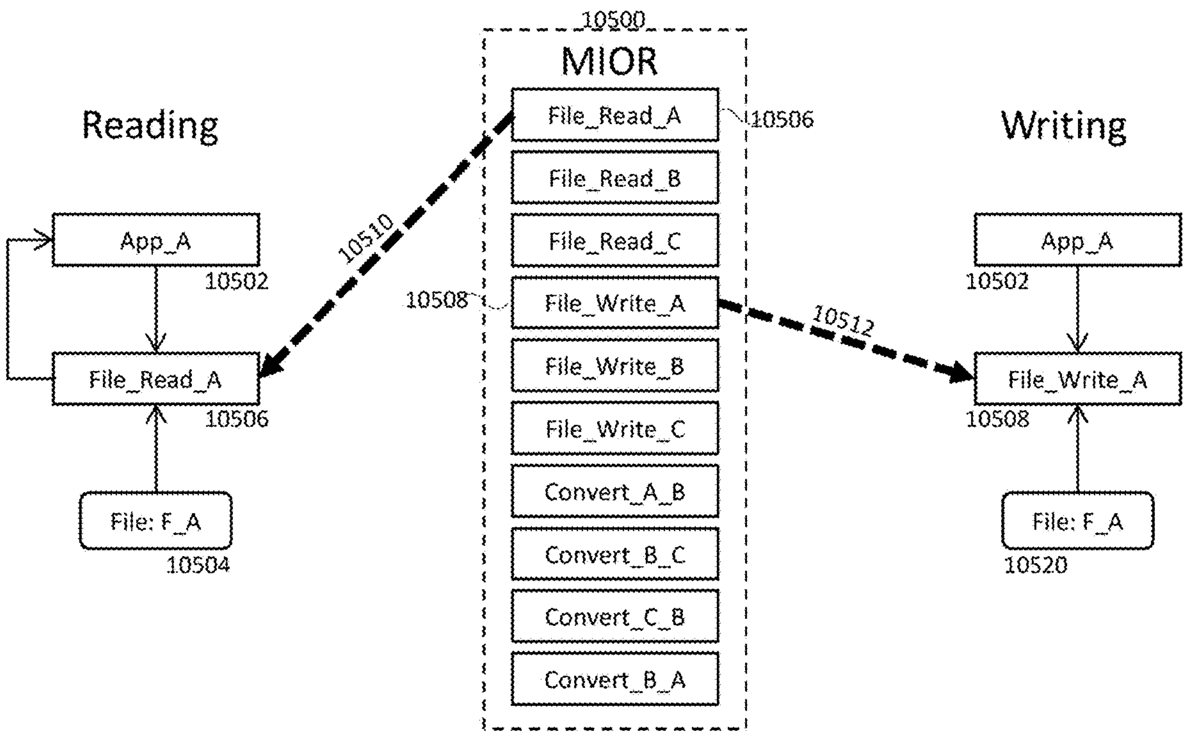
FIG. 105 shows an illustration of simple reading and writing operations using the MIOR.

FIG. 105 shows a simple reading and writing operation using the MIOR 10500. Application 10502 which may process files that may be stored in file format "A" may read the file F_A 10504 formatted in format "A" by requesting a file reading module File_Read_A 10506 from the MIOR 10500. The module 10506, if found, may be transmitted 10510 to App_A 10502 at which point App_A 10502 may install and may execute file reading module File_Read_A 10506 on file F_A 10504. Module File_Read_A 10506 may perform the file reading on file F_A 10504 and may construct the internal memory structure that may represent the contents of file F_A 10504. This memory structure that may represent the contents of file F_A 10504 may be then transferred to the calling application App_A 10502. Once successfully transferred, App_A 10502 may continue to perform its functions with the contents of file F_A 10504 that may be present in its running memory space. In other embodiments, there may be no need to transfer the memory structure to App_A 10502 once the file contents may have been read by file reading module File_Read_A 10506 if there may be a facility whereby both the file reading module 10506 and application module 10502 may share the same memory space.

When application App_A 10502 is ready to store the modified contents of file F_A 10504 back into file form, it may contact the MIOR and may request a file writing module for file format "A" called File_Write_A 10508. Upon receiving 10512 module 10508, App_A may install and may execute it using the same methodology for transferring application memory structures as the reading process. The writing module 10508 may perform the write operation to persistent storage which may create a modified file F_A 10520. The requests to the MIOR for the reading and writing modules 10506 and 10508 may be done in any sequence that may be deemed appropriate by the application developer. In one embodiment, the application may request some or all relevant I/O modules up front before proceeding in order to be sure that some or all necessary I/O operations may be performed by the application which may prevent any undesirable failures later on. In another embodiment, there may be a locally cached MIOR of previously fetched modules by previously run applications that may be maintained in order to expedite the request and fetching procedures.

Figure 106:
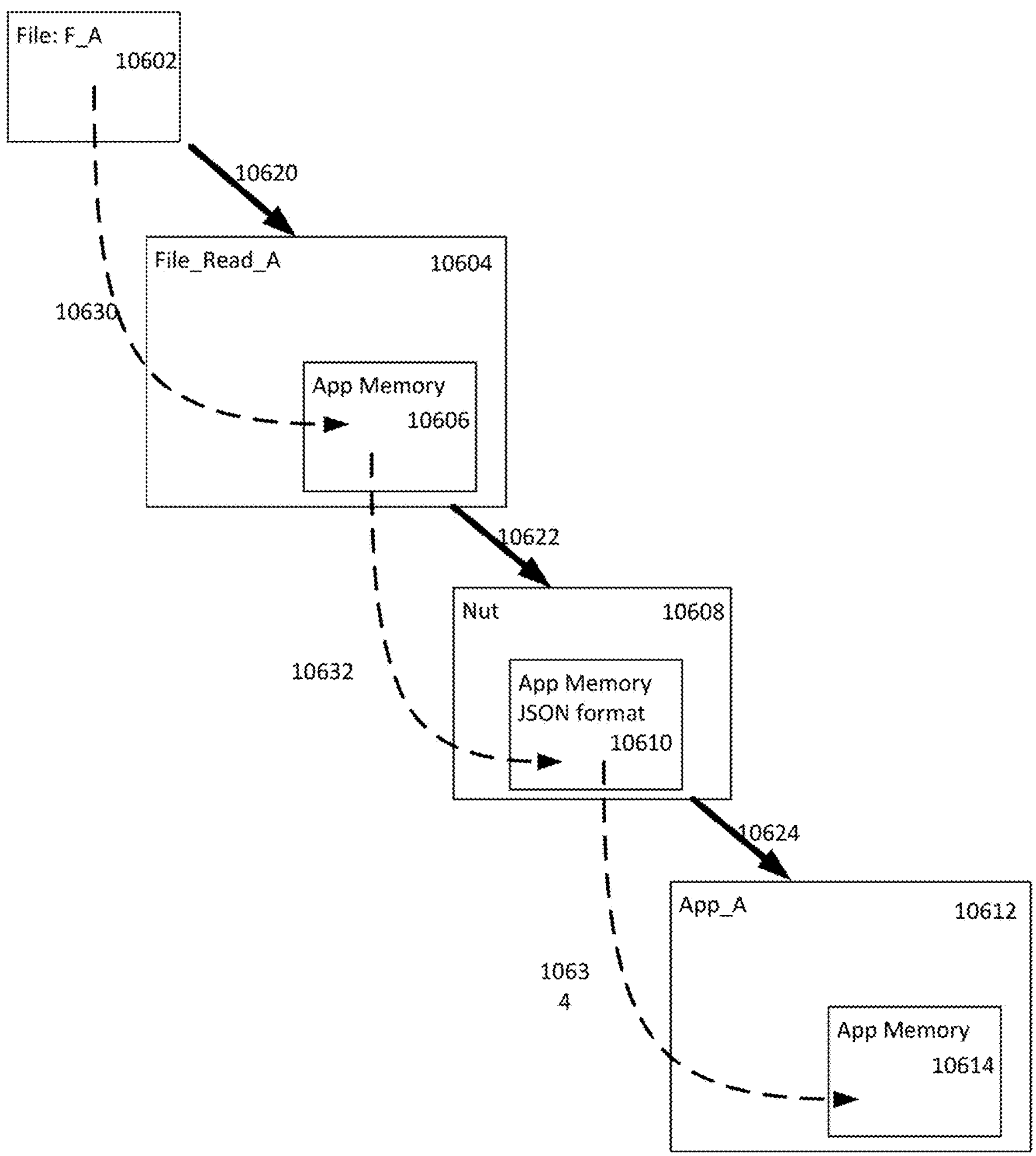
FIG. 106 shows the data transformations and transfers that may be involved in a typical MIO file reading operation.

There may be many methods of transferring and/or sharing the memory structure between two or more logical processes to a person having ordinary skill in the art such as but not limited to shared memory segments, memory mapped files, databases, inter-process messages, binary memory dump files, and/or converted memory dumps. The preferred method of application memory transfer in a MIO system may be to use converted memory dumps between processes. JSON read and write functions may be modified to recognize binary data and automatically may convert them to and from base64 encoding or other binary-to-text encoding schemes. FIG. 106 shows the data transformations and transfers that may be involved in a typical MIO file reading operation. MIO reading module File_Read_A 10604 may read 10620 the file named F_A 10602 in format "A" into its running memory 10606. Thus, the relevant contents of the file 10602 may be represented 10630 in the application memory structure 10606. The application memory may be stored into a JSON compatible data structure 10606 and may be marshalled into text form 10610 using a JSON write function call. Optionally, the JSON output may be embedded into a Nut container 10608 for added security. Thus, the application memory 10606 may have been converted and stored 10608 outside of the reading module 10604. The Nut 10608 may then be opened and read into memory by App_A 10612 and a JSON read may be performed on the data parcel 10610. Thus, reconstructing the data into App_A's 10614 running memory. The data transfer methods 10622 and 10624 may include but is not limited to command line arguments, inter-process messages, and/or data file(s). The read application and/or data processing application may be separate processes on different machines, the same machine, separate threads or separate cores; or the applications may be a single logical process on a local or remote machine with the dynamic capability to modify its running code on the fly.

Modular I/O: Backward Compatibility

Applications may undergo progressive changes over time by issuing version changes with enhancements throughout its lifetime. Many of these version changes may include format changes of the storage files used to save the user's works. Historically, this may lead to two issues: encumbrance and obsolescence. Encumbrance may be when software gets bloated due to adding backwards compatibility capabilities into every version for every format change for the life of the product line. This may involve quite a number of format version changes. Furthermore, if there may be other third party or open formats that the application may want to handle, then it may result in more software bloat. FIG. 105 illustrates how for any version of any format that the application may utilize, if modular read and write modules may be available in the MIOR, then the file may be read and processed without any excessive bloat. Furthermore, FIG. 105 illustrates how newer read and write modules may be independently added to the MIOR and every application that may communicate with the MIOR may now have access to the additional formatting modules without any program modifications. These newer modules may be the ability to read different versions of a file format for the same application product line or it may be compatibility modules to read and write third party file formats written by anyone including the application developer.

Figure 107:
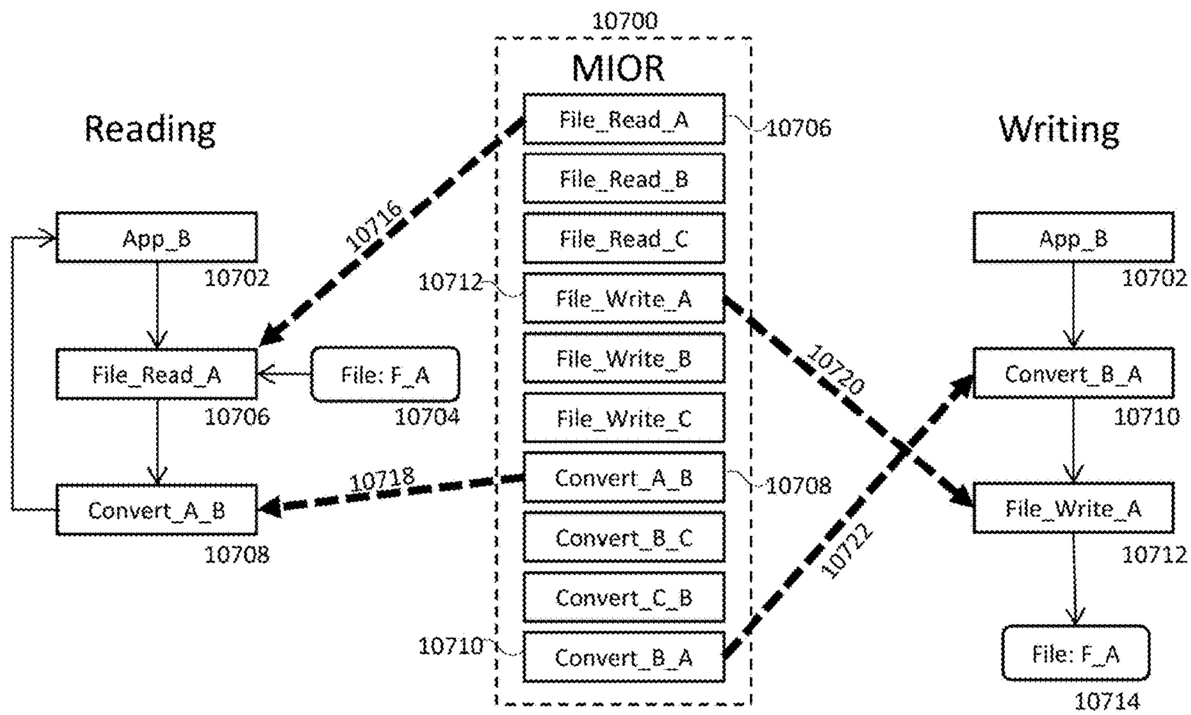
FIG. 107 illustrates how backward compatibility of file formats may be facilitated using Modular I/O.

FIG. 107 shows a backward compatibility example where the version of the application App_B 10702 may be more recent and may use a corresponding newer format version "B" of the data file but the user may desire to read and write an older version "A" of the file format 10704. Data conversion modules such as 10708 and 10710 may be created and stored in the MIOR 10700 for such cases. A conversion module may be responsible for reading in one format and producing another format: in this example conversion module 10708 may read in an "A" formatted file and may convert it into a "B" formatted file; conversion module 10710 may read in a "B" formatted file and may convert it into an "A" formatted file. The file F_A 10704 may be presented to App_B 10702 where it may determine that the file may be in an incompatible format from its metadata and may proceed to make a request to the MIOR 10700 for the reading module sequence that may be needed to read "A" and may produce "B" files. The MIOR 10700 may respond by sending the following modules to App_B 10702: File_Read_A 10706, File_Write_A 10712, Convert_A_B 10708 and Convert_B_A 10710. App_B 10702 may invoke File_Read_A 10706 on file F_A 10704, File_Read_A 10706 then may invoke Convert_A_B 10708 and may transfer its memory structure in "A" form to the module 10708, then module 10708 may convert the data received into "B" form and may transfer it to App_B 10702. When App_B is ready to save the modified data back to file F_A in "A" format, then it may invoke Convert_B_A 10710 and transfer its memory structure in form "B" into the module 10710, then Convert_B_A 10710 may convert its memory structure to form "A" and may invoke File_Write_A 10712 and may transfer its memory structure in "A" form, then File_Write_A 10712 may write over file F_A 10714 with its modified contents in form "A" and may format the file writes in file format "A". More complex examples may be where several conversion modules might be called in sequence to perform an iterative conversion process to the appropriate older format version or a developer may have added a frequently used version change converter modules such as Convert_B_F and Convert_F_B in order to streamline such requests.

The software bloat may be illustrated with a simple calculation: suppose a popular application may have undergone 5 major revisions, 3 file format versions across 3 operation systems with 3 major version changes each over 10 years. Let's also suppose that every one of these changes may have required a different version of the I/O routines for the applications. This may potentially lead to the most current version of the application to carry up to 135 versions of its I/O functions within itself. Granted that this may be an extreme case, one may understand the proliferation of program code that may be generated in order to maintain backward compatibility in an application over time. This characteristic may be referred to as the encumbrance property of software.

A properly maintained MIOR 10700 with consistently updated modules being added to its repository may act as a historical I/O format library and may allow users to access older versions of their data files at any time in the future: this may address the issues of software and data format obsolescence. When an application may be no longer produced, sold, and/or maintained, its useful life may be shortened drastically because newer versions that may allow it to run on newer operating system versions may not be forthcoming. When an application may no longer be run on modern computers due to incompatibilities, the data files formatted by the application may be difficult to access. Clever users and developers may have found various solutions to these issues but it may require much effort and/or specialized knowledge on their part. Using a MIOR may require that at least one developer may maintain the modules that may be associated with the now defunct application and he may make newer versions of the modules to be added periodically that may be compatible with newer versions of various operating systems. This type of routine maintenance may be automated using automated unit testing tools and auto-generating OS type and version appropriate modules in a timely manner. The updated modules may be inserted into the MIOR and everyone that may have access to the MIOR may benefit from the developer's work; if the particular MIOR may be accessible by everyone on the Internet, some or all users on the Internet may benefit from it automatically without requiring the user to be knowledgeable about the lower-level issues and those processes which may be invoked to automatically resolve them. Software backward and forward compatibility issues may be referred to as the obsolescence property of software.

Modular I/O: Forward Compatibility

Figure 108:
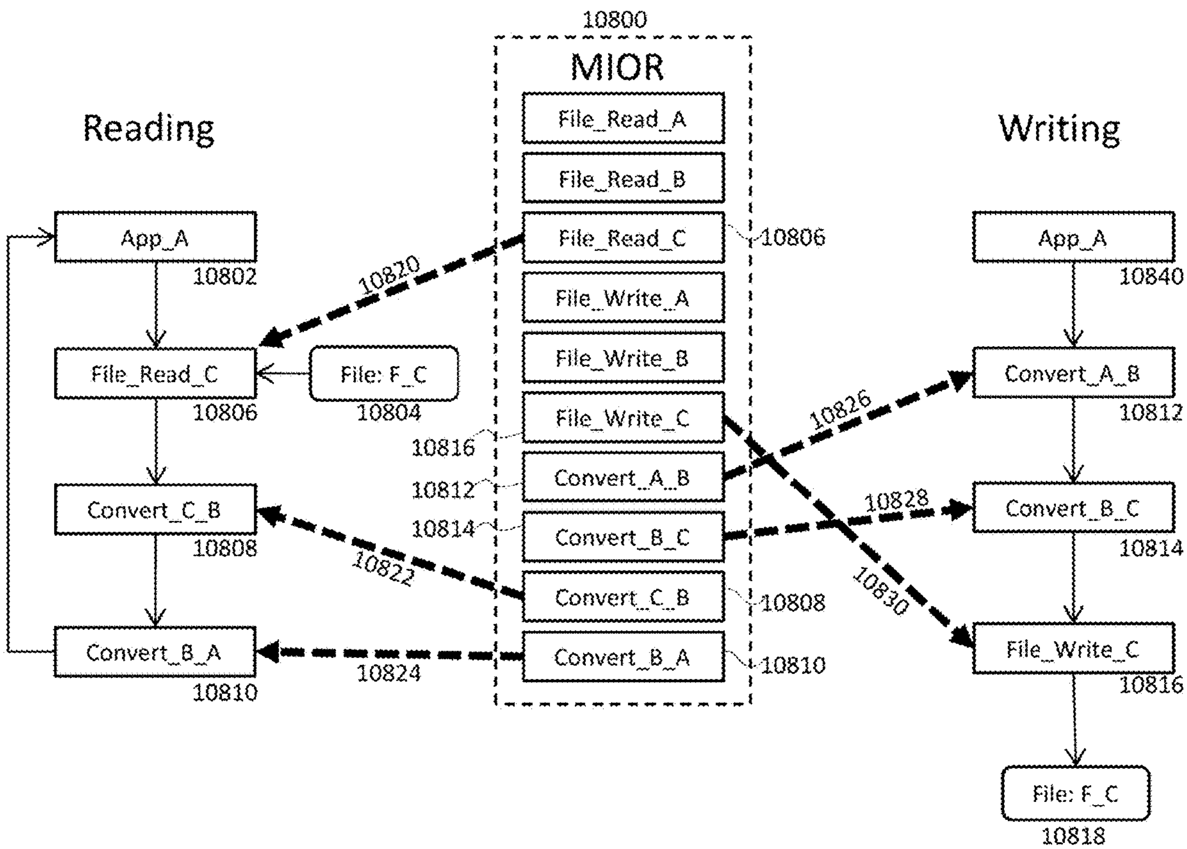
FIG. 108 illustrates how forward compatibility of file formats may be facilitated using Modular I/O.

A user sometimes may experience a situation where he may have bought, installed and/or used an application many years ago but he may have not purchased the subsequent upgrades to it over the years. However, the application may still be functional for him but it may only read and write file formats that may be compatible to his older version of the application. The newest version of the application may have introduced a newer file format with additional features at some point in the past. This situation may present two problems for the user: 1) his version of the application may not read files formatted in the latest format version, and 2) other programs that may read the latest format from this application may not be able to access his older formatted data. The solution to the first problem may be called a Forward Compatibility Read operation whereby his older application may directly load a set of modules from the MIOR that may perform progressive conversions on the data which may allow him to read files formatted in a newer version using his older program. The solution to the second problem may be called a Forward Compatibility Write operation whereby his older application may directly load a set of modules from the MIOR that may perform progressive conversions on the data which may allow him to write files formatted in a newer version using his older program. Programs built with forward compatibility in mind may make this type of transition easier and seamless using MIOR with minimal or no loss of functionality. Newer features offered in more recent format versions may be optimally mapped to less sophisticated application constructs or may be substituted with just the raw data and allow the user to modify it at a later time. FIG. 108 illustrates these two different logical operations with examples.

Forward Compatibility Read operation: App_A 10802 may be compatible with files formatted in version "A" but the user may want to read a newer file format "C". This request may be conveyed to the MIOR 10800 and it may reply with a sequence of modules that may perform these regressive conversions: File_Read_C 10806, Convert_C_B 10808 and Convert_B_A 10810. The module File_Read_C 10806 may read the file F_C 10804 which may be formatted in version "C". The module 10806 then may invoke the regressive conversion function Convert_C_B 10808 and may transfer its memory structure to it. Module Convert_C_B 10808 may perform the conversion on the data in memory and may produce a memory structure compatible with format "B", a previous file format version of the application. Module 10808 then may invoke the regressive conversion function Convert_B_A 10810 and may transfer its memory structure to it. Module Convert_B_A 10810 may perform the conversion on the data in memory and may produce a memory structure compatible with format "A", the desired file format version compatible with the older application App_A. Module 10810 may transfer its memory structure in format "A" to the calling application App_A 10802 and App_A may process it. Thus, a newer version of a file format may be read by an older version of the application without modifications to the application.

Forward Compatibility Write operation: App_A 10840 may be compatible with files formatted in version "A" but the user may want to write a newer file format "C" which may be beyond its original capability. This request may be conveyed to the MIOR 10800 and it may reply with a sequence of modules that may perform these progressive conversions: File_Write_C 10816, Convert_B_C 10814 and Convert_A_B 10812. App_A 10840 may invoke Convert_A_B 10812 and may transfer its memory structure to it. Module Convert_A_B 10812 may perform the conversion on the data in memory and may produce a memory structure compatible with format "B". Module 10812 then may invoke the progressive conversion function Convert_B_C 10814 and may transfer its memory structure to it. Module Convert_B_C 10814 may perform the conversion on the data in memory and may produce a memory structure compatible with format "C". Module 10814 then may invoke the file write function File_Write_C 10816 and may transfer its memory structure to it. Module File_Write_C 10816 may write the file F_C 10818 which may be formatted in version "C", the desired file format version. Thus, a newer version of a file format may be written by an older version of the application without modifications to the application.

This disclosure is not limited by the two examples shown. Conversion modules may be produced to access some or all versions of file formats for an application on any operating system. Conversion modules may not be limited to conversions within its application product line but may be written to perform conversions across different application product lines. Conversions modules may include conversions of data to different formats such as but not limited to file to database, database to file, file to data stream, data stream to file, file to webpage, webpage to file, file to cloud storage, cloud storage to file and/or others.

Modular I/O: Display

Figure 109:
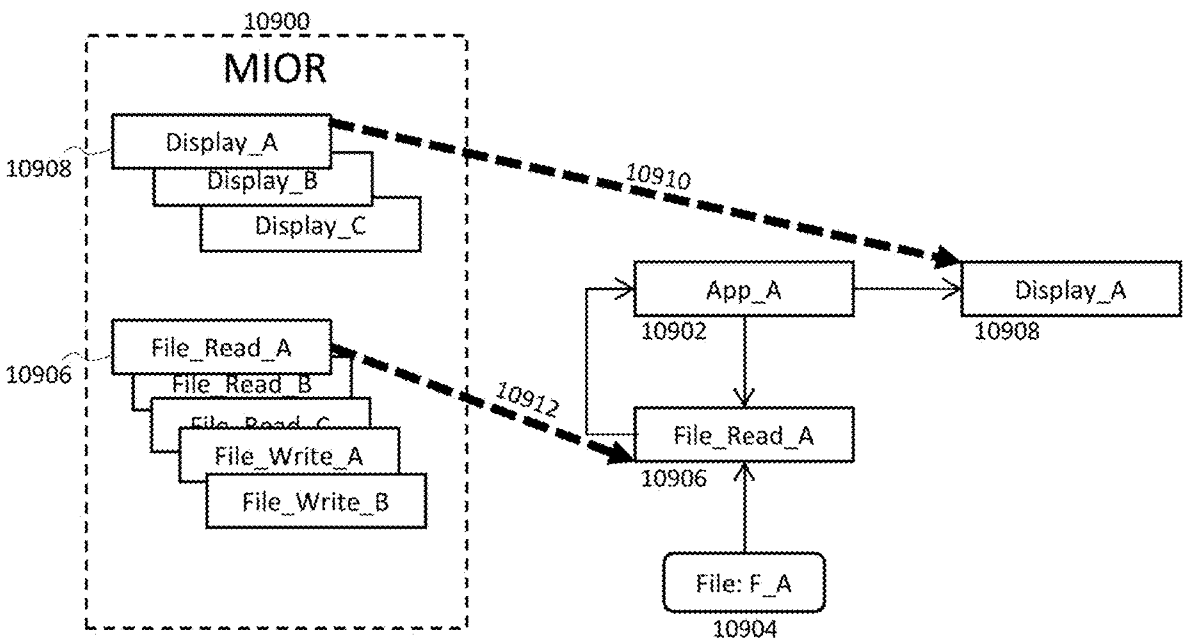
FIG. 109 illustrates how modular display may be facilitated using Modular I/O.

FIG. 109 shows a diagram of a MIOR Display module in operation. Once an application App_A 10902 may have successfully read into its memory the data from a file F_A 10904, it may proceed to use the functionality of module Display_A 10908 to display the contents of file F_A 10904 to the user. In display modules, the functional aspect of the module may vary greatly depending on the application, data content and/or developer's design. Some modules may be designed to use shared memory methods which may allow the display module to directly access the data in the application memory, others may transfer the data to the display module and which may allow it show it. Other embodiments of the display module may be screen formatting instructions and/or templates for the type of data to be shown and possibly may be edited. This modularization of display functionalities may allow for custom display modules to be created for various hardware and OS platforms while allowing the calling program to remain relatively unchanged.

The Catalog of Collections architecture discussed later in the NUTbook section may make use of the lightweight aspect of Modular Display. Instead of building ever larger monolithic applications to handle, display and/or edit different collections of datasets, NUTbook may make extensive use of the MIOR architecture which may allow it piecemeal customizations based on the type of payload in the Nut being examined.

Modular I/O: Application

Figure 110:
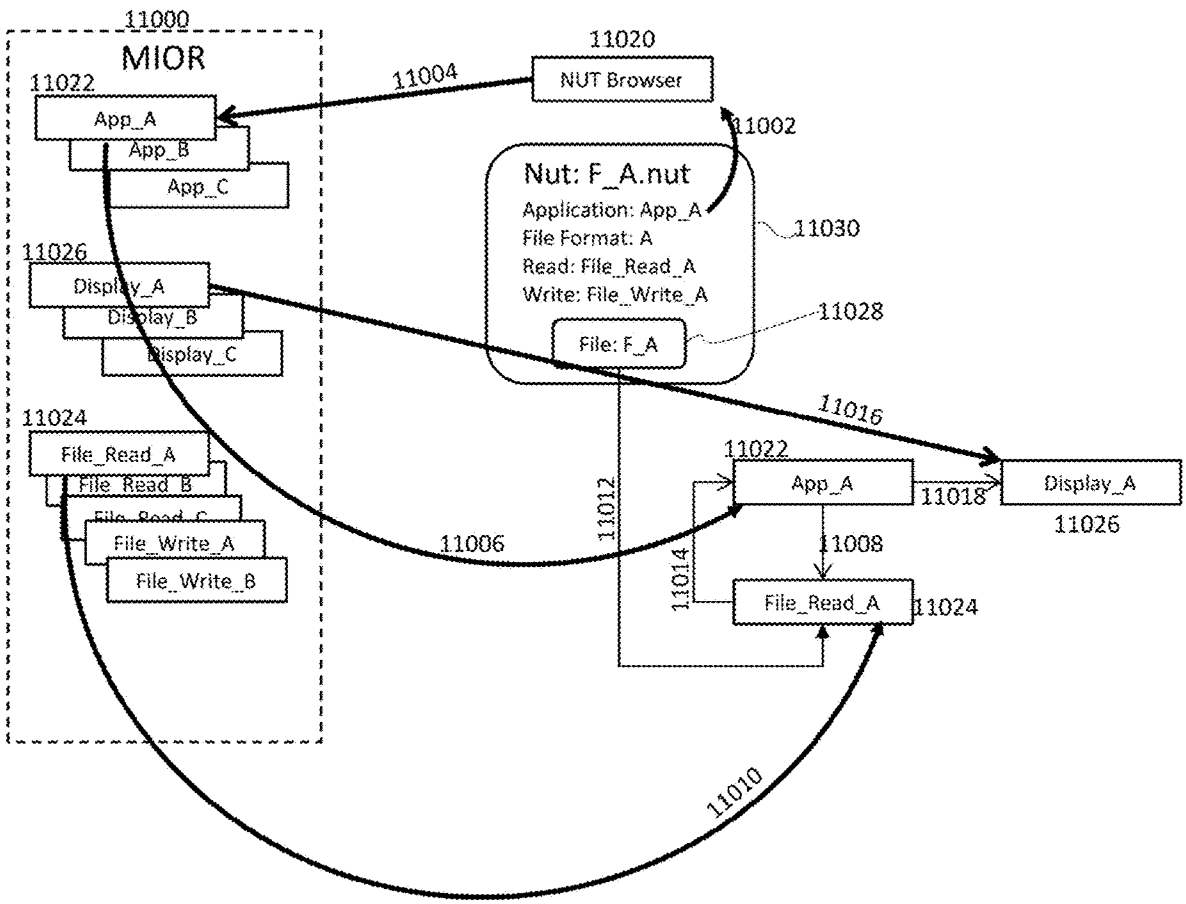
FIG. 110 illustrates how modular application may be facilitated using Modular I/O.

In FIG. 110, a MIOR 11000 may store modular application modules such as 11022. A NUTbrowser 11020 (forward reference) may be an application that may be similar in look and behavior to most file and directory browsers but it may recognize Nuts and may act upon them by looking at the Nut's extensive metadata. Within a Nut's 11030 metadata 11002 may be information pertaining to the type of payload it may be protecting and storing. When a user selects a Nut from the NUTbrowser 11020 and double clicks to open it, the NUTbrowser may open the Nut and may read the metadata to figure out what modules may be required to open the file. The metadata may include data such as but not limited to application version, file format version and/or display version. Then the NUTbrowser may make a request 11004 to the MIOR 11000 looking for application App_A 11022, File_Read_A 11024 and Display_A 11026. The MIOR 11000 may return some or all modules and the application App_A 11022 may be invoked by the NUTbrowser 11020. Once App_A is running it may invoke File_Read_A 11024 in order to read the contents of the Nut payload F_A 11028 which may be stored in the Nut 11030. After transferring the memory structure from 11024 to the calling module App_A 11022, it may invoke the display module Display_A 11026 to show the data F_A 11028 to the user.

Modular I/O Application modules may vary greatly in what they may hold and do: in some embodiments it may be a complex logical computational module; in another embodiment it may store an entire software installation package; in another embodiment it may contain some or all aspects of I/O, display and/or application functions; in another embodiment it may contain information containing a Genesis Nut which may kick start the reincarnation of a user's environment in a remote manner. The functionality of Modular I/O Application modules is not limited to these cases.

Modular I/O features such as Read, Write, Display and/or Application may be overlaid with access control mechanisms at the MIOR or container level so that only properly authorized users may access it. These access control mechanisms may include but is not limited to access control policies, ownership requirements, and/or DRM mechanisms for remunerative purposes. Most of the access controls may emanate from the properties of the Nut containers that the modules may be stored in. As this disclosure is discussed in detail further, it may be made clear as to the mechanisms by which these MIOR requests may be derived. When a data file or its contents may be encapsulated within a secure Nut container, there may be many levels of metadata available about the contents of the Nut, this metadata may specify the details of the data format such as but not limited to application version that created it, display version, file format version, size, create time, last modify time, author, type of file, and/or summary. Environmental attributes such as but not limited to OS version, application version, hardware make and/or version may be provided by the application that opens the Nut. With these pieces of information about the environment, data content and/or requested operation, the MIOR may look up the proper modules and may reply back with either a set of modules to satisfy the operation or an error message. These Modular I/O modules may run as a single or separate processes on the same machine, across different machines, across different chips or cores, across a network and other modes of running a logical process(es) on a computing device. Through these modules the problems of obsolescence, encumbrance, adaptability, compatibility and/or flexibility may be addressed in part or whole.

Nut History

The Nut container may be structured to store the history of the payload. The form of the history may comprise periodic snapshots, progressive deltas, complete event sequences or any combination of the three or any other archiving methods. The form of the history may vary depending on the type of data being stored and the preferences and design of the application and/or data. The NUTS ecosystem may include the methods and systems to support these modes of data history archiving. These three methods of archiving may be well established methods known to a person having ordinary skill in the art. The physical location of the Nut history may be in the Nut Part called the Tale (FIG. 81) and, its opacity may be controlled by the Nut RAT.

Figure 111:
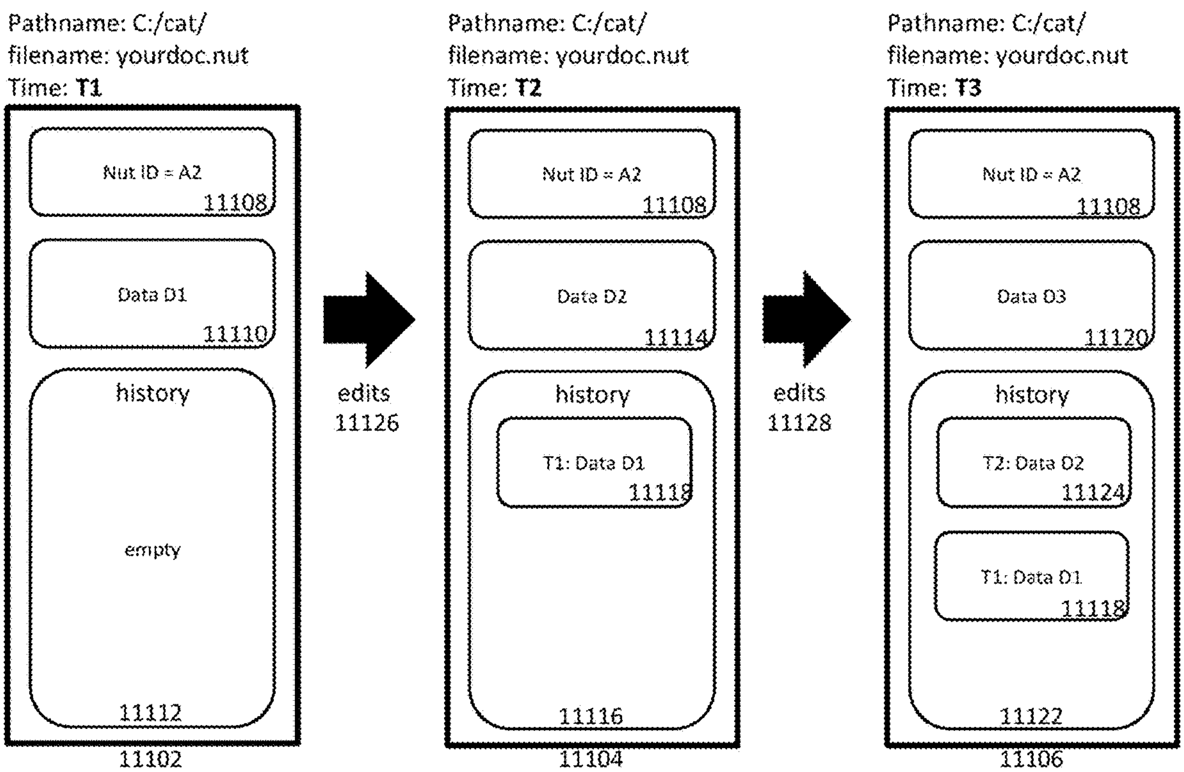
FIG. 111 illustrates the progressive changes to a Nut History over two edits and at three points in time.

FIG. 111 shows a simplified Nut schematic which illustrates the progressive changes to its history structure over three points in time covering two edit sessions of a document. At time T1, the Nut 11102 may hold data D1 11110 and its history may be empty 11112. The user may edit 11126 the data D1 11110 at time T2 and may produce a new version D2 11114. The application may employ a snapshot archiving method and may store the original version of the data D1 11110 as a snapshot of the data at time T1 11118 in the history section 11116 of the Nut. Subsequently, the user may edit 11128 the data D2 11114 at time T3 and may produce a new version D3 11120. The application may employ a snapshot archiving method and may store the older version of the data D2 11114 as a snapshot of the data at time T2 11124 in the history section 11122 of the Nut. At time T3, the history section 11122 now may hold two distinct snapshots 11118 and 11124 of the previous versions of the data D3 11120. The history 11122 of the Nut may be browsed and extracted by the user at will using simple history extraction methods at any time allowing for reversions or create entirely new documents from them. There may be Nut metadata parameters which may control the type, frequency and/or longevity of the history section in order to set reasonable history growth for the data at hand. For some textual documents, it may be practical to save some or all changes forever since its size may be relatively small when using a delta method of archiving. This may allow the Nut to produce some or all the saved versions of the document at any time thereafter. Binary documents may be archived as snapshots or deltas depending on the application. Certain event driven applications may archive the complete set of event sequences as its history. Note that Nut History may be archived within the Nut itself and may be independent of external programs and/or storage systems. As long as there may be an archival method available for the payload type in the NUTS environment, any payload may be historically archived in this manner.

Nut Log

The Nut container may be structured to store the event log of the Nut. As computer processes may read, manipulate and/or write a Nut, they may generate and leave an audit trail of the logical operations done to the Nut within the Nut itself. The audit trail essentially may exist on a per object basis from the object's perspective. Therefore, between Nut history and Nut log, the chronicle of events since inception on the data object may be stored in a single container for further review at a later time. The accuracy, content and/or granularity of the Nut archives may be dependent on the disciplined and methodical usage of these features by the developers of the applications that operate on Nuts. The physical location of the Nut Log may be in the Nut Part called the Vita (FIG. 81), and its opacity may be controlled by the Nut RAT.

Figure 112:
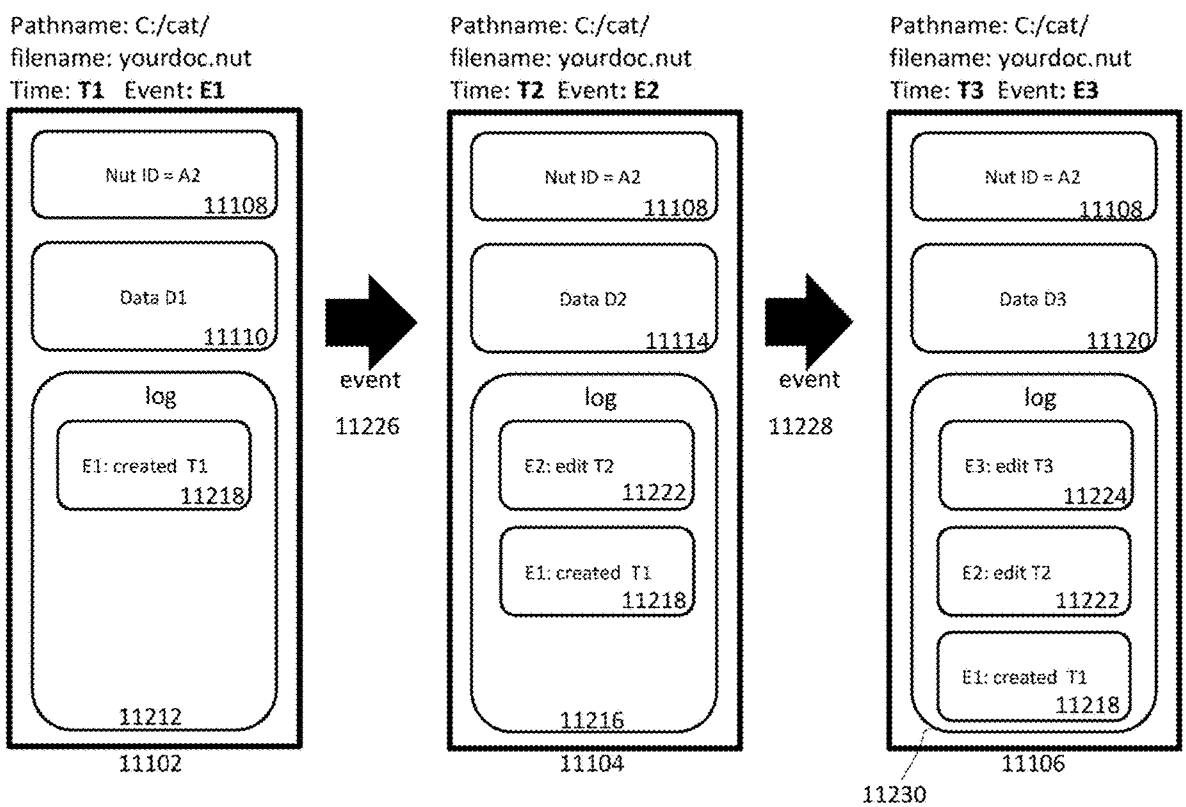
FIG. 112 illustrates the progressive changes to a Nut Log over the course of events from FIG. 111.

FIG. 112 shows a simplified Nut schematic which illustrates the progressive changes to its event log structure over three points in time covering two events occurring on the Nut. This example may continue the scenario from FIG. 111 for Nut History. At time T1, the Nut 11102 may hold data D1 11110 and its log 11212 may hold one log entry 11218 for event E1 which may indicate that the Nut 11102 was created at time T1. The user may edit 11226 the data D1 at time T2 which may create a new version of the data D2 11114 in the Nut 11104. The edit application may log an event log entry at $T_2$ into the Nut log 11216 as may be indicated by element 11222. Subsequently, the user may edit 11228 the data D2 11114 at time T3 and may produce a new version D3 11120. The edit application may log an event log entry at $T_3$ into the Nut log 11230 as may be indicated by element 11224. At time T3, the log section 11230 now may hold three distinct event log entries 11218, 11222 and 11224. The log 11230 of the Nut may be browsed and extracted by the user at will using simple log extraction methods at any time which may allow audits on the Nut. There may be Nut metadata parameters to control the type, frequency and/or longevity of the log section in order to set reasonable and appropriate log growth for the Nut.

System administrators and application developers may know the work and effort that may be involved in tracking down bugs and errors on their systems when more than one application may be involved in modifying a data object because they may have to look through the event logs of some or all the contributing applications (if they may have access to these at all) and may be filter out those event log entries that pertain to the object in question and then perhaps manually reconstruct the events in the sequence in which they might have occurred on the object. Using a Nut Log, this gathering of event logs, filtering and reconstruction may be already done at the object level from the perspective of the object. Furthermore, the metadata of the Nut may specify to the working application the level of granularity of event log message details that may be desired by the object owner. This granularity may range from a terse to detailed debug levels in order to track down various lines of inquiries. A sensitive, top secret payload may require the most granular level of event log details in order to perform an audit trail on its access history. In short, this may be a consistent and customized method of controlling the auditable past of an object by any application on a per object basis per granularity level demanded by the said object. The term consistent may refer to the consistent design and operations of the logging feature available and the term customized may refer to the per object preferences that the design may accommodate.

Relationship Based Keys (RBK)

The description of how Relationship Based Keys (RBK) may be established should sound familiar to anyone who may have used encryption tools manually: Bob and Alice may want to communicate privately and thus they may trade randomly generated asymmetric cipher keys (public parts only) with each other and may use it in a tool such as PGP or its equivalent to exchange ciphered messages and documents. The protection and management of the key pairs by Bob and Alice may be left entirely up to them. This may tend to be a deliberate and laborious task for each relationship to be established, maintained and utilized properly perhaps requiring Alice and Bob to have a primer or two on ciphers, their proper usage and/or the protection of the keys. This type of key exchange may occur when either Bob or Alice does not have an established Public Key certificate via a centralized directory or a web of trust. It may also happen if either participant feels that an added layer of privacy might be needed by creating a completely private communication channel.

What might happen if RBKs were the default method of communication for folks like Alice and Bob? What may be the consequences and what may be needed to make that happen in a painless way? The systematic aspects of the establishment, maintenance and/or usage of RBKs may be automated. It may be constructive to explore some of the properties and consequences of the consistent application of RBKs prior to delving into the details of how it may be accomplished systematically.

Characteristics of Relationship Based Keys

- The trust level between two parties may be a dynamic adjustable parameter. This may be an observation of real-life relationships between any two parties: trust may be relative. It may wax and wane over time based on events and communications.
- Unilateral adjustment of trust levels. Either party in a relationship may unilaterally change their trust level of the relationship at will with or without informing the other party.
- The relationship channel health may be determined from message context. Systems and keys may be compromised from time to time for anyone. The default usage of RBKs may allow either party to examine the content of communications and may determine the likelihood of the other person's systems or keys having been compromised. In the simplest case, a message coming from Bob without RBK ciphering may possibly be a sign of being compromised.
- The true nature of a relationship may be assessed over time. If a message of unusual nature is transmitted via RBK and the sending party's key may have not been compromised, then the sending party may have changed the nature of the relationship.
- Losing a relationship may be permanent and some or all history of the relationship may lose commercial and/or meaningful value. Unilaterally, either party may sever the relationship by blocking its messages or erasing their RBK set. This logical operation of a relationship channel may present each user with a deterministic unilateral message blocking ability.
- Parties may strictly abide by mutually amenable ground rules or risk losing the relationship—ground rules which may vary over time. Violation of implicit ground rules may result in the unilateral severing of the relationship in a permanent way, digitally speaking.
- It may allow closer expression of real-world relationships in a digital cryptographic form. Public Key cryptography in its most widely used form may be a centralized model which may be contrary to how people form relationships. RBKs may be decentralized and may use Public Key cryptography in a private way.
- Isolation of subversion. The subversion of RBKs on Bob's environment may be isolated to Bob and the RBK channels he may have established with his contacts, i.e. Alice. The damage to Alice's environment may be isolated to her channel with Bob and their mutual historical communiques. Some or all other relationship channels for Alice may be secure and may not be breached by the hackers who subverted Bob's environment.

A Personal Information Manager or PIM may be a well-known application concept in computer software. It may be widely defined as an amalgam of various functions which may provide productivity and organizational tools for an individual's use. A PIM may offer such tools as but may not be limited to calendar, address book, contact management, password keeper, notes, email manager, chat function, project management, key manager, calculator, task lists and/or activity logger. A PIM may be a combination of any of these functions or it may just offer a single function. A PIM may be designed to operate locally in an isolated manner or solely in a PIM web server or in any combination thereof. In the discussions going forward, references to such functionalities of a PIM such as an address book or chat or email manager may be understood to be either a PIM that offers any of those functions as part of its offerings or it may be its sole function.

Figure 113:
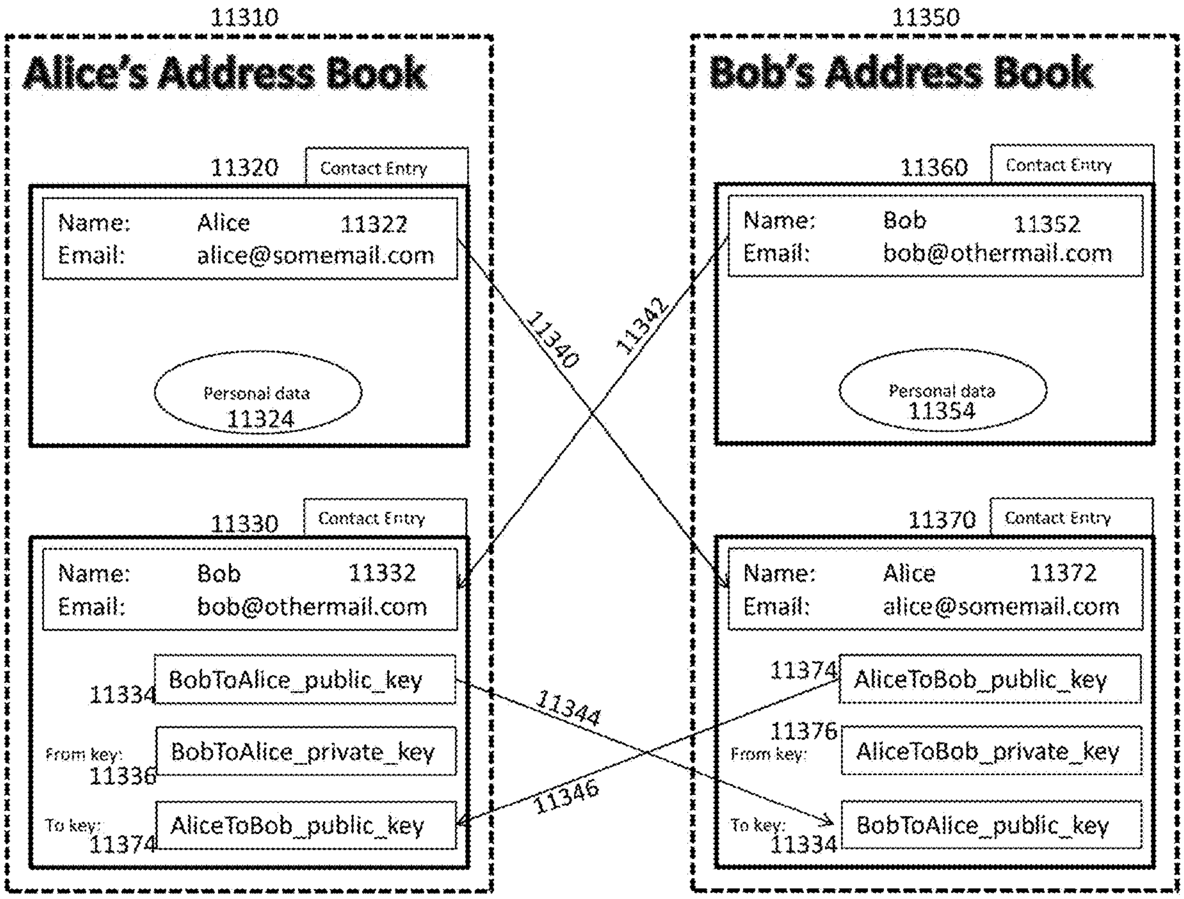
FIG. 113 shows how Relationship Based Keys may be represented in Alice and Bob's contact cards.

FIG. 113 shows how a digital address book entry between Alice and Bob may be structured to support RBKs in a consistent manner for some or all relationships in the address book. Alice's address book 11310, which may be a function offered by her PIM, may have two entries: an entry for herself 11320 and an entry for Bob's information 11330. In Alice's own entry 11320, she may have listed her own basic contact data 11322 and some personal data 11324. Alice's address book entry 11320 may be stored and may be secured as the payload in a Nut file on Alice's system. On Bob's contact card 11330, Alice may have some contact information for Bob 11332 such as his name and email address. Bob's address book entry 11330 may be stored and may be secured as the payload in a Nut file on Alice's system. Bob's address book 11350, which may be a function offered by his PIM, may have two entries: an entry for himself 11360 and an entry for Alice's information 11370. In Bob's own entry 11360, he may have listed his own basic contact data 11352 and some personal data 11354. Bob's address book entry 11360 may be stored and may be secured as the payload in a Nut file on Bob's system. On Alice's contact card 11370, Bob may have some contact information for Alice 11372 such as her name and email address. Alice's address book entry 11370 may be stored and may be secured as the payload in a Nut file on Bob's system. When Alice and Bob decide to setup RBKs with each other, they may decide to set up a private bidirectional communication channel between themselves. Alice may begin the process by generating an asymmetric key pair 11334 and 11336, storing them under Bob's address card 11330 and transmitting 11344 the public portion of the key 11334 to Bob. The transmission process 11344 may be accomplished by a passphrase secured Nut, a message written in paper, a telephone call to Bob, a message using Bob's public key known to the world, or any version of secure key exchange protocols well known to a person having ordinary skill in the art. When Bob may receive this message with the key 11334 inside, he may store it in Alice's address card entry 11370 as a key 11334 for sending messages to Alice privately. Bob then may generate an asymmetric key pair 11374 and 11376, storing them under Alice's address card 11370 and transmitting 11346 the public portion of the key 11374 to Alice using the public key that Alice sent to him 11334 to encrypt the message. When Alice may receive this message, she may decrypt the message from Bob using her private key for Bob's messages 11336. She may extract the key 11374 inside, she may store it in Bob's address card entry 11330 as a key 11374 for sending messages to Bob privately. She may create a confirmation message for Bob encrypted with key 11374 from card 11330 and may send it to Bob through any working communication medium. Bob may receive the message, then he may decrypt it with key 11376 from card 11370 and may mark his RBK set to be established and active with Alice.

The steps in this RBK setup between Alice and Bob may be automated and may be initiated with a single action button or command. This may be the operational basis of how a NUTbook may manage its Contacts Collection and may be discussed in the NUTbook section later in this document. The process may be repeated by either Bob or Alice independently for some or all the contact cards in their respective address books in their PIMs. In the end, each person may establish an RBK channel for each of their contacts which may be viewed as private communications channels for each of their relationships. If Cathy is a common friend between Alice and Bob, Cathy's RBK relationship with Bob may be different from Cathy's RBK relationship with Alice and the RBK configuration may reflect that reality.

Now that we may have defined the RBK and the context of its systematic use, what might it do for Alice or Bob? The consistent use of RBK to send messages between two entities may allow for the monitoring of their communication channel health. An example of a practical use may be SPAM email reduction. It may be estimated that a significant volume of global Internet bandwidth and data storage may be taken up by SPAM emails by both the malicious and/or commercial kinds. We may venture to assume that not many people may welcome such volumes of SPAM. Some of the usual methods of SPAM reduction may be by using filtering technologies based on content pattern recognition, domain exceptions, address exceptions and/or actually taking down prolific SPAM servers by law enforcement. In a mode where RBK encryption may be the default way of communicating, SPAM may be detected in a more deterministic way.

One of the main obstacles in the way of automating processes such as RBK may have been the significant lack of user friendly, user accessible and/or user controllable personal Public Key Infrastructure (PKI) applications. The NUTbook along with the usage of Nuts may attempt to fill the PKI gap. It may provide flexible, secure and/or user controllable methods to store, manipulate and access such information in a seamless way.

Figure 114:
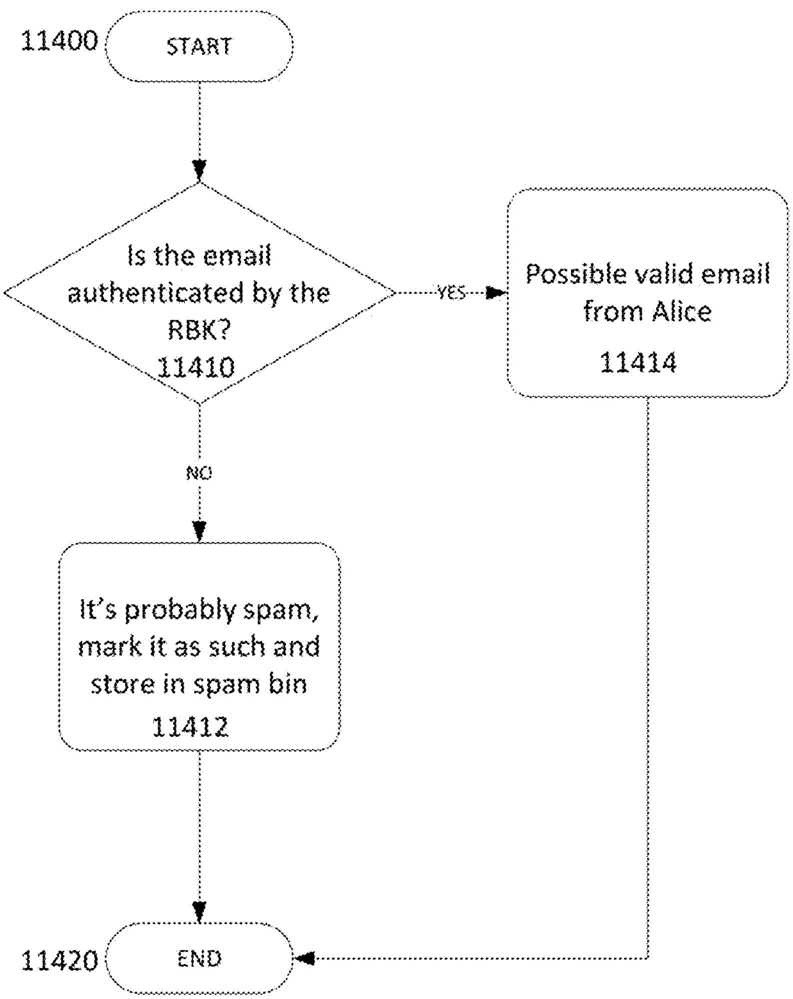
FIG. 114 shows a flowchart of how SPAM may be detected using well known email addresses and/or RBKs.

FIG. 114 shows the flowchart to reduce SPAM between Alice and Bob who may have now established a RBK communication channel and it may be their default method of communicating and they may be using well known public email addresses. If the email is encrypted via RBK between Alice and Bob, then it may probably be valid email from Alice to Bob or vice versa 11414. If either person may receive an email from the other not encrypted with RBK, then it may most likely be SPAM and may be filtered out and may be stored in the SPAM bin 11412.

Figure 115:
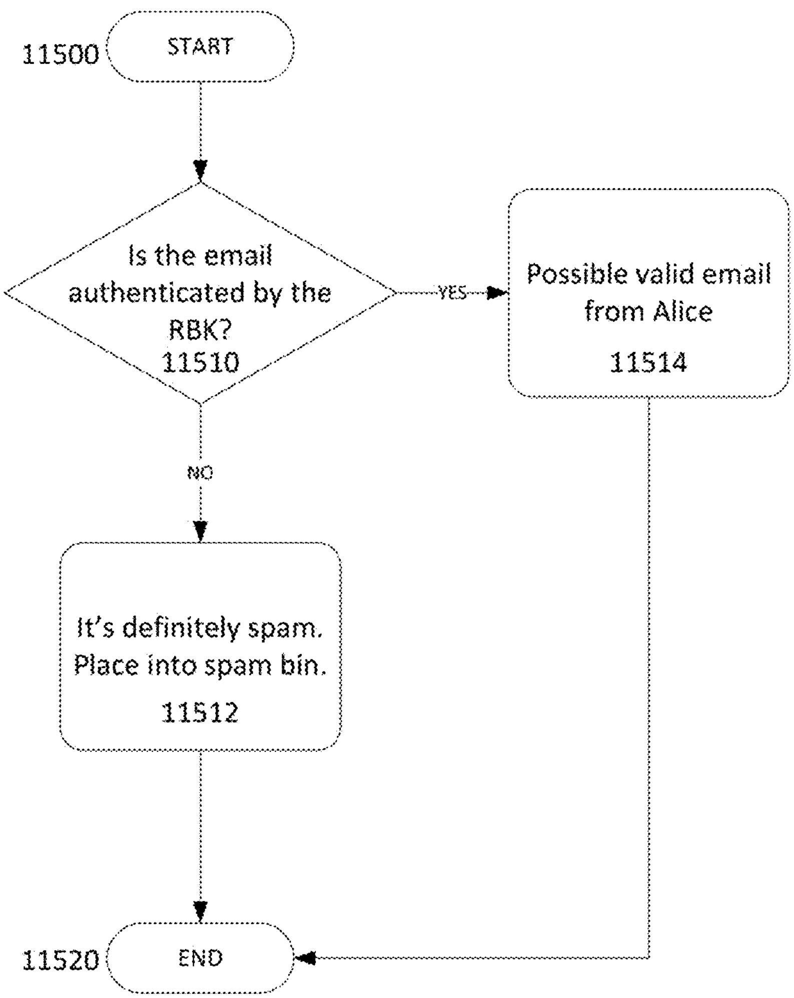
FIG. 115 shows a flowchart of how SPAM may be detected using anonymous email addresses and/or RBKs.

FIG. 115 shows the flowchart to reduce SPAM between Alice and Bob who may have now established a RBK communication channel and it may be their default method of communicating and they may be using unpublicized, private email addresses—anonymous email addresses. If the email is encrypted via RBK between Alice and Bob, then it may probably be valid email from Alice to Bob or vice versa

11514. If either person may receive an email from the other not encrypted with RBK, then it may most likely be SPAM and may be filtered out and may be stored in the SPAM bin 11512. This example may be assuming that the set of private email addresses may only be used between Alice and Bob to send each other RBK encrypted messages therefore expanding the RBK channel concept to the email address level as well. We may define this type of communication channel-oriented email addresses as Anonymous Email Addresses.

A communication channel between Alice and Bob that may consistently use RBK via anonymous email addresses may exhibit certain characteristics that may be analyzed to determine the health of the relationship itself. We may have already removed some or all unencrypted SPAM messages from the channel by default as may be described in FIG. 115. Now we may examine the context of the proper RBK encrypted messages. The table in FIG. 116 lists a Deterministic Context Based Status Matrix of the health of the Alice-Bob communication channel. It may require a qualitative assessment of the content by Alice to figure out what may be happening to their relationship. This shows a unilateral action matrix by Alice that may be based on Bob's behavior as may be evidenced by his messages to Alice.

The last symptom listed in FIG. 116 may pose an interesting scenario when the role of Bob may be substituted by a web vendor: i.e. Alice may have established an anonymous RBK communication channel with a vendor. The table in FIG. 117 shows the Deterministic Context Based Status Matrix of the health of the Alice-vendor communication channel. Now, Alice may have the ability to track down if this vendor may have sold her information to spammers through the channel identifiable aspects of the anonymous email addresses and the RBK sets. It may provide a level of transparency into the inner workings of the vendor's marketing department with a clear audit trail. This type of vendor accountability may be unprecedented in such a systematically detailed way by an average user. The consequence for violating Alice's trust by the vendor may be dire because the vendor may lose the means to contact her forever. In effect, the proper and consistent usage of anonymous email addresses and/or RBKs may allow for the digital equivalent of Alice walking out of a store and never coming back; this may serve as a deterrent for vendors to not abuse the personal information of their clients.

FIG. 118 shows the Deterministic Context Based Status Matrix of the health of the Alice-vendor communication channel from the viewpoint of the vendor. The channel characteristics may afford the vendor the same type of unilateral actions he may take to protect his business and possibly protect his clients. The use of this methodology by a vendor may possibly enhance his reputation for privacy and data security. It may also implicitly state that the vendor may not engage in the wholesale indiscriminate reselling of client data.

Figure 119:
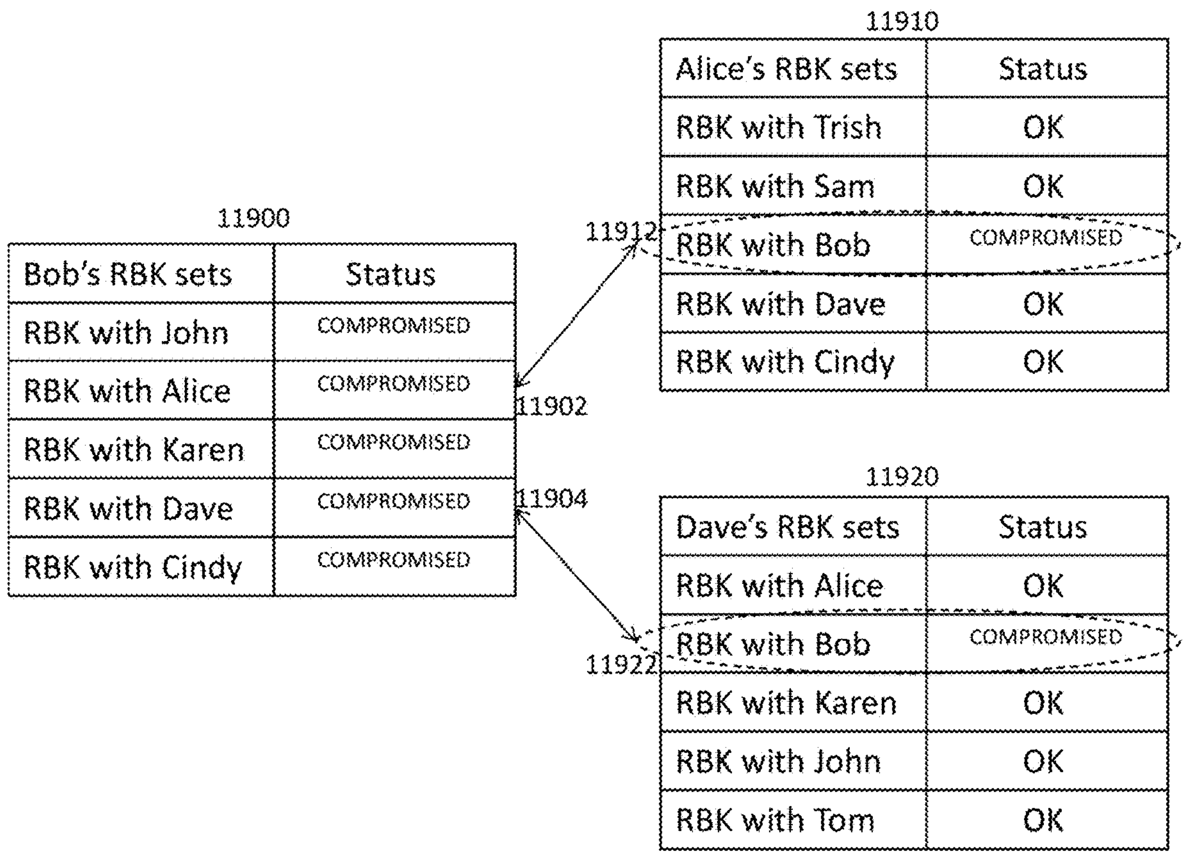
FIG. 119 illustrates the isolation of RBK relationships in a compromised system for Bob.

FIG. 119 shows a graphic representation of how the use of RBKs may help isolate the compromise of sensitive data on a user's system. Bob 11900 may have RBK channels with Alice 11910 and Dave 11920. Bob may have clicked on a Trojan horse website and may have gotten infected with a key logger or equivalent malicious program and subsequently the hackers may have been able to infiltrate his secure data store for RBKs such as his NUTbook. As a result, Bob's RBK sets with some or all his contacts may have been compromised 11900. Bob may contact some or all his friends and he may notify them of this breach or some of his friends might have already deduced something was wrong with Bob or his system from SPAM messages which might have been sent to them using their private channels with Bob. If we look at Alice's NUTbook 11910 where she may store some or all her RBK sets, she may mark her RBK set with Bob 11912 as having been compromised and may generate a new RBK set whenever Bob gets his act together to remove the viruses on his system. That may be the extent of the damage to Alice and it does not spread to other RBK relationships that she may have established. This may be especially true if she consistently used anonymous email addresses with her contacts as well. Alice may receive SPAM from the hackers but the SPAM may be ignored automatically when she marks the channel as having been compromised or deleted. When Bob may be ready, Alice may generate a new set of RBKs and a new anonymous email channel and they may continue their digital dialogue privately. The process for Dave may be the same for his RBK store 11920.

Anonymous Relationships

Digital relationship topologies and conventions that may have arisen and cemented on the Internet in the last few decades may be unnatural and unrealistic. Anonymity may be a powerful relationship construct and may be the level of relationship that we may enjoy on a daily basis with most casual interactions such as but not limited to going to the drug store to buy personal products, going to a restaurant to buy a meal, hailing a medallion cab for a ride and/or showing up at a protest rally. Contrary to this physical reality, almost every vendor on the Internet may want to know exactly who Alice may be including some or all the personal information they may get from her. Many vendors themselves may stay relatively anonymous by not publishing direct phone numbers and may service customers through emails, transaction systems and/or remotely outsourced customer service representatives in remote call centers. The most prevalent use of anonymity may be by those who may want to hide such as hackers. Currently there may be many fake persona generation websites for people who may want to stay anonymous on the Internet but they may have to keep track of anonymity in a very laborious fashion and may have to make conscientious decisions to be purposefully duplicitous. The use of RBKs and anonymous email addresses may bring some parity to this imbalance of anonymity on the Internet for the average user and may empower them to have a more meaningful bidirectional relationship with vendors and each other without having to resort to fake personas and casual duplicity.

FIG. 120 shows a simplified schematic of Pre-Packaged Personal Data Nuts. A Nut may store detailed personal information about a person 12000. It may automate the pre-packaging of different subsets of this personal information for different purposes. 12010 may be a Simple Personal Data Nut which may contain just name and email address. An Anonymous Personal Data Nut 12020 may show only an alternate email address. A Shopping Personal Data Nut 12030 may include information fields typically needed for shopping websites to purchase items. The production of these data subsets from the master information 12000 may be done via simple rules and filters and may be produced on demand during a registration process on the Internet. Whether the vendor or service may accept data Nuts or not, the information may be made available for insertion into the correct fields when needed by other means. If the user takes advantage of an Anonymous email service (forward reference), data Nuts like 12020 may offer dynamically created anonymous email addresses for the specific relationship being established.

Figure 121:
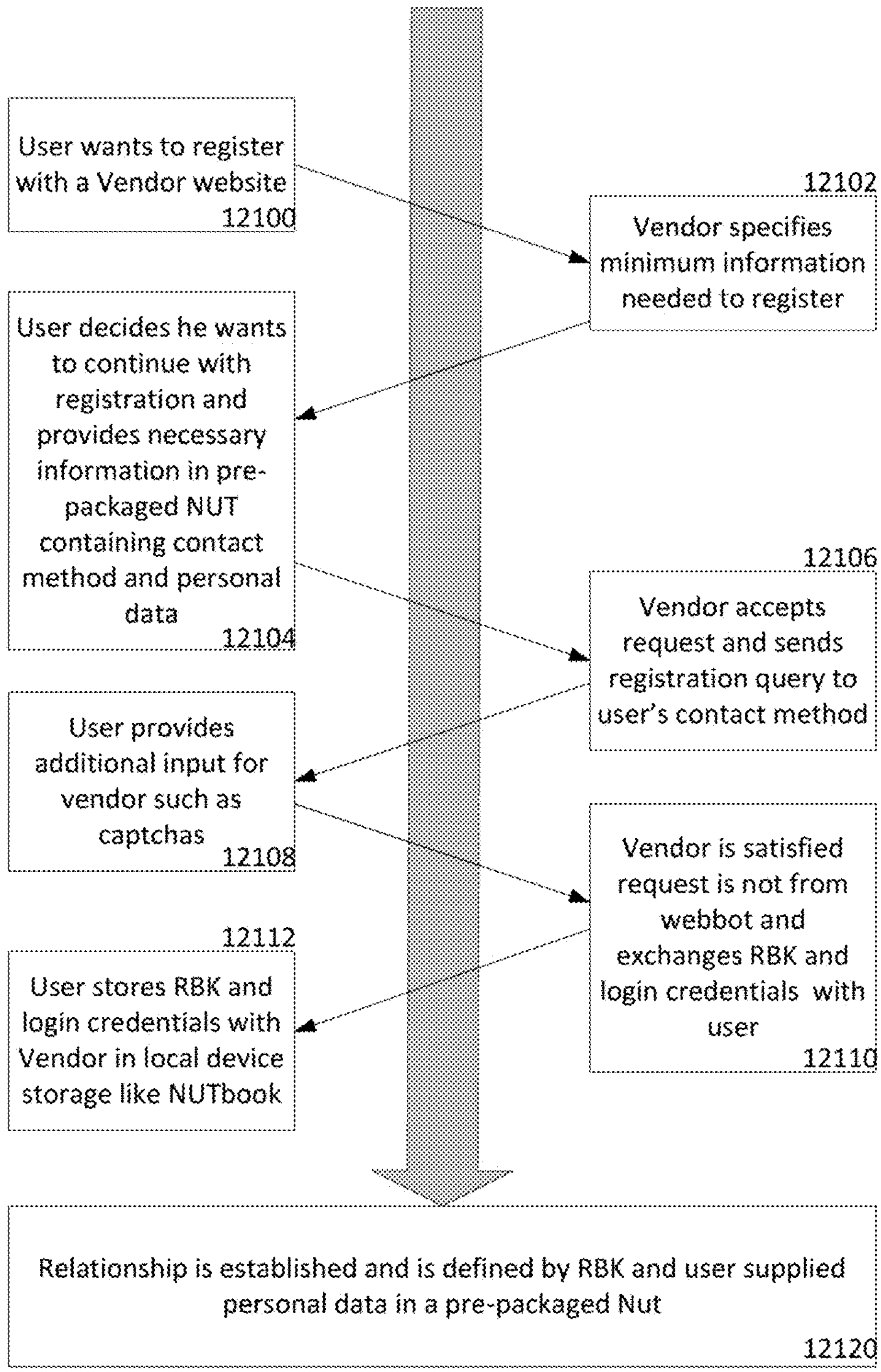
FIG. 121 charts the sequence of events in an Automated Registration process using RBKs.

FIG. 121 charts the sequence of events in an Automated Registration process that may use Nuts. A vendor on the Internet may use and accept personal data Nuts and may allow for RBK channels to be established with its customers in an automated manner. A user may visit the vendor's website and may want to register 12100. The user may start the process by instructing her NUTbook to automatically register to the vendor's website and may input the URL of the registration site. The NUTbook may query the vendor to fetch the information that the vendor may need to get her registered 12102. The NUTbook may compose a subset of her personal information that the vendor may be requesting and may show her a preview. She may decide the information requested for registration may be acceptable and that the NUTbook may have gathered the pertinent information and may continue the process 12104. The NUTbook may extract and may create a pre-packaged Nut containing the previewed information and may send it to the vendor's site. The vendor may accept the registration request and may send a query to the user's email address specified in the pre-packaged Nut 12106. The user may receive the vendor's query on her email asking her to provide evidence that she may not be a web bot which may be engaging in frivolous registrations by asking her to go to a specific URL to enter a captcha 12108 or other form of possible verification. Once the captcha is successfully entered, the vendor may be satisfied that the request may be from a person and may proceed to establish auto-generated login credentials, login key and/or RBK sets with the user. The user's NUTbook may automatically create an entry card for the vendor, its pertinent web information, login credentials, login key and/or RBK set 12112. The registration process may be done with the user interacting at a few points in the process: initiation, personal data package review/edit, and/or human verification. The hassles of picking a login name, password, typing in personal information and/or creating an entry in a password keeper for the vendor may not be required and may have been automated. When her NUTbook is activated, she may have instant access to the vendor in a fully authenticated mode seamlessly because the NUTbook may automatically log her in when so ordered to do so. Note that this process may be done with any vendor adopting this methodology to the possible benefit of both the user and vendor. Less hassles for the user and the vendor may get more accurate information from the user for their database and perhaps the possibility of more transactions between them.

Figure 122:
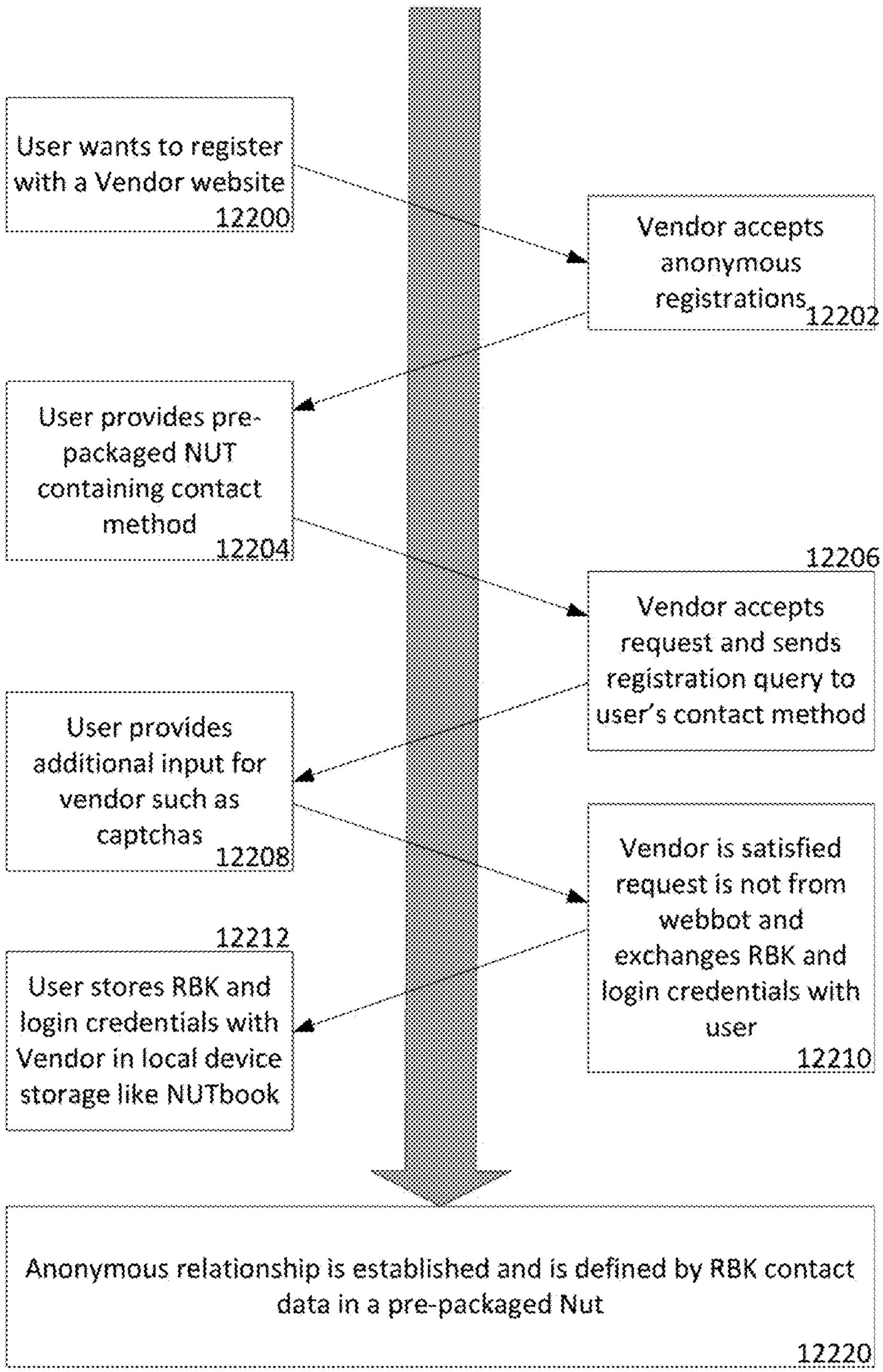
FIG. 122 charts the sequence of events in an Automated Registration process using RBKs and anonymous email addresses.

FIG. 122 charts the sequence of events in an Automated Registration process using Nuts and an Anonymous email address. A vendor on the Internet may use and may accept Nuts and may allow for RBK channels to be established with its customers in an automated manner using anonymous email addresses. A user may visit the vendor's website and may want to register 12200. The user may start the process by instructing her NUTbook to automatically register to the vendor's website and may input the URL of the registration site. The NUTbook may query the vendor to fetch the information that the vendor may need to get her registered 12202. The vendor may accept anonymous registrations so the NUTbook may contact the NUTmail service and may request a pair of anonymous email addresses under her account. The NUTbook may compose and may show a preview of the data to be sent to the vendor registration which may include the newly created anonymous email addresses. She may decide the information requested for registration may be acceptable and the NUTbook may continue the process 12204. The NUTbook may create a pre-packaged Nut containing the previewed information and may send it to the vendor's site. The vendor may accept the registration request and may send a query to the user's new anonymous email address specified in the pre-packaged Nut 12206. The user may receive the vendor's query on her anonymous email address asking her to provide evidence that she may not be a web bot which may be engaging in frivolous registrations by asking her to go to a specific URL to enter a captcha 12208 or other form of possible verification. Once the captcha is successfully entered, the vendor may be satisfied that the request may be from a person and may proceed to establish auto-generated login credentials, login key and/or RBK sets with the user. The user's NUTbook automatically may create an entry card for the vendor, its pertinent web information, login credentials, login key, anonymous email addresses and/or RBK set 12212. The registration process may be done with the user interacting at a few points in the process: initiation, personal data package review/edit, and/or human verification. The hassles of picking a login name, password, typing in personal information, creating email addresses and/or creating a new entry in a password keeper for the vendor may not be required and may have been automated. When her NUTbook is activated, she may have seamless access to the vendor in a fully authenticated mode because the NUTbook may automatically log her in when so ordered to do so. This process may require no personal user information and the email addresses that may have been created were specifically for this relationship implying only relevant emails between the user and vendor may arrive at these anonymous emails addresses. As various NUT based services may be discussed later, some or all of them offer anonymous registrations.

Communication channels which may be established using RBKs and anonymous email addresses may minimize SPAM in a deterministic fashion due to its default mode of ciphering everything via RBKs. Furthermore, it may give bidirectional control of the channel to the parties that may be involved so that there may be mutual respect for the relationship and its implied bounds. Deviations from these implied relationship boundaries may pinpoint relationship changing events and may invite a unilateral reaction ranging from inquiries to severing the relationship altogether in a deterministic way. For third parties attempting to subvert Bob or Alice's data, beyond the retrieval of the correct pair of anonymous email addresses the third party may have to crack the ciphered messages and documents as well.

Websites that may accept and may process automated registrations may add additional services such as but not limited to age filtering. Parents may deposit a pre-packaged Nut on the NUTserver of their child's device to indicate some generic identification features such as but not limited to sex, age and/or general location. This pre-packaged Nut may be automatically used to register the child on any child friendly or parentally pre-approved website that may accept Nuts. The vendor may accept or reject access attempts based on this information and the services they may provide such as but not limited to liquor sites, tobacco sites, movie preview sites, adult content sites and/or firearm sites. Furthermore, an internet activity logging Nut may be configured on the NUTserver of the child's device to monitor their activity and digital whereabouts. Limitations on internet use may also be administered by the parent by using such Nuts across some or all devices in the home so that device switching may be inconsequential to the child's cumulative internet usage per day. The blocking of, or admission to certain websites may be accomplished by using such child identification Nuts on the device itself and/or in conjunction with specific configuration settings on a NUTS based WiFi router (forward reference).

NUTS Core Applications

Figure 124:
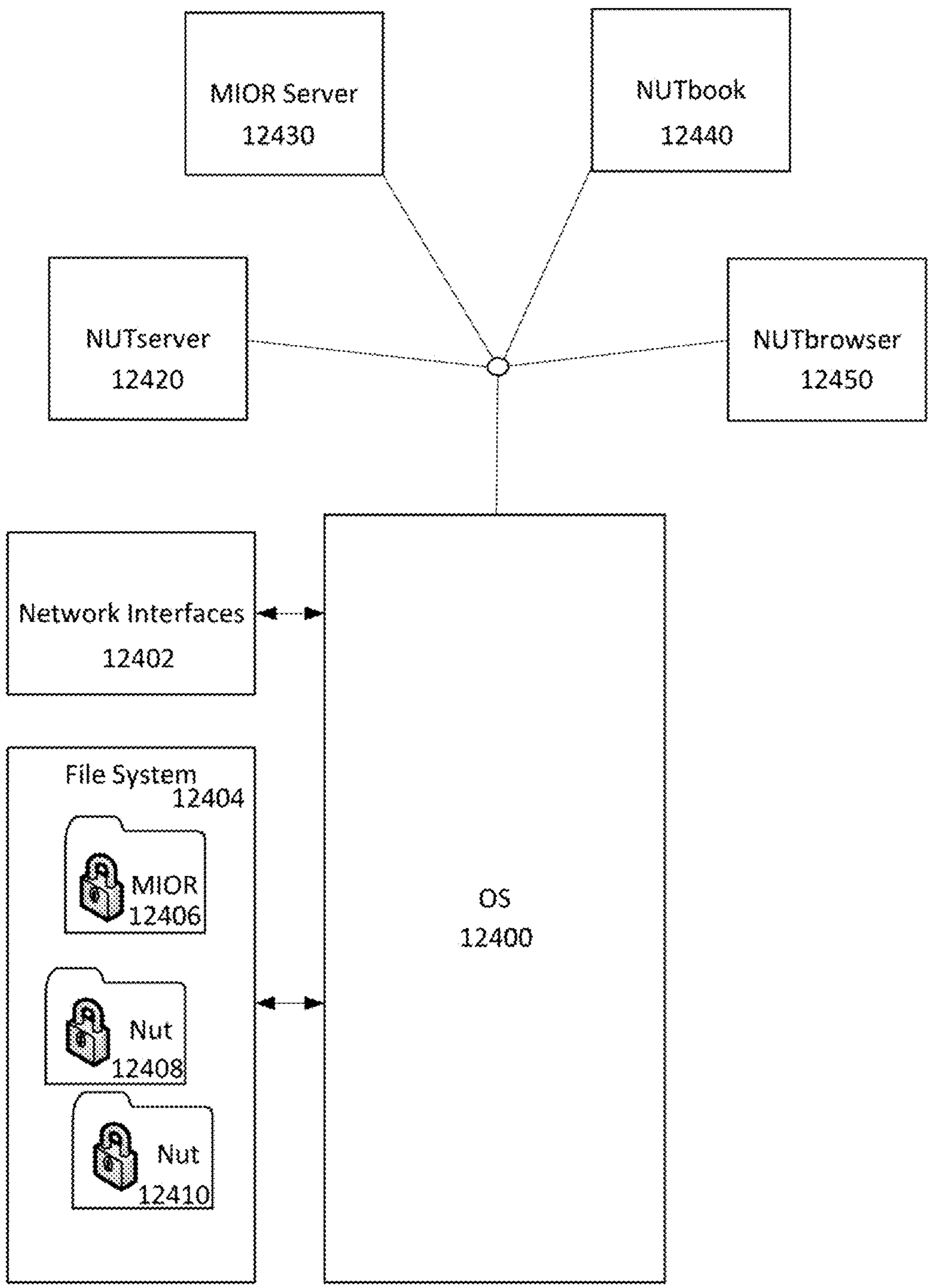
FIG. 124 shows a block diagram of the NUTS Core Applications running in a computer device.

The table in FIG. 123 lists the applications that may comprise the NUTS Core Applications set. These applications may reside in most systems that may utilize NUTS technologies and they may handle Nut files as shown in this simplified diagram of an operational computing device in FIG. 124. As previously noted, some or all of these applications may have already been referenced by material discussed earlier in this disclosure. These applications could not be detailed any earlier in this disclosure due to their dependencies on some or all the core foundational functions and capabilities of NUTS such as but not limited to Lock Nodes, Lock Graphs, Nut Parts, Nut History, Nut Log, MIO, MIOR, Nut IDs, RBKs, Gradient Opacity and/or Anonymous Relationships. Some or all of these core applications may prefer to utilize the Nut as the basic unit of storage which may be embodied by an ordinary file but is not limited to it. This may imply that some or all the data that these systems touch, store and/or manipulate may come with a high degree of security and access control by default. Design philosophies, which may have been used in Lock Node design, that may assist the reader in understanding these Core Applications more fully may be the concepts of iteration, integration, independence and/or identifiability.

NUTS Core Application: NUTserver

Figure 125:
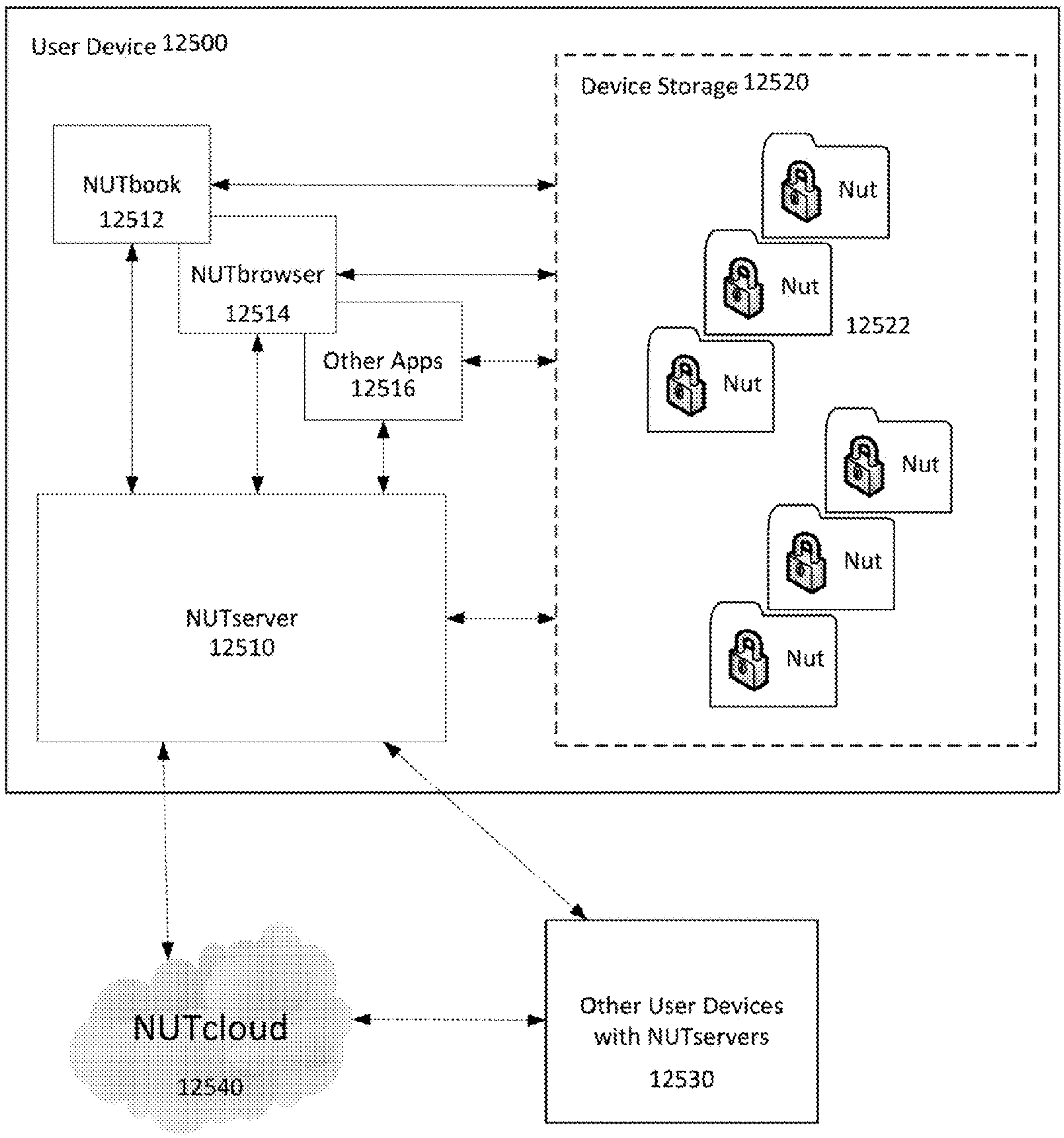

A NUTserver may be depicted schematically in a simplified diagram of a user device in FIG. 125. There may be several key functions that a NUTserver may perform in the background to organize and maintain a NUTS compatible environment. A NUTserver 12510 may run in the application space of a user computing device 12500. The device may have some storage 12520 where Nut files 12522 may be kept. The NUTserver may be responsible for providing APIs and communication channels open with various applications comprising the NUTbook 12512, NUTbrowser 12514 and/or other applications 12516 including the device OS. The NUTserver may be also responsible for maintaining external connections with other devices that may belong to the user who may be running NUTservers 12530 and possibly may be conversing with the NUTcloud 12540. The NUTserver may not be a replacement for the file system of the user device 12500 but rather may work through the local Operating System and File System to access and process any Nut files.

Figure 126:
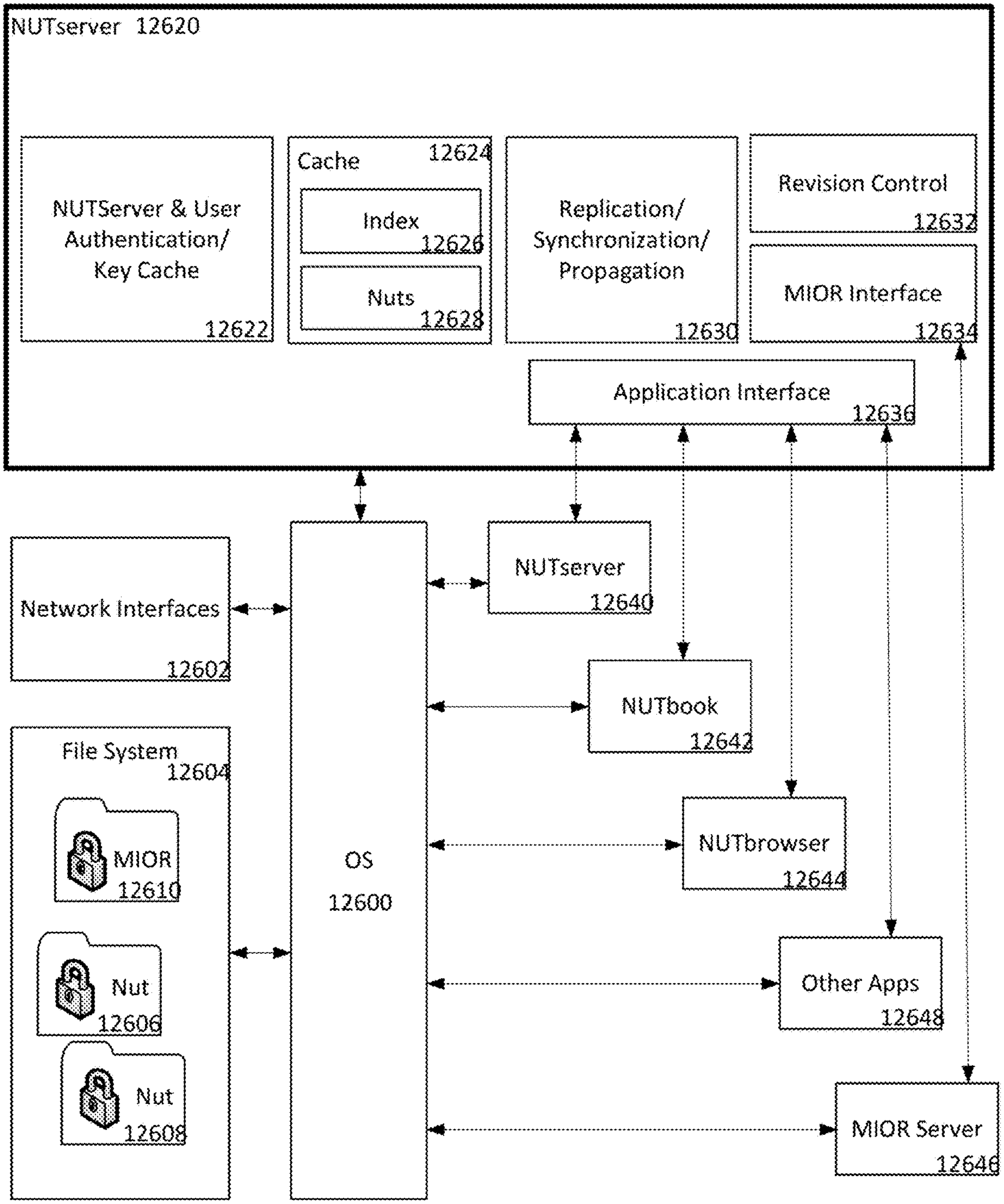

FIG. 126 shows a simplified diagram of the principal internal parts of a NUTserver and its functionalities. The user device may have an Operating System 12600 managing the hardware and software. The device may have external communications serviced by network interfaces 12602 and its associated drivers running through the OS 12600. The device also may have a File System 12604 that may be attached and may be managed by the OS 12600. Stored on the file system may be data stores for the MIOR 12610 and user data may be contained in Nuts 12606 and 12608. The OS 12600 also may act as an application environment where many applications may be run comprising those depicted in the diagram: NUTserver 12620, NUTbook 12642, NUTbrowser 12644, MIOR Server 12646 and other apps 12648. The NUTserver 12640 may be running on another device but the application interface 12636 may handle those communications as well.

Within the NUTserver 12620, there may be a module 12622 that may perform authentications into the NUTserver and may maintain a key cache. When a NUTserver starts, it may not have any authority to peer into any secured layers in any Nuts. The user and/or the hardware may provide the authentication necessary which may allow the NUTserver authentication module 12622 to gain access to certain key sets. This may be as simple as having a passphrase protected Nut holding the key sets and asking the user to provide the passphrase, opening the Nut and caching into protected/unprotected memory the keys sets in its payload; or it may be secure hardware provided keys as found in many computing devices; or it may be a hardware token such as but not limited to a USB key that a user may provide. The key set may contain at a minimum a NUTserver authentication key and/or a key for each NUTS core application that may be installed on the local device. There may be a Cache 12624 that may be maintained by the NUTserver for organizational purposes and efficiencies. A part of the cache may be the Index 12626 of Nut IDs. This Index may contain some or all the Nut IDs that the user may want to keep track of locally and remotely. Looking up a Nut ID in the Index may indicate where the Nut ID may be found. Another part of the Cache 12624 may be relegated to keeping a Nut cache 12628 in memory for frequently accessed Nuts.

The NUTserver may be responsible for synchronizing the contents of two or more Nuts with the same Nut IDs 12630. Once a NUTserver may be properly authenticated and it may have sufficient keys to access some or all the Nuts owned by the user, then it may open various Nuts to examine its contents and manage it. Each Nut may hold a version number and timestamp of last update or modification. If an update occurs on a Nut and the NUTserver may be notified of it or the NUTserver may notice it, then it may note the update and may look up the Index 12626 to see some or all the locations where a copy of this updated Nut might exist locally or remotely. It may then systematically begin to Propagate and Synchronize 12630 the changes to the affected Nuts. This process may be rather simple due to the metadata embedded within each Nut such as but not limited to Nut ID, version number, internal digns, history, and/or log. The newest version may simply overwrite the existing version if various modification criteria may be met. It may not be necessary that a NUTserver be able to peer into a Nut in part or whole since it may depend on the viewable metadata as may be allowed by the Gradient Opacity of the Nut as to whether a synchronizing update may take place. Sufficient cleartext metadata may allow some Nuts to be synchronized by NUTservers with no keys to the Nuts in question. In cases where they may be a possibility of version forking or branching, the user may be involved to decide which version to make current. The Replication function 12630 may allow peer NUTservers to propagate these types of changes across user-controlled devices automatically. The functionalities provided by 12630 may constitute a personal NUTcloud for a user when she may install and connect multiple NUTservers on her devices. She may enjoy synchronized and/or replicated Nuts on any of her devices in an automated fashion. When more complex version issues arise or a certain historical version of a Nut may be requested, the Revision Control module 12632 may handle those requests. It may utilize the specific version delta methods employed by a Nut and may perform a finer granularity of version control to produce the desired version of a Nut. These Nut specific version delta methods and the content read/write methods of Nuts may or may not exist in the local MIOR so there may be a MIOR interface 12634 to supply those functions when they may be needed.

An Access Nut may be defined as a secured Nut that may contain authentication credentials for other systems or containers such as but not limited to website logins, database logins, corporate systems, personal devices, software systems, other Nuts, NUTservers, email systems, chat systems, and/or any digital system requiring a secret passkey and/or login ID. The NUTserver may present an Application Interface 12636 for other applications to access its functions. The NUTserver may be identified by its application type and installation particulars, additionally it may be assigned a Nut ID as well. The NUTS configuration file for a user device may point to a configuration directory or area in the file system 12604 where it may find an access Nut holding information for each application it may need to know about such as but not limited to remote and/or local NUTservers. For example, the local NUTserver 12620 configuration directory may hold an access Nut containing the Nut ID, type and/or access keys for the remote NUTserver 12640. Successfully opening such an access Nut may give the local NUTserver 12620 sufficient information to attempt to contact the remote NUTserver 12640 and authenticate with it so that it may open a trusted communication channel and send each other Nuts. In a similar fashion, there may be configuration Nuts for the various applications that the NUTserver may be interacting with. Since access Nuts are Nuts, they may be kept synchronized, replicated and/or propagated amongst peer NUTservers.

From this explanation of how a NUTserver may function, the iterative design approach of the Nut internals may extend to how applications and data associated to configure and authenticate them may be stored and accessed. Sensitive data may be stored in a Nut as much as possible. The consequences of such a simple statement become far reaching when one considers the built-in functions and features of a Nut and the functions provided by NUTservers. The unauthenticated NUTserver may provide enough functionality to replicate, propagate and/or synchronize Nuts that it may have no inner access to. This may be due to the Gradient Opacity property of a Nut: many Nut parts constituting non-revealing metadata may be saved as clear text and may provide sufficient information for many normal maintenance actions to be performed on a Nut by a NUTserver. Due to the security features which may be built into the Nut, the security of the communication channels for transporting Nuts between applications across the WAN or an intranet may have less significance.

This method of using access Nuts may solve numerous problems associated with software design, programming and/or use. For example, a bane of software developers may be when they hardcode logins and passwords into their code when in the process of developing their code in order to expedite the entry into a test system such as a test database or test app server. The transition to QA and Production modes of testing and development may be done by adding in the extra authentication procedures into the code right before that stage which may have been minimally tested. Using access Nuts, it may be possible to integrate it into the developing program at the earliest stages and the process may never have to change, only the access Nut might change. A manager may assign and create the appropriate access Nuts for a developer, QA engineer and/or the production user. These access Nuts may seamlessly integrate into their respective NUTbook collections and may allow them to connect to their application resources without ever signing on separately. The manager may actually maintain ownership of the access Nuts and change it as needed and the NUTservers may eventually replicate and/or synchronize it so that the end users may never have to be bothered with it thereby the project manager may manage the relationships between users and their applications remotely and securely. The effective use of access Nuts may allow any user to configure their systems for single sign on (SSO): SSO on to their local NUTserver and everything else may be automatically authenticated when needed. Hierarchical passwords (forward reference) may allow for added security for certain subsets of access and information.

Figure 127:
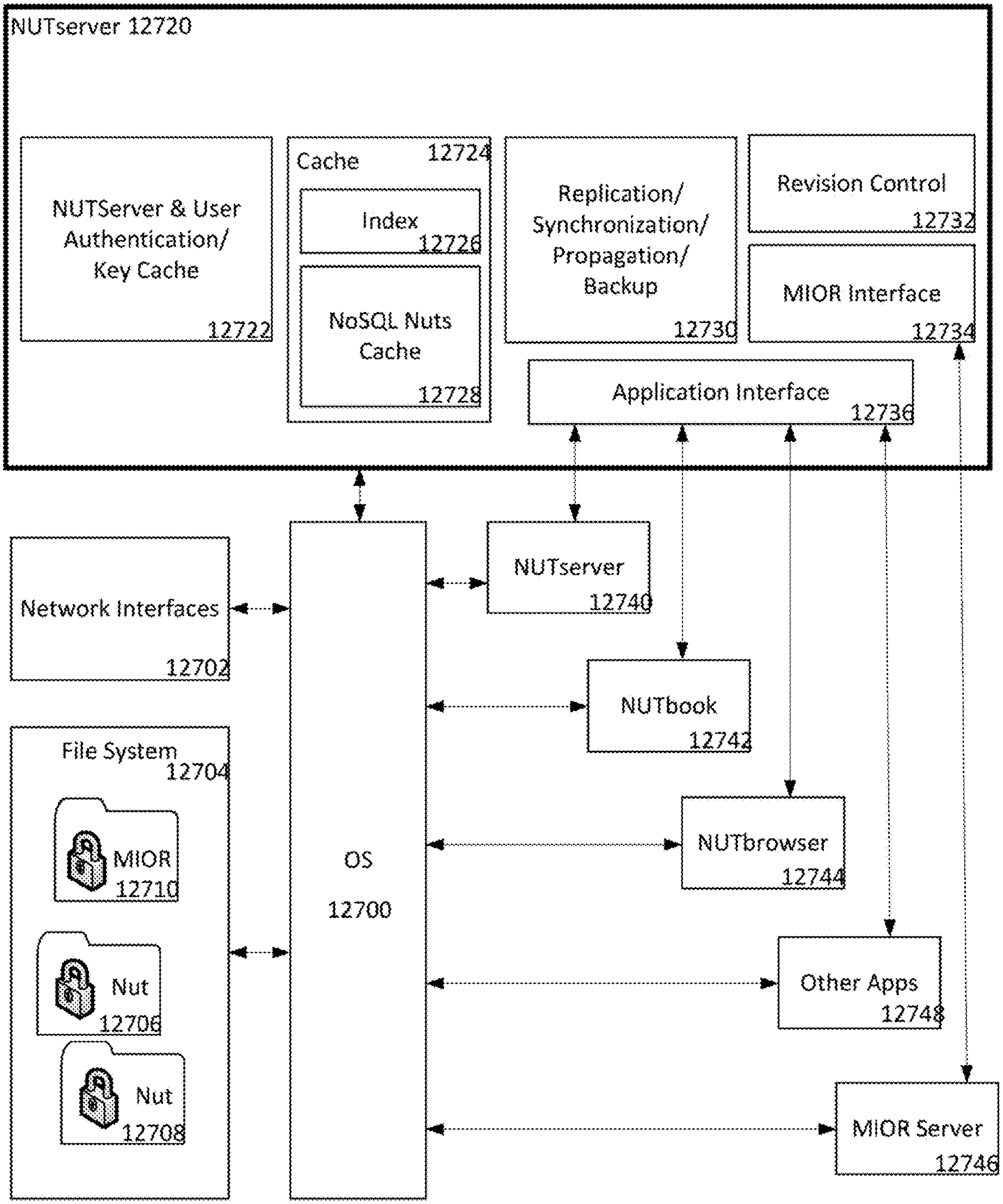

FIG. 127 is an alternate embodiment of a NUTserver where the Nut cache 12628 may be replaced by the functionalities of a NoSQL database 12728. NoSQL databases may be considered by some to be a subset of object-oriented databases and many of them may be very efficient in handling Nut-like containers which may be non-table structures. Some NoSQL databases such as CouchBase may offer built-in replication and other features which may be employed by the NUTserver to carry out some of its duties.

NUTS Core Application: MIOR Server

Figure 128:
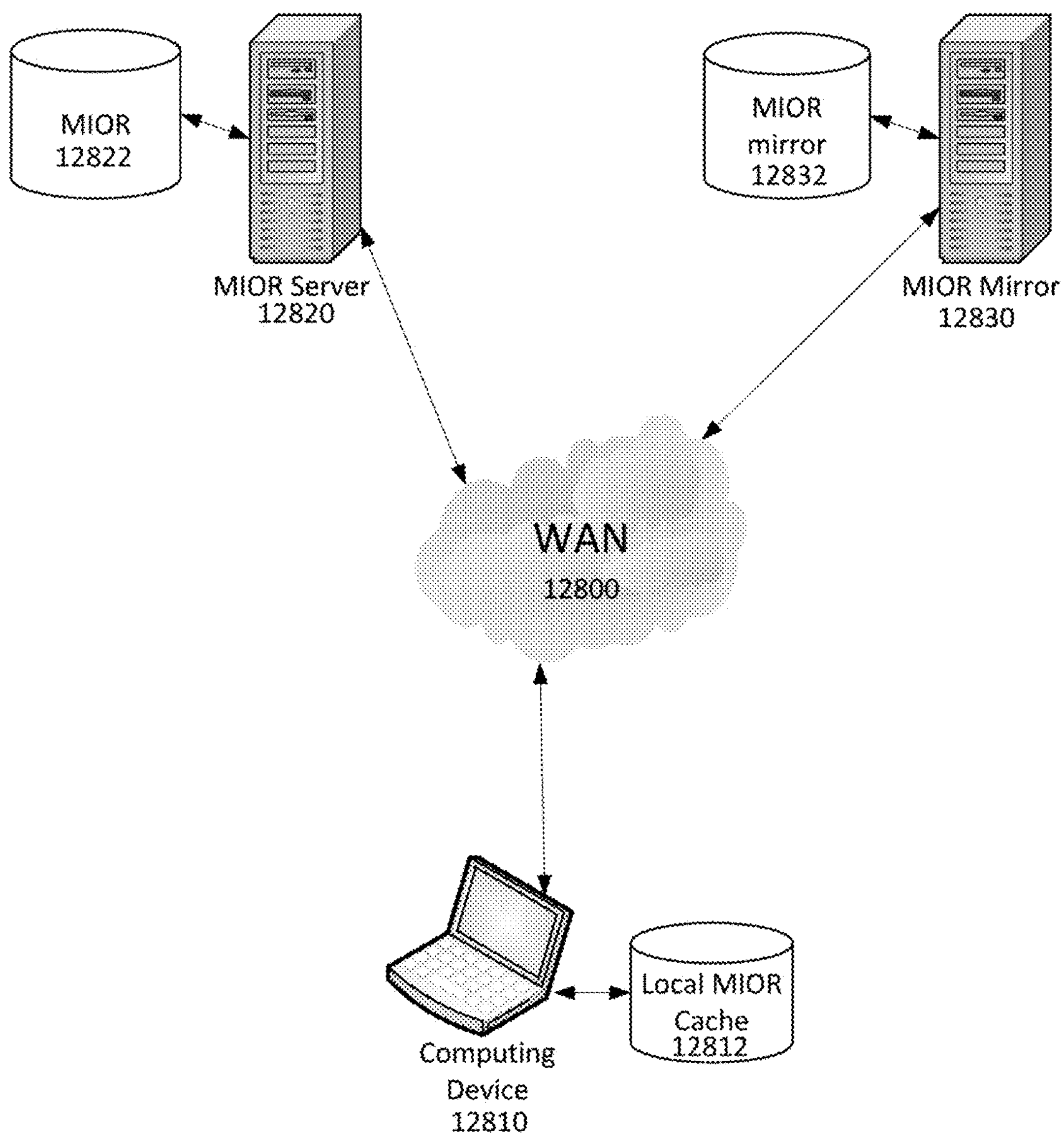

The Modular I/O Repository or MIOR may be a server-based service as depicted in FIG. 128. This may be a typical embodiment of the MIO systems and methods. A computing device 12810 may have a local MIOR Server running on the device with its own local MIOR Cache 12812. If a request may not be satisfied by the local MIOR Server, it may reach out to well-known Internet based MIOR Servers 12820 or their mirrors 12830. Their respective caches 12822 and 12832 may be searched for the appropriated MIO modules in the request. If found, it may send it back to the originating MIOR server on the user's computing device. If the requested modules may not be found at the first MIOR Server 12820 on the Internet, the MIOR Server 12820 may reach out to other MIOR Servers on the Internet to look for it. The original request may have a timeout or cascade limit on the number of cascading requests it may make altogether. In some embodiments, the requests may be done asynchronously rather than in a blocking mode if appropriate.

Figure 129:
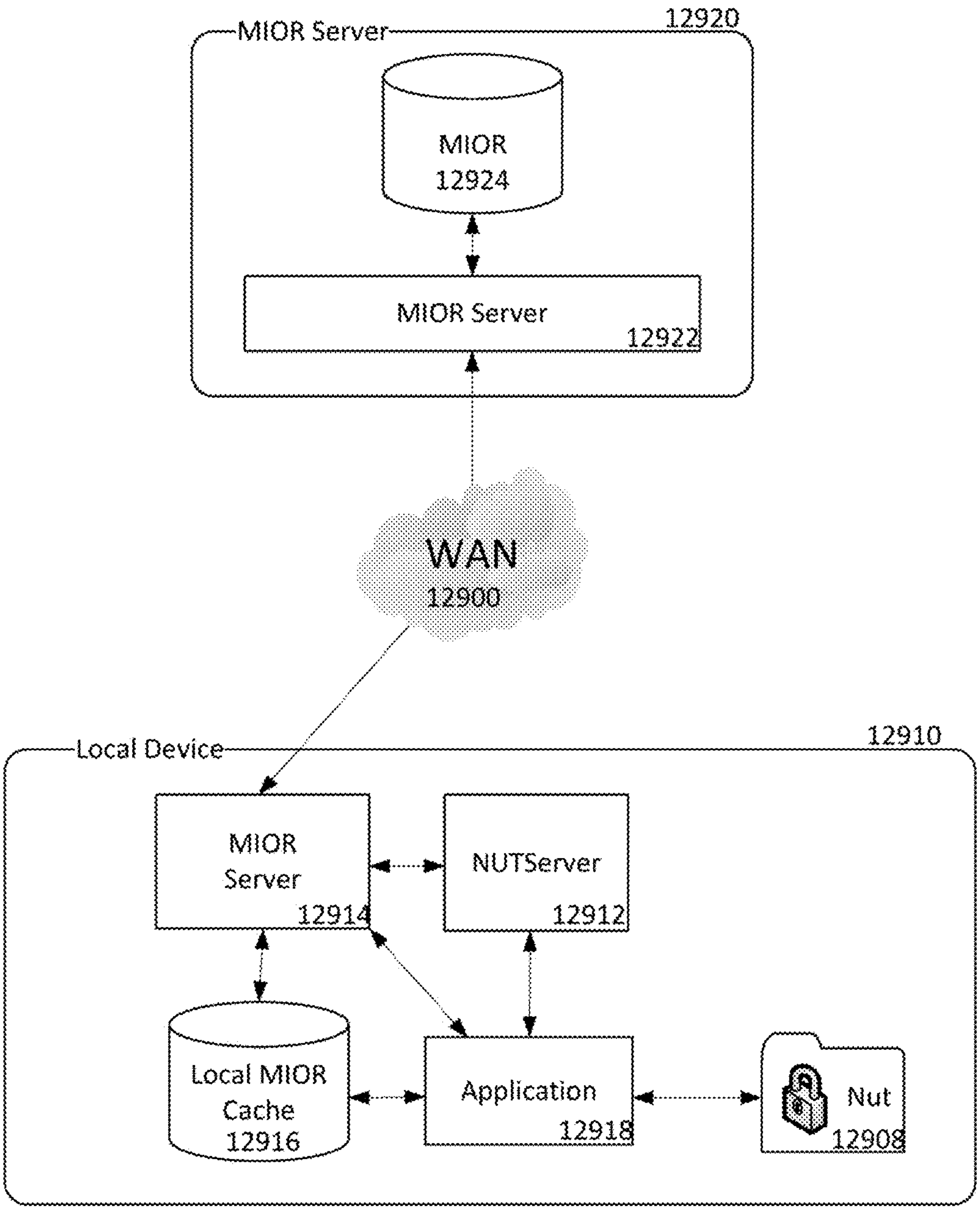

A closer inspection of this process may be depicted in FIG. 129. An application 12918 may be running on the local device 12910 which may need to read a Nut file 12908 into its memory. The Nut 12908 may indicate it may need a certain set of read and write modules for its payload from the MIOR Server 12914. The application may contact its local MIOR Server 12914 and may request the read and write modules for this Nut. The MIOR Server 12914 may look in its local MIOR Cache 12916 to see if it may have those modules. If found, it may reply back to the application with the modules or information of the location of the modules on the local system or network. If not found, the MIOR Server 12914 may reach out across the WAN 12900 or other network of MIOR Servers to request it from a larger MIO repository such as 12920. MIOR Server 12920 may be a dedicated server optimized to service requests from the Internet for various modules. Once MIOR Server 12922 may receive the request from MIOR Server 12914, it may check its local MIOR cache 12924 for those modules. If found, it may reply back to the MIOR Server 12914 with the modules in the request. If not found, it may contact other MIOR Servers in its peer group in search of these modules. In the meantime, it may send a "Failure to find but continuing search" message back to MIOR Server 12914. When a remote request comes back with the requested modules, the local MIOR Server 12914 may authenticate it prior to storing it into its local MIOR Cache 12916. As always, when the time comes for the application 12918 to instantiate and use the module, it too may authenticate the contents using the normal NUTS internal mechanisms.

Figure 130:
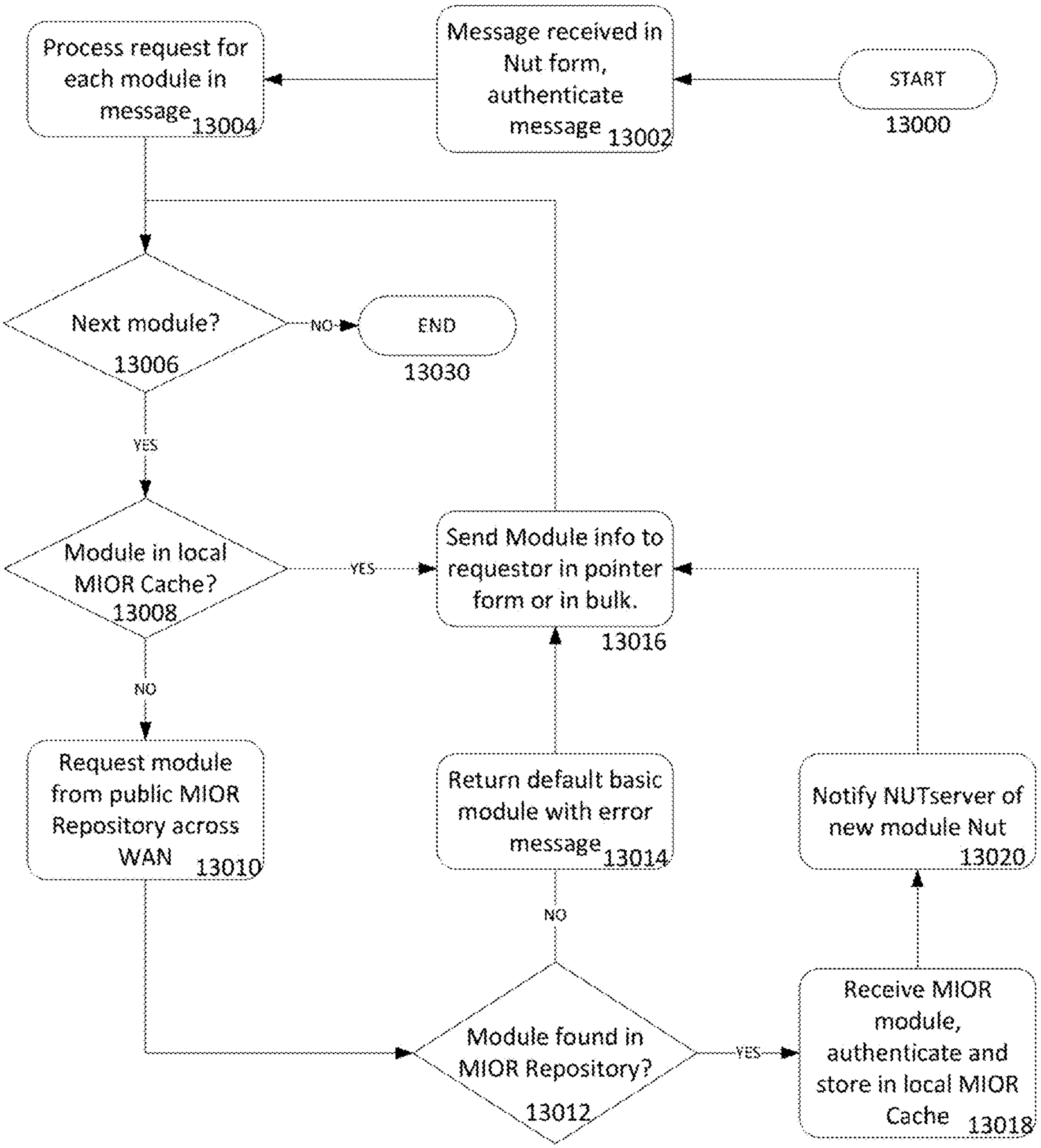

FIG. 130 shows a flowchart for fetching MIO modules from a MIOR Server.

The authentication between the remote MIOR Server and local MIOR Server may be established via session keys or anonymous accounts if so desired. Higher levels of service may include access to exclusive modules with custom keyed Nuts such as a corporation may wish to use the wide distribution of the MIOR network for their employees using custom developed software but the employees may only open and authenticate the custom modules if they have an access key possibly in an access Nut from the company thus proprietary information may be secured consistently on a relatively open service platform.

Figure 131:
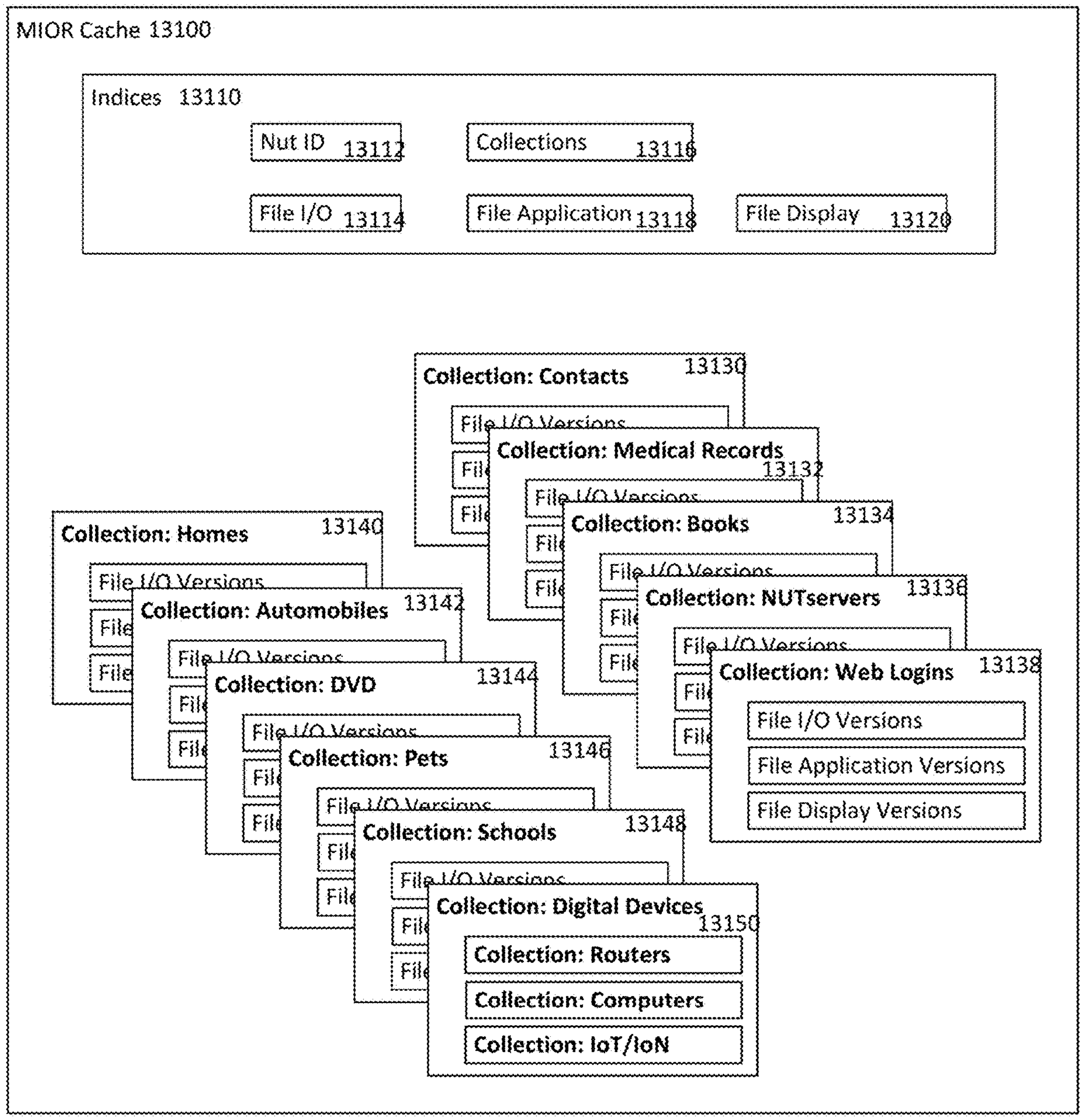

A typical embodiment of the internal organization of a MIOR Cache is shown in FIG. 131. The Cache 13100 may have a set of indices 13110 that may contain reference to various modules that may be cross referenced and indexed. The structure of the MIOR is not limited to this embodiment but may contain some or all of these organizational structures and techniques. Since every module may be stored in a Nut, the master Nut ID index 13112 may contain some or all the Nut IDs of the modules and their locations in the Cache. The File I/O modules index 13114 may list some or all the modules of that type by description and Nut ID. The File Application modules index 13118 may list some or all the modules of that type by description and Nut ID. The File Display modules index 13120 may list some or all the modules of that type by description and Nut ID. The Collections modules index 13116 may list some or all the modules belonging to a Collection by description and Nut ID. There may be other indices built to allow for the efficient searching of the cache. The Collections groups (forward reference) 13130-13150 are depicted in the diagram to visually show how related modules may be grouped together. The Collections grouping method may play an important role in the operations of the NUTbook.

NUTS Core Application: NUTbrowser/NUTshell

Figure 132:
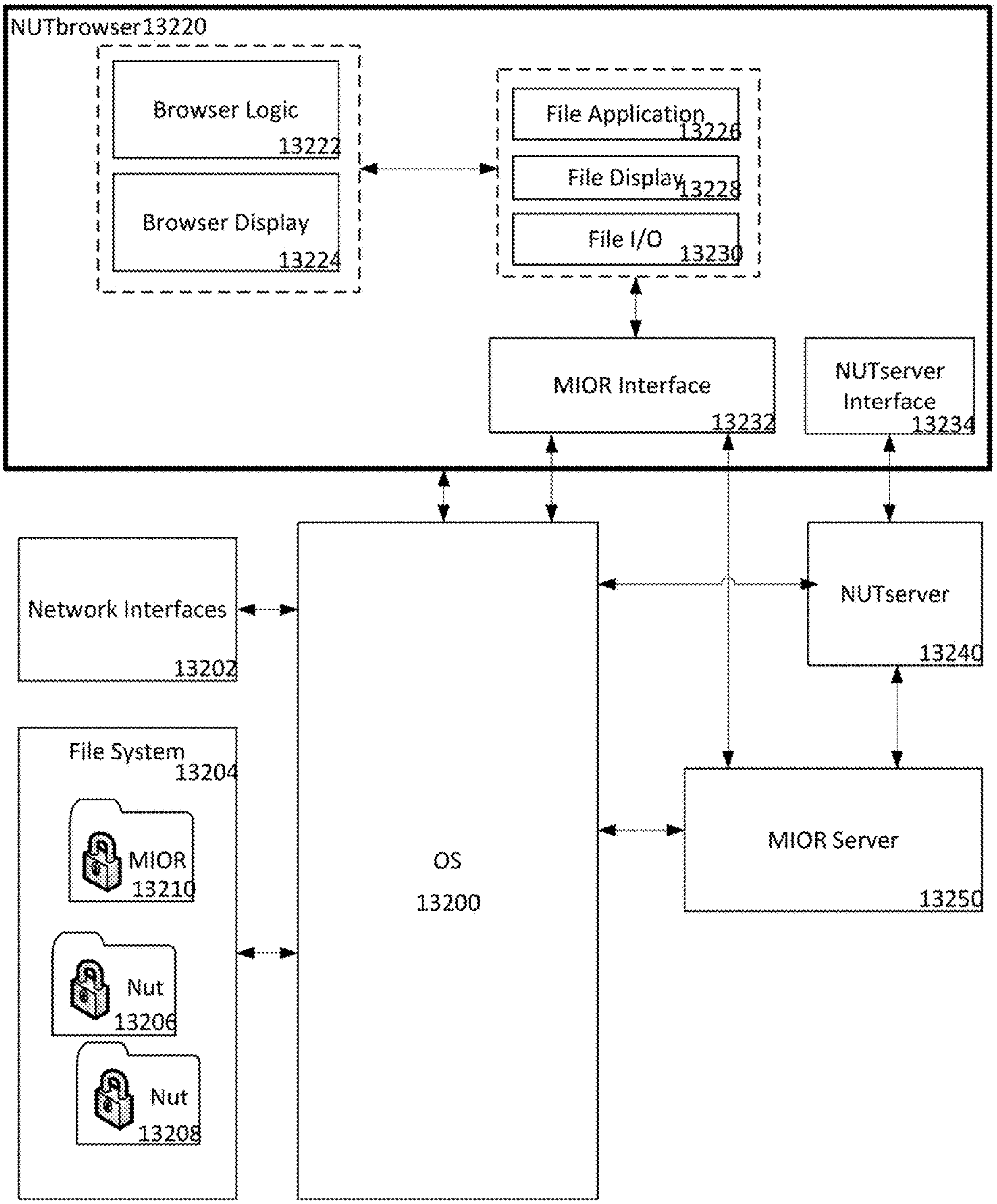

FIG. 132 shows a diagram of a NUTbrowser application. The NUTbrowser may be essentially a graphical user interface (GUI) that may run on top of the functionalities of the NUTshell command line interface (CLI) application. Commonly known shell programs may be the bash shell, csh, cmd.exe, DOS shell, among others. Commonly known file manager programs may be Windows Explorer, Apple's Finder and others. The user facing behavior of these two programs may be very similar to their commonly known counterparts; however, a difference may be that the NUTbrowser and NUTshell may recognize Nuts and may process them more fully to take advantage of the rich metadata that may be stored in every Nut file. Every Nut file may be identified by two methods: a superficial ' *.nut' file name extension and/or the deeper probing of the contents as a Nut. Most file systems may accommodate the file name extension method. The Nut read attempt might be used when attempting to confirm that a *.nut file may be actually a Nut or when introducing new files into the local system from an untrusted source.

Most popular operating systems such as Mac OS, Windows and/or Linux may use several methods to identify the type of file comprising file name extensions, magic numbers, uniform type identifiers (UTI), file system attributes and/or others. File name extensions may be the most superficial method since when a file name may be changed, the link between its content type and recognition may be severed. Magic numbers and UTI may be compact but limited forms of metadata embedded at the head of the file and may require access to an index of file types to cross reference what form the content may be. This index of file types may exist in the OS, file system, or other external system. File system attributes may be represented as attributes of the file object that may be attached to its instance within the indexing mechanism of a file system. This information may be only effective within the domain of the file system/operating system combination that may record and recognize it. The Nut metadata not only may specify the type of payload but how it may be read, written to, displayed and/or run it. It may specify some or all the versions of the various modules which may be necessary to successfully process the contents. In effect, it may remove some or all dependencies to any and all external reference tables for processing the contents such as but not limited to Windows registry entries and/or Mac OS property lists. This may allow the Nut to self-describe and prescribe the necessary components that may be needed to access its contents and may allow the MIOR Server to auto-install any components which it may lack at the time of access.

The NUTbrowser/NUTshell may read the metadata of any selected Nut and may communicate with the various other NUT Core Applications to attempt to open, display and/or run the proper application on the contents of the Nut by accessing 13232 the MIOR Server 13250. If the user has properly authenticated into the NUTserver 13240, the NUTbrowser/NUTshell may have access 13234 to some or all the necessary access Nuts to properly open the Nuts even further. In effect, the NUTbrowser/NUTshell may act no differently from any application that may properly process a Nut.

Depending on the persistent store that may be used on the local system, the NUTbrowser/NUTshell may allow multiple Nuts of the same filename to exist in the same storage area as long as the Nut IDs may be different. Some storage systems such as databases and object file systems may not be sensitive to filenames. For most cloud-based storage systems, the Nut ID method of identification may fit in more natively than the traditional pathname methods.

NUTS Core Application: NUTbook

Figure 133:
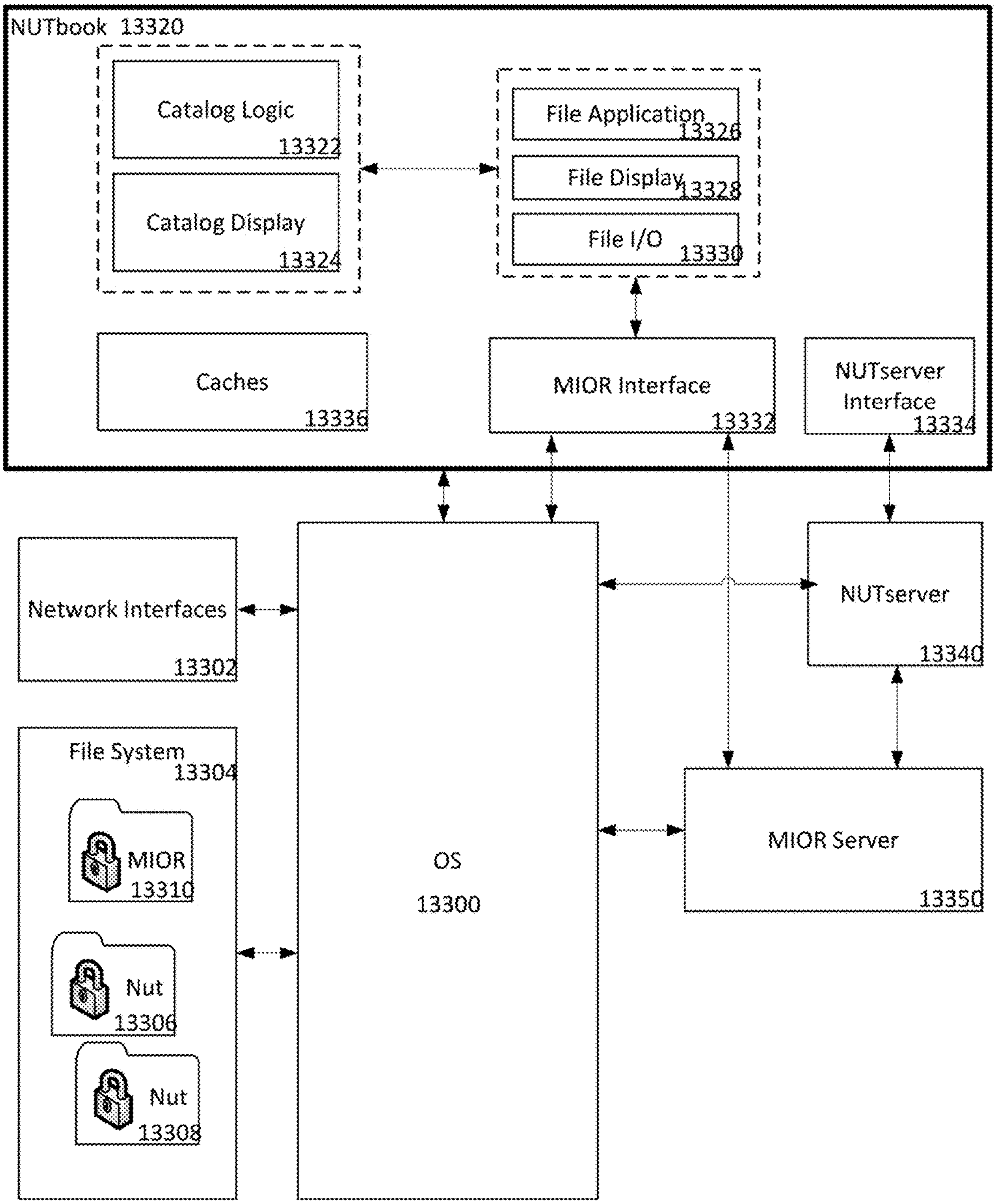
Figure 134:
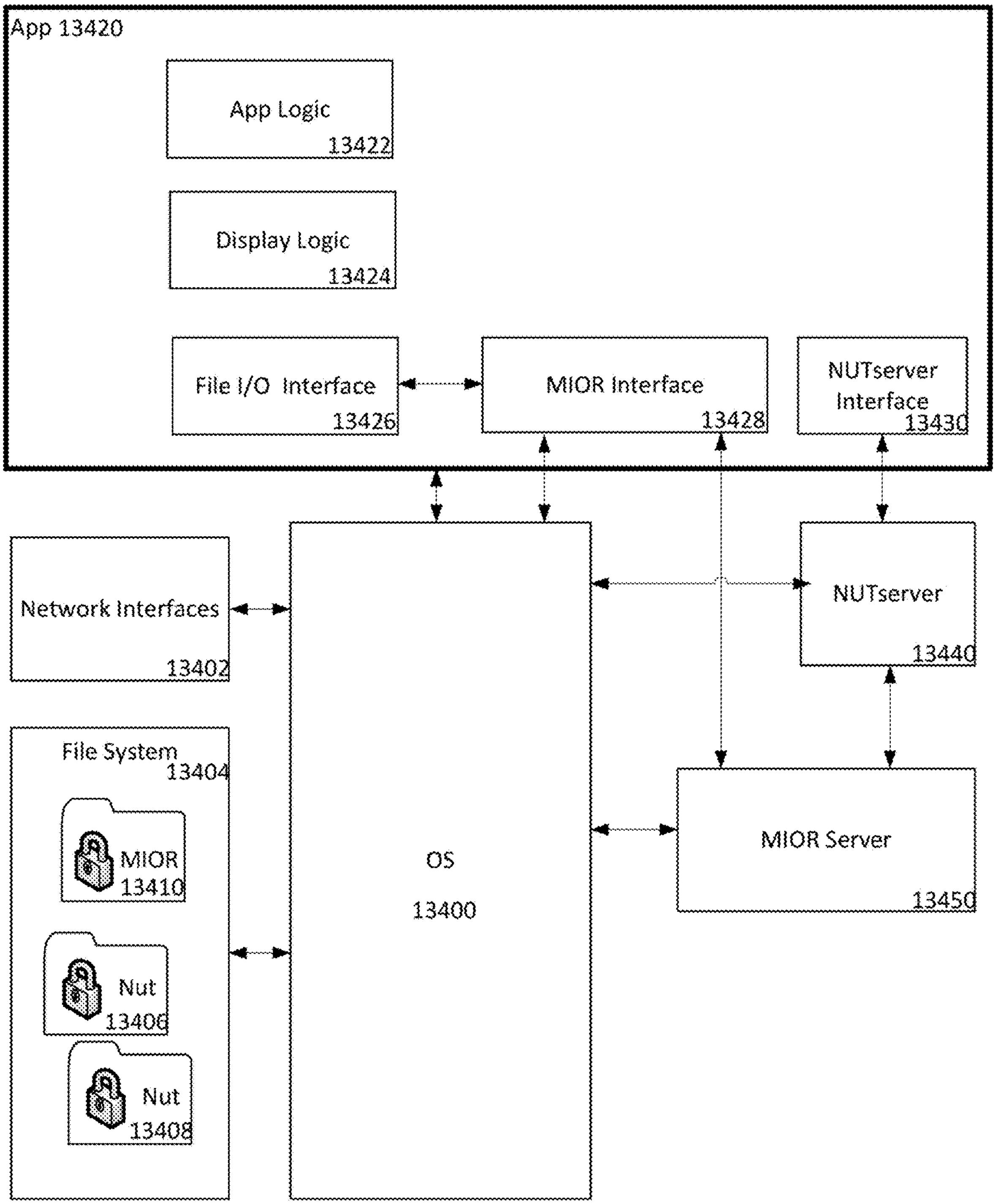

A schematic of a NUTbook is shown in FIG. 133. By now, the typical Nut processing application may look familiar with similar components; it may form the basis of a Nut processing framework more generalized in FIG. 134 and may function similarly to how the NUTbrowser application may work in FIG. 132. The NUTbook may have requisite interfaces to the NUTserver 13334 and MIOR Server 13332. It may process MIOR modules 13326-13330 as needed to provide the functionalities provided by them as indicated by 13322 and 13324. The NUTbook's main function may be to maintain an organized set of caches 13336 called a card catalog. The NUTbook may be an electronic card catalog composed of Collections of data as shown in FIG. 135. The NUTbook may offer some of the functionalities found in a typical Personal Information Manager. Why is NUTbook a card catalog? Here is a list of various reasons why it might make sense:

- Users may have no easy way to collect, process and organize arbitrary sets of data
- Usually, it may be done informally in spreadsheets, text files or simple databases
- There may be no easily accessible general utility to acquire, organize and/or catalog different collections of data in a secure way where the repository may comprise a data file per item in the collection.
- PKI certificates, contact cards, RBK sets, web logins, baseball statistics, VPN logins and credentials, car history, DVD collections, stamp collections, book collections, children's medical records, etc. . . . . These may be considered as different collections of data or cards.

A Nut may securely store each type of item in a secure way that may be easy to use and transport.

Therefore, we may store some or all the encryption keys that may be needed to make NUTS work seamlessly into Nuts as well.

We may access these card collections by indexing their Nut IDs and any optional search index metadata within the NUTbook application.

NUTservers may be aware of certain important card types and may prioritize their processing in many of its tasks.

A Nut that may exist in a multi-NUTserver environment may have replication, synchronization, logging, full history, encryption and/or access control by default packaged into a single file per item for easy transportability.

Figure 136:
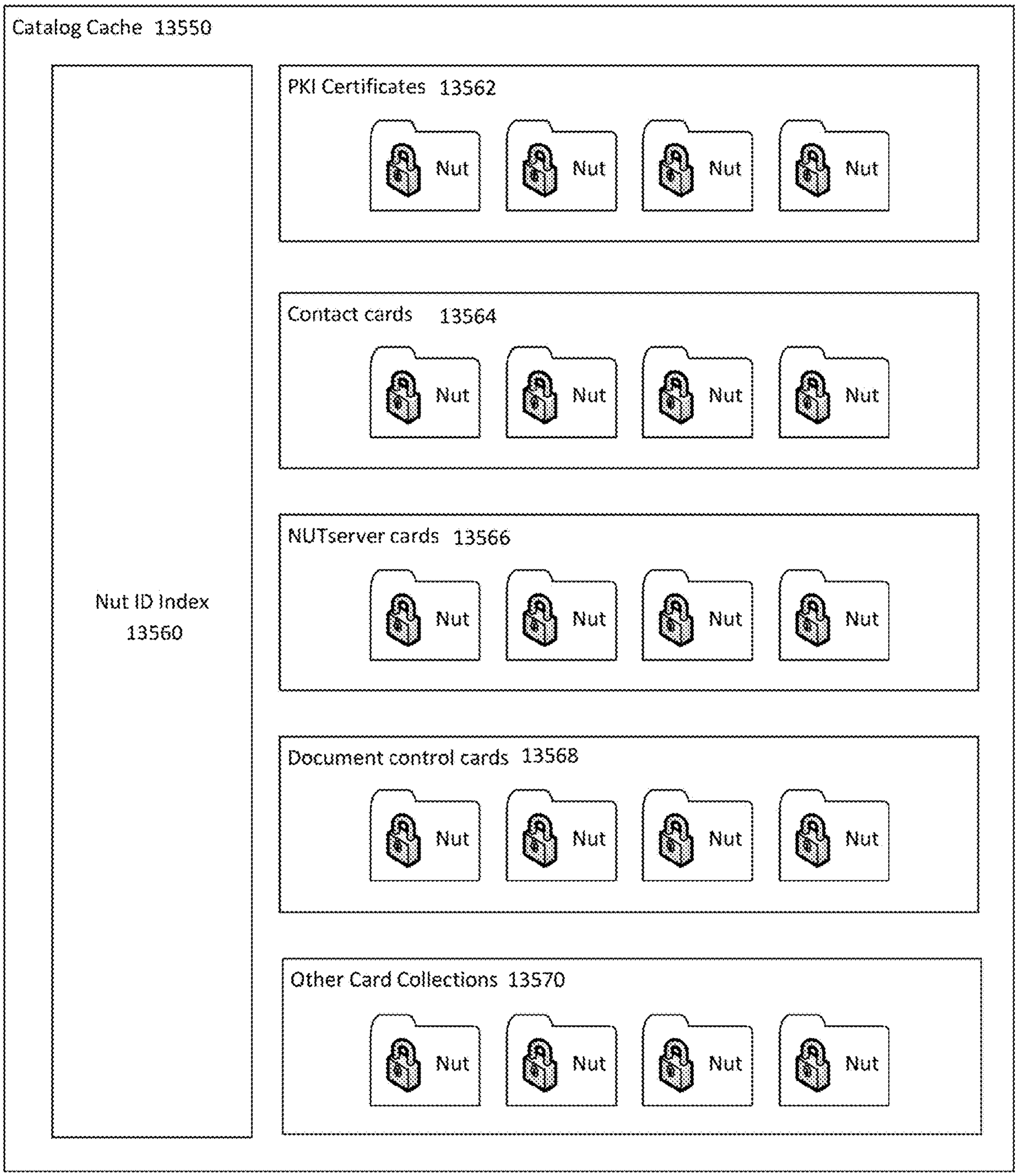

The NUTbook may contain a Key Cache 13520 which may be in the form of protected or unprotected memory depending on available hardware. The Key Cache may store frequently used access keys with proper attributes attached such as but not limited to the number of times it may be used before expiration, expiration time and/or expiration events. Its main Catalog Cache 13550 may have a master Nut ID index of the Nuts it may be keeping track of. The cache may be composed of different Collections of data such as but not limited to PKI certificates 13562, contact cards 13564, NUTserver access cards 13566, document control cards 13568 and/or any other defined Collections 13570. These Collections may be stored in memory, in a database, on a file system or other storage mechanism depending on the configuration of the NUTbook and available hardware. The database and file system storage may be remotely located as long as they may be locally accessible via a network interface. FIG. 136 may be an example of a layout of how the NUTbook Catalog Cache may be organized.

The data stored in the NUTbook may be an agglomeration of a PIM, password keeper, PKI certificate manager, key ring, address book, note taking app, recipe book, CD collection index, stamp collection index, book collection index, medical records and/or any other data sets that may be expressed as a Collection. The current state of the art for the average user may not offer many choices for them to digitally organize disparate pieces of their lives into a functional digital form. Address book apps may be numerous but seamless, effortless cross compatibility may be lacking. Most sensible users may not store sensitive passwords in their address books and might evaluate and make use of a password keeper app for that specific purpose. Even for just these two simple apps, address book and password keeper, if the user were to consider features such as operating system compatibilities, synchronization, cloud footprints, backups, web browser integration among others, the decision making matrix may have expanded by several dimensions. And there may be no guarantee of good integration between the password keeper and the address book. If the user wants to keep track of her family member's medical records, auto servicing records, home maintenance schedules, school logins related to children's classes, pet veterinary records, digital device information and/or other collections of data, they may have to do it in various different formats using different apps for each type of data. A common use of spreadsheets may be to organize such disparate sets of data and may act as a general-purpose database for a user. A NUTbook may allow the user to systematically store some or all types of information into a Nut form and may integrate the use of the data into any Nut compliant application. Data that may be properly formed and identified may be made functional by apps that may take advantage of its defined structure. Some or all of the features of the NUTS environment may be available for every Nut in the NUTbook such as but not limited to security, synchronization, replication, backup and/or non-obsolescence.

Non-obsolescence and/or time compatibility may be an important characteristic of using the MIOR. By using Collections within a NUTbook along with the MIOR, the user may gain several advantages: the data they may produce may be theirs, it may be secure, and they may have a reasonable expectation to be able to access their data indefinitely (or as long as NUTS may be active and supported). The NUTbook also may act as a bridge between the world of the database user and the world of the file user. It may provide the benefits of a database in the form of records stored in a file format. A MIO module for read/write functionality for a particular Collection may be an organized specification set of fields related to capturing the details of the particular collection the user may have in mind but it may not be limited to this model. In some embodiments, the read/write modules may be interfaces to various databases and may provide field mapping and conversion functionality for the calling application. In other embodiments, it may be read/write modules that decipher proprietary binary formats of the payload using licensed keys from a software company. The variety of ways the modules may be used to access data may be very diverse and may have many permutations depending on the goals of the application developer. The basic structure of a specific Collection may be customized by a user with very little programming knowledge starting from simple pre-existing templates. New and useful Collections may be added to their local MIOR for their personal use and shared with others via Nut files. It may also be submitted to an internet MIOR Server for use by anyone after some approval process.

Now that we may have covered some of the motivations and design goals of the NUTbook, we may focus on how the NUTbook may act as a PKI and eventually may offer SSO level of service for the average user. FIG. 137 outlines the concept of Hierarchical Passwords. In NUTS parlance, passwords may be equivalent to passphrases because a Nut may accept both forms and in place of any password, a user may use hardware tokens, encoded binary keys or any other method that may provide a secret key. The weed-like proliferation of passwords and their associated differentiators such as but not limited to two factor authentications, login rules, custom password rules, custom web pages and/or hard tokens may quickly spiral out of control and may leave the user in a mental state where they may resort to extremely easy to remember passwords across many web sites thereby the user may be counteracting the efforts of the individual vendors to make their systems more secure for their clients. The preferred solution for NUTS may be to use as few passwords as possible to allow effective SSO access and Hierarchical Passwords may embody this approach. There may be a Main password 13710 which may allow basic authentication into the NUTserver and NUTbook. The Main password may open a Nut containing a key that may be cached in the Key Cache 13520 and may be configured to auto-delete after the end of the session or a predetermined event. This Main key may be sufficient to effectively use most NUTserver and NUTbook functions. There may be second level passwords such as but not limited to Shopping 13714, Work 13716, Finance 13718 and/or Communications 13712. These passwords may only be entered after successfully entering a valid Main password, therefore they may respect a hierarchy of passwords. This second level may allow the user to segregate and isolate different levels of security for different groups of data. Each password in the second level may be configured to have different lifetimes in the Key Cache 13520 so that the user may control their exposure. For example, a user may have an internet bank account login information in a Banks Collections card and may secure it with the Finance key that may have a single use lifetime. Then he may have to enter the Finance password every time he may want to access the bank website by accessing the login and password stored in the Bank card. Within each bank card, the website password may be created randomly to maximize entropy and stored for auto-login use by the NUTbook. There may be more levels added but it depends on the complexity of the user's information and how much she may want to memorize. There may be a Master password 13720 that may bypass some or all the hierarchical passwords. The Master password may be carefully chosen or randomly generated for maximum protection and may be kept in a safe place. Using this Hierarchical Password methodology, a user may just need to carefully choose a set of passwords that may be hard to guess but may be more easily memorized by the user just due to the reduction of the number of passwords she may need to memorize, and this may form the basis of her SSO access.

FIG. 138 walks through the password entry process for opening a personal document Nut 13806. This document may be protected only by the Main level key so entering the Main password 13710 to access the Main key to authenticate into the NUTserver 13804 may be sufficient to open the Nut holding the personal document 13806. In FIG. 139, the Master password 13720 route may be exactly the same as Main password route.

FIG. 140 shows how a Work document protected by a second level Work password 13716 may be opened. The Main password 13710 may be supplied to access the Main key, then the Work password may be entered to gain access to the Work level key 14008 which may unlock the Work Document Nut 14010. In FIG. 141, the Master password 13720 unlocking route may stay the same as in FIG. 139, it may still be a single step access, thus Master passwords may be created in a more secure fashion.

FIG. 142 shows a more detailed diagram of the NUTbook Key Cache 13520. It may have a section partitioned for keys associated with the NUTservers 14210 and it may have a section partitioned for use on its various Card Collections 14230.

FIG. 143 shows a process flowchart of how a NUTbook may view a Catalog Card.

Retained ownership is a concept which concerns the mingling of Nuts of different owners. Suppose Alice gets a new job with Acme Company and they both may use NUTS based applications to manage the minutiae of organizing their respective contacts and/or digital keys. Additionally, Acme may use Nuts to control access Nuts and carefully lock down corporate documents by department and/or by employee access level. When Alice gets hired, Acme's HR department may issue Alice a general corporate access Nut: it may be the access Nut that may allow Alice to look up information such as internal corporate contact lists, client lists and/or various corporate documents. Acme's NUTS systems may have been customized and/or configured to give access to sensitive documents which may be stored in Nuts by wrapping a copy of the payload into a wrapping Nut locked by the employee's specific access Nut and a corporate master key. The ownership (RAT) of these corporate Nuts may always be Acme. Similarly, Alice's personal Nuts may always have her as the RAT. The ability to clearly define the owner in a cryptographic way may allow each Nut to be treated appropriately by each respective owner within their NUTS environments. This retained ownership characteristic of Nuts may allow Alice to comingle her Nuts with Acme's Nuts on any device she may use and maintain control over them. The same may apply to Acme's Nuts on Alice's devices. Both Alice and Acme may set the lifetimes of their respective access Nuts to be a relatively short period. For example, the lifetime may be set at 60 days on Nuts stored on foreign systems. Therefore, every 60 days, the keys may be renewed by each owner of the Nuts owned by them or they may be automatically deleted by the foreign NUTservers managing them. Deletions may occur forcibly if the appropriate NUTservers may be sent deletion commands in an appropriate access Nut and it may be encoded to systematically delete some or all affected Nuts of the owner. Thereby, each party may have the ability to maintain control over their Nuts in foreign systems either directly or indirectly. Thus, if Alice leaves for a new job, she may know that her personal contact information that she may have left a copy of on her corporate desktop may automatically be deleted in 60 days or less. The same may apply for any Acme owned Nuts left on Alice's personal devices: if there is no renewed access Nut, no more associated Nuts on the system. This type of mingling of Nuts may be meant to solve the age-old problem of juggling two or more separate contact lists and different sets of security measures for taking work home. Now Alice may always use her personal NUTbook as her main source of contacts in her personal and professional life and she may be reasonably be assured that it may be secure.

In another embodiment, a NUTbook contact card may carry references to or embed foreign Nuts that contain personal information for an acquaintance. The foreign Nut from Bob may not be owned by Alice but by Bob. Bob may send Alice a pre-packaged, limited detailed, contact Nut about himself and may maintain its ownership in Alice's NUTS environment. Alice's NUTbook entry for Bob may embed this Nut into her contact entry for Bob either directly or by reference. Whenever Bob changes some or all information about himself such as a new mailing address, a new work address, phone numbers or other affected information, he may send an update to his pre-packaged contact Nut to Alice by any available means and once Alice's NUTserver recognizes it, it may automatically update the appropriate embedded foreign Nut in the card for Bob in Alice's NUTbook. Then, Alice's NUTbook may run the contact application to process the updated card which may lead to the update in Alice's card for Bob. This last step may assure that Alice's card entry for Bob may never lose its past history on Bob's information and she may track down the various historical changes to Bob's information when she so may desire. Some or all of these steps may occur automatically without intervention on well established, trusted RBK relationships. This may mean some or all of Alice's trusted RBK relationships may have updated contact information with few or no manual interventions which may lead to a big savings in time and effort on Alice and each of her friends. If Alice has 99 RBK contacts and 50 updates may occur, then only 50 changes may have to be initiated by the affected people themselves and the rest may be handled automatically by each affected person's NUTservers. In a traditional address book setting, 50 updates may become 50 updates by the affected individual, 50 notifications to 99 friends informing them of the change, each of the 99 friends making up to 50 updates to their own address books along with some level of transcription errors within the nearly 10,000 events that the 50 updates may spawn let alone the collective time spent by the 100 people that may be involved. This embodiment may be solved alternatively by having a centralized service but such services may provide limited privacy, access, ownership and/or control. The NUTS solution may emphasize decentralization as much as possible while attempting to maintain consistently high levels of privacy, history, audit trails and/or ownership.

NUTS Based Services

NUTS based services may extend Nuts usage to a wider network such as the internet so that Nuts may be utilized between multiple remote parties. The table in FIG. 144 lists examples of the various web-based services that NUTS may support and offer and FIG. 145 shows a simplified network layout for these services. Some or all services may offer multi-tiered service packages with the lowest levels being offered for free with constraints. Payments for higher tiered packages may be made directly or anonymously via separately purchased service credit vouchers. Some or all of the services may be used anonymously to varying degrees.

NUTS Based Services: NUTmail

The NUTmail server depicted in FIG. 146 shows a web-based email service that passes some or all its messages via Nuts among its registered users. Furthermore, it may support auto-registrations, anonymous registrations, anonymous channels and/or RBK based communications. The server may interact with NUTbook and/or NUTserver apps. The NUTmail may have a client component that may run on a user's device to enable them to manage, edit, display, compose, send and/or receive emails.

FIG. 147 shows the process for establishing an anonymous registration on a NUTmail server in an automated manner. A user may contact 14700 the server with a prepackaged Nut which may contain a preferred pre-existing contact method such as but not limited to an email address, text capable telephone number and/or web browser. The server may accept the request 14702 and may send a request to the user using the preferred contact method 14704. The user may enter the required information from the request and the server may create a randomly generated login ID and password which may employ the maximum entropy of the cipher method in 14706. The server also may generate a RBK pair with the user which may be employed in some or all communications between the user and the server/administrator. The user may store the login credentials and RBK pair in her NUTbook in the card for her own contact information 14708. Thus, the user may have anonymously registered with the NUTmail server in a predominantly automated way 14710.

The login ID and RBK which may have been created during the registration process may be only used by the user to communicate to the NUTmail server; in a way, it may be considered a private channel between the user and server. When a user wants to communicate with another person who may also use NUTmail, a communication channel may need to be established with that person on the NUTmail server as depicted in FIG. 148. A communication channel may comprise a pair of randomly generated email aliases that may be attached to each user's registered accounts as aliases. The NUTmail server may not keep track of these alias pairs once the communication channel may have been established and verified in order to better preserve the anonymity of relationships. These aliases may be similar in function to the RBK in that it may only be used by the two participants in the channel. The random nature of the alias generation may give away no hints to the identities of the participants during email transit across the internet. The email contents themselves may be encased in a Nut protected by RBK methods further protecting the payload. This may provide two separate layers of relationship based methods and obfuscations that may minimize some or all unwanted SPAM and/or third party email sniffing. Once the communication channel may be properly established then the exchange of emails may be fairly standard as shown in FIG. 149.

The security rationale behind a NUTmail server may be summarized as follows:

- Anonymous registrations may mean a compromised server may reveal very little about the registered users and/or their email contents.
- The encapsulation of emails within RBK encrypted Nuts may provide another independent layer of content security. Hacked servers may only reveal messages secured by Nuts.
- NUTmail communication channels using alias pairs may obfuscate email metadata.
- The server may not store alias pairing data permanently, only long enough for the channel to be verified.
- The server may store email messages for a very short period of time. It may be configurable by the user but the default may be that messages may be expunged after it may receive information from the user's NUTmail client or NUTserver that at least 2 copies may exist outside the server or after a pre-configured duration.
- A short history of emails may allow the server to have very small long term data storage requirements.
- Randomly generated logins, aliases, passwords and/or RBKs may make full use of available data entropy which may lead to added security.

It may not be easy to use the NUTmail server without the integrated facilitation of a NUTbook although it may be possible. The login ID, password and/or aliases may be generated using maximum entropy methods and may look like a jumble of a long string of random characters. There may be a 1:1 correspondence between a relationship and an alias pair so the number of aliases that a user may have to keep track of may get numerous very quickly. A benefit of this communication methodology may be that data generated by the participants may be useless in and of itself and some meaning may only be extracted via targeted data surveillance and/or sophisticated reconstruction techniques.

The data storage requirements of a NUTmail server may be different from an ordinary email server: it may use much less space per user on an ongoing basis. When a user's NUTserver or NUTmail client may indicate that at least two copies of an email may exist outside of the NUTmail server, the NUTmail server may delete that email Nut permanently. This type of simple rule may allow each participant in a channel to establish two or more copies of their communiques at a minimum each. The NUTmail server may leverage the NUTservers of each registered client to offload as much long-term storage as possible thereby reducing its own ongoing storage requirements per user. The NUTmail server may only have new email messages for registered users since each user may have downloaded and replicated previous emails on their own NUTmail client/NUTserver systems.

NUTS Based Services: NUTchat

NUTchat may be an anonymous chat service based on Nuts. It may offer the following chat features:

- It may support anonymous registration, pairwise random aliases and/or RBKs

It may be able to provide local NUTchat hub phone numbers for anonymity

It may support simultaneous cellphone & non-cellphone chats

It may support SMS/MMS and internet-based chat sessions simultaneously

It may support similar history features as NUTmail server

Chat history may be saved within each contact entry storage, or it may be stored in a Nut and it may be referenced by the target contact entry rather than by just phone numbers or chat addresses.

Chat history may be permanently saved for personal use without the need of the NUTchat service.

NUTchat may be a specialized service for chat messages that may be contained in a Nut.

Randomly generated logins, aliases, passwords and/or RBKs may make full use of available data entropy which may lead to added security.

It may multiplex communication routes to ensure delivery of messages and show virtual chat sessions.

An example of a network diagram is shown for a NUTchat server in FIG. 150. Its registration procedures may be similar to methods employed by NUTmail servers and may offer some or all the anonymous features for its users. There may be a Nut based NUTchat client running on user devices and the basic data flow configuration is shown for chat sessions between three participants in FIG. 151. This may be a standard text message passing topology with the NUTchat server acting as the coordinator in the middle 15100. Because NUTchat may be based on Nuts, the entire chat history of a session may be saved in a Nut and therefore may take advantage of the NUTserver replication/propagation/synchronization features automatically if properly configured. The NUTserver may be configured to prioritize NUTchat Nuts so that they may be handled in a more timely manner due to the nature of the real-time interactivity in a chat session. A close look at FIG. 151 shows that the same chat Nuts exist in multiple locations; it shows that a chat topology may be equivalent to a streamlined synchronization of data states in a plurality of physical locations. FIG. 152 is an example of the data flows of a process that may replicate NUTchat sessions using a user's NUTservers. Since each chat participant may store some or all of the chat session history in a Nut 15122-15126, the NUTserver 15238 may propagate changes to those Nuts across its peer NUTservers such as 15242. By properly synchronizing data in this methodical manner, when the user brings up a NUTchat client 15260 on his device #4 15240, he may see the same session history as he may have left it on device #2 and in no manner was the NUTchat server involved in bringing his device #4 up to date. When a chat session is initiated, and when the examination of chat Nuts on either side of the channel by the respective NUTchat clients may determine it to be unsynchronized, then a forced synchronization procedure may be automatically initiated to bring the session updated to the latest version (note the classification of chat history may be viewed basically as a newer state of the payload aka Nut history). For example, Alice may have a long standing anonymous NUTchat channel with Bob but somehow she may have lost or deleted her chat Nut storing this session history on her smart phone. When she resumes this NUTchat session with Bob and may make contact though the NUTchat server, the server may receive version numbers of the session from both Alice and Bob and it may show that Bob may have a later version of the session than Alice. At that point, a copy of Bob's chat Nut may be requested automatically and may be sent over to Alice via the NUTchat server and Alice's NUTchat client may accept Bob's session history as its own and the chat session may continue with a common view of its history and thereby its context. There may be very little storage being used in this scenario by the NUTchat server and some or all the session information may be stored by the end users under their control. Once chat session versions may have been synchronized, chat messages sent to each other thereafter may be contained in Nuts only holding the new chat message in the session rather than the entire history and the NUTchat clients on each end may be responsible for updating its cumulative chat session respectively thereby it may reduce the size of data transfers in an ongoing chat session.

Furthermore, Alice's NUTbook may make references in her contact entry for Bob to reference or point to chat Nuts and email Nuts so that some or all relevant historical communications with Bob may be indexed under Bob's information which may give rise to the systematic collation of context in a relationship stored under Alice's control.

NUTchat clients may engage in a Dialogue which may involve path agnostic chat sessions for reliability, redundancy and/or obfuscation. FIG. 153 shows a typical data flow pattern for three separate chat sessions between Bob and Alice which may be using up to three different chat services and/or chat IDs. Sometimes, this type of separation and segregation may be desired and convenient for the parties that may be involved. At other times, it may be forced upon the user by choices made by the other participant: for example, Bob may only want an account on the chat service B so Alice may be forced to create a login on service B to chat with Bob. However, to the extent that a NUTchat client may interface with other chat services, it may allow multiple separate chat sessions between the same two persons to be agglomerated into a path agnostic chat session as shown in FIG. 154 which may be called a Dialogue. Chat Nuts may be the basic medium of the messages so that some or all may have version numbers and a copy of the Nut may be sent on some or all three chat session paths simultaneously. Whichever chat Nut that may get to the other NUTchat client first may be processed and the others ignored (or may be merged by the NUTserver Nut merge and then discarded). Sometimes due to the nature of the transport limitations, Chat Nuts maybe converted into concise, secured text messages appropriate for the transport platform. In this method, the conversation may be preserved over multiple pathways and only the most current version may be ever shown to each participant and the process may not rely on the storage and/or organizing functionality of the individual chat service providers, only their transport mechanisms. The redundant pathways may minimize or virtually eliminate transport failures for the Dialogue. The history that each transport service may store may be useless because it may be protected by a Nut on a per message basis therefore the contents may be opaque. The transport mechanisms may be any channel that may allow Nuts to be passed such as but not limited to email servers, ftp servers, networked file systems, point-to-point connections, WiFi protocols, Bluetooth protocols and/or any other digital transmission method. The synchronization properties of a Nut may allow for chat sessions to be engaged solely by using a shareable Nut configured to have at least two writers and common method for the users to access the Nut. This embodiment may show how relatively simple it may be to disintermediate the functionality of chat systems while protecting the user's data independently of the service and strengthening the overall reliability of the transmission mechanisms by the user.

NUTS Based Services: NUTcloud

The NUTcloud may be an internet-based storage server available to any NUTS user as depicted in FIG. 155. The NUTcloud may support anonymous registration, pairwise random aliases and/or RBKs. It may seamlessly integrate with personal NUTservers to extend the reach and availability of a personal NUTS network. The NUTcloud may store Nuts and its storage and bandwidth limits may be affected by service tier levels and user configurable policies. NUTcloud accounts may interoperate with other NUTS based services to supply more permanent and/or accessible storage: i.e. it may backup NUTmail and/or NUTchat messages.

At the base level of service, it may offer a sufficient level of storage and bandwidth for general personal use. Its main purpose may be to facilitate the accessing of data stored in Nuts from any access point on the internet. It may seamlessly integrate with NUTservers to synchronize some or all of Alice's data at home and on the road.

The NUTcloud in conjunction with personal NUTserver may offer the same or better level of synchronization as any internet based centrally managed cloud service; however, unlike the popular freely available cloud syncing services, NUTcloud may offer complete anonymity, user-controlled privacy, full history, full audit trail and/or secured data ownership.

NUTS Based Services: NUTnet

The NUTnet may be a Nut based webserver available to a NUTS user as depicted in FIG. 156. The NUTnet may support anonymous registration, pairwise random aliases and/or RBKs. The NUTnet may store Nuts and its storage and bandwidth limits may be affected by service tier levels and user configurable policy settings. NUTnet accounts may interoperate with other NUTS based services to access more permanent and/or accessible storage: for example, it may fetch Nuts from NUTcloud and/or NUTservers.

Sharing webpage content stored in Nuts may allow users to control who may view the content and it may be done on a cryptographic level. A person may have an RBK pair with the content owner in order to view the posted pages. One may say that this may be an anti-social social network, private social network and/or authenticated social network. None of the content may be mined by the NUTnet server or other unauthorized third party because it may not have any of the keys for the content. As long as the content may be stored and secured in Nuts, the owner may retain control over it. The owner may also view some or all history associated with her postings in her local Nut storage if it may be configured to replicate and synchronize the Nuts locally as well. There may be times when a person feels that sharing pictures and video amongst close friends and family may be a private matter and that no third party may have the right to own a copy of it for their use without knowledge and/or permission of the originator. NUTnet may be created for those situations requiring privacy within a group of users.

Professional photographers may set up private webpages for potential clients to view copyrighted photographs with an immense amount of details and control over who may be issued the keys and for how long. The webpage Nuts may log some or all activity on the photographs to create an audit trail for the photographer. Project managers may set up private webpages for coordinating activity amongst members of the project. From a security perspective, the registration process may be unnecessary due to the access controls built into the Nut but it may serve as an organizing and compartmentalization function at the NUTnet server.

NUTS Based Services: NUThub

Currently, there may be no universally accepted standard on how the Internet of Things (IoT) may communicate and/or function. IoT may be a growing area of hardware products that may have built-in networking capability and may allow users to control and monitor the functions of the product remotely from various personal computing devices. Many IoT products may send a constant stream of data from their sensors back to the manufacturing vendor for them to collect and analyze, sometimes, unbeknownst to the user-owner of the product. The operational mode of some or all of these IoT devices may raise many invasion of privacy issues based on their data collection range and methods since the products may be intended for the most private areas of a person's home. The IoT frameworks to gain some use may be supplied by the IoT hardware vendors for their family of products. NUThub may be a packet forwarding service to facilitate the handling of Nuts based messages which may be created by NUTS compatible IoT-type devices called the Internet of Nuts (IoN). As depicted in the network diagram on FIG. 157, IoN may be a NUTS based standard for communicating securely and privately with your IoN compatible devices at home. The lowest tier of service on NUThub may be available to anyone that may have a registered account with any NUTS based service. The account may be anonymous. NUThub may work with Nuts and it may queue a certain amount of messages. NUThub may interface seamlessly with NUTcloud and/or NUTserver to access additional storage.

The NUThub topology may be configured to work in several ways. The direct topology is shown in FIG. 158 where every IoN device in the user's home may be making independent connections to the IoN vendor servers 15804, the NUThub 15802 and/or user control devices 15806, 15822 and 15824. This topology may allow the vendors to have more direct access to the devices in your home and the user may filter outgoing Nut packets only to the extent of the filtering capabilities of each device: this may be the predominant method of communications used by IoT devices today.

The preferred NUThub topology may be the indirect one as depicted in FIG. 159. Some or all IoN devices may communicate through a designated NUTserver hub 15930 before leaving the LAN 15920 and then traversing the NUThub 15902. This topology may allow for the fine tuning of filtering rules on IoN messages leaving Alice's home based on her comfort level. The NUTserver hub device 15930 may comprise a desktop PC, a special purpose appliance or even be part of the WiFi router 15920. If the designated NUTserver hub 15930 is off or unavailable, no IoN device may communicate with the outside world.

The configuration of a NUTserver hub is shown in FIG. 160. Within the familiar NUTserver 15930, there may be a component called the NUThub/IoN Interface 16032. This module may be responsible for communicating with the NUThub 15902, IoN devices 15922 and/or other NUTserver hubs 16052. The interface module 16032 may log, queue, forward, relay, process and/or filter IoN Nut messages from both the IoN appliances and the IoN control devices.

A closer view of the NUThub/IoN Interface is shown by FIG. 161. The interface 16032 may comprise some or all of these seven functions or other additional functions. The IoN device index 16112 may keep track of some or all the IoN devices registered by the user. IoN Device Authentication 16114 may authenticate and may cipher messages to and from IoN devices. The interface may keep track of the user's Message Filters and Rules 16116. The Message Logger 16118 may log some or all IoN messages to permanent storage. The Message Queue 16120 may temporarily store undeliverable messages. The Device Key Cache 16122 may store some or all the access keys for authenticating and ciphering IoN messages and it may be embodied within protected memory hardware if available. The Remote Control Interface 16124 may be the module that may allow for IoN device specific functions to be activated remotely.

A closer view of the NUThub/NUTserver/IoT interface on any IoN device is shown by FIG. 162. The interface 16210 may comprise some or all these seven functions or other additional functions. The Nuts index 16212 may keep track of some or all the Nuts stored on the device relevant to administering and managing IoN devices. The Authentication module 16214 may authenticate and may cipher messages to and/or from the device to the vendor, NUThub and/or NUTserver hub. The interface may keep track of the user's Message Filters and Rules 16216. The Message Logger 16218 may log some or all IoN messages to permanent storage. The Message Queue 16220 may temporarily store undeliverable messages. The Device Key Cache 16222 may store some or all the access keys for authenticating and ciphering IoN messages and it may be embodied within protected memory hardware if available. The Remote Control Interface 16224 may be the module that may allow for IoN device specific functions to be activated remotely. The IoN device may have a limited set of functionality for custom filtering due to its hardware limitations. It may also have storage limitations which may limit the amount of messages it may log and queue. Therefore, if history and audit trails may be important, the user may be strongly advised to use an indirect IoN topology as depicted in FIG. 159 which may allow him to access the enhanced functionalities that may be provided by a NUTserver hub. This interface 15922 is not limited to IoN/IoT specific devices, any computing device may have a similar interface if a developer may create one for it and follows the operational modes of an IoN device; additionally, any device that may have a version of NUTserver running on it may be capable of acting as an IoN device itself.

When Alice buys her new IoN device, she may need to add it to her network and configure it. The flowchart on FIG. 163 shows the steps that Alice may take to properly register her new IoN device to her NUTS based network. The method of configuring the IoN device may be to establish a RBK relationship with it through Alice's NUTbook. Steps 16302 and 16304 may allow the NUTserver hub to relay device specific information to her NUTbook and in turn the NUTbook may create an IoN/IoT device catalog card, fill in the model, version and/or serial numbers, generate RBK pairs and send it back to the IoN device via the NUTserver hub. The act of creating a catalog card for the IoN device may create a Nut which may create a Nut ID for that Nut; therefore, the IoN device may hereafter be imprinted with the Nut ID of its catalog card Nut. This step may be akin to picking an IP address for a new device on your home network but the potential advantages of using a Nut ID may be far reaching. The assigned Nut ID for the IoN device also may serve as a permanent way to reference the device irrespective of its actual IP address and/or location. The IoN device may be reset to factory conditions so that a new Nut ID may be imprinted on it by a new or same owner.

Once an IoN catalog card is saved in Alice's NUTbook, the configuration process may proceed to step 16306 and it may check if there may be MIO components necessary to decipher the device's configuration data, display it and/or set it. Once the proper settings have been made on the configuration screens, Alice may save the setting into her IoN catalog card for the device and may submit it to the NUTserver hub interface to be sent to the IoN device 16314. The device may receive the configuration Nut, may authenticate it, may decode it, may validate it then may apply the changes to its internal system. Once complete, it may send back a Nut to the NUTserver hub indicating its status. Alice may be monitoring this device and she may see messages from it automatically.

IoN devices may operate in a mode where some or all the messages may be Nuts and therefore may be afforded the same level of privacy and control of Nuts by default. Since Nuts may utilize MIO components, the software configurations, firmware and/or software updates to the devices may be submitted through the same MIOR mechanisms and the potential for being outdated may be low. The NUThub may be configured to may be assure the user that everything may be monitored, logged and/or controlled by her if necessary and that some or all outgoing information that may be collected by the IoN device may be filtered to honor the user's privacy preferences. In this embodiment, the NUTS core philosophy may extend into physical devices so that a device you own may be under your control at some or all times and some or all the data it may generate may be yours as well. The power of MIO and its functionalities may be apparent in this scenario because any data format with a proper MIO component may be inspected by the user unlike many proprietary protocols.

This may bring us to an important module called the Remote Control Interface shown in 16124 and 16224. This may be the method by which a user or vendor may converse with an IoN/IoT device and may have it act on commands remotely which we refer to as Command Nuts. RBK authenticated command Nuts may be processed and the device owner (RAT) may execute any command available on it. This authentication requirement may allow a user to fully control its relationship with the vendor by adjusting the vendor's access rights. A user may allow the device vendor to have full access to it, a subset of it and/or no access. This may prevent unauthorized access to Alice's home network using IoN/IoT devices as entry points: each IoN/IoT access point may be now hardened by NUTS based security. As we may have mentioned the extensive nature of how Nuts may be propagated and may be sent along the intranet and/or internet, basically an IoN command Nut may be sent from anywhere there may be a proper route to the IoN device. The flowchart in FIG. 164 shows how the Remote Control Interface may process command Nuts.

The nature of the NUThub and its Remote Control Interface may give rise to Alice's ability to completely control some or all her NUTS compatible devices from anywhere there may be connectivity. It may present a secure protocol by which custom messages may be sent while being controlled by Alice's NUTbook relationships represented by RBK pairs. It may present a centralized view for Alice for all her IoN devices but it may be installed, configured and/or maintained in a decentralized manner. If Alice controls her Nuts, she may control some or all her devices. This may be another reason that when Alice may decide to use the SSO capability of NUTS she should choose her passphrases very carefully or use a hardware-based key. In such embodiments, the vendor's role may be curtailed to that of the hardware manufacturer and not that of an uninvited remote administrator of a personal device that belongs to Alice and may be situated in a private area of Alice's home. The security of the NUTS environment may present a more unified, hardened and/or user controllable barrier than current IoT protocols which may be biased towards the manufacturer's (developer's) preferences and/or advantages.

NUTS Based Services: NUTS Certification Server

Since the integrity of the NUTserver processes and protocols may be essential to trusting that it may behave as expected, there may be a NUTS Certification Server (NCS) to validate NUTserver installations on an ongoing basis. As pictured in FIG. 165, NCS may be available to any NUTS user and may support anonymous registration, pairwise random aliases and/or RBKs. It may have a tiered level of service with the highest level being official certification by the NCS company as being "NUTS Certified". The main functions of the NCS may be to monitor NUTservers for proper deletion of Nuts and/or detect unauthorized tampering with NUTserver protocols, behaviors and/or processes. Since clever programmers may identify probes and may circumvent it, the architecture of how anonymous registrations work may allow NCS probes into NUTservers to be virtually undetectable. It may be a voluntary level of service that a user may choose to activate on their NUTservers. There may be automated procedures initiated by the NCS to inject a target NUTserver with test Nuts and detect whether certain actions may have been applied to them according to NUTserver protocols. At higher levels of service, active participation by testers may allow even more thorough assessments about the state of a remote NUTserver.

Vendors may subscribe to NUTS Certification level testing to constantly maintain a level of NUTserver compliance that may be made known to their clientele and assure them that their Nuts may be being handled accordingly. The testing process may also highlight any unauthorized modifications to the client's NUTS environments unbeknownst to the client. From the client side, any vendor who may be using NUTS systems and methodologies but may not be "NUTS Certified" may require more inquiries as to their policies for handling Nuts. Users may configure their NUTservers and/or NUTbooks to interface with a lookup table on publicly available NCS databases to assess their certification status or lack thereof prior to engaging with an online vendor.

In FIG. 166 the NCS 16520 may perform functions that may allow it to assess the behavior of remote vendor NUTservers (or personal NUTservers) 16620-16624. The expiration integrity probing 16602 may be a method where Nuts may be injected 16604 into the system and may be probed by the Remote Control Interface 16610 for existence on that system after the expiration time. For example, if expired Nuts are found on the remote NUTserver, the NUTserver may be out of compliance and may not be "NUTS Certified". Long duration injection tests 16608 may test NUTservers for a longer amount of time and on an ongoing basis. Results analysis and certification 16606 may assess the adherence of the remote NUTservers to the various injection tests and may grade the NUTserver installation. Checking the versions of installed NUTservers and the patch versions may be integral to making sure that NUTservers may be updated and in compliance. A long outdated version may indicate lax maintenance of NUTS security protocols and/or unauthorized custom modifications may have been made therefore adoptions may be slower. The testing also may include but is not limited to checking various sensitive binary code segments' hash signatures and/or injecting from anonymous internet addresses. Anonymously registering a NUTserver to the NCS service may assure that RBKs may be set for deeper testing in a more secure way.

NCS may not guarantee that a NUTserver may have not been compromised since with enough knowledge and resources any person or group may eventually circumvent the testing by the NCS. On-site inspections may result in higher levels of NUTS Certification. For the average user, it may be good policy to not engage with any commercial NUTserver that may not have been certified at the highest levels. For engaging with personal NUTservers, a base level of automatic free testing from an NCS may be a minimal requirement prior to engaging with it.

NUTS Based Networking for WiFi/Ethernet Router

FIG. 167 shows an embodiment of a network layout for a personal NUTS based WiFi/ethernet router 16710. The router may operate using the normal protocols that may be involved in WiFi communications as well as use Nuts based messaging as an alternate protocol. A NUTS WiFi router may be installed and configured like any IoN device whereby the owner establishes an RBK relationship with it and may store the information into her IoN catalog card via her NUTbook. During the configuration process, since the user may have most of her devices represented by catalog card entries, she may be able to register some or all the devices she may want to allow access to on the router by Nut IDs. Originating Nut messages may contain the sending device's Nut ID and may therefore be properly vetted against the registration list for access. The router may then be instructed to establish relationships between various devices and itself, thus it may allow secure communications for the contents of the Nut messages. The flowchart for processing messages at the NUTS WiFi router is shown in FIG. 168. Some or all messages that may pass through the router by registered devices may be authenticated. Step 16818 shows an interesting feature that may be available on NUTS based routers. An unregistered device may contact the router for access not using RBKs. When this occurs, it may look up the owner specified configuration settings for bandwidth allocations and limitations for different categories of WiFi accesses: registered, IoT and/or guest. Registered devices may be set with no limitations on the type of usage and bandwidth requested. IoT/IoN devices may have their own category and may require the same level of authentication as registered devices but may be separately managed as a group. The table on FIG. 169 shows the defined categories and the type of access they may have through the router. Guest devices may be afforded access using normal protocols but with constraints. A sample configuration for category-based attribute limits is shown in FIG. 170. An owner may specify per device limits such as but not limited to expiry, bandwidth, aggregate bandwidth, maximum connections of category type, destinations and/or message modes. In this way, guest devices may have internet access through an unknown NUTS WiFi router within certain limits while the authenticated NUTS intranet may be protected by NUTS level secure methods. This methodology effectively may create separately manageable channel categories within the framework of WiFi communications.

Some or all the registered devices of the user may be now independent of internally assigned IP addresses for identification but rather by Nut IDs in a catalog card. This may be a property of NUTS to make data and hardware more tangible and functional across some or all networks in a more universal manner. The router may keep track of dynamic IP address assignments mapped against Nut IDs of registered devices. In future iterations and other embodiments, hardware manufactures may allow Nut IDs to be used alongside IP addresses and/or MAC addresses to access Ethernet interfaces on various devices. Device identifying Nut IDs may be thought of as the equivalent of assigning a system name to an OS installation on a PC but it may be systematic and practically unique therefore changing or adding an Ethernet card to a system may present new IP addresses and/or MAC addresses but it may not change the Nut ID associated with the device.

Parental oversight of their children's internet accesses may be monitored and limited at the router level using a NUTS based WiFi router rather than or in addition to at the device and user levels. The message Nut that may envelope the registered device traffic may include user identification information which may be used to further filter the traffic by parental preferences.

Application Wrapping with Nuts

The advent and development of cloud services, app stores and/or its associated apps may have allowed some form of modularization and/or transferability of apps across diverse devices. However, this may not be the case with desktop or laptop computers. Most applications that may run on them may require manual installations and/or maintenance. This may also be true for well-maintained institutional environments where a mix of pre-selected app packages may be rolled up into a custom install pack by the system administrators for the ease of machine setups. Or, they may create cloned pre-installed applications on disks that may be swapped into computers. For a running environment, it may be very difficult and hard for individuals and/or administrators to monitor and authorize every program that might be installed on a particular device. Very strict account rules may lead to decreased productivity for the user or increased personnel requirements for the systems department.

An application wrapped in a well-constructed Nut may solve many of these issues. Local operating systems may be modified to only allow Nut wrapped applications to run. The implications may be many. This may prevent some or all unauthorized installations and executions of unapproved and unvetted applications. Policies may be enforced by centralized administration of access keys in a managed institutional environment. Viral infection vectors that may involve the execution of a naked binary may be drastically reduced. The NUTserver replication and synchronization features may allow easy propagation of newer versions of installed software across some or all devices. Properly wrapped Nuts may be remotely commanded to self-install using the Remote Control Interface upon successful synchronization. Device environment backups and duplication may be automated using NUTservers as depicted in FIG. 171. Computing device 17100 may store a backup of Nuts for a device that may have failed. Upon getting a new device 17140 ready for installation, the application that may need to be installed properly may be the NUTserver 17144 and its access keys. Then a duplication command from either computing devices with the correct keys may initiate the copying of some or all relevant Nuts from Device 1 to Device 2 and then may perform the necessary installations of some or all Nut wrapped applications.

Superficially, this method may not seem that different from cloning hard drives or having a well procured install script but there may be some significant differences. The Nut wrapped application may be a specification of the application and not the specific binary itself. The binary may be stored in the institutional MIOR and then the MIO mechanisms may take over during the opening process of the Nut wrapped application specification to fetch the correct version of the application for the current operating system of the device which may or may not be the same as the original device it may be replacing. This use of the MIOR may be a way to control application versions within a computing environment comprising heterogeneous operating systems and/or hardware. The use of NUTS technology actually may allow some or all of these processes to occur from anywhere in the internet therefore new machines may be installed and maintained on behalf of an institution in a remote manner.

An example of this may be a salesperson on a weeklong road trip may have his laptop stolen which may have contained 20 custom presentations and confidential client reports he may have wanted to use in client meetings. Assuming the company was utilizing NUTS, the salesperson may go to the nearest computer store and buy a replacement laptop under the guidance of a system administrator. He then may install a standard NUTserver downloaded from the internet on that laptop. The administrator may send him a specially encoded access/install Nut called a Genesis Nut via email and the salesman may download this Genesis Nut on to his new laptop from a web browser based corporate email page. The administrator may call him and tell the salesman the secret passphrase that may unlock the Genesis Nut. Once unlocked using the local NUTserver/NUTbrowser, the Genesis Nut may initiate some or all the processes necessary across the internet to duplicate the applications and data from the salesman's lost laptop from its most recent synchronizations with the corporate servers. In a matter of a few minutes to a few hours depending on the amount of data in the backups, the salesman may be fully operational with some or all his contacts, apps and/or data Nuts reinstalled on his new laptop and it may be done on different brands of laptops and different operation systems as long as the corporate MIOR may be properly seeded and maintained. Parallel to this duplication effort, the administrator may send self-delete commands to the stolen laptop for some or all company owned Nuts stored on it just in case the thief starts up the laptop with a connection to the internet. This may be a precautionary measure since the Nuts on the laptop may be already individually secured with corporate Nut expiration policies.

In another embodiment, a hardware embedded NUTserver may be integrated into an uninitialized computing device that may have a connection to a network harboring accessible source NUTservers and MIOR servers. The Genesis Nut may be loaded onto the device and accessed which may initiate the processes which may lead to the complete installation of a computing environment onto this uninitialized computing device including the OS, drivers, applications, application configuration data and/or user data. The choice of OS may be left up to the user upon examination of the device and contents of the accessible MIOR caches. Applications may be installed incrementally as the user accesses different Nuts or all at one time by querying the source NUTserver for a complete list of needed applications for accessing the user's Nuts.

Event Processing Service (EPS)

The NUThub may allow Nut based communications with IoN/IoT devices and NUTservers. An Event Processing Service (EPS) may function as a coordinator for archiving events that may be produced by IoN devices and applications that may want to generate an event or react to it as depicted in FIG. 172. Since some or all events may be contained within Nuts, any event may be communicated across any network as long as there may be a traversable route between devices. This may allow a user to monitor for desired events in local and remote IoN/IoT devices and/or NUTserver systems. It may allow a user to trigger scheduled or adhoc events on local and/or remote devices. Events may be replicated across some or all of the user's devices if so desired. The EPS may work with the Remote Control Interface to allow for device specific commands to be initiated based on events. FIG. 172 embodies a scenario where a local calendar application 17208 on device 17200 may trigger a timed event through the local EPS 17204 to be executed on IoN device 17220 that may be reachable by NUTserver 17212 on device 17210. The local EPS 17204 may relay the event to another EPS 17214 that may have access to the target IoN device 17220. The EPS 17214 then may relay the event/command to its local NUTserver 17212 and then it may use its IoN/IoT interface to pass the event/command Nut to the IoN device 17220. Upon receipt of the event/command Nut, the IoN device 17220 may authenticate and then may execute the command via its Remote Control Interface. Examples of such events may be as varied as but not limited to starting up remote servers on a schedule, sending emails on a schedule, sending chat messages concerning system statuses, brewing coffee in the morning on an IoN compatible coffee machine, changing the temperature setting on a smart thermostat and/or warming up a car on a cold winter morning twenty minutes after the coffee may have finished brewing.

The EPS may store past events it may have received and generated on each device it may be running in an Event Nut Storage area 17216 and 17206. This may act as an event repository as well as an event queue for communication and device failures. The user or admin may browse these events at a later time and may analyze it for any use thereafter. A user with a NUTcloud account may also have her events replicated to it so that events may be viewed from any internet access. Some or all events may be Nut protected and may be owned by the user. The NUThub may interface with it seamlessly to take advantage of the queuing capability of the EPS.

An example of an application taking advantage of the EPS and its repository may be when a home alarm system starts warning that some of its battery-operated sensors may be low on battery charge. The home alarm system may generate a low battery event specifying the unit that may be involved and may request a service call with the alarm maintenance company. The alarm company may suggest various times it may service the problem to the user via email and the user may make a different time suggestion or accept their suggested time. Upon acceptance, both calendars on the alarm company and user devices may be updated with the appointment information automatically. The alarm system may have a limited RBK relationship with the alarm company thus it may do diagnostics with the implicit approval of the homeowner in a secure manner.

Contextual Computing with App Nuts

There may be an unabashed land grab for some or all facets of a user's digital detritus by web companies such as but not limited to search habits, search history, device specifications, web viewing habits, shopping tendencies, blogging content, social networks, business networks, email content, texting messages, photos and/or even the digitized analysis of their DNA. The overwhelming majority of this user generated data may not be owned, accessed, reviewed, changed, deleted and/or controlled by the user who may have generated it. NUTS technology may make it easier for app developers to store user generated data and may make it easier to give a copy to the user for their own use and archiving. It may provide a common secured container which may vary on content formats via the MIO to allow for customizations. Very few web service vendors may be general enough to cover most aspects of a user's digital footprint; for example, Amazon may only know some of your shopping preferences and Google may know only some of your search history. Thus, web vendors typically may assemble partial slices of a person's habits based on the service they provide. The best vantage point to collect some or all the digital whereabouts and activities of a user may be by the user for the user. A typical network layout for a vendor and the user app is shown in FIG. 173 where a vendor might use local browser-based cookies to tag the user or his current session and may use Big Data gathering servers to record some or all the activities from and on the App.

If a user interfaces with apps that may provide a complete record of their sessions in a Nut for their own archives and use, then the user may eventually be able to gather the various facets of her digital excursions as depicted in FIG. 174. These session histories may provide a context upon which analysis may be done by context sensitive apps to provide more conveniences to the user as shown in FIG. 175. An application may save its session histories in an App Nut 17414 and this in turn may be used by some or all other apps the user may have installed to benefit the user appropriately. The proper analysis of context may derive the essence of the task the user may want to accomplish. An accounting app 17524 may record its sessions in an app Nut 17414 for some or all the bill paying and checking account activities the user may have done. A pattern recognition app 17520 that may read such a session history may analyze it and recommend the historical steps taken to pay the monthly bills and may present a preview of the actions it may take on behalf of the user. If the user agrees with its analysis, it may execute these steps to pay some or all the relevant bills automatically using the various accounts under the user's name. This app Nut may be available to the user across the internet if she synchronizes her Nuts via the NUTcloud 17500.

Another useful aspect of the context saved by app Nuts may be that of repeatable procedures. This may be a common feature among Command Line Interfaces that developers may be fond of where previous commands may be saved for optional re-execution on demand. App Nuts may provide the same type of procedural recalls on demand for the user on virtually any compatible app. A context storing travel app may provide the essence of the requirements for a proposed trip in an app Nut after the initial search on the web by the user. At a later time, the user may resume this search to some or all her preferred travel outlets automatically by re-executing the distilled requirements on them using a context sensitive travel search app. This may alleviate the time spent on re-entering varying forms on each travel website and may produce an automatic summary of some or all her options. Furthermore, since the process may be entirely controlled by the user and some or all sensitive information may be stored by her NUTbook, the queries to vendors she may have mileage privileges and/or memberships with may be applied properly by the context sensitive travel search app to obtain the most personalized and meaningful results to her. This type of deep context sensitive searches may be virtually impossible to accomplish by a single vendor unless the user wholeheartedly may give unfettered access to some or all her sensitive digital information at some or all times to that vendor and trusts it completely; this may be a highly doubtful proposition for the average digitally sensible user.

In another embodiment, FIG. 176 shows the network layout for a user's IoN/IoT devices and the various utilities and services she may subscribe to for her daily life at home. No single company may be able to collect the user's entire home life in a digital manner. However, the user may accomplish this if some or all her devices produced app Nuts and she had an app that may analyze her various digital contexts. An energy saving context sensitive App may analyze the electricity use by various electronic appliances in her home and may merge it with the electric company's peak and off-peak rates to suggest energy saving measures that may be automatically enacted by the app on her behalf. It may analyze her personal use habits of each device to coordinate convenient combinations for her when it recognizes a set of circumstances from the past. IoN/IoT devices may inform her of maintenance requirements if periodically run self-diagnostics reveal failing parts or sub-optimal operational readings.

There may be security concerns with IoT devices containing various environmental sensors which may not be entirely controlled by the owner of the device but rather by the manufacturers and/or potential malfeasant hackers. FIG. 177 shows an example of a network layout of two IoN devices and their respective manufacturers. When app Nuts 17734 and 17744 may be produced by each IoN device 17730 and 17740, it may be locally archived by a NUTserver 17722 in local storage 17724. These archived app Nuts may later be reviewed and filtered by the user before sending them on to the manufacturers to remove any sensitive information that the user deems inappropriate for a third party to collect. In FIG. 178, a contextual analysis app 17808 may offer specialized routine filtering of some or all her IoN/IoT produced messages to minimize unknowingly exposing her privacy to third parties. In this manner, third parties may still gather some data from each device sold only to the extent of which each owner may allow; therefore, they may deduce what personal information the average buyer may be willing to give to them.

FHOG: Flexible Hierarchy Object Graphs

The nut container comprising multi-layered, cryptographically expressed security mechanisms may allow for the storage of arbitrary logical groupings and/or mappings of NutIDs which may be called FHOGs or Flexible Hierarchy Object Graphs wherein each NutID may represent the identity or reference of a nut container holding any storable digital data including FHOG nuts. FIG. 179 shows a depiction of three different nuts expressed as "*.nut" files. "C1.nut" 17900, may represent a typical contact nut where the payload may include data about a person and their contact details. A field marked "type" of payload may be indicated with "contact" to denote this. "P1.nut" 17910 may represent a typical Word nut where the payload may include a document formatted for the Microsoft Word text editor. A field marked "type" of payload may be indicated with "Word document" to denote this. "F1.nut" 17920 may represent a typical FHOG nut where the payload may include a list of NutIDs and other attributes. A field marked "type" of payload may be indicated with "fhog" to denote this.

FIG. 180 shows a FHOG nut 18000 saved in a file called "FHOG1.nut" with NutID=f21, type=fhog and a FHOG comprising a list of NutIDs 18002 along with an indication of the nut payload types of each NutID listed in the FHOG. The NutID entry in a FHOG list may not be limited to the NutID and type. An appropriate combination of attributes may be kept in the FHOG list per entered NutID which may better facilitate the handling of the FHOG by authorized applications. The NutID field may or may not be the primary index for a FHOG. FHOG mapping entries for a given NutID may also take on the form of variable attributes identified by (key, value) pairs as may be appropriate for the ID it may represent thus a FHOG may be in a table form, key-value form or any combination thereof. Any combination of local and/or global references may be used to identify an object in an absolute and/or relative way with the obvious caveats and shortcomings that may be inherent with relative and/or localized identifiers being used as references. References include but may not be limited to NutIDs, pathnames, cloud storage based identifiers, serial numbers, URLs, IP addresses, and MAC addresses. The FHOG 18002 may depict a simple tree graph of 2 levels and 3 nodes 18010, 18020 and 18030 linked by 2 edges or links. Since a generic graph 18040 may be mistaken for a linear graph where the heads may be either 18020 or 18030, the hierarchical encapsulation of nuts f1 18020 and f3 18030 into a FHOG list 18002 by nut f21 18000 may implicitly specify the links 18012 and 18014. Nuts f1 18020 and f3 18030 are FHOG nut types as may be indicated by the "type" field in FHOG 18002. However, the actual nut type of nut f1 may only be further confirmed by traversing the FHOG 18002 and retrieving nut 18020 and browsing the visible metadata and/or gaining permitted access into f1 by the presentation of the proper keys to the "F1.nut" file or container.

FHOG 18002 may be expressed in various data structures such as but not limited to text data, database tables, NoSQL objects, linked lists, arrays, hash arrays, and other complex and/or simple data storage types. An application access to FHOG 18002 may minimally imply read access to the FHOG nut 18000 but may not necessarily imply that the same accessing application may have the same level of access to the nuts listed in its FHOG. Since each nut container may have its own security mechanisms, each linked FHOG nut such as nuts f1 18020 and f3 18030 may require the presentation of the same and/or different credentials (or external input keys) in order to gain further visibility into a linked nut's payload. If the accessing application cannot present the minimally required correct input keys to a linked nut, then its access may be prevented by the linked nut's access security mechanisms in a fully independent and cryptographic manner as specified previously in this disclosure. If the accessing application presents the correct input keys to a linked nut, then its access may still be restricted to some degree by the other security mechanisms at work within the linked nut in a fully independent and cryptographic manner as specified previously in this disclosure such as but not limited to SAC, NAC, variable keyholes, variable locks and infinitely variable lock node graph combinations. This property of independently implemented cryptographic secure access within each nut may: 1) allow for arbitrary FHOGs to present an infinite permutation of access combination graphs derived from the same target nuts and/or their derivative FHOG groupings, and 2) allow for a nut container to be considered as a self-contained protective endpoint for the data within thus shrink wrapping the conventional notions of endpoint protection as known to a person of ordinary skill in the art of cybersecurity to be security at the object layer by an encapsulation capable of enforcing its configured access policies in a way that may be independent of reference monitors and at the same time may be portable along with the data object across any digital environment. Such a perspective of data being capable of acting as its own endpoint, as might be embodied by a nut, may be referred to as Data as an Endpoint, DaaE, and/or declaratively Data is the Endpoint, DitE.

FIG. 181 shows a FHOG nut f8 18100 specifying a FHOG 18102. Some of the NutIDs listed in the FHOG may indicate having links to other NutIDs listed within the same FHOG. The usage of the links attribute may flag this FHOG as an organizational FHOG where the relationships between FHOG NutIDs may be represented in a standalone graph form as depicted by 18130. In this example, graph 18130 may comprise contact nuts showing an organizational hierarchy among contacts. Conventional file organizing systems such as but not limited to file systems, virtual file systems, NAS, distributed file systems and cloud file systems may not easily allow for the creation of organizational representation of its objects as depicted in graph 18130 for numerous reasons and constraints. One such environmental constraint may be the inability to consistently identify data in a practically unique way such as but not limited to a NutID. Tagging a nut container with its own PUID or NutID may allow different systems to use absolute references for a given identifiable piece of data stored in a nut having a particular NutID. A positive characteristic of absolute references may be the general simplicity of directly accessing and/or directly requesting the given NutID (therefore the nut and its protected content) without any further lookups and may present the possibility of minimizing further downstream adverse consequences. Another perspective on the creation and usage of absolute references such as but not limited to Nuts may be that of implicitly defining data identifiers within a universal namespace thereby potentially encompassing any and all possible computing and storage environments within the known Universe. Furthermore, such universal identifiers may lend itself to uniqueness over any time period past, present and/or future thereby presenting the possibility that such universal identifiers may identify an object both in time and space. In conventional pathname based hierarchical file systems, moving a file from one directory to another may aggravate attempts to create FHOG lists by pathnames since any and all FHOG lists using relative pathnames instead of absolute references must be updated with the renaming of the file's pathname; this may result in a cascade of updates to related files stemming from a simple file relocation from one directory to another. Some files systems may present options such as hard links where multiple inodes may be pointing to the same logical file within its file system. The limiting factor of using such hard links may be that, in general, inodes may be localized to the immediate hardware and/or operating environment. On the contrary, a relocation of a nut stored within a conventional hierarchical pathname-based file system may not require the refactoring of those FHOG nuts referencing it by its absolute reference thereby allowing the FHOG list to remain consistent, specific and/or relevant across any and all operating environments and/or time period. The full pathname method of identifying a file may be a widely adopted conventional method of locating a parcel of data within computing environments. There may be some cloud based storage systems where internal mechanisms specific to the vendor may tag client hierarchical pathnames to an internal unique identifier thus operating in a linear file system within the hidden portion of the cloud storage network. However, client exposure to such vendor specific linear file identification schemes may be limited by the vendor and/or may not be fully appealing to the client due to the tight integration involved with a specific vendor supplied system and/or may present integration difficulties across different cloud storage vendor systems. The movement of a file from one directory to another may have the effect of altering its locally unique identifier thereby making it more difficult to permanently identify the file in any manner. Some conventional methods of indexing and hashing the contents of files in a separately maintained reference system in an attempt to uniquely identify them may also present glaring weaknesses due to the rehashing and reindexing necessary of the reference system indexes by any content changes and/or file relocations. A practically unique identifier of sufficient length (a suggested starting length of 512 bits for a NutID) in a universal namespace such as but not limited to a NutID may exempt a system from such additional maintenance due to the nature of its universal namespace identifier being independent of its local pathname or local reference and therefore may bypass many of the conventional difficulties associated with altered references. Furthermore, a FHOG may be viewed as a reference based file system where: 1) the physical storage and/or location of the object may be independent of the identifying characteristic of the object which may be rooted within a large namespace such as but not limited to a Universal Namespace; 2) the modifications of the object contents may have no bearing on its identifying characteristic; and 3) the access privileges of the user to the FHOG may be independent from the access privileges of the user for each of the referenced objects in the FHOG since each referenced object may be expressed in its own nut container exhibiting independent cryptographic access controls.

FIG. 182 shows FHOG nuts f1 18210 and f3 18220 forming a hierarchical tree similar to conventional directory structures in a typical file system. Nut p1 depicted as 18244 and 18264 may contain a Word document in its payload and may be entitled "Project plans" in its metadata. Nuts c1, c2 and c3 may be contact nuts as depicted by 18250, 18252, 18254, 18270, 18272, and 18274. FHOG f1 may represent an organized collection of NutIDs comprising a particular project p1 with three members assigned to the project. Any user/process that may be given read access into FHOG f1 may view at least NutIDs p1 and f3. The access controls allowed by FHOG f1 may not be assumed to be transferable nor inheritable by any of the nuts listed in the FHOG unless specifically enabled to allow such access by the owner(s) (Root Access Tier or RAT level input key holders) of each of the listed nuts. Each nut in the list may provide and enforce its own access controls upon an open attempt by the user/process. Each nut in the list may present with different RAT level owners. For example, the project plans p1 18244 may have sensitive details and may therefore present more stringent access controls thereby protecting its access from the casual FHOG f1 viewer. And, such customized restrictions to project plans p1 may be presented in any other FHOG nut referencing the p1 nut 18244. Nut p1 may have been configured to only allow access in a multi-factor authentication method comprising a project group key and a particular desktop computer within a protected environment. This may present a consistent yet infinitely customizable access control model across any given FHOG nut and its constituent nuts across any heterogenous environments storing the individual nuts independent of any centralized authentication portals which may present inherent insider threat security risks.

FIG. 183 shows FHOG nuts f2 18310 and f4 18320 forming a hierarchical tree similar to conventional directory structures in a typical file system. Nut p2 depicted as 18344 and 18364 may contain a Word document in its payload and may be entitled "Project plans" in its metadata. Nuts c1 and c2 may be contact nuts as depicted by 18350, 18352, 18370, and 18372. Contact nuts may be the same nuts as specified by nuts 18250, 18252, 18270, and 18272 from FIG. 182. FHOG f2 may represent an organized collection of NutIDs comprising a particular project p2 with two members assigned to the project. FHOGs f2 and f4 may show how arbitrary collections of NutIDs may be formed into different FHOG nuts referencing the same absolute NutIDs as those of contacts c1 and c2. Contact nut c1 18350 may have numerous FHOG nuts referencing its NutID c1. Regardless of where the physical representation of nut c1 may be stored, the reference to it may stay the same and unchanged within every FHOG that includes nut c1. If nut c1 is permanently deleted as a nut, then a FHOG entry for c1 may become stale and may require updating if so desired by the FHOG user/process. In some embodiments, a preferred, alternative method of handling deletions of nuts in a nut-based environment may require the use of tombstone techniques to address the inherent complexities with universal identifiers across time in a distributed and decentralized environment since a "deleted" ID may resurface upon partition healing and may present itself as a new and/or resurrected ID.

The use of FHOG nuts may allow for the arbitrary groupings of the same nuts in an infinite number of ways, and, the sharing, transference and/or duplication of a FHOG nut may allow the receiver to enjoy the same organizational view of the constituent NutIDs without having to reference a central store or source such as but not limited to web-based cloud file management systems, NAS devices, distributed file systems, operating systems, and conventional file systems. The replication aspect of the NUTS ecosystem may allow a single user to enjoy the same view of specific groupings of NutIDs within a FHOG across all her computing environments where NUTS may operate.

FIG. 184 shows a depiction of FHOG nuts f2 18310 and f4 18320 in a GUI setting. FHOG nut f2 may be shown as 18462, FHOG nut f4 may be shown as 18466 and Word nut p2 may be shown as 18464. Double clicking on icon 18464 in window 18462 may direct the Word application to open with the payload of p2 using the actionable metadata stored within nut p2 18468. Double clicking on icon 18466 in window 18462 may produce another FHOG GUI window 18474 showing the two project members in nut c1 18470 and nut c2 18472. The behavior exhibited within this example may only be possible if the user/process may have at least read access to each nut p2 and/or f4.

FIG. 185 shows a depiction of FHOG nut f5 18510 which lists NutIDs f1 18560 and f2 18580 within its FHOG list 18512. FHOG f5 may create a higher layer on the hierarchical view of FHOGs f1 and f2 as depicted by 18530 and 18550. This arbitrary additional layer to the organization of all the NutIDs in 18530 may be done in any particular sequence. Unlike some Linux file system soft/hard links, NutIDs may not be limited to nuts within its local environments, and more importantly, the physical relocation of individual nuts may not necessarily make obsolete any FHOGs which may reference them. Element 18540 shows a GUI depiction of FHOG nut f5 with FHOG f1 18560 and FHOG f2 18580 represented by icons.

FIG. 186 shows an expanded variant of FHOG nut f2 18600 containing additional FHOGs 18610, 18612, 18614, 18616, 18618 and 18620. In particular, FHOG f8 18620 may show an example of an organizational FHOG 18630 comprising an organization tree of the related project members and some of their superiors three levels up. 18660 may depict the GUI representation of the organizational FHOG 18630. Conventional file systems may not easily handle data structures such as an organizational FHOG in a natively embedded form nor may typically allow a combination of singly and multiple rooted hierarchical graph structures. In a FHOG, member NutIDs in any graph configuration may be expressed and each may be accessed using the same access methods in a consistent way where there may be no assumptions about security access controls per each NutID and thereby each nut which may be referenced by it. All access controls per nut may be provided solely by the configuration of that nut.

FIG. 186 also shows examples of FHOG NutIDs f12 18616 and f15 18618. Nut f12 may primarily hold references to chats associated with Project p2. These chat references may point to chat nuts and their respective NutIDs and/or NutIDs of access nuts to other chat services and sessions relevant to Project p2. Nut f15 may primarily hold references to emails associated with Project p2. These email references may point to email nuts and/or their respective NutIDs, NutIDs of access nuts to other email services and sessions relevant to Project p2, and/or references to other sources of emails relevant to Project p2. The organization of data presented by FHOG nut f2 18600 may allow many aspects of Project p2 to be logically grouped without unnecessarily duplicating source data objects referenced by the FHOG regardless of where they may physically reside. Therefore, when a duplicate of a source object may be desired for any reason, the encapsulation of such a source object by a nut container may imbue it with all the replication and synchronization features of the NUTS ecosystem.

FIG. 187 shows several networks where example storage endpoints are illustrated such as but not limited to laptop storage 18762, desktop storage 18752, smartphone storage 18740, database server storage 18772, network attached storage (NAS) 18712 within a corporate network 18710, NAS 18720 directly facing a WAN or Internet 18700, and any NAS 18732 supporting a cloud storage platform 18730. The laptop 18760, desktop computer 18750 and smartphone 18740 may be additionally networked to a private LAN 18780. Any of these storage endpoints may be representative of but not limited to software and/or hardware-based RAID configurations, distributed file systems, object storage systems, dispersed storage systems, hybrid storage systems, de-duplicative storage systems, software defined storage systems, backup storage systems, redundant storage systems, archive storage systems and any storage system able to store a logical unit of digital data however the logical storage unit may be defined.

Within the NUTS Ecosystem, a logical location may be defined as any one or a combination of storage endpoints as described in the previous paragraph as long as there may be a method to store and retrieve a logical unit of storage in an orderly manner by referencing an identifier for the logical unit of storage. For example, a nut container may be a logical unit of storage and its NutID may be its identifier. The manner in which an identifier may be resolved from NutID to its physical nut container may be done via a NUTserver NutID index 18812 as shown in FIG. 188. A NUTserver NS1 18810 may manage a NutID index 18812 comprising a list of NutIDs and their respective logical locations. Nuts c1 18822, c2 18824 and c3 18826 may be stored in Location 11 18820; nuts f1 18832, f2 18834 and c1 18822 may be stored in Location L2 18830; Nuts p1 18842 and p2 18844 may be stored in Location L3 18840. A NutID index 18812 may list each NutID and each location where they may be found as of the most recent updates the NUTserver NS1 may have received. Due to the replicative nature of the NUTS ecosystem, a nut such as NutID c1 18822 may be stored in multiple logical locations L1 18814 and L2 18816. In such instances, the NUTserver NS1 may apply optimization rules to retrieve nut c1 in the most efficient manner; for example, location L1 18820 may be an SSD drive directly accessible by NS1 18810 whereas location L2 18830 may be a network accessible storage device therefore possibly making L1 a relatively more efficient method of retrieving nut c1.

FIG. 189 shows three NUTservers NS1 18900, NS2 18910 and NS3 18920 and their respective logical storage locations L1 18904, L2 18914 and L3 18926. Logical location L3 18926 may be serviced by a cloud storage platform 18924 where NS3 18920 may need to be pre-registered and allocated some storage space which we may designate L3 18926.

NUTservers may be networked together and may communicate with each other to know the existence of each other. NUTservers may be configured to form any network topology the user desires and each NUTserver-to-NUTserver connection may require authentication with each other by presenting the proper input keys to gain access to a shared access nut. In this example, NS1 18900 may be networked to NS2 18910 and therefore each NUTserver may send NutID requests and receive messages and nuts from each other. Similarly, NS2 18910 may be networked to NS3 18920. In this particular topology, a client application may be in communication with NS1 18900 and request NutID p1. NS1 may, in turn, lookup NutID p1 within its internal NutID index 18902 and find that it may be not listed there. NS1 may then review if it may have any other NUTservers it may query and find that it may have a connection to NS2 18910. NS1 may then send a request for NutID p1 to NS2, and NS2 may look up NutID p1 in its NutID index 18912 to find that it may be located in Location L2 18914, a locally accessible storage unit 18952. NS2 may then retrieve nut p1 from Location L2 18914 and may proceed to forward it on to NS1 18900, the requestor. Depending on the type of request made from the client application communicating with NS1, NS1 may or may not save a copy of the just received nut p1 into its local repository Location L1 18904 and NS1 may or may not save an entry in its local NutID index 18902. A NUTserver may behave in a consistent manner whereby it may index all NutIDs within its local environment but it may not be a necessary requirement since, in theory, all NutID indexes may be reconstructed dynamically and from scratch by systematically traversing the local storage and from ongoing client NutID requests and queries. A client application may be in communication with NS3 18920 and request NutID f2. In this case, NS3 may send a request to NS2, and in turn, NS2 may send a request to NS1. Upon retrieving nut f2 from Location L1 from NS1, NS2 may forward it to NS3 and thus the original client application may receive a copy of nut f2. Storing nut f2 locally by NS3 into Location L3 may expedite the next request for nut f2 by any application communicating with NS3 thereby serving as a local cache and/or replica store. Note that due to the replicative, synchronizing and/or merging aspects of the NUTS ecosystem, any modifications to a locally stored nut may result in the propagation of those changes throughout the connected NUTservers thereby eventually producing a consistent state (eventual consistency) of the contents of a particular nut amongst all the copies of that nut across such an ecosystem.

FIG. 190 shows a flow chart of traversing a FHOG nut by means of NUTserver requests. An application may be traversing or browsing an open FHOG nut 19010-19014 and since each FHOG listing may be by NutID, the application may request a particular NutID C1 by only using that reference 19016 from the local NUTserver NS. The fetch request to NUTserver NS may succeed or not 19020. Then appropriate tasks may be further processed by the application according to the result of 19020.

FIG. 191 shows a flow chart of a NUTserver handling client requests to fetch a NutID. A request for NutID C1 may be received by NUTserver NS 19110. If NutID C1 is found in the local NutID index of NUTserver NS 19112, then nut C1 may be retrieved and sent to the requestor or the location information for nut C1 may be sent to the requestor depending on the type of request made to NUTserver NS 19144. If NutID C1 is not found in the local NutID index of NUTserver NS 19112, then NUTserver NS traverses its list of NUTservers and NUTcloud accounts (collectively NSC) 19114. For each NSC that NUTserver NS may be able to connect to 19120, it may attempt to connect and request 19122 NutID C1. If nut C1 is found by the NSC 19130, NS may receive nut C1 19132 (or a reference to it) and may send the nut C1 information back to the requestor 19144. NUTserver NS may or may not update its own local NutID index with the whereabouts of nut C1 19142 depending on the type of request that may have been originally made 19140. Furthermore, NUTserver NS may or may not keep a local copy of nut C1 upon successfully conveying its information to the requestor 19144 depending on the type of request that may have been originally made.

Requests to fetch nuts holding large payloads such as but not limited to image files, software images, large database queries, large archives and/or videos may require alternate methods of efficiently sending data between NUTserver to NUTserver, NUTcloud to NUTserver, client to NUTserver and vice versa. Alternate methods may involve but are not limited to multithreaded message sending, low priority message sending, streaming, breaking down into smaller logical units, controllable remote viewing, temporary direct access to external logical storage, direct access to external logical storage via a temporary customized access nut, etc. If the requesting computer may have insufficient memory required to hold a fetchable nut, the request may fail with an appropriate error message prior to any physical transfer having occurred for the desired nut. A network of NUTservers may be configured to allocate and store nuts of varying attributes in an efficient manner. A storage endpoint may be represented by a logical location profile nut which may specify the type of nuts and their relative allocations by nut type and/or priority. Therefore, each accessible storage endpoint within a given NUTS ecosystem may house copies of high priority nuts and certain storage endpoints may be designated for large payload nuts such as images and/or videos. Furthermore, if space is at a premium within a given device, there may be a preference to keep nuts on a recently used basis and discarding older used nuts once a sufficient copy level may be verified. Alternative delivery methods may be applicable for large payloads such as but not limited to online streaming and remote viewing. Each storage device may further have constraint profiles limiting what type of objects it may store such as but not limited to content, security level, size and/or country of origin.

This methodology of stratifying the management of storage allocations using logical locations nuts and/or FHOGs may allow for a self-optimizing storage network which may work across any definable logical storage location such as but not limited to cloud storage platforms, NAS, hard drives, flash drives, databases, software defined storage systems. distributed file systems and RAID systems. Therefore, a FHOG may reference NutIDs stored across such platforms but not limited to cloud platforms, internal work storage systems, personal storage devices and removable storage devices. In a later section of this disclosure, an alternate means of storage management may be articulated by means of catalogs and/or groups which may provide superior flexibility for certain situations.

From the perspective of a user, a FHOG may present a consistent view of organized data on any computer capable of running the core NUTS applications. A FHOG stored in a nut may inherit the operating features of a nut within a NUTS ecosystem such as but not limited to security, replication, history, logs, eventual consistency, and/or multi-user access and edits. A user may easily open a local copy of a FHOG on their portable computer and systematically request a local copy of some or all referenced NutIDs within the FHOG and sub-FHOGs in order to allow easier off-line viewing and/or modifications of such nuts.

A FHOG nut may be configured with revision history and/or event logs within its lock nodes. Tracking the revision history of a FHOG may allow a user/process to view and/or reinstate a previous version of the FHOG as needed. Also, while traversing a previous version of a FHOG, relevant historical parameters may be applied to the target FHOG entry such that upon retrieving the target nut and with sufficient access, the corresponding historical version of that nut may be viewed to match the same time period as the previous version of the FHOG being traversed. Using such historical features as may be found in a nut container and as previously disclosed, it may be possible to view the entire historical state of the FHOG and its listed nuts since its inception independent of any separately operating archival or backup systems and storage.

NCL: NUT Configuration Language

FIG. 192 shows a sample nut container 19200 with NutID n23, filename "N1.nut", NCL nut001 and some payload; furthermore, nut n23 may be configured to accept up to four keys 19202, 19204, 19206 and 19208 in various combinations. The partially exploded view of nut n23 19220 may show a four lock node lock graph configuration which may operate its universal keyholes and variable locks in the following way: lock node 19232 may be configured with an ORLOCK variable lock with two keyholes set for key 19222 and key 19224 of which at least one of the keys must be presented to the universal keyhole of lock node 19232 in order to decrypt it and reveal an output key 19240 for the next lock node 19234; lock node 19234 may be configured with an MATLOCK variable lock with at least two keyholes set for key 19226 and revealed output key 19240 of which at least both keys must be presented to the universal keyhole of lock node 19234 in order to decrypt it and reveal an output key 19242 for the next lock node 19236; lock node 19236 may be configured with an ORLOCK variable lock with two keyholes set for key 19228 and key 19242 of which at least one of the keys must be presented to the universal keyhole of lock node 19236 in order to decrypt it and reveal an output key 19244 for the next lock node 19238 holding the payload; lock node 19238 may be configured with any variable lock which allows access to it by using at least the one output key 19244 in order to decrypt it and reveal the payload within its bag section. We shall illustrate in the next section why lock node 19238 might be configured with a MATLOCK in order to accommodate a Stratum level access control.

FIG. 193 shows the same nut n23 from FIG. 192 to reveal additional layers of access control which may be at work within the nut container comprising the Stratum Access Control (SAC) and Nut Access Control (NAC). The successful decryption of the keyhole for either keyholes 19302 and/or 19304 by inserting the corresponding input key may reveal a decrypted keymap holding SAC keys and/or NAC keys. Such revealed SAC and NAC keys may be inserted into their corresponding lock nodes portions: SAC keys may be inserted directly into the universal keyholes of the lock nodes tagged with the matching Stratum levels such as lock nodes L30 19334 and/or L50 19338. NAC related revealed AAKS keys may be inserted into the Access Keyhole of lock node L20 19332 and may use the AAPK method of propagating access attribute keys along the lock node graph, and/or NAC related revealed AAKS keys may be inserted directly into the Access Keyhole of the target lock node such as lock node L50 19338, and/or any revealed AAKS keys may be directly inserted into those lock node portions which may be controlled by them throughout the nut lock node graph. Revisiting the key requirements for the universal keyhole of lock node L30 19334, the additional access controls of the SAC now may require lock node L30 19334 to minimally accept at least 3 keys to successfully open its MATLOCK: external input key 19306, revealed output key 19320, and the SAC key for Stratum 'a' revealed by the decryption of the keymap from the universal keyhole for the matching input key of lock node L20 19312. In a similar fashion, payload lock node L50 19318 may now require a MATLOCK variable lock configured to require at least 2 keys to successfully decrypt its payload in the bag section: revealed output key 19324, and the SAC key for Stratum 'b' revealed by the decryption of the keymap from the universal keyhole of lock node L20 19312. Therefore, the SAC configured lock nodes (L30, L50) may only be successfully decrypted by external keys which properly reveal the corresponding SAC access keys for their respective Stratum levels.

The NAC configured on the bag of lock node L50 19338 may allow for fine grained cryptographic access control to be placed on the 'data' in the bag section of the lock node. NAC may allow for any combination of Read, Write, Verify and WriteOnly privileges on the target data and/or any other part of the nut. Therefore, successfully traversing all the lock nodes L20, L30, L40, and L50 in 19330 may not necessarily allow the traverser to access the data in the bag of lock node L50 unless specific NAC access rights were granted to the external key holder in the form of Access Role Keys (ARK) in the Access Keyhole of the relevant lock node(s).

The Nut Configuration Language (NCL) segment labeled "nut001" 19352 may show a computer interpretable language that may describe how to systematically construct the lock graph configuration as shown by 19330 including the SAC and NAC layers. Line 1 declares a new NCL nut configuration with a label nut001. Line 2 declares a lock node called payload; indicates its function as part of the bale of a nut; configures the lock node with a variable lock of matlock; sets the Stratum Access Control level sac as 'b' and places an NAC controller on the bag section of the lock node. Line 3 declares a lock node called metadata; indicates its function as part of the tale of a nut; configures the lock node with a variable lock of orlock; and logically and cryptographically creates a link to the payload lock node. Line 4 declares a lock node called gate; indicates its function as part of the hair of a nut; configures the lock node with a variable lock of matlock; sets the Stratum Access Control level sac as 'a' and logically and cryptographically creates a link to the metadata lock node. Line 5 declares a lock node called primary; indicates its function as part of the nutlock of a nut; configures the lock node with a variable lock of orlock; and logically and cryptographically creates a link to the gate lock node. Line 6 declares a new crack (Cryptographic Role-based Access Control Key specification) called the_rat in the primary lock node. Line 7 declares a new crack called payload_verify in the primary lock node for an NAC controller providing verify access on the bag section of the payload lock node. Line 8 declares a new crack called payload_writeonly in the primary lock node for an NAC controller providing writeonly access on the bag section of the payload lock node. Line 9 declares a new crack called payload_reader in the primary lock node for an NAC controller providing reader access on the bag section of the payload lock node. Line 10 declares a new crack called payload_writer in the primary lock node for an NAC controller providing writer access on the bag section of the payload lock node.

The first group of lines 2-5 in 19352 may provide sufficient information to construct a lock node graph with logical-cryptographic links between lock nodes; specify the type/part of lock node each lock node may be acting as; specify if a lock node belongs to a Stratum level; give the lock node a name; set the variable lock types for each lock node; and set any sub-lock node NAC controllers on specific lock node sections. Using such a structured and descriptive language, any arbitrary lock node graph topology may be expressed. The "link=" parameters may specify more than one lock node to create multiple links to multiple lock nodes. The same method may hold for "sac" and "nac" parameters if deemed desirable and/or necessary for the payload.

The second group of lines 6-10 19370 may provide sufficient information to construct a fully functioning NAC controlling mechanism using cryptographic keys providing such fine-grained role based access control functionality. A RAT (Root Access Tier) declaration as in line 6 may specify a full set of NAC controllers on those lock node sections which may only be fully modifiable by an owner of the nut and/or those given such RAT access levels. Additionally, the declaration of a crack called the_rat may default every lock node in this nut to recognize that there may be CRBAC features operating within this nut thereby fundamentally placing the nut into a full NAC mode. The implication of full NAC mode in a nut may require every non-owner (non-rat) key keymap to be seeded with at least verify accessaccess to all RAT controlled data structures within every lock node of the nut such as but not limited to keymaps, AAKS, digital signatures on all non-payload structures and derived keys. A reader access may be included in order to successfully decrypt and authenticate various internal structures in order to be reasonably sure that the lock node traversal continues on valid data from a valid RAT writer. When external input keys may be inserted into a particular keyhole of a particular lock node of this nut 19300, the key insertion operation may specify a crack setting such as payload_reader to indicate this key being inserted should be given verification and read access to the bag of the lock node called payload. The cryptographic mechanics of such fine-grained access control expression having been fully specified in the NAC disclosure of this specification.

The specific NCL directives may not be limited by the sparse examples in these figures but may be expanded to include any directive that describes any features of configuring a nut found in this disclosure. The principles of NCL operation disclosed in these figures may be sufficient to allow a person of ordinary skill in the art to deduce the entire intent of systematically converting programmatic nut construction sequences into a structured statement driven format using modern interpretive computer language programming techniques.

FIG. 194 shows a close-up view of where an NCL definition may be stored within a nut as in lock node L40 19400. The bag section 19410 may hold the NCL; thereby the NCL may be the payload of this lock node L40. The nut 19300 may carry its own structural definition in a compact NCL form and this NCL definition may also provide custom information on how NAC may be expressed, assigned and/or prosecuted on specific sub-sections of various lock nodes that comprise this nut. The number of nut configurations expressible by NCL may be infinite similar to the infinite permutations of lock node graphs. A data structure like a nut carrying information on how to recreate it structurally as well as fully specifying its cryptographic access controls utilizing an NCL definition may allow for simpler applications: an embedded NCL may allow for the precise recreations of very complex nut configurations without burdening the servicing application with specifics on available various nut configurations. The NCL method of configuring, generating and recreating nuts may lend itself to facile customizations of nut configurations by users and/or IT personnel for specific security and sharing purposes for any given payload. A benefit provided by NCL injections may be that a user side application receiving a new nut configuration and authorized to access it may not need to know a priori what nut configurations it may need to know how to recreate; if the user side application can successfully process a valid NCL declaration, the user side application may recreate an infinite variety of nut configurations without any additional programming. A nut with an embedded NCL may be a data structure which may 'teach' or 'instruct' a process to create another data structure like itself.

NCL definitions may be stored in its own locknode as in 19400 with lock node or bag NAC access restrictions limiting the operating process (thereby indirectly the operating user) from reading the NCL directives thereby prohibiting the process from duplicating the nut's structure exactly as formed. This type of NCL read prohibition may be desirable in order to make certain nut structure duplications more difficult and/or hide key IDs. The NCL may indicate required keyIDs for keyholes within a lock node's universal keyhole section. Even though a detailed traversal/analysis of any nut configuration may be programmatically possible, it may be impossible to determine the original nut structure without the creating NCL because nut configurations may be dynamically altered, enhanced, and/or extended during the lifetime of a nut.

FIG. 195 shows a diagram of how a nut n23 19500 having an embedded NCL definition nut001 19502 may duplicate its structure by extracting the NCL nut001 and processing it 19510 to create nut n41 19530. The process 19510 may or may not be instructed to re-embed a copy of NCL nut001 19512 within itself but the default may be to do so as to help perpetuate it more easily by other accessors. The new nut n41 19560 may end up with the same lock node graph as nut n23 19500. However, generating a structural copy of a nut using its embedded NCL may not be the same as duplicating the physical "N1.nut" file and naming the copy as "N2.nut" because such outright bitwise duplication may also duplicate all the internal values such as but not limited to key values, references, encrypted content, salts, IVs, hashes and/or digital signatures for the multiple layers of cryptographic protections configured within the source nut n23 19500. Creating a duplicate nut structure using an NCL may generate a nut with different internal values from the source nut thus providing further obfuscation and/or security of the internal data and its various protection mechanisms of the NCL definition.

FIG. 196 shows a flow chart of creating a duplicate nut structure from a source nut with an NCL definition contained within it. After successfully opening the source nut using the required keys 19610, the application may fetch a pointer to the NCL definition or a copy of it from the source nut 19620.

The application may then process each NCL construction line to form a new nut structure 19630. The processing of NCL construction lines such as one depicted by 19352 may be modeled after conventional command line processing techniques generally well known by a person having ordinary skill in the art and with knowledge of lock node construction methods which may involve the use of SDFT methodologies as previously specified in this document. Once the new nut may be created, specific contents of the source nut may be copied into the new nut as indicated by the application; a clone of the source nut may copy some or all bags found in the source nut to the new nut such as but not limited to the NutID, metadata, logs, history, payload and identifiable keyIDs 19650 and 19660.

The duplication of a nut structure by means of an NCL definition may provide a convenient way to transfer the precise method of nut creation by flexible parametric means rather than by static programmatic declarations. This method may ease the time and cost burdens of hard coding different nut structures in a programmatic way which may additionally lead to leaner and efficient programs. Since the NCL may be expressible as text, NCLs may be generated dynamically on demand by applications programmed to do so thereby allowing for new varieties of nut structures as may be needed. NCLs may express the infinite varieties of constructable lock graphs. An application opening and reading a previously stored nut containing an NCL, may accurately duplicate its structure using the embedded NCL with no previous knowledge of its structure. NCLs may allow for better Structured Cryptographic Programming (SCP) expression thereby making it easier for the application programmer.

A nut container holding its own original NCL definition may be structurally modified over time and its use as to diverge from its original NCL definition. In such situations, the original structure of the nut container may be accurately described by its NCL definition and may be recreated if needed. Incremental modifications to the nut structure may or may not be noted in corresponding updates to its NCL definition. However, nuts configured to hold revision history of NCL definition changes may include previous versions of the NCL definition including its original definition.

Since NCLs may be fully expressible as text, it may be convenient to store a plurality of NCL definitions within a text file, nut or any other storage mechanism. Such a reference store of NCL definitions may serve as a standard set of nut structures accessible by any NUTS compatible application using the NUTS API. Each NUTS compatible programming installation may have additional NCL definition stores for customized nut structures. NCL definitions may also be stored and referenceable as groups or individually within a MIOR and may gain all the advantages of MIOR provided features. A corporation wishing to provide a newer version of their standard nut structure may publish it on their corporate MIOR for easy access by any and all applications configured to use the corporate NUTS ecosystem. In some tightly integrated environments, it may be preferred to not embed the entire NCL within each created nut but may include an NCL reference in the metadata of the nut which may be queried via the MIOR mechanism. A benefit of this method of MIOR-NCL integration may be that a new nut construction may access and may use the most current version of the nut structure that the corporation may have determined may be best for its use.

Conventional definitions of self-describing data structures may be exemplified by key-value based hierarchical data definition languages such as but not limited to XML, JSON and SQL. It may be considered unconventional and/or unorthodox to allow a data structure construct to directly hold information which may be used to replicate its original data structure at initial creation which may be different from its current operating structure. Additionally, NCLs allow for the systematic structuring of cryptographic fine grained access security on the same data structure being described. One intent of NCL may be to allow the user/process the freedom to create any customized nut structure necessary to protect and/or organize payload(s) in a form that may be required by the sensitivity of the payload(s) in an independent, decentralized, and/or distributed manner at the time of need and in a device of the user's choosing regardless of network connectivity and/or access to optional centralized services.

NUT Taxonomy

FIG. 197 shows a sample NUT Taxonomy based on NutIDs. Since a NutID may be a PUID (practically unique ID), a NutID may represent any digitally referenceable and/or identifiable item including itself. The figure may show a sample division of NutID categories and the various sub-categories of NutID data types it may represent. At the root this NutID category tree 19700 may be a 'NutID' which may comprise three sub-categories of 'Resource' 19710, 'Control(FSM)' 19720 (Finite State Model), and 'Asset' 19730. The third level of sub-categories further subdivides each of these into finer sub-sub-categories and so on. This illustration may show that a NutID may represent any digital asset, resource and/or controls. The NUT Taxonomy may be expanded to include any and all digitally referenceable item. Therefore at least for this reason, this disclosure may interchangeably use ID, NutID, and identifiers among other similar terms, to refer to any digitally referenceable item such as but not limited to other IDs, data structures, databases, systems, networks, devices, files, file systems, etc.

Finite State Machine (FSM)

FIG. 198 shows a sample generic state table representing a Finite State Machine (FSM). The State column, S, may indicate the various states the system may be in such as S0, S1, S2, . . . . The Condition column, Cx, may indicate the defining simple and/or complex condition(s) upon which the FSM may transition to that corresponding state such as when in state S3 and meeting condition C3=False may mean the FSM continues being state S3 whereas meeting condition C3=True may mean the FSM may perform action A3 and the result of performing action A3 may produce True transitioning state S3 to state S4; however, if the result of performing A3 is False, the FSM may transition from S3 to S2. There may be many different types of FSMs but in all FSMs, the primary goal may be to articulate an orderly transition from one known state to another of a set process or algorithm. The field of electrical engineering may use extensive use of FSMs such as but not limited to truth tables. Server, multithreaded and/or massively parallel programming may require the use of many FSMs to control multiple processes. MapReduce technology may use FSM techniques as a fundamental building block of its technology. A processor acting on an FSM may hold the FSM in locations comprising running memory, a database, shared memory, network drives and/or other processes.

An FSM may be saved and operated upon by storing the state of the FSM into a secure portable container such as but not limited to a nut. The payload of a nut may store an FSM in a convenient, portable, secure and replicated way.

FIG. 199 shows how two processes A 19900 & B 19910 may operate the FSM 19924 embedded in the payload/bag 19922 of nut 19920 in a manner that comprises trust, protection, provenance, authentication, privacy and persistence. Process A 19900 may be operating an application and may indicate a state transition in FSM 19924 which may be then stored, saved 19902, transmitted and/or replicated 19914 to process B 19910. Process B 19910 may be operating the same or different application from process A 19900 and may indicate a state transition in FSM 19924 which may be then stored, saved 19912, transmitted and/or replicated 19904 to process A 19900. This cycle of FSM transitions between the two processes may continue until at some point a terminal state may be reached or the processes may be halted. Therefore, a single nut may hold at least one or more FSMs that may function to couple two or more independent processes to operate in-part according to an FSM within that nut; furthermore, the FSM in the nut may specify a fully encompassing series of states and/or actions that may be entirely domiciled within the context of the nut or it may interact with other external elements outside of the nut such as but not limited to the processor's internal operating states, other processes, the operating system/environment of the running process, external events, other nuts, other FSMs in nuts, other FSMs, etc. Security of the FSM in a nut may be of a consistent and persistent quality due to the nature of the security provided by nut containers, and this security may propagate to processes handling such FSM nuts within the context of processing the FSM nut mainly due to the cryptographic restriction of a process not being able to properly access a FSM nut's FSM without the proper access keys.

The persistent and/or resilient characteristic of a nut may allow a FSM in a nut to recover its state at any point and continue processing regardless of the internal state of the processing application. Therefore, a processor or set of processors may operate on as many FSM nuts thereby effectively operating as many FSMs in serial and/or in parallel in an entirely independent and resilient way across a single or multiple devices operating in single or multiple communication networks.

FIG. 200 shows a sequence of steps illustrating how Alice 20000 and Bob 20010 in their respective computers installs an embodiment of NUTserver (NS), NUTbrowser and/or Rendezvous Server (RZ). A combination NUTserver+Rendezvous Server may also be indicated by NSRZ or simply NS as shown in a later part of this disclosure. The install process for Alice 20000 may minimally require Alice's system 20000 to create an NSID, a NutID for the NS system being installed, called AliceNSID 20002. Then step 20004 may create a contact nut Na for Alice with NutID=AliceID and minimally saving an email address for Alice, AliceMail. The install process for Bob 20010 may minimally require Bob's system 20010 to create an NSID, a NutID for the NS system being installed, called BobNSID 20012. Then step 20014 may create a contact nut Nb for Bob with NutID=BobID and minimally saving an email address for Bob, BobMail. With these respective systems being setup as in FIG. 200, Alice and Bob may be ready to create RBK based relationship utilizing a relationship FSM in a nut called a Relationship nut.

FIG. 201 through 208 illustrates the steps in establishing a Relationship nut between Alice and Bob. Relationships via RBK may be covered in FIG. 113 through 119 along with their associated specification sections. A simple method of establishing a RBK relationship between two parties with installed NUTS systems using a FSM embedded in a Relationship nut may be shown. In this simple example, it may be sufficient to allow the sharing of a nut by means of having a keyhole defined for each party. Any nut found in such a shared configuration may be eligible to being "pushed" by the NUTserver/RZ (NS), upon modification if the other NS may be available and ready to receive such shared nuts. Many efficiency steps and/or additional feature steps may be introduced to make this simple example method better but it may suffice to show the overall machinations of the FSM in performing this operation.

Alice has a laptop 20100 installed with a NS and having established her own contact nut Na 20102. Bob has a laptop 20110 installed with a NS and having established his own contact nut Nb 20112. Alice decides to establish a relationship with Bob using NUTS by means of a relationship nut Nd 20108. Alice instructs her NUTbook on system 20100 to create relationship nut Nd 20108 by providing at least Bob's email address, "BobMail", a password of Alice's choosing "bobpw", and his contact name, "Bob", that Alice wants to know Bob by in her NUTbook address book in system 20100. Alice's NUTbook and NUTserver coordinate to create a local contact nut for Bob, Nc, in Alice's contact book (NUTbook) including in its payload at least his name, email address and her side of the RBK between them, the Bob-to-Alice asymmetric key pair [kuBA, krBA] used to encrypt(lock) nuts being addressed to and/shared with Bob within the context of this relationship. Nut Nc may be keyed for only Alice to access it using her access key(s) in her own contact nut Na 20102 or another access nut if so desired by Alice thus Nc may NOT be a shared nut. Alice's NUTserver/NUTbook may create a relationship nut Nd 20108 comprising a keyhole for Alice using key kuBA, a password keyhole for Bob using password "bobpw" with access for Bob to create additional keyholes in the relationship nut Nd, a payload comprising a FSM for the relationship states from Alice's and Bob's point of view, Bob's name, Bob's email, Alice's name, Alice's email, key kuBA. At this point, the relationship FSM in nut Nd may be marked as state 1 "manual send" for the sender status field 20106 then the nut Nd may be closed and saved. Alice's NUTbook may index keyID for kBA (kuBA, krBA).

Step #1: relationship nut Nd may be submitted to Rendezvous Server RZ 20130 alongside RZ cleartext metadata wrapper data comprising BobMail and AliceMail email addresses. Step #2: RZ 20130 may send relationship nut Nd as an email attachment in an email addressed to BobMail and CC: to AliceMail and may send it to the email host for RZ 20122. Step #3: RZ email host relays the email to Bob's email host 20124 and CC: to Alice's email host 20120. Step #4: each email host relays mail to the mail clients on 20100 and 20110. Bob and Alice communicate out-of-band where Alice conveys to Bob that the relationship invite password for Bob may be "bobpw". Note that this out-of-band exchange of a secret may be substituted by any standard key exchange method such as but not limited to Diffie-Hellman based methods thus allowing the invite-acceptance process to be automated even further; however, any key exchange method relying on pre-quantum algorithms may be rendered weak or insecure with the advancement of quantum cryptography in which case it may be advisable to use post-quantum based key exchange methods if and/or when available. Bob views the email from Alice with the attached relationship invite nut Nd 20118. Bob drags and drops the email attachment Nd into his NUTbrowser nut drop area. The NUTbook may begin to open the nut Nd and may prompt Bob to enter a password for a keyhole. Bob may enter the password "bobpw" and the NUTbook may start the process of accepting a relationship request from Alice. Bob's NUTbook and NUTserver may coordinate to create a local contact nut for Alice, Nf, in Bob's contact book (NUTbook) including in its payload at least her name, email address, key kuBA and his side of the RBK between them, the Alice-to-Bob asymmetric key pair [kuAB, krAB] used to encrypt(lock) nuts being addressed to and/shared with Alice within the context of this relationship. Nut Nf may be keyed for only Bob to access it using his access key(s) in his own contact nut Nb 20112 or another access nut if so desired by Bob thus Nb may NOT be a shared nut. Alice's name, email and key kuBA may originate from the opened relationship invite nut Nd from Alice. The NUTbook may write key kuAB into the Nd payload, may set the target status 20116 to 5 "received/cleanup" in the relationship FSM in the payload; may add a keyhole for himself in Nd using key kuAB which he may use to open the nut as well; then the NUTbook may close and save the nut Nd. Bob's NUTbook may index keyIDs for kBA and kAB (which ever parts he may have access to so far).

Bob's NUTserver 20110 may determine that nuts Nf and Nd may have been modified and/or new. For nut Nf, the NUTserver may do nothing more than index its NutID and version marker locally. For nut Nd, the NUTserver may index the NutID Nd and its version marker and it may determine that there may be a keyhole in nut Nd related to Alice contact 20114. Bob's NUTserver may send nut Nd to RZ 20130 and the RZ may relay it directly to Alice's NUTserver 20100. Alice's NUTbook may sync and merge the newly received nut Nd with its existing slightly older copy. In this case, it may evaluate both versions of nut Nd and decide to replace its old copy with the new one. Alice's NUTbook may open the relationship nut Nd using the Bob-to-Alice key krBA thereby having some indication that Bob may have sent it. A successful opening of nut Nd may further give comfort that it may be indeed Bob who may have sent this nut Nd. Alice's NUTbook may recognize that the Sender Status may be in "manual send" and Target Status may be set to "received/cleanup". The NUTbook may copy the key kuAB into her contact nut for Bob Nc 20104; may index key kAB (kuAB and krAB); may delete the keyhole in Nd for Bob with a password "bobpw"; may mark Sender Status to 6 "cleanup/ack"; may close and may save nuts Nd and Nc.

Alice's NUTserver 20100 may determine that nuts Nc and Nd may have been modified. For nut Nc, the NUTserver may index its NutID and version marker locally. For nut Nd, the NUTserver may determine that there may be a keyhole in nut Nd related to the Bob contact 20104. Alice's NUTserver may send nut Nd to RZ 20130 and the RZ may relay it directly to Bob's NUTserver 20110. Bob's NUTbook may sync and merge the newly received nut Nd with its existing slightly older copy. In this case, it may evaluate both versions of nut Nd and decide to replace its old copy with the new one. Bob's NUTbook may open the relationship nut Nd using the Alice-to-Bob key krAB thereby having some indication that Alice may have sent it. A successful opening of nut Nd may further give comfort that it may be indeed Alice who may have sent this nut Nd to Bob. Bob's NUTbook recognizes that the Sender Status may be in "cleanup/ack" and Target Status may be set to "received/cleanup". The NUTbook may mark Target Status to 7 "active"; may close and may save nut Nd.

Bob's NUTserver 20110 may determine that nut Nd may have been modified. For nut Nd, the NUTserver may determine that there may be a keyhole in nut Nd related to Alice contact 20114. Bob's NUTserver may send nut Nd to RZ 20130 and the RZ may relay it directly to Alice's NUTserver 20100. Alice's NUTbook may sync and merge the newly received nut Nd with its existing slightly older copy. In this case, it may evaluate both versions of nut Nd and decide to replace its old copy with the new one. Alice's NUTbook may open the relationship nut Nd using the Bob-to-Alice key krBA thereby having some indication that Bob may have sent it. A successful opening of nut Nd may further give comfort that it may be indeed Bob who may have sent this nut Nd. Alice's NUTbook recognizes that the Sender Status may be in "cleanup/ack" and Target Status may be set to "active". The NUTbook may mark Sender Status to 8 "active"; may close and may save nut Nd.

Thus, the relationship between Alice and Bob may be considered active and acknowledged by both participants and a direct, secure, private route of communication may be possible via a RZ. Shared nuts between Alice and Bob may automatically be managed and replicated, synchronized and merged (as per previously discussed methods in this disclosure) without user intervention thereby effectively creating a secure, end-to-end, bidirectional communication channel on each shared nut basis using FSM mechanisms embedded in a nut payload to establish and coordinate the dynamic state changes of the relationship affirming process comprising the secure exchange of RBK keys between the participants.

FIG. 202 illustrates how nut synchronization works after a relationship is established. Email servers 20220, 20222 and 20224 may no longer be necessary for communications between two users in a nut-based relationship. Information comprising RBK keyIDs the respective local contacts Nc 20204 and Nf 20214, the relationship nut Nd, the respective machine identifiers for 20200 and 20210 may be sufficient to allow each respective NUTserver 20200 and 20210 and RZ 20230 to route appropriate nuts keyed for various participants in a rudimentary manner. A person of ordinary skill in the field of network routing and/or data distribution may find numerous existing methods to maximize efficiencies in all stages of the examples shown in FIGS. 201 and 202. However, at the crudest level, the examples shown in FIGS. 201 and 202 may work in a broadcast network with virtually no intelligent routing albeit with suboptimal efficiency. The routing method in FIG. 202 may minimize data duplication and leakage to email/relay servers outside of Alice or Bob's control. RZs may default to an operating mode of holding minimal cached nuts but all nuts cached may be secured by default by each originator and the RZ may not hold keys for them by default. This may result in three total copies of nut Nd to exist in the configuration of FIG. 202 between 20200, 20210 and 20230. In comparison, the initial relationship nut invitation configuration of FIG. 201 may result in a minimum of nine copies of the initial nut Nd: Alice local Nd, Alice email client cache on 20100, RZ local copy 20130, RZ email client cache 20130, RZ email host copy 20122, Alice email host copy 20120, Bob email host copy 20124, Bob email client cache 20110, and Bob local copy on 20110. This count of nine copies may not account for any relay mail servers in between the various email hosts which may opt to cache it and may be beyond the control of either Alice or Bob.

FIG. 203 illustrates the data fields layout of a relationship nut's payload. Table 20300 lays out sample fields in an originating initial invite as may be inferred by Primary 1 keyhole indicating it may be a password keyhole. The sender and target status fields comprise the relationship FSM. The RBK fields may be where the pair of asymmetric key sets may be stored for each participant of the relationship. Table 20310 lays out the sample fields in an established 'active' relationship where the password keyhole no longer exists and all keying may be primarily driven by RBK.

FIG. 204 shows a flow chart of the relationship establishing process. Referencing the fields in the tables from FIG. 203 and elements of FIG. 201, this flow chart may show the initial basic steps needed to drive the relationship FSM using nut Nd for establishing a relationship between Alice and Bob initiated by Alice. After step 20480, the process continues by referencing FIG. 205 and FIG. 206 which represent the relationship FSM in the relationship nut Nd from the perspective of Alice (Sender) and Bob (Target) and each respective state in progression.

FIG. 207 shows a flow chart of catching nuts in a NUTserver/NUTbook for establishing a relationship. The flow chart depicts the broad steps that may be used in matching relationship FSM conditions to identify which state the relationship nut may currently be in 20706 and what it may transition to 20712.

FIG. 208 shows a steady state of nut synchronizations for established relationships. Once a relationship may be deemed in active state for both Sender and Target, the free flow of secure nuts may freely pass between the relationship participants. The Rendezvous Server 20830 may be useful for many reasons such as but not limited to: bridging IPv4/IPv6 environments, zero-knowledge caching, efficient routing, gateways to protected environments, offline caching, group data distribution, etc. When so desired and when the environments meet sufficient minimal operating requirements, Alice and Bob's devices may connect to each other directly without an intermediary such as the RZ 20830 thus perhaps enabling a more secure transmission of data on top of the inherent data protection characteristics available in the transfer of nut containers, and more dedicated and efficient transfers of data between their devices.

In FIG. 201 through 208, Alice and Bob establish a single relationship using a single relationship nut, Nd, utilizing the state transitions in a single relationship FSM embedded in the payload of nut Nd. This relationship establishing method may not limit Alice and Bob from creating a second, a third and/or any number of separate relationships via separate and different relationship nuts as needed. The mechanics may change slightly for the second and subsequent relationships since the initial conditions may be different such as but not limited to an existing relationship therefore an existing nut transit pathway that may be leveraged via access to an NS-RZ network; the use of existing RBKs to prepare the setup for subsequent relationship nuts therefore no longer requiring a manual password to be communicated to a participant, and replacing the introducing RBKs with specific RBKs pertaining to the new relationship. A typical example of multiple relationships between Alice and Bob may be exemplified: 1) Alice and Bob may be coworkers in the same department and may need to share work files between them when either or both of them may be working remotely so they establish a "work" relationship nut between them and may use this relationship to share such work files; 2) Alice and Bob become socially friendly outside of work and decide to exchange personal emails and phone numbers but also desire to share personal invitations to BBQ outings outside of work and pictures of the BBQ afterwards so they establish a "personal" relationship nut between them and may use this relationship to share such personal files. Each target contact payload (Bob from Alice's NUTbook perspective and Alice from Bob's NUTbook perspective) may be augmented to have a separate but distinct section for each related relationship nut between them. Therefore, any number of such relationships may be supported using this method.

A deletion of a relationship nut and/or an appropriate relationship status setting of "ghost" in the relationship nut's FSM may be sufficient to terminate the relationship. The deletion operation may be a more permanent and more effective method of disregarding any incoming communications from the other party without giving them any direct clues to the user's intent. Changing the relationship status to 'ghost' may give clues to the other party in the relationship that the relationship may have soured for some reason and the other party wants to communicate no longer. However, since a typical relationship nut gives both parties read and write privileges to the same payload, the Target and Sender statuses may be protected by the appropriate RBK to prevent the undesirable alteration of a desired status by the other party. This protection may be enacted by a simple digital signature on the respective relationship status field value using the proper RBK key therefore only the correct party may modify it and any attempts to make unauthorized changes to it may be noticed and rectified.

Carnac Revisions

FIG. 209 illustrates a timeline for revision history purposes. The past 20900 may be indicated by time points $t_{p1}$, $t_{p2}$ and tp3. At each time point in the past, there may be revision history deltas 20902 which we may refer to collectively as 'history' 20904 part or section of a nut. The present 20910 indicated by time point to may be reflective of the current state of the payload 20912 and may represent the cumulative agglomerations (summations) of historical deltas or revisions over time 20914.

FIG. 210 illustrates a timeline that extends to the future. A future 21020 may be indicated by time points $t_{p1}$, $t_{p2}$ and $t_{p3}$. At each time point in the future, there may be possible future events 21022 which we may refer to collectively as 'fate' 21024 part or section of a nut. The combination of 'history' 21004 and 'fate' 21024 may be called Carnac Revisions. Coverage of a nut's history and log sections may be covered in FIGS. 111 and 112 along with their associated specification sections.

In conventional computer science, a data object's past, present and future may be found on separate storage locations, handled by separate processes and applications, and/or enacted upon by vastly different mechanisms with no organizing principle uniting these at least three phases of data. Carnac Revisions may unite the at least three phases of data into a cohesive organizing principle that every piece of data may have a past, present and/or future. Computer science may be replete with mechanisms organizing the past such as but not limited to backup systems, archive systems, source code control systems and revision control systems. Computer science may also have many ways of enacting and recording possible future events such as but not limited to calendars, task managers, event schedulers, batch schedulers and cron jobs. Carnac Revisions may allow a single data object to chronicle itself, hold its present state and/or schedule possible future events on itself or on its behalf in a unitized fashion. This may be a significant perspective shift in how we view data as having not only depth in time past but in time to pass. Carnac Revisions may present a significant technological difference from conventional technology due to its data centric approach rather than an application centric approach. Carnac Revisions may allow handling the continuous timeline of data in a unitized fashion in a distributed, decentralized and inherently secure way from the data's perspective.

FIG. 211 shows three different variants of Carnac Revisions in a nut. 21110 may be a nut originally displayed and described by FIG. 58. Lock node 21112 may be the tale part of the nut holding this nut's history. In nut 21120, there may be distinct lock nodes comprising the tale 21122 and fate 21124. These correspond to the history 21190 and events 21192 of the lock graph or nut. In nut 21130, the tale and the fate parts may be combined into a single lock node 21132 called carnac 21194. The embodiment of Carnac Revisions may not be limited by these three variants and may inherit a subset of the infinite permutations of lock graph configurations wherein the subset itself may be infinite.

FIG. 212 is an expanded table of nut parts definitions. The original nut parts table in FIG. 81 may be expanded to include the fate 21204 and carnac 21206 parts.

FIG. 213 shows a table view of an Event Driven State Machine (EDSM). An event driven state machine 21300 may be a specific type of FSM with certain constraints regarding its operating mode. Statements S1, S2, S3 21310 may each be triggered by a combination of events 21330 wherein a default event of "COMPLETE" may be raised at the completion of processing each statement and/or a default event of "COMPLETE" may by default trigger, in the absence of any other event combination, the next statement in sequence 21310 to be evaluated. This distinction of the EDSM may be consequential in the processing of future events of Carnac Revisions.

FIG. 214 illustrates an EDSM command language. The fate of a nut may be prescribed in an illustrative but non-limiting example of a generic EDSM command language. A person of ordinary skill in the art may understand the basic structures and intentions in this example to apply more sophisticated lexical and syntactical techniques to make the EDSM command language more feature rich and flexible. Section 21400 may be processed as when the "COMPLETE" event may be raised AND event E1 may be equal to condition C11 21402 then execute statement S1 21404 and upon completion of statement S1, return a "COMPLETE" event with a value of true or false based on the ending condition of the execution of statement S1 21406. Section 21410 may be processed as when the "COMPLETE" event may be raised AND event E1 may be equal to condition C11 AND event E2 may be equal to condition C22 21412 then execute statement S2 21414 and upon completion of statement S2, return a "COMPLETE" event with a value of false or raising event E3 based on the ending condition of the execution of statement S2 21416. Section 21420 may be processed as when the "COMPLETE" event may be raised AND event E3 may be equal to condition C33 21422 then execute statement S3 21424 and upon completion of statement S1, return a "COMPLETE" event with a value of 0 or −1 based on the ending condition of the execution of statement S3 21426. Section 21430 may be processed as when the "COMPLETE" event may be raised AND event E4 may be equal to condition C44 21432 then execute statement S4, S5, S6 21434 and upon completion of the statements, return a "COMPLETE" event with a default value of the ending condition of the execution of statement S6. An alternative term for this type of EDSM command language may be the Carnac Command Language (CCL).

FIG. 215 shows examples of the Carnac Command Language. Section 21500 may be processed as when the "COMPLETE" event may be raised AND system clock may be equal to noon local time then execute statement S1 and upon completion of statement S1, return a "COMPLETE" event with a value of 'complete' or 'error' based on the ending condition of the execution of statement S1. Section 21510 may be processed as when the "COMPLETE" event may be raised AND last statement may be complete then execute statement S2 and upon completion of statement S2, return a "COMPLETE" event with a default value of the ending condition of the execution of statement S2. The triggering event of section 21510 may be logically equivalent to just processing the next statement in sequence in a logical group of sequential statements. Section 21540 may be processed as when the "COMPLETE" event may be raised AND the start event may be detected then execute statement S1 and upon completion of statement S1, return a "COMPLETE" event with a default value of the ending condition of the execution of statement S1. Section 21530 may be processed as when the "COMPLETE" event may be raised AND 1 clock second has passed then execute statement S2 and upon completion of statement S2, return a "COMPLETE" event with a default value of the ending condition of the execution of statement S2. Section 21550 may be processed as when the "COMPLETE" event may be raised AND 2 clock seconds has passed then execute statement S3 and upon completion of statement S3, return a "COMPLETE" event with a default value of the ending condition of the execution of statement S3. Sections 21500, 21510 and 21520 may sequence themselves in this manner at 11:00 local time: since it may be not noon local, skip statement S1, raise "COMPLETE" event, execute statement S2 since "COMPLETE" event raised AND the last statement completed (the entire EDSM line denoted by the brackets in 21500), raise "COMPLETE" event with value of return value from statement S2, execute statement S3 since "COMPLETE" event raised AND the last statement completed (the entire EDSM line denoted by the brackets in 21510), raise "COMPLETE" event with value of "complete" or error based on return value from statement S3 execution.

Sections 21540, 21530 and 21550, may sequence themselves in this manner upon execution: since execution started, raise START event, execute statement S1 since start event detected, raise "COMPLETE" event, event pauses processing for 1 second, execute statement S2 since "COMPLETE" event raised AND the wait event may be detected, raise "COMPLETE" event with value of return value from statement S2, event pauses processing for 2 seconds, execute statement S3 since "COMPLETE" event raised AND the wait event may be detected, raise "COMPLETE" event with value of the return value from statement S3 execution. As clearly described in these two example sections, the commands within the brackets { } may be considered as one logical statement with an event constraint. Some differences of this EDSM command language or CCL to that of conventional task scheduling or programming languages may be that even the simple incremental step of processing the next statement in sequence may be constrained by arbitrary event conditions, that every statement or logical groupings of statements may be tied to at least one event with even the completion of a logical statement raising a "COMPLETE" event.

FIG. 216 illustrates CCL for calculated delays. A conventional programming language may race onto the next statement as soon as practically allowed by the processor's timing clock according to its processing manifest. Delayed execution of statements may not be a familiar feature of programming languages except for running them in a specialized debugging environment wherein execution characteristics may be controlled externally from the application or by injecting specialized timing libraries. CCL may inherently provide a systematic delay feature due to its built-in event processing per statement ability. Line 21600 indicates the targetCPU variable to the Intel 8086 running in 10 MHz speed. Line 21602 calculates a relative nanosecond delay value for the currently running processor specifications vs the targetCPU specifications. This calculated delay value may only be theoretically accurate due to OS overhead that may be present in real operating conditions and/or the load of machine at the time of execution. However, if a developer wanted to slow down the processing to 5 seconds per statement, he may just set the delay to 5 seconds. Every statement thereafter 21610, 21620 and 21630 may have at least the wait delay_ns nanoseconds as a trigger event to effect a uniform delay prior to statement execution. Alternatively, as commented out with '#' markers, the delay may come in forms such as cycle counts of the relative CPUs in play.

FIG. 217 shows calendar event examples using CCL. Line 21700 sets a condition for the CCL code to only run on a process that may be running a NUTserver/Rendezvous Server where the RZ may be in eRZ mode. This condition may be warranted in order to limit certain events to be processed by a limited number of NUTservers, in this case, a single process. A calendar in a nut may be replicated and distributed across several of the user's devices. If the calendar's future appointment and/or reminders may be coded into the carnac of the nut, then without such machine-mode specific constraints, all the user's devices holding a replica of the calendar nut may trigger the same event at around the same time thus causing the event to be multiplied by the number of replicas within the users NUTS ecosystem: a wholly undesirable behavior in a distributed and decentralized environment. eRZ mode of an RZ may be discussed in a later section of this disclosure. Therefore, with this condition(eRZ) in effect, the statements in this example may only run once in a single eRZ ecosystem. Other controls may be put into place as needed in order to avoid the multiplying effects of independently processed replica nuts. Statement 21710 may send a reminder text to the user about his wife's birthday on Jan. 6, 2020. Statement 21720 may insert a calendar appoint for a noon staff meeting on the first Wednesday of every month going forward. Statement 21730 waits 36.5 hours then may send an email embedded in a nut to a distribution list. Statement 21740 may be triggered when a system reboots, then it waits 15 minutes and then executes an application or script in the payload of the nut.

The examples in FIG. 217 may point to some advantages of utilizing a universal identifier such as but not limited to a NutID in that it all encompassing taxonomy allows the integration of any NutID at any time or place. Statement 21730 simply references a premade email content stored in a nut with someNutID. This nut email may or may not be locally found but as long as the user's ecosystem may locate it amongst her accessible storage locations, it may be fetched and sent. In this context, the NutID may traverse any and all digital environments regardless of OS, FS, network, etc. In statement 21740, the 'execute_payload' command may be replaced with an 'execute nut(someNutID)' command where the executable nut may hold any executable payload but the access to the executable nut may or may not be permitted based on the configured cryptographic access controls of the executable nut which may be changed over time by the owner of the executable nut.

CCL may be injected into any nut therefore any payload may have a custom actionable event calendar all protected by the security of the nut container. The fate part of the nut may be placed in a separate lock node thereby affecting its own security constraints since it may be deemed an executable which poses higher risks in an operating environment. The plethora of variant access controls configurations in controlling various parts and aspects of a nut may be sufficient in addressing very challenging security scenarios in sensitive environments and/or sensitive data/documents. A simple use of CCLs with a document may be a document stored in a nut that comes with its own event appointments therefore the receiver of such a nut may not have to manually insert document associated deadlines into their personal calendars but may simply accept the suggested possible future events into her own calendar nut: the self-appointing document. In the legal and accounting fields where a deluge of arbitrary deadlines may be the norm, the secure sharing of self-appointing documents may ease the burden of calendar management for all participants involved. For example, in the patent world, priority dates and filing deadlines may be some of the driving factors of legal work to be done in a timely fashion, self-appointing documents shared by a jurisdiction's patent office to the legal team and their clients may significantly ease the timing and managing of deadlines. An added benefit of using NutIDs and nuts may be that when a filing deadline of 12 months may be automatically inserted into the client's calendar by the confirmation of a provisional filing by the patent office, the NutID of the self-appointing nut holding the original copy of the provisional filing confirmation may be referenced directly in the calendar appointment entry thereby allowing the user to reference the original document with one or two clicks of the mouse when browsing the calendar for nearby future events and drilling into the details without searching for things.

FIGS. 218 and 219 shows CCL usage to control a set of IoT devices. FIG. 218 is the payload of an IoT nut. FIG. 219 is the CCL of the IoT nut of FIG. 218. The payload of the IoT nut 21800 may show four IoT devices of interest to the user: a first-floor thermostat 21810, an upstairs thermostat 21820, an outdoor thermometer 21830 and an outdoor anemometer 21840. Various measurements and/or metrics of each IoT device may be kept in this single payload. Some of them such as the temperature readings marked 'current' may be measurements being sent out of the respective IoT devices. The 'temperature set' lines indicate IoT device controlling parameters.

CCL 21900 may begin with a machine name condition whereby it specifies an ordered hierarchy of specific machines to operate this CCL only under one process in one machine at a time. The traversal of this hierarchy may depend upon whether the desired machine may be reachable or not. If the current machine is named the 'IoTmaster' then the CCL may run. If the current machine is named 'ERZ' AND 'IoTmaster' is unreachable within the user's NUTS ecosystem, then the CCL may run, etc. Basically, the condition may act as an automatic failover while minimizing duplicate processing in a replicated nuts environment. Statement 21910 catches events titled 'IoT_thermostat01_from' from the NUTserver and/or OS and may save the event values into 'msg' and 'value' variables, then it edits the payload text matching the 'msg' from the event and may replace that line with the event provided 'msg'+' '+'value'. The 'IoT_thermostat01_from' event corresponds to the first-floor thermostat therefore the 'msg' returned may be 'Thermostat first floor current temperature:' and the 'value' may be '68 F'. The edit payload command may match the line starting with 'Thermostat first floor current temperature:' and replace that entire line with 'Thermostat first floor current temperature: 68 F' therefore updating the current temperature reading from the first-floor thermostat from 71 F to 68 F. Statement 21920 operates a similar logic to statement 21910 but for 'IoT_thermostat02_from' event which in this case corresponds to the upstairs thermometer. Statement 21930 operates a similar logic to statement 21910 but for 'IoT_outdoor_temp' event which in this case corresponds to the outdoor thermometer. Thus, all three temperature related IoT devices may be monitored by such statements. A similar statement may be added for the outdoor anemometer to monitor it periodically.

Statement 21940 may be triggered when a payload modification may be identified by the process and returns the text lines which were modified. Then it executes a series of text searches looking for 'set' line for each the first floor and upstairs thermometers. When a match is found, the value of the entire line of modified text may be sent as the value to a matching event raise. For example, if the 'IoT_thermometer01_to' event is raised with a value of 'Thermostat first floor temperature set: 75 F' then the first-floor thermometer may catch that event through the local network and set its target temperature from 70 F to 75 F thus leading to turning on the heater on the first floor. The control commands for IoT devices may not be limited to those shown in these examples.

FIG. 220 shows an example of calendar mode CCL. A CCL may support a calendar mode to ease the burden of programming in common calendar appointment tasks without resorting to programming language like constructs as in the previous examples. Line 22000 sets this CCL segment to be processed under calendar mode interpretive rules using 'US' style date/time conventions. Line 22002 sets the operating time zone to 'CST'. Line 22004 indicates to clear out old events from the CCL. This may not affect the memorializing of past events within the history portion of the carnac revisions thus line 22004 may not completely erase what transpired in the past. All the sample statements may be easily understood by the average user since the lexicon, syntax and grammar of the statements may be self-explanatory. A person of ordinary skill in the art may apply natural language processing techniques to expand the variety of formats such appointments may be made. Such calendaring CCL may be useful for the legal deadline examples and for any institutions such as but not limited to schools whereby periodic class and activity schedules may be disseminated to their faculty and students in a vastly more efficient way. CCL may include commands where it may rescind or cancel previously issued statements and provide replacement statements. In such cases, an embodiment of the calendar payload of a nut may save a copy of the statement which produced a calendar event along with the actual calendar event thereby making the cancellation of such events emanating from the particular statement may be easily identified and rectified. A person of ordinary skill in the art may introduce a myriad of modern calendaring techniques to be applied to CCL constructs thereby making the editing of calendars much more feature rich.

FIG. 221 shows the event space of CCL within a NUTS environment. Any system comprising applications, processes, threads, devices, networks, OSes, cloud servers, cloud storage, IoT devices may generate events catchable by a participating NUTserver 22166 within the confines of a defined NUTS ecosystem. Since a NUTS ecosystem may run based on NutIDs, events transiting via a Rendezvous Server in internet mode (iRZ) may relay events across the internet. If such event traffic becomes too congestive, an events relay server may be introduced and utilized to efficiently pass events and not congest other RZ nuts traffic. Event messages and values maybe sent in cleartext but may not be a desirable method. Security for event messages may be provided by bundling them in a nut and sending the nut. However, lightweight IoT devices may have insufficient processing and memory capacity to process a nut. In those instances, an encrypted session with the IoT device may be managed by a 'IoTmaster' designated device within the user's NUTS ecosystem which may utilize a SDFT like protocol for transmitting secure messages in a lightweight form and/or use the IoT manufacturer provided lightweight encrypted protocol.

Structured Access Framework (SAF)

FIG. 222 shows some existing Access frameworks. Diagrams 22200 and 22210 from Mahajan "Distributed Computing" illustrate the conventional approach and framework for access control and access rights. 22200 may show an application centric approach to restricting access to a protected object by a subject using a generic application called a Reference Monitor which may embody itself in many forms such as but not limited to OS, FS, Active Directory, Network Access Controls, Web Login, Web based authentication systems, etc. The Reference Monitor may be responsible for any and all aspects of asset (object) protections by authenticating the subjects and doling out tokens and/or session-based access rights to various objects and resources of a system. 22210 may show a conventional way of organizing sets of access rights into protection domains. 22220 may show an example of Attribute Based Access Controls (ABAC) from Song, et al. The ABAC may be an application or Reference Monitor that operates on various attributes associated with the subject, environment and object to be accessed. This example may show a ABAC application operating on a logical combination of multiple attributes when a subject wishes to access a protected object. All the methods in these diagrams rely on a programmatic approach which may coalesce into a form of centralized access management. This may be due to the complexity and sensitivity of administering and managing such access control reference monitors which typically may require expert level competence and experience of the operators. However, many centralized systems may pose the classic insider threat risk where a privileged user may abuse his access rights for purposes contrary to the organization which employs him.

FIG. 223 shows how a nut expresses ABAC. The ABAC from Song, et al. 22300 protecting a single object payload 22306 may perform the access control by gathering the required attributes and performing logical programmatic operations by the ABAC 22304 rules in the application's memory. Upon satisfying the ABAC rules in place 22304, the ABAC system 22300 may present the subject with access to the object 22306. A nut structure 22310 may encode the ABAC rules cryptographically directly into the nut container as pure cryptographic data 22312 and 22314 in order to protect the payload 22316 which may also be inside the same container. The variable lock types, flexible lock graphs and other cryptographically expressed protection features of a nut may allow any arbitrary ABAC protection domains and rules to be encoded directly onto the object to be protected in a portable and non-centralized way. Notice that a significant difference between the two expressions of the same ABAC rules may be that 22300 requires a subject to access a centralized access system and that the system knows all the rules of all objects under its protection whereas in the nuts embodiment 22310, the specific rule for the specific object 22316 may be attached to it and the ABAC rule protecting it may be always protecting the payload 22316 in any environment; therefore, it may be construed that reference monitors such as 22300 may only be effective within the confines of its access control environment whereas a nut container 22310 may exhibit the same protection characteristics of its payload 22316 across and/or within any environment both hostile and/or friendly.

An organized configuration of nut containers holding access credentials, keys and/or tokens may allow the formation of a Structured Access Framework (SAF) whereby any access control methodology utilizing programmatic access control methods may be replaced and/or supplemented. A security framework may allow arbitrary combinations of access control models to operate cooperatively to protect assets such as but not limited to Discretionary Access Control (DAC), Mandatory Access Control (MAC), Role Based Access Control (RBAC), Attribute Based Access Control (ABAC), Policy Based Access Control (PBAC), and Emergency Access Control (Break Glass). The NUTS approach to securing data may be referred to as Data Perimeter Access Control (DPAC) where data may be treated as an endpoint. (Data as an Endpoint, DaaE) by attaching a security perimeter to the data itself as a protective layer. In NUTS, DPAC may be implemented using only cryptographic data and may be operated in complete isolation from reference monitors.

FIG. 224 shows the basic elements of the SAF. An identity 22400 presents attributes 22410 to access derivation methods 22420 producing access keys 22430 which may be submitted to and operated on by access processors 22440 resulting in access keys 22450 enabling access to restricted assets 22460. Identifiers 22400 may be any PUID which may refer to a subject comprising other PUIDs, users, contacts, devices, systems, groups, processes, networks, etc. Attributes 22410 may comprise logins, passphrases, biometric information, device identifiers, PINs, cards, tokens, apps, ADF (Attribute Derivation Function), access keys. Access derivation methods 22420 may comprise account lookups, KDF (Key Derivation Function), PIN matching, role derivations, biometric key derivations, temporal attributes, environmental attributes, device ID key derivations, hardware key handshakes, secure OS bootstrap. Access keys 22430 and 22450 may comprise cryptographic keys, tokens (derived from access key), passphrases. Access processors 22440 may comprise the application of rules, polices and other constraints; a combination of attributes imposing constraints to determine authorized access to an asset; an access 'lock'. Assets 22460 may be objects to be protected comprising assets, accounts, objects, data, devices, and networks.

FIG. 225 shows a detailed view of SAF. SAF may be enacted by a user ID 22500 specified within an access nut for the user. The user ID may also be a login ID and/or any other digital identifier produced by a conventional authentication system. Attributes 22510 may be presented by the user ID and/or gathered by the authenticating process on behalf of the user ID from the operating environment. A conventional authentication system may require the user ID to present a PIN, passphrase and/or a USB key 22510 then attributes may be further processed by access derivation methods 22520 within the running access control process such as but not limited to KDFs, PIN matchers, and hardware key handshakes. A nut's universal keyhole may accept access attributes such as but not limited to PINs, passphrases and biometric information and perform an appropriate access derivation method 22520 specified by each keyhole on the attribute 22510 to produce an access key 22530. In some cases, an access key may be produced by an external access derivation method embedded in separate processes and/or hardware thus the nut keyhole may just accept an access key corresponding to that attribute. Conventional access control systems may utilize programmatic access processors 22540 on the supplied access keys 22530 to produce access comprising keys, credentials, tokens 22550 to the restricted object 22566. The nut may utilize an internal configuration of lock nodes in a graph form 22562 and 22564 to express a particular access processor access model 22540 producing an access key to access the asset/object 22566. Alternatively, any subset of lock nodes which may form a part or whole of the expression of a particular access processor access model 22562 may be extracted from the internal portions of a nut's lock graph and externalized into separate nuts wherein the payload of each nut may hold access keys to other nuts including that of the nut holding the asset.

FIG. 226 shows role partitions. Scenario 22600 may show two logical groups: users 22602 and permissions (PRMS) 22604. In the first instance, user U1 may be expressed as a U1 access nut where upon proper unlocking, the payload may reveal access keys for various permission nuts P1, P5 and Pn. Each permission nut accessible by the revealed U1 access keys may each reveal permission keys which may permit the holder to perform certain restricted operations within the protection domain. The other users U2 . . . Un 22602 may be processed in a similar way.

Scenario 22610 may show three logical groups: users 22612, access roles 22614 and permissions (PRMS) 22616. In the first instance, user U1 may be expressed as a U1 access nut where upon proper unlocking, the payload may reveal access keys for various access role nuts R1, R5 and Rn. Each access role nut accessible by the revealed U1 access keys may each reveal access keys for various permission nuts P3 and Pn. Each permission nut accessible by the revealed role nut access keys may each reveal permission keys which may permit the holder to perform certain restricted operations within the protection domain. The other users U2 . . . Un 22612 may be processed in a similar way.

Scenario 22620 may show k role partitions 22624 between the users group 22622 and the permissions group 22626. Each level of role partitions may be process in a similar way as shown in the previous example scenarios. Scenario 22630 may show that any combination of role partitions 22634 may be inserted between the users group 22632 and permissions group 22636. These scenarios may show that any complex expression of RBAC may be enacted in a cryptographic way in part or in whole using a configuration of nut containers holding access keys.

FIG. 227 extends the application role partitions to other groupings. Arbitrary attribute groups 22700 may be formed from a collection of accessor attributes. These attribute groups may be further interlinked as required and/or desired to arbitrary partitions such as but not limited to role partitions 22710, device partitions 22720 and other attribute partitions 22730. From a universe of permissions 22740, arbitrary groups of permissions may be formed where each permission may be interlinked in arbitrary ways with other groups comprising single attributes, attribute groups, permission groups, role partitions, single partitions, device partitions, attribute partitions. A successful route traversal of this access control model may result in producing one or more permission keys and/or accesses. Such complex access control models may be built conventionally, but this may require complex processing and the pre-formulation and pre-analysis of complex and numerous permutations that may be possible with such flexibility and variety of rules and combinations. This may be due to conventional methodology embedding the logic into a centralized application whereby it may be required to handle all the permutations of such access rules. Using nuts, each access rule use may be analyzed and structured precisely for that one user-permission combination targeting access to one or more restricted objects thereby access rules may physically manifest themselves in specific sequences of access nuts, access keys and permissions nuts. The Structured Access Framework utilizing nuts may allow for the expression of an infinite variety of access rules enforceable in a cryptographic manner.

FIG. 228 illustrates the expression of attribute groups using nuts. An attribute group 22800 may be expressed as attribute group attribute10 22810 where nuts a11, a12, a13, and a14 may be nuts and/or accessor methods both of which may produce access keys. Access keys produced by attribute10 may link to another attribute group attribute20 22820 in a partitioning configuration as shown in FIGS. 226 and 227. Attribute20 may link to another attribute30 attribute group 22830. 22840 may show a simplified diagram of nut a24 showing keyholes for access keys produced by nuts a12 and a13, a variable lock section, and an a24 access key stored in the payload 22842. For example, if a21 held an access key for a Read permission nut a31 and a24 held an access key for a Write permission nut a34, then any user or ID successfully accessing a31 and a34 may produce Read and Write permission keys which when inserted into a protected nut Object1 with a keyhole for a31 and a34 access keys may produce RW access into Object1's payload if each respective access key inserted may have been properly configured with NAC fine grained access controls to present Read and Write NAC cryptographic access permissions at the last time of locking the Object1 nut. Such additive behavior of Read and Write access permissions may be allowed by the additive features of the NAC cryptographic mechanisms.

FIG. 229 illustrates the SAF using various attribute groups. A user Alice in a user attribute group 22910 may be a Vice President of a company having top secret level clearance may insert her credentials and access keys into her Alice access nut within group 22910 which may produce access keys for the VP role nut in role group 22900, the top secret clearance nut in the clearance level group 22930 and a user access key for Alice. Accessing the VP role nut may produce an VP role access key. Accessing the top secret clearance nut may produce the top secret clearance access key. The three keys so far thus produced by Alice's actions comprise top secret clearance access key, VP role access key and an Alice access key. These three keys may be insufficient to allow Alice to open the access key nut 22940 because it may further require Alice to perform the access on a secure PC1 from the device group 22920 within a secure area of her company building. If Alice may have been performing the access on secure PC1 then the device itself may present its device access key thus it may allow Alice to access the access key 22942 upon successfully opening the executive top secret access nut 22940. In a similar fashion, secret document nut 22950 may be accessed and the secret document 22950 may be opened by Carol if she may have been accessing it from secure PC2 and successfully may open her access nut in group 22910. These configurations of access control models using nut containers may exhibit the same protection characteristics in any environment within, without and any combination thereof the NUTS ecosystem environment that may have created the access and object nuts. Furthermore, each nut used in the examples may be stored in the same and/or different locations across NUTS environments as long as it may be searched and found by the accessing NUTserver/RZ directly and/or indirectly via some communication method.

Any access nut such as but not limited to 22900, 22910, 22920 and 22930 may be expressed by at least one access nut and/or by a reference monitor system each producing as output at least one access token and/or access key. An access nut may be further protected by controlling access through environmental access controls and/or hardware enabled access controls. A Structured Access Framework comprising a plurality of access nuts may integrate easily with most access control systems and may be configured to express a variety of access control models using cryptographic data structures.

Groups

FIG. 230 illustrates sets and groups. In mathematics, a set of elements may be expressed as set S 23000. Graphically, set S 23000 may be represented as 23002. In NUTS parlance for the purposes of describing and specifying groups in a distributed and decentralized environment, group GID1 23010 may be defined in a similar fashion as set S and its graphical representation may look like 23012. The elements or members of group GID1 may be referred to as IDs such as but not limited to ID1, ID2, and ID3.

FIG. 231 shows a conventional group management layout. A directory service application and/or system 23110 may allow operations on groups comprising creation, attribution, membership changes, deletion and servicing queries. The members 23122 of an environment defined by a directory service may be held in memory and/or storage by the directory service as IDs alongside their respective additional attributes. The defined groups 23124 of an environment defined by a directory service may be held in memory and/or storage by the directory service as group IDs or GIDs alongside their respective additional attributes. The groups memberships 23126 of an environment defined by a directory service may be held in memory and/or storage by the directory service as GID-ID mappings alongside their respective additional attributes. An Admin and/or Master of Ceremonies (MC) 23100 may access the directory service memories to perform operations comprising maintenance, administrative and management functions. Unless specifically allowed to do so by the specific features of a directory service, a user via a system may generally not have the same access privileges as an Admin/MC. Each system accessing the directory service may send queries concerning ID and group memberships. Furthermore, a directory service may be coupled with or include an access control model which may restrict various IDs, groups and group members from certain accesses within its own memory space as well as to external systems and/or data. Many directory services may be of a centralized nature. The availability of directory services may technically be distributed for better service but it may still resort to a privileged admin model for maintenance and other group related operations.

FIG. 232 show two configurations of a system of devices. SystemMC 23202, system1 23204, system2 23206, and system3 23208 may be communicating over a communication network 23200 resulting in establishing logical communication paths as shown in 23210. For the purposes of this disclosure, the manner in which 23210 may be implemented may have little or no bearing on the grouping methodology disclosed.

FIG. 233 shows a group object and its relationship to its members. The depictions of group objects in the following figures may be applicable with or without the protections of a nut container but the use of nuts may be preferred for security reasons. An MC using systemMC 23300 holding member ID information for himself MCID 23302, ID1, ID2 and ID3 may create 23310 a group object GID 23320 of type group having a container ID of GID version 0 (v0) and referencing group GID1 holding a list of group members ID1, ID2 and ID3 alongside additional attributes as needed. SystemMC 23300 may then send 23312 a copy of the group object GID1 23320 to each group member systems System1 23330, System2 23340 and System3 23350. User1 (ID1) on System1 23330 may accept the copy of group object GID1 23334 and may store it in memory and/or a persistent location alongside his own contact information on ID 23332. User2 (ID2) on System2 23340 may accept the copy of group object GID1 23344 and may store it in memory and/or a persistent location alongside his own contact information on ID2 23342. User3 (ID3) on System3 23350 may accept the copy of group object GID1 23354 and may store it in memory and/or a persistent location alongside his own contact information on ID3 23352.

FIG. 234 illustrates group membership acceptance and group catalogs. User1 (ID1) on System1 23430 may accept the group object's membership invite by setting one of the attributes on the line specifying his invite status to 'accept' state and marking the version change of the group object's content 23434 as GID v1 from GID v0 23334, and, System1 may create a catalog 23436 CAT1 v1 referencing group ID GID1 and listing the data object IDs to be shared by the group such as but not limited to GID1 v1 and NID7 where NID7 may be a local data object on System1. User2 (ID2) on System2 23440 may accept the group object's membership invite by setting one of the attributes on the line specifying his invite status to 'accept' state and marking the version change of the group object's content 23444 as GID1 v2 from GID1 v0 23344, and, System2 may create a catalog 23446 CAT2 v1 referencing group ID GID1 and listing the data object IDs to be shared by the group such as but not limited to GID1 v2 and NID8 where NID8 may be a local data object on System2. User3 (ID3) on System3 23450 may accept the group object's membership invite by setting one of the attributes on the line specifying his invite status to 'accept' state and marking the version change of the group object's content 23454 as GID1 v3 from GID v0 23354, and, System3 may create a catalog 23456 CAT2 v3 referencing group ID GID1 and listing the data object IDs to be shared by the group such as but not limited to GID1 v3 and NID9 where NID9 may be a local data object on System3. The version marker changes to the respective group nuts 23532, 23542 and 23552 do not represent sequential changes in expressing them as v0, v1, v2, v3. GID1 v0 may be their common starting state, but each system changing the payload slightly differently may make the version changes go from v0→v1 for 23534, from v0→v2 for 23544 and from v0→v3 for 23554.

FIG. 235 illustrates how groups poll catalogs. Each system now may recognize that they each may have a catalog that they each may maintain related to a group they may belong to, but the frequency and/or diligence of the maintaining may be entirely up to the configuration and/or current load of the system. Therefore, intermittently each system may 'poll' the other members of the group for catalog updates and/or post its own catalog to them. System1 23530 may 'poll' the other members of the group ID2 on system2 23540 and ID3 on system3 23550 by sending his copy of catalog CAT1 v1 23536 to system2 and system3. Each system may receive and store the just received catalog. System2 23540 may 'poll' the other members of the group ID1 on system1 23530 and ID3 on system3 23550 by sending his copy of catalog CAT2 v1 23546 to system1 and system3. Each system may receive and store the just received catalog. System3 23550 may 'poll' the other members of the group ID1 on system1 23530 and ID2 on system2 23540 by sending his copy of catalog CAT3 v1 23556 to system1 and system2. Each system may receive and store the just received catalog. The 'catalog polling' process described in this section may be performed in this rudimentary manner and/or any other manner as long as the end result of distributing copies of the various different catalog versions amongst the group members may be accomplished. A conventional meaning of poll may not be construed as the same as 'catalog polling' because catalog polling may comprise pushing out catalogs and/or requesting/querying for catalogs in the same single procedure, only requesting/querying catalogs and/or responding to queries, and/or any combination thereof. Catalog polling may or may not require the requestor to be expecting a response from any system; in some embodiments the preferred method may be for the requestor to not expect a response and tend to any received catalogs. Additionally, when using nuts, catalog polling may require the formation of cleartext summary metadata of visible non-revealing portions of the catalog nut to be sent along with any transmission of a catalog nut between two different Rendezvous Servers RZs as to help preserve the opacity of any sensitive data in the nut. A Rendezvous Server may provide additional efficiency features comprising caching, pushing data, maintenance functions and smart routing.

FIG. 236 shows a flowchart to compare a first set of catalogs on System1. A process on System1 23600 may perform the following catalog comparisons 23630 between just received catalog CAT2 v1 23620 from System 2 and the locally existing catalog CAT1 v1 23610 both of which reference a common group ID GID1. After determining that CAT2 v1 23620 may have two items in its payload that may be missing (thus causing a difference) from CAT1 v1 23610 namely NID8 and GID1 v2. The process then may request those two items from System2 who sent it in the first place, after which it may add the two missing items in its own catalog CAT1 and mark a status attribute alongside each item as 'pending' 23634, and then revise the version marker of CAT1 to v2 23612 and then the process may discard the just processed catalog CAT2 v1. The step 23634 of adding the missing items back into its own catalog CAT1 under a 'pending' state may prevent the process from repeatedly requesting the same missing items. The 'pending' status for an object ID listed in a local catalog may indicate that the local system may have not yet received the object in question. This may show how catalog CAT1 v1 may synchronize itself with CAT2 v1 to transition from CAT1 v1 23610 to CAT1 v2 23612.

FIG. 237 shows a flowchart to compare a second set of catalogs on System1. A process on System1 23700 may perform the following catalog comparisons 23730 between just received catalog CAT3 v1 23720 from System 3 and the locally existing recently updated catalog CAT1 v2 23710 both of which reference a common group ID GID1. After determining that CAT3 v1 23720 may have two items in its payload that may be missing (thus causing a difference) from CAT1 v2 23710 namely NID9 and GID1 v3. The process then may request those two items from System3 who sent it in the first place, after which it may add the two missing items in its own catalog CAT1 and mark a status attribute alongside each item as 'pending' 23734, and then revise the version marker of CAT1 to v3 23712 and then the process may discard the just processed catalog CAT3 v1. The step 23734 of adding the missing items back into its own catalog CAT1 under a 'pending' state may prevent the process from repeatedly requesting the same missing items. The 'pending' status for an object ID listed in a local catalog may indicate that the local system may have not yet received the object in question. This may show how catalog CAT1 v2 may synchronize itself with CAT3 v1 to transition from CAT1 v2 23710 to CAT1 v3 23712.

The processes described in FIGS. 236 and 237 may each be performed by System2 and System3 respectively with the catalogs they each received during the catalog polling process amongst the group members in FIG. 235.

FIG. 238 shows the results of catalog polling and synchronizations. The state of the three systems and their respective catalog and group objects may look like FIG. 238. Note that the requested pending data objects may be still pending and awaiting a response back with actual data objects back to the requestor from the three separate synchronization processes. Eventually each requested data object by each system may be received and stored locally ready to be synchronized.

FIG. 239 shows the group object synchronization process on System1. When System1 23900 may receive the requested data object GID v2 23920 from System2 as part of the catalog synchronization process as previously described, a process on System1 23900 may perform the following group object comparisons 23930 between the just received group object GID1 v2 23920 from System 2 and the locally existing group object GID1 v1 23910 both of which may have the same object ID GID1. The versions markers of the two data objects having the same NutID=GID1 may be different where 23910 may be v1 and 23920 may be v2 therefore the evaluation 23930 proceeds to step 23932 where a history merging may be performed between the two group objects having the same NutIDs but different version markers. A conventional data object may not have ready access to localized history that may travel with it like a nut so in this case it may be easier to understand that if the group object GID1 is a nut, then the merging of history processes may be well understood using the embedded revision histories (carnac revisions) of each group object version. After merging their histories together to produce a combined, updated group object GID1 v4 23912, the entry in CAT1 v3 for GID1 v2 may be deleted and the entry for GID1 v1 may be updated to v4 resulting in CAT1 v4. This may show how group object GID1 v1 may synchronize (and/or merge) itself with GID1 v2 to transition from GID1 v1 23910 to GID1 v4 23912.

FIG. 240 shows group object synchronization processes across all three systems. The previous FIG. 239 described the process for 24034, 24044 and 24064 in System1 24000. The same process may be enacted upon 24064 with 24054 to produce a synchronized GID1 v5 group object 24074 incorporating all the differences amongst the various GID versions. At around the same time, System2 24002 and System3 24004 may each be performing the same synchronizations on the various versions of group objects with NutID=GID1 to each arrive at the same group object GID v5 24074; therefore, each system results in holding a group object GID1 with the same version marker v5. In a similar fashion, data objects NID7, NID8 and NID9 may each be synchronized on each system after all the requests may have been satisfied; however, in this instance, due the exclusivity of each NIDx data object having only originated from its corresponding system, the synchronization process may comprise just updating the NIDx status in the respective local catalog and storing the received NIDx locally.

FIG. 241 illustrates the local catalog states being updated after object synchronizations. System1, System2 and System3 each may transition their local catalogs from v3 to v5 as each requested group object version and data objects may be synchronized. The ending catalogs for group ID GID1 on each system may now be in sync even though they each may have different NutIDs and different catalog IDs.

This method comprising forming an arbitrary group, inviting group members by a MC who may decide to only make introductions and not be a group member, accepting the group membership invite by each member, creating a local group catalog by each group member's system, polling group catalogs across systems via a communication network, synchronizing group objects at each member system, synchronizing shared data objects at each member system, and/or updating the local group catalog as state transitions may be made, may be collectively be referred to as 'group operations'. Such sequences of group operations may exhibit some unexpected benefits in a distributed and decentralized environment such as but not limited to distributed replication, partition resilience, partition healing, partition tolerance, private groups without central admins, formation of multiparty relationships and data sharing, formation of unitary relationships and data sharing, sharing amongst one or many devices, anonymous group formations and redefining what a group may really be in the context of distributed and decentralized identifiers. Furthermore, all of the group operations described may be performed using nut containers to provide a consistent and pervasive security layer throughout a group. The access methods for groups may require group key distribution in an anonymous way. The key distribution methods may require custom data flows. These features may be disclosed later in this document. Efficiencies may be extracted from many specific aspects of this described process such as but not limited to sending only catalog deltas instead of full catalogs, the caching of catalogs and their cleartext metadata by a Rendezvous Server.

FIG. 242 shows a group defined across three systems using conduits. A loopback conduit may be considered an agglomeration of mechanisms that comprise the replication, synchronization, merging, querying and polling of shared objects within a logical group having an aim to facilitate the orderly transition of a heterogeneous states of the group towards an eventually consistent state of the group across disparate systems. FIG. 242 recasts the previous three system example in an alternate symbolic representation using groups and loopback conduits 24230. A group GID1 may be defined by a group designation as in a set of members but it may be enabled by a logical loopback conduit expressible by a collection of group catalogs referencing the same group 24240. A system having knowledge of a group ID may be the minimal sufficient condition for the system to decide that it may be part of that group. This may be apparent when reviewing the steps described earlier to synchronize the group across three systems. Just by knowing the existence of GID1, a system may create a catalog referencing group GID1 and thus perform a catalog poll on that group ID across any and all systems it may communicate with. A control to prevent unwanted interlopers for a group may be to use a replicated group object listing the invited group members. Another control to further impede interlopers may be to encapsulate the group object into a nut container requiring access keys by each member. Catalogs embedded as the payload of a nut may further dissuade unwanted peekers. By systematically utilizing secure nut containers for all the data objects utilized in the synchronization of groups, a secure environment may exhibit emergent characteristics from the data level upwards across space and time.

A curious characteristic of a group defined as in FIG. 242 may be that of partition resiliency. The group GID1 may operate as a group regardless of no invitee acceptances or full acceptances or any number in between. Any non-intersecting subsets of group GID1 may operate independently from one another and may synchronize its own subset. When any two subsets merge or intersect, the combined subsets may operate as a unit and may synchronize itself. When all elements of a group finally communicate with each other, then the full group may eventually reach a consistent state. This may show the resiliency of groups to partitioning. Partitioning may occur when a system or subset of systems (members of a group) may be disconnected from a communication network for a period of time such as but not limited to hardware failures, line failures, system shutdowns, system movement across different wireless networks, wireless transmission failures and application restarts. This ability to recover from partitions may be referred to as partition healing.

FIG. 243 illustrates a unitary group. A group with just one member may work in a similar way to multiple member groups. A loopback conduit that uses a local catalog per system (aka "catalog passing") may be conducive for a unitary group to manage and/or synchronize multiple systems that the sole group member may own or may have access to. Thus, a group as defined in this disclosure may facilitate the management of not only a plurality of members but also a plurality of systems per member. Group GID21 having a single member ID1 24308 may have defined a loopback conduit for GID21 24304 and may have some shared data objects with itself 24306. ID1 contact and/or access information may be found in data object 24312 on System1 24310. All data objects in this example may be unprotected files in a secure environment. Where security and integrity may be important, all data objects may be replaced by nut containers in which case nut with NutID=ID1 may hold at least one access key for all the other nuts used in this example. A group data object GID21 24314 may hold the single self-same member ID1 and the group reference and version marker may be GID21 v1. A catalog object 24316 referencing group GID21 and with catalog ID/version marker CAT21 v1 may hold a list of IDs of data objects it shares with itself in GID21, namely group object GID21 v1, data objects NID22 and NID23.

FIG. 244 shows how a loopback conduit works for a unitary group. System1 24410 in state S1 24450 may perform a catalog poll on itself for Catalog CAT21 24416 for group GID21. The system may recognize that it may be the same system therefore it may or may not send itself a copy of Catalog CAT21 24416 as shown in state S2. If System1 creates and sends a copy of Catalog CAT21 24416 to itself, it may look like state S2 24460. Merging and synchronizing the two copies of Catalog CAT21 24416 may produce state S3 24470. In this case, since no differences were found in CAT21 copies, the version marker may be unchanged at v1. System1 processing may be made more efficient and specific to such self-same loopback cases but the main emphasis may be that the same mechanics shown to synchronize a group of three members may still apply and be effective in producing an eventually consistent state of the group even utilizing the crudest of methods. The behavior shown in this unitary group may define the mechanical essence of a Loopback Conduit 24430 for a group.

FIG. 245 shows how a loopback conduit works for a unitary group on two systems. The user represented by ID1 24520 may have two systems, System1 24500 and System15 24510. This example may show how a shared data object NID22 modified on System1 may propagate to System15 using a loopback conduit for the unitary group thereby synchronizing the group to an eventually consistent state between the two systems. Starting from the state S3 24470 of System1 from the FIG. 244, the user may modify and may save the content of data object NID22 24542 on System1 24500 thus changing its version from v2 to v3 and may make the appropriate update to the NID22 entry in Catalog GID21 24532 from "NID22 v2" to "NID22 v3" which causes the content of Catalog CAT21 with NutID=CAT21 to change therefore changing CAT21's version marker from v1 to v2. Suppose System15's starting state also resembled state S3 24470 of System1 from FIG. 244. Periodically, System15 24510 in state S1 24550 may perform a catalog poll by requesting from any system servicing group GID21 for any catalog versions different from what it has which may be Catalog CAT21 v1. System1 24500 may receive that request and may respond by sending a copy of Catalog CAT21 v2 with NutID=CAT21 24532 to System15 as shown in state S1 24550. System15 may perform a catalog compare between CAT21 v1 with NutID=CAT22 24530 and CAT21 v2 with NutID=CAT21 24532 to determine that it may be missing NID22 v3 thus appending the catalog entries in CAT21 with NutID=CAT22 24530 with an entry for "NID22 v3, pending" which causes the content of CAT21 v1 24534 to change creating a new version marker for CAT21 from v1 to v3 24534. When System15 24550 may determine the missing NID22 v3, it may request a copy of NID22 v3 24532 from System1 24500 and then eventually receive it bringing it to state S2 24560. System15 may then merge and synchronize NID22 v2 24540 with NID22 v3 24542 producing NID22 v3 24542 and discarding NID22 v2 which may be proper since the only modification to NID22 may have been made on System1 by the user. After the merging and saving of NID22 onto System15, System15 may update its catalog CAT21 with NutID=CAT22 entry "NID22 v3, pending" to "NID22 v3" and may delete the entry for "NID22 v2" reflecting the events that transpired on the system. The catalog entry modifications 24534 changes the contents of CAT21 with NutID=CAT22 thus requiring a different version marker v2 24536 in state S3 24570. This may be the same catalog ID CAT21 v2 as in catalog CAT21 with NutID=CAT21 24532 because effectively the changes System15 made to its own catalog with NutID=CAT22 24536 may have synchronized the catalog entries to look like System1's catalog with NutID=CAT21 24532. Note that version markers may look sequential such as v1, v2, and v3 but they do not represent sequential version changes but serve as distinct markers signifying distinct contents; an embodiment of a version marker may be a hash of the content but may not be limited to hashes. Sequencing in a distributed asynchronous environment poses challenges when performing synchronizations, therefore many of the content merging and synchronizing methods used in these examples may not be easily facilitated without the use of nuts with carnac revisions. In state S3 24570, the unitary group GID21 may be in a consistent state between the two systems, System1 and System15, that the user ID1 may control where all shared data objects may be in the same state including group object GID21, data object NID22 and the respective local catalog objects on each system; therefore, this example may show how loopback conduits for a unitary group across multiple systems may achieve eventual consistency for the group.

FIG. 246 shows a schematic view of a unitary group across two systems. A view may be formed that a group may be defined by a group ID and that each member represents a subgroup formed by a group ID called a catalog ID therefore a group may be a collection of members where each member may be a collection of catalogs representing distinct operating units such as but not limited to devices, processes, systems, virtual machines, networks, etc.

FIG. 247 shows the logical state of a system hosting two different groups. The groups in examples from FIG. 242 group GID1, group of three members, and FIG. 246 group GID21, a unitary group, may be logically represented as the state shown in FIG. 247 from the perspective of System1 24700. The elements of FIG. 247 may be labeled to show the corresponding parts between the two representations. In this example, System1 24700 contains two groups and two group objects, 24710 and 24720, two loopback conduits and two catalogs, 24712 and 24722, and shared data objects, 24750, 24752, 24754, 24756, and 24758, for user ID1 24702. Using such configurations, a system may host any number of groups and loopback conduits comprising identifiers of any type including other groups and conduits. However, arbitrary groupings of mixed ID types may warrant close analysis as it may lead to unexpected and/or undesirable behaviors. It may be the purview of the NUTS system GUIs and/or processing systems to restrict such arbitrary configurations to those that may seem most useful to users and systems.

FIG. 248 categorizes the ICBM components of a NUTS ecosystem with regard to groups and synchronization. An identity 24800 may be any ID and/or NutID representing anything that may be digitally representable such as but not limited to objects, data, systems, users, tokens, networks, IoT devices, devices, streams, etc. A conduit 24810 may be any cataloging data object that facilitates, through a method, a synchronizing a group of IDs and their corresponding objects within a single system and/or across multiple systems, and, a conduit may comprise loopback conduits, catalogs, catalog nuts, catalog tables and catalog objects. A bond 24820 may be any grouping of IDs and/or their corresponding access credentials which may together act to form arbitrary but desired logical groupings and may limit access to the logical group from other IDs who may not be members of the grouping, and, bonds and/or their corresponding access credentials may comprise group objects, group nuts, access keys, passphrases, group keys, RBKs, and group tables. A map 24830 may be any collection of IDs logically grouped together comprising directories, lists, FHOG nuts, inodes, network lookup tables and indexes of objects. Identity, conduit, bond and map (ICBM), together may form the concepts and/or implementable data structures and methods which promote the organization and/or management of data in a distributed and decentralized environment in a distributed and decentralized manner across unitary systems to multiple systems and/or networks, across heterogeneous groups of IDs, and in a universal namespace. When all ICBM components may use nuts and/or NUTS methods, ICBM may further promote behaviors and/or characteristics not limited to embedded security, emergent security, inherited security, portable security, customized security, integrated security, historical lookbacks, time compatibility, future events scheduling, spatial irrelevance, system redundancy and network partition resiliency.

FIG. 249 illustrates representations of a nut and some of its parts. Elements labeled 24900 may represent different nut diagrams. This figure points to at least three parts of a nut: metadata 24904, universal keyhole 24902 and payload 24906. From previous sections of this disclosure, it may be apparent that these three nut parts may be expressed as a single lock node nut or a complex nut structure with many lock nodes interlinked in an acyclic directed graph layout. A three sectioned rectangular box may be made use of in the following few sections and figures where the top box may represent metadata of a nut, the middle box may represent the universal keyhole of a nut and the bottom box may represent the payload of a nut.

FIG. 250 shows examples of a group, FHOG, catalog and catalog override nuts. A group object may be expressed as a group nut 25000 using a rectangular three sectioned box where the top box 25002 may show the metadata comprising the Group ID NutID=GID and nut type=GROUP, the middle box 25004 may show the universal keyhole comprising keyhole IDs, the keyhole users, the accesses encoded for the keyhole; the bottom box 25006 may show the list of group members comprising member IDs, member specific group access keys, the accesses encoded for the member, the group admin status of the member; there may be other nut parts 25008, which may or may not be explicitly stated but may be implied depending on the nut type being considered, comprising vita or event logs, tale or history, fate or possible future events, and/or carnac revisions (history and fate). A FHOG object may be expressed as a FHOG nut 25010 using a rectangular three sectioned box where the top box 25012 may show the metadata comprising the FHOG ID NutID=FID and nut type=FHOG, the middle box 25014 may show the universal keyhole comprising keyhole IDs, the keyhole users, and the accesses encoded for the keyhole; the bottom box 25016 may show the list of mappings comprising NutIDs, version markers per NutID, status of the entry, nut type of NutID, and size of object represented by NutID; there may be other nut parts 25018, which may or may not be explicitly stated but may be implied depending on the nut type being considered, comprising vita or event logs, tale or history, fate or possible future events, and/or carnac revisions (history and fate). A catalog object may be expressed as a catalog nut 25020 using a rectangular three sectioned box where the top box 25022 may show the metadata comprising the catalog ID CAT1, NutID=CID, member GA and nut type=CATALOG, the middle box 25024 may show the universal keyhole comprising keyhole IDs, the keyhole users, and the accesses encoded for the keyhole; the bottom box 25026 may show the list of catalog entries comprising NutIDs, version markers per NutID, status of the entry, nut type of NutID, and size of object represented by NutID; there may be other nut parts (not shown in diagram), which may or may not be explicitly stated but may be implied depending on the nut type being considered, comprising vita or event logs, tale or history, fate or possible future events, and/or carnac revisions (history and fate). A catalog override object may be expressed as a catalog override nut 25030 using a rectangular three sectioned box where the top box 25032 may show the metadata comprising the catalog override NutID=COV, catalog ID CAT1, group ID GID and nut type=CATOVR, the middle box 25034 may show the universal keyhole comprising keyhole IDs, the keyhole users, and the accesses encoded for the keyhole; the bottom box 25036 may show limitations and/or constraints which may be applicable to the local system as defined by the physical limitations of the system and/or the preferred limitations of the controlling user(s) of the system; there may be other nut parts (not shown in diagram), which may or may not be explicitly stated but may be implied depending on the nut type being considered, comprising vita or event logs, tale or history, fate or possible future events, and/or carnac revisions (history and fate).

FIG. 251 shows a flowchart for processing catalog overrides during a catalog compare on System1. This flowchart modifies the flowchart of FIG. 237 on System1 to show how a catalog override like 25030 may be processed by any system running a catalog compare process. Flowchart steps 23730, 23732 and 23734 may be replaced by steps 25120, 25122, 25124, 25126, 25128 and 25130. In the replaced steps, the comparison of the two catalogs referring to the same group ID GID and catalog ID CAT1 but having different catalog versions v1 and v2 may be iterated over each missing item from CAT1 v2 as compared to CAT1 v1 25122. For each missing entry, the step 25124 checks if a catalog override nut exists on System1. There may be one or more catalog override nuts that may apply to a given group, catalog, system, or any other combination thereof. The combined override limitations and constraints 25126 may bear down on the missing entry on hand to determine if the missing entry, given the various attributes which may be provided from catalog CAT1 v1, may be limited or not from this system System1. If the catalog override limits the missing entry from System1, the next step iterates to the next missing entry 25122. If the missing entry item is not limited by the combined catalog overrides, System1 may request System3, where CAT1 v1 may have came from, for the object or nut referred to by the missing entry 25128. The next step 25130 may update its local catalog NutID=CAT1 catalog ID CAT1 v2 group ID GID1 by appending the missing entry NutID, version marker and at least a status of 'pending', then it may also create a new version marker for NutID=CAT1 to catalog CAT1 v3 as finally shown in 23712.

Catalog overrides may exist and be enforced at any level such as but not limited to groups, devices, users, OSes, File Systems, Networks, IoT devices, IDs, etc. Any catalog ID and/or group combination may be referenced by a catalog override. All catalog overrides that may be applicable for a given catalog entry evaluation may be combined, and the combined constraints and/or limitations of the plurality of applicable catalog overrides may be applied to a catalog entry being evaluated for possible inclusion into the local system environment. A practical need for catalog overrides may exist for limited devices and/or systems such as but not limited to: mobile devices with limited characteristics such as but not limited to low bandwidth, small capacity and expensive bandwidth; systems customized for limited objects where the limitations may comprise size, type, system capacity, regulatory limits, system efficiency, redundancy considerations, and ownership; groups customized for limited objects; storage systems with limitations either physical and/or contrived; accounts with limitations; and others as appropriate and/or desired.

FIG. 252 through FIG. 258 all relate to a common example where groups are synchronized using nuts. FIG. 252 lays out some nuts to be used by the example. A group nut G1 v5 25200 as defined 25202 may have keyholes in the universal keyhole section of the group nut G1 where the keyhole ID 'KA' may be configured for user A who may have RAT access (Root Access Tier, aka owner). Keyhole 'KGA' may be configured for user A's Group member ID of 'GA' which may provide RBK key sets for user A to use on behalf of the group and member 'GA' may also be set as the admin of the group G1. In a similar fashion, when user A (or an MC who may not be user A) created the group nut, they may configure the group membership IDs and their respective attributes to provide a level of anonymization for the members and for the MC's own anonymity; the group member RBK sets may be provided so that a member of the group may store their particular RBK set in their contacts for future access to group G1 nuts including the group nut G1. The proper hiding of group member RBKs may be further discussed in a later section but for this example's purpose the secrecy of a group member RBK may be kept private by encrypting the private part of the asymmetric key set with the RBK key set known by the member's relationship with the MC. After acceptance of a group nut, a member may re-encrypt his private group member key part using his public group member key part thereby removing any lingering detritus having to do with the MC's introducing relationship with the group member. Note that the introduction may occur just by communicating a passphrase out-of-band to a prospective group member by the MC where the group member's RBK set may be encrypted by the same passphrase or another key revealed by the key map associated with the member's keyhole. The group nut admin GA may periodically review the group nut membership acceptance states and may delete invite keyholes such as 'KA', 'KB, and 'KC' when their respective member may have accepted the group invite and re-encrypted their RBK sets using their group member RBK set. By doing such a cleanup, eventually the group nut may have few remnants of the original user IDs which were used to invite the group members and be only left with the group-oriented IDs for each member thus achieving a level of anonymization at the group level. The remnants of all these historical deltas and/or events may be logged in the vita and/or carnac parts of the group nut but the MC and/or the group admin may have the proper privileges to control the opacity of those parts from the rest of the group by using the features available in constructing a nut. For the purposes of this example, group nut G1 may be expressed compactly 25204 just by using the ID and version "G1 v5".

A catalog nut A:C1 v5 25210 as defined 25212 may have keyholes in the universal keyhole section for each group member using only their group assigned group user IDs (GA, GB, GC) and group member key IDs (KGA, KGB, KGC). This keyhole configuration limits access to this nut only by group members or any subset thereof. Furthermore, only member GA may have RAT access and the other two members GB and GC only may have Read access to catalog nut A:C1 v5. The metadata section of nut 25212 sets at least the NutID=A:C1, type CATALOG, catalog ID=C1, group ID G1, member GA and version marker v5. The payload section may hold only one catalog entry for NutID=G1 comprising version v5, type=group and a status of 'local' signifying that the nut G1 may be locally stored. For the purposes of this example, catalog nut A:C1 v5 may be expressed compactly 25214 just by using the ID and version "A:C1 v5" and list its only catalog entry simply as "G1 v5".

A catalog nut B:C1 v5 25220 as defined 25222 may have keyholes in the universal keyhole section for each group member using only their group assigned group user IDs (GA, GB, GC) and group member key IDs (KGA, KGB, KGC). This keyhole configuration limits access to this nut only by group members or any subset thereof. Furthermore, only member GB may have RAT access and the other two members GA and GC only may have Read access to catalog nut B:C1 v5. The metadata section of nut 25222 sets at least the NutID=B:C1, type CATALOG, catalog ID=C1, group ID G1, member GB and version marker v5. The payload section may hold only one catalog entry for NutID=G1 comprising version v5, type=group and a status of 'local' signifying that the nut G1 may be locally stored. For the purposes of this example, catalog nut B:C1 v5 may be expressed compactly 25224 just by using the ID and version "B:C1 v5" and list its only catalog entry simply as "G1 v5".

A catalog nut C:C1 v5 25230 as defined 25232 may have keyholes in the universal keyhole section for each group member using only their group assigned group user IDs (GA, GB, GC) and group member key IDs (KGA, KGB, KGC). This keyhole configuration limits access to this nut only by group members or any subset thereof. Furthermore, only member GC may have RAT access and the other two members GA and GB only may have Read access to catalog nut C:C1 v5. The metadata section of nut 25232 sets at least the NutID=C:C1, type CATALOG, catalog ID=C1, group ID G1, member GC and version marker v5. The payload section may hold only one catalog entry for NutID=G1 comprising version v5, type=group and a status of 'local' signifying that the nut G1 may be locally stored. For the purposes of this example, catalog nut C:C1 v5 may be expressed compactly 25234 just by using the ID and version "C:C1 v5" and list its only catalog entry simply as "G1 v5".

FIG. 253 lays out some nuts to be used by the example. A catalog nut A:C1 v7 25300 as defined 25302 may be a future modified version of catalog nut A:C1 v5 25212 from FIG. 252. The payload section now may hold several additional locally stored entries beyond "G1 v5" namely FHOG F1 v1, text nut N4 v1 and data nut N6 v1. For the purposes of this example, catalog nut A:C1 v7 may be expressed compactly 25304 just by using the ID and version "A:C1 v7" and list its catalog entries simply as "G1 v5", "F1 v1", "N4 v1" and "N6 v1".

A FHOG nut F1 v1 25310 as defined 25312 may have keyholes in the universal keyhole section for each group member using only their group assigned group user IDs (GA, GB, GC) and group member key IDs (KGA, KGB, KGC). This keyhole configuration limits access to this nut only by group members or any subset thereof. Furthermore, only member GA may have RAT access and the other two members GA and GB only may have Read and Write access to FHOG nut F1 v5. The FHOG nuts payload may list a map of NutIDs comprising Word document nut N1 v1, chat nut N3 v1, nt01 nut N5 v5 (nt01 may represent a custom data type), FHOG nut F8 v8 and group nut G7 v3. For the purposes of this example, FHOG nut F1 v1 may be expressed compactly 25314 just by using the ID and version "F1 v7" and/or with a listing of its map entries simply as "N1 v1", "N3 v1", "N5 v5", "F8 v8" and "G7 v3".

A data nut N4 v1 25320 as defined 25322 may have keyholes in the universal keyhole section for each group member using only their group assigned group user IDs (GA, GB, GC) and group member key IDs (KGA, KGB, KGC). This keyhole configuration limits access to this nut only by group members or any subset thereof. Furthermore, only member GA may have RAT access, member GB may be given Read access, and member GC may be given VerifyOnly access to data nut N4 v1. The metadata section of nut 25322 sets at least the NutID=N4, type 'text', and version marker v1. The payload section may hold some text. For the purposes of this example, data nut N4 v1 may be expressed compactly 25324 just by using the ID and version "N4 v1".

A data nut N6 v1 25330 as defined 25332 may have keyholes in the universal keyhole section for each group member using only their group assigned group user IDs (GA, GB, GC) and group member key IDs (KGA, KGB, KGC). This keyhole configuration limits access to this nut only by group members or any subset thereof. Furthermore, only member GA may have RAT access, member GB may be given Read and Write access, and member GC may be not given access (an absence of a keyhole) to data nut N4 v1. The metadata section of nut 25332 sets at least the NutID=N6, type 'data, and version marker v1. The payload section may hold some data. For the purposes of this example, data nut N6 v1 may be expressed compactly 25334 just by using the ID and version "N6 v1".

FIG. 254 shows the initial phase of a nuts-based group synchronization example. The compact expressions of nut defined in FIG. 252 and FIG. 253 will be used in the following few diagrams. FIG. 254 shows three systems A, B and C with the nut configurations as shown. Initially, all three systems may be synchronized and may be members of group G1 25400, 25420 and 25430 having local catalog nuts 25402, 25422 and 25432 respectively. System A also may have nuts F1, N4 and N6 residing locally and decides to share it with group G1 at varying points in time. The example may show how system A adding nuts F1, N4 and N6 into its local catalog A:C1 v5 25402 (thereby intending to share those nuts with the group G1 by modifying it to A:C1 v7 25410 eventually) may synchronize the group G1 to become eventually consistent across all three-group member systems A, B and C using nuts where each local catalog for each system may resemble the catalog entries in C1:A v7 25410.

FIG. 255 shows the first panel set of group synchronization transitions. Panels 25500, 25502 and 25504 may show all three systems in a consistent state therefore the group G1 may be consistent. Panel 25510: system A creates nuts N4 v1 and F1 v1. Panel 25520: system A shares nuts N4 and F1 with group G1 by adding catalog entries for N4 v1 and F1 v1 into local catalog nut A:C1 v5 thereby modifying its content thereby generating a new version marker v7, then saving the modified local catalog for group G1 as A:C1 v7.

Panels 25530, 25532, 25534: each system may perform catalog polls on catalog C1 for group G1 by querying the other two systems for their catalogs for catalog ID C1 for group G1; the other two systems each reply back with their copies of their local catalogs thereby each system ends up holding and/or receiving all three catalogs corresponding to each member of group G1. There may be far more efficient methods of conveying and transmitting such information in a network of three systems known to a person of ordinary skill in the art, but the point of this exercise may be that even by using the crudest of methods of data requests and transmissions, group synchronization may be achieved sufficiently well by means of groups and loopback conduits using nuts and that the proper use of nuts may provide a pervasive privacy even in an unsecured transmission network; in fact, in this example, all the transmissions of nuts from one system to another may be done in cleartext and the security and privacy of the nut payload may stay wholly intact unbeknownst to each member and/or system. After the respective catalogs may have been received by each system, each system may begin the process of merging each received catalog with its own local catalog which may result in panels 25540, 25542, and 25544.

Panel 25540: on system A, the merging of local catalog A:C1 v7 with catalog B:C1 v5 from system B may result in discarding catalog B:C1 v5 and keeping catalog A:C1 v7, then the merging of catalog A:C1 v7 with catalog C:C1 v5 from system C may result in discarding catalog C:C1 v5 and keeping catalog A:C1 v7, thus the resulting merged local catalog on system A may be A:C1 v7. Panel 25542: on system B, the merging of local catalog B:C1 v5 with catalog A:C1 v7 from system A may result in updating catalog B:C1 v5 with entries from catalog A:C1 v7 as "(F1 v1)" and "(N4 v1)" and marking the catalog as version v6 and saving catalog B:C1 v6, then the merging of catalog B:C1 v6 with catalog C:C1 v5 from system C may result in discarding catalog C:C1 v5 and keeping catalog B:C1 v6, thus the resulting merged local catalog on system B may be B:C1 v6. In this example, the parentheses around a new entry may signify that the process may have requested those nut IDs and versions from the originating system and may have entered a status of "pending" on the catalog entry. Panel 25544: on system C, the merging of local catalog C:C1 v5 with catalog A:C1 v7 from system A may result in updating catalog C:C1 v5 with entries from catalog A:C1 v7 as "(F1 v1)" and "(N4 v1)" and marking the catalog as version v6 and saving catalog C:C1 v6, then the merging of catalog C:C1 v6 with catalog B:C1 v5 from system B may result in discarding catalog B:C1 v5 and keeping catalog C:C1 v6, thus the resulting merged local catalog on system C may be C:C1 v6.

Panels 25552 and 25554: systems B and C each receive their requested nuts N4 v1 and F1 v1 from system A. Panels 25562 and 25564: systems B and C each save received nuts F1 v1 and N4 v1 locally, (note that the local catalog C1 for group G1 requested them) may update the catalog entries for each received nut from "pending" to "local" resulting in the local catalog version changing from v6 to v7, and thus the resulting state in each system B and C may be that of panels 25562 and 25564. Since the requested nuts do not exist in their local system, each system B and C may just read the viewable metadata of the received nuts and update their catalog entries; however, each system may additionally decide to insert their group keys and authenticate that the received nuts may indeed be for the group and may have not been tampered with. In this particular case, both systems B and C may have RW access to F1 v1 25312 thus each may verify its authenticity; for N4 v1 25322, system B may have Read access and may verify it while system C may have VerifyOnly access and may verify it. These two panels may now be in sync with system A state shown in panel 25560 which effectively may have not changed since panel 25520. The local catalogs of each system may have the same catalog entries, each system may have local copies of nuts G1 v5, F1 v1 and N4 v1, thus consistency of the group may be achieved. The local catalogs in this example may have different version markers than their counterpart member systems but they specify the same catalog ID of the same group ID. This example may show that by using groups, conduits and nuts, that a single member of a group may share new nuts with the group and eventually, all member systems may achieve consistent states thus the group may be considered consistent.

Deletions in a distributed and decentralized system using PUIDs may require a bit more care than conventional FS inode erasures. A partition event in a distributed system may cause a previously deleted ID to reappear during partition healing. In these cases, tombstones (a notation in some form whereby the existence of the deleted ID may be referenced) may need to be kept track of in maps such as but not limited to FHOGs, catalogs and groups. There may be many methods to maximize the efficiency of processing and space for maintaining tombstones throughout a distributed and decentralized system. The benefits of a truly distributed and decentralized systems with NUTS type features may be weighed against those lacking such features to determine if maintaining system wide tombstones may be worth the effort. Operating in a universal namespace may require extending the states of and/or actions performed on IDs and their respective objects comprising create, active, delete, inactive, recycle, undelete, archive, expunge, resurrect, and expunge with prejudice (annihilate); the specific definitions of each state and/or action may vary depending on the embodiment and its purposes and limitations; and only smaller subsets of states and/or actions may be necessary for an embodiment.

FIG. 256 continues the example from FIG. 255. This example may show how a modification of a shared object in a group may propagate amongst the group members towards achieving consistency. Picking up the states of systems A, B and C where FIG. 255 left them, we begin with panel 25602 where system B may modify locally stored FHOG nut F1 v1 to F1 v2. This modification action may be allowed due to system B having been given Read/Write access to nut F1 when it was configured 25612. Panel 25612: system B may modify its local catalog C1 for group G1 B:C1 v7, updating the entry for FHOG F1 v1 to "F1 v2" upon which a new version marker for the local catalog changes from v7 to v8 resulting in catalog nut B:C1 v8. Panels 25620, 25622 and 25624: each system may exchange copies of their local catalogs with each other which may result in these three states.

Panel 25632: on system B, the merging of local catalog B:C1 v8 with catalog A:C1 v7 from system A may result in discarding catalog A:C1 v7 and keeping catalog B:C1 v8, then the merging of catalog B:C1 v8 with catalog C:C1 v7 from system C may result in discarding catalog C:C1 v7 and keeping catalog B:C1 v8, thus the resulting merged local catalog on system B may be B:C1 v8. Panel 25630: on system A, the merging of local catalog A:C1 v7 with catalog B:C1 v8 from system B may result in updating catalog A:C1 v7 with the entry from catalog B:C1 v8 as "(F1 v2)" and marking the catalog as version v8 and saving catalog A:C1 v8, then the merging of catalog A:C1 v8 with catalog C:C1 v7 from system C may result in discarding catalog C:C1 v7 and keeping catalog A:C1 v8, thus the resulting merged local catalog on system A may be A:C1 v8. In this example, the parentheses around a new entry may signify that the process may have requested those nut IDs and versions from the originating system and may have entered a status of "pending" on the catalog entry. Panel 25634: on system C, the merging of local catalog C:C1 v7 with catalog B:C1 v8 from system B may result in updating catalog C:C1 v7 with entries from catalog B:C1 v8 as "(F1 v2)" and marking the catalog as version v8 and saving catalog C:C1 v8, then the merging of catalog C:C1 v8 with catalog A:C1 v7 from system A may result in discarding catalog A:C1 v7 and keeping catalog C:C1 v8, thus the resulting merged local catalog on system C may be C:C1 v8.

Panels 25640 and 25644: systems A and C each receive their requested nut F1 v2 from system B and merge the existing nut F1 v1 with received nut F1 v2 producing merged nut F1 v2 and saving it locally. For F1 25312, system A may be the RAT (owner) and may easily verify its authenticity, and system C may have Read/Write access to F1 and may easily verify its authenticity. Panels 25650 and 25654: systems B and C each may update the catalog entry for merged nut F1 v2 from "pending" to "local" resulting in the local catalog version changing from v8 to v9, and thus the resulting state in each system A and C may be that of panels 25650 and 25654. These two panels may now be in sync with system B state shown in panel 25652 which effectively may have not changed since panel 25612. The local catalogs of each system may have the same catalog entries, each system may have local copies of nuts G1 v5, F1 v2 and N4 v1, thus consistency of the group may be achieved. The local catalogs in this example may have different version markers than their counterpart member systems but they specify the same catalog ID of the same group ID. This example may show that by using groups, conduits and nuts, that a single member of a group may modify a shared nut with the group and eventually, all member systems may achieve consistent states thus the group may be considered consistent.

FIG. 257 shows how a VerifyOnly nut gets synchronized across a group. FIG. 257 continues the example from FIG. 256. This example may show how a modification of a shared nut in a group may propagate amongst the group members towards achieving consistency wherein some members may be restricted from Read and/or Write accesses on the shared nut. Picking up the states of systems A, B and C where FIG. 256 left them, we begin with panel 25700 where system A may modify locally stored text nut N4 v1 to N4 v2. This modification action may be allowed due to system A being the RAT owner of nut F1 when it was configured 25322. Panel 25710: system A may modify its local catalog C1 for group G1 A:C1 v9, updating the entry for text nut N4 v1 to "N4 v2" upon which a new version marker for the local catalog changes from v9 to v10 which may result in catalog nut A:C1 v10. Panels 25720, 25722 and 25724: each system may exchange copies of their local catalogs with each other which may result in these three states.

Panel 25730: on system A, the merging of local catalog A:C1 v10 with catalog B:C1 v8 from system B may result in discarding catalog B:C1 v8 and keeping catalog A:C1 v10, then the merging of catalog A:C1 v10 with catalog C:C1 v9 from system C may result in discarding catalog C:C1 v9 and keeping catalog A:C1 v10, thus the resulting merged local catalog on system A may be A:C1 v10. Panel 25732: on system B, the merging of local catalog B:C1 v8 with catalog A:C1 v10 from system A may result in updating catalog B:C1 v8 with the entry from catalog A:C1 v10 as "(N4 v2)" and marking the catalog as version v9 and saving catalog B:C1 v9, then the merging of catalog B:C1 v9 with catalog C:C1 v9 from system C may result in discarding catalog C:C1 v9 and keeping catalog B:C1 v9, thus the resulting merged local catalog on system B may be B:C1 v9. In this example, the parentheses around a new entry may signify that the process may have requested those nut IDs and versions from the originating system and may have entered a status of "pending" on the catalog entry. Panel 25734: on system C, the merging of local catalog C:C1 v9 with catalog A:C1 v10 from system A may result in updating catalog C:C1 v9 with the entry from catalog A:C1 v10 as "(N4 v2)" and marking the catalog as version v10 and saving catalog C:C1 v10, then the merging of catalog C:C1 v10 with catalog B:C1 v8 from system B may result in discarding catalog B:C1 v8 and keeping catalog C:C1 v10, thus the resulting merged local catalog on system C may be C:C1 v10.

Panels 25742 and 25744: systems B and C each may receive their requested nut N4 v2 from system A. System B only may have Read access to nut N4 v2 25322 so it may insert its group key into N4 v2 to authenticate it; upon a successful authentication (system B may open and read the payload in the nut), it may close the nut and then may proceed to replace its local nut N4 v1 with the just authenticated N4 v2; if further reassurance may be required that the latest version may be kept, system A may attempt to traverse the logs and/or carnac revisions to determine the latest version if the nut may have been configured to allow such access for system A. System C may only have VerifyOnly access to nut N4 v2 25322 so it may insert its group key into N4 v2 to verify it; upon a successful authentication (an attempt to open nut N4 v2 simply may result in a verification notice for the key inserted and that the payload may have been authenticated but no other part of the nut may be accessed), it may close the nut and then may proceed to replace its local nut N4 v1 with the just authenticated N4 v2; no further reassurances may be gotten by system C on nut N4 v2 as to which version v1 or v2 may be the latest; if there may be cleartext metadata in the nut indicating a last modification time, it may be compared to make such determinations.

Panels 25752 and 25754: systems B and C each may update the catalog entry for nut N4 v2 from "pending" to "local" resulting in the local catalog version changing from v9 to v10 for system B and from v10 to v11 for system C, and thus the resulting state in each system B and C may be that of panels 25752 and 25754. These two panels may now be in sync with system A state shown in panel 25750 which effectively may have not changed since panel 25710. The local catalogs of each system may have the same catalog entries, each system may have local copies of nuts G1 v5, F1 v2 and N4 v2, thus consistency of the group may be achieved. The local catalogs in this example may have different version markers than their counterpart member systems but they specify the same catalog ID of the same group ID. This example may show that by using groups, conduits and nuts, that a single member of a group may modify a shared nut with the group and eventually, all member systems may achieve consistent states thus the group may be considered consistent.

FIG. 258 shows how a nut gets synchronized across a group. FIG. 258 continues the example from FIG. 257. This example may show how the addition of a shared nut in a group may propagate amongst the group members towards achieving consistency wherein some members may have no keyholes configured for them on the shared nut. Picking up the states of systems A, B and C where FIG. 257 left them, we begin with panel 25800 where system A may create a locally stored data nut N6 v1. This action may indicate that system A may be the RAT owner of nut N6 25324. Panel 25810: system A may modify its local catalog C1 for group G1 A:C1 v10, appending an entry for data nut N6 v1 upon which a new version marker for the local catalog changes from v10 to v11 which may result in catalog nut A:C1 v11. Panels 25820, 25822 and 25824: each system may exchange copies of their local catalogs with each other resulting in these three states.

Panel 25830: on system A, the merging of local catalog A:C1 v11 with catalog B:C1 v10 from system B may result in discarding catalog B:C1 v10 and keeping catalog A:C1 v11, then the merging of catalog A:C1 v11 with catalog C:C1 v11 from system C may result in discarding catalog C:C1 v11 and keeping catalog A:C1 v11, thus the resulting merged local catalog on system A may be A:C1 v11. Panel 25832: on system B, the merging of local catalog B:C1 v10 with catalog A:C1 v11 from system A may result in updating catalog B:C1 v10 with the entry from catalog A:C1 v11 as "(N6 v1)" and marking the catalog as version v11 and saving catalog B:C1 v11, then the merging of catalog B:C1 v11 with catalog C:C1 v11 from system C may result in discarding catalog C:C1 v11 and keeping catalog B:C1 v11, thus the resulting merged local catalog on system B may be B:C1 v11. In this example, the parentheses around a new entry may signify that the process may have requested those nut IDs and versions from the originating system and may have entered a status of "pending" on the catalog entry. Panel 25834: on system C, the merging of local catalog C:C1 v11 with catalog A:C1 v11 from system A may result in updating catalog C:C1 v11 with the entry from catalog A:C1 v11 as "(N6 v1)" and marking the catalog as version v12 and saving catalog C:C1 v12, then the merging of catalog C:C1 v12 with catalog B:C1 v10 from system B may result in discarding catalog B:C1 v10 and keeping catalog C:C1 v12, thus the resulting merged local catalog on system C may be C:C1 v12.

Panels 25842 and 25844: systems B and C each may receive their requested nut N6 v1 from system A. System B may have Read/Write access to nut N6 v1 25332 so it may simply save it locally; if more reassurance may be desired, System B may insert its group key into N6 v1 to authenticate it; upon a successful authentication (system B may open and read the payload in the nut), it may close the nut and then it may proceed to save it. System C may have no keyholes configured in nut N6 v1 therefore its only alternative may be to simply accept the nut and save it locally knowing that its inclusion within a group catalog may be sufficient for it to keep a copy locally.

Panels 25852 and 25854: systems B and C each may update the catalog entry for nut N6 v1 from "pending" to "local" which may result in the local catalog version changing from v11 to v12 for system B and from v12 to v13 for system C, and thus the resulting state in each system B and C may be that of panels 25852 and 25854. These two panels may now be in sync with system A state shown in panel 25850 which effectively may have not changed since panel 25810. The local catalogs of each system may have the same catalog entries, each system may have local copies of nuts G1 v5, F1 v2, N6 v1 and N4 v2, thus consistency of the group may be achieved. The local catalogs in this example may have different version markers than their counterpart member systems but they may specify the same catalog ID of the same group ID. Each system may or may not have full, partial or no access to some of the shared nuts in a group. This example may show that by using techniques comprising groups, conduits and nuts, that a single member (or non-member MC) of a group may share a nut with the group with varying access configurations for certain members but eventually, all member systems may achieve consistent states thus the group may be considered consistent.

Groups and/or loopback conduits may be viewed as FSMs being passed around as data objects among different members in order to achieve a consistent state between currently available members of the group. Utilizing nut containers for the components of groups and loopback conduits such as but not limited to group nuts, catalog nuts and FHOG nuts may allow for the secure exchange of FSM states. A group nut may also facilitate the secure key distribution of group key sets to each member anonymously or not. Groups and loopback conduits may allow for the arbitrary creation of any logical grouping of a set of NutIDs from a unitary group to N members by any process, user or asset with an ID. Groups and loopback conduits may be the preferred method of forming cryptographic relationships using RBKs between any two NutIDs for some embodiments due to enhanced features comprising synchronization, sharing, partition resilience, asynchronicity, key distribution, security (when using nuts), applicability and versatility. The earlier FSM example of Alice setting up a relationship nut with Bob may be preferably expressed as a group of two where Alice may be the MC and member who invites Bob to the group. Groups consistently implemented over nuts may provide end-to-end encryption for all communications between members thereby effectively creating a secure logical network for an arbitrary set of members. Any digital ID may be allowed to perform group related actions comprising creation, introduction, initiation, distribution, maintenance, administration, revocation, invitation, and sharing; some or all of these actions may be undertaken by an digital ID independently and without escalated privileges from an external access control system unless so desired. Groups may constitute a self-contained micro access control model in the form of a portable, decentralized, and/or distributable FSM for the purposes of ad-hoc and/or permanent congregation of IDs and their related data. A partitioned network may be an operating assumption underlying the method of groups and loopback conduits therefore dynamically changing, arbitrary subsets of communicative group members may be the norm including a member operating in isolation for extended periods of time.

RBK Key Notation

FIG. 259 illustrates RBK terminology in a three-person scenario. FIG. 259 may expand on the RBK example from FIG. 113 by adding Carol to the mix. It may show a three-person network of having three separate relationships 25950 where they may all know each other: Alice-Bob, Bob-Carol and Carol-Alice. This figure may introduce accurate and concise notations to depict specific address book and RBK components. Section 25940 may define the notation method employed and how each sample may be read and understood. For brevity, this example uses the first letters of the user name, B for Bob, A for Alice and C for Carol. Each person may have a NUTbook where they may keep contact nuts for themselves and their contacts for a total of three contact nuts per NUTbook per user; this figure may not show each user's own contact nut therefore only a total of six contact nuts may be represented and only their RBK sections may be illustrated. RBKs may have a directional aspect to them and may be indicated by the use of arrows. The key identifier (KID) may be a NutID generated and assigned to a newly formed cryptographic key at the time of creation and/or the KID may be the NutID of the nut container created and/or used to store a cryptographic key. Practically, it may be bad practice to reuse KIDs unless there may be a good reason to do so. However, if a nut is used to store a key as in an Access Nut, the NutID of the nut may indicate a series of related keys that may be generated from the seed key stored within along with its specific key rotation, generation and/or serial creation method and any necessary parametric settings.

When Bob wants to send a text nut to Alice, he may look up the contact nut for Alice in his NUTbook 25922 and may use the "Bob to Alice public key which may have originated from Alice NUTbook contact for Bob" as indicated by '$B_A B \rightarrow A.U$' and having a KID of '$B_A B \rightarrow A$'. The contact nut for Alice in Bob's NUTbook may not carry the private part of the '$B_A B \rightarrow A$' key because when Bob may send to Alice, only Alice may read it because only Alice may have the private key. The situation may be mirrored in Alice's contact for Bob in her NUTbook 25912. The rest of the RBK portions of the contact nuts may reflect the same type of RBK key setup between the users for each of their relationships. This method of RBK use and relationship forming within a NUTbook between any two contacts or IDs may also be of conceptual value in relation to generalized groups. This notation may be used extensively in the following sections on group data flows and group key distributions.

Group Data Flows

FIG. 260 illustrates data flow topologies for various group sizes. The use of nuts in forming and/or maintaining groups may allow for secure data exchange amongst the members. The use of group nuts may be utilized to establish the membership of the group and to securely distribute group keys. The conventional notion of a group may allow for a default behavior of an "n:n" (read n to n) relationship network similar to 25950 where the number of edges of the graph may be computed as n(n−1)/2 which may be equivalent to the number of relationships being formed. Expressing bidirectional edges using directional flows may double the number of edges to n(n−1). Including the looping flow of a member sending data to itself increases the number of edges to $n^2$ which may be graphically represented as a square matrix called a square cross matrix of data flows. The use of cryptographic relationships on a 1:1 basis in groups may be particularly useful in the accurate and/or authenticatable attribution of modifications of shared objects amongst its members. There may be scenarios where an n:n group communication network may be undesirable such as but not limited to Bell-LaPadula and Biba Integrity access models. Group data flows as may be defined in this section may be a generalized form of configuring arbitrary communication network topologies with directionality within a group of n members using RBKs within a group nut.

Group network 26000 may show a two ID network with bidirectional data flows representing a 2↔2 network; in RBK terms, this network may be expressed as four directional relationships: A→A, B→B, A→B and B→A. Note that any node may send a message to itself thereby implying a loopback edge for each node onto itself. A nut's NAC model may facilitate the restriction of loopback edges in such models by its WriteOnly CRBAC. Group network 26010 may show a three ID network with directional data flows representing a 1→N network; in RBK terms, this network may be expressed as five directional relationships: 3 loopback edges, C→B and C→A. Group network 26020 may show a five ID network with directional data flows representing a M→N network; in RBK terms, this network may be expressed as thirteen directional relationships: 5 loopback edges, A→B, A→E, A→C, A→D, B→A, B→D, B→C and B→E. Group network 26030 may show a five ID network with bidirectional data flows representing a 1↔N network; in RBK terms, this network may be expressed as n(n−1)=20 directional relationships. Group network 26040 may show a three ID network with directional data flows representing a (N−1)→2 network; in RBK terms, this network may be expressed as five directional relationships: 3 loopback edges, A→C and B→C. Group network 26050 may show a five ID network with directional data flows representing a (N−M)→(N−M) network; in RBK terms, this network may be expressed as eleven directional relationships: 5 loopback edges, D→A, C→A, E→A, D→B, C→B, and E→B. These example networks show how data flows within a networked group may be limited by directionality, target node and/or other arbitrary factors.

FIG. 261 introduces a notation method for protected, directional, data flows in an arbitrary network of nodes. A group nut may provide protection for the group FSM embedded in its payload and the payload may be extended to include a cross matrix of data flows controlling key sets between group members. The cross matrix of data flows in the payload may be expressed as follows: each member may be allocated a "mini-NUTbook" or concise contact book holding separate keysets for each of the other members in the group thereby effectively creating N mini-contact books for its N members where each mini-contact book contains N entries or RBK key sets including one for the member itself thus a cross matrix of data flows for N members in a group becomes an N×N matrix. Effectively, each mini-contact book entry may be represented by an element in the square cross matrix of data flows wherein each row may form a complete mini-contact book for that member to address the members of the group including himself Within this context, the notation method shown as 26100 points out how an RBK component may be expressed in an N×N matrix containing N mini-contact books. A group nut may map ID A as ID GA to provide some form of anonymity to other group members therefore we may equate GA=A, GB=B, GC=C and so on. By reading the notation 26110 in the suggested way, any RBK component between any two members in either direction may be accurately described in the context of an N×N cross matrix of data flows. Note the convention of using "U" to indicate the public part of an asymmetric key set, "R" to indicate the private part of an asymmetric key set and "S" to indicate a symmetric key. The notation concisely comprises directionality, the two members involved, key type, key part, the mini-contact book it belongs to, the member it may be filed under in that contact book and the originator of the key. An originator of "X" denotes that it may be a symmetric key which may not require hiding from both participants since it may be considered a shared secret and therefore common between the participants; the drawback to using symmetric keys may be well known when it comes to irrepudiation and/or authenticable attribution.

FIG. 262 shows a three-member network in an N→N data flow configuration. A three-member network 26200 in a N→N bidirectional configuration may be pictured. A cross matrix of data flows may be expressed by the table shown 26210. Each row of the table may be viewed as a mini-NUTbook or mini-contact book ("contact book" or "book" going forward) for the member named on that row: table 26210 has three rows or three contact books, one contact book each for members A, B and C, and each contact book may hold three contact entries ("contacts" going forward) one each for members A, B and C, thus presenting itself as a 3×3 cross matrix of data flows for 3 members. Row 26220 may represent a contact book for A holding 3 contacts: A→A 26222 for sending messages to itself, A→B 26224 for sending messages to B, and A→C 26226 for sending messages to C. Contact A in book A 26222 may contain at least one symmetric key $A_{A:A}$A↔A.S read the symmetric key originating from A located in contact A of book A used to send a message from A to A (itself). The prospect of creating asymmetric keys for sending messages to oneself may be inefficient and unnecessary in most situations. Contact B in book A 26224 may contain several keys: $B_{A:B}$A→B.U reads the public key originating from B located in contact B of book A used to send a message from A to B; $B_{A:A}$B→A.U reads the public key originating from A located in contact B of book A used to send a message from B to A; $B_{A:A}$B→A.R reads the private key originating from A located in contact B of book A used to send a message from B to A; $B_{A:X}$A↔B.S reads the common symmetric key located in contact B of book A used to exchange messages between A and B. Contact C in book A 26226 may contain several keys: $B_{A:B}$A↔B.U reads the public key originating from B located in contact B of book A used to send a message from A to B; $B_{A:A}$B→A.U reads the public key originating from A located in contact B of book A used to send a message from B to A; $B_{A:A}$B→A.R reads the private key originating from A located in contact B of book A used to send a message from B to A; $B_{A:X}$A↔B.S reads the common symmetric key located in contact B of book A used to exchange messages between A and B. In summary, member A using its contact book embedded in the group nut may have a contact entry for each other member including itself wherein may be stored the key components which may allow member A to converse with the contact member in either direction in a cryptographically controlled manner.

Rows 26230 and 26240 may represent contact books for members B and C respectively may be read in a similar manner as row 26220 but accounting for the differences of the cross matrix locations. Thus, each member of Group G 26210 may be said to have a defined contact book each containing contact entries for all members of the group including itself wherein may be stored the key components which may allow a member to converse with any other contact member in either direction in a cryptographically controlled manner.

A member's contact book in Group G may be hidden from other members simply by utilizing the member specific group key they each may have been assigned during the group invite process. This member specific group key may or may not be the same key used by a member to unlock group nuts and other shared nuts within the group comprising catalog nuts, FHOG nuts, data nuts, etc. It may be the case that the group MC and/or admin may have full access to all the keys in a group nut at time of creation. Thereafter, each member may re-encrypt their contact books with a key of their choosing to hide it better going forward even from the MC and/or admin. Unless the group creator archived a copy of the original cross matrix data flows RBKs, once a contact book in a group may have been re-encrypted by a member using a key not accessible to the creator, the original keys of that contact book may stay private going forward.

FIG. 263 shows a three-member network in a custom data flow configuration. Using 26200 and 26210 as a starting base, if the bidirectional data flow between members A and B is deleted and/or not allowed, it may resemble the diagram 26300. The A→B directional flow may be represented by contact entry 26324 and it may be deleted to no longer allow messages to be encrypted and/or decrypted by A to and from B. The B→A directional flow may be represented by contact entry 26332 and it may be deleted to no longer allow messages to be encrypted and/or decrypted by B to and from A. Thus, the bidirectional data flow A↔B may be eliminated and the cross matrix of data flows may reflect a customized data flow pattern.

FIG. 264 shows a five-member network in an 1↔N configuration. The cross matrix of data flows of a five-node group may be represented in table form 26410 where every member may privately communicate with each other with attribution and directionality.

FIG. 265 shows a five-member network in a custom configuration. The five-node group of FIG. 264 may be customized to limit data flows A↔B and C↔E as shown by 26500. These limitations may be reflected in the cross matrix of data flows 26510 by deleting the four contacts as marked.

FIG. 266 shows a five-member network in a custom configuration. The five-node group of FIG. 265 may further be customized to limit data flows as shown by 26600. These limitations may be reflected in the cross matrix of data flows 26610 by deleting the various contacts (matrix elements), key parts and/or key sets as shown. The selective deletion of select directional RBKs in a cross matrix of data flows may allow for any arbitrary directional data flows to be configured for any size group of N members. Each mini-contact book contact entry (matrix element) may implement NAC level granularity to achieve fine grain access controls comprising Read/Write/WriteOnly/VerifyOnly access rights on data flows between any two members.

FIG. 267 shows how a mini-NUTbook may be represented and stored in a group nut. Table 26700 is the same as the one from FIG. 262. A simple rearrangement of the keys in the table results in the table shown in 26710. Again, each row represents the mini-contact book or mini-NUTbook for that member. 26712 may be a contact book for A where it may have 3 contact entries A, B, and C. Key KGA may not have been shown in table 26700 but may have been specified previously for the purpose of hiding the contact book of A from other members of the group. Each contact entry may be encrypted by key KGA which may NOT be stored in the group unencrypted or at all. KGA may be the same key that allowed A to access this group nut and/or it may be a revealed key from opening A's universal keyhole thereby may be revealing a key map. Then all the different key components from the cross matrix of data flows pertaining to this group may be organized under columns titled "Symmetric", "To Public Key" and "From Key Pair". Either table form may be easily stored in a convenient programmatic data structure for storage inside the payload of a group nut.

FIG. 268 shows adding a member to an existing group cross matrix of data flows. Suppose member A created this Group G table 26800 and also configured member B as a group admin which may allow B to add members to the group membership. One way this type of access may be configured for member B may be to give member B Read/Write access to the group nut G thus member B may perform edit actions on the payload including the group membership list and/or the group cross matrix of data flows table. This example 26810 assumes member B may have established nut-based relationships (a group of 2) with each of the other members in the group thereby member B may have group keys that comprise the RBK set between himself and the others. These relationship RBKs may be indicated in the figure as $B \rightarrow A_{RBK}$, $B \rightarrow C_{RBK}$, and $B \rightarrow D_{RBK}$, and they may be used to encrypt each catalog entry for new member D in each member's mini-contact book. These initializing keys may be later replaced by each member with their respective group access keys like KGA, KGB, KGC, and KGD if and only if they have been configured for Write access to the group nut payload. Member B adds new member D and subsequently generates all the key sets necessary to build the incremental cross matrix of data flows between new member D and the rest of the members including himself, B. In the table 26810, the notation for the Symmetric, To Public Key and From Key Pair may be to note that the originator for those keys may be from member D where in fact member B may have created them all at the time when he invited member D to the group.

Another embodiment of assigning additional group admins may be to encrypt another copy of the member group keys with an admin key which may be given to the assigned admin as an encrypted admin key using their own member group key. The admin having access to each member's group key may decrypt and edit every member's matrix element and encrypt it using that member's group key. This method may allow for zero or more admins for the group. An MC may decide to: 1) only be involved in getting the group together initially and assign one or more group members to be admins going forward; 2) become a group member and keep being one of the group admins; 3) become a group member but assign away the admin role to another member. It may be entirely possible that a group may be formed with the admin role left out in which case it may be very difficult to modify the group characteristics in the future and may require creating a new group to affect any different arrangements between the same members. The cross matrix of data flows method may provide a framework for configuring and controlling directional flows in an arbitrary network of N members in a compact cryptographic manner. The members of a group G may form different groups with the same membership but having different cross matrix of data flows configurations if so desired. Since the directional aspect of data flows management may require the hiding and/or removal of certain keys according to the desired flow between members, each member may only create shared nuts with keyholes configured for members it may have data flow keys for thereby limiting to whom a member may key a nut for and/or by whom a nut may be opened by; furthermore, the cross matrix of data flows may be extended with NAC-like fine grained access controls to further limit what access a keyholder may be allowed within the nut. Furthermore, if data is shared via nuts, each nut may be configured by the owner/creator to affect fine grained CRBAC using a nut's NAC features which may operate independently of any group mechanism.

Version Markers

In various sections of this specification, version markers were used but not described more fully as to their purpose and characteristics as may be applicable and required in a distributed and decentralized environment integrating an emergent pervasive security stemming from the lowest layers of SDFT and nut containers to systems acting upon such objects. It may be fairly common to use serial version numbers to signify different iterations of a document on a single system by a single user at a time. In a multiuser environment with shared documents, the notion of seriality quickly loses its effectiveness and other attributes surrounding and of the modifications may be required to be considered. All of the examples in the following figures may be enacted by various types of well-known hashing methods but the preferred method for some embodiments may be digital signatures (digns) due to their authenticable attribution characteristics. When using digns and/or hashes as version markers, there may be no easy methods to deduce any sense of seriality between one versus another. The only reliably measurable characteristic may be that of differences—is one dign different from the other? A difference may indicate that the source material may be different. Theoretically, a possibility of collisions may exist with any hashing or dign method but the probability maybe very small depending factors comprising the length of the hash, the size of the dign key and/or the presence of salting.

Anywhere there may be a reference to a version marker, the following methods may be applicable as-is or with variations as needed. Most if not all of these methods may be well-known to one of ordinary skill in the art but it is provided here so it may provide a more complete description of how all the components may work. One of the nut's special characteristics may be that it carries not only the payload but it may also carry its carnac revisions which may include historical revisions. A nut also may have a PUID called NutID of sizable starting length which may be extended if necessary at any time. There may be many variations of marking each historical revision to make the process of noticing differences more efficient such as but not limited to Merkle Trees, but for the purposes of this example, a simple two digns per revision entry may be considered. Each revision history delta may be stored in the carnac revisions along with its delta dign (DD) and a summary dign (DS) where the summary dign may be the dign(delta dign+previous summary dign) thereby giving a quick indication of a dign from a historical perspective of all previous revisions. This example may use summary digns (DS), NutIDs, payloads, carnac revisions, payload digns (DP) and other attributes as needed.

FIG. 269 shows how a series of asynchronous updates to a shared nut may be detected and resolved. Table 26910 works through a 1 User making 1 Change scenario for a shared nut with NutID=NID, a group of at least three members Alice, Bob and Carol, with the nut payload revision history showing DS=DS1 for the local copy of nut NID for each user at time T1. At time T2, Alice may modify the payload of nut NID causing a revision delta to be inserted into the revision history of the nut, generating a DD for the latest delta and a summary dign DS2=dign(DD+DS1), storing the modified payload in the nut, updating the cleartext metadata of the nut with attributes comprising DS2, date/time of last modification, and userID of update. Then Alice's process may save the modified nut NID and the NUTserver may determine that NID may be a shared object for a group and thus may update its catalog nut for the group and may perform a catalog poll. Thereafter, Bob and Carol's systems may themselves perform catalog polls and identify the new version of NID DS2 that Alice may have and may request it from Alice's system. At time T3 (coincidentally), both Bob and Carol receive Alice's nut NID DS2 and start the process of merging it with their own copy of NID DS1. In this scenario, each system of Bob and Alice may perform the following merge/sync steps: the version marker of Bob's local NID DS1 may be different from the just received Alice's nut NID DS2, the process may open both nuts and may begin to browse Alice's nut's history DSes to see if it can find a revision entry with a DS of DS1. If found, Bob's nut may be older than Alice's nut and the process may simply replace Bob's nut with Alice's resulting in Bob having a local copy of NID DS2 thus his system may be now synced. However, if DS1 is not found in Alice's nut's history, the process may look for DS2 in Bob's nut's history to see if Alice's nut may be older than Bob's. If found, then the process may just discard Alice's nut and keep Bob's nut NID DS1 since it may be newer than Alice's NID DS2. If DS2 is not found in Bob's nut's history, then the process looks backwards in time to find a common history entry with the same DS values between Bob's and Alice's versions of the nut NID. If a common DS value is not found or it is found somewhere deeper in each history, then a full merge of both histories may begin using universal timestamps for each delta being examined (in the first case, it may start from the beginning of one or both histories, in the other case, it may start from where the common DS may have been found); any update conflicts may be resolved automatically by a preferred method as may be indicated by the nut's metadata which may comprise CRDT methods (conflict free replicated datatypes), Git-like methods, textual conflict annotations within the payload itself to be manually visited by an authorized user at a later time; once a full merge may be complete, the payload may be reconstituted from the merge history; the merging of histories may require the recalculation of DSes for each delta (since computations of digns may take more CPU cycles, DSes may be calculated with a simple hashing method while keeping DDs as digns thereby preserving provenance of the data) which may result in a DS other than DS2 such as DS3 (we may discuss this shortly since this example may not fit this criteria). When Carol's system performs the same process of merging nut NID DS1 and NID DS2, her system results in holding only NID DS2, therefore at time T4, all three members of the group may be in sync holding NID DS2.

When a full merge occurs and a DS3 may be calculated by Bob's system, then it may be considered a new version of NID namely NID DS3 and the catalog polling process may begin again until the system may achieve synchronization. In the previous example, all three members may have begun with the same version NID DS1 so a merge situation may not have occurred.

Table 26920 works through a 1 User making 2 Changes with a delayed receiver scenario for a shared nut with NutID=NID, a group of at least three members Alice, Bob and Carol, with the nut payload revision history showing DS=DS1 for the local copy of nut NID for each user at time T1 and Carol's system may be currently offline or out of reach of the network. At time T2, Alice may make a first modification to NID DS1 producing NID DS2. By time T3, Bob's system may have synchronized with Alice's system and now may hold NID DS2 but Carol may be still offline leaving her with the original NID DS1. At time T4, Bob may make a second change to NID DS2 producing NID DS3. By time T5, Bob's system may have synced with Alice's system thus holding NID DS3 and Carol may be still offline. At time T6, Alice may be offline, Carol may come online, may poll Bob's system for its catalog, may request NID DS3 from Bob, may receive NID DS3 from Bob, may find that her DS DS1 may be found in NID DS3's recent history and may simply replace her NID DS1 with NID DS3 thus all three members may now be synchronized.

FIG. 270 show two examples of version changes. Table 27000 works with the same starting scenario as found in FIG. 269 where at time T1 all three members may have and may know NID DS1. At time T2, Bob and Alice may each make local changes to their copy of NID DS1 producing DS2 for Alice and DS3 for Bob. At time T3, Carol may perform a catalog poll on Bob and may request DS3 from Bob and then may replace her DS1 with DS3; Bob may do nothing; Alice may have polled Bob and may have requested DS3 from Bob, then Alice may merge DS3 with DS2 to produce DS4. At time T4, Bob may poll Alice and may receive DS4 and may replace his DS3 because it may be older than DS4; Carol may poll Alice and may request DS4 and then may receive DS4 which then may cause her system to replace her DS3 with DS4. Thus, the group may now be synchronized at time T5.

Table 27010 may work with the same starting scenario as found in FIG. 269 where at time T1 all three members may have and may know NID DS1. At time T2, Bob and Alice each may make local changes to their copy of NID DS1 producing DS2 for Alice and DS3 for Bob. At time T3, Carol may perform a catalog poll on Bob and may request DS3 from Bob and then may replace her DS1 with DS3; Alice polled Bob and requested DS3 from Bob, then Alice may merge DS3 with DS2 to produce DS4; Bob may modify his nut NID DS3 again producing DS5. At time T4, Bob may poll Carol and may receive DS3 which may be eventually discarded, then he may poll Alice and may receive DS4; Alice may poll Bob and may receive DS5, Carol may poll Alice and may request DS4 and then may receive DS4 which then causes her system to replace her DS3 with DS4. At time T5, Alice may merge the received DS5 with her DS4 producing DS6; Bob may merge the received DS4 with his DS5 producing DS6; Alice does nothing. At time T6, Bob and Alice poll each other and do nothing; Carol may poll Bob and may request DS6 then may receive DS6 and may replace her DS4 with DS6 because it may be newer. Thus, the group may now be synchronized at time T7.

These examples show how non-serial version markers may be used with nuts having carnac revisions utilizing the mechanisms of group and catalog nuts to achieve synchronization with relatively low overhead of keeping version markers in memory. There may be many different efficiencies that may apply to such passing of data but even with the simplest of communication methods, this synchronization method may perform synchronizations satisfactorily.

Anonymous Identifiers

Privacy may be achieved to some degree throughout a system by creating anonymous reference to identifiers which may be called anonymous identifiers. In a network of systems, systems and/or users may desire to keep private certain identifiers which may become more meaningful to themselves and others in the form of PUIDs since theoretically they may maintain their uniqueness across space and time. Access controls may help in the effort to keep identifiers as well.

When externalizing information and/or sensitive attributes of systems, it may be prudent to mask its internally known identifier by using an anonymizing method that matches its use. The embodiments in this disclosure may require the use of different types anonymizing methods comprising short duration (session salts, nonces or IVs) and long duration (common or known salts). FIG. 271 shows a typical procedure for deriving an anonymous ID (AID). 27110 also may show how anonymous identifiers may undergo multiple iterations to mask original identifiers.

Short duration anonymization may require a session based salt, nonce or IV which may be discarded when the session may be over. Long duration anonymization may require a common or known salt which may be stored in a secure way and/or be derivable from the operating environment in a consistent and/or reproducible manner. Key IDs, NutIDs, network names, group IDs, among others may be deemed sensitive enough to warrant the use of common salts when engaging in data exchanges outside of protected networks and/or systems. These long duration salts may be applied in a consistent way to derive anonymous IDs for each particular use at the user's and/or developer's choosing. A data exchange and indexing server such as but not limited to the Rendezvous Server (RZ) may make extensive use of anonymous IDs to further maintain its neutrality from being privy to a user's private identifiers. However, there may be certain limitations to such masking endeavors when it comes to network and/or hardware communications since at some point systems like the RZ may require a hard IP address to actually deliver data to the recipient. FIG. 272 shows various mappings of anonymous IDs. Tables 27200, 27210 and 27220 show how NUTserver IDs may be anonymized to an external system such as an external RZ but that there may be some IP mappings which may continue to be very specific.

Rendezvous Server

FIG. 273 is a network diagram showing three RZs. A Rendezvous Server (RZ) may present itself in at least three different modes: iRZ, eRZ and RZ. FIG. 274 illustrates these three modes of an RZ. An iRZ may be an internet RZ that may be accessible by other eRZ/iRZ and may run in a standalone mode 27400. A RZ running in RZ mode may be paired with a NUTserver (NS) 27410. An eRZ may be an ecogroup/ecosystem RZ that may be accessible by other eRZ/RZ within the same ecogroup/ecosystem 27420. FIG. 275 shows the nature of RZ accessibility within a network of RZs. It may be apparent from this figure that RZs may prefer to communicate and network with one another in a particular modal hierarchy iRZ-eRZ-RZ.

FIG. 276 illustrates a network of RZs. The different modes of an RZ may facilitate a network of RZs to self-organize into hierarchies at different levels thereby performing a type of efficiency function. A network of RZs having no hierarchy may lead to pure peer-to-peer communication between RZs and NSs which then may lead to untenable congestion of network connections, communications and/or workloads per RZ host. The overall design of a network of NSs and RZs (NSRZ) may be to encourage inquiring (polling) rather than pushing for information from one another. Such encouragement, although not a hard rule, may ease the strains on the network as a whole and may promote self-organization and/or self-maintenance at each level of the network. An ecogroup 27600 comprising three NSRZ self-organizes according to some preferred formulation into a hierarchy as shown where NSRZ 27602 in RZ mode may primarily make inquiries to the RZ in NSRZ 27604 in eRZ mode. NSRZ 27606 in RZ mode may primarily make inquiries to the RZ in NSRZ 27604 in eRZ mode. The eRZ of 27604 may maintain multiple connections to internet facing iRZ 27632 and other eRZs 27622 of the same ecogroup. The eRZ 27622 may also have a connection to an iRZ 27634. A network of iRZs may maintain ecogroups of their own 27630 and/or network across other standalone iRZs 27642 and 27640.

Overlaying a practical sheen to FIG. 276, Alice may have a NUTS Ecogroup established amongst her three personal computing devices in her home where 27614 may be a wireless tablet, 27616 may be her wireless laptop and 27612 may be a desktop with an ethernet cable connected to her main router port. Alice may prefer to have a priority of desktop, laptop and then tablet for eligibility to act as an eRZ for her ecogroup of NSRZs. This preference may be due to her perception of each device's capabilities, connectivity, stability, capacity, among other factors. RZs may be endowed with self-examination methods paired with a simple consensus protocol which may allow rudimentary self-organizing behaviors. Alice's tablet 27614 may be out of WiFi reach to her main router and therefore cannot communicate with her eRZ desktop 27612 at which point her laptop RZ which may be within reach may allow a relaying service to relay and/or process messages from her tablet temporarily by using an alternate means of communication such as but not limited to Bluetooth or direct WiFi if the laptop may have at least a second WiFi adapter. This configuration limits communications and inquiries from her ecogroup to the internet iRZ by having her NSRZs try to satisfy her inquiries as much as possible. Only those queries where Alice's eRZ 27612 cannot answer may be relayed to an external iRZ 27640. If her desktop crashes, Alice's laptop may automatically takeover as the ecogroup's eRZ when it may determine that her desktop may be no longer reachable. This self-organizing behavior may be due to Alice's setting of her eRZ hierarchical preferences and/or other dynamic methods.

Bob's ecogroup 27600 may comprise four devices 27602, 27604, 27606 and 27622. Within his home, the devices may self-organize as shown in 27600. However, he may be travelling with his laptop 27622 and now he may be operating in a partitioned ecogroup 27620. His laptop 27622 may attempt to make a connection to his home eRZ but it may fail due to internet service providers NAT-ing and/or other constraints. At which point, his laptop may declare that since no other devices reachable, it must act as the eRZ for his ecogroup of one device therefore it may make a connection to a reachable iRZ 27634. Note that any shared documents within Bob's own ecogroup may eventually synchronize even in such a splintered ecogroup using group nuts and loopback conduits.

iRZs may cooperate and form iRZ groups 27630 for different purposes such as but not limited to load balancing, geographical coverage, vendor SLA agreements, and network segmentation. iRZ groups may also enjoy self-organizing aspects when appropriate using relevant factors and attributes. The self-organization aspect of RZs may be as simple as a priority list of devices or NSRZ IDs, or it may be as complex as having an automated dynamic performance monitor of a network of systems and networks and processing a complex series of analyses to derive at high efficiency configurations which may be dynamically deployed periodically and/or in response to relevant events comprising network failures, system failures, load balancing, load sharing, hacking attacks, and network modifications.

FIG. 277 shows a network diagram with three ecogroups of NSRZs. An Internet/WAN 27700 may provide digital communication connectivity across diverse systems in divers locations such as an iRZ service 27710, Alice's NSRZ ecogroup 27722 via a private LAN 27720, Carol's NSRZ ecogroup comprising two devices 27744 and 27742 via a private LAN 27740, and Bob's NSRZ ecogroup comprising two devices 27732 and 27734 via a private LAN 27730.

FIG. 278 shows a logical connection diagram of the network in FIG. 277. The scenario in 27800 may show a Rendezvous Server 27822 receiving connections from a device in each ecogroup for Bob 27812, Alice 27832 and Carol 27842. Bob and Alice's ecogroups may be operating in an IPv6 mode of TCP/IP which allows for larger IP addresses spaces whereas Carol's ecogroup devices operate primarily in an IPv4 environment. The need for larger IP addresses spaces may not have been envisioned when originally designed but due to an explosion of internet connected devices, the need for more IP addresses may have necessitated the expansion and reformulation of IP addresses as IPv6; however, adoption may be very slow due to the many existing devices, applications, networks and systems having a longer than expected useful life and thus prolonging the transition to IPv6. This may be one of the contributing examples which encourages creating a rather lengthy PUID in the form of a NutID whose suggested starting length may be at least 512 bits.

The iRZ 27822 may act as facilitator for connecting diverse TCP/IP operating environments such as IPv6 and IPv4. Typically, IPv4 networks may operate in a NAT environment where the router maps a single internet address to a set of local addresses to conserve addresses and/or hide local network configurations. In a NAT environment, user devices generally may not receive incoming connection requests unless special configuration changes may be made in the local router to allow such access. Thus, in such cases, the iRZ acts as an outbound connection receiving point for devices operating behind a NAT and the router not specifically configured to service connection requests. For IPv6 networks, the RZ may still act as a common connection point to exchange data over diverse and dispersed networks across the internet, and the RZ may act a bridging mechanism to constrained networks such as but not limited to IPv4, NAT environments and firewalls. Due to the diversity of networks with various limitations connecting and communicating over the internet, a group or groups of common connection receiving points such as may be provided by iRZs may be necessary. The scenario of 27850 may show how IPv6 devices and/or networks may connect directly; however, the constraints of the local internet access provider may or may not allow such direct IPv6 operations to occur in which case the mode of operation may be no different than operating behind a NAT.

FIG. 279 through FIG. 284 illustrate various RZ network configurations. FIG. 279 shows a single iRZ 27900 in the internet fielding connections from Alice Ecogroup 27910 eRZ device 27912 and Bob Ecogroup 27940 eRZ device 27942. Alice currently may have a single device in her ecogroup. Bob may have two devices in his ecogroup and his second device 27980 may be running in RZ mode connecting to its eRZ 27942.

FIG. 280 adds Bob's mobile phone 28032 operating as part 28030 of the Bob Ecogroup but partitioned from his main ecogroup 28040 perhaps due to Bob running some errands. The two separate portions of the Bob Ecogroup may congregate at the iRZ 28000 in order to exchange data for the purposes of synchronizing the Bob Ecogroup because they may be part of the same group called the Bob Ecogroup. The responsibility of the iRZ includes indexing NutIDs, caching nuts and dynamically building routing tables to facilitate such data transfers in an effective manner. Note that a Rendezvous Server may be purposefully designed to not be able to open any clients' nuts; a RZ may store keys and nuts it may access for the purposes of maintenance, administration and perhaps restricted client access (for client hosted iRZs) but in general, it may not open client nuts because it may not escrow such keys nor may have access to them. Therefore, a large part of the information the RZ needs to do its communication responsibilities may be derived from cleartext metadata from nuts and any additional wrapper information that may be sent along with a nut.

FIG. 281 has Bob visiting Alice's apartment to do some work on his spare laptop. Alice's only device 28112 may be operating the Alice Ecogroup connected to the iRZ 28100. When Bob boots his laptop in Alice's WiFi environment (she may have given him the WiFi access codes already), the NSRZ in the laptop 28122 may start operating the Bob Ecogroup NSRZ in eRZ mode since it cannot locate any of his other devices in the immediate local network (we may not be considering the case where he may tunnel to his LAN via a VPN). Then the eRZ 28122 connects to the iRZ and may poll for Bob Ecogroup catalogs across the internet to his home devices running a partition of his ecogroup. Given enough time, any modification Bob may have made to shared nuts across his ecogroup on his laptop 28122 in Alice's apartment may eventually synchronize across to his partitioned ecogroup 28140 thus all of the devices of his ecogroup may be eventually consistent. This also includes his mobile phone 28130 which in this case may be synchronizing via the telephone carrier's data network because Bob may have turned off the WiFi feature on it.

FIG. 282 has Alice visiting Bob's apartment and she wants to use Bob's running laptop to access her ecogroup. Bob may configure his Server Ecogroup 28250 to allow his laptop 28280 NSRZ to host a session of the Alice Ecogroup 28270 alongside his own ecogroup 28260. The Server Ecogroup may be a higher level grouping of other ecogroups it may host across one or more devices.

FIG. 283 illustrates how partitioned ecogroups may communicate via an iRZ. The Alice Ecogroup which may be partitioned into two segments 28312 and 28370 may effectively continue to function as a single ecogroup 28390 by communicating group and loopback conduit operations and/or data over the commonly connected iRZ 28300 using logical connections 28392 and 28394. Logical connection 28394 may actually traverse through device 28342 before physically reaching the iRZ 28300. The Bob Ecogroup, which may be partitioned into three segments 28320, 28330 and 28340, may effectively continue to function as a single Bob Ecogroup by communicating group and loopback conduit operations and/or data over the commonly connected iRZ 28300 using logical connections 28382, 28384 and 28380. Each of Alice and Bob's Ecogroups may independently synchronize over their respective groups by this methodology.

FIG. 284 illustrates a multiple iRZ network. The Alice Ecogroup may connect to a different iRZ 28404 for some reason but such network of iRZs may connect with each other thus enabling Alice to maintain synchronization across her Ecogroup partitions 28412 and 28470. All of these connections in theory may use unencrypted message sessions due to the secure nature of a nut container but it may be prudent to continue to use available transport security protocols to gain some Defense in Depth advantages.

Ecogroups & Ecosystems

FIG. 285 shows the components of Bob's ecosystem. A NUTS ecosystem may comprise the physical components required to host a NUTS application, store nuts, process nuts and/or the communication networks required to communicate over those devices. This figure may show at least four of Bob's devices which may comprise his ecosystem.

FIG. 286 shows some of the differences between an Ecogroup and Ecosystem. Bob's Ecosystem may be logically shown as 28600 where there may be a contact nut for Bob 28610 (acting as his main Access Nut), the devices, applications and systems comprising his ecosystem 28612, 28614, 28616, 28618 and 28620. The ecosystem diagram may depict the network topology that logically connects them and may allow communications amongst the devices. Bob's Ecogroup GBE may be logically shown as 28650 where there may be a contact nut for Bob 28660 (acting as his main Access Nut), a group nut for group GBE 28670 with each of the system device's NutID as members 28664, 28662, 28666, 28668, and a diagram depicting the communication paths which may exist between these components which may have been configured and described by an embedded cross matrix of data flows within the group nut GBE 28670, but may more likely be the result of the self-organizing aspect of a collection of NSRZs in the same ecogroup. Non-limiting differences between Bob's Ecosystem and his Ecogroup may be the inclusion of group methods comprising group nuts, group members, group cross matrix of data flows, and loopback conduits.

FIG. 287 shows the various components of Bob's Ecogroup GBE. In mathematical set notation, Bob's GBE Ecogroup may be depicted as shown in 28700 where 28702 may be the set membership in equation form and 28704 the set graphic form. Panel 28710 depicts Bob's Ecogroup GBE in the graphical notation for group 28712, loopback conduit 28714 and shared data objects 28716. As noted previously in the section on groups, a logical loopback conduit may be enabled by a collection of group catalogs across a group's members and across each of their systems. Panel 28720 may show several nuts that may take part in the following few figures. There may be a contact nut for Bob with NutID=BOBID 28730, a group nut for Bob's ecogroup with NutID=GBE for group GBE 28740, a group catalog nut for NSID1 (System1) with NutID=CN1 for catalog=C1 for group=GBE, a group catalog nut for NSID2 (System2) with NutID=CN2 for catalog=C1 for group=GBE, a group catalog nut for NSID3 (System3) with NutID=CN3 for catalog=C1 for group=GBE, a group catalog nut for NSID4 (System4) with NutID=CN4 for catalog=C1 for group=GBE, a FHOG nut with NutID=F1 28750 and a text nut with NutID=N3 28752.

FIG. 288 shows the contact and group nuts for ecogroup GBE. A tri-part box representation of a nut may be used in these several figures with the parts being metadata, universal keyhole and payload, in that order top to bottom. Bob's contact nut for himself 28800 may be filled out with more details in 28802. Bob's group nut for ecogroup GBE 28810 may be further detailed in 28812. FIG. 289 shows the first 2 catalog nuts for Bob's ecogroup GBE. The System1 (NSID1) catalog nut CN1 for catalog C1 for group GBE 28900 may be further detailed in 28902 and note that NSID1 may be set as the RAT owner 28904 of this catalog nut and all others may only have Read access. The System2 (NSID2)

catalog nut CN2 for catalog C1 for group GBE 28910 may be further detailed in 28912 and note that NSID2 may be set as the RAT owner 28914 of this catalog nut and all others may only have Read access. FIG. 290 shows the second 2 catalog nuts for Bob's ecogroup GBE. The System3 (NSID3) catalog nut CN3 for catalog C1 for group GBE 29000 may be further detailed in 29002 and note that NSID3 may be set as the RAT owner 29004 of this catalog nut and all others may only have Read access. The System4 (NSID4) catalog nut CN4 for catalog C1 for group GBE 29010 may be further detailed in 29012 and note that NSID4 may be set as the RAT owner 29014 of this catalog nut and all others may only have Read access. FIG. 291 shows the FHOG and text nuts for ecogroup GBE. The FHOG nut F1 29100 may be further detailed in 29102 and note that this FHOG nut may be set to 'nut' mode 29104 indicating that it may behave like a normal data nut and not like a catalog nut. The text nut N3 29110 may be further detailed in 29112 and note that all members of the group may have Read/Write access and Bob may be the RAT.

FIG. 292 shows the system locations of the nuts related to Bob's ecogroup GBE. Note that each group catalog for each system may have its own NutID thereby making it eligible for being included as a shared nut but care may be needed when enabling that feature as to not cause any race conditions. Bob's ecogroup GBE may resemble the group example of FIG. 245 where a unitary group across two systems achieves synchronization whereas in Bob's ecogroup example there may be four systems. It may indeed be the same problem and solved the same way but applied here to show how sets of systems for a user may be organized as ecogroups' to distinguish them from other types of groups.

Storage Subsystems Management (SSM)

FIG. 293 shows Bob's ecogroup GBE comprising two systems. Bob's ecogroup GBE 29300 may comprise two systems, Sys1 29310 and Sys2 29320, and may have access to a network 29330 to communicate over. Storage Subsystems Management (SSM) may be a method of applying a combination of group nuts and loopback conduits to synchronize one or more disparate storage units operated as managed storage units by at least one system which may be a member of an ecogroup.

FIG. 294 shows the systems of ecogroup GBE. These two systems, SYS1 29400 and SYS2 29450, may represent a conventional computing device comprising CPU, RAM, hard drive, network adapters, disk controllers, graphics cards, OS, FS, etc. In this example, SYS1 and SYS2 may be members of group GBE and may be in a consistent state as shown.

SYS1 29400 may have several logical sections comprising: an application run section 29430 including RAM, CPU, OS, a temporary storage area 'tempdev1' either in RAM or disk, and a running NUTserver/RZ (NSRZ) in eRZ mode (external RZ) 29410 wherein may be stored and indexed in memory a set of NUTbook contacts 29432 and group nut GBE and two shadow catalog nuts 29434 C1A and C2A; and a persistent storage media drive HSN1 29420 which may have at least two separate Logical Storage Areas (LSA) LSA11 29422 and LSA12 29440. Logical storage area LSA11 29422 may store nuts that may be representative of the storage media comprising identify, catalogs, catalog overrides, and hardware characteristics. Logical storage area LSA12 29440 may store nuts and other files as may be requested by the local OS, FS and other apps such as the NSRZ. Ideally, catalog C1A 29426 in LSA11 may aim to reflect the state of LSA12 29440 accurately and consistently but there may be situations where it may be inconsistent, thus when a storage device such as but not limited to HSN1 29420 may be initialized, the system 29400 may run one or more consistency checks and/or may correct catalog nut C1A to reflect the state of LSA12 and/or may rebuild C1A from the contents of LSA12 entirely thereby accurately reflecting in C1A the nuts LSA12 may be holding making the state of C1A consistent with the state of LSA12.

SYS1 29450 may have several logical sections comprising: an application run section 29480 including RAM, CPU, OS, a temporary storage area 'tempdev2' either in RAM or disk, and a running NSRZ in RZ mode (internal RZ) 29460 wherein may be stored and indexed in memory a set of NUTbook contacts 29482 and group nut GBE and two shadow catalog nuts 29484 C1A and C2A; and a persistent storage media drive HSN2 29470 which may have at least two separate Logical Storage Areas (LSA) LSA21 29472 and LSA22 29490. Logical storage area LSA21 29472 may store nuts that may be representative of the storage media comprising identify, catalogs, catalog overrides, and hardware characteristics. Logical storage area LSA22 29490 may store nuts and other files as may be requested by the local OS, FS and other apps such as the NSRZ. Ideally, catalog C2A 29476 in LSA21 may aim to reflect the state of LSA22 29490 accurately and consistently but there may be situations where it may be inconsistent, thus when a storage device such as but not limited to HSN2 29470 may be initialized, the system 29450 may run one or more consistency checks and/or may correct catalog nut C2A to reflect the state of LSA22 and/or may rebuild C2A from the contents of LSA22 entirely thereby accurately reflecting in C2A the nuts LSA22 may be holding making the state of C2A consistent with the state of LSA22.

FIG. 295 specifies highlighted information from the nuts stored in ecogroup GBE. Nuts may be represented in both compact form 29500 and highlighted form 29502 using a tri-part box comprising metadata, universal keyhole and payload sections. Nut BOBID 29500 may be Bob's own contact nut for himself in his NUTbook on either system and may be further detailed as 29502. Access nut AND 29510 may hold an access key with KeyID=KGSG 29512.

A server contact nut for SYS1 29520 may hold keys KSYS1.[U,R] (read the public and private parts of an asymmetric key pair KSYS1), specifies that SYS1 may be the Storage Manager for storage unit SD1 and may be designated to use temporary directory or device 'tempdev1' to store transient objects. A server contact nut for SYS2 29530 may hold keys KSYS2.[U,R] (read the public and private parts of an asymmetric key pair KSYS2), specifies that SYS2 may be the Storage Manager for storage unit SD2 and may be designated to use temporary directory or device 'tempdev2' to store transient objects. The Storage Manager parameter may indicate that the local NSRZ may manage zero or more storage devices as specified; and it may also indicate that the NSRZ process may be the primary reader/writer of nuts for the indicated storage device; note that additional storage devices may be available to the server but may not have been configured to be used by the local NSRZ server.

A storage contact nut for SD1 29540 may indicate at least the hardware device ID as HSN1, a local base path of BP1, a device access key SDK1, and may be represented by catalog nut C1A in a NUTS environment. A storage contact nut for SD2 29550 may indicate at least the hardware device ID as HSN2, a local base path of BP2, a device access key SDK2, and may be represented by catalog nut C2A in a NUTS environment. A device ID may be any combination of hardware and/or identifying data encoded information that may uniquely identify the device within ecogroup GBE's operating environment. A local base path may indicate the location path to use for the NSRZ to store and/or manage nuts. This location path may be in the format that may be accepted by the local file system and/or operating system. The catalogs parameter may specify the catalogs that the drive may store, and the combination of these catalogs may comprise all that may be currently known to be held by the device within the context of the group that the catalog refers to and as known when last updated by the processing NSRZ. One or more device keys may be available if the local storage device may have one or more enabled, operating, hardware/software encryption layers requiring key(s) for Read and/or Write accesses.

A cloud drive storage contact nut for CL1 29560 may indicate the cloud account information, its login and password (or any required credentials), a priority list of cloud drive storage managers as SYS1 then SYS2, and may be represented by catalog nut CLA in a NUTS environment. The catalogs parameter may specify the catalogs that the cloud drive may store and the combination of these catalogs may comprise all that may be currently known to be held by the cloud drive within the context of the group that the catalog refers to and as known when last updated by the processing NSRZ.

FIG. 296 continues describing nuts in the GBE ecogroup.

A group nut for group GBE 29600 (29602) indicating that the members may be BOBID, SYS1, SYS2 and Access Nut ANID. Access Nut ANID may serve to give access to shared objects and other objects to a wider audience of users and/or processes (any identifiable asset) without requiring Bob to expose sensitive elements of his GBE Ecogroup such as but not limited to system contact nuts, storage contact nuts and access nuts.

Catalog nut C1A 29610 for catalog C1 for group GBE may hold catalog entries for a group nut ID GBE and a FHOG nut ID F1; furthermore, catalog nut C1A may be storage manager specific and may physically be located on storage device SD1 as may be indicated by the 'Catalogs' parameter of storage nut SD1 29542 and it may have a replication path that may be different than for typical shared nuts; catalog C1A may be considered to be 'paired' to a storage device. Copies of C1A may exist in more than one location within a single NSRZ system: 1) a persistent originating catalog for the storage device 29426 in LSA11 29422, 2) a shadow catalog in the local storage manager's (NSRZ) running memory 29436, 3) a persistent 'replica' 29446 in the normal storage area for nuts by the NSRZ. The purpose of these copies of C1A may be revealed in the coming example.

Catalog nut C2A 29620 for catalog C2 for group GBE may hold catalog entries for a group nut ID GBE and a FHOG nut ID F1; furthermore, catalog nut C2A may be storage manager specific and may physically be located on storage device SD2 as may be indicated by the 'Catalogs' parameter of storage nut SD2 29552 and it may have a replication path that may be different than for typical shared nuts; catalog C2A may be considered to be 'paired' to a storage device. Copies of C2A may exist in more than one location within a single NSRZ system: 1) a persistent originating catalog for the storage device 29476 in LSA21 29472, 2) a shadow catalog in the local storage manager's (NSRZ) running memory 29486, 3) a persistent 'replica' 29496 in the normal storage area for nuts by the NSRZ. The purpose of these copies of C2A may be revealed in the coming example.

Catalog nut CLA 29630 may correspond in character, purpose and behavior to C1A 29610 but in relation to a cloud drive CL1 29560.

Catalog nut CLA 29630 for catalog CL for group GBE may hold catalog entries for a group nut ID GBE and a FHOG nut ID F1; furthermore, catalog nut CLA may be storage manager specific and may physically be located elsewhere on a cloud drive as may be indicated by the 'Catalogs' parameter of storage nut CL1 29562 and it may have a replication path that may be different than for typical shared nuts; catalog CLA may be considered to be 'paired' to a particular cloud drive. Copies of CLA may exist in more than one location within a single NSRZ system: 1) a persistent originating catalog for the cloud drive on the cloud drive, 2) a shadow catalog in the local storage manager's (NSRZ) running memory, 3) a persistent 'replica' in the normal storage area for nuts by the NSRZ in the local system. The purpose of these copies of CLA may be revealed in the coming example.

FHOG nut F1 29640 may act as the 'M' in ICBM where it stands for Identity (GBE), Conduit (catalogs for GBE), Bond (all those keys and keyholes!) and Map (FHOG F1 and/or catalog). The payload lists entries similar to a catalog because F1 may be in "catalog" mode which may limit nut F1's carnac features to prevent "chasing its own tail" situations in a replicated environment such as this GBE group. Note that none of the C1A, C2A or CLA catalogs may be listed since storage device catalogs may have a different replication path than typical replicated nuts. Normal nut type IDs like GBE may be entered in both the group catalogs such as C2A 29622, C1A 29612 and FHOG F1 29642. In this GBE configuration of 29400, FHOG F1 may act as a "catalog" to share nuts amongst the group members. Text nut N10 29650 and chat nut N23 29660 may be simple data nuts for the purposes of this example.

FIG. 297 shows the replication paths of storage device catalogs. In distributed and decentralized environments, an important factor to consider may be how systems fail and/or recover from failures in repeated fashion. Failures may comprise any loss in communications, operating capacity of servers, hardware failures, system overloads, software abnormalities. Failures may lead to issues comprising corrupted data, partitioning, unsynchronized states in a group, loss of state, and loss of events and transactions. It may be useful to originate a state of a system via a consistent, repeatable and/or reliable method. Regardless of what may be the ideal current state of a group of networked systems, due to the unpredictability of asynchronous and/or simultaneous failures and/or the randomness of reliable recovery from each type of failure, an approach of incremental and/or available statefulness may lead to an acceptable and/or useful level of eventual consistency for a group of distributed and decentralized systems. Groups and loopback conduits may provide a mechanism to facilitate an eventually consistent system based on the incremental availability of its constituent members. The addition of physical storage devices to provide a persistent store may add complicating factors towards the origination of a system's state with the added requirement of being able to replicate shared objects amongst a group. A method which may balance such factors may be disclosed with the use of storage device catalogs and their various projections utilizing a particular style of replicating them.

Initializing a system such as 29700, a persistent store such as but not limited to LSA12 29740 holding a set of nuts may be systematically sifted by the NSRZ 29710 to build an index of nut IDs stored on LSA12. The process may find a copy of C1A 29746 in LSA12 29740 or a copy of C1A 29726 in LSA11 29722 or a copy of C1A 29736 in NSRZ memory 29734 to compare its own NutID index and 1) choose the more accurate version of C1A found, 2) build a brand new C1A from the generated NutID index and the information found in SD1 and SYS1, 3) update an existing C1A found on 29720 by traversing the catalogs and FHOGs and cross-referencing its generated NutID index and only including the NutIDs it may recognize then quarantine the unrecognized nuts. But, once a C1A catalog may be produced, updated and/or identified for use, a copy may be placed 29750 in LSA11 29722 as the persistent originating storage device catalog 29726 for storage device SD1 29720. A shadow catalog 29736 of the persistent originating catalog 29726 may be produced as a copy of C1A 29726 and placed 29752 in 29734 as C1A 29736, or replace 29752 the existing C1A 29736 with the newer copy of C1A. Then the shadow catalog may be copied and be stored (or overwrite an existing copy) 29754 in the normal nuts storage area of SYS1 NSRZ LSA12 29740. Thus, the local origination path for all three projections storage device catalog C1A of the store of nuts LSA12 29740 in storage device SD1 29720 may be defined. This type of origination path may assure the accuracy of C1A as being the most stateful representation of the nuts stored in SD1 LSA12.

The preferred method of updating the shadow catalog of C1A 29736 in some embodiments may be to copy the originating catalog C1A 29726 upon its modification. Thus, it may be preferred that no other system (or NSRZ) may update C1A catalogs except by the NSRZ system managing the storage device, and the preferred path may be to update 29726, copy into 29736, then copy into 29746. In this case, the only C1A that NSRZ 29710 may modify may be 29726 and C1A 29726 may only be modified by state changes in LSA12 29740 thereby always presenting a consistent view of the state of the storage area LSA12 via a consistent origination path. Another purpose of the shadow catalog C1A 29736 may be to provide an efficient in-memory copy of C1A 29726 for NSRZ processing. Another purpose of the shadow catalog C1A 29736 may be to provide other connected NSRZs ready replies 29760 to queries of catalogs regarding any combination of identifying features of the catalog comprising NutID, group ID, CatID and version marker. On the flip side, if SYS1 were the querying NSRZ and queried the NSRZ of SYS2 about its catalogs for group GBE CatID C2, SYS2 may respond by sending 29770 a copy of catalog C2A 29738. The existing and just received versions of C2A 29738 may be compared for differences and processed (discussed shortly). Then the existing C2A 29738 may be simply replaced with the newly received one and thus may be considered effectively a 'read-only' copy of C2A on SYS1 since SYS1 may not be the storage manager on this catalog C2A. Then a copy of C2A 29738 may be stored 29772 (or replace the existing) as C2A 29748 in the normal nuts store LSA12 29740. If missing catalog entries may be found in the C2A catalog comparison, then there may be at least two paths of resolution: 1) none of the missing entries may be relevant to the nuts stored in SYS1 except for C2A, then the difference processing may be complete; 2) at least one reference may be made by a nut known to SYS1 including catalogs and/or FHOG other than catalog C2A, then each NutID of each missing entry may be queried to SYS2 to ask for a copy of each and each catalog and/or FHOG reference said missing NutID may be updated by adding another entry for the missing NutID/version marker with a status of 'pending'. For example, suppose FHOG F1 29740 may be in nut mode and may have been modified in SYS2 to F1 v2 and the version known by SYS1 C2A may be F1 v1. SYS2 knows C2A v2 and SYS1 knows C2A v1. When SYS1 NSRZ queries SYS1 concerning catalogs related to CatID C2 group GBE, SYS2 may respond with a copy of C2A v2. SYS1 may compare the existing C2A v1 against C2A v2 and may find that it may be missing F1 v2 in its catalog entries. SYS1 may scan all its catalogs, FHOGs and NutID indexes and 1) find that it recognizes FHOG F1 but has version v1 and 2) F1 may be referenced by catalog C1A as F1 v1. Therefore, for one or both reasons, SYS1 may ask SYS2 for a copy of F1 v2 and may note such a request in it memory space. When SYS2 sends F1 v2 to SYS1, SYS1 may note that it recognizes F1 v2 as having been requested and may begin processing it. Since we supposed that F1 may have been in nut mode, SYS1 may process F1 like any other nut other than a catalog and/or a FHOG in catalog mode. SYS1 may synchronize (merges) F1 v1 with F1 v2 and may result in F1 v2 thus it may replace F1 v1 in LSA12 with F1 v2. The saving of F1 v2 into LSA12 triggers the origination path spin-cycle for C1A to start resulting in an updated version of originating storage device catalog C1A in LSA11 which leads to an update or overwrite of the shadow catalog C1A which leads to a copy of the shadow catalog to overwrite the copy of C1A in LSA12. This may present a synchronized state of SYS1 with respect to C2A across both SYS1 and SYS2, F1 v2 across both SYS1 and SYS2, all three copies of C1A on SYS1 to reference F1 v2, therefore, the state of group GBE between members SYS1 and SYS2 may be considered consistent. In the configuration of this example, FHOG F1 may act as the reference bridge between two different catalogs C1 and C2 on two physically different storage devices SD1 and SD2 on two different managing systems SYS1 and SYS2 operating two different NSRZs but conjoined by a group membership in group GBE and a common map in FHOG F1, thus any changes to FHOG F1 in either mode may make its way towards synchronizing the group members eventually. This example may show that a change in a nut F1 replicates across the group GBE. Note that the replication pathway for F1 v2 may be subtly different from the replication pathway for storage device catalogs like C1A primarily in the manner in which an NSRZ process may make queries: when querying for catalogs and/or nuts acting like catalogs, an NSRZ process may use any combination of NutIDs, CatIDs, group IDs, version markers and/or other identifying attributes whereas when querying for nuts unlike catalogs, an NSRZ process may prefer to but not necessarily be limited to the use of NutIDs and/or version markers.

The path of the originating storage device catalog and its subsequent projections may be done stepwise as disclosed or may be more efficiently done as an atomic transaction involving all of the steps involved by the NSRZ but irregardless each action may be performed in the end. Note that by introducing common FHOGs across different catalogs of different storage devices, it may be possible to allow changes to be made to the contents of a storage device whether it may be online or not. In the example, if SD1 was offline, F1 v2 may have been still modified by SYS2 on SD2. When SD1 may come back online and may begin synchronizing, the F1 v2 change may flow into SD1 from SYS2 thus effectively allowing changes to an object stored on an offline device to be 'queued' in the group whilst still allowing full utility to the rest of the group that may be online and operating.

Origination paths of catalogs may present a priority of sourcing that may value accurate representations over timeliness: 1) storage device, a persistent store holding objects may be preferred over transitory stores when initializing in isolation; 2) storage device catalogs, a storage device shutdown in an orderly manner may present an accurate representation of its object holdings upon initialization reflecting its last state before shutdown which may not necessarily be the most currently 'queued' state of some of its objects across the group; 3) shadow catalogs may allow other group members to know the full or partial state of other storage devices in other systems. In some embodiments, the preferred path of state change may be to start as close to or at the storage device level as possible to maintain this origination path of catalogs for accuracy and consistency across groups. Catalogs may cross list an object's NutID directly and/or indirectly (via maps) for the following purposes such as but not limited to organization, replication, resiliency, redundancy, timeliness, availability, segmentation, routing, load sharing, object sharing, and security.

FIG. 298 illustrates ecogroup nut replication. This example may extend the previous example to show how SYS1 creating nut N10 may store it on LSA12 on disk drive HSN1 and then may share N10 with ecogroup GBE which may result in N10 being replicated to a different logical storage area LSA22 on a different device HSN2 managed by a different server SYS2 which may happen to be a member of group GBE, thus this process may be affecting an eventual consistency across all the members of the group GBE particularly pertaining to the newly shared nut N10; this process may be construed as replicating a new nut N10 from SYS1 to SYS2, or more broadly, ecogroup nut replication.

In FIG. 298, we may go back to the FHOG as defined 29642 where it may be in catalog mode. Bob creates nut N10 29850 in memory on SYS1 29830 using NSRZ 29810 and may save it to the NSRZ's default storage device it may be managing which happens to be SD1 29820 as per SYS1 contact nut 29520. Then, local NSRZ 29810 may manage the SD1 storage device. The NSRZ may examine SD1's catalog nut C1A 29826 in LSA11 29822 and may find that there may be a FHOG F1 29642 that may be mapping shared nuts for the default catalog (of group GBE) of this device operating in the 'catalog' mode of a FHOG. Then, the NSRZ may update 29852 FHOG F1 by adding an entry for nut N10 v1 which may have been just saved on SD1 and it may create a new version marker v2 for F1. Closing F1 v2 and saving it may trigger the NSRZ to search if any of its catalogs in memory mapped FHOG F1. SYS1 NSRZ may find that shadow catalog C2A 29838 references F1 v1 but it may ignore it since SYS1 may not manage SD2 the storage device of C2A. SYS1 NSRZ may find that shadow catalog C1A 29836 references F1 v1 in 'local' state so it adds a catalog entry with F1 v2 in a 'local' state into storage device catalog C1A 29826 and may save it back to LSA11 29822 with a revised version marker C1A v2 29826. This action may trigger the originating path of storage device catalog updates as described previously resulting in having copies of C1A v2 29826 as C1A v2 29836 and C1A v2 29846. In SYS1, the F1 v2 may be synchronized by all catalogs and/or FHOGs referencing F1 and under the management of SYS1.

FIG. 299 continues the example from FIG. 298. At some periodic interval and/or by some triggering event, SYS2's NSRZ 29960 in RZ mode (internal RZ, therefore may query, request and/or poll an eRZ) may perform a catalog poll to its eRZ 29910 on SYS1 by requesting, "send me all your catalogs for group=GBE". Note that this polling method may be simplistic and inefficient and overly broad and there may be many well-known methods to enhance such polling but for this example it may be sufficient to make its point. At which point the eRZ 29910 may respond by sending its copies of catalogs C1A v2 29936 and C2A v1 29938 to RZ 29960. RZ 29960 of SYS2 may receive the catalogs from SYS1 into its tempdev2 storage area and then may start processing them using the NS process 29960. NSRZ 29960 ignores and may delete catalog C2A v1 it received from SYS1 because it may be under its management via SD2 and SYS2 contact nuts; SYS2 may be the originating source for C2A catalogs. Comparing C1A v2 from SYS1 with SYS2's local C1A v1 29986, NSRZ 29960 may determine that F1 v2 may be missing in its local catalog C1A v1 29986. Since C1A may not be under SYS2 management, the NSRZ simply may replace C1A v1 with C1A v2 into 29986 and 29996. NSRZ 29960 checks its NutID index and may determine that shadow catalog C2A v1 29988 also references F1 and that C2A may be SYS2's responsibility. Checking the version of F1 in C2A v1 29988 vs the missing F1 v2 from C1A v2, the NSRZ 29960 may then request the missing nut F1 v2 from SYS1 NSRZ 29910, note the request in running memory. The NSRZ of SYS1 29910 may respond to the query by sending back a copy of F1 v2 to SYS2. F1 v2 may be recognized by the NSRZ of SYS2 as having been requested and/or by checking its NutID index and finding F1 being referenced by C2A which may be a SYS2 responsibility. NSRZ 29960 may process the received F1 v2 by treating it like a catalog (FHOG F1 may be configured for catalog mode) and may compare it against its locally existing F1 v1 and may find that it may be missing N10 v1 which it may request from SYS1 and may note the request in memory. SYS1 may respond to the query by sending a copy of N10 v1 to SYS2. SYS2 may be expecting N10 and may store it in LSA22 then it may find all FHOGs and catalogs it may manage referencing N10 resulting in F1 v1 in LSA22. F1 v1 29990 may be updated by adding an entry for N10 v1 'local' and saved in LSA22 which triggers the originating path of storage device catalog updates as described previously resulting in having copies of C2A v2 29976 as C2A v2 29986 and C2A v2 29996. In SYS2, the F1 v2 may be synchronized by all catalogs and/or FHOGs referencing F1 and may be under the management of SYS2, and F1 v2 may contain a reference to N10 v1 may be locally saved as well as N10 v1, thus the group GBE may be consistent.

This example may show how FHOG F1 may act as a reference bridge between two different catalogs on two different storage devices across two different systems within the same group to accomplish a replication of a data nut within the group making its state consistent. C1A may have shadow copies of itself (in memory and/or local storage) in another system SYS2 because it may be of interest to a group GBE of which SYS2 may be a member of; furthermore, in SYS2, C1A may NOT be a locally modifiable catalog because it may not be managed by SYS2, therefore, in SYS2, C1A may be replaced by the more recent version of C1A if just received. C1A may have shadow copies of itself (in memory and/or local storage) in system SYS1 because it may be of interest to a group GBE of which SYS1 may be a member of; furthermore, in SYS1, C1A may be a locally modifiable catalog because it may be managed by SYS1, therefore, in SYS1, C1A may be updated by the state change of a local object listed in its catalog entries. Any map objects such as but not limited to FHOG nuts referencing the just changed local object may also be updated by the same state change.

The group/loopback conduit for ecogroup GBE may allow for the treatment of an offline storage device as a partitioned system promoting the features of automatic eventual consistency to be applicable to local storage devices. This method of partition healing applied to storage devices allows for storage devices to be moved from one system to another and be made manageable by the host system's NSRZ with minor updates to the server and storage contact nuts. An example may be removable storage devices such as but not limited to flash drives (it may be that in theory any storage device may be eligible for 'removal' physically and/or inactivated from its host system thus any storage device may be thought of as 'removable').

By adding proper carnac revisions into a storage device contact nut, one may affect automated responses preconfigured by the owner of the storage device: a carnac revision entry of a possible future event (fate) placed in the storage device contact nut may be triggered by flash drive insertion into a host which may specify that if the host NSRZ may not be an authorized host for the flash drive, the flash drive may be wiped clean of its data thus it may protect from data leakage. The flash drive may store its own storage device contact nut in another portion of the device and/or a protected area/chip of the storage device which may instruct in cleartext metadata of its preference to be deleted when unrecognized by the host NSRZ. Some practical implications of the group/loopback conduit method of eventual consistency may be illustrated by the following scenarios but this disclosure may not be limited by these as there may be too many to illustrate. Bob may be on a business trip with his laptop and he wants to browse the nuts on a flash drive plugged into his home desktop which he left inserted and the desktop powered on and in operating condition: Bob's laptop NSRZ and storage device may already have the latest shadow catalog locally reflecting the contents of the flash drive. Bob may want to store notes he took during this trip in a note nut and have it be stored on that flash drive: he may store the notes in a nut on his laptop and shares it with a group that includes his flash drive as a storage device for the group, then the group's eventual consistency mechanism may allow the replication of the notes nut back to his flash drive plugged into his desktop at home whenever the laptop may communicate with his home computer via an iRZ server or any other means. While Bob was away on business, his teenage son needs a flash drive for school work and just grabs Bob's flash drive and inserts it into his own laptop running his own standard NSRZ process: 1) his son's laptop's local NSRZ may not recognize the flash drive, nor may have any keys to access its nuts so it may prompt Bob's son whether it should erase the flash drive; 2) his son's laptop's local NSRZ may observe that the cleartext metadata on the flash drive's storage device catalog may indicate its preference for deletion upon the local NSRZ not recognizing it, thus the flash drive contents get wiped clean which honors Bob's data loss prevention preferences. Bob may use a dual hard drive setup on his desktop in his home office where he allocates the second drive primarily as a nuts store for his ecogroup and he wants to unplug it and install it into his server in the basement with extra disk controllers which also is a member system of his ecogroup: Bob unplugs the hard drive from his desktop and plugs it into his server and reboots it, as long as the server may accept and may auto configure it to be recognized as a local device, an auto configuration by the NSRZ and the ecogroup information may be sufficient for his server to recognize the drive, start managing it as a local nuts store, and be made available to his ecogroup on his other machines including the desktop he pulled the drive from without any further intervention from Bob. The SSM methodology of configuring an ecogroup to manage storage devices may allow any storage device and/or service to be treated as a removable drive primarily because the NSRZ server may act on behalf of its managed storage device(s) and may let each such managed storage device behave as if it may be a system that may be a member of the group in an indirect and/or direct way. Therefore, the SSM method may inherit all or some of the distributed and decentralized features that may be found in the behavior of groups and loopback conduits as exemplified in these embodiments. An alternative view of SSM which may extend itself to any configurable device and/or service including IoT, cloud servers, cloud accounts, etc. may be to consider it as at least one identity forming a cryptographic relationship with at least one other identity including the at least one identity and operating a combination of groups and loopback conduits which may allow data synchronization amongst the identities.

FIG. 300 illustrates a SSM with a cloud drive and flash drive. The SSM of SYS1 and SYS2 of Bob's ecogroup GBE as previously configured may add a cloud drive CL1 30022 and a flash drive FD1 30072 to its storage device managing responsibilities as diagramed. The cloud drive CL1 30022 comprises access nut CL1 30024 (and its other copies in this configuration), origination path storage device catalog CLA 30026 (and its other copies in this configuration) and appropriate modifications to the SYS1 server contact nut to be the storage manager for SD1 and CL1. As long as a cloud drive may provide Read and Write access, an NSRZ may treat it like any other storage device. There may be many efficiencies to be extracted from such configurations but this example illustrates the minimums required to implement such features as may be provided by configuring a SSM in an ecogroup. The flash drive FD01 30072 comprises storage device contact nut FD1 30074 (and its other copies in this configuration), origination path storage device catalog FDA 30076 (and its other copies in this configuration) and appropriate modifications to the SYS2 server contact nut to be the storage manager for SD2 and FD1. When a flash drive is inserted into SYS2, there may be automated configuration processes that reconfigures the SYS2 server contact/access nut to become the storage manager of FD1 as well and beginning the process of letting FD1 get in sync with the ecogroup. Modifications to server contact nut SYS2 may replicate across the ecogroup thus informing the group and its operating members of the current status and whereabouts of flash drive FD1; this eventually consistent (replicative/synchronization) behavior may be a significantly desirable feature in a distributed and decentralized environment whose implications include resiliency, redundancy, recoverability, statefulness, independence, availability, remote indirect inspection, security, partition resiliency, incremental partition healing, data loss minimization, system data completeness, auto-configurability, process simplicity, process consistency, flexible configurability and organic scalability. The term organic may be used in the context that the methods comprising groups allow for a NUTS based system to exhibit incrementally greater capacities such as but not limited to storage, processing, communication, distance, system features, data resiliency, as members may be added to the group in a consistent and seamless way. The NUTbook entries in a NUTS ecogroup may be able to securely identify any asset that may be part of the ecogroup such as but not limited to users, groups, hardware, accounts, networks, IoT devices, servers, laptops, storage devices, licenses, software, processes, data, databases, etc. where such a feature may be considered a self-describing system.

A note may be made on the multiple copies created by the replication of the origination storage device catalogs like FDA 30058. Such copies may be driven by several features of the system comprising redundancy, resilience, data completeness, data loss prevention, reproducibility, availability, support loopback conduit activities, interchangeability, self-describability, and regenerative states from persistent stores. An observation may be made that biological organisms may exhibit similar data completeness characteristics in that DNA may be required to be complete in all or most cells in an organic organism for it to survive. The configuring of a Storage Subsystems Management (SSM) in an ecogroup may allow using the data synchronization and replication features inherent in a groups and loopback conduits operated data sharing scheme to replicate and/or synchronize data objects across one or more physically and/or logically distinct storage units which may be each managed by members of a common ecogroup. Furthermore, SSM may or may not require a logical storage unit to be members of the common ecogroup.

Multiuser Groups

Reviewing some of the features discussed in this disclosure: group/loopback conduits may allow for the creation of logical groups of any size; storage subsystem groups may integrate any storage device to become a member of a group; group members may be span users, processes, systems, devices, accounts, etc.; each group member may have groups or collections of systems. There may be a need for a system to host multiple groups as separate and/or in carefully conjoined ways. Conventionally this may be referred to as multiuser or multisystem hosting.

FIG. 301 illustrates a VM hosting multiple NUTS systems. A virtual machine host (VMH) may be a powerful server that may virtually host multiple instances of virtual machines (VM) within itself wherein each VM may act independently. There may be many varieties of VMH and VM with various features. VM host 30100 may be operating a hypervisor process 30110 which allows multiple VMs to be hosted VM1 30120, VM2 30130, VM3 30140 and VM4 30150 and each VM may be an instance of a NUTS system running an NSRZ process. These VM NUTS systems may be part of the same group, of some groups and/or of its own group. A set of individual NSRZs may be configured to act as a single logical NUTserver/RZ group to allow for load balancing, availability, capacity, attack mitigation, and redundancy. A VM NSRZ may behave and may be treated like any standalone NSRZ instance.

FIG. 302 shows multiple ecogroup hosting using a Server Ecogroup. The system of Alice's Windows 10 machine Win10 30200 may be running an NSRZ in eRZ mode 30210 configured with Alice's Server Ecogroup SEA 30220 having as its members, at least, Alice's Ecogroup GAE 30230 named SYSALICE and Bob's Ecogroup GBE 30240 called SYSBOB, each of which may be configured by the SEA group to have access to distinct logical storage areas, SD1 30260 for GAE and SD2 30270, allocated on the single storage device of system Win10 30200 disk drive HSN1 30250 which may be managed by the Server Ecogroup of Alice SEA 30220 as storage device unit SD0 30250. The allocated logical storage units SD1 and SD2 may be partitions, files, directories and/or any logical disk areas allowed by the combination of file system and operating system operating on Win10 30200. The organizational structure of a Server Ecogroup may require the operating NSRZ to recognize it and be appropriately respective of the secure partitioning of memory spaces, threads and processes amongst the hosted Ecogroups. The NSRZ hosting and operating a Server Ecogroup may spawn, manage and coordinate separate processes and/or threads where each process and/or thread may be running a hosted Ecogroup each. The NSRZ hosting and operating a Server Ecogroup may operate in a multitasking mode where each hosted Ecogroup may be stacked in a polling queue and tended to as its own memory space but managed by a single process which may be utilizing multiple processors or threads. In any configuration, the Server Ecogroup hosting NSRZ may take care in not allowing the leakage of cryptographic secrets from one hosted Ecogroup to another.

An example of a Server Ecogroup hosting may be shown in FIG. 282 where Bob's laptop 28280 may be operating an NSRZ servicing a Server Ecogroup for Bob configured to allow both Bob's Ecogroup 28260 and Alice's ecogroup 28270 to run concurrently 28250.

FIG. 303 shows a group of two across two separate systems. Shown are two systems one each for Alice ALICESYS 30300 and Bob BOBSYS 30320 running on separate physical hardware. A group GAB 30340 with two members, Alice and Bob, may be established where the contact nuts for each member's NUTbook may be illustrated: $Alice_A$ 30310 may be Alice's own contact nut for herself in the Alice NUTbook, $Bob_A$ 30312 may be Bob's contact nut in the Alice NUTbook, $Bob_B$ 30330 may be Bob's own contact nut for himself in the Bob NUTbook, and $Alice_B$ 30332 may be Alice's contact nut in the Bob NUTbook. This may be a typical user to user group setup for sharing nuts across two physically separated systems most likely utilizing an iRZ accessible in the internet by both systems. The group GAB 30340 may have been setup initially by Alice, Bob or an introducing MC who no longer may be part of the group GAB.

FIG. 304 shows a group of two across two separate Ecogroups hosted by a Server Ecogroup. Shown are two ecogroups one each for Alice SYSALICE GAE 30430 and Bob SYSBOB GBE 30440 hosted by a Server Ecogroup SEA 30420 on a single system 30400. A group GAB 30480 with two members, Alice and Bob, may be established where the contact nuts for each member's NUTbook may be illustrated: $Alice_A$ 30432 may be Alice's own contact nut for herself in the Alice NUTbook, $Bob_A$ 30434 may be Bob's contact nut in the Alice NUTbook, $Bob_B$ 30442 may be Bob's own contact nut for himself in the Bob NUTbook, and $Alice_B$ 30444 may be Alice's contact nut in the Bob NUTbook. This may be a typical user to user group setup for sharing nuts across two distinct ecogroups both hosted by a single Server Ecogroup where the Server Ecogroup's NSRZ 30410 may service RZ requests from each hosted ecogroup similar to an iRZ. The group GAB 30480 may have been setup initially by Alice, Bob or an introducing MC who no longer may be part of the group GAB. This scenario may be applicable to the configuration seen in 28250 in FIG. 282.

FIG. 305 shows a group of two across two separate systems. This configuration may extend the configuration shown in FIG. 303 where Bob may have asked Alice to allow him access to their shared nuts in group GAB on Alice's Ecogroup NSRZ 30502. Alice may create a new contact nut for $Bob2_A$ 30514 in her NUTbook and may configure it so that Bob may have access to it (this may be as simple as giving Bob a keyhole into $Bob2_A$ with a passphrase) and then Alice may add $Bob2_A$ as a member of group GAB with some local space for Bob2 (this may be as simple as a Bob2 directory with size constraints). This may give Bob access to the shared nuts within group GAB on Alice's ecogroup system. Furthermore, Bob may ask Alice to allocate him more space so he may access some nuts available on his own ecogroup. Alice may allow Bob2 to form group GBB 30542 between the $Bob2_A$ contact 30514 and a part of Bob's ecogroup and/or the entire Bob ecogroup (inadvisable unless Alice and Bob trusted one another a lot, such as within the same family). To facilitate, isolate and/or limit the possible incursion of her own ALICESYS system from being overwhelmed by Bob's full ecogroup comprising a massive video movie collection, Alice may constrain Bob2 to only operate within a restrictive FHOG Bob2 30544 limited to nuts of a certain type and/or size. Also, other catalog overrides operating in ALICESYS may restrict such large nuts or sets of nuts from being replicated into her system automatically.

FIG. 306 shows a group of two across two separate Ecogroups hosted by a Server Ecogroup. This configuration may extend the configuration shown in FIG. 304 where Bob may have asked Alice to allow him access to their shared nuts in group GAB 30680 on Alice's Ecogroup GAE 30630. Alice may create a new contact nut for $Bob2_A$ 30636 in her NUTbook and may configure it so that Bob may have access to it (this may be as simple as giving Bob a keyhole into $Bob2_A$ with a passphrase) and then Alice may add $Bob2_A$ as a member of group GAB with some local space for Bob2 (this may be as simple as a Bob2 directory with size constraints). This may give Bob access to the shared nuts within group GAB on Alice's ecogroup system GAE. Furthermore, Bob may ask Alice to allocate him more space so he may access some nuts available on his own ecogroup. Alice may allow Bob2 to form group GBB 30682 between the $Bob2_A$ contact 30636 and a part of Bob's ecogroup GBE and/or the entire Bob ecogroup GBE (inadvisable unless Alice and Bob trusted one another a lot, such as within the same family). To facilitate, isolate and/or limit the possible incursion of her own ALICESYS system from being overwhelmed by Bob's full ecogroup comprising a massive video movie collection, Alice may constrain Bob2 to only operate within a restrictive FHOG Bob2 30638 limited to nuts of a certain type and/or size. Also, other catalog overrides operating in ALICESYS may restrict such large nuts or sets of nuts from being replicated into her system automatically.

Server Ecogroups may allow the comingling of separate ecogroups in precisely controlled ways without reliance on a centralizing authority. The benefits of ad-hoc secure group creations as needed by arbitrary groups of individual systems and/or users may be many comprising insider threat mitigation, ransomware resiliency, data loss prevention, classified data compartmentalization, classified data sharing in controlled ways, supply chain protection, consistent methods, scalability, automation, administrative bottlenecks, lower overheads, bidirectional data updates, simultaneous data updates, asynchronous data updates, better utilization of processing power, storage space and digital devices.

CONCLUSION

The various embodiments and scenario examples which may have been detailed may be based on the core NUTS philosophy that data belongs to the user who generated it and that the user may have the means to control its exposure with precision. The design may be flexible enough to accommodate variations and/or alternatives such as but not limited to alternate cipher methods, keys of different lengths, different data transmutations, and/or different locking mechanisms. SDFT may provide a useful tool set for the programmer with which to transmute data at the lowest levels and may help in the enabling of Structured Cryptographic Programming to construct NUTS structures and other complex cryptographic structures. SDFT may allow a portability of data paired with its transmutation commands in a flexible and generalized way. NUTS' various embodiments may be customized to fit into existing organizational and security infrastructures or it may be stand-alone installations for a single user. The tangibility of data may be an important philosophy that NUTS proposes and may implement, the ability for users to store, manipulate and/or review the data that they may generate in simple ways while offering features befitting the most sophisticated managed systems. In conclusion, NUTS may give individual users an alternative to current methods of organizing their digital works and data.

Moreover, portions of this disclosure may augment the utility of the NUTS systems and methods to be applicable to groups of systems. The aim of the overall design philosophy may be to maintain user individuality and control over a user's digital assets in a secure, manageable, and resilient way while being respective and considerate of the ad-hoc nature of systems usage and configurations by different users. Introducing layered consistent methods with integration in mind may allow for easier overall integration of the NUTS set of technologies to any existing system. Foremost, these disclosures may provide the average individual user with some of the most sophisticated methods available to control and secure their digital environment in ways that may be only available to advanced institutions. Scale may matter but in the NUTS view, scale may start with a single system and more likely a single data object, for all digital systems may in the end rely on secure data for proper operations in a heterogeneous environment which may be hostile by default. Security may allow data objects to be endowed with more abilities which may encourage data objects to ask services to perform actions on their behalf in a trusted manner thereby data may be made more autonomous, self-reliant, self-organizing and/or self-aware. In conclusion, the proper security of data may be the basis for creating and configuring inherently secure systems where the security characteristics of the data object may be emergent at larger scales of usage which may be referred to as fractal security.

What is claimed is:

1. A system for organizing data comprising:

at least one memory;

a plurality of lock nodes (nut) stored in the at least one memory, each of the lock nodes comprising:

an input section including a plurality of key maps, each of the key maps being encrypted with a corresponding one of a plurality of primary keys, respectively, the key maps including a plurality of main keys;

a variable lock section including an encrypted derived key, the encrypted derived key configured to be decrypted with a key derived from a logical operation on the plurality of main keys corresponding to the plurality of primary keys applied to the input section; and an output section including encrypted data, the encrypted data configured to be decrypted with the derived key;

at least one keyhole lock node of the nut including a key map for each of the primary keys including at least one access attribute key, the at least one access attribute key configured to provide role based access control based on the corresponding primary key within the nut; and at least one of the lock nodes providing an output key which is a primary key for another of the lock nodes; and at least one flexible hierarchy object graph (FHOG) node stored in the at least one memory, the at least one FHOG node comprising:

a FHOG input section including a plurality of FHOG key maps, each of the FHOG key maps being encrypted with a corresponding one of a plurality of primary FHOG keys, respectively, the FHOG key maps including a plurality of main FHOG keys;

a FHOG variable lock section including an FHOG encrypted derived key, the FHOG encrypted derived key configured to be decrypted with a key derived from a logical operation on the plurality of main FHOG keys corresponding to the plurality of primary FHOG keys applied to the FHOG input section; and a FHOG output section including an encrypted reference set, the encrypted reference set configured to be decrypted with the FHOG derived key, the reference set comprising references to each of the nuts that collectively define a reference based file system including the nut;

wherein each key map includes at least one access attribute key, the input section further including at least one encrypted access role key, the at least one encrypted access role key configured to be decrypted by the at least one access attribute key, the at least one access role key configured to enable at least one operation on the data, wherein the at least one access role key is based on permissions associated with the designated primary key resulting in the particular key map.

2. The system of claim 1, wherein the at least one reference to a digital resource includes at least one attribute associated with the digital resource.

3. The system of claim 1, wherein the at least one reference to a digital resource includes at least one attribute referring to at least one reference to another digital resource.

4. The system of claim 1, wherein the input section of one of the lock nodes provides at least one access key for another of the lock nodes.

5. The system of claim 1, wherein at least one key map for one of the lock nodes includes at least one stratum key, the at least one stratum key decrypting a different key map for at least one lock node different from the one lock node.

6. The system of claim 5, wherein the at least one stratum key and the input sections of the lock nodes in the nut control which lock nodes of the nut are accessible for the particular designated primary key.

7. The system of claim 1, wherein the output section of at least one lock node of the nut stores at least one log section storing data related to accesses of the nut across a plurality of different applications.

8. The system of claim 7, wherein the at least one log section is stored in encrypted form.

9. The storage unit of claim 7, wherein at least one parameter stored in the nut controls what is logged and what is not logged.

10. The system of claim 7, wherein at least one parameter stored in the nut controls a level of detail in the at least one log.

11. The system of claim 7, wherein at least one parameter stored in the nut controls a type of log to produce.

12. The system of claim 11, wherein the type of log comprises log entries involving processing events involving the nut.

13. The system of claim 11, wherein the type of log comprises historical revision entries involving the data in at least one of the lock nodes in the nut.

14. The system of claim 7, wherein at least one parameter stored in the nut controls a method of producing a log entry.

15. The system of claim 1, further comprising combining the at least one access role key in a logical operation with other provided at least one access role keys to form a union of all the defined operations permitted on the data.

16. The system of claim 1, wherein the reference set comprises a list of nut identifiers.

17. The system of claim 1, wherein the reference set comprises a list of nut payload types.

18. The system of claim 1, wherein the file system is defined independently of the physical locations of the nuts.

19. The system of claim 1, wherein permissions associated with the primary FHOG keys are independent from the permissions associated with the primary keys of each referenced nut.

20. The system of claim 1, wherein the FHOG output section further comprises other encrypted data configured to be decrypted with the FHOG derived key.

* * * * *